US006525875B1

(12) United States Patent
Lauer

(10) Patent No.: US 6,525,875 B1
(45) Date of Patent: Feb. 25, 2003

(54) MICROSCOPE GENERATING A THREE-DIMENSIONAL REPRESENTATION OF AN OBJECT AND IMAGES GENERATED BY SUCH A MICROSCOPE

(75) Inventor: Vincent Lauer, 1 villa de Beauté, Nogent sur Marne (FR)

(73) Assignee: Vincent Lauer, Nogent sur Marne (FR)

( * ) Notice: Subject to any disclaimer, the term of this patent is extended or adjusted under 35 U.S.C. 154(b) by 0 days.

(21) Appl. No.: 09/673,026

(22) PCT Filed: Apr. 13, 1999

(86) PCT No.: PCT/FR99/00854

§ 371 (c)(1),
(2), (4) Date: Dec. 1, 2000

(87) PCT Pub. No.: WO99/53355

PCT Pub. Date: Oct. 21, 1999

(30) Foreign Application Priority Data

| Apr. 15, 1998 | (FR) | 98 04654 |
| Aug. 6, 1998 | (FR) | 98 10136 |
| Jan. 6, 1999 | (FR) | 98 00042 |
| Apr. 12, 1999 | (FR) | 98 04536 |

(51) Int. Cl.[7] .............................................. G02B 21/00
(52) U.S. Cl. ..................... 359/371; 359/368; 359/386
(58) Field of Search ............................... 359/370, 371, 359/368, 385, 386

(56) References Cited

U.S. PATENT DOCUMENTS 5,736,958 A * 4/1998 Turpin ........................ 342/179
5,751,243 A * 5/1998 Turpin ................... 250/370.08

OTHER PUBLICATIONS

R. Dändliker, K. Weiss, "Reconstruction of the Three–Dimensional Refractive Index from Scattered Waves", Optics Communications, vol. 1, No. 7, p. 323, Feb. 1970, The Netherlands.

A.F.Fercher, H.Bartelt, H.Becker, E.Wiltschko, "Image Formation by Inversion of Scattered Field Data: Experiments and Computational Simulation". Applied Optics, vol. 18, No. 14, p. 2427, Jul. 1979, Optical Society of America, United States.

S.Kawata, O.Nakamura & S.Minami, "Optical Microscope Tomography. I. Support Constraint" Journal of the Optical Society of America A, vol. 4, No. 1, p. 292, Jan. 1987, Optical Society of America, United States.

Tomoya Noda, Satoshi Kawata & Shigeo Minami, "Three–Dimensional Phase–Contrast Imaging by a Computed–Tomography Microscope", Applied Optics, vol. 31, No. 5, p. 670, Feb. 10, 1992, Optical Society of America, United States.

A.J.Devaney and A.Schatzberg, "The Coherent Optical Tomographic Microscope", SPIE proceedings, vol. 1767, p. 62, 1992, SPIE, United States.

(List continued on next page.)

Primary Examiner—Mark A. Robinson

(57) ABSTRACT

A microscope is disclosed which determines a complex three-dimensional representation of an object based on a series of recordings of the light wave diffracted by the object, wherein the direction of the wave lighting of the object varies between two succesive recordings. The diffracted wave interferes with a reference wave on a receiving surface and a frequency representation of the diffracted wave is computed from interference patterns received on the receiving surface. A plurality of frequency representations of diffracted waves are then superimposed yielding a frequency representation of the object. The phase of each frequency representation of a diffracted wave is shifted in order to compensate for variations of the phase difference between the reference wave and the wave lighting of the object.

39 Claims, 61 Drawing Sheets

OTHER PUBLICATIONS

Figure 1:
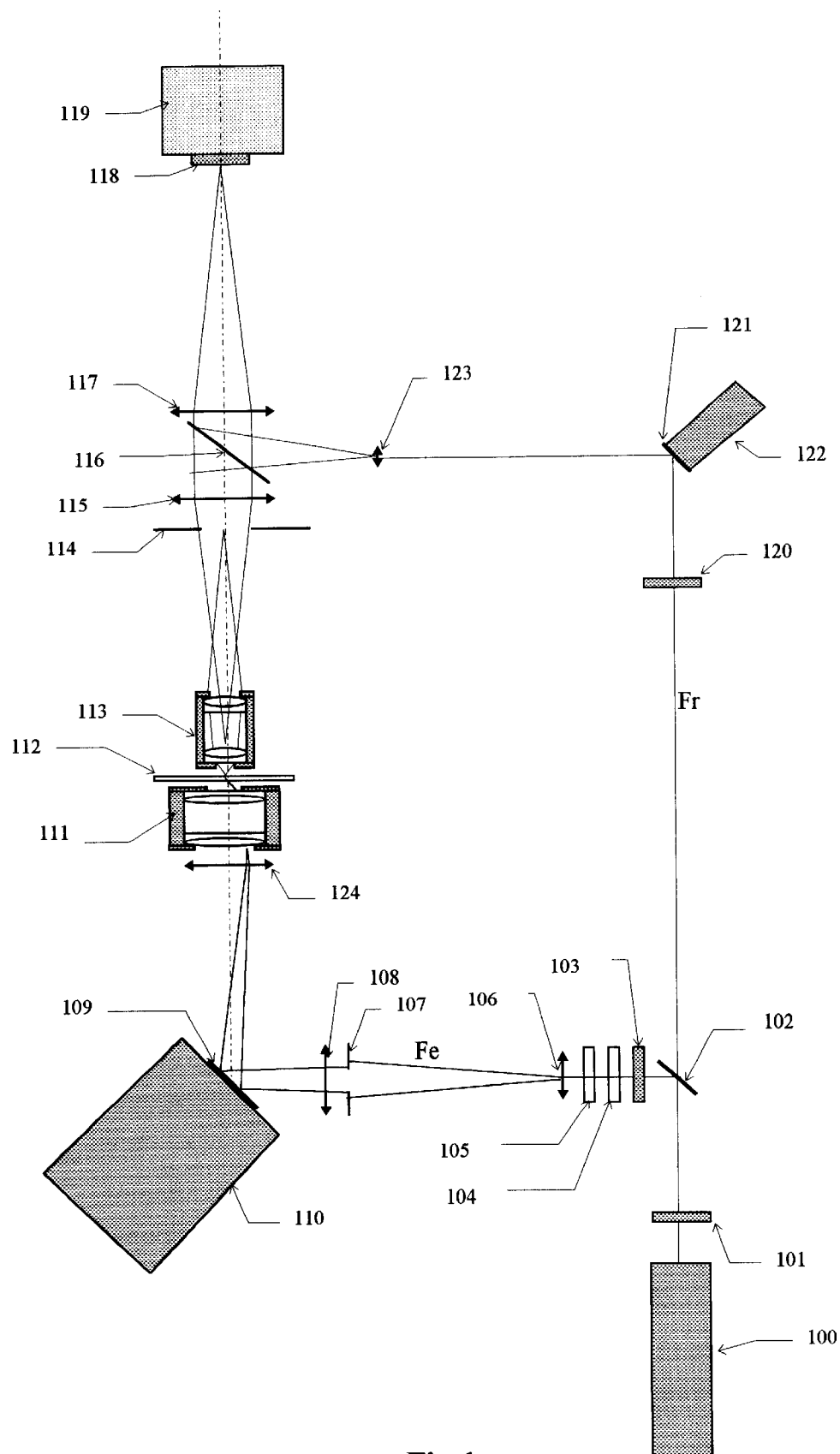

Gennady N. Vishnyakov & Gennady G. Levin,"Interferometric Computed—Microtomography of 3D Phase Objects", SPIE Proceedings, vol. 2984, p. 64, 1997, SPIE, United States.

Terry Turpin, Leslie Gesell, Jeffrey Lapides, "Theory of the Synthetic Aperture Microscope", Craig Price, SPIE Proceedings, vol. 2566, p. 230, 1995, SPIE, United States.

Torolf A. Wedberg and Jacob J. Stamnes, "Experimental Examination of the Quantitative Imaging Properties of Optical Diffraction Tomography", Journal of the Optical Society of America A, vol. 12, No. 3, p. 493, Mar. 1995, Optical Society of America, United States.

* cited by examiner

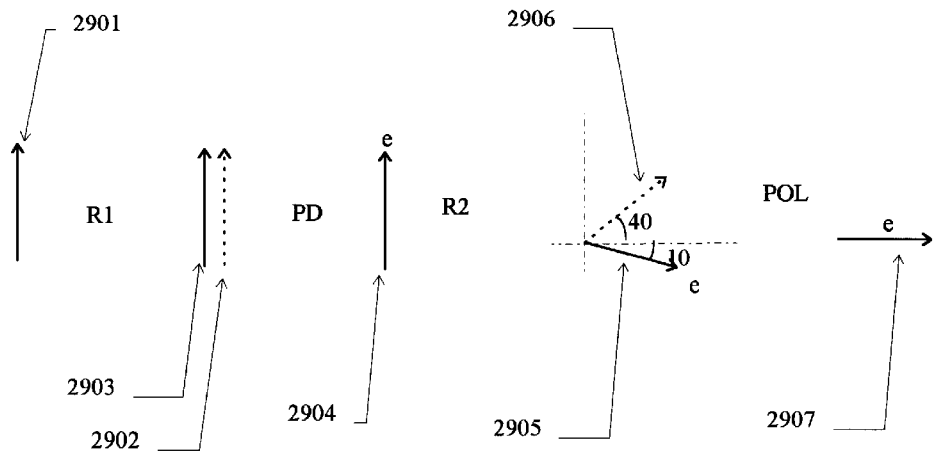
FIG.39
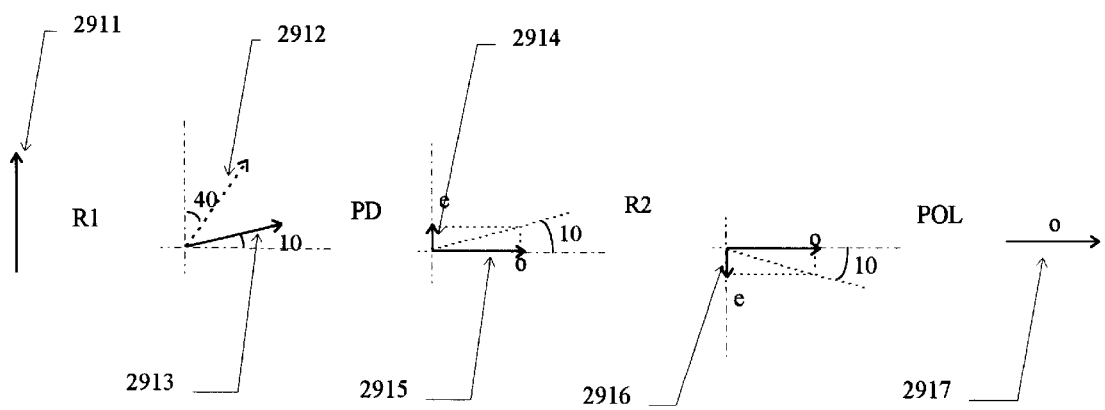
FIG.40
FIG.41:
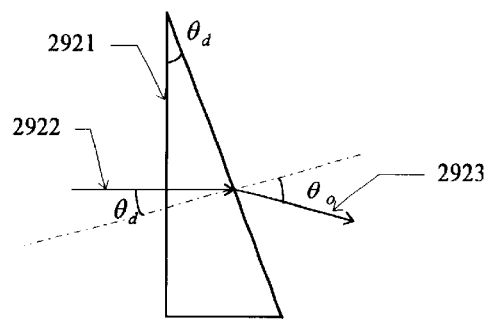

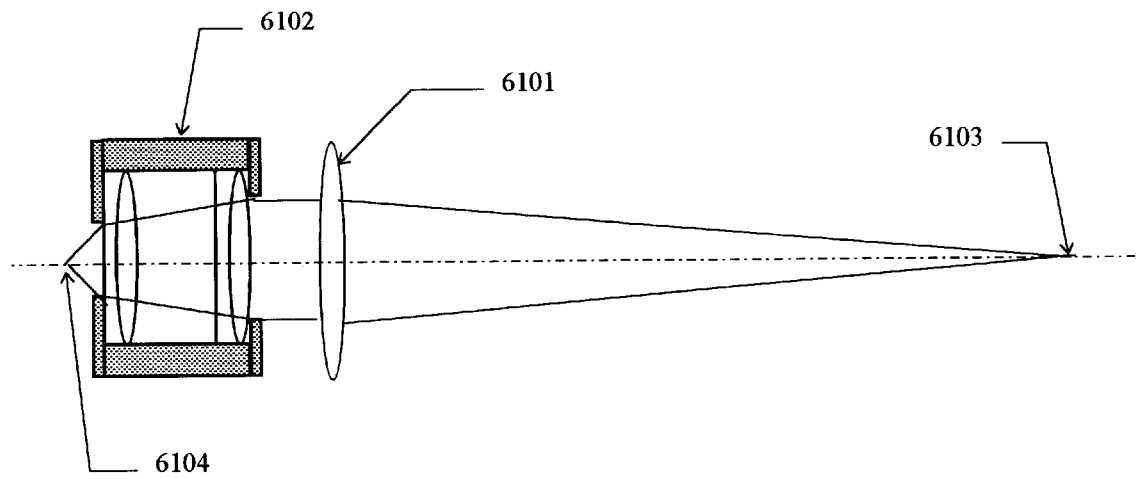
Fig. 89
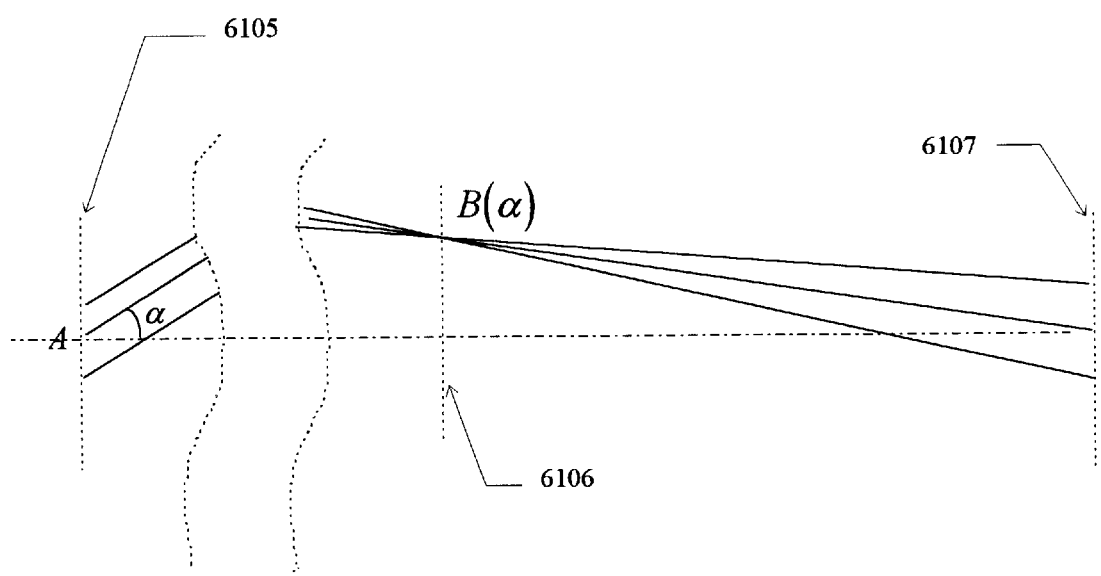
Fig. 90
$P_0$ $P_1$ $P_2$ $P_3$ $P_4$ $P_5$ $P_6$
• • • • • ● • • • • • •
Fig. 91

MICROSCOPE GENERATING A THREE-DIMENSIONAL REPRESENTATION OF AN OBJECT AND IMAGES GENERATED BY SUCH A MICROSCOPE

1. BACKGROUND OF THE INVENTION

This invention relates to a microscope generating a three-dimensional representation of the observed object, operating on a principle derived from "image formation by scattered field inversion", tomography and synthetic aperture systems.

2. THE PRIOR ART

2.1. References

[Wolf]: *Three-Dimensional Structure Determination of Semi-Transparent Object from Holographic Data*, Emil Wolf, Optics Communications, Vol. 1, No. 4, p.153, October 1969.

[Dändliker]: *Reconstruction of the Three-Dimensional Refractive Index from Scattered Waves*, R. Dändliker, K. Weiss, Optics Communications, Vol. 1, No. p.323, February 1970.

[Fercher]: *Image Formation by Inversion of Scattered Field Data: Experiments and Computational Simulation*. A. F. Fercher, H. Bartelt, H. Becker, E. Wiltschko, Applied Optics, Vol.18, No 14, p.2427, July 1979

[Kawata]: *Optical Microscope Tomography. I. Support Constraint*, S. Kawata, O. Nakamnura & S. Minami, Journal of the Optical Society of America A, Vol. 4, No.1, p.292, January 1987

[Noda]: *Three-Dimensional Phase-Contrast Imaging by a Computed-Tomography Microscope*, Tomoya Noda, Satoshi Kawata & Shigeo Minami, Applied Optics, Vol. 31, No. 5, p.670, Feb. 10, 1992

[Devaney]: *The Coherent Optical Tomographic Microscope*, A. J. Devaney and A. Schatzberg, SPIE, Vol.1767, p.62, 1992

[Wedberg]: *Experimental Simulation of the Quantitative Imaging Properties of Optical Diffraction Tomography*, Torolf A. Wedberg and Jacob J. Stamnes, Journal of the Optical Society of America A, Vol. 12, No 3, p.493, March 1995.

[Vishnyakov]: *Interferometric Computed-Microtomography of 3D Phase Objects*, Gennady N. Vishnyakov & Gennady G. Levin, SPIE Proceedings, Vol.2984, p.64, 1997

[Ausherman]: *Developments in Radar Imaging*, D. A. Ausherman, A. Kozma, J. L. Walker, H. M. Jones, E. C. Poggio, IEEE Transactions on Aerospace and Electronic Systems, Vol. 20, No. 4, p.363, July 1984.

[Goodman]: *Synthetic Aperture Optics*, Progress in Optics, Vol. VIII, 1970, North Holland Publishing Company.

[Walker]: *Range-Doppler Imaging of Rotating Objects*, Jack L. Walker, IEEE transactions on Aerospace and Electronic Systems, Vol. 16, No. 1, p.23, Januasy 1980.

[Brown]: *Walker model for Radar Sensing of Rigid Target Fields*, William M. Brown, IEEE Transactions on Aerospace and Electronic Systems, Vol. 16, No 1, p.104, January 1980.

[Turpin 1]: U.S. Pat. No. 5,384,573

[Turpin 2]: *Theory of the Synthetic Aperture Microscope*, Terry Turpin, Leslie Gesell, Jeffrey Lapides, Craig Price, SPIE Proceedings, Vol. 2566, p.230, 1995

[Turpin 3]: *The Synthetic Aperture Microscope, Experimental results*, P. Woodford, T. Turpin, M. Rubin, J. Lapides, C. Price, SPIE Proceedings, Vol. 2751 p.230, 1996

[Lauer 1]: Patent WO 98/13715

2.2. Description of the Prior Art

A three-dimensional object may be characterized optically by a certain number of local parameters, for example its index and its absorptivity at each point. Mathematically, this may be expressed by the data at each point of a complex number which is a function of the local parameters at the considered point. A three-dimensional spatial representation of the object can then be expressed in the form of a three-dimensional array of complex numbers.

By carrying out the three-dimensional Fourier transform of this three-dimensional spatial representation, a three-dimensional frequency representation of the object is obtained.

[Wolf] showed that a three-dimensional representation of a weakly diffracting object can be obtained from the acquisition of the wave diffracted by this object when it is illuminated successively by a series of plane waves of variable direction. [Wolf] also determined the maximum resolution thus obtainable, expressed as a function of the illuminating wavelength. This resolution corresponds to a maximum period of $\lambda/2$ for the sinusoidal components the object's representation, i.e. a sampling period in the Nyquist sense of $\lambda/4$ which is a resolution twice as fine as that of conventional microscopes. [Dändliker] improved [Wolf]'s formalism and provided a geometrical interpretation of it. From the wave diffracted by the object under a given illumination, part of the three-dimensional frequency representation of the object is obtained. This part is a sphere in a three-dimensional frequency space. By combining the spheres thus obtained for various illuminating waves, the frequency space can be filled, obtaining the three-dimensional frequency representation of the object. The latter can then be inverse transformed to obtain a spatial representation.

[Fercher] designed a microscope constituting the first practical application of the principles defined by [Wolf] and [Dandliker]. In that microscope, the wave diffracted by the object is picked up on a receiving surface on which it interferes with a reference wave not having passed through the object and the phase of which can be modified. From several interference figures differing from each other by the phase of the reference wave, [Fercher] obtains, at each point of the receiving surface, the amplitude and the phase of the wave diffracted by the object.

[Fercher] does not use several successive illumination waves but several illuminating waves generated simultaneously by means of a diffraction grating, thus limiting the number of possible illumination directions, even though the use of several successive illuminating waves does not present any particular technical difficulty. The reason for this choice is not clearly explained. However, it appears that this technique is adopted in order to obtain illuminating waves all having the same phase at a given point of the image. In fact, the equation (1) of the document [Wolf] assumes that each illuminating wave has a zero phase at the point of origin of the position vectors.

The method defined by [Wolf], [Dändliker] and [Fercher] is generally called "image formation by scattered field inversion". Another conventional approach for obtaining three-dimensional images is tomography. Tomography, used for example in x-ray techniques, consists in reconstructing an image from a set of projections of this image along different directions. Each projection depends linearly upon a three-dimensional density function characterizing the object. From a sufficient number of projections it is possible to reconstitute the object by reversing this linear correspondence.

Tomography was adapted to optical microscopy by [Kawata]. In his tomographic microscope, a plane and non-coherent illuminating wave of variable direction is used. This illuminating wave passes through a sample and then a microscope objective focussed in the plane of the sample. It is received on a receiving surface placed in the plane in which the objective forms the image of the sample. Because the illumination is non-coherent, the intensities coming from each point of the object are added and the image intensity produced on the receiving surface consequently depends linearly on the three-dimensional density function characterizing the absorptivity of the object. From a sufficient number of images it is possible to reconstitute the image by reversing this linear correspondence. This microscope differs from usual tomographic systems in that the linear correspondence between the density function of the object and a given image is not a projection, but is characterized by a three-dimensional optical transfer function.

This microscope is not very suitable for obtaining images that take into account the index of the sample. [Noda] designed a modified microscope enabling this phase to be taken into account. The initial idea of that microscope [Noda] is to use phase contrast for obtaining an image which depends on the index of the sample, and to adapt to this configuration the linear correspondence reversal principle already implemented by [Kawata]. The use of the [Noda] microscope is however limited to the study of non-absorbing objects whose index variations are extremely small.

[Noda]'s text does not refer to holography nor to "image formation by scattered field inversion," but the operating principle involved can be interpreted within this framework. In fact, the technique adopted by [Noda] is tantamount to using on the receiving surface a reference wave consisting of the illuminating wave alone. From the images received for a set of illuminating waves of variable direction, a three-dimensional frequency representation is obtained. The complex wave detected on the receiving surface is replaced here by a pure imaginary value obtained by multiplying by j the real value obtained using the single reference wave constituted by the illuminating wave shifted $\pi/2$ in phase. If the reference wave is sufficiently higher, at each point of the receiving surface, than the diffracted wave, then the quantity thus obtained is the imaginary part of the complex wave really received on the receiving surface, the phase reference being the phase of the illuminating wave. The object generating a pure imaginary wave equivalent to that detected by [Noda] on the receiving surface is made up of the superposition of the observed real object and a virtual object whose complex spatial representation is obtained from that of the real object by symmetry in relation to the plane of the object corresponding to the receiving surface, and by reversing the sign of the real part. Using the imaginary part thus detected in a manner similar to that used by [Fercher] for the detected complex wave, a function representing the superposition of the real object and the virtual object is generated in frequency representation. During each acquisition, the two-dimensional frequency representation obtained by performing the Fourier transform of the value detected on the receiving surface includes a part corresponding to the real object and a part corresponding to the virtual object, which coincide only at the point corresponding to the illumination frequency. It is thus possible to select only the part corresponding to the real object, so as to obtain a representation thereof. [Noda] in fact uses the superposition of the real object with the virtual object which he symmetrizes in relation to the plane of the object corresponding to the receiving surface, thus obtaining a pure imaginary representation corresponding to the imaginary part of the representation that would be obtained using [Wolf]'s method.

The theoretical explanations given in the document [Noda] are very different from those presented here and are perfectly valid. The principle consisting in reversing a filter by multiplication in the frequency domain, as applied by [Noda], is found to be equivalent to the explanations given above, although obtained by different reasoning. It may be considered that FIGS. 2 and 3 of the document [Noda] illustrate how the three-dimensional frequency representation of the object is generated from two-dimensional frequency representations.

[Devaney] proposed a tomographic microscope whose operating mode is derived essentially from the method of [Wolf]. In the [Devaney] microscope the reference wave coincides with the illuminating wave. Consequently, that microscope does not have means for varying the phase of the reference wave. As in the case of [Noda], the detected wave consequently corresponds to that which would be formed by the superposition of a real object and a virtual object. [Devaney] solves the problem by placing the receiving surface outside of the object, so that the real object and the virtual object do not overlap. When the direction of the illuminating wave varies, only one of the two objects is reconstituted. Two variants of the microscope are presented: a first in which the object is fixed and the direction of the illuminating wave is variable, and a second in which the object rotates around a fixed point, the illuminating wave then having a fixed direction in relation to the receiver. The first version of the [Devaney] microscope was built by [Wedberg].

Another approach allowing the adaptation of tomography to the production of phase images is that of [Vishnyakov]. [Vishnyakov] introduces a reference wave distinct from the illuminating wave and carries out a detection of the wave received on a receiving surface in accordance with a method similar to the one used by [Fercher]. He then generates a profile characteristic of the phase difference between the received wave and the illuminating wave. As this phase difference is considered to be the projection of the index along the direction of the illuminating wave, it regenerates the distribution of the index in the object according to the tomographic method used conventionally in x-ray techniques. This method may be compared to a method of the [Wolf] type, but in which the sphere portion acquired in the frequency space would be assimilated with a plane portion, which is largely unjustified in the case of an objective with a large aperture such as the one used here.

The technique of the synthetic aperture radar is an imagery method used in the field of radar waves and which was considered very early for application to the field of optics. [Ausherman] presents the history of this technique. The application of the synthetic aperture radar technique to the field of optical wavelengths would make it possible in principle to obtain images of an observed object. However, in order for the technique to be feasible, it is necessary, at all times, to have the position values, within a reference coordinate system linked to the object, of each element of the transmitter-receiver assembly. These values must be known to within a fraction of a wavelength. This is achievable in the area of radar frequencies, in which wavelengths are macroscopic and can be, for example, of a few tens of centimeters. In the optics field, where wavelengths are sub-micrometric, this is difficult to achieve. This problem is the basic reason for which the system is difficult to adapt to optics, as indicated in [Goodman], Pages 36 to 39.

[Walker] and [Brown] formalized the synthetic aperture radar method in a form similar to that already obtained by

[Wolf] for optical systems. This formalism was originally used by [Walker] with a radar imagery method in which the transmitter-receiver assembly is fixed and in which the object rotates around a fixed point. This overcomes the problem of determining the position of the object at each instant.

[Turpin] recently described several microscopes constituting an adaptation of synthetic aperture radar principles to the field of optics.

In the microscope implemented by [Turpin 3], the material configuration used complies with the principle used in [Walker] to overcome the problem consisting in determining the position of the object at each instant, i.e. the transmitter and receiver are fixed and the object rotates around a fixed axis. This microscope is also similar to the second version of the [Devaney] microscope. Since the rotation axis, the transmitter and the receiver are fixed, the position of the transmitter-receiver assembly within a reference coordinate system linked to the object can be known with the required accuracy.

However, effective resolution calls not only for a mechanical system making it possible to determine the movement of the object, but also the taking of this movement into account in the definition of algorithms and/or appropriate adjustment of the system. In the absence of special precautions, the point of origin of the reference wave moves in relation to the object over a circle centered on the rotation axis of the object. If this movement is significant, this effect destroys the image. If this movement is small, resolution in the plane of this circle is affected in proportion to the amplitude of the movement.

To solve this problem in the absence of any specific compensation algorithm, the point of origin of the reference wave should be on the rotation axis of the object. This condition is in principle difficult to obtain. [Turpin] does not mention this problem and does not specify any means of appropriate adjustment.

This problem can however be solved when use is made, for example, of a flat specimen, by performing an adjustment intended to comply with the following conditions:

(i)—The image of the reference wave on the "image CCD array" of FIG. 1 in document [Turpin 3] must be a point image.

(ii)—When the object makes a rotation of 180 degrees, the image obtained must be symmetrized in relation to an axis passing through the point image of the reference wave.

The position of the "image CCD array" must be adjusted to comply with (i).

The position of the entire receiver must be adjusted to comply with (ii).

This solution is however not perfect, depending essentially on a visual interpretation. It can be used reasonably only for very simple objects.

The microscope described in [Turpin 3] is a particular case of the generalized system described in [Turpin 1] and [Turpin 2]. The generalized system specifies that the illuminating wave and/or the position of the receiver can vary. However, the material configurations proposed do not allow the solution of the problem consisting in determining, to within a fraction of a wavelength, the position of the transmitter and the receiver in relation to the object. In fact, the illuminating wave of variable direction is produced by mechanical devices which cannot be controlled with sub-micrometric accuracy.

The microscope described in [Lauer 1] allows the generation of the frequency representation of a wave coming from the object and the reconstitution of the object from several of these representations. The method used in [Lauer 1] is not directly related to the one described by [Wolf]. In fact, in the case in which it recombines several frequency representations to obtain the representation of the object:

it uses spatially incoherent lighting and not plane illuminating waves it combines the frequency representations of the waves received by intensity summing in the spatial domain.

The image obtained by [Lauer 1] is affected by a residual granularity effect, does not allow a differentiation of the refractive index and of absorptivity, and does not yield the theoretical accuracy indicated by [Wolf].

3. SUMMARY OF THE INVENTION

3.1. Problem to Be Solved by the Invention

Systems based on "image formation by scattered field inversion," "tomographic" systems or "synthetic aperture" systems appear to be equivalent to each other, at least when examined from only the coherent optical domain. Two classes of systems may be distinguished depending on the reference wave generation mode:

the microscopes of [Noda] and [Devaney] use a reference wave coinciding with the illuminating wave.

the microscopes of [Fercher], [Vishnyakov] and [Turpin] use a reference wave distinct from the illuminating wave.

Microscopes of the first category exhibit limitations in terms of observed image size, characteristics imposed on the object, or displayable parameters. These limitations are due to the fact that, in the absence of a reference wave distinct from the illuminating wave, it is not possible to acquire under good conditions the complex value of the wave received on the receiving surface. It is thus necessary to use various expedients to eliminate spurious images and various disturbances generated by the drawbacks of the acquisition method.

Microscopes of the second group allow this problem to be solved. In principle, microscopes of the second group should allow the representation of the refractive index and the absorptivity of the object in three dimensions with quarter-wavelength accuracy, according to the theory devised by [Wolf] and [Dändliker]. Such performance is clearly higher than that of all existing optical microscopes including the confocal microscope, and these microscopes should in all logic have led to industrial applications. However, none of these microscopes has as yet made it possible to obtain quality images comparable to those produced, for example, by the [Noda] microscope, and thus these microscopes have not gone beyond the experimental stage. The reason for which these microscopes have never yielded high quality images, despite their theoretical possibilities, has never been clearly determined.

A first approach to the problem is contained implicitly in the equation (1) of the document [Wolf]: all the illuminating waves must have the same phase at the origin of the representation. However, in an optical system, the only values accessible to measurement are the phase differences between a reference wave and a wave to be analyzed. The fact that at the illuminating waves all have the same phase at a given point of the object, as indicated implicitly by the equation (1) in the document [Wolf], is thus not sufficient to ensure the proper functioning of the system: it is also necessary for the reference wave to meet appropriate conditions, so that the phase differences accessible to measurement lead to correct results.

A second approach to the problem is provided by [Goodman], Pages 36 to 39, in the terms of the numerical aperture radars: the position of the transmitter and receiver must be determined with an accuracy within the wavelength, and this is not feasible in the optical domain.

If the illuminating wave has a variable direction, these two approaches are similar: in fact, an indetermination on the position of the transmitter results, among other effects, in a phase shift of the illuminating wave at the origin of the representation. We shall confine ourselves here to these systems, i.e. to the microscopes of [ercher] and [Vishryakov], and to the versions of the microscope of [Turpin] which include a variable direction illuminating wave.

For example, in the microscopes of [Turpin], the illuminating wave is generated by a mechanical device. This device does not allow the illuminating wave phase to be controlled. When two successive three-dimensional images are taken, a given illuminating wave characterized by its direction will not have the same phase difference with the reference wave in each case. The wave detected on the receiving surface will consequently not have the same phase either, and hence finally that two successive three-dimensional images taken will not lead to the same result, even in the absence of any noise. This example highlights the basic problem which has up to now limited the performance of microscopes of the second group: lack of control of the phase difference between the illuminating wave and the reference wave leads to non-reproducibility of the results obtained and, in general, results which do not correspond to what is expected considering the theoretical approach of [Wolf].

3.2. Solution of Problem According to the Invention

The entire three-dimensional frequency representation of an object can be multiplied by a complex number $Ae^{j\alpha}$. It will then be said that the frequency representation of the object is affected by a phase shift $\alpha$ and by a multiplicative factor A. If an object is characterized by its three-dimensional frequency representation, its spatial representation can be obtained by taking the inverse Fourier transform of this frequency representation. If the frequency representation of the object is affected by a phase shift $\alpha$ and a multiplicative factor A, its spatial representation is affected by the same phase shift and the same multiplicative factor, corresponding to a modification of the function giving the complex number associated with a point as a function of the local parameters at this point.

It is also possible to multiply each point of the three-dimensional representation by a complex number $Ae^{j\alpha}$ depending on the point. Two different points of the three-dimensional frequency representation can then be affected by a phase shift and a multiplicative factor which are different. By performing the inverse Fourier transform of a frequency representation in which the phase shift and/or the multiplicative factor depend on the considered point, a modified representation of the object is obtained in which the complex number associated with a point depends not only on the local parameters at the considered point, but also on the local parameters at a set of other points. This modified representation of the object is a filtered spatial representation, the filter having a frequency representation consisting of the numbers $Ae^{j\alpha}$ defined at each point. Depending on the characteristics of this filter, more or less correct frequency representations will be obtained.

In the microscopes of [Turpin], the illuminating wave is generated by a mechanical device. With each change of direction of the illuminating wave, a random phase shift of this wave occurs, and hence a random phase shift in the corresponding part of the three-dimensional frequency representation.

In the document of [Vishnyakov], and for the same reasons, the phase of the illuminating wave varies randomly with each change of illumination direction. Equation (2) on Page 67 of the document [Vishnyakov] should be replaced by $\psi(x,y)=\Phi(x,y)+x \sin \alpha+\phi$, where $\phi$ is the phase of the illuminating wave at the origin of the three-dimensional representation obtained. When the direction of the illuminating wave varies, the value of $\phi$ varies. Non-determination of the correct value of $\phi$ results in the addition of a constant to each projection obtained, this constant varying randomly between two projections. This consequently makes inexact the assimilation of the phase profile obtained with the projection of the index. The method of [Vishnyakov] is roughly equivalent to the method of [Wolf] in which a portion of the sphere of the frequency space, obtained from a given illuminating wave, would have been assimilated to a plane. The non-determination of $\phi$ is equivalent to a random phase shift of the entire part of the two-dimensional frequency representation generated from a given illuminating wave. However, other sources of error are added to this effect, and in particular the fact that a conventional tomographic reconstruction is used.

In the document of [Fercher], owing to the use of a diffraction grating to generate the three illuminating waves simultaneously, there is no random phase shift in the illuminating waves. However, a detailed analysis of the system shows that, to obtain the same phase shift in the parts of the frequency representation obtained from each illuminating wave, the virtual image, in the object, of the point of focus of the reference wave, must coincide with a point in which the illuminating waves all have the same phase. This calls for very precise adjustment of the position of the reference wave origin. As the document of [Fercher] does not contain any mention of such an adjustment, it is likely that it has not been carried out. In any case, the solution adopted by [Fercher] limits significantly the number of illuminating waves that may be used and the aperture under which the wave coming from the object can be acquired.

In existing microscopes using variable direction illuminating waves and a reference wave distinct from the illuminating wave, the parts of the frequency representation obtained from different illuminating waves are thus affected by different phase shifts. Consequently, the inversion of the frequency representation obtained generates a filtered representation which is in general of rather poor quality and which is moreover not reproducible owing to the random nature of the phase shift.

The invention consists in providing a microscope in which the direction of the illuminating wave is variable, but comprising means for generating a three-dimensional representation of the object in which the distribution of the phase shift affecting each point obtained, in frequency representation, is concentrated around a constant value. Ideally, this phase shift should be constant, but the existence of disturbances such as Gaussian noise, a residual spherical aberration, or a small imprecision in controlling the phase difference between the reference wave and the illuminating wave, creates a certain spread of the distribution around the constant value.

In existing microscopes using variable direction illuminating waves and a reference wave distinct from the illuminating wave, and in the case in which a large number of distinct illuminating waves are used, such as in [Turpin], this phase shift tends to be of a random nature and its distribution is hence roughly homogeneous over the interval $[0,2\pi]$. Where a limited number of illuminating waves are used, as in [Fercher], the phase shift distribution exhibits peaks of comparable level centered on several distinct values corresponding to the phase shifts affecting the sub-representations obtained from each illuminating wave.

The fact that the phase shift affecting each point, in frequency representation, is roughly constant, constitutes a new functionality of the microscope which allows, for example, a better quality spatial representation. However, the generation of a three-dimensional representation of the observed object does not necessarily constitute the final purpose sought by the microscope user. For example, the microscope may be used to read three-dimensional optical memories. In this case, the data can be encoded before being stored in the optical memory. The microscope then allows a three-dimensional representation of this optical memory to be obtained from which the data can be decoded. The three-dimensional representation of the object is then a calculation intermediary finally enabling the decoded data to be obtained.

3.3. Vocabulary Used and General Considerations

A three-dimensional object can be characterized optically by a certain number of local parameters. These parameters can, for example, be its refractive index and its absorptivity at each point, or its absorptivity and one of its indices in the case of a non-isotropic material. It is possible to define at each point a complex number which is a function of certain of these local parameters, this function generally being defined uniquely in the entire spatial representation and hence not depending on the considered point. It will then be possible to express a three-dimensional spatial representation of the object in the form of a three-dimensional array of complex numbers. The dependency between the complex number and the local parameters can be defined in various ways. For example, this complex number may reduce to a real number characterizing the index, as in the microscope of [Noda]. The definition that will be used most often will however be of the type given by [Wolf], but with a "complex index" representing both the refractive index and absorptivity. For example, the real part of the complex number may be proportional to absorptivity and its imaginary part to the refractive index. A complex number may be used which is obtained by rotating the preceding in the complex plane, corresponding to a phase shift. In every case, the three-dimensional spatial representation of the object is unique if the correspondence between the complex number and the local parameters has been defined and the central part of the representation has also been defined.

Performing the three-dimensional Fourier transform of this three-dimensional spatial representation, a three-dimensional frequency representation of the object is obtained.

The phase shift affecting a point of the three-dimensional frequency representation of the object is defined when the representation of the object has been defined uniquely, i.e. when the complex function of the local parameters and the point of origin characterizing the spatial representation have been defined.

When these parameters are not specified, it may be considered that the phase shift is defined in relation to the spatial representation which coincides at best with the obtained three-dimensional representation of the object.

The term "three-dimensional representation of an object" will designate all the numerical data characterizing the spatial or frequency representation of the object, independent of the manner in which these data are combined or stored, for example in a computer memory. This representation may be expressed, for example:

in the spatial domain, in the form of a complex number dependent on spatial coordinates in the frequency domain, in the form of a complex number dependent on the spatial frequency in any other manner when the "three-dimensional representation of the object" allows the spatial or frequency representation of the object to be obtained by a known algorithm.

Part of the three-dimensional frequency representation of the object will be called frequency sub-representation of the object, and the term sub-representation will designate all the corresponding data, independent of how they are combined or stored.

A wave reaching a receiving surface is entirely characterized by its amplitude and its phase along each polarization direction and at every point of the receiving surface. A scalar representation of the wave may also be adopted by limiting oneself, for example, to a single polarization direction, the wave then being characterized by a single phase and a single intensity at every point of the receiving surface. From the wave measured on a receiving surface, a frequency sub-representation of the observed object can be generated. This sub-representation is two-dimensional in that it constitutes a sphere portion in the space of the frequencies, as indicated by [Dändliker]. A calculation intermediary may be constituted by a frequency representation of the wave, defined by the wave phase and intensity on each wave vector, a scalar representation being adopted.

The frequency representation of the wave is two-dimensional and can be projected on a plane without any loss of information. Such a projection yields a plane image that will be called "frequency plane image". In a system such as that of [Turpin] or that of [Fercher], such a frequency plane image is obtained directly on the receiving surface. In other systems, such as the second embodiment of the present invention, such a frequency plane image is obtained by two-dimensional Fourier transformation of the scalar representation obtained directly on the receiving surface. A modified frequency plane image can also be obtained from several frequency plane images differing from each other in the polarization of the illuminating wave and the direction of analysis of the wave received on the receiving surface. The frequency plane image can constitute a calculation intermediary making it possible to obtain the frequency representation of the wave and then a corresponding sub-representation of the object.

The term "two-dimensional frequency representation" will designate either a two-dimensional frequency representation or a two-dimensional part of a three-dimensional frequency representation. In particular, it can designate either a frequency plane image, a frequency representation of a wave, or a two-dimensional sub-representation of the object.

The term "lens" will designate, throughout the text, either simple lenses, compound lenses, or achromats, generally designed to limit optical aberration.

In the rest of the text, five embodiments are described, referred to as Embodiments 1, 2, 3, 4 and 5.

3.4. Obtaining the Three-Dimensional Frequency Representation Directly

For each direction of the illuminating wave, a frequency sub-representation of the object is obtained by direct application of the methods defined in [Fercher] and [Turpin]. In the systems of [Fercher] and [Turpin], the microscope is built so that the different sub-representations obtained are affected by different phase shifts. According to one embodiment of the invention, the microscope is built so that these phase shifts are constant. This variant of the invention implies:

(i)—that the microscope is built so that the phase difference between an illuminating wave and the reference wave with which it interferes is reproducible. This condition implies an appropriate construction of the microscope. This is shown, in the absence of vibrations, in Embodiments 3, 4 and 5. Embodiments 1 and 2 are affected by the same problems as the microscope of [Turpin]: the phase difference between reference wave and illuminating wave varies randomly owing to the overall mechanical design. Embodiments 1 and 2 consequently do not allow compliance with this first condition. Embodiments 3 to 5 enable this condition to be complied with because of the different design of the illuminating and reference wave generating system.

(ii)—that the microscope is built so that, through appropriate adjustment, the phase difference between the illuminating wave and the reference wave can be made constant. Embodiment 3 does not allow this condition to be met because there is no particular point at which all the illuminating waves have the same phase, which would be necessary in order to meet this condition since the reference wave used is spherical and constant. Embodiment 4, quite similar moreover to Embodiment 3, allows this condition to be met because, with an appropriate control of the beam deflection system, it is possible to generate illuminating waves whose phase at a given point is constant. Embodiment 5 also meets this condition.

(iii)—that the position of the optical elements is adjusted appropriately so that the phase difference between the illuminating wave and the reference wave is in fact constant. This adjustment is described in 8.6. for Embodiment 4 and in 9.20. for Embodiment 5.

Conditions (ii) and (iii) imply that the phase difference between the illuminating wave and the reference wave is constant. It is possible to define a virtual wave present in the object and such that its image, through the optical device modifying the wave coming from the object between the object and the receiving surface, is the reference wave. The phase difference between the illuminating wave and the reference wave means here the phase difference between the illuminating wave and the component of this virtual wave on the wave vector of the illuminating wave.

3.5. Phase Correction Method

When the microscope is not built so that the phase shift affecting each frequency sub-representation is constant, the differences between the phase shifts affecting each sub-representation must be determined and compensated if necessary.

3.5.1. General Phase Correction Method

Part of the three-dimensional representation of the object is considered:

consisting of a subset A of the three-dimensional representation.

characterized by a function a(f) defined on A and conventionally zero outside of A, where f is the spatial frequency vector and a(f) the value of the representation on this spatial frequency.

affected by a Gaussian noise, the standard deviation of the noise on a given frequency f being $\sigma_a(f)$.

This sub-representation will be designated by the expression "sub-representation RA". It will be said that A is the support of RA.

A second part of the three-dimensional representation of the object is considered, consisting of a subset B of the three-dimensional representation, characterized by a function b(f) defined on B, affected by a Gaussian noise $\sigma_b(f)$, designated by the expression "sub-representation RB."

These two parts of the representation are phase shifted in relation to each other and are assumed to have a non-zero intersection. From these two parts will be generated a sub-representation RC defined on a set C=A∪B (C is the union of A and B) and defined by a function c(f) affected by a Gaussian noise $\sigma_c(f)$.

It is possible to proceed in two steps:

a complex ratio between the two representations can be obtained, for example, with the formula:

$$r = \frac{\sum_{f \in E} \frac{a(f)\overline{b(f)}}{\sigma_a^2(f) + \sigma_b^2(f)}}{\sum_{f \in E} \frac{|b(f)|^2}{\sigma_a^2(f) + \sigma_b^2(f)}}$$

where the sums are over a set E of frequency vectors included in the intersection of the two sets A and B, or E⊂(A∩B), the set E being if necessary limited to points for which the signal-to-noise ratio is sufficiently high. The phase difference between the two representations is the argument of r. The phase difference thus calculated is a good approximation of the most probable phase difference knowing the values of the representations RA and RB over the set E.

the representation RB may be "phase-corrected" in relation to RA by multiplying it by the ratio r:

b(f)←r.b(f) where the sign← means that b(f) is replaced by r.b(f).

the function c can be obtained, for example, by the formula:

$$c(f) = \frac{\frac{a(f)}{\sigma_a^2(f)} + \frac{b(f)}{\sigma_b^2(f)}}{\frac{1}{\sigma_a^2(f)} + \frac{1}{\sigma_b^2(f)}}$$

The values thus assigned to the representation RC are the most probable values, knowing the phase-corrected representations RA and RB.

the function $\sigma_c(f)$ can be obtained, for example, by the formula:

$$\frac{1}{\sigma_c^2(f)} = \frac{1}{\sigma_a^2(f)} + \frac{1}{\sigma_b^2(f)}$$

Both of the preceding operations constitute the grouping of RA and RB.

More detailed explanations on the calculation of these functions in the form of arrays are given in Paragraph 7.17.1. The formulas indicated above for phase correction carry out an intensity normalization simultaneously, which however is not indispensable.

This method makes it possible, from the two sub-representations RA and RB whose supports A and B have a non-zero intersection, to obtain a sub-representation RC corresponding to the superposition of RA and RB.

If the three-dimensional frequency representation of the object must be reconstituted from many sub-representations whose phases are not known, the above method, applied iteratively, allows the grouping of all these sub-representations. For example, it is possible to begin with a given sub-representation, and group it with a second sub-representation. Then, it is possible to begin with the sub-representation generated by this grouping, and group it with a further sub-representation. By repeating this grouping operation until all the sub-representations have been integrated in a overall representation, one finally obtains the three-dimensional frequency representation of the object. The only conditions to be met in order for this method to succeed are:

that no sub-representation or group of sub-representations has an empty intersection with all the other sub-representations.

that the object does not have an excessively singular frequency representation, which would be for example zero on a set of points separating in two its three-dimensional frequency representation.

These conditions are easily met for all biological objects as soon as a large number of representations is acquired.

For example:

an embodiment may be derived from the system of [Fercher] in which the three simultaneous illuminating waves produced by the diffraction grating have been replaced by a single illuminating wave of variable direction. In this case, a sub-representation is constituted by a two-dimensional frequency representation obtained for a given illuminating wave.

an embodiment can be derived from the microscope implemented in [Turpin 3] in which, in addition to the rotation of the object, variations in the direction of the illuminating wave have been authorized. In this case, a sub-representation is constituted by all the two-dimensional frequency representations obtained for a given illuminating wave when the object is rotated.

in the case of Embodiment 5, Paragraph 9.19., a sub-representation is constituted by a two-dimensional frequency representation obtained for a given illuminating wave. A small number of sub-representations is first grouped in a basic representation having a non-zero intersection with all the other sub-representations obtained under similar conditions. All the representations are then phase-corrected in relation to the basic representation, and then an overall representation is generated.

in Embodiments 3, 4 and 5, four intermediate sub-representations are generated each time, as explained in 7.17.1.1. These four representations are grouped in a single representation by the application of this general method.

According to a variant of the invention, the microscope thus comprises means for:

determining, for each sub-representation RB, a coefficient characterizing the phase difference between this sub-representation and another sub-representation, part of a sub-representation or group of sub-representations RA, this coefficient being calculated from values of RA and RB over a set included in the intersection of the supports of RA and RB.

correct the phase of RB so as to obtain for RB the same phase reference as for RA.

The simplest way to correct the phase of RB is to carry out a multiplication by the coefficient r as indicated above. However, this correction can also be carried out by physical means, in which case the phase does not need to be corrected during the calculation stage. An example of such an embodiment is described in 7.18.7.

The phase difference affecting each sub-representation can be recalculated with each acquisition. This is necessary in Embodiments 1 and 2, for which these differences are not reproducible. In the case of Embodiments 3, 4 and 5, this phase difference is reproducible and can consequently be measured during a phase preparatory to acquisition. An example of such an embodiment is described in 7.18.1.

According to a variant of the invention, the microscope comprises means for:

determining, for a given sub-representation RB, the frequency representation RC resulting from the grouping of RB with another sub-representation RA.

determining a coefficient characteristic of the noise affecting RC defined over the entire support of RC, obtained from a coefficient characteristic of the noise affecting RA and defined on the support of RA, and from a coefficient characteristic of the noise affecting RB and defined on the support of RB.

The methods used can differ from the formalism set forth above. For example, in Embodiment 1, the quantity $$\frac{1}{\sigma_c^2(f)}$$

is assimilated with the number N of frequency representations reaching a given point.

The calculations can be grouped: after phase correction of each sub-representation, they can be grouped in an overall representation, without calculating each intermediate sub-representation. This is what is done in all the embodiments to group two-dimensional sub-representations into complete or partial three-dimensional sub-representations.

Representations of the object can be calculated without passing formally through its three-dimensional frequency representation. For example, in 7.17.3.3., a confocal representation of the object is generated using, for the final frequency representation, a value at each point which is the sum of the values obtained for each representation reaching this point. The representation thus obtained is not strictly speaking a frequency representation of the object, but nevertheless carries information on this object. It is also possible to generate real representations of the refractive index or absorptivity. These representations can be generated simply through the frequency representation of the object, but it is also possible to modify the algorithms so as not to formally use this procedure.

3.5.2. Absolute Phase Correction

The method set forth in 3.5.1. makes it possible to obtain a three-dimensional representation of the object. However, the overall phase of this three-dimensional representation remains arbitrary.

In the three-dimensional spatial representation of the object, obtained from the three-dimensional frequency representation by taking the inverse Fourier transform, the complex number associated with each point characterizes the absorptivity and the refractive index of the considered point. If the overall phase of the three-dimensional representation is chosen appropriately, the real part of the said complex number characterizes the local absorptivity of the object, and the imaginary party of said complex number characterizes the local refractive index of the object. The overall phase is chosen appropriately when the origin of the three-dimensional frequency representation has a real value.

According to a variant of the invention, and in the case in which the origin of the three-dimensional frequency representation is one of the points that have been acquired, the microscope has means for dividing, by its value at the origin, the three-dimensional frequency representation obtained by the method pointed out in 3.5.1. This makes it possible to obtain a spatial representation in which the real part and the imaginary part of the complex numbers represent respectively the local absorptivity and the local refractive index. This also allows the entire representation to be normalized.

When the origin of the three-dimensional frequency representation is not part of the points that have been acquired, this operation is impossible. The operator who views an image sees, for example, the real part of the complex number, and must intuitively choose the total phase of the representation so as to obtain the most contrasted possible image.

3.5.3. Phase Correction in Relation to the illuminating Wave

The general phase correction algorithms defined above exhibit the drawback of being relatively complex to implement. A simplified version can be obtained when the acquisition system allows the acquisition of the non-diffracted part of the illuminating wave. This corresponds to the origin of the three-dimensional frequency representation of the object. This point is common to all the two-dimensional frequency representations.

The phase correction described in 3.5.1. can then be carried out in relation to the sub-representation part constituted by this single point. This correction can be grouped with the absolute correction described in 3.5.2. The total of the two corrections then is equivalent to dividing the entire sub-representation of the object obtained from a given illuminating wave by its value at the origin. When a plane frequency image is generated as an intermediate calculation step, this is equivalent to dividing the entire plane frequency image by its value at the point corresponding to the non-diffracted part of the illuminating wave. According to a variant of the invention, the phase correction of the two-dimensional frequency representations is carried out by dividing each sub-representation of the object by its value at the origin of the three-dimensional frequency representation of the object. This method is used, for example, in Embodiments 1, 2, 3 and 4.

3.5.4. Phase Correction in Relation to Pre-Recorded Phase Values

A three-dimensional frequency representation of the object is obtained from a series of two-dimensional frequency representations each corresponding to a different illuminating beam.

Each of these two-dimensional frequency representations can be phase corrected in relation to the sub-representation constituted by the origin alone, as indicated in 3.5.4. However, the high intensity of the corresponding point on each two-dimensional frequency representation makes difficult the simultaneous acquisition of the rest of the representation. According to a variant of the invention, the acquisition of plane frequency images takes place in two phases:

a preliminary phase during which are recorded the values obtained at the image point of the illuminating wave, for each illuminating wave;

an acquisition phase proper during which the direct beam can be obstructed and during which the values of the plane frequency images are recorded.

A two-dimensional frequency representation can then be obtained for each illuminating wave from these two recordings, the value at the image point of the illuminating wave being obtained from the first recording and the value at any other point being obtained from the second recording. The method described in 3.5.4. can then be applied to each two-dimensional frequency representation obtained.

When a series of two-dimensional frequency representations is obtained, for example to "film" the movement of cells, the preliminary phase must not be repeated. It only needs to be carried out once before the start of the acquisitions.

In order for this method to be functional, the phase difference between the illuminating beam and the reference beam, at the level of the receiving surface, must be reproducible. The illuminating beam generation systems used in Embodiments 3, 4 and 5 meet this condition. This phase correction phase is described for example in 7.18.1. and 9.18.2.

3.6. Vibration Compensation

The method described in 3.5.4. presupposes the reproducibility of the illuminating beams. The method described in 3.5.3., in the case in which several objectives are used, presupposes a constant phase shift between the waves received on each of these objectives. However, in Embodiments 3, 4 and 5, the vibrations can make these methods ineffective or less robust. In order for the results to be reliable, these vibrations must be compensated.

For this purpose, the system can periodically acquire a reference image. The reference image consists, for example, of an image obtained on the receiving surface for a fixed illuminating wave, which is not modified when the illuminating wave used to obtain the "useful" plane frequency images varies. Each acquisition then corresponds to a reference image acquired at a near instant. A reference image acquired at an initial instant is chosen as absolute reference. By "useful" image is meant an image obtained on the receiving surface and for which will be calculated a two-dimensional frequency representation used to generate the representation of the object.

With the vector v going through the entire support of an image, we denote by m(v) a "useful" image obtained on this receiving surface, and h(v) the corresponding reference image. We denote as $h_o(v)$ the reference image chosen as absolute reference, obtained on the receiving surface. v represents the plane frequency projection and is thus a two-dimensional vector varying over the entire receiving surface. By $\sigma(v)$ is denoted the standard deviation of the Gaussian noise affecting the function h(v) at each point.

The phase variation of vibratory origin can be characterized, for example, by the coefficient $$r = \frac{\sum_f \frac{h_0(v)\overline{h(v)}}{\sigma^2(v)}}{\sum_f \frac{|h(v)|^2}{\sigma^2(v)}}$$

which represents the most probable phase difference between the reference images h(v) and $h_o(v)$.

The image m(v) can then be phase corrected as follows: m(v)←r.m(v) where the sign← designates the sense.

When this preliminary correction has been carried out the images thus phase corrected can be used in the algorithms defined in 3.5.3. and 3.5.4.

If the system is totally free from vibrations, this preliminary correction is not required.

If the vibrations are of the low-frequency type, the reference image can be acquired only at a low frequency, however higher than the frequency of the vibrations of the system.

If the vibrations are of the high-frequency type, it is possible to acquire a reference image at each useful image.

In the presence of vibrations, this preliminary correction is essential for the application of the algorithm defined in 3.5.4.

this preliminary correction is not essential for the application of the algorithm defined in 3.5.3. in the case in which a single objective is used. However, if several objectives are used, it allows the fixing of the phase difference between the plane frequency images generated from each objective. In this case, it is thus also essential.

This technique is used in Embodiments 3 and 4 and described in 7.17. It is also used in Embodiment 5 when the phase correction is carried out in accordance with paragraph 9.18.

A variant of the invention thus consists in periodically acquiring reference images corresponding to a fixed illuminating direction, and using these images to compensate for phase differences of vibratory origin affecting the plane frequency images.

3.7. Characterizing the Wave Vector of the Illuminating Wave

It is necessary to control the direction of the illuminating wave, i.e. its wave vector $f_e$, for instance by mechanical means as described for example in [Turpin]. However, these mechanical means must be very accurate and are costly to implement.

In the conditions defined in 3.5.3., i.e. if the acquisition system allows the acquisition of the non-diffracted part of the illuminating wave, the non-diffracted part of the illuminating wave corresponds to the maximum modulus value on the frequency representation of the wave coming from the object. According to a variant of the invention, the microscope has means for determining the coordinates of this maximum and for calculating, from these coordinates, the wave vector $f_e$ of the illuminating wave. This method is used, for example, in Embodiments 1 and 2.

However, the presence of the object can slightly distort the value of the wave vector thus obtained. According to a variant of the invention, the wave vectors $f_e$ of each illuminating wave are obtained in a preliminary phase in which the object is eliminated or replaced by a transparent plate. The wave vectors thus obtained are thus not distorted by the presence of the object. This method presupposes that the wave vectors are reproducible from one acquisition to the other. On the other hand, it obviates the need to calculate these wave vectors according to mechanical parameters. This method is used in Embodiments 3, 4 and 5.

3.8. Characteristics of the Receiver 3.8.1. Use of a Microscope Objective

According to a variant of the invention, the receiver comprises a large-aperture microscope objective that transforms the rays coming from the object under a large aperture into paraxial rays that can be directed towards a receiving surface. This configuration offers better performance than the configurations defined in [Fercher] (absence of objective) or [Turpin] (small-aperture objective). While [Vishnyakov] uses such a configuration without benefiting from it, owing to the use of poorly suited tomographic methods, the algorithms defined in the present invention make it possible to take full advantage of this configuration.

3.8.2. Use of a Receiving Surface in a Frequency Plane

It is advantageous to directly acquire the image in the frequency domain, as in [Turpin 3]. This can be done, for example, by means of the receiver described in [Lauer 1] that allows improved performance compared to the receiver of [Turpin 3].

3.8.3. Use of a Receiving Surface in a Spatial Plane

Besides the microscope objective itself, the receiving system defined in 3.8.2. presents a paraxial part allowing the modification of the optical signal captured by the objective, to obtain a frequency representation. The signal from the objective first passes through the plane in which the objective normally forms the image of the observed sample. This plane will be called the spatial plane. It is then transformed by a paraxial system so that, in the plane in which the receiving surface is placed, a plane wave coming from the object has a point image. This plane, in which the receiving surface is placed, will be called the frequency plane. The paraxial part of the optical system used can include intermediate spatial or frequency planes. The receiving surface can be placed in a spatial plane, in a frequency plane, or in an intermediate plane. However, to simplify calculations, it will always be placed either in a spatial plane or in a frequency plane. In order for the received image to be correct, the following conditions must moreover be complied with:

if the receiving surface is in a frequency plane, the reference wave must be centered virtually at a central point of the observed object.

if the receiving surface is in a spatial plane, the reference wave must be the image of a virtual wave which is plane on the crossing of the observed object.

Under these conditions, the signal detected on a receiving surface placed in a frequency plane is the optical Fourier transform of the signal that would be detected in a spatial plane. One variant of the invention constituting an alternative to the receiver defined in 3.8.2. is thus to use a receiving surface positioned in a spatial plane and a reference wave which is the image of a virtual wave which is plane on the crossing of the observed object. A numerical Fourier transform then replaces the optical Fourier transform.

Embodiments 1, 3 and 4 use sensor means in a frequency plane and Embodiments 2 and 5 use sensor means a spatial plane. A plane frequency image can thus be obtained either directly on a receiving surface placed in a frequency plane, or by the Fourier transform of an image received on a receiving surface placed in a spatial plane.

3.9. Beam Attenuation

If the sensor is placed in a spatial plane, the direct illuminating wave has, as a representation on the sensor, a constant modulus value which is superimposed on the wave diffracted by the object. An excessively weak diffracted wave in relation to this constant basic level cannot be detected correctly. On the other hand, this basic level is not very high because the intensity of the reference beam is spread over the entire sensor, thus generally allowing good images to be obtained. If the sensor is placed in a frequency plane, the illuminating wave is concentrated at a point and, as in the previous case, an excessively weak diffracted wave in relation to this constant basic level cannot be correctly detected. As the wave is concentrated at a point, this basic level is high and this limitation is troublesome.

According to an advantageous variant of the invention, a device controlling the attenuation of the beam, having one or more attenuation levels, is introduced to solve this problem. The attenuation device makes it possible to obtain successively several recordings differing in the intensity of the illuminating wave. A less noisy value of the diffracted wave is then obtained by combining these recordings. The final value of the diffracted wave is calculated for example at each point from the recording for which the intensity of the wave received at the considered point is highest, but for which the sensor remains unsaturated at the considered point and in its immediate surroundings for all the interference patterns allowing said recording to be obtained.

Given the use of the beam attenuation device, the variant of the invention in which a plane wave has a point image allows the detection of weaker diffracted waves. In fact, the waves are not superimposed on the sensor with any other wave and very low levels can be detected when the illuminating beam intensity is high.

Such a device is used in Embodiments 1, 3 and 4.

3.10.

Illuminating Beam Generation System

Whatever the embodiment, an illuminating beam generation method must be designed. The methods proposed by [Turpin] have the drawback of requiring significant mechanical movements and hence of greatly slowing down the system.

An optical system, for example the one described in 8.1.1., can transform a parallel beam having a given spatial extension and variable direction into a parallel beam whose spatial extension has been reduced and whose directional variations have been amplified. In general, small directional variations applied to a beam having a broad spatial extension can be amplified by an optical system through a reduction in the spatial extension of the beam. As the spatial extension of the illuminating beam required for a microscope is small, this principle can be used for the optical amplification of small mechanical movements.

A beam with a variable direction can be transformed by a lens into a beam with a variable position in the back (image) focal plane of this lens. A directional variation of the beam in a part of its optical path is thus equivalent to a position variation in another part of its optical path and vice-versa. In intermediate planes, the variation is a joint position and directional variation. There is thus no reason to differentiate between a system generating illuminating wave position variations and a system generating directional variations, as these systems are equivalent.

According to one variant of the invention, the illuminating beam generation system comprises:

- a beam deflector generating variations in a paraxial beam.
- a large-aperture optical element (for example, a microscope objective or a condenser) transforming said incoming paraxial beam variations into significant directional variations in the outgoing beam.

Said system can also comprise a lens system designed so that the beam is parallel at the exit of said large-aperture optical element.

The beam deflector may, for example, be a mirror mounted on a positioner allowing the control of its orientation. This solution is implemented in Embodiments 1 and 2. However, this solution has two drawbacks:

the movement of the mirror generates vibrations which disturb the system. After each movement of the mirror, it is necessary to wait for the absorption of vibrations before proceeding with the acquisition.

the phase difference between the reference beam and the illuminating beam is not reproducible, thus preventing the use of certain algorithms such as those defined in 3.5.4.

Each of the beam deflectors described in 3.10.1., 3.10.2 and 3.10.3. enables these two problems to be solved.

3.10.1. Beam Deflector Based on a Series of Binary Deflectors

A system capable of sending the beam back in two directions can be built by means of a birefringent prism which transmits the ordinary beam and the extraordinary beam in two different directions. The laser beam used must then be polarized. A polarization rotator placed before the prism allows the orientation of its polarization in the ordinary direction or the extraordinary direction, which implies a different angle of deflection by the prism. However, available ferroelectric polarization rotators, which have the advantage of being fast, do not allow a rotation of 90 degrees but a rotation of about 80 degrees. This prevents the possibility of having both a beam polarized exactly in the ordinary direction, for one of the positions of the polarization rotator, and a beam polarized exactly in the extraordinary direction for the other position. Hence, in one of the positions, is created a spurious beam deflected in an undesired direction. To eliminate this spurious beam, it is necessary to use at the output of the birefringent prism a polarizer selecting only the desired beam. In order for this polarizer not to eliminate the beam in the other position of the rotator, a second rotator must be introduced between this polarizer and the prism, said second rotator being used to bring the electric field vector of the beam back to the passing direction of the polarizer when it is not there directly at the exit of the prism.

A system capable of returning a beam in many directions can be constituted by combining in series several of these elementary systems. By combining two of them, which produce a deflection of the same amplitude but in two different orthogonal directions, a doublet is formed. By combining N doublets in series, each doublet being characterized by birefringent prisms having characteristics such that the deflection angle of doublet number i is proportional to $2^i$, one obtains $2^N$ possible deflection values in each direction. For example, with N=8, there is a total of 256×256 beam deflection directions.

According to a variant of the invention, the beam deflection system is constituted by the association of elementary deflectors in series, each of these elementary deflectors comprising a birefringent prism deflecting differently the ordinary beam and the extraordinary beam, preceded by an electronically controlled polarization rotator and allowing the orientation of the electric field vector of the beam along the ordinary axis or the extraordinary axis of said prism, and followed by a second rotator and by a polarizer allowing the elimination of spurious beams.

Such a device is used in Embodiment 3.

3.10.2. Beam deflector based on spatial modulators

A spatial modulator is a two-dimensional matrix of pixels allowing the phase or intensity modulation of a wave in a plane. Most spatial modulators are based on liquid crystals. Common LCD screens constitute an example of a spatial intensity modulator.

A spatial plane, on the path of the illuminating beam, will be defined by a plane in which this beam is parallel and is centered on the optical axis. A frequency plane will be defined as a plane in which this beam has a point image.

A parallel beam reaching a spatial plane has, in this plane, a complex representation of the form $\exp\{j2\pi(f_x x+f_y y)\}$ in which (x,y) are coordinates of a point of the plane and in which $(f_x,f_y)$ are the coordinates of the projection of the wave vector in this plane. If a phase modulation device is placed in this plane and if a phase shift of the form $\theta=2\pi(g_x x+g_y y+c)$ is applied by means of this device, the wave has, after passing through said device, a complex representation $\exp\{j2\pi((f_x+g_x)x+(f_y+g_y)y+c)\}$. The spatial modulation device has thus modified the direction of the incident wave. Wave vectors that can generate such a spatial modulation device are included in a cone the aperture of which depends on the maximum values of $g_x$ and $g_y$ permitted by the modulator. This cone will be called "deflection cone."

If an intensity modulation device is used instead of the phase modulation device, it is possible to apply an attenuation function of the type $\cos\{2\pi(g_x x+g_y y+c)\}$. After passing through the device, the wave then has a form of the type $\exp\{j2\pi((f_x+g_x)x+(f_y+g_y)y+c)\}+\exp\{j2\pi((f_x-g_x)x+(f_y-g_y)y-c)\}$ which corresponds to the superposition of two plane waves whose wave vectors are symmetrical in relation to the axis oriented along the wave vector of the wave leaving the device in the absence of modulation. One of the two waves can be stopped by a diaphragm, in which case the device constitutes a beam deflector comparable to the preceding one.

Intermediate modulation devices performing joint phase and intensity modulation may also be used.

A variant of the invention thus consists in using, as beam deflector, a suitably controlled spatial modulator.

According to a variant of the invention, said modulator is a phase modulator controlled so as to generate a phase shift in a form as near as possible to $\theta=2\pi(g_x x + g_y y)$.

Prior-art modulation devices operate pixel by pixel. This discretization leads to the generation of spurious frequencies outside of the deflection cone. One variant of the invention consists in eliminating these spurious frequencies by means of a diaphragm placed in a frequency plane on the path of the wave coming from the phase modulator.

Modulation devices allowing fast modulation are binary, i.e. to a given pixel there correspond only two possible phase or intensity values. The use of a binary modulation device results in the presence of a spurious plane wave symmetrical with the wave to be obtained in relation to an axis constituted by the direction of an undeflected beam. In the case of binary modulators, this is true even in the case of a phase modulator, whereas in the case of modulators generating a continuous modulation, this problem can be avoided by using a phase modulator. According to a variant of the invention, the diaphragm filtering the spurious frequencies is dimensioned so as to filter not only the frequencies located outside of the deflection cone, but also part of the frequencies located within the deflection cone, so as to stop the spurious plane wave.

Binary modulation devices also have the drawback of generating spurious frequencies included within the deflection cone and constituting a frequency "noise." According to a variant of the invention, these frequencies are stopped by an intensity modulator placed in a frequency plane along the path of the beam coming from the phase modulator, and controlled so as to allow only the sought frequency to pass.

Such a device is used in Embodiment 4.

3.10.3. Beam deflector consisting of a mobile mirror designed so that vibrations are not troublesome The beam deflectors described in 3.10.1. and 3.10.2. are based on the use of liquid crystal devices and polarizers. These devices are not available in the ultraviolet radiation range. To use ultraviolet rays, other means are required.

In prior-art devices, the entire system was placed on an optical table.

According to one variant of the invention, the beam deflection device is made up of a mirror placed outside the optical table, the separation between the illuminating beam and the reference beam being provided by a separator fixed on the optical table and positioned after said mirror on the path of the beam.

As the mirror is placed outside the optical table, it does not generate vibrations in this table. As the separation of the beams takes place after the mirror, its vibrations also do not generate phase shifts between illuminating beam and reference beam. This consequently solves the problem of vibrations.

On the other hand, the fact that beam separation takes place after the mobile mirror means that the reference beam varies at the same time as the illuminating beam. This variation must be taken into account in the design of the system and compensated. For example, if the receiving surface is placed in a spatial plane, variations in the direction of the reference wave result in translations of the plane frequency image. According to a variant of the invention, this effect is compensated by providing a translation in the opposite direction of the plane frequency images obtained.

This technique is used, for example, in Embodiment 5.

3.11. Compensation of errors due to polarization

The image generation method described by [Wolf] is based on a scalar diffraction theory and assumes that the wave passing through the object is diffracted isotropically in all directions by each point of the object.

It is only on the basis of this assumption that the theoretical resolution of $\lambda/4$ can be obtained. Scalar diffraction theory is however not valid for high diffraction angles. The intensity diffracted by a point of the object depends on the direction of the diffracted wave, the direction of the illuminating wave, the polarization direction of the illuminating wave and the polarization direction of the diffracted wave.

3.11.1. Compensation by real-coefficient multiplication

The wave diffracted by the object differs from the wave which would be diffracted if the diffraction were isotropic by a real multiplicative factor depending on the:

illuminating wave propagation direction
illuminating wave polarization
diffracted wave propagation direction
diffracted wave polarization According to one variant of the invention, the microscope comprises means for determining this multiplicative factor and compensating it by multiplying the received waves by the inverse of said factor. Such a variant of the invention is described in 7.18.8.

3.11.2. Compensation in the case of an anisotropic material

If the observed object is made up essentially of an anisotropic material, the effects of the diffraction differ from what they are in an isotropic material. The material is then characterized at each point by six crystalline parameters plus absorptivity.

In the particular case in which the observed object is a uniaxial crystal, the refractive index of the ordinary ray has a constant value. According to one variant of the invention, a three-dimensional representation in which the complex numbers obtained characterize the absorptivity and the ordinary index of refraction can be calculated. According to a variant of the invention, this representation is calculated from plane frequency images obtained for an illuminating wave polarized so that it constitutes an ordinary beam.

As the ordinary polarization direction varies with the wave's propagation direction, it is necessary to be able to modify the polarization direction of the illuminating wave. However, as the phenomena are linear, one need only record the wave received at every point for two polarization directions of the illuminating wave to be able to deduce the wave diffracted by the object for an illuminating wave of any direction. According to a variant of the invention, the microscope comprises means for generating two polarization directions of the illuminating wave. According to a further variant of the invention, the microscope also comprises means for analyzing the diffracted wave along two polarization directions, thus making it possible to distinguish the ordinary diffracted wave from the extraordinary diffracted wave. According to this variant of the invention, the plane frequency images are then obtained from four elementary images corresponding to each combination of two polarization directions and two analysis directions.

Such a variant of the invention is described in 7.18.9. In the description of 7.18.9. only the analysis direction corresponding to the ordinary ray is used, but it is also possible to take into account the analysis direction corresponding to the extraordinary ray. Two plane frequency images are then obtained for each illuminating wave propagation direction, one corresponding to the ordinary index and the other to the extraordinary index. The final frequency representation is obtained from this set of images, taking into account the variations in the extraordinary index at each point of the plane frequency images corresponding to the extraordinary index.

3.11.3. Compensation by combining several polarization and analysis directions

In the case of the isotropic material, the method described in 3.11.1. has the drawback of causing the noise level to rise considerably. One way to avoid this problem is to acquire at least four plane frequency images corresponding to each combination of two distinct polarizations of the illuminating wave and two distinct polarization directions of the diffracted wave. An appropriate algorithm then makes it possible, from these four images, to calculate a single image corresponding to the scalar parameter sought. According to a variant of the invention, the microscope consequently comprises means for generating two distinct illuminating wave polarizations, and means for analyzing the diffracted wave along two distinct polarization directions. A variant of the invention is that the microscope comprises means for calculating, from the plane frequency images corresponding to each combination of two polarization directions and two analysis directions, a single plane frequency image representing a complex scalar quantity complying with the condition of uniform diffraction in all directions. This principle is used in Embodiments 3, 4 and 5. The principle for calculating said scalar quantity is described in detail in 7.12.1.

In the case of wavelengths in the visible, said means for varying the illuminating wave polarization can consist of a liquid crystal polarization rotator. Said means for varying the diffracted wave analysis direction can consist of a polarization rotator associated with a polarizer. In the case of ultraviolet, these devices are not available.

3.11.4. Variation of illuminating wave polarization direction in the UV range

In the UV range, polarization rotators can be replaced by a quartz retardation plate rotating around an axis by mechanical means. However, these mechanical movements slow the system down considerably. For this reason, use is made of a system in which the only mechanical movements are those of shutters and in which the beam to be closed off has a spatial extension which is as small as possible so that the movement of the shutter is as small as possible. It is then possible to use a high-speed shutter or a shutter system with a rotating crownwheel.

According to one variant of the invention, such a system includes:
a beam separator which breaks the beam down into a beam A and a beam B.
lenses placed on each beam A and B and focussing these beams on points of focus at which the shutters are placed.
a device making it possible to again superimpose beams A and B having passed through their respective shutters.
a device placed on the place of one of the beams A or B, in the part of the path in which the two beams are distinct, and modifying the polarization of this beam.

Such a system can also comprise additional lenses designed to reform parallel beams after passage through the shutters. It can also comprise a second polarization modification device. The beam polarization modification device can be a retardation plate. The beam separation and beam superposition devices can be semi-transparent mirrors. Such a device is used in Embodiment 5.

3.11.5. Variation of analysis direction in the UV range

The wave coming from the object can be broken down into a wave whose electric field vector is parallel to that of the reference wave and a wave whose electric field vector is orthogonal to that of the reference wave. The intensity received on the receiving surface is the sum of the intensity of the wave whose electric field is orthogonal to the reference wave and the intensity produced by the interference of the reference wave and the wave whose electric field is parallel to the reference wave. The first of these intensities does not depend on the phase of the reference wave and consequently does not modify the complex value of the wave coming from the object measured by the combination of interference patterns corresponding to different phases of the reference wave. It is thus only the wave whose electric field vector is parallel to that of the reference wave which is obtained on the receiving surface.

The analysis direction of a wave can consequently be modified simply by modifying the polarization direction of the reference wave or, symmetrically, by modifying the polarization direction of the wave coming from the object.

According to a variant of the invention, the analysis direction is modified by varying the polarization direction of the reference wave or of the wave coming from the object.

According to a variant of the invention, the polarization of the reference wave or of the wave coming from the object is modified by a device comprising:
a beam separator breaking the beam down into two beams A and B
a retardation plate LA placed on the path of beam A and a retardation plate LB placed on the path of beam B, the angle between the neutral axes of these two retardation plates being 45 degrees.

The polarization direction of the beam having passed through retardation plate LA is then deduced from the polarization direction of the beam having passed through retardation plate LB by a rotation whose angle is the angle between the neutral axes of retardation plates LA and LB. If this angle is 45 degrees, the beams coming from plates LA and LB will always have orthogonal polarizations whatever the polarization direction of the incident beam.

The two beams A and B can then be combined by a superposition device after having passed through shutters, as in the case of the device described in 3.11.4. This has the drawback of requiring the use of shutters at a point of the beam path in which the direction of the beam is variable and in which the beam can consequently not be focussed on a fixed point.

According to a variant of the invention, the two beams A and B are separately superimposed on the beam coming from the object (if they constitute the reference wave) or the reference wave (if they come from the object). The interference patterns corresponding to each polarization direction are then formed on two distinct receiving surfaces.

Whether the plane frequency images corresponding to each polarization are obtained on distinct receiving surfaces or on the same receiving surface, a phase difference is then created between these images and must be compensated. According to a variant of the invention, the retardation plates are positioned so that the reference and illuminating beams reaching the receiving surface have different polarization directions, preferably 45 degrees from each other. Then, the part of the wave coming from the object which comprises frequencies near the illuminating wave is detected on the two receiving surfaces and can be used to calculate said phase difference.

3.12. System for eliminating direct illumination

The illuminating wave is generally much more intense than the diffracted wave. It can saturate the sensors or reduce considerably the signal-to-noise ratio of the system by requiring acquisition of high signal levels. The illumination of the non-diffracted part of the illuminating wave during the acquisition phase or during part of the acquisition phase clearly improves the performance of the system. In a frequency plane, the non-diffracted part of the illuminating wave has a point image and can be eliminated by placing an absorbing element on this point. According to one variant of the invention, the system accordingly comprises a device for eliminating the non-diffracted part of the illuminating wave, placed in a frequency plane, and absorbing the beam on a small zone around the point corresponding to this illuminating wave.

According to a variant of the invention, this device is made up of a spatial intensity modulator controlled to allow passage at all points except on a limited zone around the impact point of the non-diffracted part of the illuminating wave. This variant is implemented in Embodiment 4.

According to a further variant of the invention, this device comprises a glass which is mobile in translation within a frequency plane, an absorbing black spot placed on the glass being designed to stop the direct beam, the position of the glass being controlled so that this black spot coincides with the point of impact of the non-diffracted part of the illuminating wave. This variant of the invention is implemented in Embodiment 5.

3.13. Spatial modulator utilization device

The spatial modulators used in 3.10.2. or in 3.12. may in particular be high-speed binary modulators operating by reflection. They are generally used by means of a polarizing semi-transparent mirror which is a device of cubic form sending back incident beams in two different directions depending on their polarization. This device, owing to its thickness, generates a slight aberration which widens the point corresponding to a given frequency, which is detrimental to the quality of the images obtained.

To avoid the use of this device, it is possible to use beams coming from the modulator under an oblique angle. The incident and reflected beams are then separated. However, this method deforms the distribution of the generated frequencies. To prevent this deformation, said oblique angle must be small.

According to one variant of the invention, this problem is solved by using a device consisting of a mirror with two orthogonal reflecting faces and a lens traversed in one direction by the beam directed towards the modulator and in the other direction by the beam reflected by the modulator. The incident beam is reflected by one side of the mirror, passes through the lens, is reflected by the modulator, passes again through the lens in the opposite direction and is reflected by the second side of the mirror, resuming its initial direction. The incident and reflected beams can be partially superimposed on the lens, but are separated on the two-sided mirror. In order to obtain this separation on the mirror, while maintaining as small an oblique angle as possible, the two-sided mirror must be positioned approximately in one focal plane of the lens and the modulator must be positioned in the other focal plane of the lens.

3.14. Use of objectives traversed in both directions and/or of several objectives The object can be illuminated on one side and the wave coming from the object can be picked up on the opposite side by an objective, thus allowing the reconstitution of part of the frequency representation of the object. However, other parts of the frequency representation of the object can be constituted only from the wave moving towards the side of the object from which the illuminating waves come. According to one variant of the invention, an objective is associated with an optical system allowing, on the one hand, the measurement on a sensor of the wave coming from the sample and having gone through the objective and, on the other, the formation of an illuminating wave which, after crossing the objective, becomes in the sample a plane illuminating wave of variable direction. This objective is then crossed in one direction by the illuminating wave moving towards the object, and in the other direction by the diffracted wave coming from the object. It plays both the role of objective receiving the wave coming from the object and the role of high-aperture system transforming the small directional variations of the wave coming from the beam splitter into large directional variations of the wave in the object. This can be achieved for example by means of a semi-transparent mirror placed on the path of the beam coming from the object and superimposing the beam coming from the object and directed in a given direction on the illuminating beam moving in the opposite direction. This variant of the invention is implemented in Embodiments 3, 4 and 5 which comprise several objectives. One arrangement in which only one objective is used is described in 7.18.10.

Possible limitations having to do with the direction of the illuminating wave, characterized by its frequency vector, influence the performance of the system. Maximum precision is obtained when all the possible directions are used. Similarly, it is desirable to record the wave diffracted by the object in all directions. When a single microscope objective is used, its aperture limits the directions in which it is possible to record the wave diffracted by the object. According to an advantageous variant of the invention, several objectives focussed on the sample are used, which makes it possible to record the wave coming from the sample along more directions. The objectives then cover almost the entire space around the sample, and the illuminating waves must necessarily pass through these objects to reach the sample. According to one variant of the invention, each objective is associated with an optical system allowing, on the one hand, the measurement on a sensor of the wave coming from the sample and having passed through the objective and, on the other, the formation of an illuminating wave which, after passing through the objective, becomes a variable direction plane illuminating wave in the sample. The illuminating waves can thus be generated in all the directions covered by the aperture of the objectives, and similarly the waves coming from the object can be measured in all these directions. Considering a variant of the invention, the acquisition and calculation system takes into account all the waves measured on all the sensors for all the illuminations used and, from these data, generates the three-dimensional frequency representation of the object. Each pair (illuminating wave direction-direction of wave from object) corresponds to a point of the frequency representation of the object, and the frequency representation thus generated consequently comprises all the points obtainable from the illuminating waves and the diffracted waves respectively produced and received by all the objectives.

A large number of objectives can be used in order to receive all the waves coming from the sample, or in order to increase the working distance by using low-aperture objectives. However, most of the samples observed in practice are flat and can be placed conveniently between two cover glasses. By virtue of a variant of the invention constituting the best compromise between utilization difficulty and performance, use is made of two large-aperture microscope objectives positioned opposite each other, the flat sample being introduced between these two objectives. This solution is used in Embodiments 3, 4 and 5. In Embodiments 1 and 2, which exhibit lower performance but are easier to fabricate, a single microscope objective is used.

3.15. Generation of inverse beams

When two or more microscope objectives are used, a plane frequency image is generated from the wave received by each objective. Each point of a plane frequency image corresponds to a given wave vector of the diffracted wave. In order to calculate the three-dimensional frequency representation of the object, it is necessary to determine these wave vectors correctly, and this in a coordinate system common to the wave vectors received by each objective.

Knowing the K factor and the optical center, defined in [Lauer 1], allows the determination of the wave vectors corresponding to each point of a frequency image. However, the coordinate system used for two-dimensional representations RA (before translation of vector $-f_e$) reconstituted from the plane frequency image obtained from a given objective is different from that used for the representations RB obtained from the facing objective. To establish a correspondence between these two coordinate systems it is necessary to determine the coordinates of certain points in the coordinate system used for RA as well as in the coordinate system used for RB.

Each point PA of the representation RA is the image of a wave vector $f_e$ of the illuminating wave which reaches this point in the absence of an object, and has the coordinates of this wave vector. To this vector there corresponds a wave vector $-f_e$ of opposite direction whose image is a point PB of representation RB. The coordinates of point PB in a coordinate system used for RA are the opposite of the coordinates of point PA in this coordinate system.

The correspondence between the two coordinate systems can thus be established if the coordinates of point PB are also determined in coordinate system RB. This can be done by generating, by optical means, a wave vector beam opposite to the illuminating beam and by determining the coordinates of the image point of this beam in the coordinate system used for RB. If this correspondence is established at a sufficient number of points, the relationship between the coordinate systems used for RB and RA can be easily determined and these representations can be modified to use a common coordinate system.

In like manner, it is possible to obtain, by optical means, a direct correspondence between coordinate systems RB and RA. This requires the adjustment of a certain number of optical elements. To perform this adjustment, it is possible to check continuously the correspondence between the coordinates of point PB obtained in each of the coordinate systems used, and this for a certain number of points PB (three points in principle).

In both cases, it is necessary to generate a beam having the same characteristics as the illuminating beam, but propagating in the opposite direction. In general, given a beam used in the system, the term "opposite indicator beam" will designate a beam having the same characteristics but propagating in the opposite direction.

Considering one variant of the invention, the microscope consequently comprises, during the 35 adjustment phase, means for generating an indicator beam opposite to the illuminating wave. These means may be eliminated after the adjustment phase corresponding to the determination, by calculation means or optical means, of the correspondences between coordinate systems RB and RA.

According to a variant of the invention, the microscope also comprises means for generating, during an adjustment phase, an indicator beam opposite to the reference beam. This beam will also be used in certain adjustment phases. For example, if the receiving surface is in a frequency plane, the reference wave is centered virtually at a central point of the object. The indicator beam opposite to the reference wave makes it possible to adjust the position of the objectives so that these objectives are focussed on the same point.

According to a variant of the invention, when the receiving surface is a spatial plane, an additional beam centered on this spatial plane is also used during an adjustment phase, as is its opposite indicator beam. This beam makes it easy, for example, to adjust the position of the objectives in the absence of a reference wave centered on a point of the object.

In Embodiments 3, 4 and 5, each beam used has an opposite indicator beam, and the means of generating these opposite indicators are described as forming part of the microscope and are not eliminated after the adjustments have been completed: shutters are simply used to cut off these beams.

According to one variant of the invention, the device generating an opposite indicator beam from an original beam comprises:
- a semi-transparent mirror separating the original beam into an unmodified beam and a secondary beam.
- a lens focussing the secondary beam in a focussing plane.
- a mirror placed at the point of focus, which reflects the opposite beam back to said lens.

The fact that the mirror is placed at the point of focus guarantees that the reflected beam has exactly the opposite direction of the incident beam. The reflected beam passes through the lens again in the opposite direction. The part of this beam which is then reflected again by the semi-transparent mirror has the same characteristics as the unmodified beam but is directed in the opposite direction.

3.16. Determination of differences in the position of objectives

From waves coming from the object and passing through a given objective, it is possible to generate a three-dimensional representation of the observed object. In spatial representation, this representation is relative to a given origin, that will be called characteristic point of the objective. In general, characteristic points of the objectives used do not coincide. Consequently the part of the frequency representation generated from an objective is translated in relation to that obtained from another objective. This translation results in a frequency modulation, the points in the frequency space obtained from a given objective consequently being affected by a variable phase shift corresponding to this modulation. Considering a particular variant of the invention, the microscope comprises means for compensating this translation and generating a representation of the object in which the phase shift affecting each point of the representation is constant. To be able to superimpose the representations obtained from each objective, and in accordance with one variant of the invention, the microscope comprises means for determining the coordinates of the characteristic points of each microscope objective, in a common coordinate system. It is then possible to translate appropriately each representation before superimposing them. This translation in the spatial domain is equivalent to a demodulation in the frequency domain, which can be carried out directly on the plane frequency images.

3.16.1. Determination of coordinates of characteristic points of each objective According to a variant of the invention, this can be obtained by using the beam centered on a central point of the observed object and its opposite indicator beam. This beam is received on one sensor after having passed through the objectives, and its opposite indicator is received on another sensor. From the beam received on a sensor, the two-dimensional frequency representation of this beam can be obtained and the coordinates of its point of focus can be determined. The point of focus of the beam is the same as that of its opposite indicator beam. The difference between the coordinates of the point of focus of the beam obtained from one objective and those of its opposite indicator obtained from another objective is equal to the difference between the coordinates of the characteristic points of these objectives in a common coordinate system.

This method can be implemented with any number of objectives, provided that the configuration is such that no group of objectives is optically isolated, i.e. that a given objective group, if it does not include all the objectives used, can always be reached by a beam coming from an objective outside the group. For example, if six objectives are used, they must be grouped two by two: each objective must receive beams coming from the other two objectives.

This aspect of the invention is implemented in 7.9.1. and in 9.12.

3.16.2. Determination of displacements of each objective

It is generally necessary to move the objectives in order to introduce the observed object. This operation modifies the coordinates obtained and calls for the repetition of the preceding operation. However, the presence of the object disturbs the beam which passes through it and prevents any precise result from being obtained. According to one variant of the invention, this problem is solved by using parallel beams of variable direction. A parallel beam has a point plane frequency image and the value obtained at this point is affected little by the local irregularities of the observed sample.

The difference between the phase of such a beam received on a sensor before the movement of the objectives and the phase of the same beam after the movement of the objectives depends on the vector characterizing the displacement of the characteristic point of the objective receiving the beam in relation to the characteristic point of the objective from which the beam comes. From these phase differences established for a sufficient number of beams, it is possible by means of an appropriate algorithm to determine this displacement. According to this variant of the invention, the phase of a set of parallel beams reaching a given sensor is consequently measured a first time in the absence of the object and a second time in the presence of the object. From the phase differences and possibly from the intensity ratios thus measured, an appropriate algorithm can recalculate the displacement of the characteristic points of each objective. These phase and intensity differences can be characterized, for each parallel beam, by a complex value obtained as the quotient of the value obtained in the presence of the object by the value obtained in the absence of the object at a corresponding point of the plane frequency image. This value will be called the phase and intensity ratio on a given parallel beam.

Knowing the initial coordinates of the origin of each representation and its displacement, its current coordinates can be deduced and the difference in position can be compensated. This method can be implemented with any number of objectives, with the same provision as in 3.16.1.

The first measurement in the absence of the object is carried out, for example, in 7.9.2. and in 9.13. In these two cases, the correction related to the position values determined as indicated in 3.16.1. is described in the same paragraph as that measurement.

The second measurement in the presence of the object and the calculation of the displacements are carried out for example in 7.11. and in 9.15. In both cases, the absolute positions are calculated directly without intermediate displacement determination, the correction related to the position values having already been performed as indicated above. This determination is coupled with the calculation of the average index of the object whose principle is given in the next paragraph.

3.17. Determination of index and thickness of the object

3.17.1. Principle

When two microscope objectives opposite to each other are used and when the observed object forms a layer between two flat cover glasses, the average index of the object, if it differs from the nominal index of the objective (index of optical liquid designed to be used with the objective), creates a spherical aberration which distorts the three-dimensional representations obtained. This spherical aberration is reflected in phase and intensity variations of the beams measured in 3.16.2., these variations depending on the index and thickness of the object. According to one variant of the invention, a program uses the values measured in 3.16.2. to determine simultaneously the displacements of the objectives, and the index and thickness of the object.

The calculation carried out in 7.11. or in 9.15. is an embodiment of this variant of the invention.

3.17.2. Minimization algorithm

For given values of displacements and of the index and thickness of the object it is possible to calculate the phase and intensity ratios on each parallel beam. According to a particular variant of the invention, the calculation algorithm determines the values of the displacements and the index and thickness of the object which minimize the standard deviation between the theoretical values thus calculated and the values actually measured.

This algorithm must determine an absolute minimum on a set of five parameters of a noisy function, the standard deviation function exhibiting, even in the absence of noise, local minimum values other than the absolute maximum. This problem consequently lends itself poorly to conventional minimization methods.

When the values of the parameters are known approximately, the algorithm can maximize, in a first phase, the value at the origin obtained by compensating the phase differences due to these parameters. Maximization of a function being equivalent to a minimization of its opposite, the term maximization will be used only to define the algorithm, but it would also be possible to speak of minimization.

According to a variant of the invention, the algorithm comprises iterative phases during which it determines, for each iteration, an absolute maximum on a set of vales of the parameters varying discretely, the function to be maximized having previously been filtered to eliminate the frequencies that would cause aliasing when sampling at the variation intervals of the parameters. According to this variant of the invention, the interval is reduced with each iteration and the central point of the set on which the parameters vary during an iteration is the maximum determined in the preceding iteration.

Such an algorithm makes it possible in general to converge towards the solution despite the local maxima and the large number of parameters.

Such an algorithm is described in 7.8.2.

3.18. Object position determination

The exact position of the object has no influence on the values measured in 3.16.2. and can consequently not be obtained from these values. On the other hand, it can modify the three-dimensional representations obtained: the spherical aberration affecting a given three-dimensional representation depends on the position of the object. If the index of the object differs from the nominal index of the objectives, this position must be determined.

The position of the object in relation to the objectives affects the proper superposition of the phase corrected two-dimensional representations. If it is not correctly evaluated and taken into account as a correction factor, abnormal phase differences appear between pairs of phase corrective two-dimensional representations, on the part of the frequency space that corresponds to the intersection of these representations.

According to a variant of the invention, the measurement of the position of the object in relation to the objectives comprises an acquisition phase during which a series of plane frequency images are acquired, corresponding to a series of illuminating beams of variable orientation. Knowing the position parameters, the index and the thickness of the object, previously calculated by the maximizing algorithm described in 3.17., and knowing the sought position, a program can determine the two-dimensional representations corresponding to each plane frequency image. According to this variant of the invention, the program for determining the position of the object in relation to the objectives is consequently a minimization program that determines the value of the position parameter that minimizes the abnormal phase differences. Such a program is described in detail in paragraph 17.15.

3.19. Use of objectives exhibiting aberrations

The design of an objective without aberrations is difficult. Aberrations increase in proportion to the size of the optical elements used, so that it is difficult to obtain a great working distance. It is also difficult to obtain a high numerical aperture.

In the present microscope, the complex value of the wave received on a receiving surface is recorded. The frequency representation of part of the wave coming from the object can be reconstituted when this part of the wave coming from the object reaches the receiving surface. The frequency representation of the wave coming from the object is obtained, in every case, by a linear relationship from the wave reaching the receiving surface. The only "indispensable" property of the objective is consequently its ability to pick up a significant part of the wave coming from the object, and transform it into a paraxial beam reaching the receiving surface. An objective having this property can easily be designed and have a high numerical aperture and long working distance. According to one variant of the invention, an objective affected by aberrations greater than the limit imposed by the diffraction is used, and the calculation program reverses the linear relationship between the wave coming from the object and the wave picked up on the receiving surface so as to compensate these aberrations.

According to a variant of the invention, the microscope objective is designed to comply with the following property:

(1)—The aberration affecting the image formed in the image plane of the objective must be less than a fraction of the diameter of the observed part of this image.

The requirement (1) ensures that, for the major part of the object studied, the entire beam coming from a given point reaches the receiving surface. In fact, the spatial extent of the observed sample is limited, depending on the systems, by a diaphragm or by the size of the sensor used. In the presence of spherical aberration, when the distance between a point and the limit of the observed area is less than the characteristic distance of the spherical aberration, part of the waves coming from this point do not reach the receiving surface and the image of this point can consequently not be reconstituted with precision. If the area concerned remains small in size, this drawback is not very troublesome: this is what is guaranteed by compliance with condition (1). If the area concerned were too large, the precision would be affected on the entire image.

Requirement (1) is similar to the usual requirement concerning spherical aberration, but is considerably reduced. In fact, results of good quality can be obtained with a spherical aberration of the order of 10 or so wavelengths, whereas in a conventional microscope spherical aberration must be a fraction of a wavelength.

However, an objective not having certain additional properties may be difficult to use. In fact, the linear relation linking the wave received on the receiving surface to the frequency representation of the wave coming from the object may be relatively complex. The algorithmic compensation of aberrations may thus require high computation volumes. According to one variant of the invention, this problem is solved by using an objective having, in addition, the following property:

(2)—The image, in the back (image) focal plane of a beam which is parallel in the observed object, must be a point image.

The plane frequency image used in all the embodiments is equivalent to the image formed directly in the rear focal plane. The requirement (2) means that each point of a plane frequency image corresponds to a given frequency of the wave in the object. If requirement (2) were not complied with, it would be necessary to use a generalized algorithm consisting in obtaining the value associated with a given point as a linear combination of the values detected on a set of neighboring points. Requirement (2) is relatively simple to comply with. The use of an objective not complying with condition (2) would only be of limited interest, but would considerably complicate the calculations needed to obtain an image. An example of the use of an objective complying with conditions (1) and (2) is described in paragraph 7.21.

In the case of an objective complying only with conditions (1) and (2), the image reconstitution algorithm must take into account the relation between the coordinates of a point on the plane frequency image and the corresponding frequency of the wave in the object.

By $B(\alpha)$ is denoted the image point, in the back focal plane, of a parallel beam in the object and forming in the object an angle a with the optical axis.

According to a variant of the invention, the algorithms are simplified by using an objective complying in addition with the following condition:

(3)—The distance between point $B(\alpha)$ and point $B(0)$ must be proportional to $\sin \alpha$.

Compliance with condition (3) means that the coordinates of a point on the plane frequency image must be directly proportional to the components along two corresponding axes of the wave vector of the wave in the object, which considerably simplifies the calculations. If an objective complies with conditions (1)(2)(3), spherical aberration results only in a phase shift of each point of a given frequency representation, a phase shift which can then be easily compensated. An example of the use of an objective complying with conditions (1)(2)(3) is described in 7.20. Condition (3) is roughly equivalent to the condition of Abbe's sines.

In an objective complying only with conditions (1)(2)(3), the image is disturbed in the vicinity of the diaphragm over a distance equivalent to the characteristic distance of the spherical aberration. This disturbance is eliminated by the use of a conventional objective rid of any spherical aberration, which thus makes it possible in principle to obtain the best images. However, the use of an objective complying only with (1)(2)(3) allows a significant reduction in the design requirements of the objective. This makes it possible to obtain an objective with a longer working distance, a less expensive objective, or an objective with a higher numerical aperture. This technical solution may thus be preferable in certain cases.

The use of such a microscope objective requires the algorithmic compensation of phase differences affecting the plane frequency image and which are the consequence of spherical aberration. This calls for the determination of the function characterizing the spherical aberration induced by the microscope. Because the objective exhibits a symmetry of revolution, the phase difference affecting a point of a plane frequency image depends only on the distance between this point and the optical center. The spherical aberration may thus be characterized by a one-dimensional function representing the phase difference as a function of this distance.

According to a variant of the invention, this function can be obtained by the optical calculation program used for the design of the objective. In fact, this program allows the tracing of beams and can easily be improved to also enable optical path calculations. As the phase differences are proportional to the optical path differences affecting the rays coming from a given point, they can be deduced from geometrical considerations of this type.

According to a further variant of the invention, this function can be measured by optical means. In accordance with this variant of the invention:

two identical microscope objectives facing each other are used.
use is made of an illuminating wave centered on a point of the plane at which a first objective normally forms the image of the observed sample.
the wave received in the plane at which the second objective forms the observed sample's image is detected.

In the absence of spherical aberration, the phase of the detected wave must be constant. In the presence of spherical aberration, the phase difference due to the aberration is twice the difference due to a single microscope objective. This makes it possible to obtain the sought function.

3.20. Compensation for spherical aberration and position differences

Spherical aberration due to the refractive index of the object, spherical aberration due to the properties of the objective, and positioning errors relative to the objectives, all result in phase differences applied to the plane frequency image. These phase differences must be corrected in order to obtain a good quality image.

According to a particular variant of the invention, this corrected is carried out by multiplying each plane frequency image by a correction function taking into account the various parameters determined above. The calculation of such a function is described in 7.16. and the multiplication operation is carried out for example in step 2 of the algorithm described in 7.17. If an objective exhibiting spherical aberration is used, the calculation described in 7.16. must be modified as indicated in 7.20.

3.21. Regular sampling

When two microscope objectives are used, the sampling interval on the plane frequency image generated from one of the receiving surfaces can be taken as the basis for the sampling interval of the three-dimensional representation of the object along two corresponding axes. If no precaution is taken:

The image points of the illuminating waves on this plane frequency image do not correspond to integer values of the coordinates in pixels.
If two objectives are used, the sampling interval and the axes on the plane frequency image generated from a receiving surface associated with the objective located opposite do not correspond to the sampling interval and to the axes of the three-dimensional representation of the object.

The result of this is that the sampling of the three-dimensional representation of the object is not regular. According to one variant of the invention, this sampling is made regular along two axes corresponding to the axes of the plane frequency representations. The quality of the three-dimensional representation of the object is then clearly improved.

The plane frequency image can be modified in particular, due to imperfections in the optical system, by rotation or by similitude transformation. To obtain a regular sampling, it is necessary to cancel or compensate for these imperfections.

Further, in Embodiment 4, there must be a point to point correspondence between the different SLMs used and the CCDs. To obtain these correspondences, adjustments of the same type are needed.

According to a variant of the invention, the microscope consequently comprises one or more optical devices allowing a rotation adjustment of the images generated in the frequency planes and/or one or more devices allowing adjustment by magnifying the images generated in the frequency planes.

3.21.1. Adjustment of representation scale (homothetic transformation)

This adjustment is in fact a magnification adjustment. According to a variant of the invention, the magnification of an image is adjusted by means of an optical system with a variable focal length. Such a system may, for example, be composed of two lenses, a variation in the distance between said lens resulting in a variation in the overall focal length. Such a device is used in Embodiments 4 and 5 and is described in 8.1.4.1.

3.21.2. Image rotation adjustment

According to a variant of the invention, said adjustment is carried out by means of a device consisting of a first group of fixed mirrors and a second group of mirrors, complying with the following conditions:

the first group of mirrors symmetrizes the wave vector of the incident beam in relation to a given axis.
the second group of mirrors symmetrizes the wave vector of the incident beam in relation to a second axis.
the second group of mirrors is mobile in rotation around an axis orthogonal to the plane of these two axes.

Both groups of mirrors then have the effect of imparting a rotation to the beam represented in a frequency plane, the angle of rotation being twice the angle between the two axes of symmetry. Such a device is used in Embodiments 4 and 5 and is described in 8.1.4.2.

3.22. Phase shift system

The phase shift system used can be a piezoelectric mirror, constituting the most usual solution. However, used at high speed, such a mirror generates vibrations. According to an advantageous variant of the invention, the phase shift system used is a birefringent blade inducing a phase shift of 120 degrees between its neutral axes, preceded by a polarization rotator allowing the orientation of the electric field vector of the beam along one or the other of said neutral axes, and followed by a second polarization rotator for bringing the polarization direction of the beam at the output of the device back to its direction at the input of the device. As this system allows only a phase shift of 120 degrees, it is necessary to combine two in series to obtain a phase shift of −120, 0, or +120 degrees.

3.23. Data processine method in the case of a limited RAM

Three-dimensional frequency representation calculations involve large quantities of data. As these data are normally accessed in a random order, they cannot be stored during calculations on a sequential-access medium such as a hard disk and must be stored on a random-access medium such as an internal computer memory (RAM).

According to an advantageous variant of the invention, adapted to the case in which the system does not have sufficient RAM to allow storage of all the data, the calculation algorithm is modified so as to process the data block by block, a block corresponding to a large amount of data which can then be stored sequentially on a sequential-access medium and loaded into central memory only during the processing time of said block. For this purpose:

The modified algorithm carries out, within a three-dimensional space, processing operations horizontal plane by horizontal plane, each horizontal plane being stored on the sequential-access medium in a single block.

In order to be able to also carry out processing along the vertical dimension, the algorithm incorporates axis exchange phases which make it possible to bring the vertical axis temporarily into a horizontal plane.

The axis exchange procedure works block by block, the blocks generally having equal or similar dimensions along the two axes to be exchanged and having as byte size the maximum size that can be stored in the central memory of the system (random-access memory—RAM).

This method is implemented in Embodiment 1 and described in paragraph 5.21.

3.24. Images venerated by the microscope

The three-dimensional representations generated by the present microscope can be stored and transmitted in the form of a three-dimensional array of complex numbers. According to one variant of the invention, it is possible to generate two-dimensional projections or sections representing either the refractive index or absorptivity in the object.

In the case of a projection, one generates a projection of the three-dimensional image on a projection plane and along a projection direction orthogonal to the projection plane. Each of the projection plane is obtained from all the values of the three-dimensional spatial representation which is located on a line passing through this point and directed along the projection direction.

According to a variant of the invention, the value associated with each point of the projection plane is obtained by extracting the maximum value of the real or imaginary part or the module from the points of the three-dimensional spatial representation located on the corresponding line.

According to a variant of the invention, the value associated with each point of the projection plane is obtained by integrating the complex value of the points of the three-dimensional spatial representation located on the corresponding line. It is then possible to display either the real part or the imaginary part of the projection thus obtained. According to this variant of the invention, the projection can be obtained more rapidly as follows, in two steps:

step 1: extraction, in frequency representation, of a plane passing through the origin and orthogonal to the projection direction.

step 2: inverse Fourier transformation of this plane.

The two-dimensional array thus obtained constitutes a projection along the direction having served to extract the frequency plane.

3.25. Optical element positioning system

The embodiments described require the use of many high-precision positioners. These positioners are costly elements ill suited to mass production and capable of losing their adjustment with time.

According to a variant of the invention, this problem is solved by using removable positioners during the manufacture of the microscope, each element being positioned and then fixed by a binder, for example an adhesive, and the positioner being removed after final solidification of the binder.

3.26. Shocks, vibration and dust protection system

The microscopes described consist of a set of elements fixed to an optical table. During possible transport, shocks, even minor ones, can lead to the misadjustment of the system. During prolonged use, dust may deposit on the different optical elements.

According to one variant of the invention, the greater part of the optical device is included in a hermetically closed box which is itself included in a larger box, the link between the two boxes being provided by shock absorbers placed on each side of said hermetically closed box. This system protects the microscope from shocks and from dust while providing a good suspension for the optical table.

4. BRIEF DESCRIPTION OF THE DRAWINGS

Figure 2:
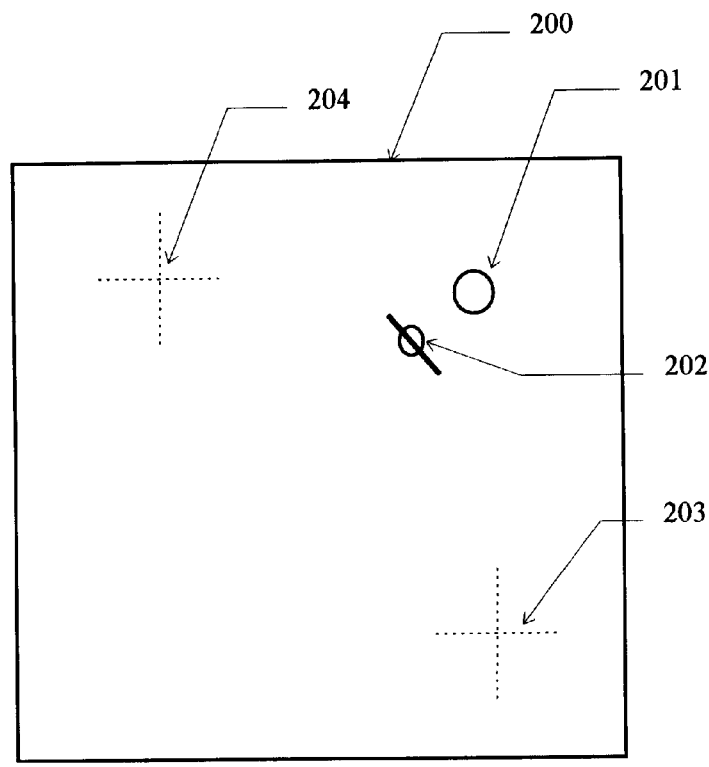
Figure 3:
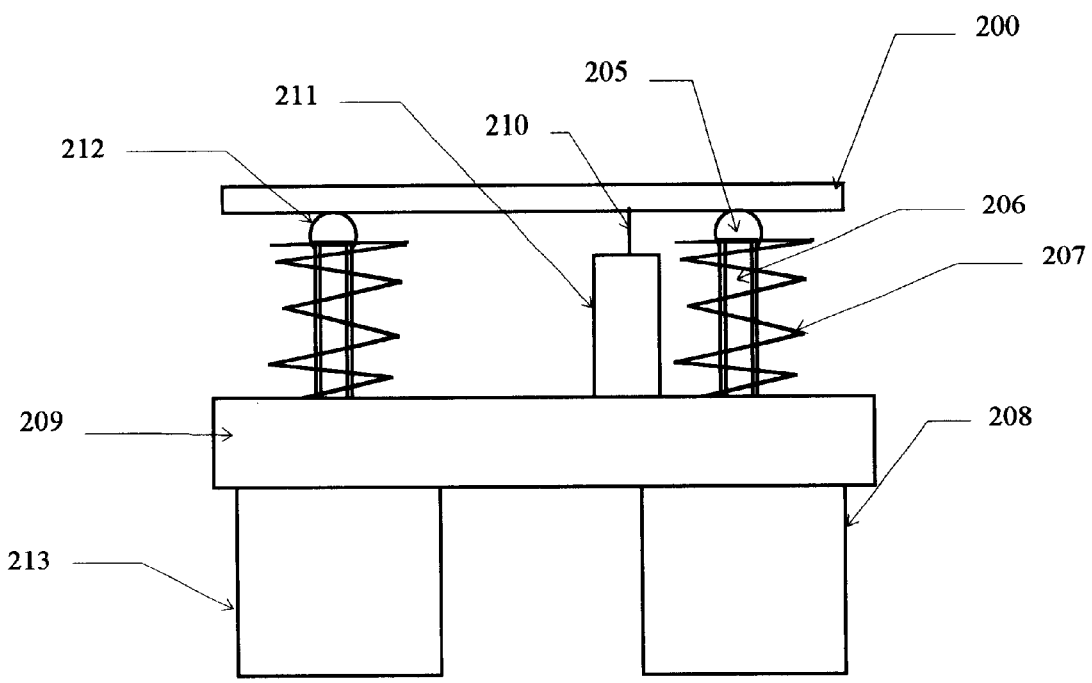
Figure 4:
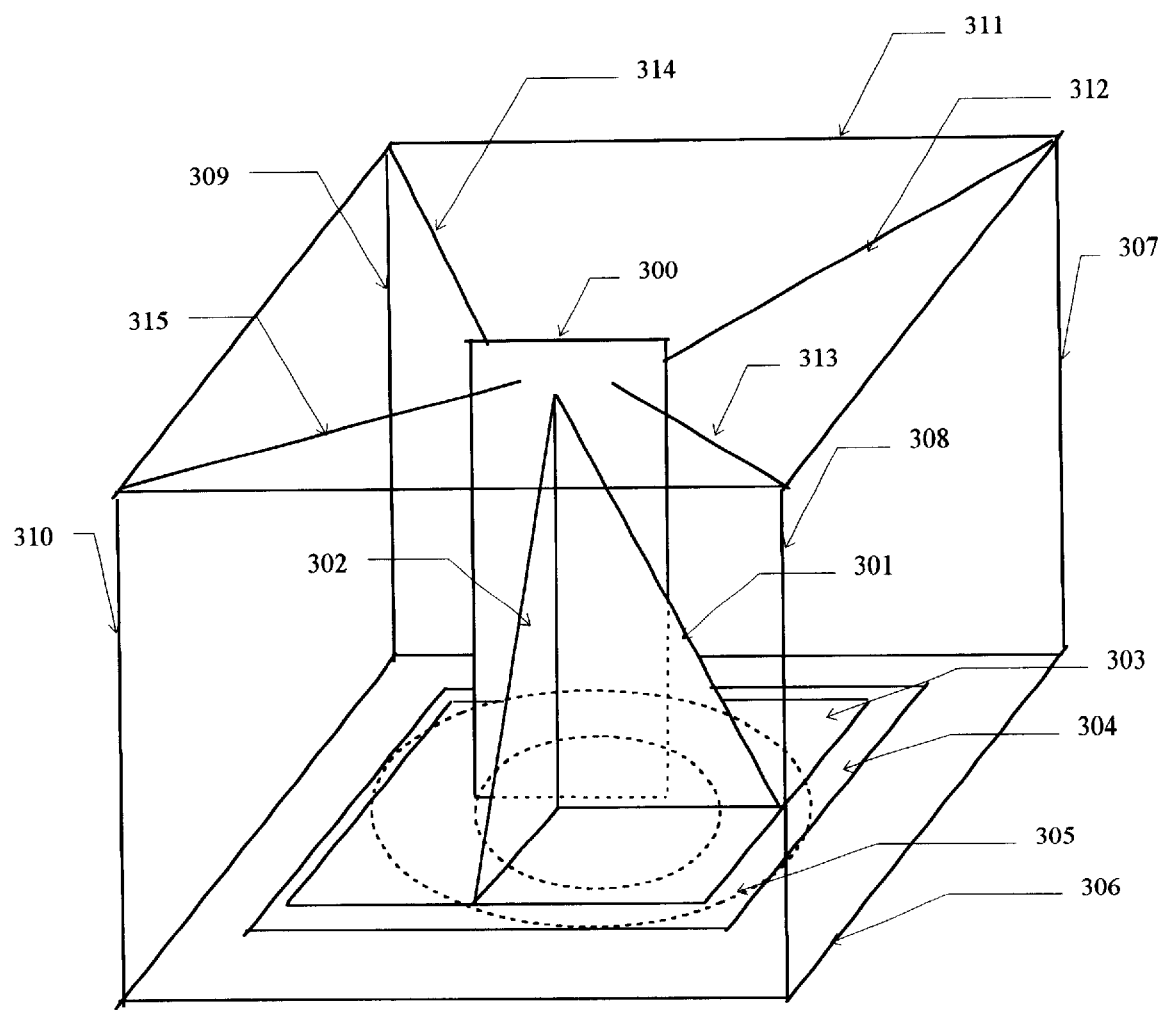
Figure 5:
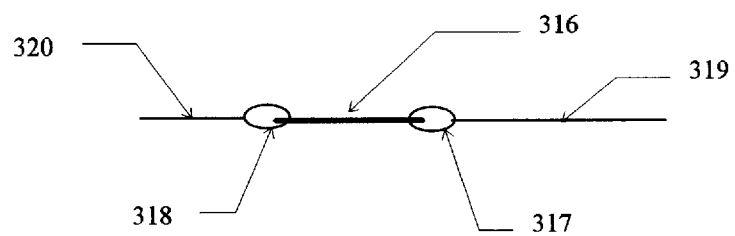
Figure 6:
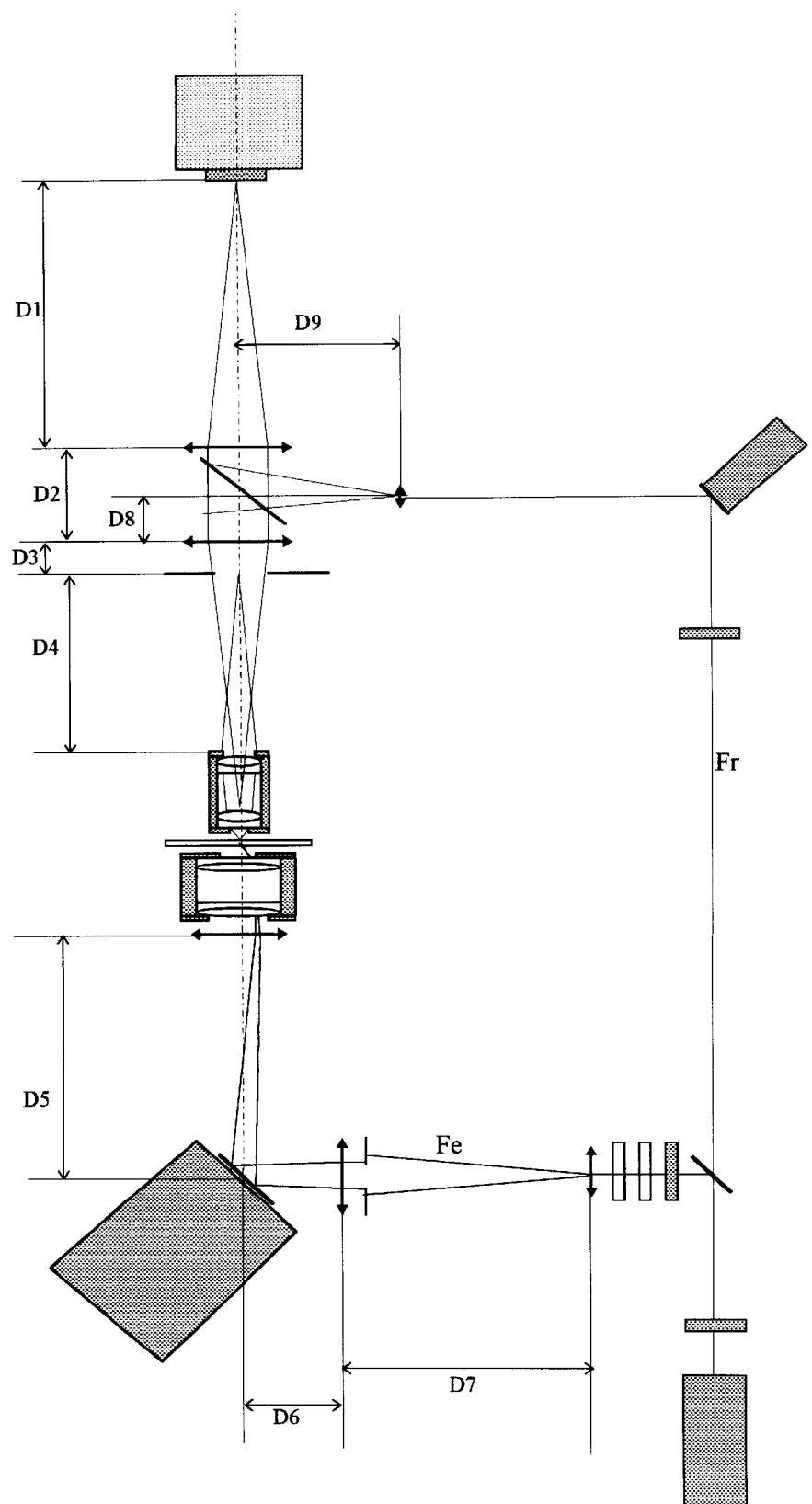
Figure 8:
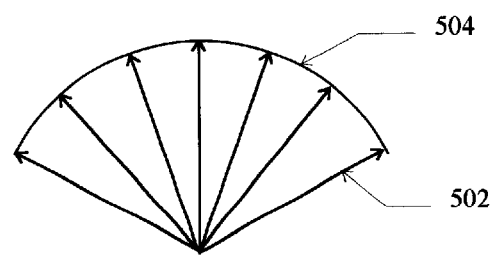
Figure 9:
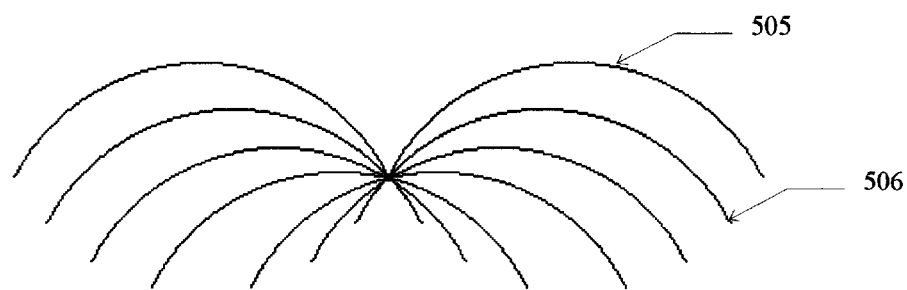
Figure 10:
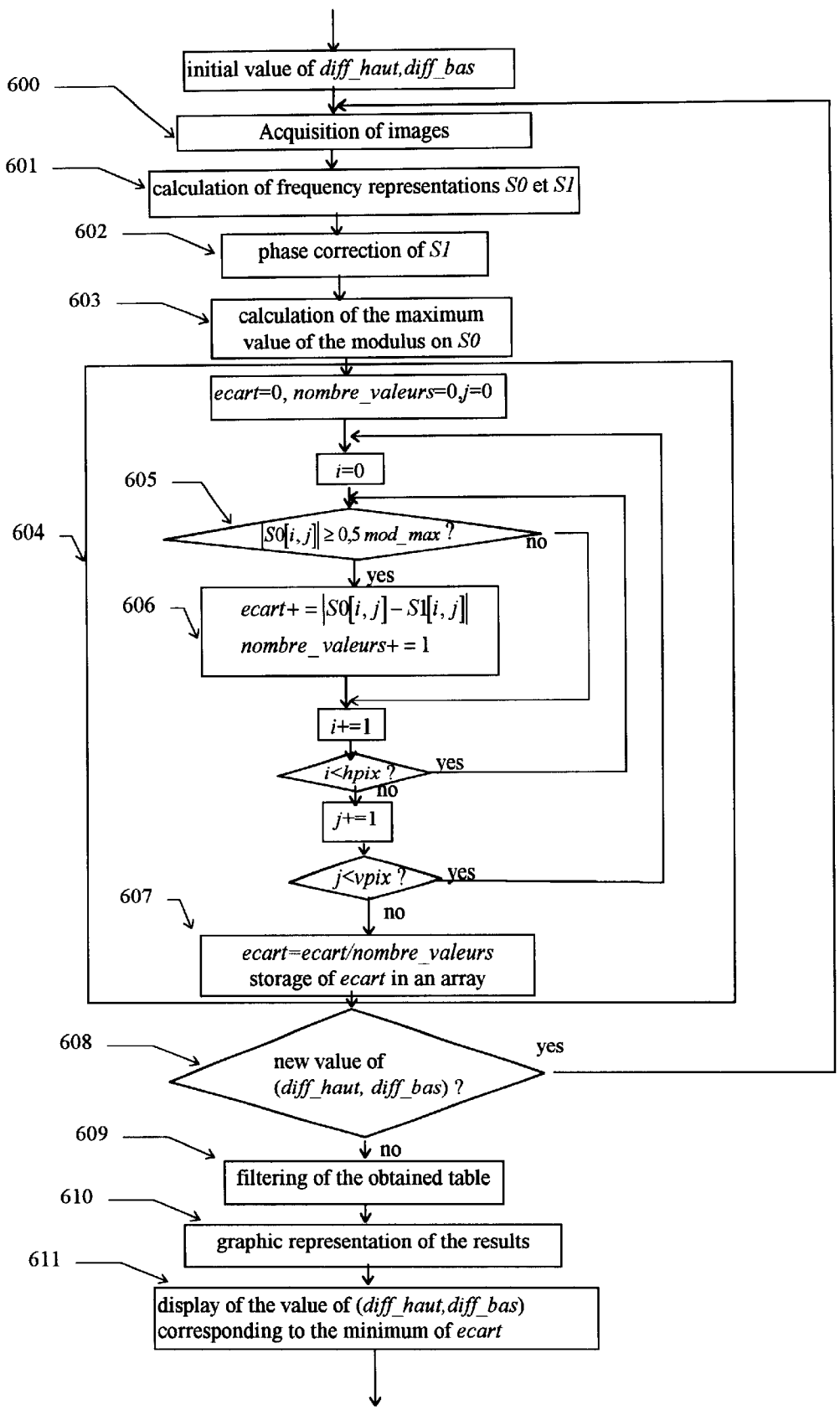
Figure 11:
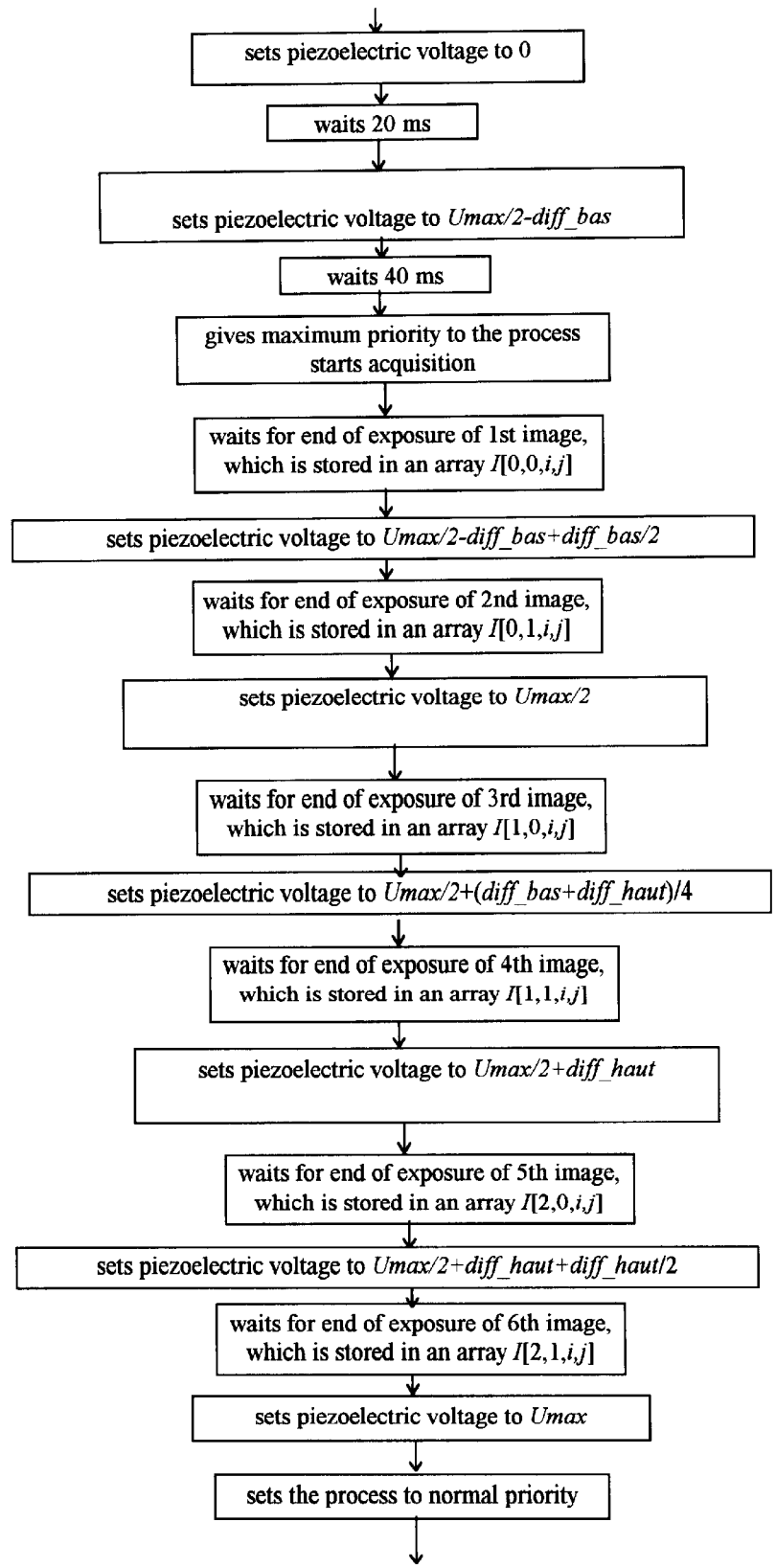
Figure 12:
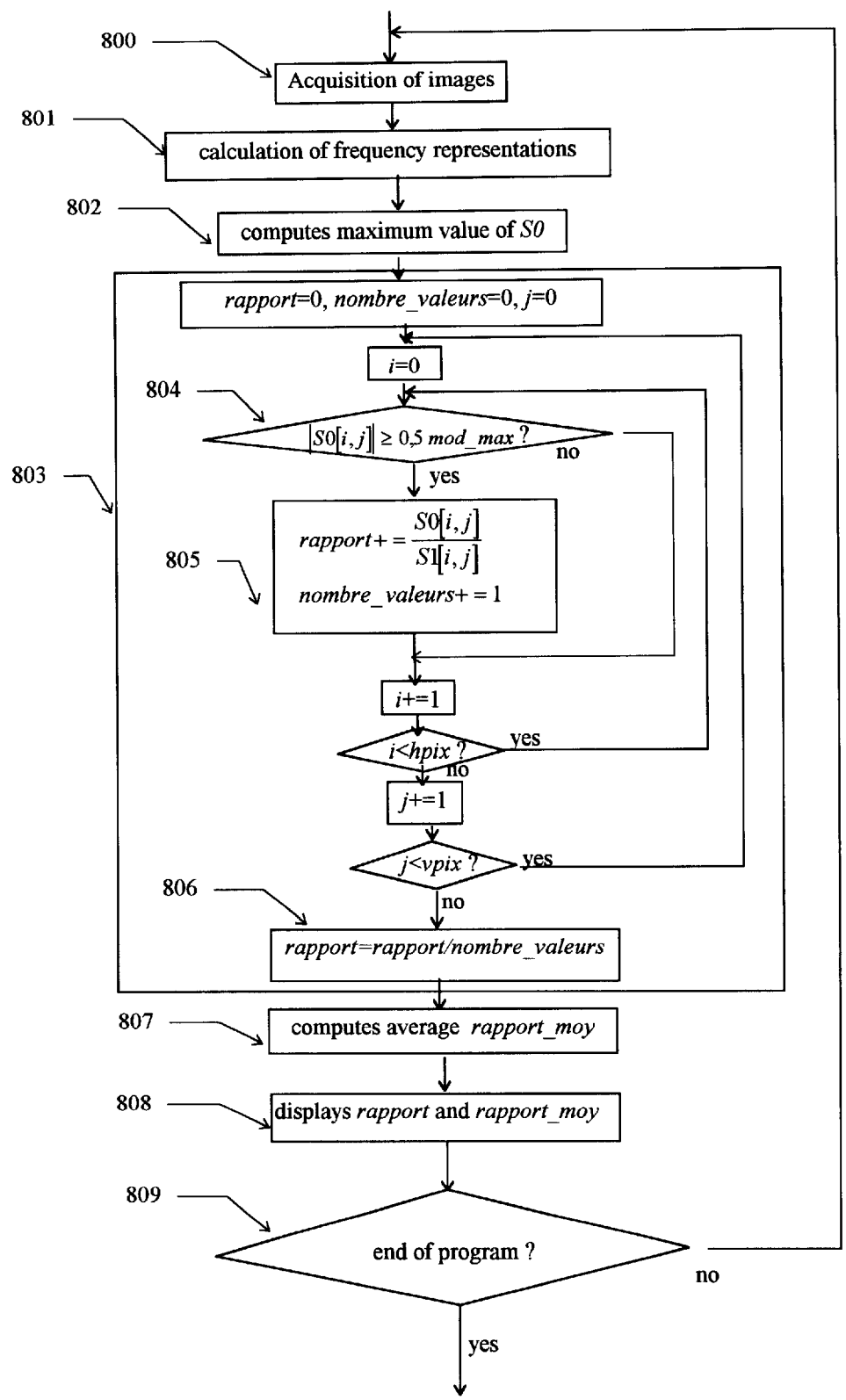
Figure 13:
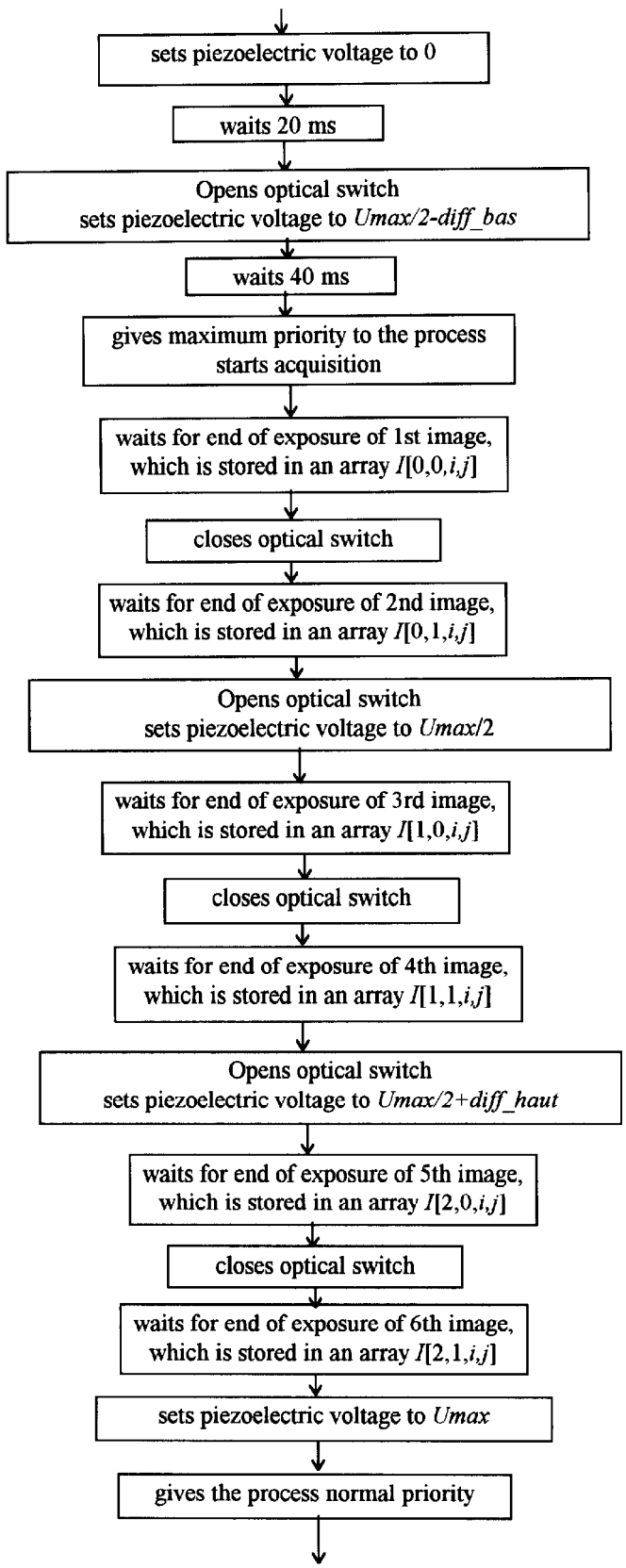
Figure 14:
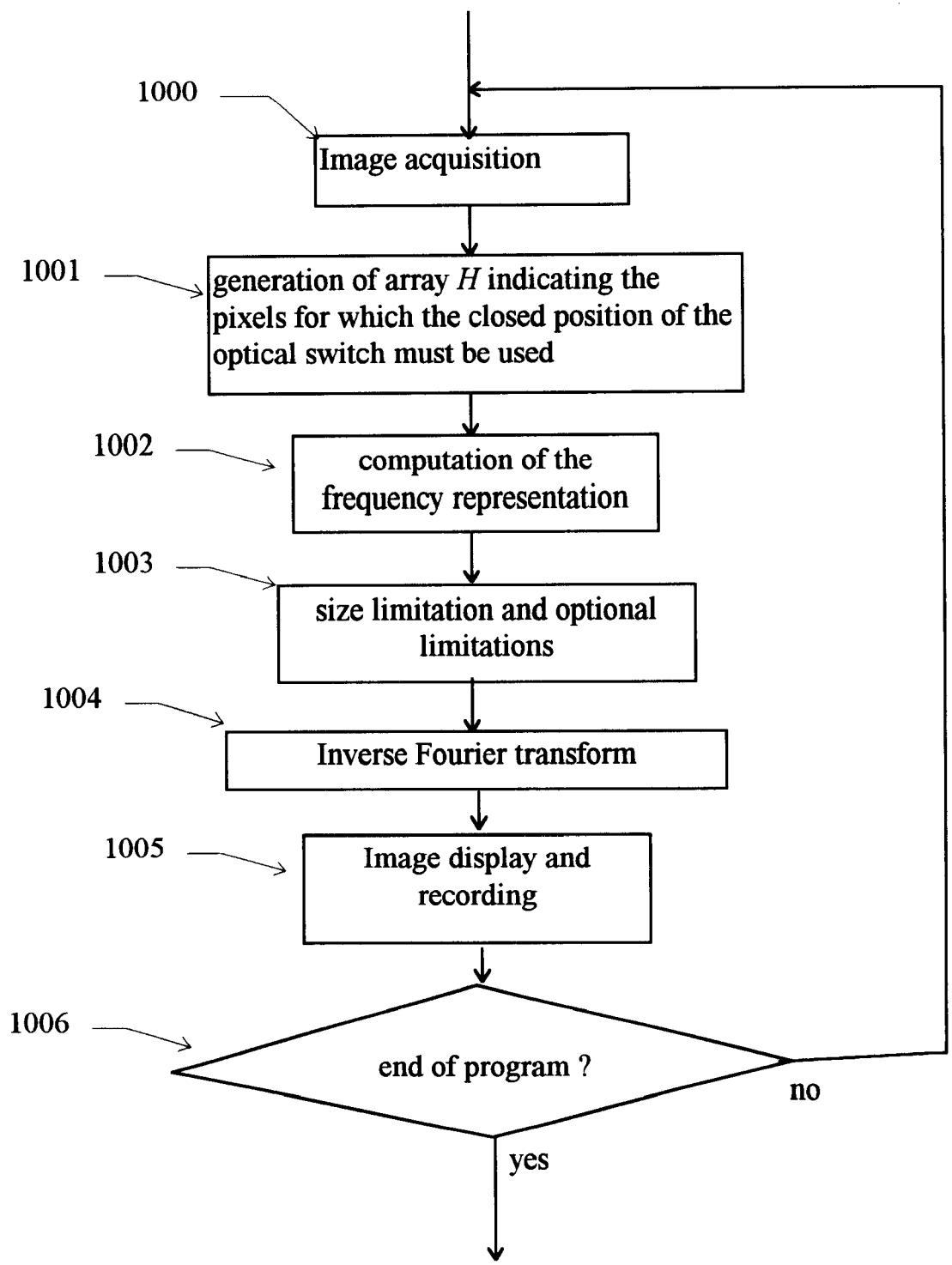
Figure 17:
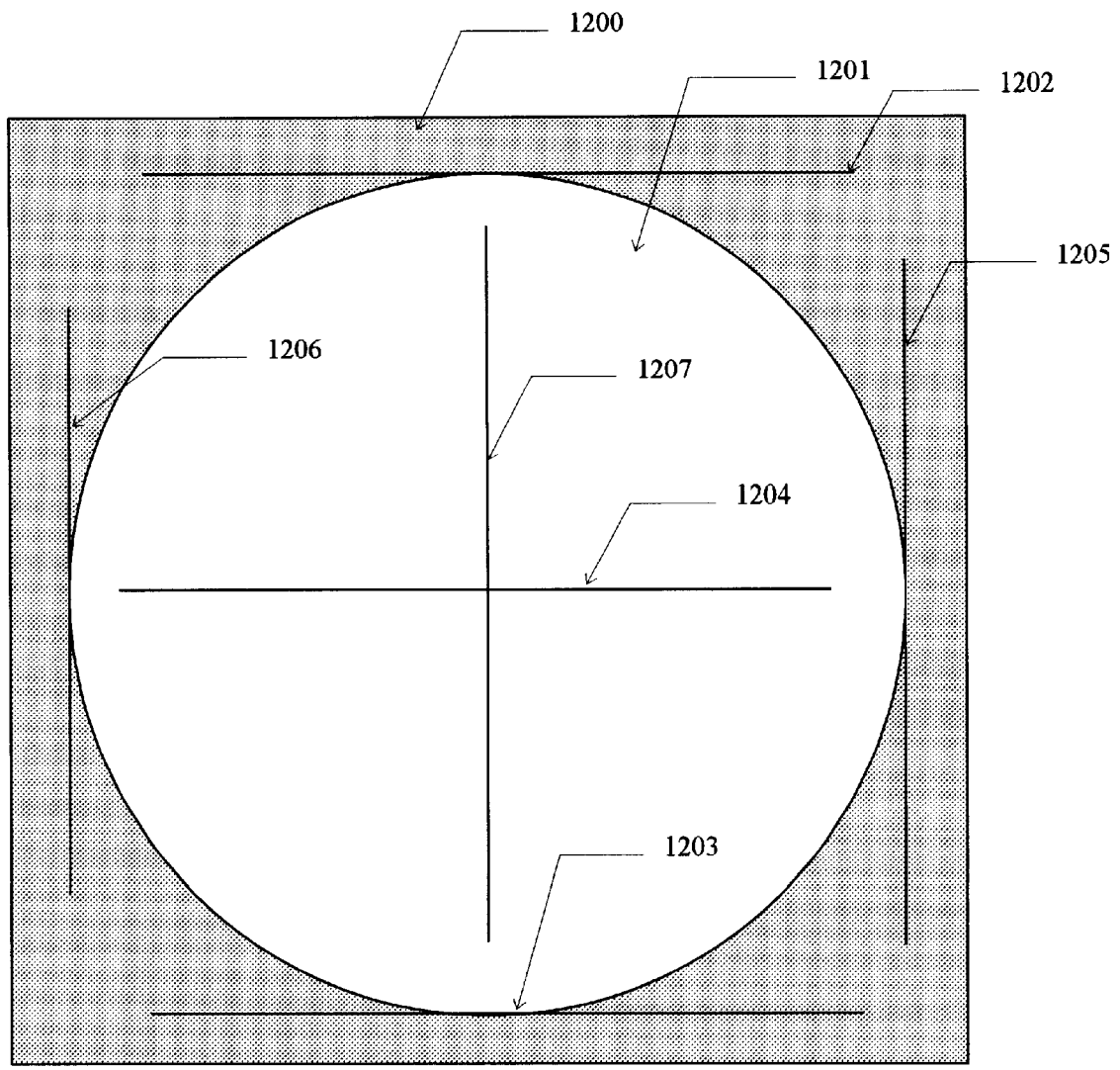
Figure 18:
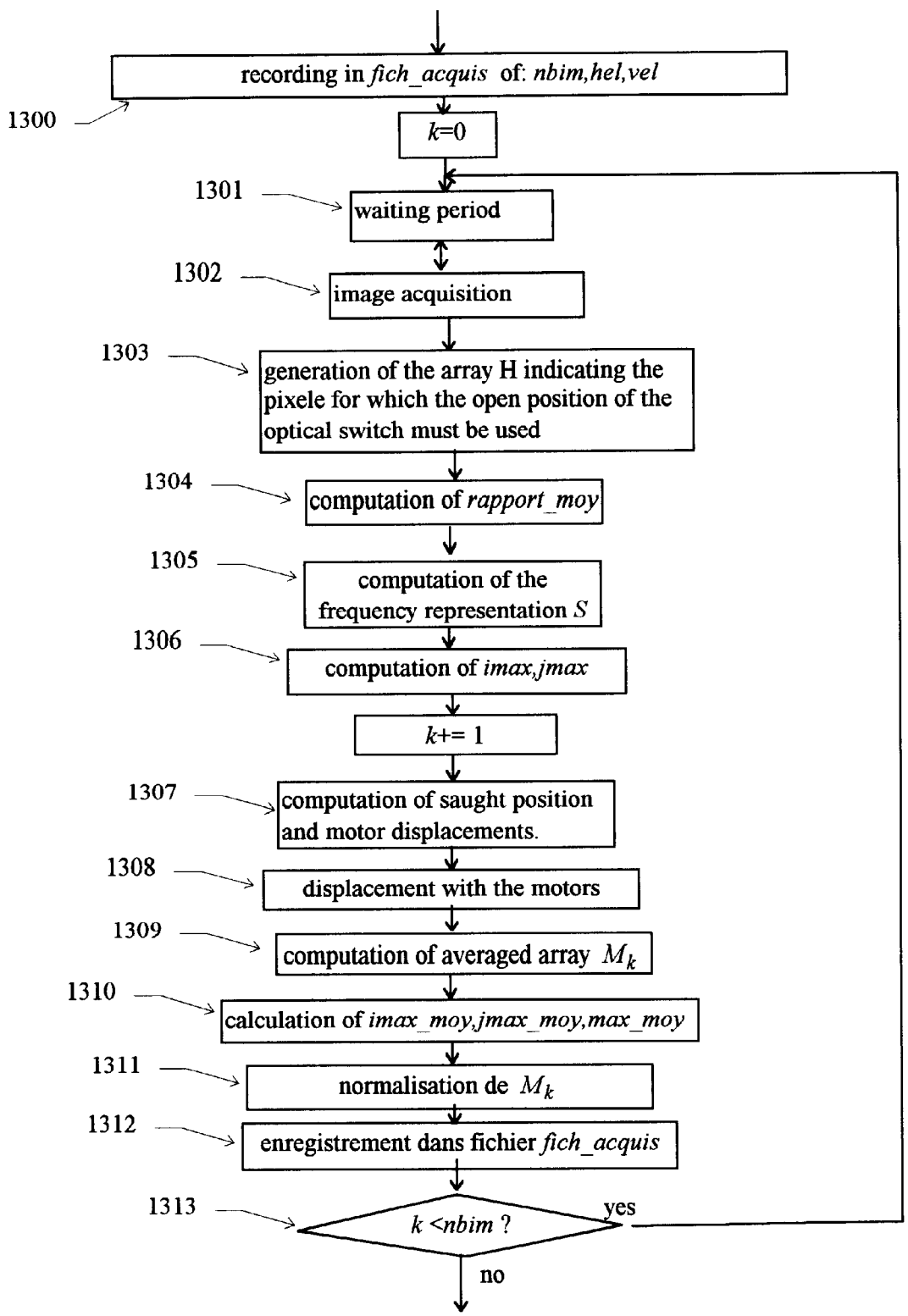
Figure 19:
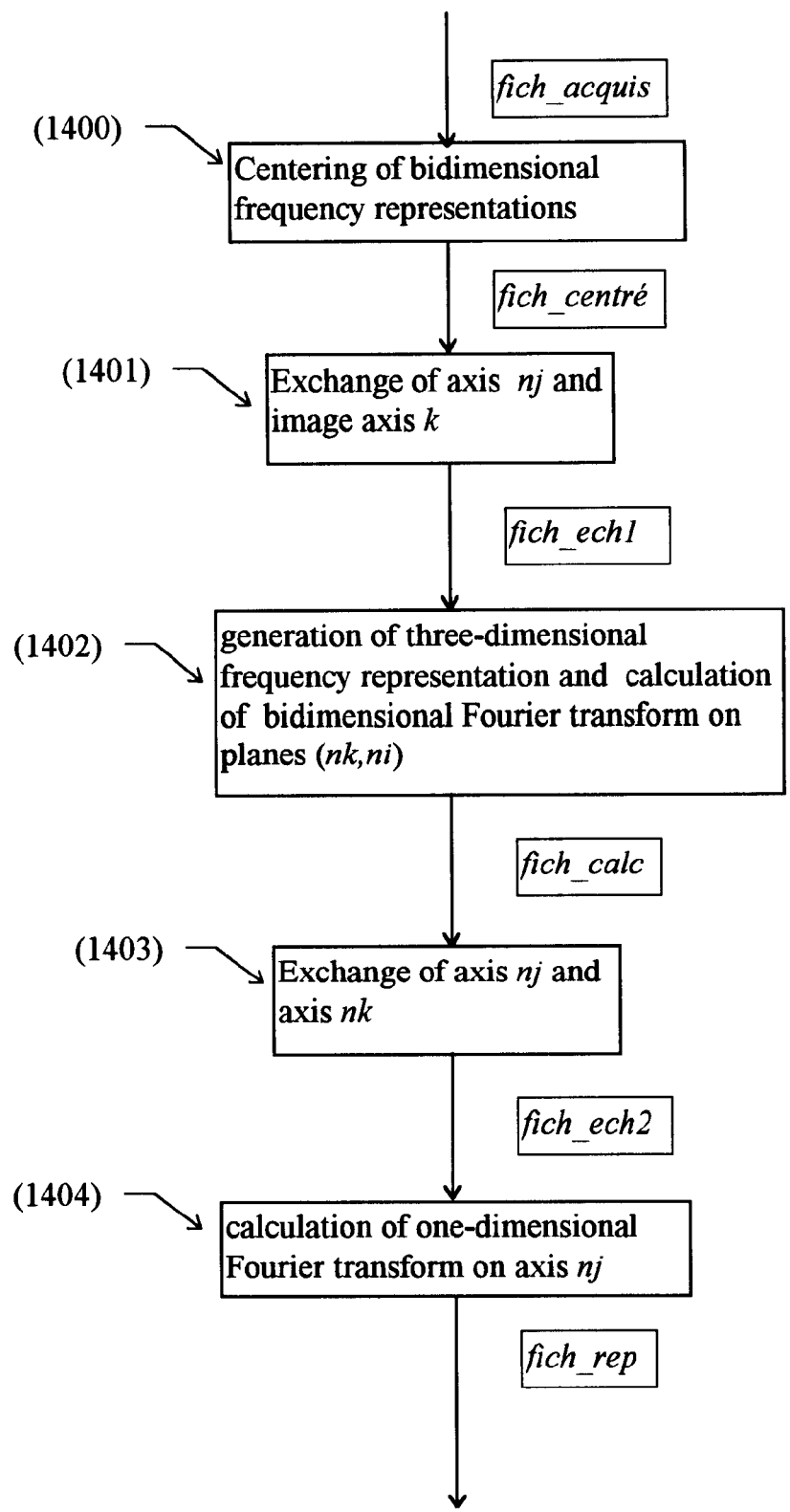
Figure 20:
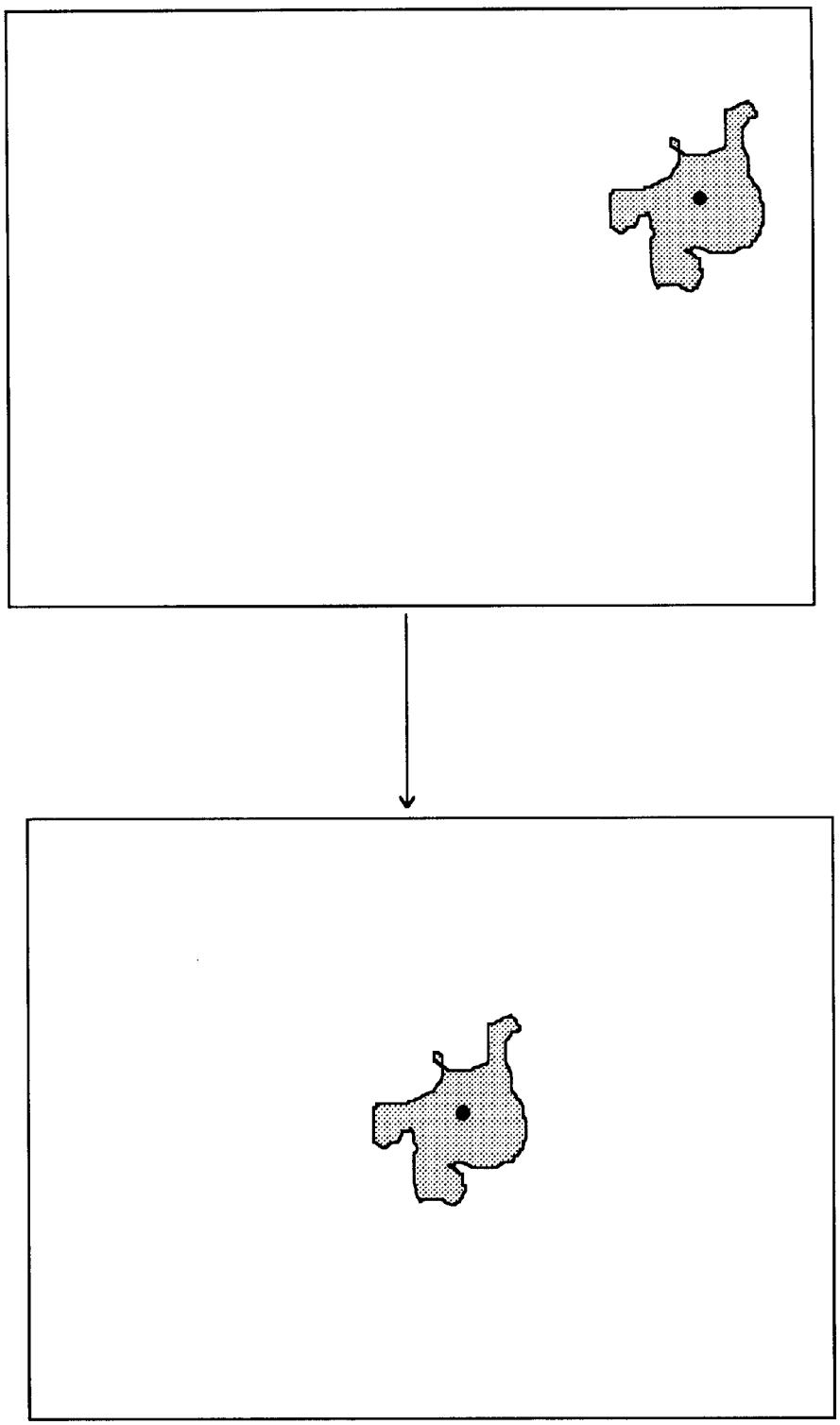
Figure 21:
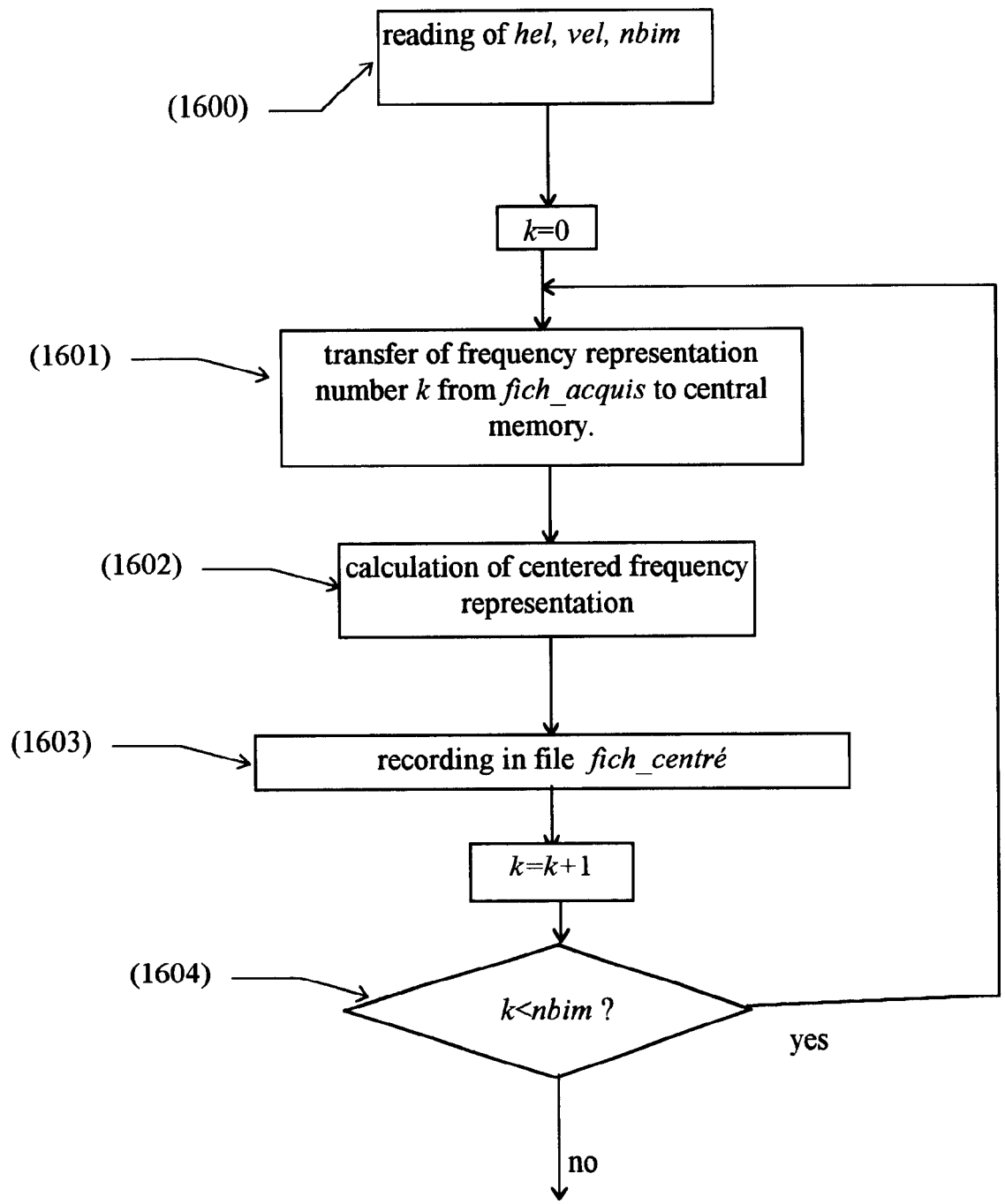
Figure 22:
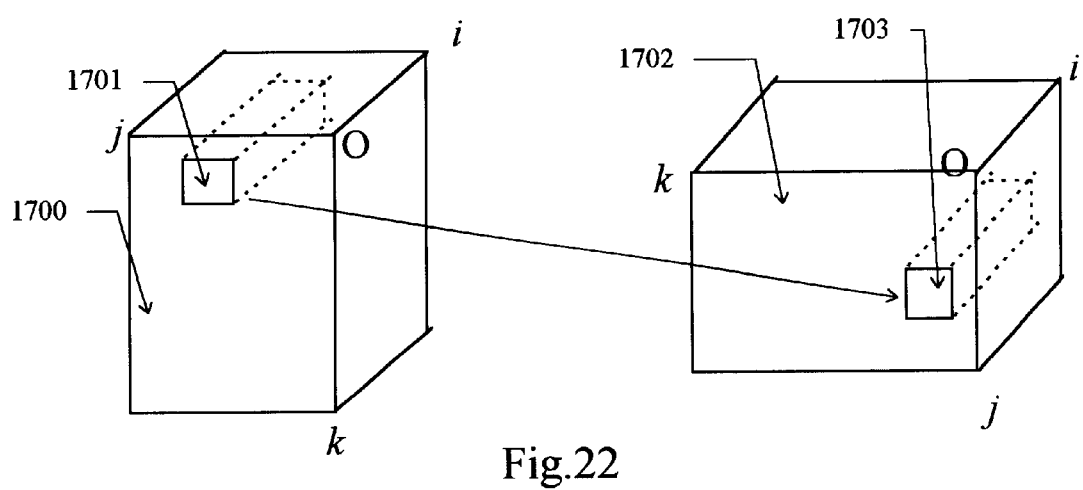
Figure 23:
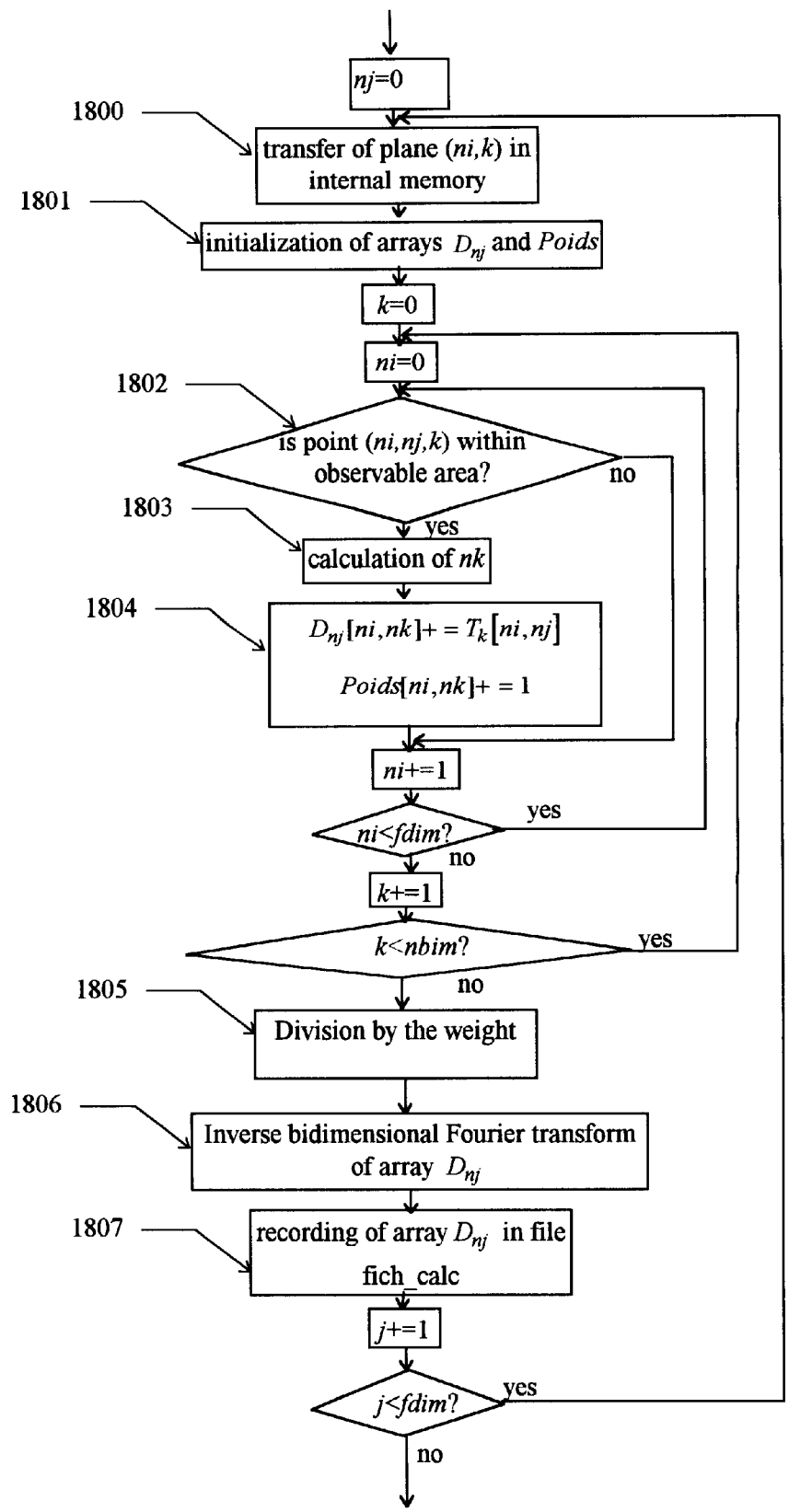
Figure 24:
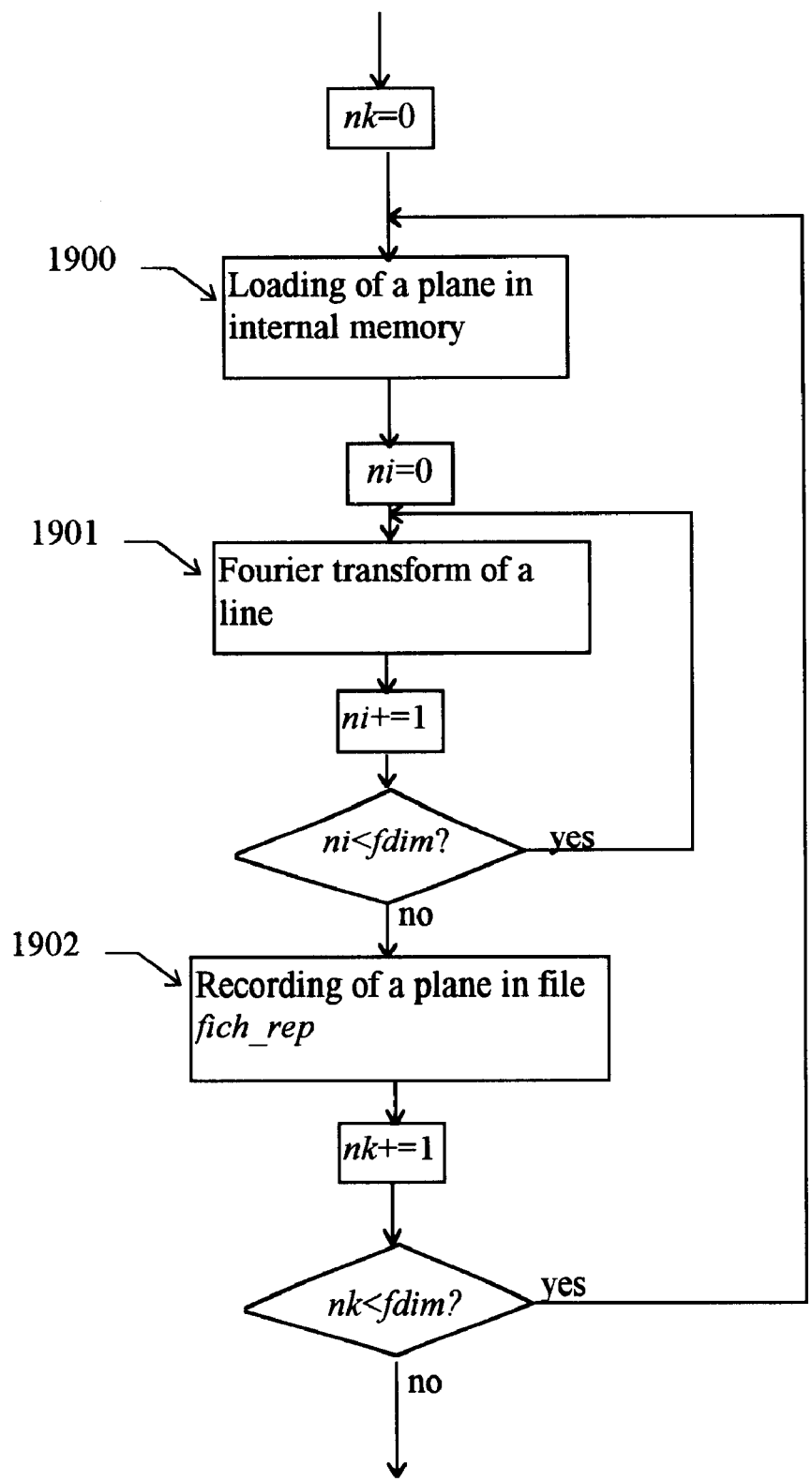

FIGS. 1 to 24 relate to a first embodiment. FIG. 1 is a general diagram of the microscope optical system. FIGS. 2 and 3 represent in detail the angular positioner (110) already represented in FIG. 1. FIG. 4 is a general diagram of the vertical mechanical and anti-vibration support of the microscope. FIG. 5 represents in detail a tensioner of FIG. 4. FIG. 6 represents a dimensioning example of the optical part. FIGS. 7 to 9 and 15 and 16 are graphic representations serving as a support for the explanation of the microscope's operating principle. FIG. 10 represents the algorithm of a program allowing the adjustment of piezoelectric control voltages (122). FIG. 11 represents the detailed algorithm of an imaging procedure used in the preceding program. FIG. 12 represents the algorithm of a program for adjusting the intensity attenuator consisting of the polarizer (105) and of the polarization rotator (104) and for obtaining its characteristics. FIG. 13 represents the detailed algorithm of a "low-level" imaging procedure used in the preceding program and in the 2D or 3D image acquisition programs. FIG. 14 represents the algorithm of a focussing program for obtaining a 2D image and focussing the microscope objective (113). FIG. 17 is a support for the explanations concerning the adjustment of the condenser. FIG. 18 represents the algorithm of the three-dimensional image acquisition program. FIG. 19 represents the algorithm of a calculation program generating, from the results of the acquisition, a three-dimensional representation of the object. FIG. 20 represents schematically an operation carried out by the first part of this program. FIG. 21 represents in detail the algorithm of this first part. FIG. 22 represents schematically an operation carried out by the second part of this program. FIG. 23 represents the algorithm of a third part of this program. FIG. 24 represents the algorithm of a last part of this program.

Figure 25:
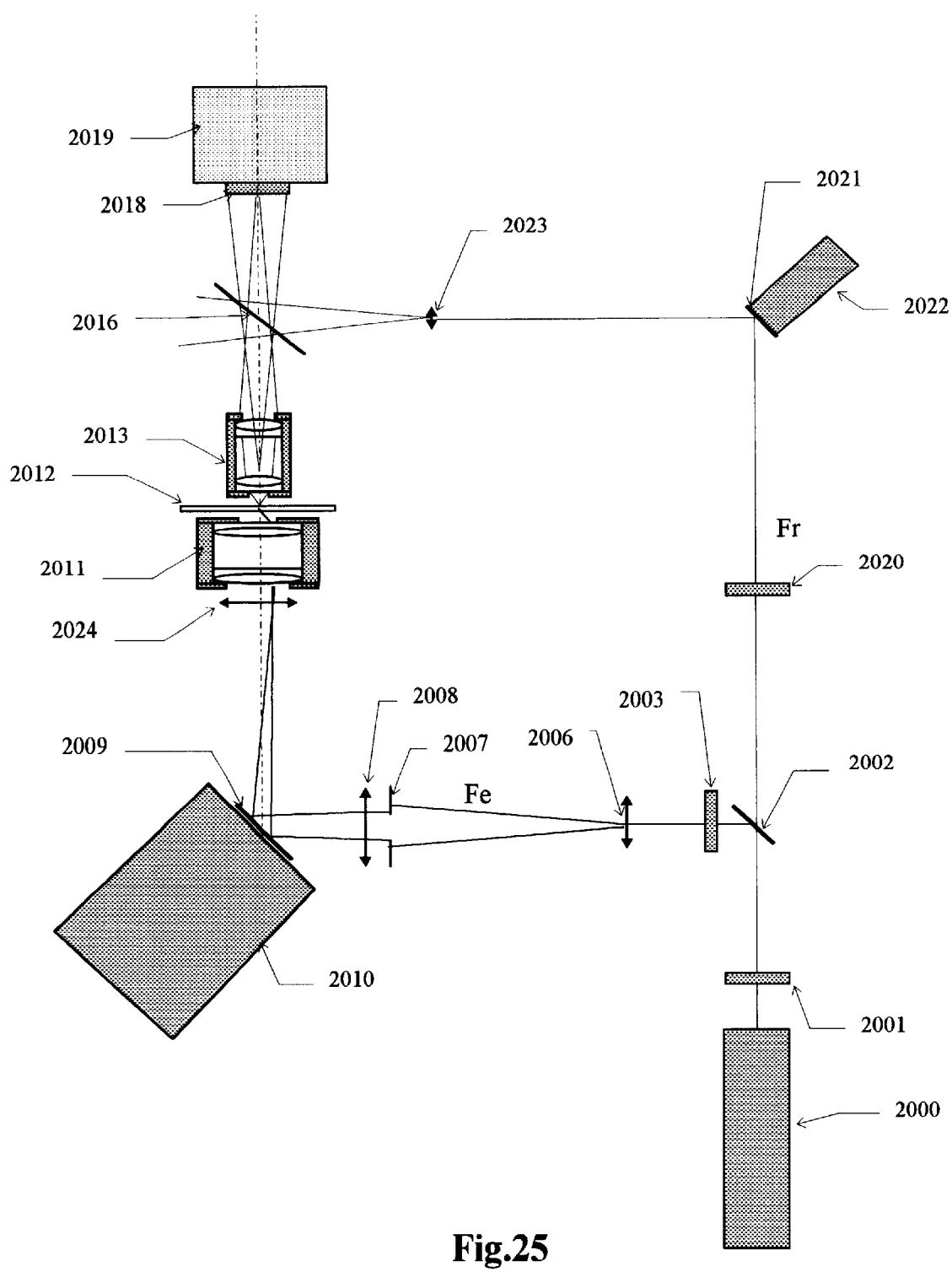
Figure 26:
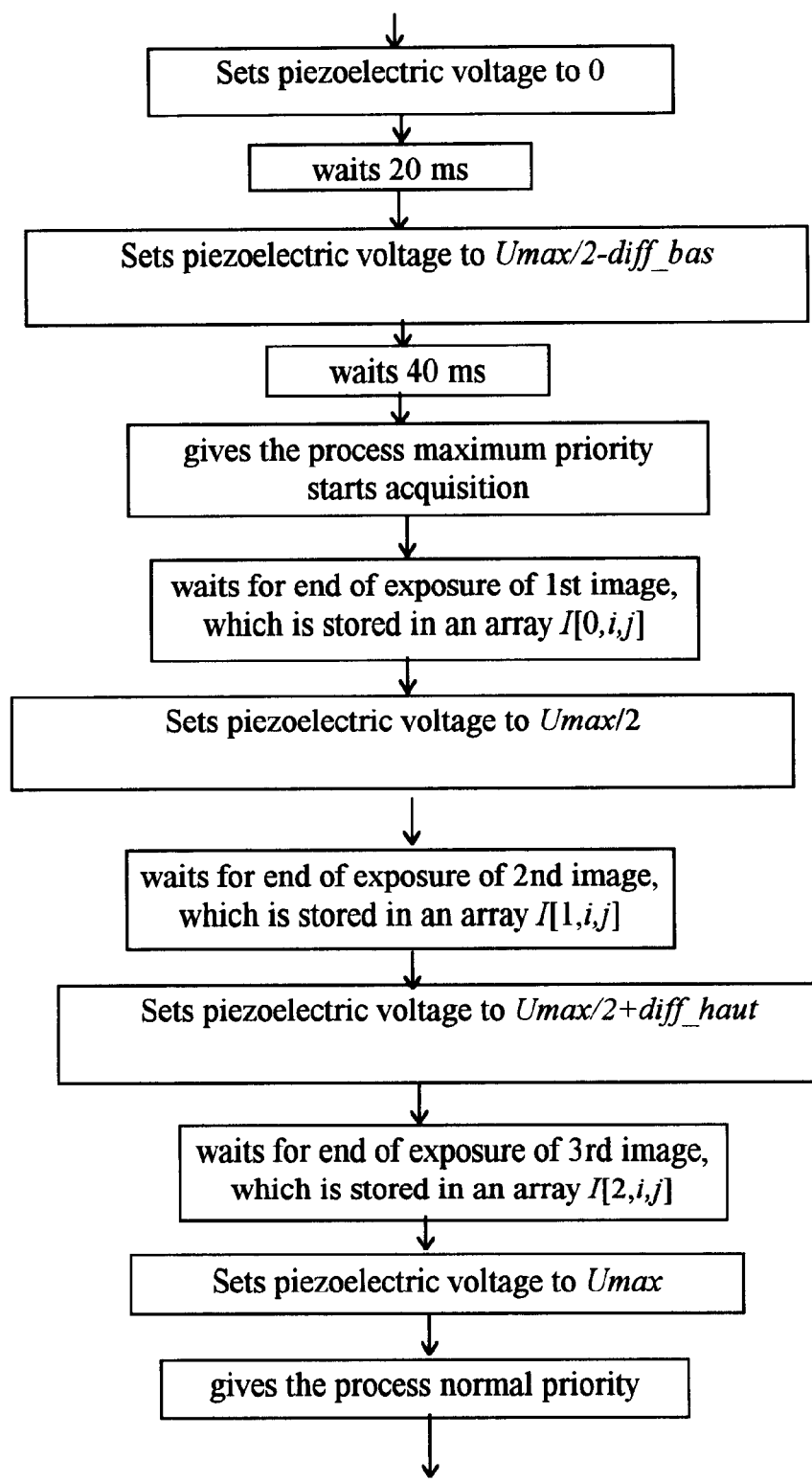

FIGS. 25 and 26 relate to a second embodiment. FIG. 25 is a general diagram of the optical part of the microscope. FIG. 26 represents the algorithm of the "low-level" image acquisition procedure used.

Figure 71:
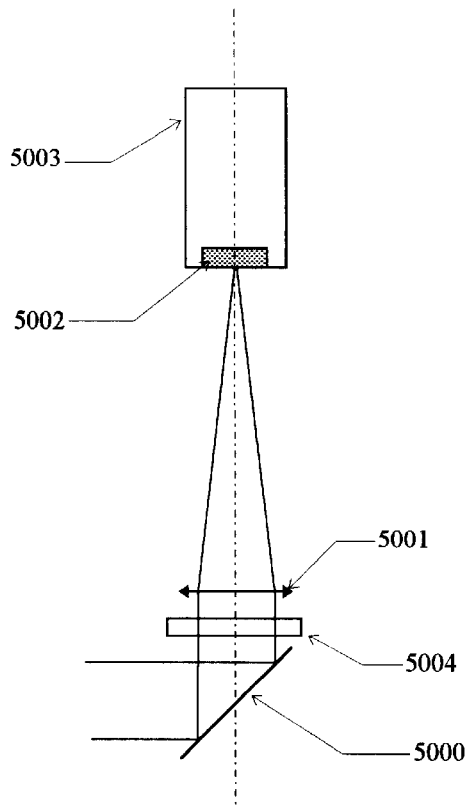

FIG. 71 illustrates a specific device used in the adjustment operations for Embodiments 3 to 5.

Figure 27:
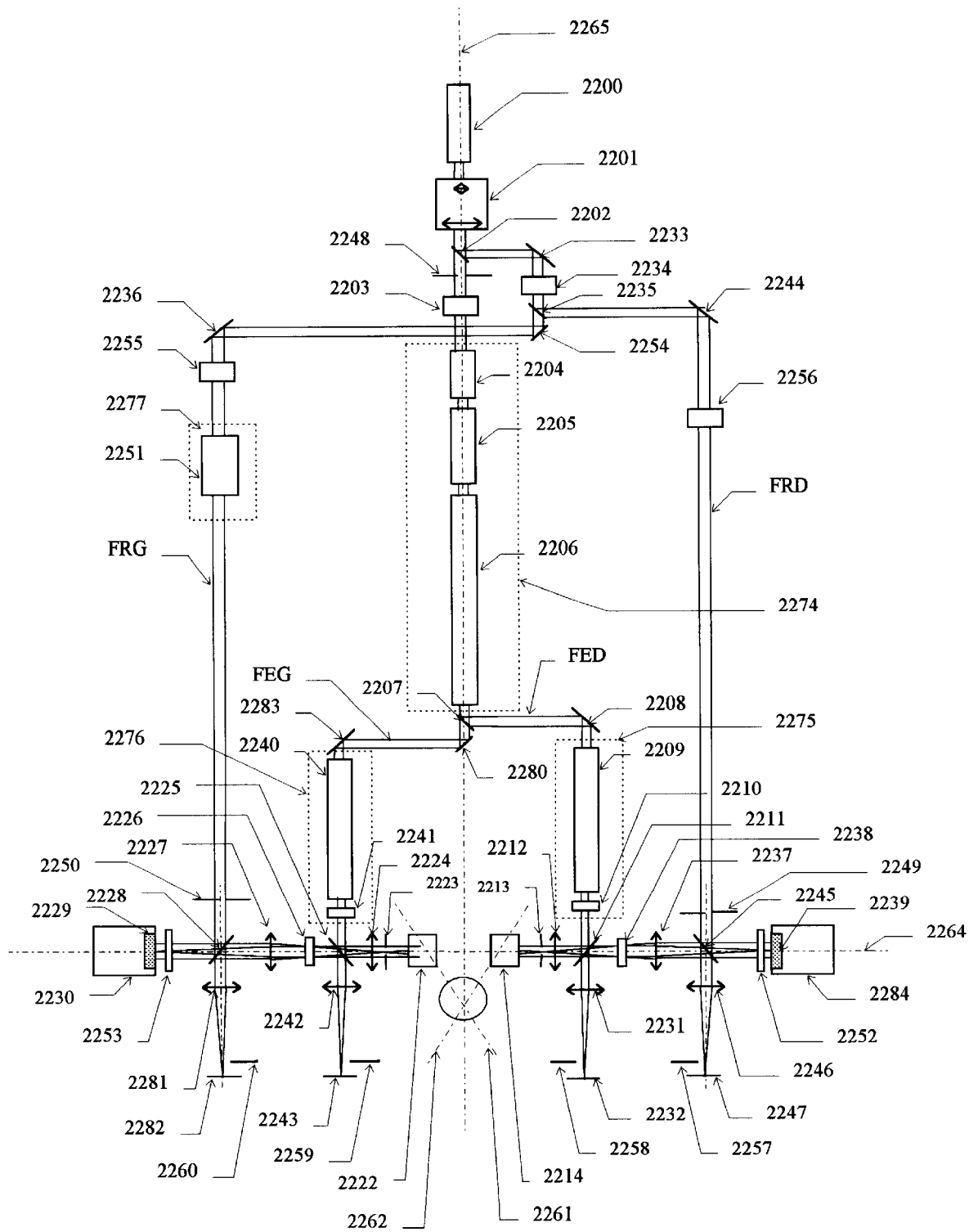
Figure 28:
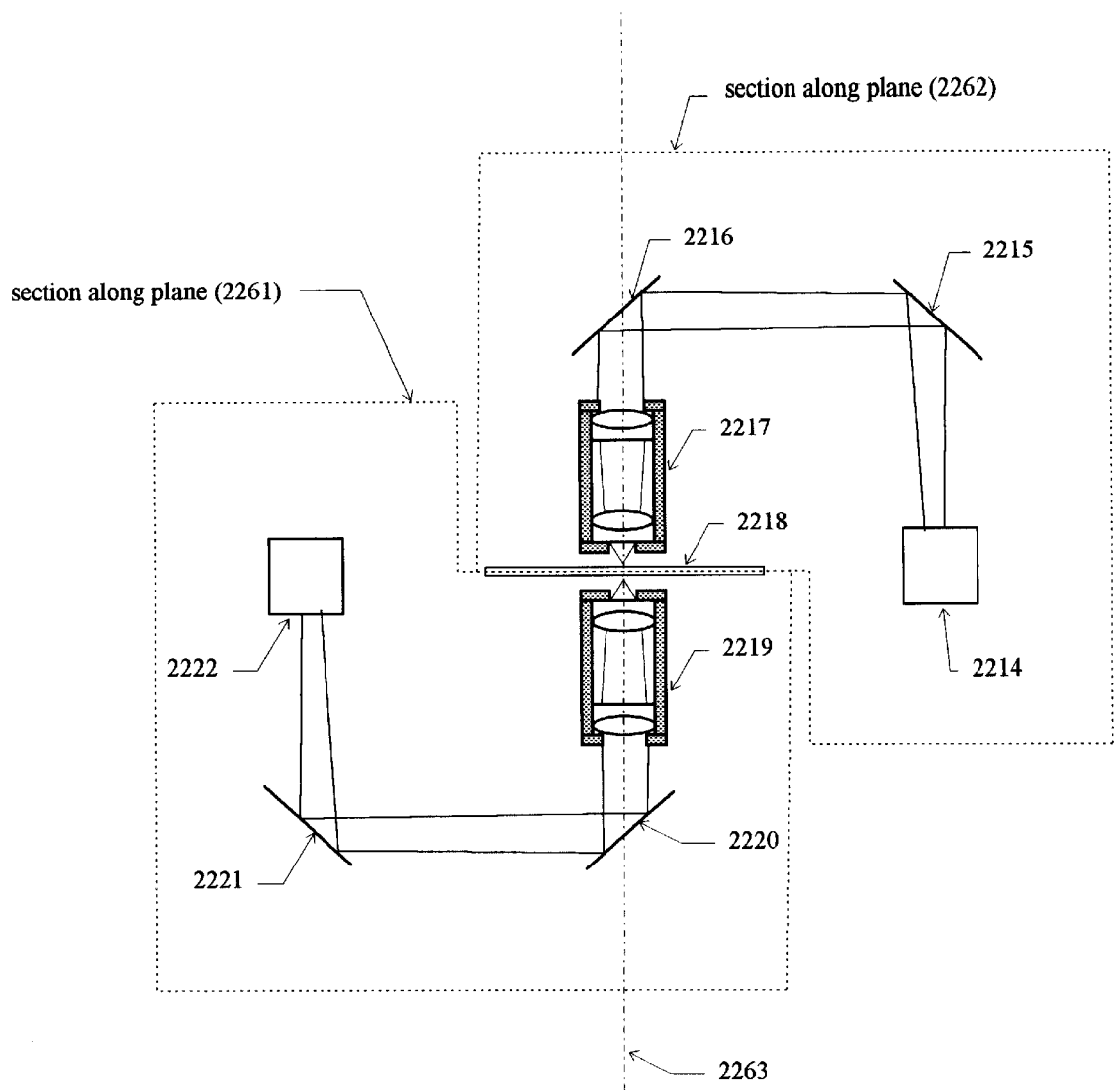
Figure 29:
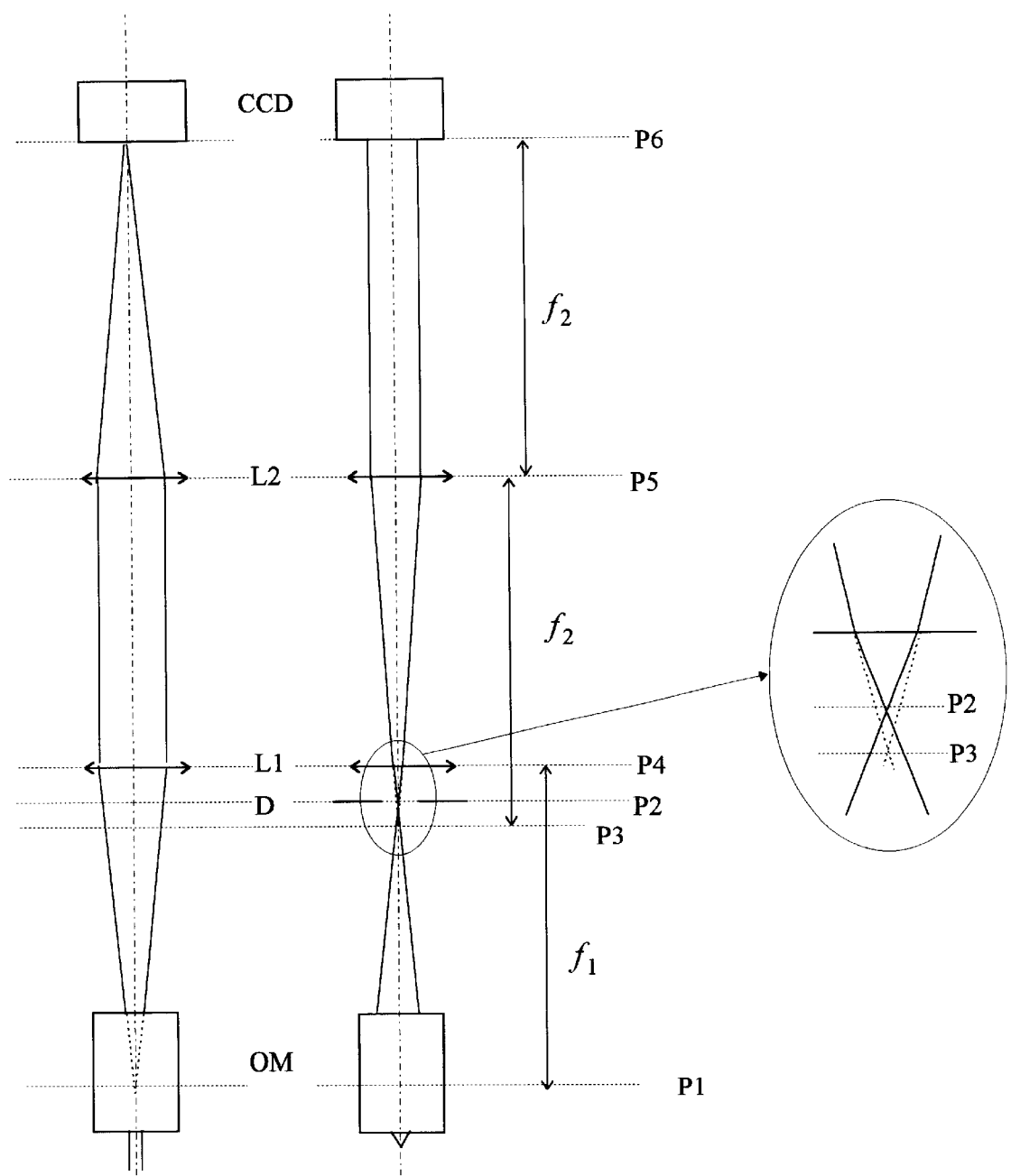
Figure 30:
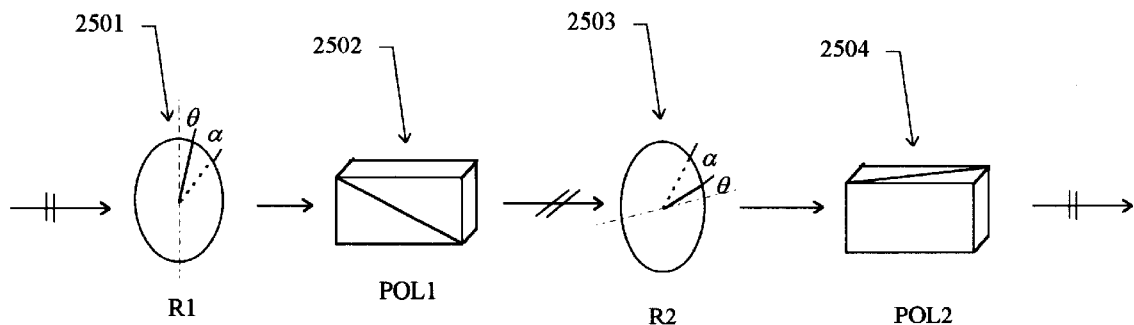
Figure 31:
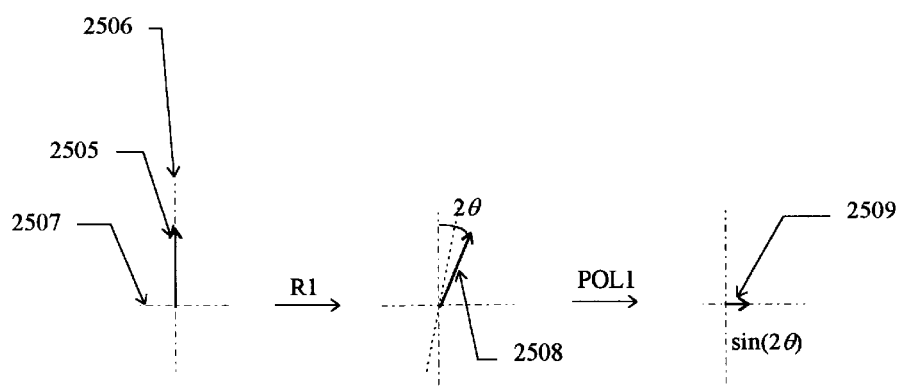
Figure 32:
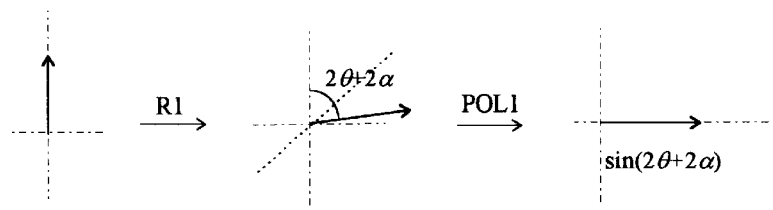
Figure 33:
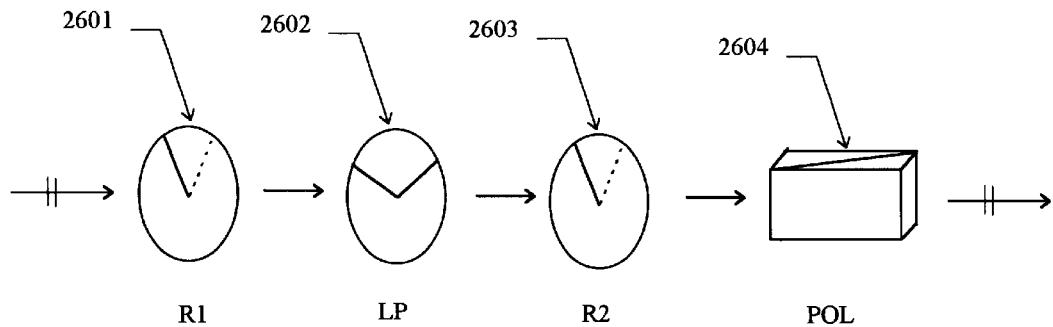
Figure 34:
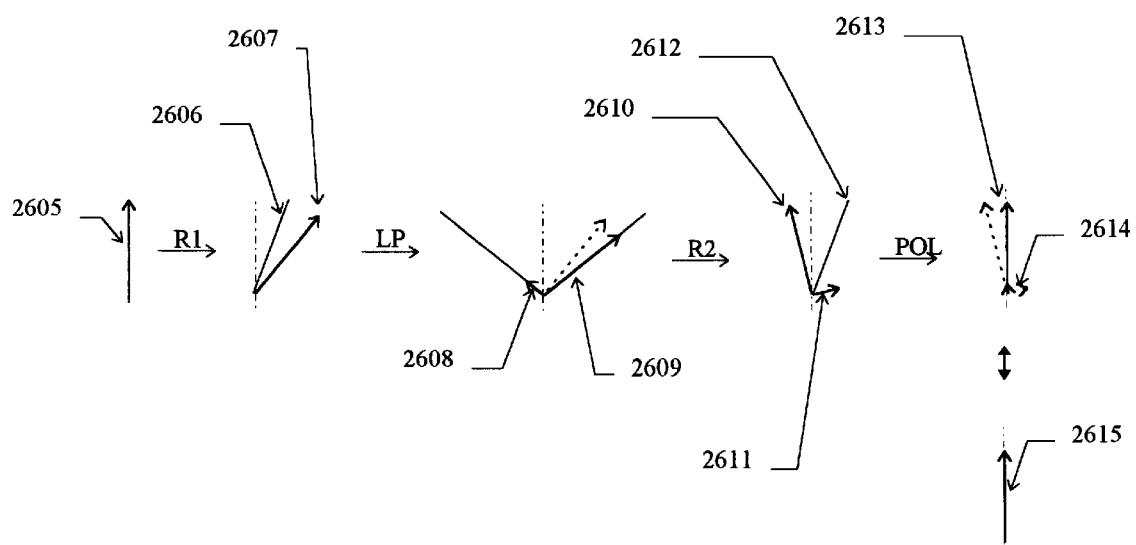
Figure 35:
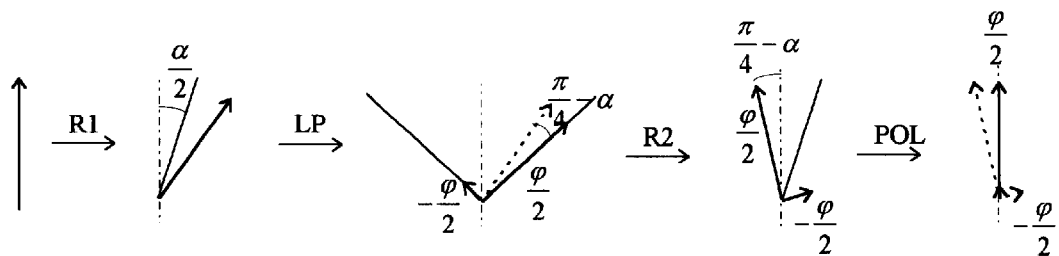
Figure 36:
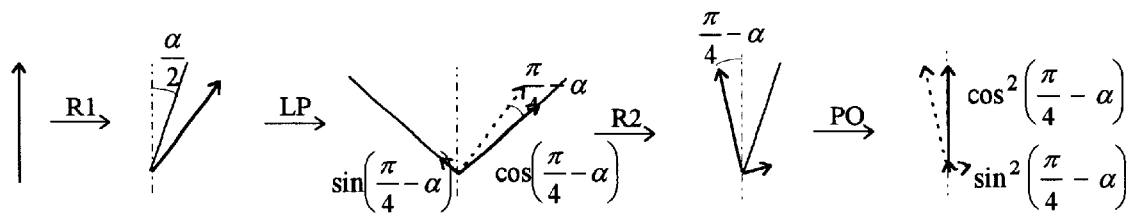
Figure 37:
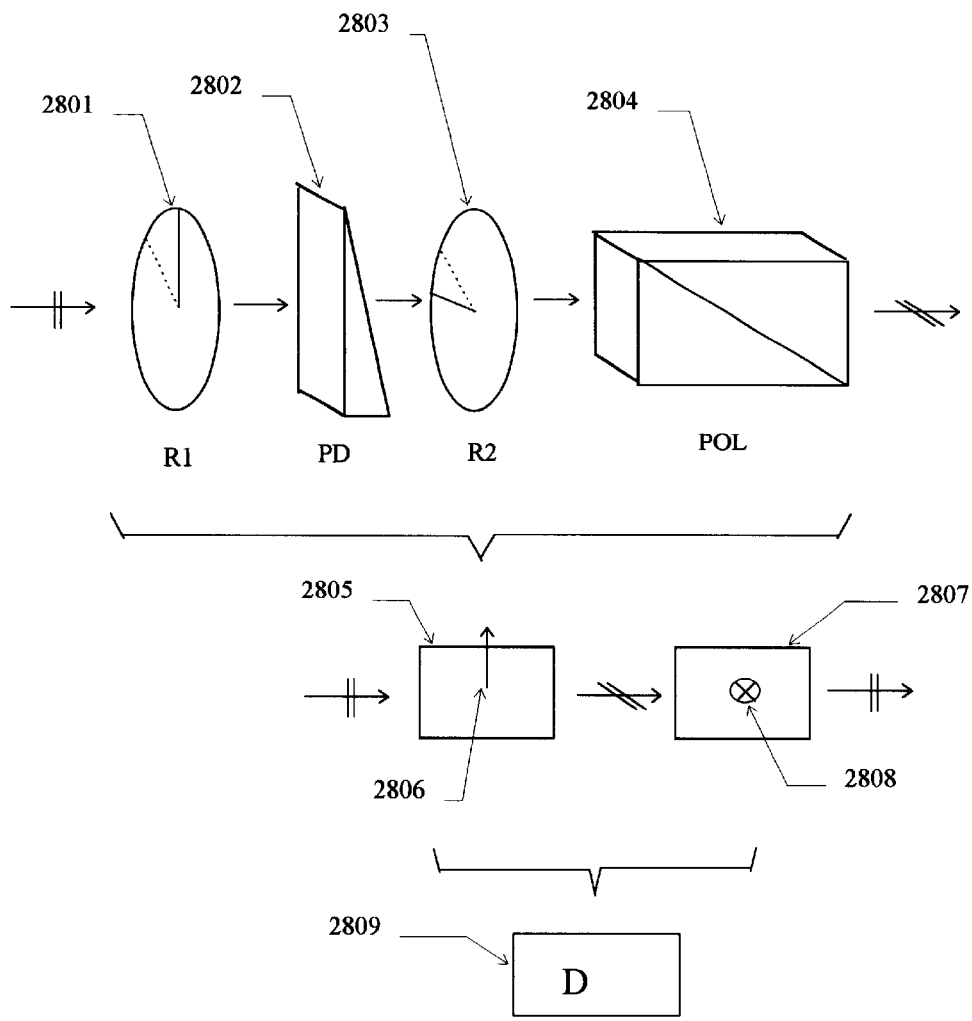
Figure 38:
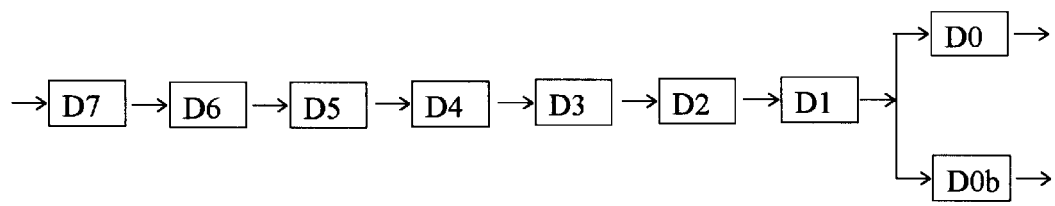
Figure 42:
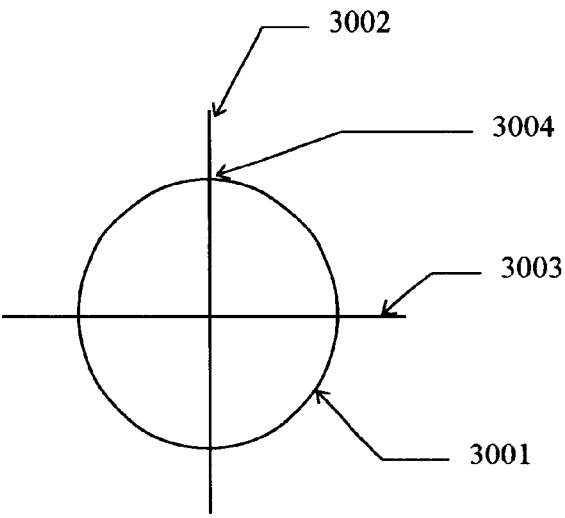
Figure 43:
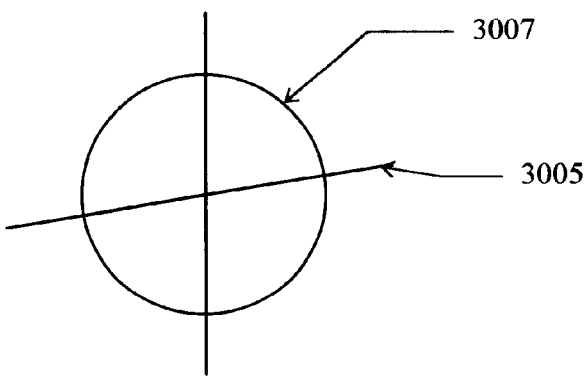
Figure 44:
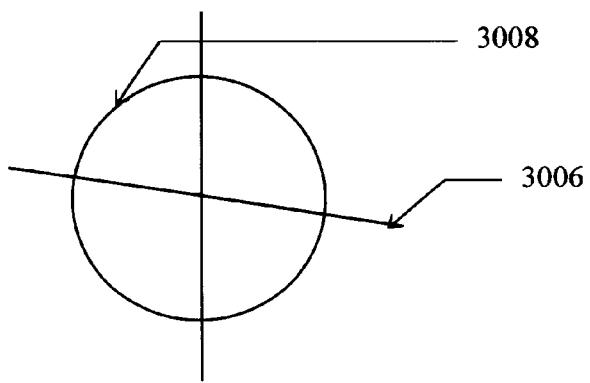
Figure 45:
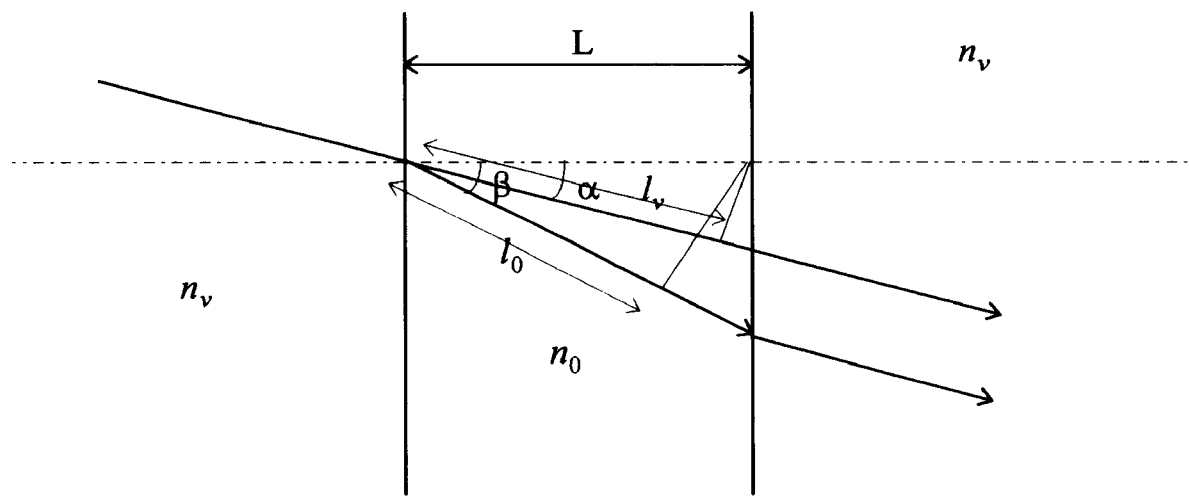
Figure 46:
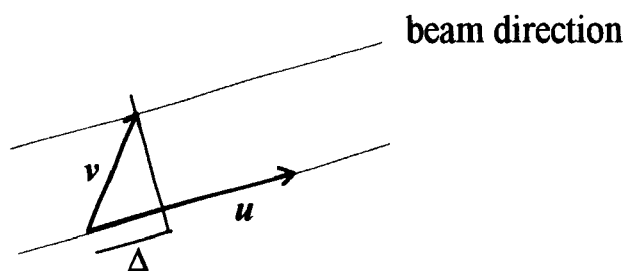
Figure 47:
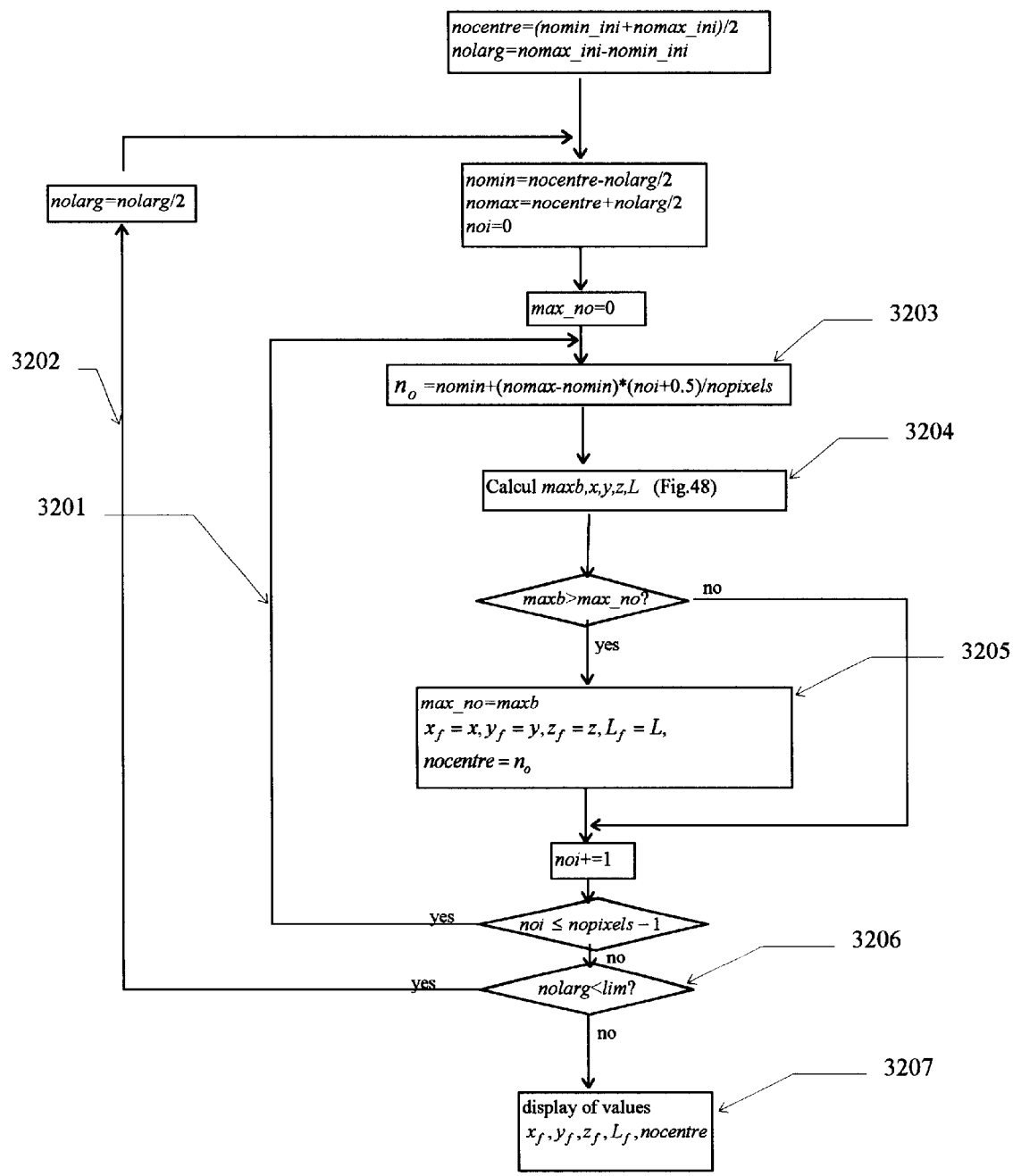
Figure 51:
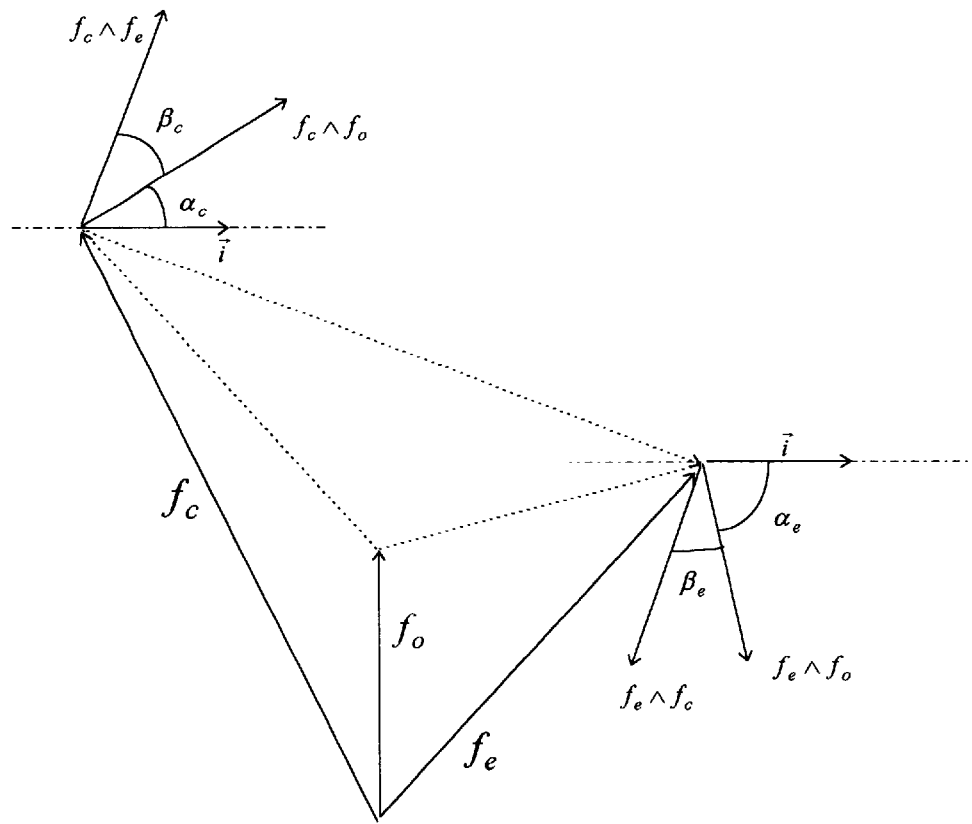
Figure 52:
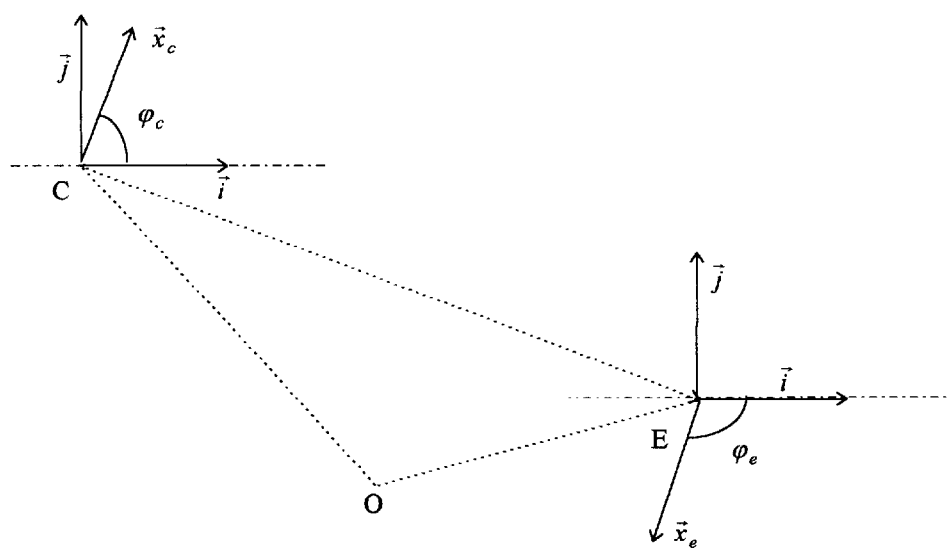
Figure 53:
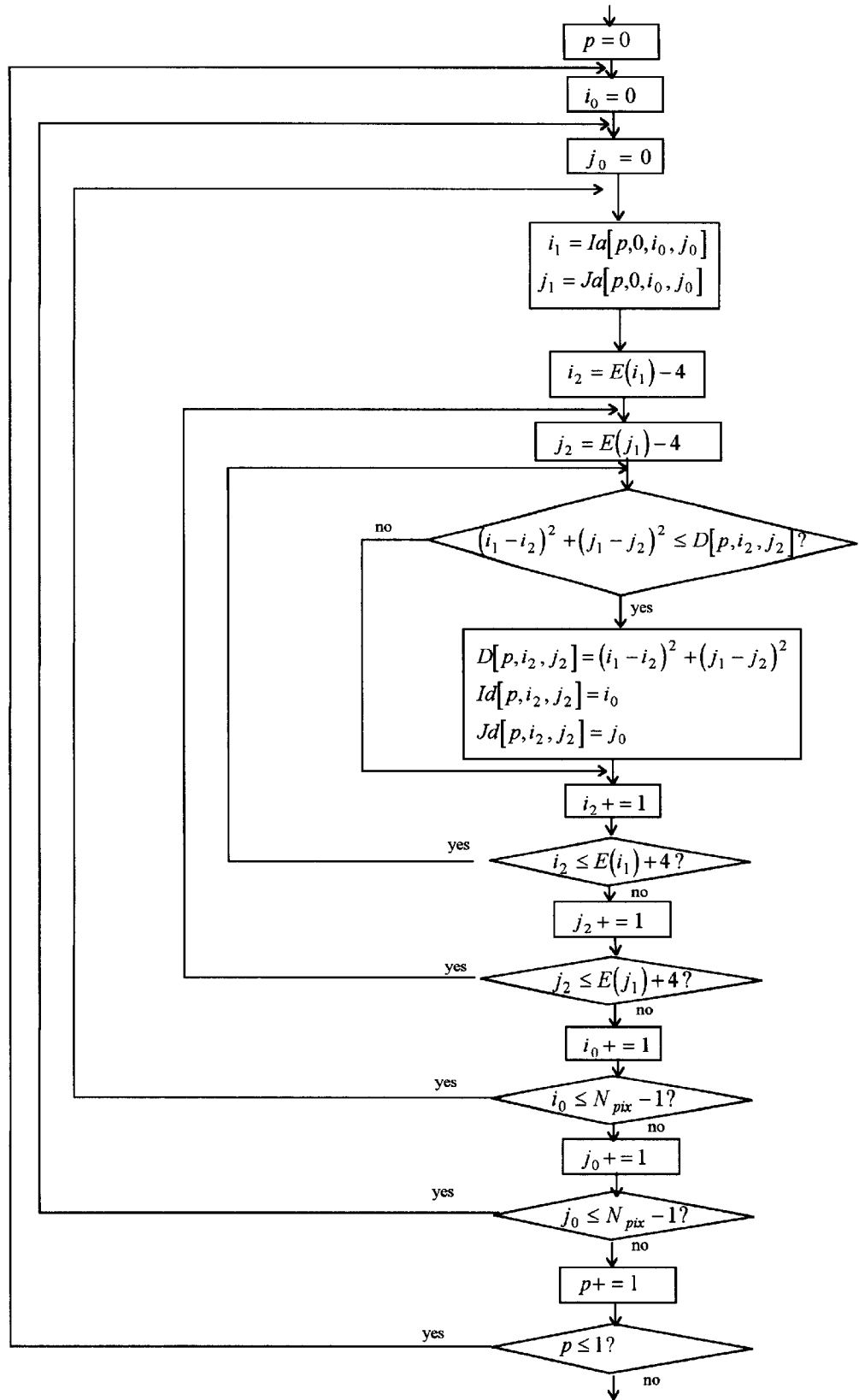
Figure 54:
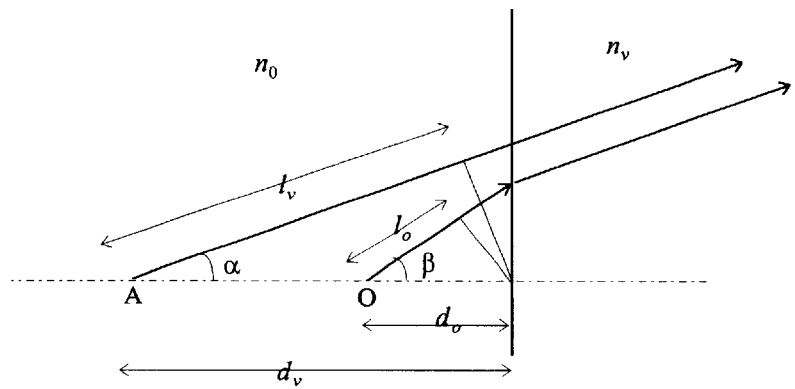
Figure 55:
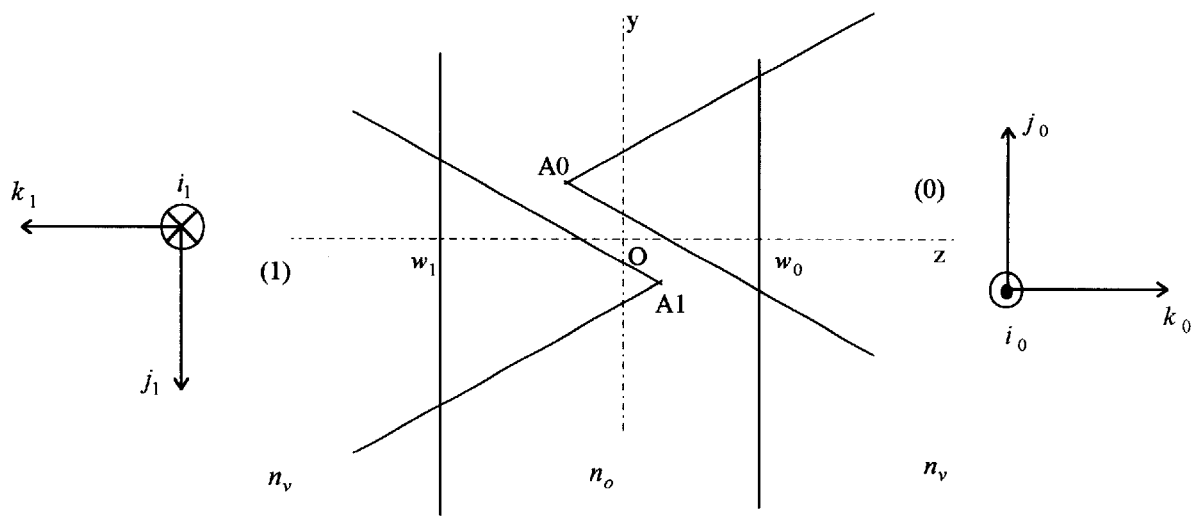
Figure 56:
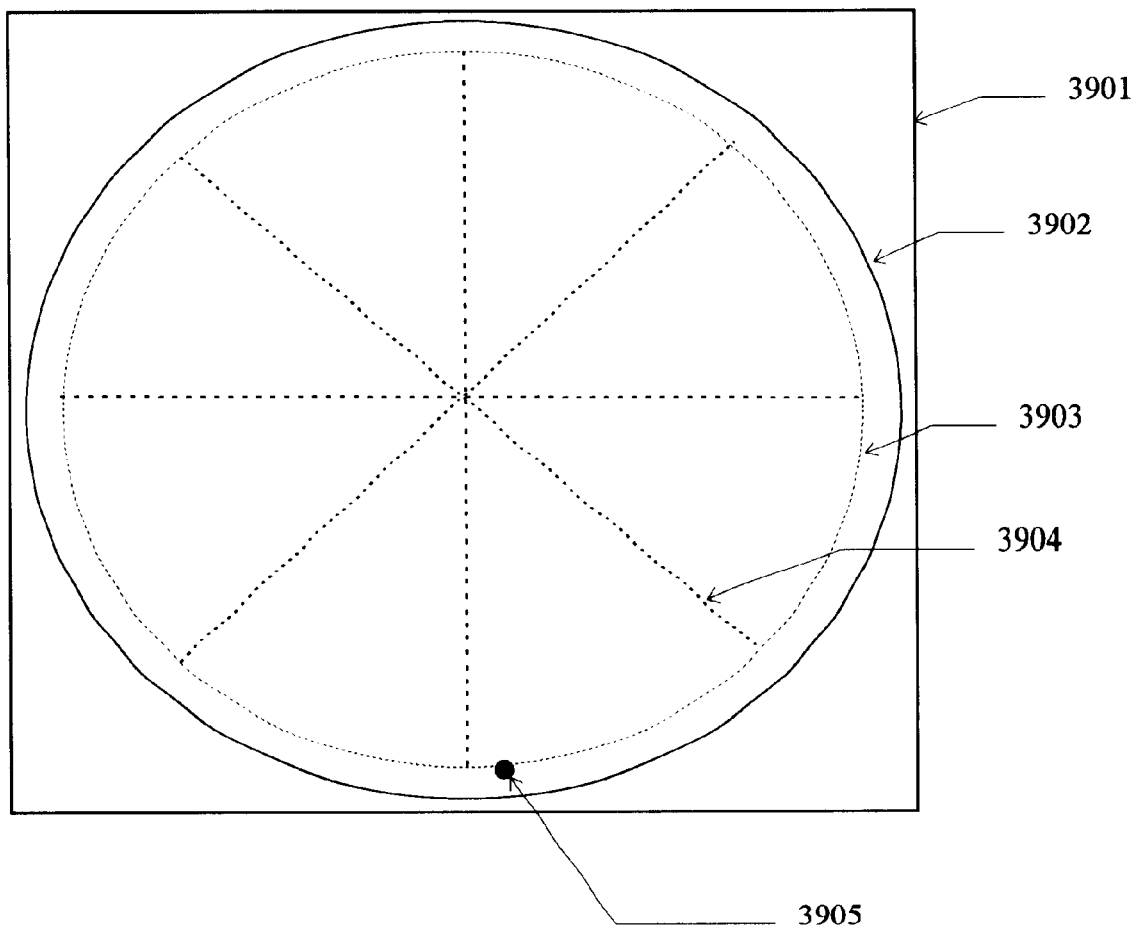
Figure 57:
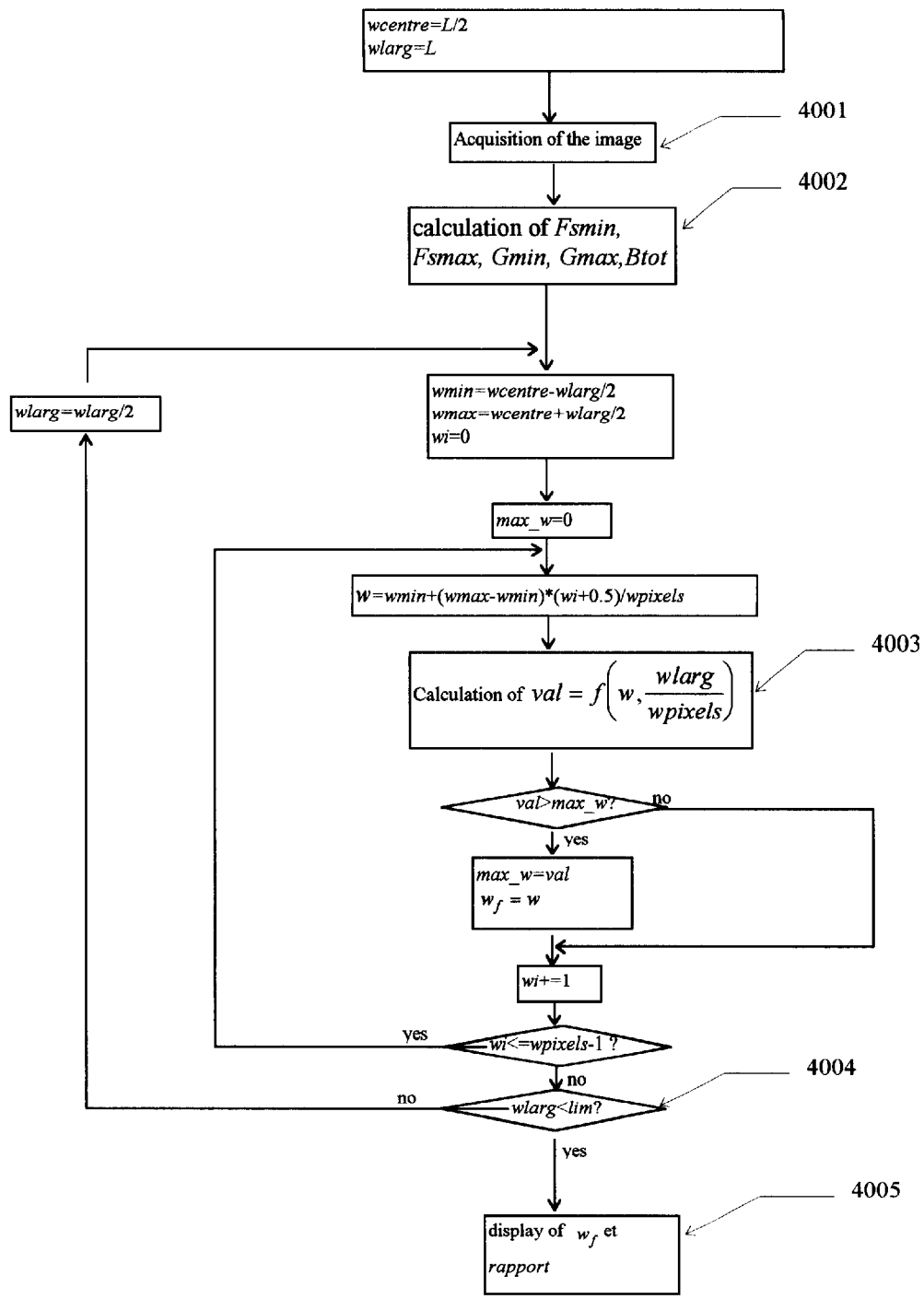
Figure 58:
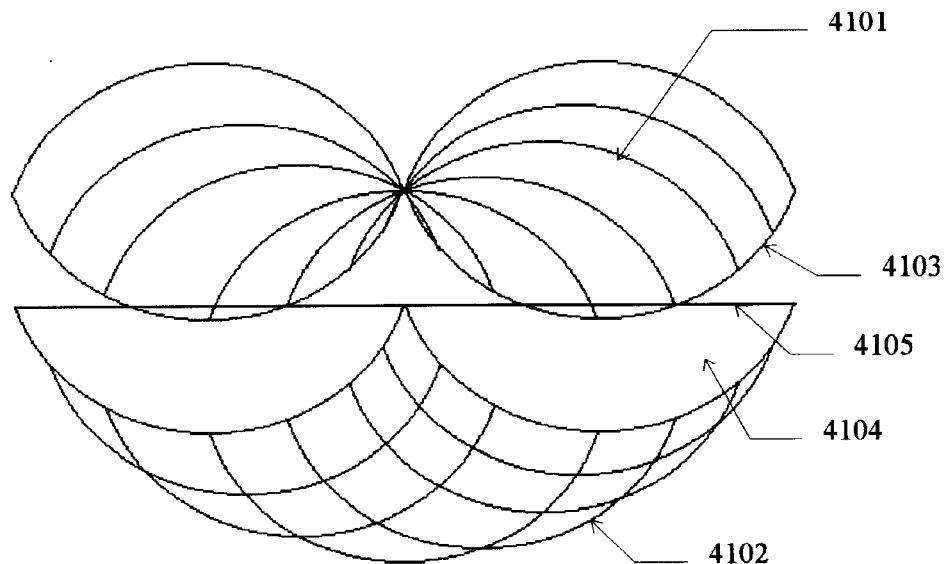
Figure 59:
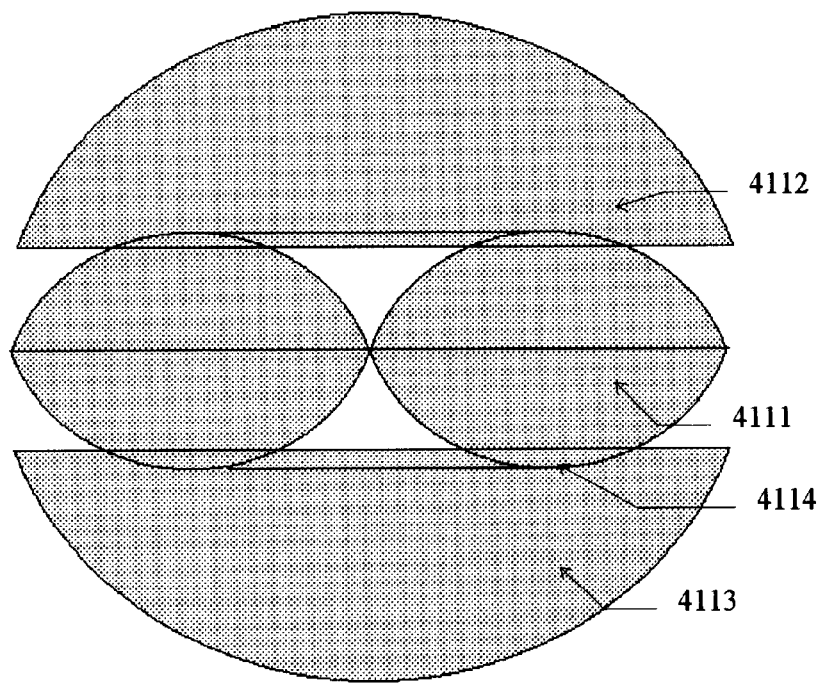

FIGS. 27 to 59 relate to a third embodiment. FIGS. 27 and 28 constitute a general diagram of the optical part of the microscope. FIG. 29 shows schematically the optical path of the rays between the objective and the sensor. FIG. 30 represents the beam attenuation device used. FIG. 31 is a schematic diagram illustrating its operation in the case in which there is actually an attenuation. FIG. 32 is a schematic diagram illustrating its operation in the case in which there is no attenuation. FIG. 33 represents the phase shift device used. FIG. 34 is a schematic diagram illustrating its operation. FIG. 35 continues FIG. 34 indicating the phase differences of the various vectors. FIG. 36 continues FIG. 34 indicating the modulus of the different vectors. FIG. 37 represents a basic unit of the beam deflection device used. FIG. 38 represents the beam deflection and switching device, formed by the association of these basic units. FIGS. 39 and 40 are schematic diagrams explaining the operation of a basic unit. FIG. 39 corresponds to one deflection direction and FIG. 40 to the other deflection direction possible. FIG. 41 illustrates the calculation of the deflection of the beam by a prism. FIGS. 42 to 44 illustrate steps in a phase rotator marking procedure. FIG. 42 illustrates the first step and FIGS. 43 and 44 illustrate a second step, in two different cases. FIG. 45 illustrates the calculation of the path difference produced on a parallel beam by an object with a given refractive index and thickness. FIG. 46 illustrates the calculation of the path difference produced on a parallel beam by the displacement of the origin of the reference wave in relation to which the optical path is calculated. FIGS. 47 to 50 and FIG. 60 illustrate an algorithm for calculating the refractive index and thickness values of the sample as well as the displacement of the origin of the reference wave. FIG. 47 corresponds to the highest level of this algorithm and FIG. 50 to the lowest level. FIG. 51 represents, in a three-dimensional space, different vectors used to evaluate the effect on the diffracted wave of the polarization of the illuminating beam. FIG. 52 represents, in the plane of a sensor, vectors deduced from the preceding. FIG. 53 represents an algorithm for obtaining beam deflector control indices based on the coordinates of a point of direct impact sought for the illuminating beam. FIG. 54 illustrates the calculation of the path difference of a wave coming from a point of the object in relation to a reference wave. FIG. 55 illustrates the calculation of the path difference between a wave coming from a point of the object and the reference waves used on the two sensors of the system. FIG. 56 illustrates the path, on one of the sensors, of the point of direct impact of the illuminating wave during an imaging procedure. FIG. 57 represents an algorithm determining the position of the object in relation to the objectives. FIG. 58 illustrates how the three-dimensional frequency representation of the object is obtained by the superposition of two-dimensional representations. FIG. 59 represents a section of the three-dimensional frequency representation of the object.

Figure 61:
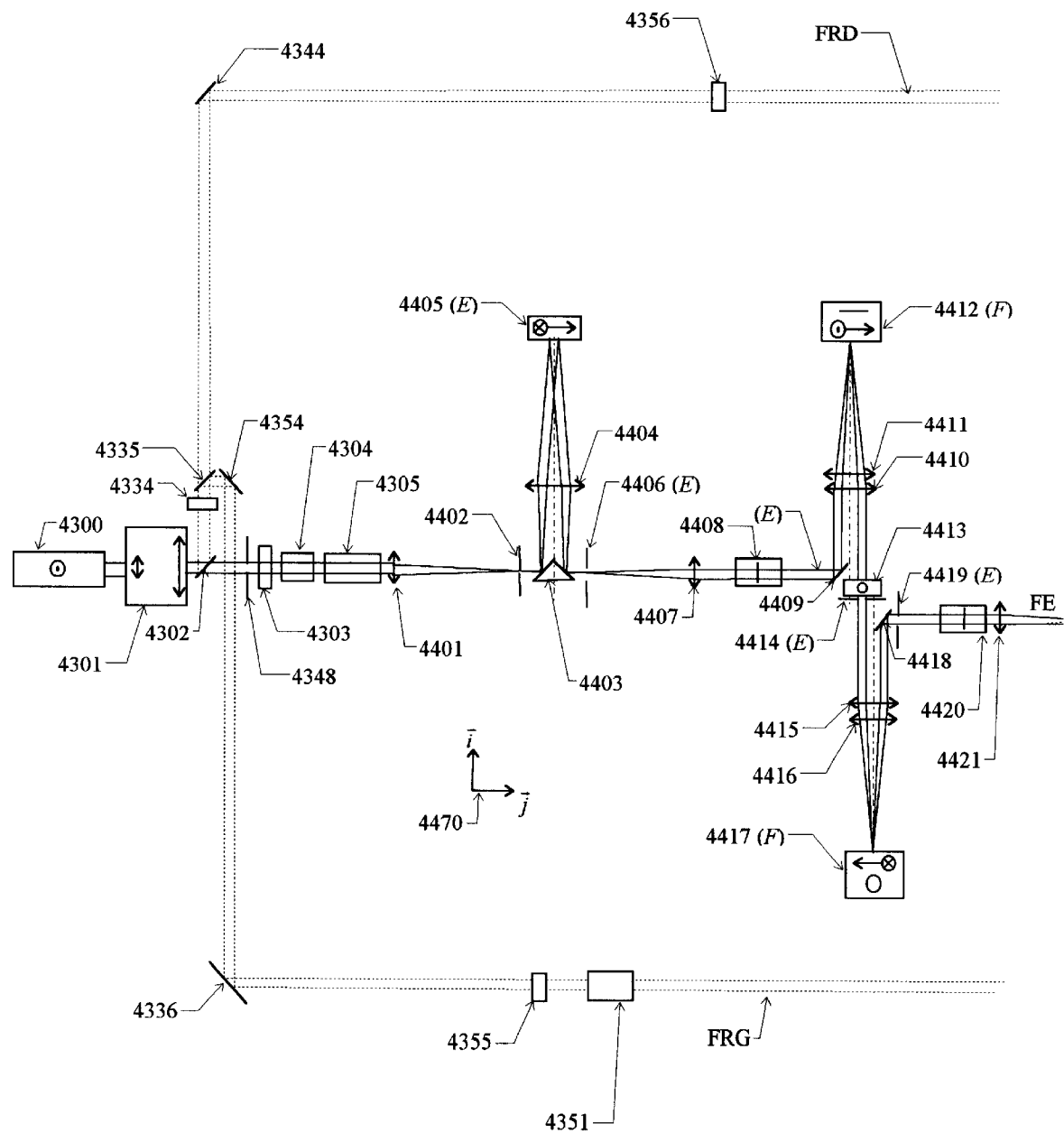
Figure 62:
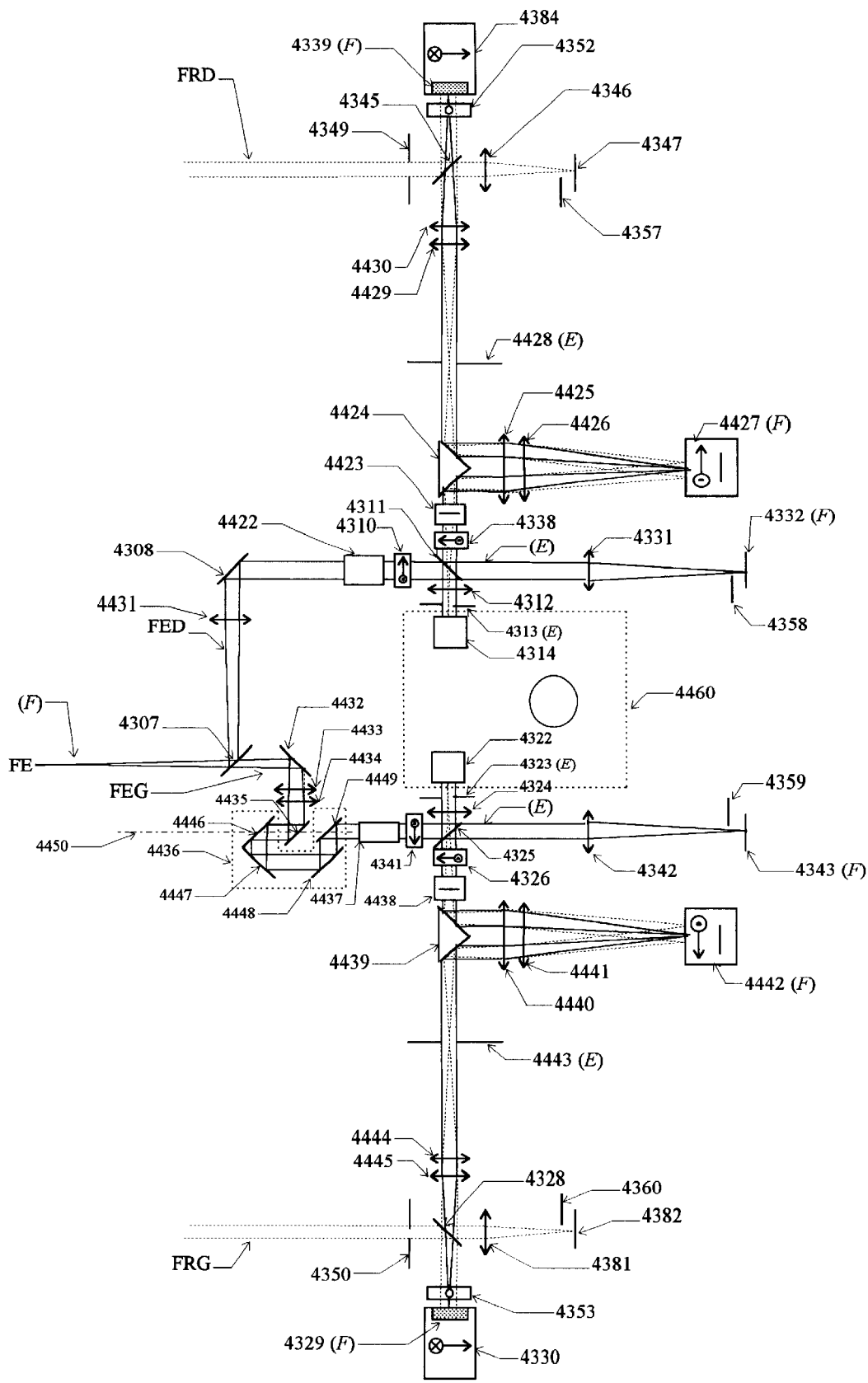
Figure 63:
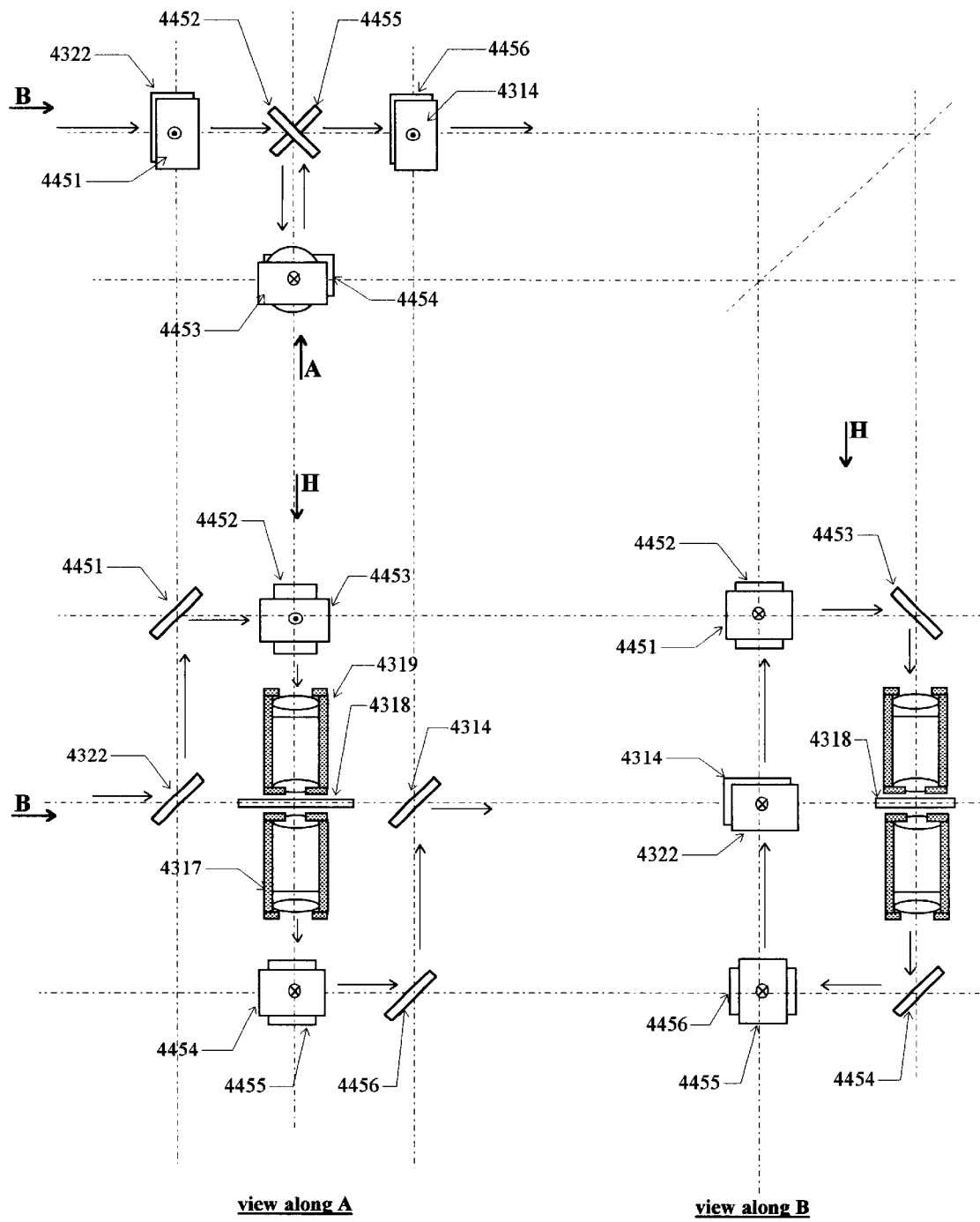
Figure 64:
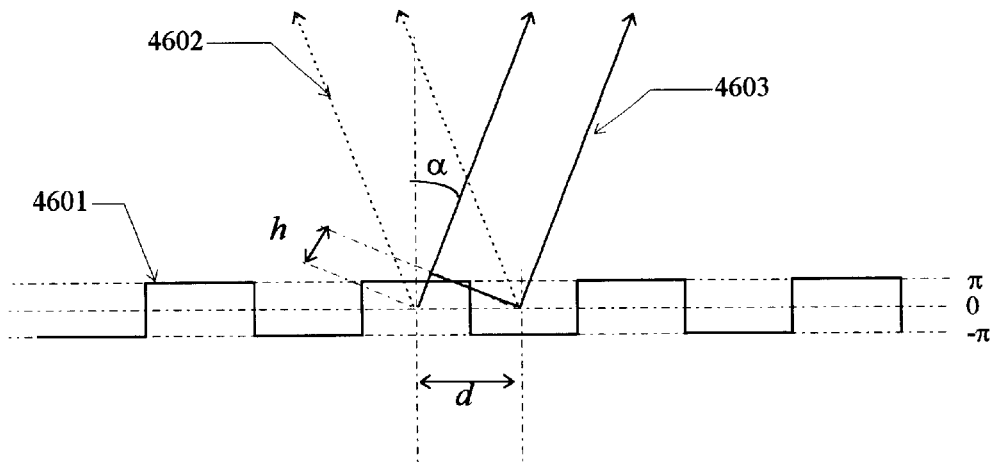
Figure 65:
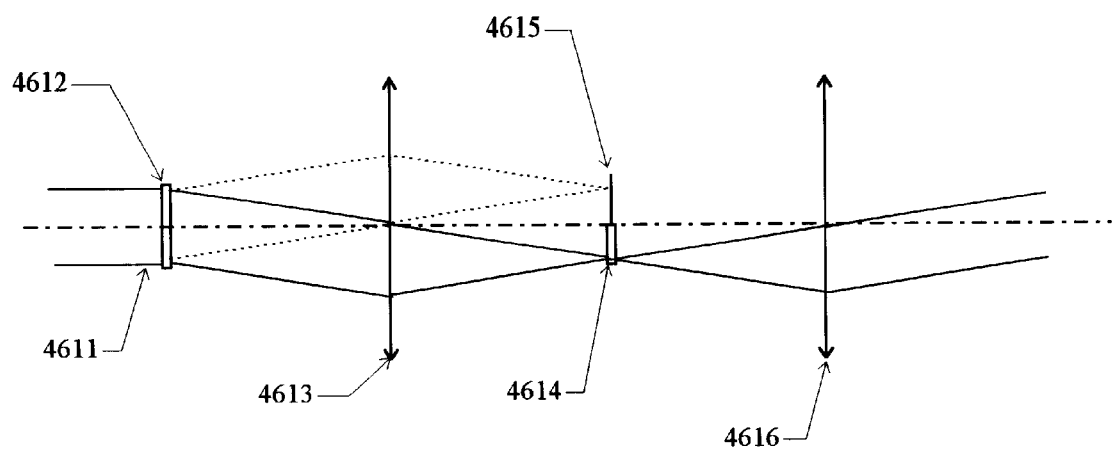
Figure 66:
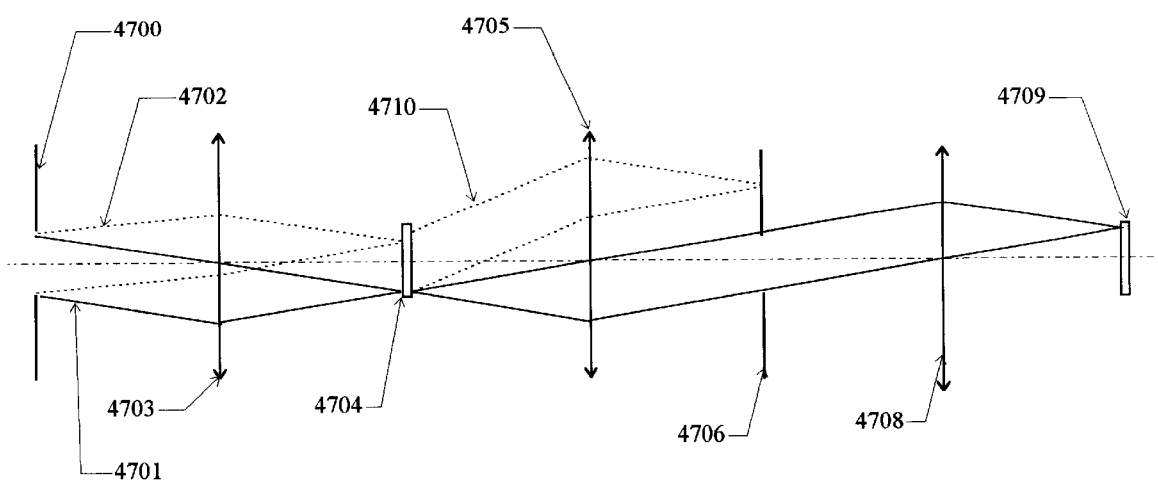
Figure 67:
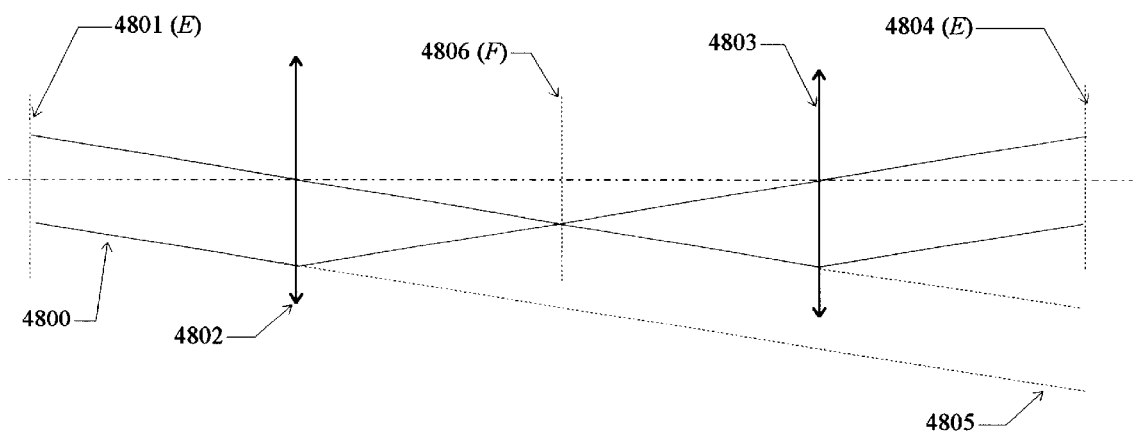
Figure 68:
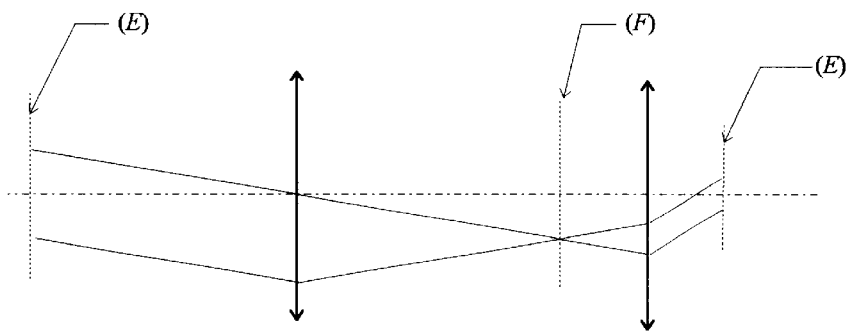
Figure 69:
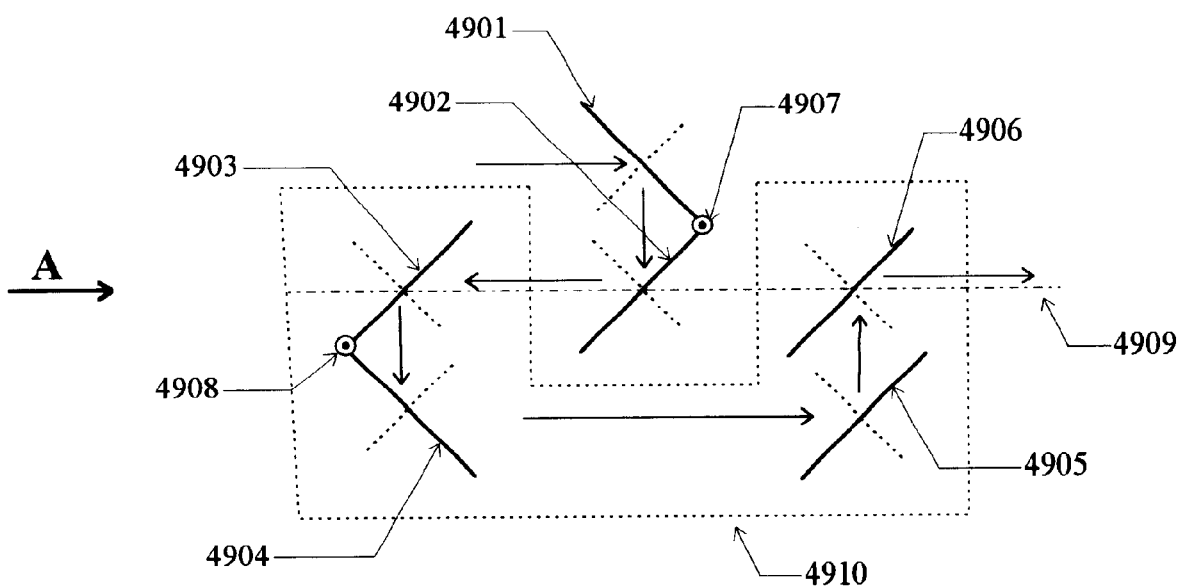
Figure 70:
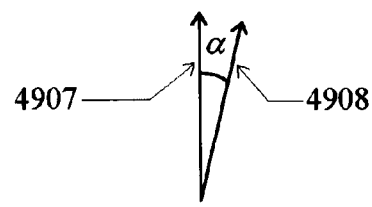
Figure 72:
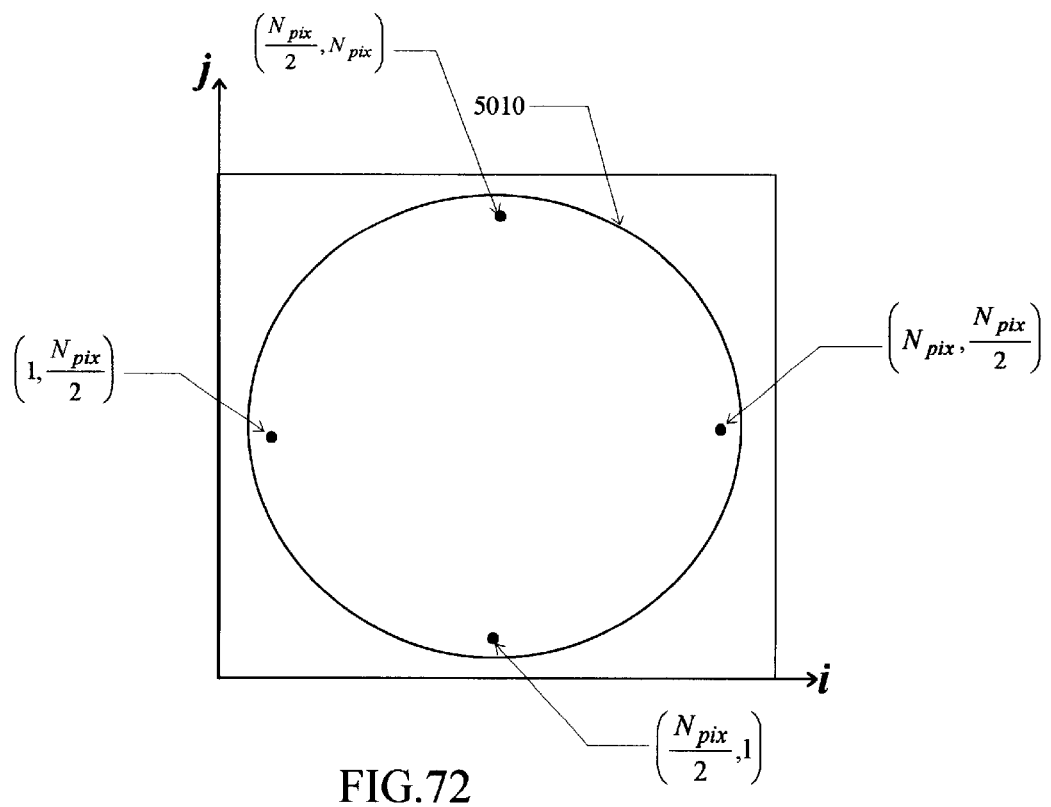

FIGS. 61 to 70 and 72 relate to a fourth embodiment of the invention, constituting the preferred embodiment. FIGS. 61, 62 and 63 constitute a general diagram of the optical part of the microscope. FIGS. 64 and 65 illustrate the operation of the beam deflector used in this embodiment. FIG. 66 illustrates the operation of a direct illuminating wave eliminating system. FIGS. 67 and 68 illustrate the principle used to control the beam paths. FIGS. 69 and 70 illustrate a system used to obtain controlled rotation of a beam. FIG. 72 illustrates the image to be obtained in one of the adjustment operations.

Figure 73:
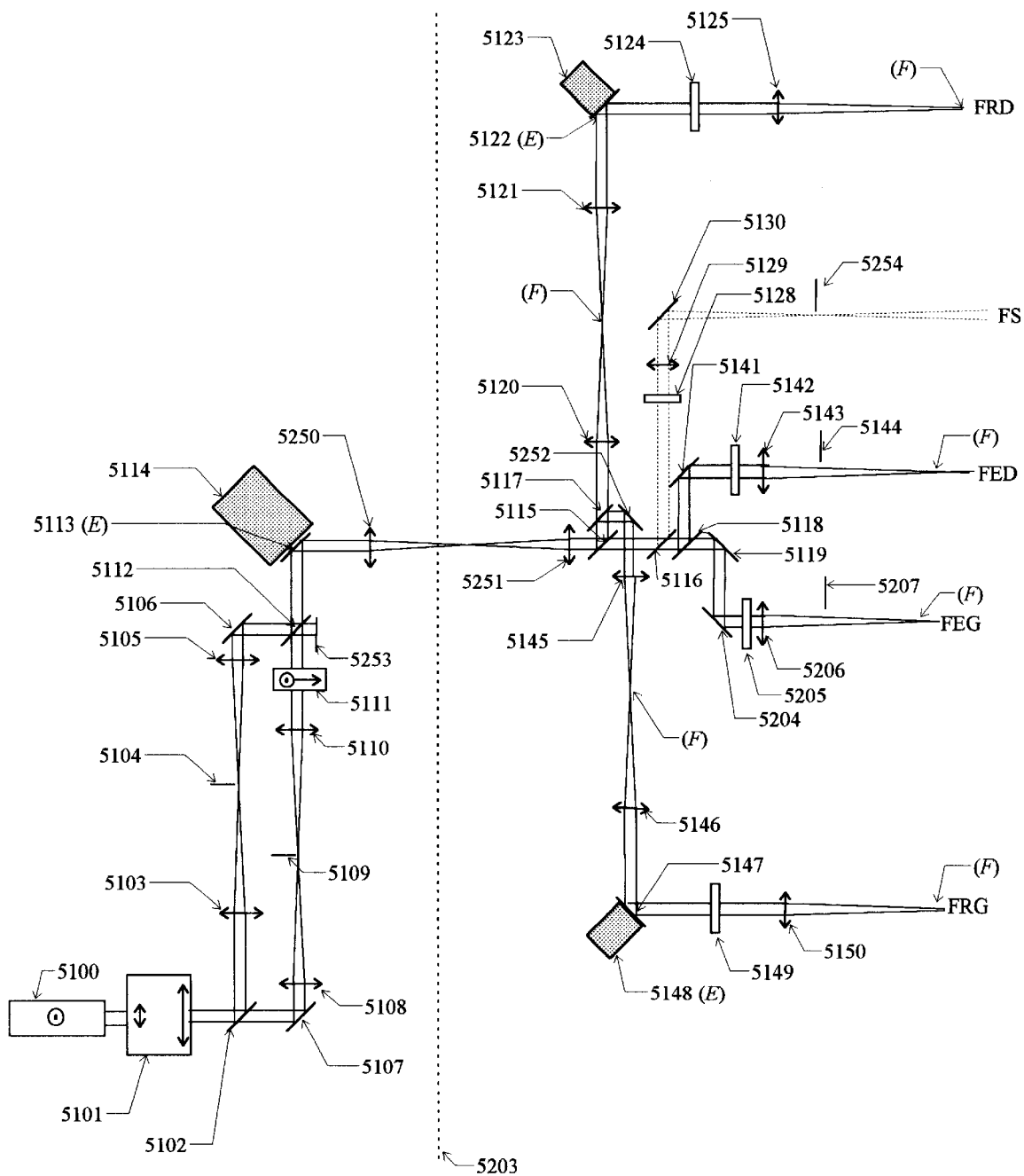
Figure 74:
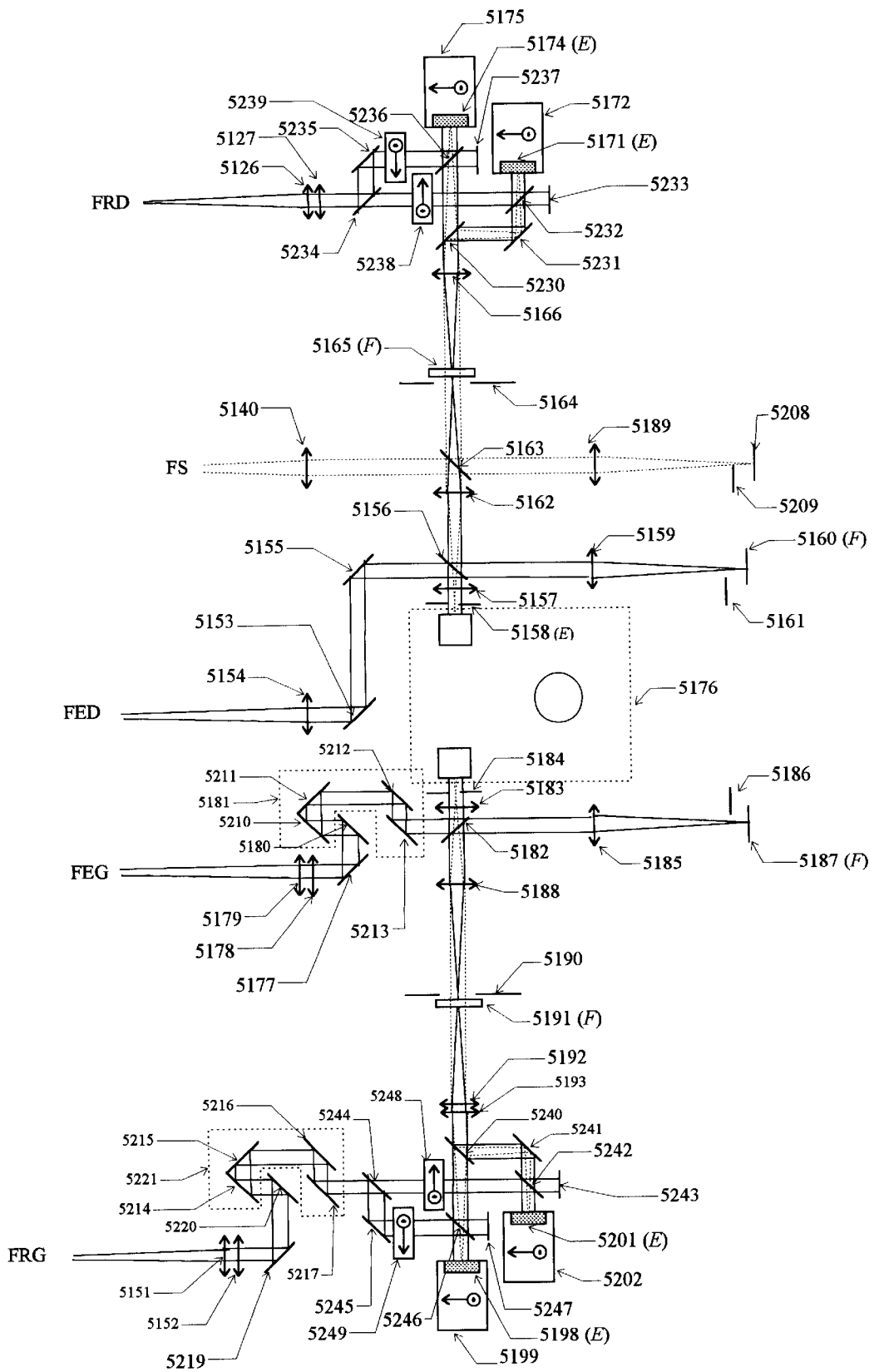
Figure 75:
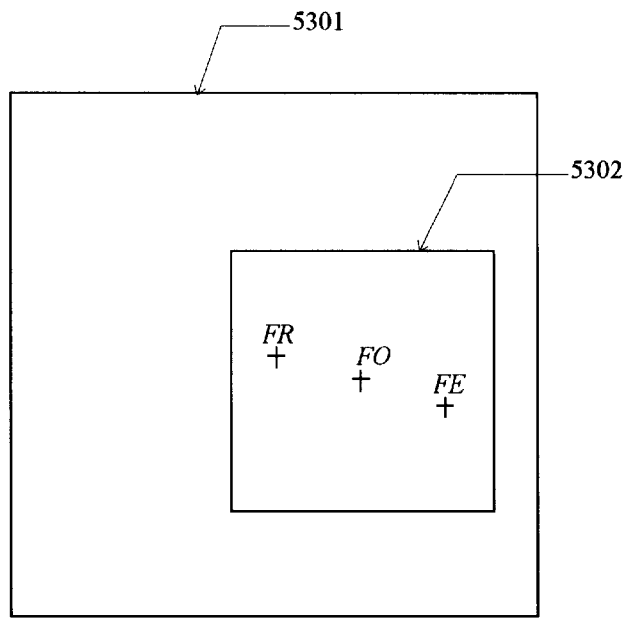
Figure 76:
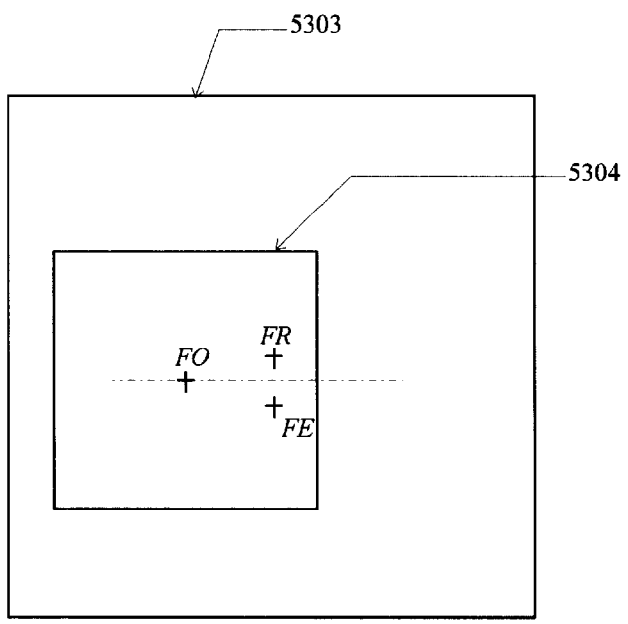
Figure 77:
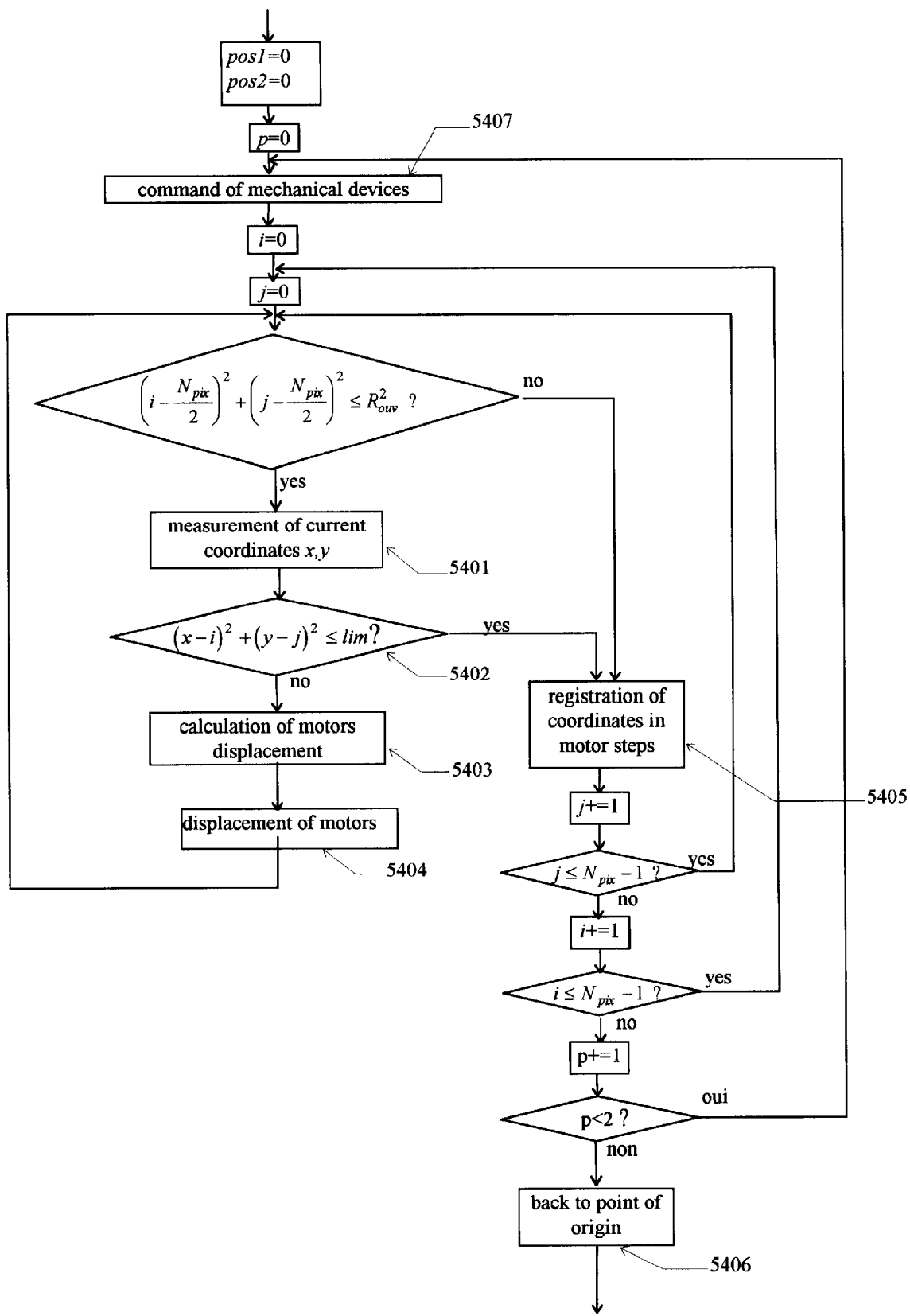
Figure 78:
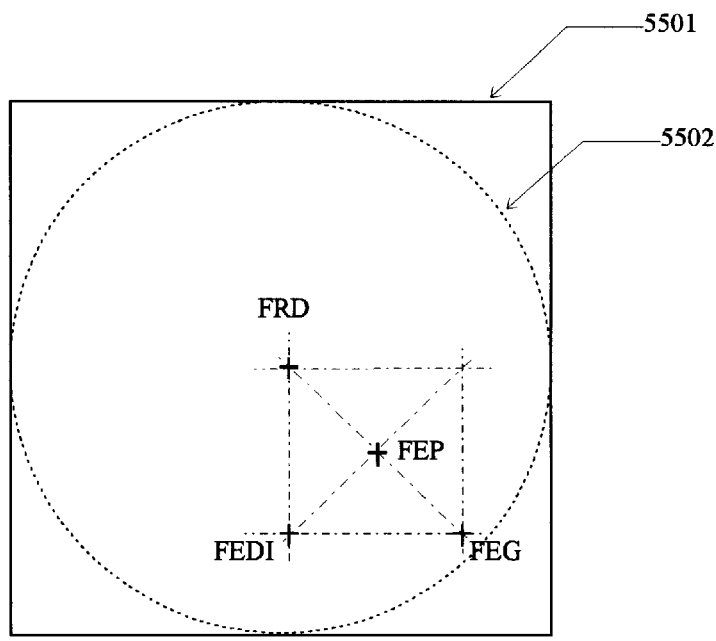
Figure 79:
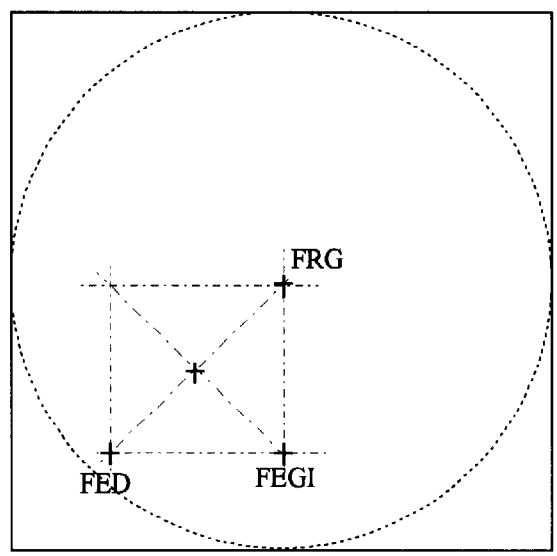
Figure 80:
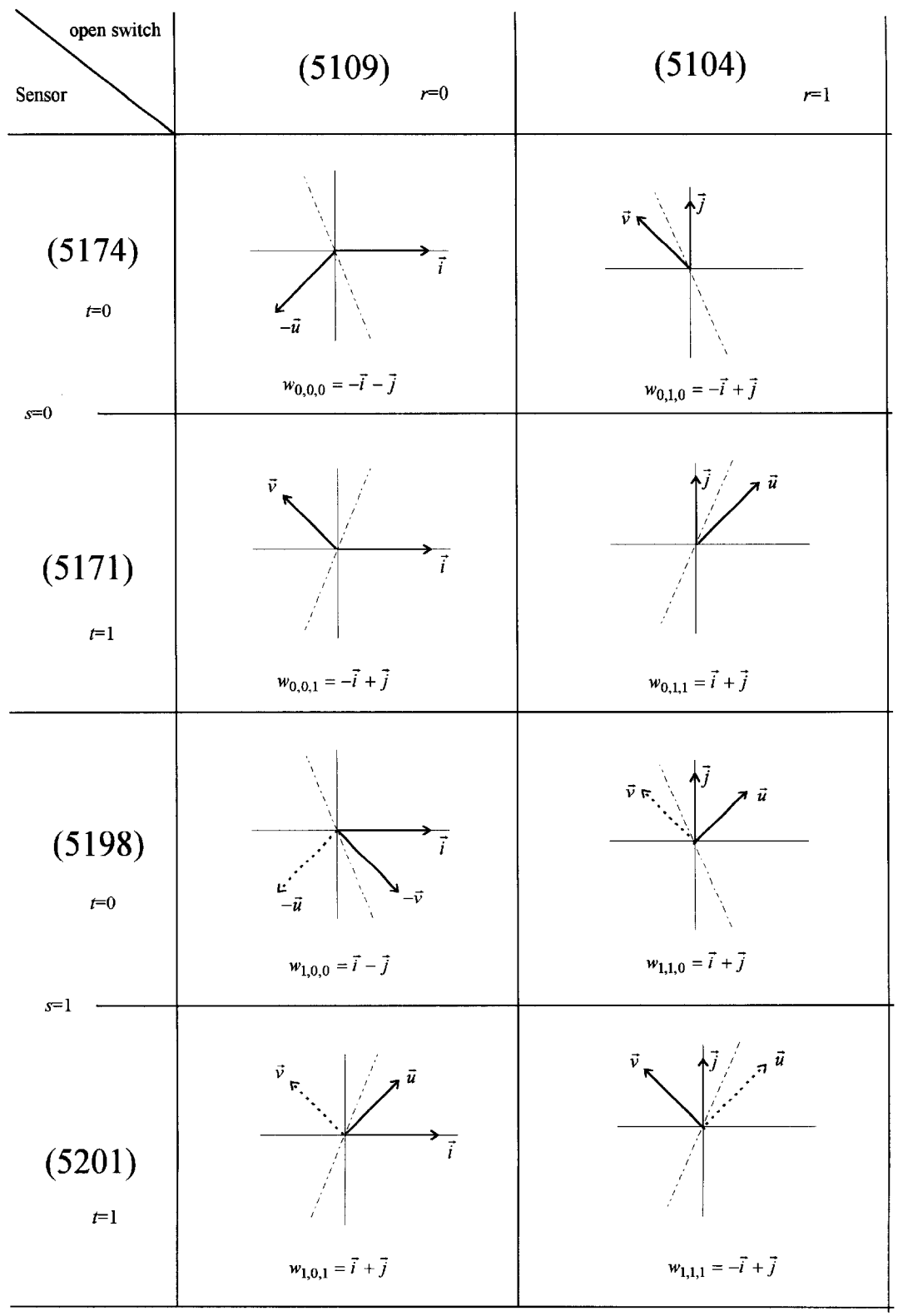
Figure 81:
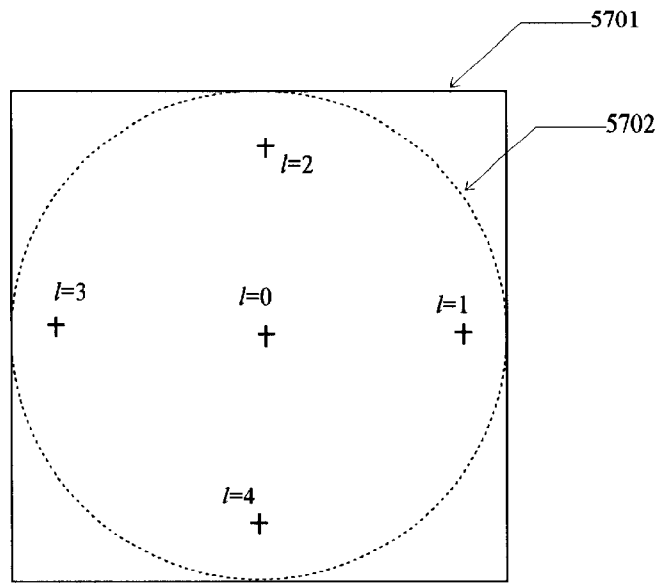
Figure 82:
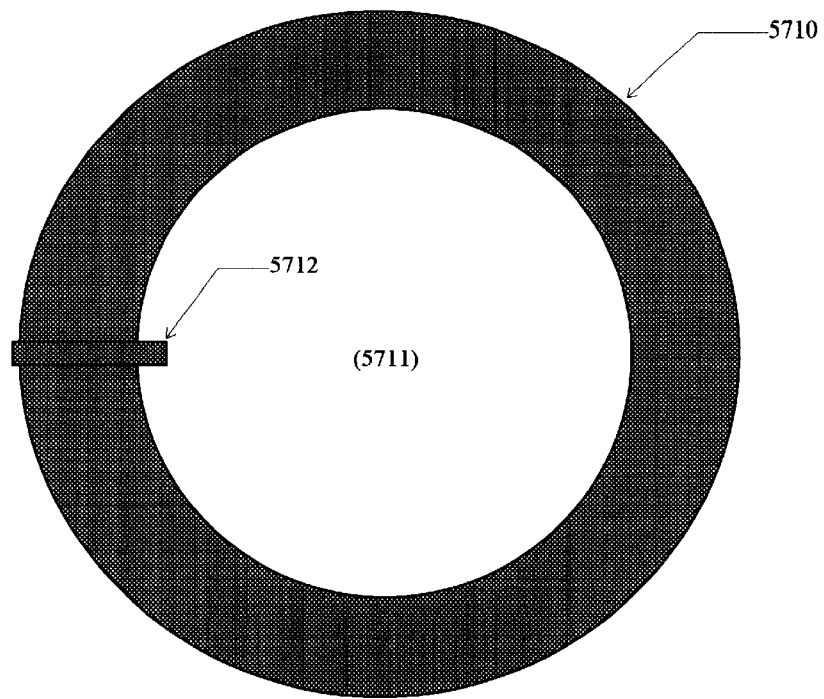

FIGS. 73 to 82 relate to a fifth embodiment. FIGS. 73 and 74 constitute a general diagram of the optical part of the system. FIGS. 75 and 76 illustrate images obtained during an intermediate calculation step. FIG. 77 illustrates an algorithm used to determine the control sequence of a mirror deflecting the beam and to determine the control sequence of a glass stopping the direct illuminating wave. FIGS. 78 and 79 represent images obtained during an adjustment step. FIG. 80 illustrates the principle used to vary the polarization of the illuminating wave and the analysis direction. FIG. 81 represents the points corresponding to different illuminating waves used in a phase correction algorithm. FIG. 82 represents a diaphragm used in this embodiment.

Figure 83:
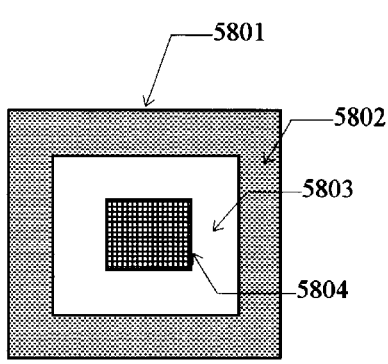
Figure 84:
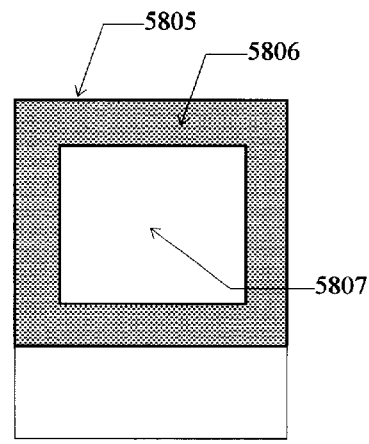
Figure 85:
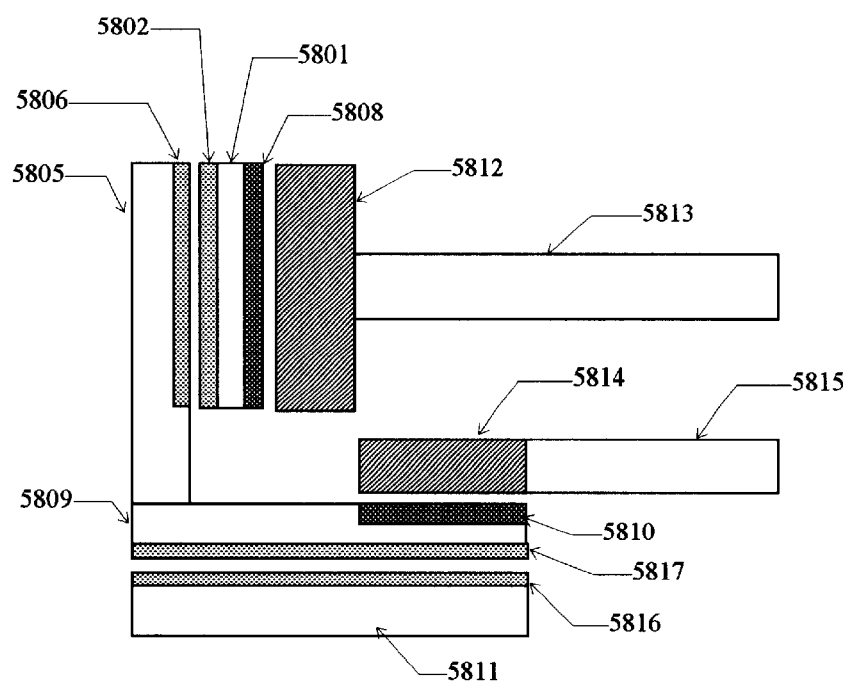
Figure 85:
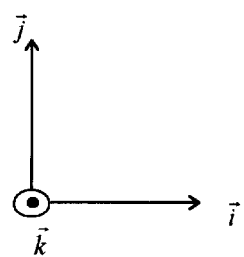

FIGS. 83 to 85 relate to a device for positioning and fixing in a definitive manner the optical elements. FIG. 83 and FIG. 84 represent parts of this device, and FIG. 85 represents the entire device.

Figure 86:
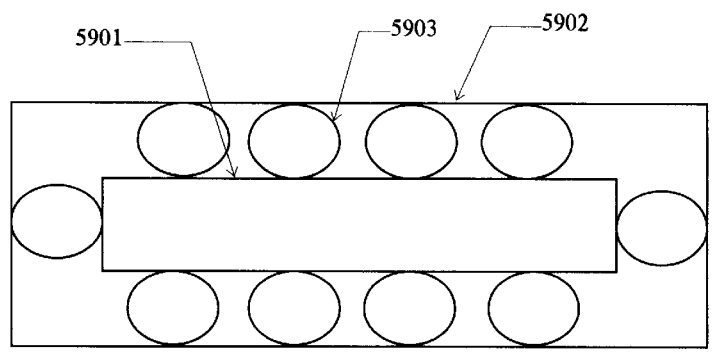
Figure 87:
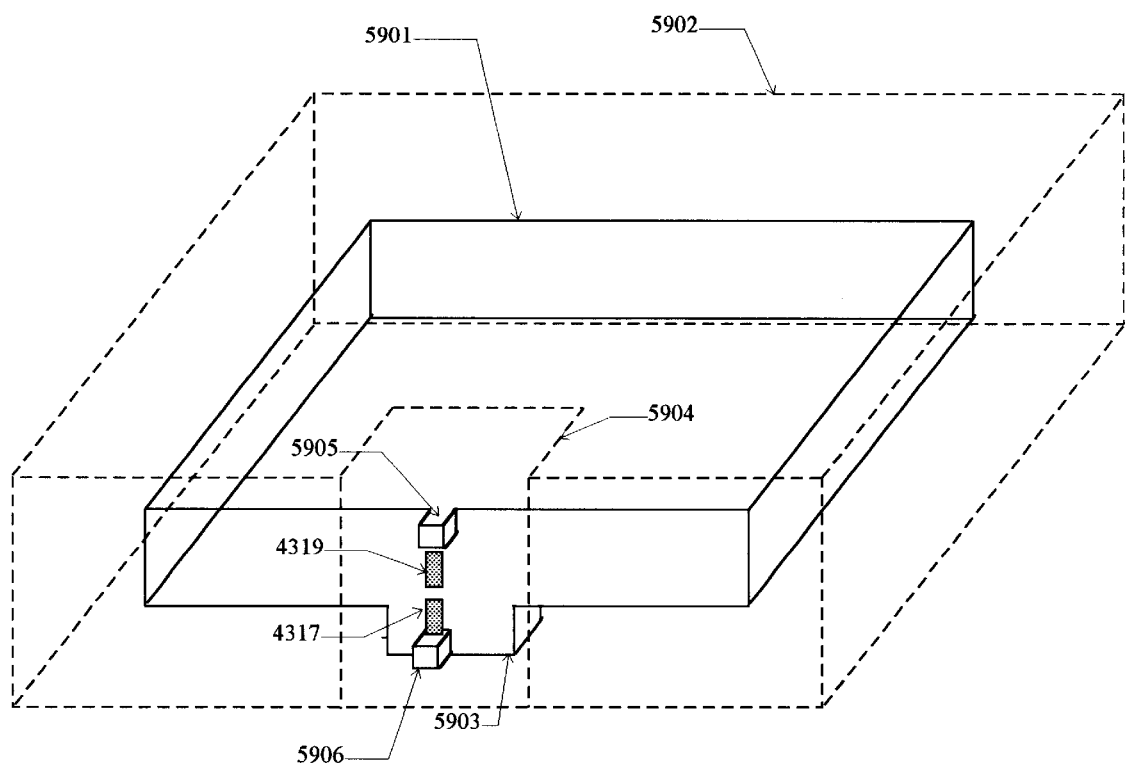
Figure 88:
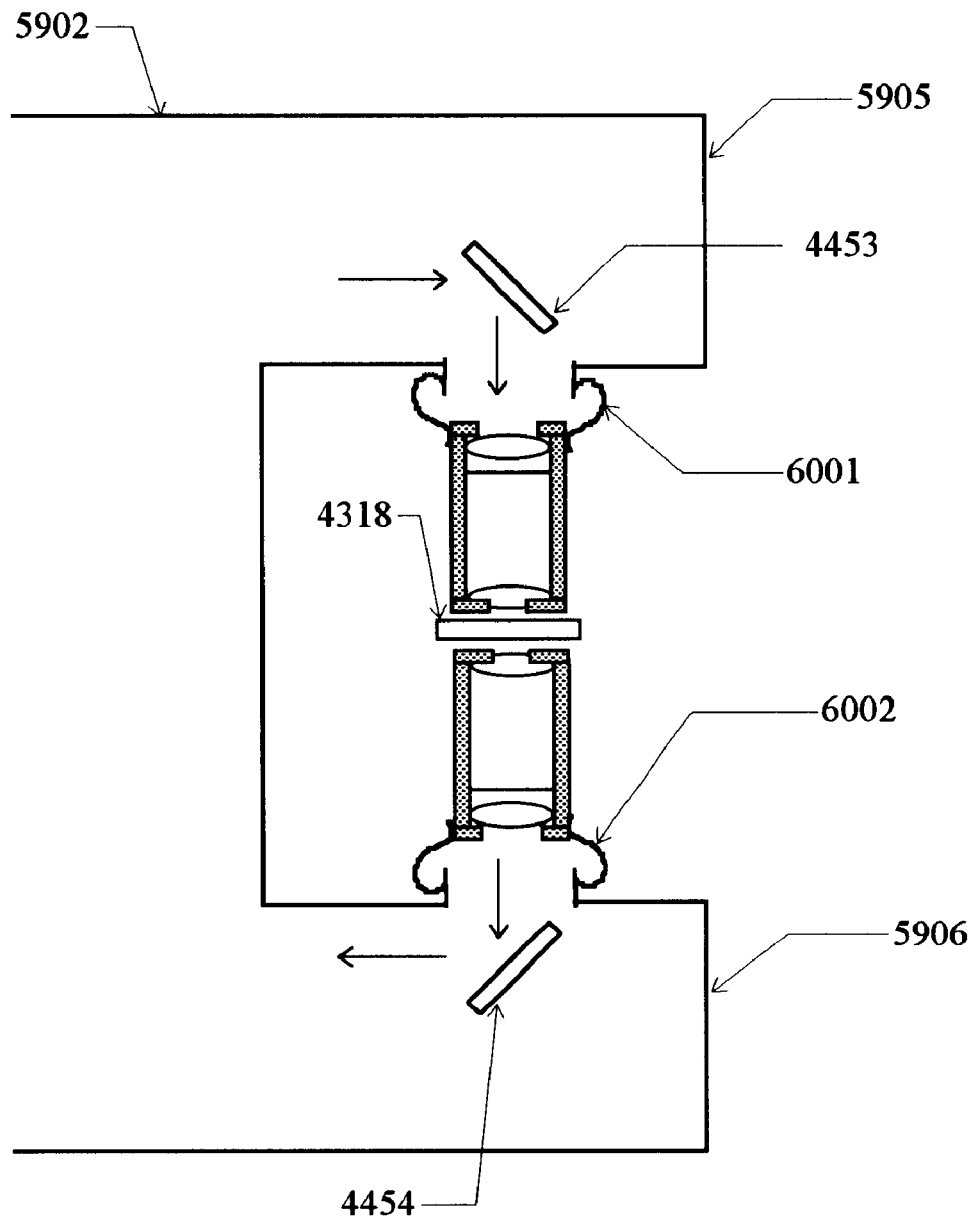

FIGS. 86 to 88 relate to a device designed to protect the microscope from shocks and dust. FIG. 86 represents a schematic diagram of the device. FIGS. 87 and 88 represent a specific configuration suited to the case of Embodiment 4.

FIGS. 89, 90 and 91 relate to the use of non-stigmatic objectives. FIG. 89 represents an embodiment of such an objective. FIG. 90 is used as a support for the statement of conditions to be complied with by this objective. FIG. 91 shows a plane frequency image obtained by means of this objective.

5. DESCRIPTION OF A FIRST EMBODIMENT

This embodiment is the simplest and is not costly.

5.1. Material characteristics

A laser beam with a 633-nm wavelength polarized in the direction orthogonal to the figure is emitted by the helium-neon laser (100) and passes through the filter (101) made up of zero, one or more stacked filters in tinted glass of the Schoff type. It is then separated into an illuminating beam Fe and a reference beam Fr by the semi-transparent mirror (102). The illuminating beam then passes through a filter (103) of the same type as (101), then through a polarization rotator (104) based on ferroelectric liquid crystals and marketed by the company Displaytech Inc., 2602 Clover Basin Dr., Longmont, Colo. 80503, United States. It then passes through a polarizer (105). The beam then goes through an achromat (106) then a diaphragm (107) and an achromat (108). It is reflected by a mirror (109) fixed on the angular positioner (110) controlled by two stepping motors. It then passes through an achromat (124) and then a condenser (111) and reaches the object (112). The condenser is, for example, a Nikon aplanatic/achromatic condenser of 1.4 aperture designed for a light source located at infinity. The object (112) is a sample placed between plate and cover glass, the absorptivity and refractive index variations of which are relatively small, and a three-dimensional image of which is to be obtained. The achromat (124) is placed as near as possible to the lowest lens of the condenser (111), possibly in the condenser body. The front focal point of the achromat (124) coincide with the rotation center of the mirror (109). Lenses (106) and (108) must be such that the laser beam focuses in the front focal plane of the assembly made up of the condenser (111) and the achromat (124), and have a sufficient aperture upon its arrival in this focal plane.

The beam is thus again parallel when it reaches the object (112). The object plane must be horizontal so that the optical oil required to use the objective and the immersion condenser does not flow. The optical axis is thus vertical and the elements of FIG. 1 are fixed on a vertical plate (300) shown in FIG. 4.

The angular positioner (110) is shown in detail in FIGS. 2 and 3. FIG. 2 represents a plate on which the mirror (109) is glued, in a bottom view. FIG. 3 represents the entire device seen from the side. The plate (200) is placed on mobile contact pads (205) and (212) whose contact points with the plate are (203) and (204), and a fixed contact pad whose contact point is at (201), the plate (200) being slightly hollowed at this point. It is maintained by a spring (210) fixed to the plate at (202) and to a fixed pad (211). The mobile contact pad (205) moves vertically in translation and is incorporated in a single-axis actuator of conventional type: it is blocked in rotation by a flexible element (207) and is driven in translation by the rotation of the rod (206) coming out of the stepping motor (208) which is, for example, a 400 steps/rev. stepping motor. The drive is obtained, for example, by means of a screw thread. The contact pad (212) is likewise driven by the rotation of the motor (213). The fixed contact point (201) must be in the optical axis of the objective (113) and the center of the mirror must be on this contact point. The motors (208) and (213) are fixed on a plate (209) itself fixed on the support plate (300). The center of rotation of the mirror, which must be positioned on the optical axis, is a point of the reflecting surface of the mirror located on a line orthogonal to the plane of the mirror and passing through the center of (201).

The wave coming from the object (112) passes through the microscope objective(113). This objective is an aplanatic objective (giving a flat image of a plane), with a high aperture (for example 1.25), of the immersion type, and forming a magnified image of the object at a finite distance.

In the plane in which the objective normally forms the image of the object to be observed, a diaphragm (114) is inserted and allows spatial filtering of the image. Behind this plane is positioned an achromat (115) whose front focal plane must coincide with the rear focal plane of the objective (113). A second achromat (117) whose rear focal plane is in the plane of a CCD sensor (118) forms in the plane of this CCD the image of the rear focal plane of the objective (113). The CCD (118) is incorporated in a camera (119) delivering an analog video signal and a pixel clock.

The reference beam first passes through a filter (120) of the same type as (101) and is then reflected by a mirror (121) mounted on the mobile end of a piezoelectric translator (122). It then passes through a lens (123) which focuses the beam at a point. The diverging beam coming from this point is reflected partially by the semi-reflecting mirror (116), thus superimposing it on the beam coming from the object, enabling the recording of their interferences on the CCD (118). The point of focus of the beam coming from the lens (123) must have a virtual image after reflection on the semi-transparent mirror (116) at the center of the image of the diaphragm (114) through the achromat (115). The piezoelectric translator (122) permits the modulation of the reference beam phase.

The manual positioners used in the system are not represented in the figure. The microscope objective (113) is mounted on a focussing device. The laser (100) is mounted on a two-axis positioner permitting the direction to be adjusted. The fixed part of the piezoelectric stack (122) is mounted on a two-axis positioner allowing rotation in relation to an axis orthogonal to the plane of the figure and passing through the center of the mirror (121), and in relation to a second axis located in the plane of the mirror (121), orthogonal to the first axis and passing through the center of the mirror (121). The condenser is mounted on a three-axis translation positioner. The camera (119) is mounted on a three-axis translation positioner. The angular position of the semi-transparent mirrors (102) and (116) can be adjusted manually. The lens (106) can be translated along its axis. The object (112) is fixed on a two-dimension positioner enabling it to be moved in a horizontal plane. The diaphragm (114) can be moved in a horizontal plane.

The assembly is fixed on the support plate (300), on the side of the plate opposite the viewpoint of FIG. 4. This plate is fixed to two triangular plates (301) and (302) themselves fixed to a square base (303). The plate (300) is also fixed directly to the square base (303). Plates (300)(301)(302) (303) are in rigid aluminum alloy AU4G, for example 20 mm thick. The attachment of the plates is possible by means of screws and tapped holes, and must be done in a sufficient number of points to ensure perfect overall rigidity. This makes it possible to keep the system vertical while providing sufficient rigidity. The assembly is placed on an anti-vibration support consisting of a granite plate (304) 30 mm thick placed on a van inner tube inflated to a low pressure (305) which dampens the vibrations and which is itself placed on a rigid wooden table (306). A rigid wooden frame (311) is fixed on top by means of uprights (307) (308)(309) (310) to the table (306). The entire wooden construction is reinforced so as to be perfectly rigid. The top of the plate (300) is connected by tensioners (312)(313)(314)(315) to the corners of the rigid frame. Each tensioner, shown in detail in FIG. 5, consists of a set of rubber bands (316) tensioned between two rings (318)(317), these rings themselves being fixed to the plate (300) and to the frame (311) by means of cords (320)(319), the assembly being placed under tension. The inner tube (305) makes it possible to have, for the suspended AU4G assembly, small resonance frequencies for translation movements, of the order of 2 Hz. The tensioners (312) to (315) allow the swing of the assembly to be limited. The swinging frequency can be evaluated simply by imparting a light swinging movement to the assembly and measuring the time required to have, for example, ten swings. The swinging frequency is adjusted by modifying the number of rubber bands used for each tensioner. The higher the number, the higher the swinging frequency. It must be adjusted so that the swinging frequency is of the same order as the resonance frequency for translation movements, i.e. about 2 Hz.

The mounting of the different elements on the plate (300), and in particular the mirrors and the semi-transparent mirrors, must be carried out so as to ensure maximum overall rigidity. All usual precautions must be taken so as to limit vibrations.

The following description relates to a particular practical design example for the device. The distances mentioned are represented in FIG. 6. The dimensions given are approximate and some of them must be corrected in an adjustment phase. The lens (106) is an achromat with a focal length of 10 mm. The lens (108) is an achromat of 24-mm diameter and 120-mm focal length. The distance D7 between (106) and (108) is 250 mm. The distance D6 between the lens (108) and the center of the mirror (109) is about 100 mm. The distance D5 between the center of rotation of the mirror (106) and the achromat (124) is 120 mm. The achromat (124) is placed about 5 mm from the lowest lens of the condenser, in the body of the condenser. The condenser is a clear-bottom achromatic/aplanatic immersion type condenser with an aperture of 1.4, for example, the Nikon model. The microscope objective is an ×100 planachromatic objective with an aperture of 1.25, finite distance, forming the image 160 mm from the shoulder of the objective, with a focal length of about 1.8 mm, for example the Zeiss model. The distance D4 between the shoulder of the objective and the diaphragm (114) is 160 mm. The distance D3 between the diaphragm (114) and the achromat (115) is 20 mm. The achromat (115) has a focal length of 200 mm and a diameter of 30 mm and its most curved side is oriented towards the semi-transparent mirror (116). The achromat (117) has the same characteristics and its most curved side is also oriented towards the mirror (116). The distance D2 between the two achromats is 85 mm, allowing the insertion of a semi-transparent mirror (116) of sufficient dimensions. The distance between the achromat (117) and the CCD (118) is 200 mm. The lens (123) has a diameter of 4 mm and a focal length of 6 mm. The distance D9 between this lens and the optical axis is about 70 mm. The distance D8 between the achromat (115) and the center of the semi-transparent mirror (116), located on the optical axis, is about 45 mm. The laser (100) is a helium-neon laser with a wavelength in vacuum λ=633 nm, polarized in the directional orthogonal to the figure, with a power of about 0.5 mW, and a beam diameter of 0.5 mm. The CCD sensor is a square pixel sensor, the surface of the pixel being about 8.5×8.5 micrometers, and the useful surface in pixels having dimensions at least equal to 512×512 pixels. The camera delivers a CCIR video signal and a pixel clock, and its exposure time is equal to half the duration of a field, i.e. 1/50 second for a non-interleaved CCIR camera whose fields last 1/25 second. This gives a delay between the end of a field and the start of the next exposure period, a delay which can be used to modify the illumination conditions without any influence by the transition on the image. The piezoelectric positioner (122) is a prestressed piezoelectric 'stack' in the form of a cylinder whose body is fixed and whose end moves 15 micrometers for an applied voltage of 100 volts.

The calculation system is, for example, a 'PC' type computer equipped with appropriate acquisition and control cards and possibly with additional computation resources, operating for example under the Windows 95 operating system. The video signal acquisition card, operating in real time, samples the signal on 8 bits and acquires images of hpix×vpix size in which hpix and vpix are higher than 512 and multiples of 4. The pixels are sampled according to the pixel clock, hence corresponding exactly to the pixels of the CCD. The piezoelectric positioner is controlled directly by a digital/analog conversion card delivering a signal included, for example, between zero and $U_{max}$, for example with $U_{max}$=10 volts. A resistance is inserted between the output of the conversion card and the terminals of the piezoelectric actuator so as to limit the current. Its value is set so that the rise time of the voltage at the terminals of the actuator (122) is about 1 ms. The polarization rotator (104) is equivalent to a half-wave plate whose axis can turn and has two equilibrium positions separated by an angle of 45 degrees. If it is positioned so that the polarized beam is parallel to this axis in one of the equilibrium positions, it will cause the beam to turn 90 degrees in the other position. The polarization rotator is controlled by applying a bipolar voltage, −5 V, corresponding to one equilibrium position and +5 V to the other. Each terminal of the polarization rotator is connected to an 0/5 V output of a digital output card, and its two positions are controlled by applying in one case 0 V to one output and 5 V to the other, and reversing for the other position. The stepping motors (208) and (212) are also controlled by computer, via an appropriate control card and electronics. The computer is equipped with sufficient internal memory (at least 32 MB) and a hard disk of sufficient size (at least 4 GB).

5.2. Miscellaneous conventions

The following conventions will be used in the rest of this description, as well as in the other embodiments:

The letter j represents sometimes an index, sometimes the pure imaginary complex number of modulus 1. If there should be any ambiguity, the complex number j will be denoted $\bar{j}$.

The sign=symbolizes the assignment of a value right of the sign to a symbol left of the sign, or equality, depending on the situation.

The expression a+=b means a=a+b a multiplied by b is written ab, a.b or a*b

The modulus of a complex number z is denoted |z| and its conjugate is denoted $\bar{z}$.

The expression a%b will mean <<a modulo b>>

If a is a boolean integer, $\bar{a}$ is its complement, hence $\bar{0}$=1 and $\bar{1}$=0

The discrete Fourier transform, in its most usual form, transforms a Dirac located at the origin into a constant and transforms a constant into a point located at the origin. The discrete Fourier transform used throughout this patent transforms a constant into a Dirac located in the middle of the transform array and transforms a Dirac located at this point into a constant. This means that the 'zero' in frequency or in position is placed at the middle of the array and not at the origin of the array. This modified transform is obtained from the usual form by carrying out, before and after the transformation, a permutation of indices. An array E of dimension fdim is transformed as follows:

1-first permutation: E[i]=E[(i+fdim/2)%fdim]
2-usual Fourier transformation of Array E
3-inverse permutation: E[i]=E[(i+fdim/2)%fdim]

where the sign % designates the modulo.

The two-dimensional Fourier transform of an array of lines and columns is obtained by performing the one-dimensional Fourier transformation defined above on each line of the array, thus generating an intermediate array, and then performing this transformation on each column of the intermediate array to obtain the transformed array.

Similarly, the three-dimensional Fourier transform consists in carrying out successively, on each axis, one-dimensional transforms extended to the entire array.

5.3. Opera tiding principles

The value of the light wave coming from the object under a given illumination at a point of the CCD sensor is obtained from the recording of three interference patterns received on the sensor, the phase of the reference wave being shifted 120 degrees between each of these patterns.

If s is the light vibration coming from the object and r is the light vibration constituting the reference wave during the first recording, the total light vibrations reaching the sensor during the three successive recordings are:

$$s_0 = s + r, \; s_1 = s + re^{j\frac{2\pi}{3}}, \; s_2 = s + re^{-j\frac{2\pi}{3}}.$$

The intensities recorded successively are thus:

$$|s_0|^2 = |s|^2 + |r|^2 + (s\bar{r} + \bar{s}r)$$

$$|s_1|^2 = |s|^2 + |r|^2 + \left(s\bar{r}e^{-j\frac{2\pi}{3}} + \bar{s}re^{-j\frac{2\pi}{3}}\right)$$

$$|s_2|^2 = |s|^2 + |r|^2 + \left(s\bar{r}e^{-j\frac{2\pi}{3}} + \bar{s}re^{-j\frac{2\pi}{3}}\right)$$

It is possible to reverse these formulas, thus obtaining:

$$s\frac{\bar{r}}{|r|} = \frac{1}{6|r|}(2|s_0|^2 - |s_1|^2 - |s_2|^2) + j\frac{1}{2\sqrt{3}\,|r|}(|s_1|^2 - |s_2|^2)$$

The above value is the light vibration coming from the object alone, the phase reference being conventionally equal to zero for a vibration in phase with the reference wave. This calculation consequently allows the reconstitution of the complex value of the wave from the intensity recordings.

By construction, each point of the CCD sensor corresponds to a pure frequency $f_c$ of the wave coming from the sample. By optical center of the sensor is meant the point of the sensor illuminated by a ray entering the objective along a direction strictly parallel to its axis of symmetry, and by $C_x, C_y$ is denoted its coordinates in pixels. As the objective complies with the sine condition, the deflection at the exit of the objective of a ray originating at a central point of the object is proportional to the sine of its angle of entry into the objective, which is equal to $$\sin\varphi = \frac{\sqrt{f_x^2 + f_y^2}}{\sqrt{f_x^2 + f_y^2 + f_z^2}},$$

where $(f_x, f_y, f_z)$ are the coordinates of the spatial frequency vector of the beam at the entry of the objective, whose norm is $1/\lambda$ where $\lambda$ is the wavelength in the observed medium, and whose direction is that of the beam. As the rest of the optical system is paraxial, the deflection of the point of arrival of the beam on the sensor in relation to the optical center of the sensor is also proportional to this value, and hence the coordinates $(i-C_x, j-C_y)$ of this point in relation to the optical center are proportional to $(f_x, f_y)$. If the sensor has square pixels, the frequency vector at the entry of the objective of the ray which illuminates the point of the sensor having coordinates $(i,j)$ is thus equal to:

$$f_c(i, j) = \frac{1}{K\lambda}\left(i - C_x, j - C_y, \sqrt{K^2 - (i - C_x)^2 - (j - C_y)^2}\right)$$

where K is a constant to be determined. This frequency vector will be called "characteristic frequency" of the corresponding point.

Knowing the characteristic frequency of each point of the sensor and the light vibration coming from the object and received at this point, one thus obtains, for a given illumination of the sample, the frequency representation of the wave coming from this sample.

When a sufficiently thin sample which is not highly absorbing and which exhibits low index variations is traversed by a parallel laser beam, each point of the sample is subjected to a light vibration $Ae^{j2\pi f_e \cdot r}$ where $f_e$ is the spatial frequency vector of the illuminating beam and r is the position vector at the considered point of the object, the origin being taken at the virtual origin of the reference wave. The absorptivity and index variations of the sample result in the appearance of a secondary wave which is superimposed on the illuminating wave. A small volume dV creates a secondary wave $Ae^{j2\pi f_e \cdot r}u(r)dV$ where $u(r)$ is a complex coefficient whose real part depends on the local absorptivity of the sample and whose imaginary part depends on the index of the sample. The three-dimensional image of the sample generated by this microscope is the set of the values $u(r)$ at each point of the sample.

When a point of the sample, of position vector r, emits a light vibration $s(r)$ locally, the light vibration received on the sensor at a point of characteristic frequency $f_c$ is then equal to $s(r)e^{-j2\pi f_c \cdot r}$. A small volume dV of the object, of position vector r, illuminated by a plane wave having a spatial frequency $f_e$, thus creates, at the point of sensor having a characteristic frequency sensor $f_c$, a vibration $Ae^{j2\pi(f_e - f_c) \cdot r}u(r)dV$ which is superimposed on the main vibration. Integrated over the entire object, the vibration received at a point of the sensor is hence equal to: $s(P) = \iiint Ae^{j2\pi(f_e - f_c) \cdot r}u(r)dV$. This vibration is thus an element of the Fourier transform of the function $u(r)$, corresponding to the Fourier frequency $f_f = f_e - f_c$. The principle of this microscope is to record this vibration for a set of frequencies $f_e$ and $f_c$, and then to reconstitute the frequency representation of $u(r)$ and finally $u(r)$ by inverting the Fourier transform.

The samples studied are not highly absorbent and exhibit small variations in the refractive index. Consequently, the illuminating wave remains very intense and illuminates a point of the CCD, which will be called the point of impact of the illuminating wave and which is the point of the CCD at which the received light vibration is highest. If this point has the coordinates (imax,jmax) then the frequency of the illuminating wave is:

$$f_e = \frac{1}{K\lambda}\left(imax - C_x,\ jmax - C_y,\ \sqrt{K^2 - (imax - C_x)^2 - (jmax - C_y)^2}\right)$$

Figure 7:
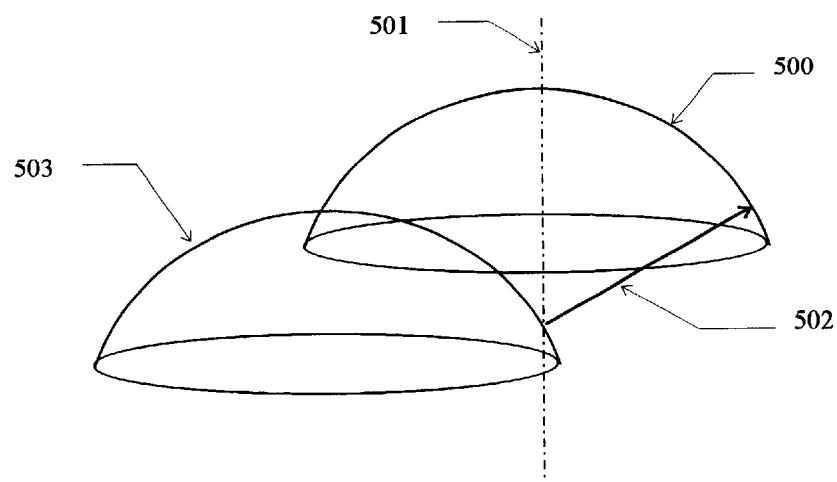
Figure 15:
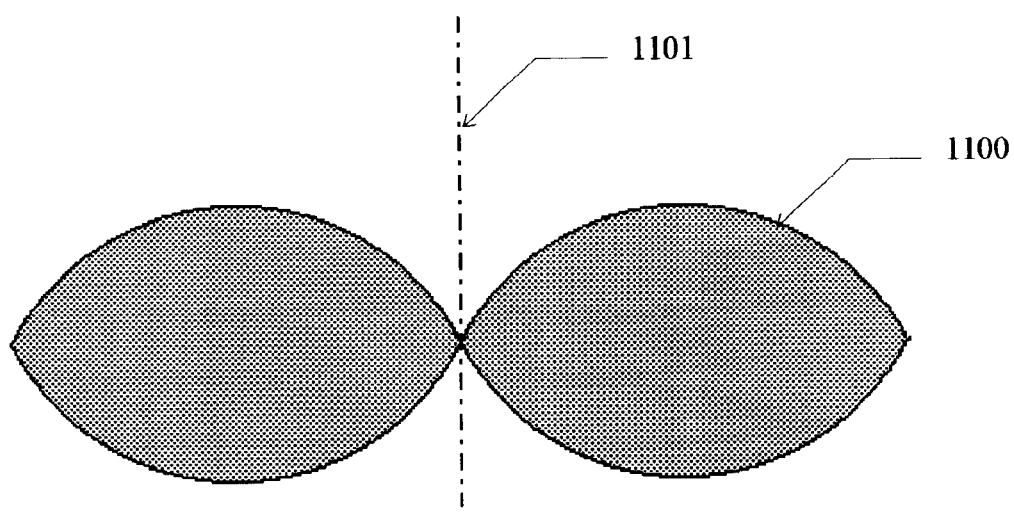
Figure 16:
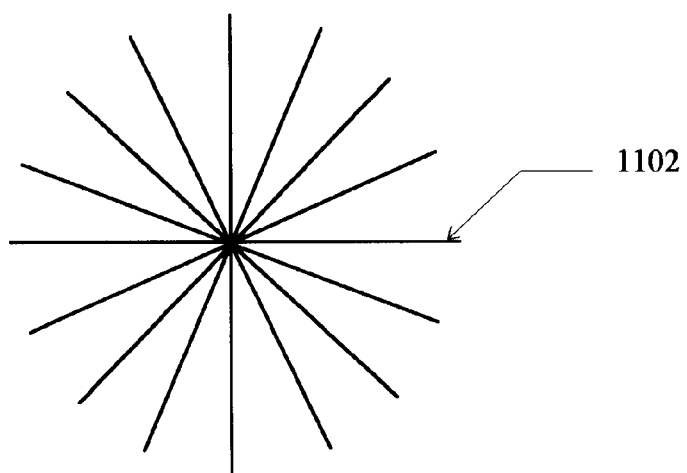

FIG. 7 shows the set (500) of all characteristic frequencies corresponding to the points of the sensor. This set is a sphere portion of radius $1/\lambda$, limited by the aperture of the objective, centered on the optical axis (501) of the system. An example of illuminating frequency vector (502) is superimposed on this set. Finally, the set (503) of the corresponding frequencies $f_f = f_c - f_e$ is deduced therefrom. When the illuminating frequencies (502) are made to vary along a circular arc (504) as indicated in FIG. 8, each position of the illuminating frequency vector corresponds to a set of frequencies $f_f$ forming a portion of a sphere. FIG. 9 shows a section of a set of such sphere portions (505) (506) and others, generated when the illuminating frequency vector is moved on the circular arc (504). When the movement of the illuminating frequency vector on the circular arc (504) becomes continuous, a volume is generated whose sectional view is represented in FIG. 15. In a top view, the circular arc (504) is represented by the segment (1102) of FIG. 16. When the extremity of the illuminating frequency vector passes through several circular arcs so as to generate a path represented in a top view in FIG. 16, the generated volume is roughly that which would be generated by rotating the surface (1100) around the vertical axis (1101). One thus obtains a three-dimensional frequency representation (and no longer a two-dimensional representation as in the case in which a single recording is used). From this three-dimensional representation in the frequency space, it is possible to generate the function $u(r)$ by taking the inverse Fourier transform.

To obtain the frequency representation of $u(r)$ from the set of two-dimensional frequency representations, at each point will be calculated the average value of the two-dimensional frequency representations reaching this point.

The calculation of the frequency representation of u(r) and then finally of u(r) can be carried out for example in six steps:

Step 1: For each illuminating wave, the two-dimensional frequency representation of the received wave is determined, which is a sphere portion of a three-dimensional space.

From a point of the CCD sensor having the coordinates (i,j), one obtains a point of the representation of the wave coming from the object, this point having the frequency $$f_c(i,j) = \frac{1}{K\lambda}\left(i - C_x, j - C_y, \sqrt{K^2 - (i-C_x)^2 - (j-C_y)^2}\right)$$

and having as complex value the complex value obtained at the considered point of the CCD sensor by the formula $$s\frac{\vec{r}}{|r|} = \frac{1}{6|r|}(2|s_0|^2 - |s_1|^2 - |s_2|^2) + j\frac{1}{2\sqrt{3}|r|}(|s_1|^2 - |s_2|^2).$$

Step 2: For each illuminating wave, one determines the frequency $f_e$ of the illuminating wave by determining the coordinates (imax,jmax) of the point of maximum intensity on the CCD sensor and applying the formula:

$$f_e = \frac{1}{K\lambda}\left(imax - C_x, jmax - C_y, \sqrt{K^2 - (imax-C_x)^2 - (jmax-C_y)^2}\right)$$

Step 3: For each illuminating wave, one translates the representation obtained after Step 1, of a vector $-f_e$ where $f_e$ is the frequency of the illuminating wave obtained after Step 2.

Step 4: For each illuminating wave, the two-dimensional frequency representation obtained after Step 3 is divided by its value at the point of coordinates (0,0). This step constitutes the phase correction operation described in 3.5.3. and is indispensable so that the two-dimensional frequency representations can be superimposed in a coherent manner.

Step 5: All the two-dimensional frequency representations obtained after Step 4 are superimposed, obtaining the frequency representation of u(r). The value assigned to a point not reached is 0 and the value assigned to a point reached is the average of the values at this point of each two-dimensional frequency representation reaching this point.

Step 6: A three-dimensional inverse Fourier transformation of the frequency representation is carried out, finally obtaining the function u(r) in spatial representation.

In practice, the steps will be carried out in a different order and in a modified form in order to optimize the calculation time and to limit the required memory space. The method actually used includes two steps, equivalent to the preceding six steps:

Acquisition phase: For each illuminating wave, this phase determines the plane frequency image obtained on the CCD sensor by applying, at each point, the formula $$s\frac{\vec{r}}{|r|} = \frac{1}{6|r|}(2|s_0|^2 - |s_1|^2 - |s_2|^2) + j\frac{1}{2\sqrt{3}|r|}(|s_1|^2 - |s_2|^2).$$

Also determined are the coordinates (imax,jmax) of the point of maximum intensity on the CCD sensor, and the entire frequency plane image obtained on the CCD sensor is divided by its value at the point of coordinates (imax, jmax).

Three-dimensional calculation phase: From each illuminating wave characterized by the values (imax,jmax), and from each point of coordinates (i,j) of the sensor, is obtained a point of the three-dimensional frequency representation with the frequency $$f_t = \frac{1}{K\lambda}\left(i - C_x, j - C_y, \sqrt{K^2 - (i-C_x)^2 - (j-C_y)^2}\right) - \frac{1}{K\lambda}\left(imax - C_x, jmax - C_y, \sqrt{K^2 - (imax-C_x)^2 - (jmax-C_y)^2}\right)$$

When a point is not reached, a zero value is assigned. When it is reached several times, the average of the values obtained each time is assigned to it. When this operation has been carried out for all the illuminating waves and all the points of the sensor, the thee-dimensional inverse Fourier transform can be taken.

This method raises a practical problem, namely that the point illuminated directly by the beam passing through the sample is illuminated much more intensely than the points corresponding to the diffracted wave. The three-dimensional representation generated when imaging contains basically the frequencies near that of the illuminating beam, the other frequencies being smothered in the noise. To remedy this drawback, use is made of a device allowing controlled attenuation of the beam. The part of the frequency representation corresponding to the frequencies on which the intensity is high is obtained with a strong attenuation, and that corresponding to the other frequencies is obtained with a weak attenuation. The values obtained with a strong attenuation are then multiplied by a complex coefficient characteristic of the phase shift and of the ratio of the illuminating wave amplitudes between the two positions of the controlled attenuation device. This controlled attenuation device consists of the polarization rotator (104) and the polarizer (105).

The three-dimensional representation obtained from images of size hpix×vpix corresponds to large file sizes. In order to limit the size of files and the calculation time, the size of the images will be divided by two by averaging during the three-dimensional representation acquisition procedure. This is equivalent to grouping the pixels 4 by 4, a group of 4 pixels on the original image being equivalent to an actual pixel used for the calculation. The size of the observable object is of course reduced accordingly. The values of $C_x$, $C_y$ and K are divided by 2 to take into account the new coordinate system. This lniitation in the size of the observed image is of course optional.

The use of the microscope proper comprises:
a focussing phase on the sample, described in paragraph 5.17.
a condenser position adjustment, described in paragraph 5.18.
a filter adjustment, described in paragraph 5.19.
the acquisition phase for the standard two-dimensional frequency representations, described above, and described in detail in paragraph 5.20.
the three-dimensional calculation phase, described above, and described in detail in paragraph 5.21.
a display phase described in paragraph 5.22.

Before being able to use this microscope, several adjustments must be made:
The adjustments of the manual positioners, described in paragraphs 5.6, 5.7, 5.8, 5.9, allow the correct adjustment of the beam path so that the image of a plane wave on the camera is actually a point image, and that the condenser indeed forms a parallel beam at its exit. In particular, the adjustment described in paragraph 5.8. allows a first adjustment of the condenser position.

The adjustment described in paragraph 5.10. allows the number of motor steps per pixel to be obtained, useful for controlling the beam deflection mirror (109).

The level of the reference wave is adjusted as indicated in paragraph 5.11.

The adjustment described in paragraph 5.12. makes it possible to obtain appropriate control voltages for the piezoelectric actuator.

The adjustment described in paragraph 5.13. allows the adjustment of the beam attenuator and makes it possible to obtain the attenuation and phase shift constants characterizing it.

The adjustment described in paragraph 5.14. enables the constant K to be obtained.

The aperture of the diaphragms and the position of the semi-transparent mirror (116) must be adjusted so as to obtain a centered image without aliasing. This adjustment is described partly in paragraph 5.14 and is completed in paragraph 5.15.

The reference wave must be recorded, as described in paragraph 5.16.

5.4. Handling of filters

Adjustment operations require constant handling of filters to adjust the intensity received on the sensor. These handling operations are not systematically described in the rest of the text.

The filter at (120) determines the intensity of the reference wave. Its value is determined in a particular adjustment phase. Subsequently, when a reference wave is necessary, the filter thus determined is inserted. When the reference wave must be eliminated, an opaque element is inserted at (120).

The filter at (103) determines the intensity of the illuminating wave. Its value depends on the ongoing adjustment operations. For most of the operations, the filter is adjusted so that the intensity received on the sensor (118) is high, without reaching saturation. For certain operations, the sensor is saturated. For others, the illuminating wave must be eliminated, which is done by inserting an opaque element.

The filter at (101) is used only for adjustment operations requiring visual monitoring of the beam, identified by its diffusion disk on a piece of white paper. The filter is then adjusted so that the diffusion disk is visible without being dangerous to the eye.

If only the illuminating wave is present, the term relative intensity of the image received on the CCD sensor will refer to the ratio of the intensity received on the sensor to the intensity at the output of the filter (103). In an operation in which the aim is to maximize the relative intensity received on the sensor, it is necessary to change filters regularly in order to keep the intensity at a level measurable by the sensor.

5.5. Programs currently used

Certain simple programs are frequently used during adjustment, without this being indicated each time:

Displacement of the mirror (109): as this mirror is motor-driven, a program is needed in order to modify its position. This program asks the user for a number of steps and an axis number corresponding either to the motor (213) or to the motor (208), and then has this motor carry out the number of steps requested.

Display of image received on the sensor: a program permits the direct display on the computer screen of the image received on the sensor (118).

Display of image and characteristics of the maximum: this program allows the direct display on the computer screen of the image received on the sensor (118). It also displays the maximum value detected by the sensor, the coordinates of the corresponding point, and the ratio between the intensity of this point and the sum of the intensities of its 8 neighbors. This program is used to check the appearance of an image, to check the non-saturation of the sensor (maximum value lower than 255), to determined the coordinates and the value of the maximum, to evaluate the point nature (punctuality) of this maximum by direct observation of the image and by the use of the displayed values: the (relative) intensity of the maximum must be as high as possible, as must also the ratio of its intensity to that of its neighbors.

5.6. Adjustment of position of laser (100) and mirror (121)

In a first phase, the illuminating wave is eliminated and the position of the sensor (100) is set so as to actually aim at the center of the mirror (121), which is verified by following the path of the beam by means of a piece of paper enabling it to be displayed. The position of the mirror (121) is then adjusted so that the reference beam actually passes through the lens (123) and reaches the camera. The reference beam must be centered on the sensor (118).

5.7. Translation adjustment of camera position and adjustment of mirror (102)

The position of the camera is adjusted in translation by sending a parallel beam directly on to the microscope objective. For this purpose, elements (106)(108)(111)(105)(104) are temporarily removed, the reference wave is eliminated, and the microscope objective is placed in a position roughly focussed on the object. The object (112) used is a transparent plate and optical oil is placed between (112) and (113). The angular position of (102) is then adjusted so that the beam reaches directly the center of the mirror (109). The position of the mirror (109) is adjusted so that the parallel beam enters directly into the objective (113) and is fine-adjusted so as to maximize the relative intensity of the signal received on the CCD sensor. The position of the CCD sensor is then adjusted in translation in the direction of the optical axis so that the image produced is a perfect point image, then adjusted in translation in the directions orthogonal to the optical axis so that this point is at the center of the useful area of the sensor. It is finally re-adjusted in translation in the direction of the optical axis.

5.8. Condenser (111) position adjustment and obtaining the position of the optical center The elements (106)(108)(111) are putback in place. Oil for the microscope is placed between (111) and (112) and between (112) and (113). A piece of white cardboard is placed on the mirror (109) to diffuse the light. The diaphragm (107) is open to the maximum position and the aperture of the diaphragm (114) is about 6 mm. The microscope objective is placed in a roughly focussed position. The position of the condenser (111) is adjusted so as to obtain on the CCD a slightly granular clear disc with the highest possible radius and with a roughly constant intensity over the entire disc. In FIG. 17, the useful area of the CCD (1200) is represented, and the clear disc (1201) stands out against this black background. A specific program is then used to determine the coordinates $C_x$, $C_y$ of the optical center and the radius R of the disc. This program determines:

the lines (1206) and (1205) constituting the right and left limits of the disc (1201).

the line (1207) defined as the middle of the lines (1206) and (1205).

the lines (1202) and (1203) constituting the upper and lower limits of the disc (1201).

the line (1204) defined as the middle of the lines (1202) and (1203).

the optical center, which is the intersection of the lines (1204) and (1207)

the radius R of the disc, equal to half the distance between the lines (1205) and (1206).

5.9. Adjustment of lens (106) position

The piece of white cardboard placed on the mirror (109) is removed. The position of the mirror is modified in order to bring the illuminated point on to the edge of the disc previously obtained. The position of the lens (106) is then adjusted along its axis so as to have the most perfect possible point image on the CCD sensor.

5.10. Determining the number of steps per pixel

The piece of paper blocking the mirror is then removed. The motor is moved along an axis by a known number of steps. The position in pixels of the point of maximum intensity is noted before and after the movement, and the number of pixels covered is deduced therefrom. The ratio $$\text{steps\_per\_pixel} = \frac{\text{number of steps}}{\text{number of pixels}}$$

is then calculated. The same is done on the other axis and the smallest ratio obtained is used.

5.11. Reference wave level adjustment

If we consider a reference wave and an illuminating wave having the same maximum intensity upon their arrival on the sensor, adding up in amplitude when they are in phase, the non-saturation requirement of the sensor is that the common amplitude of the two waves is half the amplitude saturating the sensor, or equivalently that the common intensity of the two waves is one-fourth the intensity saturating the sensor. To adjust the level of the reference wave at this value, the illuminating wave is eliminated and the value of the filter (120) is adjusted to obtain an image whose maximum level is about one-fourth the maximum level authorized by the acquisition card, i.e. in the case of a sampling on 8 bits of the video signal, a level of about 64. Before imaging, the maximum level of the illuminating wave must be adjusted in the same manner.

5.12. Piezoelectric actuator control voltage adjustment

This calibration of the piezoelectric actuator can be performed outside the system using a known interferometric method. Three positions of the actuator are used. The movement of the mirror between each position must be $$\frac{\lambda}{3\sqrt{2}}.$$

The control voltages corresponding to each position must be determined, the actuator having a regular cycle to prevent hysteresis effects.

However, it is also possible to carry out this adjustment while the actuator is in place. This allows compensation for the inaccuracy on the orientation of the mirror and provides a simple calibration procedure not requiring any specific equipment.

This is done by using a program which varies the control voltages and which is described by the algorithm of FIG. 10. Before starting the program, the position of the mirror (109) must be adjusted so that the point produced on the CCD sensor using an object consisting of a completely transparent plate is at the center of the sensor. To utilize this program, the object used must be highly diffusing. Use may be made, for example, of a piece of white paper soaked in gelatin and then placed between the plate and the cover glass. The paper must be sufficiently thick to stop the direct beam and sufficiently thin to allow the passage of a diffused beam. The diaphragm (107) is at its maximum aperture and the diaphragm (114) is adjusted for an aperture of about 0.8 mm. The reference wave then interferes on the CCD sensor with the clear disc produced by the wave coming from the object. The intensity of the illuminating wave must be adjusted so that the sensor is near its saturation limit.

If the maximum voltage applied to the actuator is Umax, the voltages corresponding to the phase shifts of $$-\frac{2\pi}{3}, 0, \frac{2\pi}{3}$$

will be respectively Umax/2−diff_bas, Umax/2, Umax/2+diff_haut, where diff_haut and diff_bas are chosen to produce the indicated phase shifts. To prevent any hysteresis effect, with each acquisition the voltage is initialized to 0, the different images are acquired in the increasing order of voltages applied to the actuator, and a final voltage Umax is finally applied so that the same cycle is always used. This cycle must also be used in the normal operating phase. Imaging with the phase shifts indicated above allows the calculation of a frequency representation by applying to each pixel P the formula $$S(P) = \left[ \frac{1}{6}\left(2I(P, 0) - I\left(P, \frac{2\pi}{3}\right) - I\left(P, -\frac{2\pi}{3}\right)\right) + j\frac{1}{2\sqrt{3}}\left(I\left(P, \frac{2\pi}{3}\right) - I\left(P, -\frac{2\pi}{3}\right)\right) \right]$$

in which the reference wave has been replaced by a constant and the expression I(P,α) designates the intensity recorded at the point P for a phase shift α.

The adjustment of the actuator control voltages consists in evaluating diff_haut and diff_bas. The principle is to obtain two frequency representations shifted by π/3 in relation to each other. The second image can be phase corrected by multiplying it by $e^{-j\pi/3}$ and the average difference between the first image and this phase-corrected image can be calculated. This difference is minimum when the voltages diff_haut and diff_bas are correctly adjusted. The phase shifts allowing the acquisition of the second elementary frequency image are thus $$-\frac{2\pi}{3} + \frac{\pi}{3}, \frac{\pi}{3}, \frac{2\pi}{3} + \frac{\pi}{3}$$

and correspond respectively, as a first approximation, to the voltages Umax/2−dif_bas+diff_bas/2, Umax/2+(diff_bas+diff_haut)/2, Umax/2+diff_haut+diff_haut/2. The adjustment program calculates the average difference for series of values of diff_haut and diff_bas and chooses those which correspond to the minimum average difference. Its algorithm is shown in detail in FIG. 10.

The basic steps of this algorithm are:

(600): Acquisition of images. The acquisition procedure is depicted in FIG. 11. By "images" is meant here six interference patterns received consecutively by the CCD sensor. This procedure always carries out the same cycle beginning with the voltage 0 and ending with the voltage Umax. The waiting time after the application of a zero voltage to the piezoelectric enables the latter to become stabilized. The waiting time before the start of the acquisition avoids the acquisition of a frame which may have been exposed before the application of the desired exposure conditions. The end of the exposure of an image is indicated on the acquisition cards by the start of the transfer of the corresponding image. The use of an exposure time shorter than the image transfer time prevents the image from being affected by transient states. Giving the process maximum priority prevents the disturbance of acquisition by other system tasks under a multitask operating system. The six images are acquired successively and in real time (no image lost) by the acquisition card in order to minimize the time during which vibrations can affect the result. Each image has the horizontal dimension of hpix and vertical dimension of vpix. During acquisition, images are transferred automatically by the acquisition card into an array which is reserved for them in the computer's central memory. Following the acquisition procedure, there is a resulting array I[a,b,i,j], the index a corresponding to the phase difference, the index b corresponding to the image (phase-shifted or not phase-shifted), the indices i and j being the coordinates in pixels and varying respectively from 0 to hpix–1 and from 0 to vpix–1.

(601): Calculation of the two frequency representations. These are stored in the arrays of complexes S0[i,j] and S1[i,j], applying the formulas:

$$S0[i, j] = \frac{1}{6}(2I[0, 0, i, j] - I[1, 0, i, j] - I[2, 0, i, j]) +$$

$$\tilde{j}\frac{1}{2\sqrt{3}}(I[1, 0, i, j] - I[2, 0, i, j])$$

$$S1[i, j] = \frac{1}{6}(2I[0, 1, i, j] - I[1, 1, i, j] - I[2, 1, i, j]) +$$

$$\tilde{j}\frac{1}{2\sqrt{3}}(I[1, 1, i, j] - I[2, 1, i, j])$$

(602): The program modifies the array S1 by multiplying each of its elements by $e^{-j\pi/3}$.

(603): The program calculates the maximum value $$\text{mod\_max} = \max_{\substack{0 \le j \le hpix-1 \\ 0 \le j \le vpix-1}} |S0[i, j]|$$

of the modulus on S0.

(604): The program calculates the standard difference between the two arrays as follows:

The program initializes ecart and nombre_valeurs to 0 and goes through all the points i,j by testing the condition (605): $|S0[i,j]| \geq 0,5$ mod_max. Each time this condition is met, it carries out the following operations (606):

ecart+=|S0[i,j]–S1[i,j]| nombre_valeurs+=1

When the program has gone through the indices (i,j) it divides the ecart by nombre valeurs (607), giving it the average difference. This difference consequently integrates only values for which the illuminating wave is sufficiently strong, in order to prevent too noisy a result. It is stored in an array.

(608): The program goes on to the next value of the pair (diff_haut,diff_bas) and reiterates the operations until the series of differences has been calculated.

(609): The program applies a low-pass filter to the array obtained in order to limit the noise due to system vibrations. The low-pass filter used is represented in the frequency domain by a step going from a value of 1 at low frequencies to a value of 0 at high frequencies, and its bandwidth is determined empirically to have a good limitation of noise without excessively deforming the curve.

(610): The array is represented graphically in order to check its shape.

(611): The value of the pair (diff_bas, diff_haut) corresponding to the minimum is shown.

The series of values of the pair (diff_bas,diff_haut) are determined as follows:

In a first stage, the program varies the values of diff_haut and diff_bas, leaving them equal to each other. For example, they may vary between 0 and $$\frac{U_{max}}{4}$$

in steps of $$\frac{U_{max}}{4096}$$

if use is made of 12 conversion bits. The result is an array of 1024 elements (the differences calculated for each value of (diff_haut,diff_bas) ) that the program filters in order to eliminate the noise (609) and which it represents graphically (610). The index value of the array corresponding to the minimum difference then corresponds to the correct value of the pair (diff_bas,diff_haut) and this pair is displayed (611).

In a second stage, the program is restarted by setting diff_bas to the value previously obtained and by varying only diff_haut. A new minimum is thus obtained, which corresponds to a more precise value of diff_haut.

In a third stage, the program is restarted by setting diff_haut to the value previously obtained and by varying only diff_bas, obtaining a more precise value of diff_bas.

The operator can reiterate these steps by varying separately and alternately diff_bas and diff_haut, but the maximum accuracy on these values is obtained quite rapidly.

5.13. Adjustment of polarizer (105) and of polarization rotator (104)

The following step consists in adjusting the position of the polarization rotator (104) and of the polarizer (105). This device is designed to provide a controlled attenuation of the illuminating beam by controlling the phase rotator, and the assembly will be called the "optical switch". It has a closed position corresponding to a low intensity through it, and an open position corresponding to a higher intensity.

The object used is the same as in the preceding step, and the adjustment of the mirror (109) and of the diaphragms is also the same. The reference wave is first eliminated. In a first stage, the polarizer is put in place and adjusted to maximize the intensity going through it and received on the sensor (118). In a second stage, the polarization rotator is put in place. The voltage corresponding to a state arbitrarily defined as closed is applied to it and it is positioned in rotation to minimize the intensity going through the entire switch. In a third stage, the reference wave is re-established and a program is used which calculates the ratio of the intensities and the phase difference between the two positions of the polarization rotator, a ratio which will be needed during the image acquisition phases in order to combine the waves corresponding to the open and closed states of the switch. The algorithm of this program is shown in FIG. 12. The stages are the following:

(800): The program first acquires the images using the acquiert_images procedure described in FIG. 13. By "images" is meant here six interference patterns received consecutively by the CCD sensor. This procedure always performs the same cycle beginning with the voltage 0 and ending with the voltage Umax. The waiting time after the application of a zero voltage to the piezoelectric allows the latter to become stabilized. The waiting time before the start of the acquisition prevents the acquisition of a frame which may have been exposed before the application of the desired exposure conditions. The end of the exposure of an image is indicated on the acquisition cards by the start of the transfer of the corresponding image. The use of an exposure time shorter than the image transfer time prevents the image from being affected by transient conditions. Giving the process maximum priority prevents the disturbance of the acquisition by other system tasks under a multitask operating system. The six images are acquired successively and in real time (no image lost) by the acquisition card in order to minimize the time during which vibrations may affect the result. Each image has the horizontal dimension of hpix and vertical dimension of vpix. During the acquisition, the images are transferred automatically by the acquisition card into the array reserved for them in the computer's central memory.

(801): The program calculates the two frequency representations S0 and S1 which differ by the state of the switch. S0 corresponds to the open switch and S1 to the closed switch.

$$S0[i, j] = \frac{1}{6}(2I[0, 0, i, j] - I[1, 0, i, j] - I[2, 0, i, j]) +$$
$$j\frac{1}{2\sqrt{3}}(I[1, 0, i, j] - I[2, 0, i, j])$$

$$S1[i, j] = \frac{1}{6}(2I[0, 1, i, j] - I[1, 1, i, j] - I[2, 1, i, j]) +$$
$$j\frac{1}{2\sqrt{3}}(I[1, 1, i, j] - I[2, 1, i, j])$$

(802): The program calculates the maximum value $$\text{mod\_max} = \max_{\substack{0 \leq j \leq hpix-1 \\ 0 \leq j \leq vpix-1}} |S0[i, j]|$$

reached by the modulus of the elements of array S0.

(803): The program calculates the average ratio between the two frequency representations. It initializes rapport and nombre_valeurs to 0 then goes through all the indices (i,j) while testing the condition (804): $|S0[i,j]| \geq 0{,}5$ mod_max When the condition has been checked, it carries out (805):

$$\text{rapport} += \frac{S0[i, j]}{S1[i, j]}$$

nombre_valeurs+=1

When all the indices i,j have been gone through, the program divides rapport by nombre_valeurs (806) which gives the sought ratio.

(807): The program calculates the average rapport_moy of the values of rapport obtained since it started.

(808): The program displays the real and imaginary parts as well as the modulus of rapport and rapport_moy.

(809): The program reiterates this procedure continuously to allow continuous adjustment. The program is ended on an instruction from the operator.

The angular position of the polarization rotator must be adjusted so that the modulus of rapport is roughly equal to 30. The program is then stopped and restarted and, after a sufficient number of iterations, the average complex value rapport_moy is noted and will serve as the basis for the following operations.

5.14. Obtaining the constant K and adjusting the diaghram (114) and the mirror (116)

K is the maximum value in pixels corresponding to the maximum spatial frequency of the wave where $1/\lambda_v$ where $\lambda_v$ is the wavelength in the observed medium, assumed to have an index equal to the nominal index $n_v$ of the objective. The nominal index of the objective is the index for which it was designed and for which it creates no spherical aberration. It is also the index of the optical oil to be used with the objective.

There are K pixels between the frequencies 0 and $1/\lambda_v$. The frequency step along an axis is thus $$\frac{1}{K\lambda_v}.$$

The frequencies vary in all from $-1/\lambda_v$ to $1/\lambda_v$ in steps of $$\frac{1}{K\lambda_v}.$$

If N is the total number of pixels along each axis taken into account for the Fourier transform, N values of frequencies are taken into account, from $$-\frac{N}{2K\lambda_v}$$

to $$\frac{N}{2K\lambda_v}.$$

After transformation, N position values are obtained with a position step equal to half the inverse of the maximum frequency before transformation.

The position step is thus $$\frac{1}{2\frac{N}{2K\lambda_v}} = \frac{K\lambda_v}{N}.$$

If we consider two points between which the distance in pixels is $D_{pix}$ and the real distance is $D_{reel}$, we have:

$$D_{reel} = \frac{K\lambda_v}{N}D_{pix}$$

so that $$K = \frac{N}{\lambda_v}\frac{D_{reel}}{D_{pix}}.$$

The wavelength to be considered here is the wavelength in the material, assumed to have an index equal to the nominal index $n_v$ of the objective or:

$$\lambda_v = \frac{\lambda}{n_v}.$$

We finally have:

$$K = \frac{n_v}{\lambda} \frac{N}{D_{pix}} D_{reel}.$$

To obtain the constant K, we produce the image of an objective micrometer for which the real distances are known, and then apply the above formula.

This is done using a focussing program which will be re-used later whenever focussing on a sample is necessary before three-dimensional imaging. The algorithm of this program is shown in FIG. 14. Its main steps are:

(1000): The program acquires an image using the acquiert_images procedure of FIG. 13. This yields an array of integers (unsigned char type for 8 bits) I[p,c,i,j] where the index p varying from 0 to 2 corresponds to the phase state, the index c varying from 0 to 1 corresponds to the state of the switch (0=open, 1=closed) and indices i and j varying from 0 to hpix−1 and from 0 to vpix−1 correspond to the coordinates of the pixel.

(1001): An array of Booleans H[i,j] is generated: it is initialized to 0 then, for each pixel, the maximum value reached by I[p,0,i,j] on the three images corresponding to the open position of the switch is calculated. If this value is equal to 255 (highest value of the digitizer), the images corresponding to the closed position of the switch must be used in calculating the frequency associated with the pixel and with its 8 immediate neighbors, and the array H[i,j] is set to 1 for these 9 pixels.

(1002): The frequency representation S[i,j] of complex numbers is generated: for each pixel, the value is generated according to the following equations:

$$S[i, j] = \left[ \frac{1}{6}(2I[0, H[i, j], i, j] - I[1, H[i, j], i, j] - I[2, H[i, j], i, j]) + \right.$$
$$\left. \tilde{j}\frac{1}{2\sqrt{3}}(I[1, H[i, j], i, j] - I[2, H[i, j], i, j]) \right](1 +$$

(rapport_moy− 1)H[i, j])

If H[i,j] is equal to 1, the complex value thus obtained is consequently multiplied by the complex number rapport_moy obtained during the switch calibration operation in order to give the final value of the element of array S[i,j], in order to take into account the phase shift and absorption induced by the switch.

(1003): The program limits the array S to dimensions of 512×512. The program then carries out optionally one or the other, or none, of the following two operations:

averaging over a width of 2, which brings the array S to an array S' of dimensions 256×256 with S'[i,j]=S[2i,2j]+S[2i+1,2j]+S[2i,2j+1]+S[2i+1,2j+1]. This averaging, coupled with a reduction in the aperture of the diaphragm (114), makes it possible to reduce the diameter of the observed area and to reduce the calculation time. It is equivalent to a low-pass filter followed by sub-sampling.

limitation of all the observed frequencies to a square of 256×256 pixels with S''[i,j]=S[128+i,128+j]. This allows a reduction in the calculation time at the cost of a reduction in resolution. However, in the present case, the program carries out neither of these two operations.

(1004): The program then performs the inverse Fourier transform of the array thus obtained.

(1005): It displays the results on the screen, extracting the modulus, the real part or the imaginary part. In the presence case, it will display the modulus. Whatever the variable displayed, the corresponding array of real numbers is first normalized either in relation to the average value or in relation to the maximum value. The program also writes on the disk the corresponding file of real values. When the real part or the imaginary part are represented, it is essential that the point of impact of the direct beam should be at (256,256) on the image of size 512×512, otherwise a modulation becomes visible. When the modulus is represented, the exact point of impact of the direct beam does not affect the result signficantly.

(1006): The program starts again during the acquisition of a new image, thus operating continuously. It stops on an instruction from the operator.

To obtain the image of the micrometer, the objective is first placed in a roughly focussed position, the micrometer having been introduced as an object. In a first step, the reference wave is eliminated, the diaphragms are at maximum aperture, and the program for the direct real-time display of the image received on the sensor is started, the filters at (103) and the polarization rotator being set to allow the passage of sufficient intensity to saturate significantly the sensor at the direct point of impact of the beam. The object is then moved in the horizontal plane by means of the corresponding positioner until the image made up of many aligned intense points characteristic of the micrometer appears. The micrometer is then correctly positioned under the objective.

The diaphragms at (107) and (114) are then set for an aperture of about 8 mm. The filters at (103) are then set so that the maximum intensity on the CCD is at a level of about a fourth of the maximum value of the digitizer, or 256/4=64. The reference wave is re-introduced. The focussing program is then started. The diaphragm (114) must be adjusted so that it is clearly visible on the displayed image, while being as open as possible. If the image is not correctly centered, it is possible to improve its centering either by modifying the orientation of the mirror (116), in which case it may be necessary to readjust the orientation of the mirror (121), or by modifying the position of the diaphragm (114). The diaphragm at (107) must be adjusted so that the observed area appears uniformly illuminated. The focussing program is then stopped, the reference wave is eliminated and the intensity of the beam is readjusted as previously. The reference wave is then re-introduced and the focussing program restarted.

The microscope objective is then moved by the focussing device so as to obtain a good image of the micrometer. To facilitate focusing, it is advisable to display the part of the micrometer where lines of different length are present. This limits "false focussing" due to interference phenomena ahead of the micrometer. Between two movements it is necessary to release the manual focussing device to obtain an image not disturbed by the vibrations. When a good image has been obtained, the program is stopped and the obtained image is used to obtain the distance in number of pixels between two lines, the metric distance between these lines being known. If the distance between two graduations separated by $D_{real}$ micrometers is the image thus obtained of $D_{pix}$ pixels, if the nominal index of the objective is $n_v$ (in general, $n_v$=1.5) and if the wavelength of the laser in vacuum is $\lambda$ ($\lambda$=0.633 micrometers) and if the number of points of the Fourier transform is N (N=512) then we have:

$$K = \frac{n_v}{\lambda} \frac{N}{D_{pix}} D_{real},$$

where of course $D_{real}$ and $\lambda$ are in the same unit.

5.15. Diaphraom adjustment

The three-dimensional image to be calculated has a side measuring 256 pixels, which allows the file sizes and calculation times to be limited. The adjustment of the diaphragm consists in re-using the focussing program, this time with the intermediate averaging option, and adjusting the diaphragm (114) so that its image is clearly visible while being as large as possible. The diaphragm (107) is then adjusted so that it is slightly more open than the minimum allowing regular illumination of the observed part of the sample.

5.16. Reference wave recording

Knowing the reference wave is essential for the precise calculation of the complex values of the wave reaching the sensor. It must be recorded independently of the constant average noise value that characterizes each pixel. A specific program is used for this purpose. In a first step, the illuminating and reference waves are eliminated and the program records the optically dark background which results on the CCD sensor. It averages the intensity obtained on 100 images to have a noise-free optically dark background. In a second step, the reference wave is re-established and the illuminating wave remains eliminated. The program records the resulting image, the average on 100 images for noise removal. The program then calculates the difference between the image of the reference wave alone and the background image, and records the resulting image in an array Iref[i,j] where i varies from 0 to hpix−1 and j varies from 0 to vpix−1.

5.17. Focussing on the studied object

This stage must be reiterated for each sample for which an image is desired. The illuminating wave is reestablished. The sample to be studied is put in place. The mirror (109) is adjusted so that the direct impact point of the illuminating beam is at the center of the sensor. The filters at (103) are adjusted so that, in the absence of a reference wave, the maximum intensity received on the CCD sensor is about 64. The reference wave is then re-established. The focussing program is started with the intermediate averaging option and the position of the objective is adjusted by means of the focussing device to obtain a clear image of the region of interest of the sample.

5.18. Adjustment of condenser position and setting of diaphragm (107)

After the focussing phase, the position of the condenser must be adjusted so that the image, in the sample, of the illuminated part of the mirror coincides with the observed part of the sample. The reference wave is removed, the illuminating beam attenuation device is placed in the open position, the filters located along the path of the illuminating beam are removed, and a wet piece of white paper is placed on the surface of the mirror (109) so as to form a diffusing surface of small thickness that may be considered assimilated with the surface of the mirror. A specific program for the display of the image received on the CCD is used. This program averages the image, for example over eight successive acquisitions, and represents, on the screen, the root of the value obtained at each point so as to make the image more visible even in the absence of a high brightness. The diaphragm (107) is first opened widely, and the position of the condenser is adjusted to obtain a homogeneous clear disc of long radius. It is then closed again gradually up to the image visibility limit, the position of the condenser being itself readjusted gradually. The final aperture of the diaphragm (107) must be clearly smaller than that determined in 5.15.

The filters are then re-introduced, the reference wave is also re-introduced, and the focussing program is started. The image of the diaphragm (114) should be seen with a central light spot corresponding to the out-of-focus (hence blurred) image of the diaphragm (107). The position of the condenser can then be adjusted in a plane orthogonal to the optical axis so that the central light spot is centered.

The diaphragm (107) is then adjusted so as to be slightly more open than the minimum allowing regular illumination of the observed area.

5.19. Filter adjustment

The filters at (103) are adjusted so that, in the absence of a reference wave and in the open position of the beam attenuator, the maximum intensity measured on the CCD sensor is about 64. It can also be useful, just before acquisition, to again adjust the position of the polarization rotator (104) and of the polarizer (101). This adjustment can be carried out using the same program as in 5.13, but leaving the observed sample in place and without modifying the adjustment of the diaphragms and filters. This adjustment allows compensation for the time-wise drift of polarization rotator characteristics.

5.20. Acquisition stare

This stage allows the acquisition of two-dimensional frequency representations from which the three-dimensional representation will be calculated. The point of direct impact of the illuminating wave is moved along a series of radii starting at the optical center and having a length Rb slightly smaller than R, for example Rb=R−6, the optical center and the radius R having been determined in stage 5.8. nbangles will be used to denote the total number of radii that will be traversed, for example nbangles=9. nbim is the number of two-dimensional frequency representations to be acquired and its value is $$nbim = \frac{Rb}{2} nbangles.$$

At each stage, the program calculates and stores in a file fich_acquis a frequency representation which will be used in the three-dimensional calculation phase. The size of the image acquired from the camera is hpix×vpix, but this size is divided by two to obtain frequency representations of dimension hel×vel, according to the intermediate averaging principle already used in the focussing program.

The acquisition program is represented in detail by the algorithm of FIG. 18 whose stages are the following:

(1300): The basic data of the acquisition are stored in file fich_acquis:

nbim: number of two-dimensional frequency representations hel=hpix/2: final number of points in the horizontal direction vel=vpix/2: final number of points in the vertical direction (1301): Waiting time allowing the absorption of vibrations created by the movement of the positioner (110). A waiting time of about 2 s can be suitable.

(1302): The program acquires the images through the acquiert_images procedure of FIG. 13. One thus obtains an array of integers (unsigned char type for 8 bits) I[p,c,i,j] where the index p varying from 0 to 2 corresponds to the phase condition, the index c varying from 0 to 1 corresponds to the condition of the switch (0=open, 1=closed) and the indices i and j varying respectively from 0 to hpix−1 and from 0 to vpix−1 correspond to the coordinates of the pixel.

(1303): An array of Booleans H[i,j] is generated: it is initialized to 0, then, for each pixel, the maximum value reached on the three images corresponding to the open position of the switch is calculated. If this value is equal to 255 (highest value of the digitizer), the images corresponding to the closed position of the switch must be used in the calculation of the frequency associated with the pixel and with its 8 immediate neighbors, and the array H is set to 1 for these 9 pixels.

(1304): Calculation of rapport_moy. The calculation of rapport_moy, already carried out during the switch calibration operation, must be performed again with each image so as to compensate for time drifts. The program first determines:

$$Vmax = \max_{(i,j) \in E1} \left| \frac{1}{6\sqrt{Iref[i,j]}} (2I[0,0,i,j] - I[1,0,i,j] - I[2,0,i,j]) + \bar{j}\frac{1}{2\sqrt{3Iref[i,j]}}(I[1,0,i,j] - I[2,0,i,j]) \right|$$

where E1 is the set of pairs (i,j) verifying H[i,j]=0
The program then calculates:

$$rapport\_moy = \frac{1}{N2} \sum_{(i,j) \in E2} \frac{\frac{1}{6}(2I[0,0,i,j] - I[1,0,i,j] - I[2,0,i,j]) + \bar{j}\frac{1}{2\sqrt{3}}(I[1,0,i,j] - I[2,0,i,j])}{\frac{1}{6}(2I[0,1,i,j] - I[1,1,i,j] - I[2,1,i,j]) + \bar{j}\frac{1}{2\sqrt{3}}(I[1,1,i,j] - I[2,1,i,j])}$$

E2 is the set of pairs (i,j) verifying H[i,j]=0 and $$\left| \frac{1}{6\sqrt{Iref[i,j]}}(2I[0,0,i,j] - I[1,0,i,j] - I[2,0,i,j]) + \bar{j}\frac{1}{2\sqrt{3Iref[i,j]}}(I[1,0,i,j]) \right| \geq coef \cdot Vmax$$

with, for example, coef=0.5. The coefficient coef can be adjusted so that E2 contains a sufficient number of points. N2 is the number of elements of E2.

(1305): The frequency representation S[i,j] of complex numbers is generated: for each pixel, the value is generated according to the following equations:

$$S[i,j] = \left[ \frac{1}{6\sqrt{Iref[i,j]}} (2I[0,H[i,j],i,j] - I[1,H[i,j],i,j] - I[2,H[i,j],i,j]) + \bar{j}\frac{1}{2\sqrt{3Iref[i,j]}}(I[1,H[i,j],i,j] - I[2,H[i,j],i,j]) \right]$$

$$(1 + (rapport\_moy - 1)H[i,j])$$

If H[i,j] is equal to 1, the complex value thus obtained is multiplied by the complex number rapport_moy obtained during the switch calibration operation to give the final value of the element of array S[i,j], in order to take into account the phase shift and absorption induced by the switch.

(1306): The point corresponding to the modulus maximum value of array S is determined. Its coordinates (i_max, j_max) are recorded.

(1307): The "saught" position is calculated, the angle having the value k.pas:

$$i\_obj = G_x + \left(k \% \left(\frac{Rb}{2}\right)\right) \cdot \cos\left(E\left(\frac{2k}{Rb}\frac{2\pi}{nbangles}\right)\right)$$

$$j\_obj = G_x + \left(k \% \left(\frac{Rb}{2}\right)\right) \cdot \sin\left(E\left(\frac{2k}{Rb}\frac{2\pi}{nbangles}\right)\right)$$

where i_obj and j_obj are coordinates of the objective position in pixels, and where the sign % designates the modulo, and where E(x) designates x rounded to the nearest integer.

The movement of the motors is calculated:

pas_i=(i_obj−i_max).pas_par_pixel pas_j=(i_obj−j_max).pas_par_pixel where pas_par_pixel is the number of steps of the motors per pixel of movement, determined experimentally during the adjustments.

(1308): One of the motors allows the movement of the direct impact point of the beam in the direction of the axis i. It must complete a number of steps pas_i in the direction corresponding to an index i increasing for the position of the direct impact point of the illuminating beam (for pas_i<0, it must complete a number of steps −pas_i in the opposite direction). The other motor allows the movement of the direct impact point of the beam in the direction of the axis j. Similarly, it must complete a number of steps pas_j.

(1309): An array of averaged frequencies is generated: Each dimension of the initial array S is divided by two to give an array $M_k$ with $$M_k[i,j] = \sum_{\substack{0 \leq p \leq 1 \\ 0 \leq q \leq 1}} S[2i+p, 2j+q]$$

(1310): The point corresponding to the modulus maximum value of array $M_k$ is determined, and its coordinates $imax_k$, $jmax_k$ and the value of this point max_moy=$M_k$[$imax_k$, $jmax_k$] are recorded.

(1311): The elements of array $M_k$ are normalized by dividing them by max_moy:

$$M_k[i,j] = \frac{M_k[i,j]}{max\_moy}$$

(1312): $imax_k$, $jmax_k$ and the frequency representation $M_k$ are stored in file fich_acquis.

(1313): The algorithm ends when the angle is equal to $2\pi$. The motor then returns to its initial position and the acquisition file fich_acquis is closed.

5.21. Three-dimensional calculation

The acquisition procedure generated two-dimensional frequency representations $M_k$, where the index k represents the order number of each representation. These representations have been averaged over a width of 2, so that the values $C_x$, $C_y$ and K must be divided by 2 to correspond to the new system of coordinates. These divided values are the ones used below. The set of two-dimensional representations may be considered to be a representation with three dimensions (i,j,k) in which the index k represents the image index and the indices i and j represent the Cartesian coordinates of each representation. In the k-th two-dimensional frequency representation:

The relation between the coordinates and the characteristic frequency is:

$$K\lambda f_c = [i - C_x, j - C_y, \sqrt{K^2 - (i - C_x)^2 - (j - C_y)^2}]$$

The relation between the coordinates and the illuminating frequency is:

$$K\lambda f_e = [i\max_k - C_x, j\max_k - C_y, \sqrt{K^2 - (i\max_k - C_x)^2 - (j\max_k - C_y)^2}]$$

The relation between the coordinates and the total frequency is thus:

$$K\lambda f_t = [i - i\max_k, j - j\max_k, \sqrt{K^2 - (i - C_x)^2 - (j - C_y)^2} - \sqrt{K^2 - (i\max_k - C_x)^2 - (j\max_k - C_y)^2}]$$

The three-dimensional calculation procedure consists in principle in generating during a first stage a three-dimensional representation in the form of an array F of dimensions fdim×fdim×fdim where fdim=512, then in taking the Fourier transform to obtain an array U of the same dimensions corresponding to the representation u(r), and in which the indices thus correspond to the position vector. The representation F is an array in which the indices represent the coordinates of $K\lambda f_T$, the zero being brought by translation to the point of coordinates (fdim/2,fdim/2,fdim/2). One thus obtains, from each point of coordinates i,j of a two-dimensional representation $M_k$, a point of the three-dimensional representation by:

$$F[ni,nj,nk] = M_k[i,j]$$

where:

$$ni = i - i\max_k + \frac{fdim}{2}$$

$$nj = j - j\max_k + \frac{fdim}{2}$$

$$nk = \sqrt{K^2 - (i - C_x)^2 - (j - C_y)^2} - \sqrt{K^2 - (i\max_k - C_x)^2 - (j\max_k - C_y)^2} + \frac{fdim}{2}$$

When a point of array F, of coordinates (ni,nj,nk), is obtained successively from several distinct two-dimensional representations, the value of F taken at this point is the average of the values obtained from each of the two-dimensional representations. When this point is never obtained, a zero value is assigned.

When the array F has been generated, the array U can be obtained by means of the inverse three-dimensional Fourier transform.

This method can be applied directly if the program has a sufficient random-access memory. The program whose algorithm is described in FIG. 19 however makes it possible to carry out the calculations on a system whose RAM is limited, the files being stored on a sequential-access medium (hard disk).

For practical reasons, part of the Fourier transformation will be carried out as the array F is being generated, so that it is consequently never really generated.

The program works in five stages. Each stage uses an input file stored on the hard disk of the computer and generates an output file also stored on the hard disk, whose name is italicized in the figure. The program could theoretically carry out more directly the operations necessary for the generation of the three-dimensional image, but the size of the files involved is too large to enable them to be contained entirely in a computer memory. It is thus necessary to manage their storage on disk. As the reading/writing of file elements on disk takes place faster if the elements are stored contiguously, the program must be designed to read and write on the disk only blocks of a sufficient size. This is what the described algorithm renders possible, whereas a direct method would require reading/writing to non-contiguous addresses and would not be practicable owing to the time lost in disk accesses. The stages of the algorithm are the following:

(1400): Centering of two-dimensional frequency representations:

This procedure consists in translating the two-dimensional representations to go from a representation in the system of coordinates (i,j,k) to a representation in the system (ni,nj,k) where ni=i−imax+fdim/2,nj=j−jmax+fdim/2, the dimensions following ni and nj in the array thus generated being fdim×fdim. The algorithm of this part is represented in FIG. 21. The stages are the following:

(1600): The values of hel,vel,nbim are read in the file fich_acquis.

(1601): The frequency representation $M_k$ corresponding to the index k is transferred to central memory with the corresponding values $i\max_k$ and $j\max_k$.

(1602): A translated frequency representation $T_k$ of dimensions fdim×fdim is generated with:

$$.T_k[ni,nj] = M_k[ni - fdim/2 + i\max_k, nj - fdim/2 + j\max_k]$$

when $$0 \leq ni - fdim/2 + i\max_k \leq hel - 1 \text{ and } 0 \leq nj - fdim/2 + j\max_k \leq hel - 1.$$

.$T_k[ni,nj]=0$ in the other cases.

FIG. 20 shows an image of an origin with its point of coordinates ($i\max_k$, $j\max_k$) and an arbitrary drawing around this point, and the new translated image.

(1603): The values of $i\max_k$, $j\max_k$, and the representation $T_k$ are stored in the file fich_centré in the following order:
$i\max_k, j\max_k, T_k[0,0], T_k[1,0], \ldots T_k[fdim-1,0],$
$i\max_k, j\max_k, T_k[0,1], T_k[1,1], \ldots T_k[fdim-1,1], \ldots$
$i\max_k, j\max_k, T_k[0,fdim], T_k[1,fdim], \ldots T_k[fdim-1,fdim-1],$ Note that $i\max_k$ and $jmck_k$ are repeated on each line of $T_k$ in the file fich_centré. This makes it possible for these data, indispensable for the index change k→nk, to remain available after the axis exchange operation.

(1604): The process is repeated as long as k is less than nbim.

(1401): Exchange of "plane" and "line" axes

The change of indices i→ni and j→nj having been carried out, it remains to perform the change of index k→nk. To carry out this change of index in a reasonable time, it is necessary to be able to load into central memory, rapidly, a plane (ni,k). For this operation to be possible, it is previously necessary to exchange the axes k and nj. This is what this algorithm does.

The file fich_centré previously created is reread, the order of the data is modified and a file fich_ech1 is written in which the data are in the following order:

$imax_0,jmax_0,T_0[0,0],T_0[1,0], \ldots T_0[\text{fdim}-1,0]$,
$imax_1,jmax_1,T_1[0,0],T_1[1,0], \ldots T_1[\text{fdim}-1,0], \ldots$
$imax_{nbim-1},jmax_{nbim-1},T_{nbim-1}[0,0],T_{nbim-1}[1,0], \ldots T_{nbim-1}[\text{fdim}-1,0]$,
$imax_0,jmax_0,T_0[0,1],T_0[1,1], \ldots T_0[\text{fdim}-1,1]$,
$imax_1,jmax_1,T_1[0,1],T_1[1,1], \ldots T_1[\text{fdim}-1,1], \ldots$
$imax_{nbim-1},jmax_{nbim-1},T_{nbim-1}[0,1],T_{nbim-1}[1,1], \ldots T_{nbim-1}[\text{fdim}-1,1], \ldots$
$imax_0,jmax_0,T_0[0,\text{fdim}-1],T_0[1,\text{fdim}-1], \ldots T_0[\text{fdim}-1,\text{fdim}-1]$,
$imax_1,jmax_1,T_1[0,\text{fdim}-1],T_1[1,\text{fdim}-1], \ldots T_1[\text{fdim}-1,\text{fdim}-1], \ldots$
$imax_{nbim-1},jmax_{nbim-1},T_{nbim-1}[0,\text{fdim}-1],T_{nbim-1}[1,\text{fdim}-1], \ldots T_{nbim-1}[\text{fdim}-1,\text{fdim}-1,]$ In other words, the axes nj and k are exchanged. This axis exchange operation is carried out block by block. FIG. 22 represents symbolically (1700) the content of a three-dimensional file corresponding to indices i,j,k, arranged in memory horizontal plane by horizontal plane and each plane being arranged line by line, one line being in the direction of the depth in the drawing. The axes i,j,k and the origin 0 of the coordinate system are indicated in the drawing. The content of the file obtained by inverting the axes j and k is represented in (1702). The transfer of data from one file to another takes place block by block, block (1701) being copied into central memory and then transferred at (1703). The reading and writing of the blocks takes place horizontal plane by horizontal plane, a horizontal plane in the file read not corresponding to a horizontal plane in the file written. The size of the block is the maximum size that the internal memory of the computer can hold. The operation is repeated for all the blocks, the blocks located "on the edge" generally not having the same dimension as the others. This procedure enables the exchange of axes with a computer whose internal memory size is smaller than that of the files used.

The procedure in C language (Microsoft C/C++ under Windows 95) which permits this operation is the following:

```
void echange_axes(FILE* read_file,FILE* write_file,int ktot,int jtot,int itot,int memory_limit)
{
int knum,jnum,bknum,bjnum,keff,jeff,k,j,bk,bj;
char* buff;
knum=(int)sqrt(((double)memory_limit)/((double)itot));
jnum=knum;
buff(char*)malloc(itot*knum*jnum);
bknum=ktot/knum;
if knum*bknum!=ktot) bknum+=1;
bjnum=jtot/jnum;
if(jnum*bjnum!jtot) bjnum+=1;
for (bk=0;bk<=bknum-1;bk++)
for (bj=0;bj<=bjnum-1;bj++)
{
   if (bk==(bknum-1)) keff=ktot-knum*(bknum-1); else keff=knum;
   if (bj==(binum-1)) jeff=tot-jnum*(bjnum-1); else jeff=num;
   for (k=0;k<=keff-1;k++)
   for (j=0;j<=jeff-1;j++)
   {
      fseek(read_file,(bk*knum+k)*jtot*itot+(bj*jnum+j)*itot,SEEK_SET);
      fread(buff+k*jeff*itot+j*itot, 1, itot, read_file);
   }
   for (j=0;j<=jeff-1;j++)
   for (k=0;k<=keff-1;k++)
   {
      fseek(write_file,(bj*jnum+j)*ktot*itot+(bk*knum+k)*itot,SEEK_SET);
      fwrite(buff+k*jeff*itot+j*itot, 1, itot, write_file);
   }
}
free(buff);
}
```

The parameters to be passed to this procedure are:
read_file: pointer to filed fich_centré
write_file: pointer to file fich_ech1
ktot: total number of images nbim
jtot: total number of lines in the frequency representation: fdim
itot: size in bytes of a line: fdim*sizeof(complex)+2*sizeof(int), where sizeof(complex) designates the size in bytes of a complex number ($T_k[ij]$ for example) and sizeof(int) the size in bytes of an integer number ($imax_k$ for example).
memory_limit: maximum size in bytes of the random-access memory (RAM) available to the procedure for the storage of blocks.

The files must be opened in "committed" mode, i.e. the read/write operations are carried out directly from or towards the hard disk, without intermediate buffering in central memory.

(1402): Calculation phase

The purpose of this calculation phase is to replace the "image" index k by the index nk given by the formula:

$$nk = \frac{fdim}{2} + \sqrt{K^2 - (i - C_x)^2 - (j - C_y)^2} - \sqrt{K^2 - (imax_k - C_x)^2 - (jmax_k - C_y)^2}$$

where i,j are the coordinates in the original system of coordinates (before centering). In the centered system of coordinates we thus have:

$$nk = \sqrt{K^2 - (ni - fdim/2 + imax_k - C_x)^2 - (nj - fdim/2 + jmax_k - C_y)^2} - \sqrt{K^2 - (imax_k - C_x)^2 - (jmax_k - C_y)^2} + \frac{fdim}{2}$$

When the same indices (i,j,k) are obtained several time by the replacement of the image index, the value taken for the corresponding element of the three-dimensional frequency representation is the average of the values for which the indices (i,j,k) are obtained.

A point of the three-dimensional frequency representation, with coordinates (ni,nj,nk), can only be obtained by this change of coordinates from a given plane (ni,k) corresponding to its index nj. The planes (ni,k) can consequently be processed independently of each other. When, in a plane (ni,k), the index k has been replaced by the index nk, it is possible to directly take the inverse two-dimensional Fourier transform of this plane before going on to the next plane. This is what is done by this part of the program, whose algorithm is represented in detail in FIG. 23. Its main stages are:

(1800): The following elements are read in the file fich_ech1 and transferred to internal memory:

imax$_0$,jmax$_0$,T$_0$[0,nj],T$_0$[1,nj], ... T$_0$[fdim−1,nj],
imax$_0$,jmax$_0$,T$_1$[0,nj],T$_1$[1,nj], ... T$_1$[fdim−1,nj], ...
imax$_{nbim−1}$,jmax$_{nbim−1}$,T$_{nbim−1}$[0,nj],T$_{nbim−1}$[1,nj], ...
T$_{nbim−1}$[fdim−1,nj]

(1801): The arrays D$_{nj}$ and Poids, having dimensions fdim×fdim, are initialized to 0.

(1802): The following condition is tested:

$$(ni - fdim/2 + imax_k - C_x)^2 + (nj - fdim/2 + jmax_k - C_y)^2 < \left(K\frac{o}{n}\right)^2$$

where o is the aperture of the microscope, and n the index of the optical oil and of the cover glass used, i.e. approximately:

$$\frac{o}{n} = \frac{1.25}{1.51}.$$

If the condition is true, the point corresponds to a frequency vector which is not beyond the aperture of the objective and is thus within the observable area.

(1803): The value nk is calculated by the formula:

$$nk = \sqrt{K^2 - (ni - fdim/2 + imax_k - C_x)^2 - (nj - fdim/2 + jmax_k - C_y)^2} - \sqrt{K^2 - (imax_k - C_x)^2 - (jmax_k - C_y)^2} + fdim/2$$

(1804): The corresponding frequency value is added to the array D$_{nj}$. The corresponding element of the array of weights, which will be used to calculate the average value, is incremented.

$$D_{nj}[ni,nk] += T_k[ni,nj]$$

$$Poids[ni,nk] += 1$$

(1805): When all the indices ni,nk have thus been covered, the program goes through all the indices ni and nk while testing the condition Poids[ni,nk]≠0 and, each time this condition is met, it performs:

$$D_{nj}[ni, nk] = \frac{D_{nj}[ni, nk]}{Poids[ni, nk]}$$

(1806): The program performs the inverse two-dimensional Fourier transform of the array D$_{nj}$.

(1807): It stores the transformed array in the output file fich_calc in the following order:
D$_{nj}$[0,0],D$_{nj}$[1,0], ... D$_{nj}$[fdim−1,0],
D$_{nj}$[0,1],D$_{nj}$[1,1], ... D$_{nj}$[fdim−1,1], ...
D$_{nj}$[0,fdim−1],D$_{nj}$[1,fdim−1], ... D$_{nj}$[fdim−1,fdim−1]

(1403): Second exchanges of axes

At this level, it remains to carry out an inverse Fourier transform with a single dimension along the axis nj. In order to be able to carry out this transformation in a reasonable time, it is necessary to previously exchange the axes nj and nk. The program will then be able to load into central memory complete planes (ni,nj) in order to process them.

In the file fich_calc the data are arranged in the following order:
D$_0$[0,0],D$_0$[1,0], ... D$_0$[fdim−1,0],
D$_0$[0,1],D$_0$[1,1], ... D$_0$[fdim−1,1], ...
D$_0$[0,fdim−1],D$_0$[1,fdim−1], ... D$_0$[fdim−1,fdim−1],
D$_1$[0,0],D$_1$[1,0], ... D$_1$[fdim−1,0],
D$_1$[0,1],D$_1$[1,1], ... D$_1$[fdim−1,1], ...
D$_1$[0,fdim−11],D$_1$[1,fdim−1], ... D$_1$[fdim−1,fdim−1], ...
D$_{fdim−1}$[0,0],D$_{fdim−1}$[1,0], ... D$_{fdim−1}$[fdim−1,0],
D$_{fdim−1}$[0,1],D$_{fdim−1}$[1,1], ... D$_{fdim−1}$[fdim−1,1], ...
D$_{fdim−1}$[0,fdim−1],D$_{fdim−1}$[1,fdim−1], ... D$_{fdim−1}$[fdim−1,fdim−1]

This file is reread, and a file fich_ech2 is generated, in which the data are rewritten in the following order:
D$_0$[0,0],D$_0$[1,0], ... D$_0$[fdim−1,0],
D$_1$[0,0],D$_1$[1,0], ... D$_1$[fdim−1,0], ...
D$_{fdim−1}$[0,0],D$_{fdim−1}$[1,0], ... D$_{fdim−1}$[fdim−1,0],
D$_0$[0,1],D$_0$[1,1], ... D$_0$[fdim−1,1],
D$_1$[0,0],D$_1$[1,1], ... D$_1$[fdim−1,1], ...
D$_{fdim−1}$[0,1],D$_{fdim−1}$[1,1], ... D$_{fdim−1}$[fdim−1,1], ...
D$_0$[0,fdim−1],D$_0$[1,fdim−1], ... D$_0$[fdim−1,fdim−1],
D$_1$[0,fdim−1],D$_1$[1,fdim−1], ... D$_1$[fdim−1,fdim−1], ...
D$_{fdim−1}$[0,fdim−1],D$_{fdim−1}$[1,fdim−1], ... D$_{fdim−1}$[fdim−1,fdim−1]

This exchange of axes nj and nk is carried out by blocks as in the previous exchange of axes. The same procedure is used, the parameters to be processed being:
read_file: pointer to file fich_calc
write_file: pointer to file fich_ech2
ktot: fdim
jtot: fdim
itot: Size in bytes of a line: fdim*sizeof(complex) where sizeof(complex) designates the size in bytes of a complex number.
memory_limit: as previously, the size in bytes of the available memory.

(1404): Last Fourier transformation

This procedure consists in performing the inverse Fourier transform along the axis nj. It is an iterative process on the index nk. The algorithm of this part of the program is represented in FIG. 24. Its basic stages are the following:

(1900): The program loads the following values into internal memory:
D$_0$[0,nk],D$_0$[1,nk], ... D$_0$[fdim−1,nk],
D$_0$[0,nk],D$_1$[1,nk], ... D$_1$[fdim−1,nk], ...
D$_{fdim−1}$[0,nk],D$_{fdim−1}$[1,nk], ... D$_{fdim−1}$[fdim−1,nk]

(1901): The program generates an array E$_{nk,ni}$ with one dimension:
E$_{nk,ni}$[nj]=D$_{nj}$[ni,nk]

It performs the inverse Fourier transform of this array, generating the array Ẽ$_{nk,ni}$ (1902): It stores the results in the file fich_rep, in the following order:
Ẽ$_{nk,0}$[0],Ẽ$_{nk,1}$[0], ... Ẽ$_{nk,fdim−1}$[0],
Ẽ$_{nk,0}$[1],Ẽ$_{nk,1}$[1], ... Ẽ$_{nk,fdim−1}$[1], ...
Ẽ$_{nk,0}$[fdim−1],Ẽ$_{nk,1}$[fdim−1], ... Ẽ$_{nk,fdim}$[fdim−1]

The file thus generated then contains the three-dimensional representation of the object in the format U[ni,nj,nk] in which the complex element U[ni,nj,nk] is arranged in the file fich___rep at the address (nk*fdim*fdim+nj*fdim+ni) counted from the start of the file, the addressing taking place by "complex number" type elements.

5.22. Display

The array U having been generated, its content can be displayed.

The simplest display consists in extracting a section, one of the indices being fixed at a constant value. On this section, the real part, the imaginary part or the modulus can be displayed. For example, to extract a section in an imaginary part with nk constant, the program first generates the array V[ni,nj]=Re(U[ni,nj,nk]) in which nk has a fixed value, and in which Re(x) designates the real part of x. It then determines the minimum and maximum values of the array $$V, \text{ i.e. } V_{\min} =, \min_{ni,nj}(V[ni, nj]),$$

$$V_{\min} = \min_{ni,nj}(V[ni, nj]).$$

It then generates an array of pixels to be displayed on the screen (bitmap), the gray level of a given pixel with coordinates ni,nj being:

$$val[ni, nj] = \frac{V[ni, nj] - V_{\min}}{V_{\max} - V_{\min}}.$$

Another display method consists in extracting projections therefrom. The displayed image depends to a great extent on the type of projection used.

For example, for a projection of the real part along the axis nk, by integration, the array V will be represented with $$V[ni, nj] = \sum_k \text{Re}(U[ni, nj, nk]),$$

where Re(x) designates the real part of x, the sum over nk being taken between two "limit" planes depending on what is to be represented, and the array V being represented as previously.

For a projection of the real part along the axis nk, by extraction of the maximum in absolute value, the array V will be represented with:

$$V[ni, nj] = \max_{nk}(|\text{Re}(U[ni, nj, nk])|)$$

In these two cases, it is possible to represent the array V on the screen according to the method already used for the representation of a section, i.e.

$$val[ni, nj] = \frac{V[ni, nj] - V_{\min}}{V_{\max} - V_{\min}}$$

in which $V_{min}$ and $V_{max}$ are respectively the minimum and maximum values of V.

Even though the example used was of sections with nk fixed and projections along nk, these sections and projections can be carried out along any direction, including oblique directions.

As a significant part of the frequency representation was not acquired, there are a certain number of resulting defects in the images obtained under spatial representation, which depend on the type of image represented. In general, the defects are less significant for a top view. In the particular case of the projection by integration, the produced image will remain of good quality up to a limit angle of the projection direction with respect to the vertical: the projection direction must form with the vertical an angle sufficiently smaller than $$\text{Arc sin}\left(\frac{ouv}{n_v}\right).$$

In the case of the projection by extraction of the maximum, defects will be present whatever the angle of observation. On the other hand, projection by extraction of the maximum is less sensitive to gaussian noise than projection by integration.

In the case of the projection by integration, a fast method may be obtained for the projection. This method requires storage in memory of the frequency representation of the object. The latter may have been obtained, for example, as indicated in 5.21 but without taking the Fourier transforms described in (1806) and in (1901). The fast method comprises two stages:

Stage 1: extraction, frequency representation, of a plane passing through the origin and orthogonal to the projection direction.

Stage 2: inverse Fourier transformation of this plane.

The two-dimensional array thus obtained constitutes a projection along the direction used to extract the frequency plane.

It is possible to generate a stereoscopic view by extracting two projections along appropriate directions and using the anaglyph method, for example, to view them. In this case, the use of the fast method makes it possible, if the computer has a sufficient memory for storing the three-dimensional representation, to modify in "real time" the observation angle of an image precalculated in frequency representation form.

6. DESCRIPTION OF A SECOND EMBODIMENT

This embodiment is a simple variant of the first and is represented in FIG. 25.

6.1. Principle

In the first embodiment, the sensor (118) is in the back (image) focal plane of the optical assembly made up of the objective (113) and lenses (115) and (117). The plane illuminating wave thus has a point image in this plane, and a spherical reference wave centered virtually on the object must be used to obtain homogeneous illumination on the sensor (118). In this second embodiment, the sensor (2018) is placed directly in the image plane of the objective. A plane illuminating wave consequently no longer has a point image. The reference wave must be the image through the objective of a virtual plane wave passing through the object.

An image in complex numbers is obtained on the CCD (2018) from three images differing in the phase of the reference wave, using, as in the first embodiment, the formula $$s\frac{\vec{r}}{|r|} = \frac{1}{6|r|}(2|s_0|^2 - |s_1|^2 - |s_2|^2) + j\frac{1}{2\sqrt{3}\,|r|}(|s_1|^2 - |s_2|^2)$$

The two-dimensional Fourier transform of this image gives an image in complex numbers equivalent to that which, in the first embodiment, was obtained directly in the plane of the CCD sensor. This image thus replaces the image obtained directly on the sensor in the first embodiment. For the rest, this embodiment uses the same principles as the first.

6.2. Equipment description

The system is represented in FIG. 25. The elements of this figure, identical to those of FIG. 1, are numbered by replacing the first digit 1 of the elements of FIG. 1 by the digit 20. For example (116) becomes (2016). This system is similar to the one used in the first embodiment, except that:

The device for controlled attenuation of the beam, made up of the elements (104) and (105) is eliminated.

The CCD (2018) is placed in the plane in which the diaphragm (114) was previously located, and consequently the elements (114) (117) (115) are eliminated.

The virtual image, after reflection on the semi-transparent mirror (2016), of the focussing point of the beam coming from the lens (2023), must be located on the optical axis and in the rear focal plane of the objective (2013). The elements (2023)(2022)(2021)(2016) are thus moved so as to meet this condition.

On the CCD sensor CCD (2018), the size of the basic cell (distance between the central points of two neighboring pixels) must be less than $$\frac{\lambda}{2} \frac{g}{ouv},$$

where ouv designates the numerical aperture of the objective, $\lambda$ the wavelength in vacuum of the laser used, g the magnification. For example, for an ×100 objective with an aperture of 1.25 we find 25 micrometers. It is possible to use an objective modified to have an ×50 magnification, in order to obtain 12 micrometers, thus allowing the use of a current camera with 10-micrometer graduations in a more optimum manner than with an ×100 objective.

The lens (2023) is mounted on a positioner allowing translation along the axis of the beam entering this lens.

6.3. Adjustments: overall view

In the preceding embodiment, the image received on the sensor was in the frequency domain. An image in the spatial domain could if necessary be obtained from that frequency domain image by two-dimensional inverse Fourier transform, which was done by the focussing program described in FIG. 14. In this second embodiment, the image received on the sensor is in the spatial domain and an image in the frequency domain can be obtained by Fourier transform.

Each time the two-dimensional frequency image received directly on the CCD sensor (118) was used, it is necessary to use the two-dimensional Fourier transform of the image received on the CCD sensor (2018), which constitutes a frequency image which can have a dimension of 256×256 square pixels. Conversely, the focussing program must be replaced by a program for direct display of the image received on the CCD sensor.

As the beam attenuation device is eliminated, a single image must be used instead of two in the stages in which this device was used.

The camera (2019) is fixed. The adjustment of this camera's position along the optical axis is replaced by an adjustment of the position of the lens (2023) along the axis of the beam entering this lens. The camera position adjustment in the plane orthogonal to the optical axis is replaced by an angular adjustment of the mirror (2016).

For the rest, the operating procedure is similar to that of the previous system. The adjustment stages and the programs used are given in detail below:

6.4. Current usage program

In addition to the programs described in 5.5., use is made of a frequency image display program. This program generally replaces the direct display program used in the first embodiment, which allowed the observation of an image in the frequency domain. To use this program, a reference wave must be used, whereas in the direct display program used in the first embodiment it was not necessary. When this program is used, it is necessary to avoid vibrations and hence to release at least temporarily the focussing device if it is used, or wait for the absorption of the vibration before each image when stepping motors are used.

This program is similar to the focussing program described in 5.14 and whose algorithm is given in FIG. 14. It is modified as follows:

The image acquisition stage (1000), represented in detail in FIG. 13, is modified as indicated in FIG. 26, in order to take into account the absence of the beam attenuation device.

The stage (1001) is eliminated.

The stage (1002) is modified to take into account the absence of the array H. For each pixel, the value is generated according to the following equations:

$$S[i, j] = \left[\frac{1}{6}(2I[0, i, j] - I[1, i, j] - I[2, i, j]) + j\frac{1}{2\sqrt{3}}(I[1, i, j] - I[2, i, j])\right]$$

During the stage (1002) the program limits the array S to dimensions of hpix×hpix but does not perform any averaging.

The stage (1004) is replaced by a direct Fourier transform.

During the stage (1005), the program displays the intensity, corresponding to the square of the modulus of the elements of the transformed array S, as well as the maximum value of this intensity, the coordinates of the corresponding point and the ratio between the intensity of this point and the sum of the intensities of its eight neighbors.

This program makes it possible to determine the point nature (punctuality) and the general appearance of a frequency image. On the other hand, to determine non-saturation (which must be checked in almost all the stages, a fact which will no longer be mentioned), the programs described in 5.5. continue to be used, and the non-saturation must be verified directly on the CCD sensor CCD (2018).

6.5. Adjustment of position of laser (2000) and mirror (2021)

This stage is similar to the stage described in 5.6.

6.6. Adjustment of piezoelectric actuator control voltages

The process is the same as the one described in 5.12., except that there is no adjustment of the diaphragm (114) which is eliminated and the position of (2009) is adjusted so as to maximize the intensity received on the sensor. The fact that the image received directly by the sensor is in the spatial domain does not affect the result.

6.7. Adjustment of reference wave level

This stage is identical to the one described in 5.11, the level of the reference wave being measured on the direct image.

6.8. Position adjustment of (2023) (2002) (2016)

This adjustment is similar to the one described in 5.7. The direct display program is replaced by the frequency image display program described in 6.4, for which the presence of the reference wave is necessary. The adjustment of the camera position along the optical axis is replaced by an adjustment of the position of the lens (2023) along the axis of the beam entering this lens. The camera position adjustment in the plane orthogonal to the optical axis is replaced by an angular adjustment of the mirror (2016).

6.9. Adjustment of condenser position (2011)

This adjustment is similar to the one described in 5.8. but it is the frequency image which must be observed in the presence of the reference wave, and not the direct image in the absence of the reference wave.

6.10. Adjustment of position of lens (2006)

This adjustment is similar to the one described in 5.9. but it is the frequency image which allows punctuality to be evaluated.

6.11. Determination of number of steps per pixel

This stage is similar to the one described in 5.10. but the maximum intensity pixel is observed on the frequency image.

6.12. Obtaining the constant K

This stage is carried out on the same principle as the one described in 5.14. but is modified to take into account the inversion between direct image and frequency image.

To obtain the image of the micrometer, the objective is first placed in a roughly focussed position, the micrometer having been introduced as the object. The program for the direct display of the image received on the CCD is started, in the absence of a reference wave. The diaphragm at (2007) must be adjusted so that the observed area appears uniformly illuminated. The micrometer is moved under the objective until an image thereof is obtained.

The microscope objective is then moved by the focussing device so as to obtain a correctly focussed image. To facilitate focussing, it is advantageous to display a part of the micrometer in which lines of different lengths are present. This limits "false focussing" due to interference phenomena ahead of the micrometer.

When a good image has been obtained, the program is stopped and the obtained image is used to obtain the distance in number of pixels between two lines, as in 5.14. If the distance between two graduations separated by $D_{real}$ micrometers is on the image thus obtained of $D_{pix}$ pixels, if the nominal index of the objectives is $n_v$ (in general, $n_v$ is close to 1.5) and if the wavelength of the laser in vacuum is $\lambda$ ($\lambda=0.633$ micrometers) and if the number of points of the Fourier transform which will be used for image acquisition is N (N=256) then we have:

$$K = \frac{n_v}{\lambda} \frac{N}{D_{pix}} D_{real},$$

in which $D_{real}$ and $\lambda$ are in the same unit.

6.13. Adjustment of diaphragm

This stage is similar to the one described in 5.15. but the focussing program is replaced by a direct display of the image received on the sensor in the absence of a reference wave.

6.14. Recording of reference wave

This stage is similar to the one described in 5.16. The reference wave alone is recorded on the direct image.

6.15. Focussing on studied object

This stage is simplified, the specific focussing program being replaced by a program for the direct display of the image received on the CCD sensor in the absence of a reference wave.

6.16. Adjustment of condenser position and adjustment of diaphragms

This stage is similar to the one described in 5.18. but:
the frequency image is now obtained in the presence of the reference wave by Fourier transformation of the image received directly on the CCD sensor, and not directly as in 5.18.;
by contrast, the image of the object in the spatial domain is now obtained directly and not by Fourier transformation of the image received on the CCD sensor.

6.17. Adjustment of filters

The filters are adjusted so that the image formed on the CCD by the illuminating wave alone has a maximum intensity of 64.

6.18. Image acquisition

This stage is similar to the one described in 5.20. but the following modifications must be taken into account:
stage (1302) is replaced by the acquisition of images described in FIG. 26
stage (1303) is eliminated.
stage (1304) is modified: the complex numbers representation S[i,j] is generated by assigning to each point the following value:

$$S[i, j] = \left[ \frac{1}{6\sqrt{Iref[i, j]}}(2I[0, i, j] - I[1, i, j] - I[2, i, j]) + j\frac{1}{2\sqrt{3Iref[i, j]}}(I[1, i, j] - I[2, i, j]) \right]$$

then by taking the Fourier transform of array S.

6.19. Calculation stage

This stage is identical to the one described in 5.21.

6.20. Display

This stage is identical to the one described in 5.22

7. DESCRIPTION OF A THIRD EMBODIMENT

This embodiment is more complex and more costly than the preceding but allows higher performance in terms of definition and speed.

7.1. Principle

This acquisition method makes it possible to improve the performances of the first embodiment as follows:

Higher image acquisition speed:

In the first embodiment, this speed is limited by the mechanical movement of the stepping motors and the need to wait for the absorption of vibrations induced after each movement. The present embodiment allows the acceleration of this image acquisition by replacing this mechanical system by an optical beam deflection system based on liquid crystals and not inducing any mechanical displacements in the system.

Improved precision:

In the first embodiment, the precision is limited by the impossibility of adopting all the possible directions for the illuminating beam and by the fact that the reflected wave is not taken into account. The present embodiment uses a two-objective system. Illumination then takes place through an objective, thus enabling the frequency vector of the illuminating wave to vary on both sphere portions limited by the aperture of each objective. In addition, the reflected wave passes through the illuminating objective again and can be taken into account.

In the first embodiment, the variations in the intensity of the diffracted wave as a function of the polarization direction of the illuminating wave are not taken into account, thus resulting in errors in the measurement of high frequencies. In the present embodiment, polarization rotators allow the variation of the illuminating wave polarization direction and the diffracted wave analysis direction. An algorithm takes into account all the measurements thus obtained in order to obtain frequency representations in which dependence of the diffracted wave in relation to the polarization of the illuminating wave has been removed.

Compensation for spherical aberration:

In the preceding embodiments, the average index in the observed sample must be close to the nominal index of the objective. Otherwise, the difference between the average index of the sample and the nominal index of the objective results in a spherical aberration which significantly limits the thickness of the observable sample. In this new embodiment, the equipment configuration and the algorithms used permit the compensation of phase differences induced by the average index of the sample and the cancellation of this spherical aberration.

Paragraph 7.2. describes materially the microscope used.

This microscope undergoes a number of preliminary adjustments carried out in the absence of the observed sample and which normally do not have to be repeated when the observed sample is modified:

- The position of the different system elements is adjusted as described in Paragraph 7.4.
- The modulus of the reference wave is determined as described in Paragraph 7.4.
- The parameters $K_p$, equivalent to the parameter K used in the first embodiment, are determined as described in Paragraph 7.6.
- The characteristics of the illuminating beams used are determined as described in Paragraph 7.9.
- The arrays of control indices are determined as described in Paragraph 7.13.

After introducing the sample, the microscope undergoes a second series of adjustments:

- The position of the objectives is adjusted as described in Paragraph 7.10.
- The relative coordinates x,y,z of the points of origin of the reference beams associated with each objective, as well as the average index $n_0$ of the sample and its thickness L, are determined as described in Paragraph 7.11. This determination implies the use of a specific algorithm described in Paragraph 7.8., using equations established in Paragraph 7.7. A simplified version of this algorithm is also used in Paragraph 7.9.
- The value $w_0$ characterizing the position of the sample is calculated as described in Paragraph 7.15.

The determination of this value makes use of an image acquisition procedure described in Paragraph 7.12. and of equations established in Paragraph 7.14. Simultaneously, a first adjustment of the position of the sample is carried out as indicated in Paragraph 7.15.3.

- The aberration compensation function, in the form of arrays $D_p$, is obtained as described in Paragraph 7.16.

When these preliminary adjustments have been carried out, the procedure for obtaining three-dimensional representations can be started. This procedure is described in 7.17. It makes use of the image acquisition procedure described in 7.12. and uses the array $D_p$ determined in 7.16. By repeating this procedure indefinitely, it is possible to obtain a succession of three-dimensional representations characterizing the time evolution of the observed sample. The position of the sample must be adjusted so that the obtained representation is that of a region of interest of the sample. This adjustment is carried out as indicated in 7.17.3. and may involve a repetition of the preliminary calculation stages for $w_0$ and $D_p$ described respectively in 7.15.2. and in 7.16.

Different variants of the algorithms and adjustments carried out are described in 7.18. Many adjustments can be eliminated if conditions are favorable to this, for example if the index and the thickness of the sample are known in advance.

A design method for microscope objectives, specifically suited to this microscope, is described in Paragraph 7.19.

7.2. Equipment description 7.2.1. Overall view

FIGS. 27 and 28 constitute an overall view of the system. The greater part of the system, represented in FIG. 27, is within a horizontal plane and is supported by an optical table. However, the two microscope objectives used must be positioned on a vertical axis (2263) to be able to use a sample (2218) positioned horizontally. The axis (2263) is at the intersection of two vertical planes defined moreover by their horizontal axes (2261) and (2262). These horizontal axes can form an angle of 0 degrees, 90 degrees or 180 degrees between them. FIG. 28 represents partially a section along the vertical plane defined by (2261) and partially a section along the vertical plane defined by (2262).

The beam coming from a laser (2200) polarized in the vertical direction will be divided into four beams supplying the right and left optical chains associated with the two objectives of the microscope. These four beams are designated in the diagram and in the text by the following abbreviations:

FRD: right-hand reference beam.
FRG: left-hand reference beam.
FED: right-hand illuminating beam.
FEG: left-hand illuminating beam.

Each of these beams will be divided subsequently into a main beam, which will be designated the beam of origin, and an opposite indicator beam. The opposite indicator beams will be denoted FRDI, FRGI, FEDI, FEGI.

The beam comes from the laser (2200) and has its electric field vector directed along an axis orthogonal to the plane of the figure. It passes through a beam expander (2201) and is then separated into an illuminating beam and a reference beam by a semi-transparent mirror (2202). The illuminating beam passes through a diaphragm (2248), a filter (2203) and then a beam attenuation device (2204), a phase shift device (2205), a beam deflection device (2206) which allows the direction of this parallel beam to be varied. It is then deflected by a semi-transparent mirror (2207) which separates a right-hand illuminating beam and a left-hand illuminating beam, intended to illuminate the sample in two opposite directions. The right-hand illuminating beam FED is deflected by a mirror (2208), passes through a beam deflection and switching device (2209), a phase rotator (2210), and is separated by a semi-transparent mirror (2211) into a main illuminating beam and an opposite indicator beam. The main illuminating beam then passes through an achromat (2212), a diaphragm (2213), is reflected on a mirror (2214) sending it upwards, and then on mirrors (2215) and (2216), and passes through the objective (2217) to illuminate the sample (2218). After passing through the sample, it passes through the objective (2219), is reflected by the mirrors (2220) (2221) (2222), and then passes through the diaphragm (2223), the achromat (2224), the semi-transparent mirror (2225), the phase rotator (2226), the achromat (2227), the semi-transparent mirror (2228) and the polarizer (2253) and is received by the CCD sensor (2229).

The two objectives (2217) and (2219) must have their optical axis (2263) vertical so that the optical oil required for their use does not flow. The mirrors (2214) (2215) (2216) (2220) (2221) (2222) have the utility of deflecting the beam so that it can pass through the objectives in a vertical direction. FIG. 28 represents a section along the axes (2262) and (2263), articulated around the optical axis (2263).

FIG. 29 is a representation of the optical path of the light rays between the objective (2219) designated by "OM" and the CCD sensor (2229) designated by "CCD". The mirrors, semi-transparent mirrors and phase rotator have been omitted in the figure but influence the position of the different elements. The rays are propagated along an optical axis shown as "straight", which in reality ceases to be straight between the planes P2 and P1, a zone in which it deflected by mirrors (2220) (2221) (2222) to approach the objective in a vertical plane. The left-hand part of the figure represents the optical path of rays which are parallel in the studied sample, and the right-hand part opposite represents the optical path of rays coming from a point in the observed area. The achromat (2224) is designated by "L1", the diaphragm (2223) by "D", the achromat (2227) by "L2". $f_1$ is the focal length of L1, $f_2$ is the focal length of L2. P1 is the plane in which are focussed rays entering parallel into the objective (rear focal plane). This plane must coincide with the front focal plane of the achromat (L1) so that a ray parallel on entering the objective is also parallel between the achromats L1 and L2. P2 is the plane in which the image of the observed sample is formed. It is in this plane that the diaphragm (D) must be positioned. P3 is the virtual image of the plane P2 through the achromat L1. P3 must coincide with the front focal plane of L2 so that a ray coming from a central point of the observed object, forming a point image in P2, reaches the CCD in the form of a parallel ray. P6 is the rear focal plane of L2. It is in this plane that the CCD must be placed so that a ray parallel on entering the objective forms a point image on the CCD.

The optical path of rays between the objective (2217) and the sensor (2239) is symmetrical with the preceding.

The reference beam separated by the mirror (2202) is reflected by (2233), passes through a filter (2234), and a semi-transparent mirror (2235) transforming it into a left-hand part and a right-hand part. The left-hand part is reflected by mirrors (2254) (2236), passes through the complementary filter (2255), the phase shift device (2251) and the diaphragm (2250) and then reaches the semi-transparent mirror (2228) which separates it into a main beam and an opposite indicator beam. The main beam is directed towards the CCD (2229).

Both the illuminating beam and the reference beam have opposite indicator beams having the same characteristics as the main beam but directed in the opposite direction. The opposite indicator FRGI of the reference beam FRG, coming from the semi-transparent mirror (2228), passes through the achromat (2281) and is focussed on a mirror (2282) which reflects it. It then passes against through the achromat (2281) which again makes it parallel, then it is again reflected by the semi-transparent mirror (2228). It then has the same (but directed opposite) direction as the reference beam directed towards the CCD sensor (2229). Similarly, the opposite indicator FRDI of the illuminating beam FRD, coming from the semi-transparent mirror (2211), is focussed by the achromat (2231) on the mirror (2232). The latter reflects it, and after another reflection on the semi-transparent mirror (2211), it has the direction opposite that of the main illuminating beam directed towards the objective (2217).

The entire device is optically symmetrical in relation to the observed object. There is thus a left-hand illuminating beam having a symmetrical role in relation to the right-hand illuminating beam, and a right-hand reference beam having a symmetrical role in relation to the left-hand reference beam.

The left-hand illuminating beam FEG, coming from the semi-transparent mirror (2207), is reflected on the mirrors (2280) and (2283) and then passes through the deflection and switching device (2240) equivalent to (2209). It then passes through the polarization rotator (2241), is separated by the semi-transparent mirror (2225) into a main beam which is directed towards the microscope objective (2219), and an opposite indicator beam FEGI which passes through the achromat (2242), is focussed on the mirror (2243) and finally reflected again on (2225).

The right-hand reference beam FRD, coming from the semi-transparent mirror (2235), is reflected by the mirror (2244) and passes through the complementary filter (2256). The semi-transparent mirror (2245) separates it into a main beam which passes through the polarizer (2252) and reaches the CCD (2239), and an opposite indicator beam FRDI which passes through the achromat (2246) and is focussed on the mirror (2247), and then returns towards the semi-transparent mirror (2245) which reflects it in the direction of the objective (2217).

The polarizers (2252) and (2253) are plates of small thickness consisting of a dichroic sheet maintained between two glass plates.

The zones (2274) (2275) (2276) (2277), delimited by dotted lines in the drawing, correspond to parts of the system immersed entirely in the optical oil. Such a zone consequently constitutes a leaktight recipient containing the optical elements visible in the drawing. The entry and exit of the beam into this recipient take place through windows having received an antireflecting treatment on their outer face. This makes it possible to limit defects related to the cutting of the glasses used in the different devices included therein.

The CCDs (2239) and (2229) are integrated in cameras (2284) and (2230) themselves fixed to three-axis positioners allowing their adjustment along the axis (2264) and along the two axes orthogonal to (2264), as well as in rotation around the axis (2264). The achromats (2227) (2224) (2212) (2237) (2246) (2231) (2242) (2281) are fixed to positioners with one axis allowing fine adjustment of the position in the direction of the axis (2264). The mirrors (2282) (2243) (2232) (2247) are fixed to positioners allowing an adjustment of their orientation. The diaphragms (2213) and (2223) are adjustable and fixed to two-axis positioners allowing the adjustment of their position in the plane orthogonal to (2264). The semi-transparent mirrors (2225) (2228) (2211) (2245) are fixed to positioners allowing the adjustment of their orientation. The mirrors (2214) and (2222) are fixed to positioners allowing the adjustment of their orientation. The microscope objective (2219) is fixed to a two-axis positioner allowing it to be moved in a plane orthogonal to the axis (2263). The objective (2217) is fixed to a focussing device allowing it to be moved along the axis (2263). The entire system is fabricated with the greatest precision possible in the positioning of the various elements.

The mirrors (2247) (2232) (2243) (2282) are equipped with manual shutters (2257) (2258) (2259) (2260) allowing the suppression of the beams reflected by these mirrors. The beams FRD and FRG can be suppressed by using completely opaque filters.

The sample (2218) is made up of two cover glasses of standard thickness (150 $\mu$m) between which there is a thin layer (50 to 100 $\mu$m) of the substance to be observed. This sample is fixed to a thicker plate, in such manner that the latter does not prevent the access of the sample through the objectives. The assembly is fixed to a three-axis translation positioner.

The objectives used can be, for example, planapochromatic objectives with a numerical aperture ouv=1.4 and magnification g=100 forming the image at 160 mm from the shoulder of the objective. It is also possible to use other types of objectives, described in Paragraphs 7.19 to 7.21.

The achromats (2212) (2237) (2224) (2227) (2246) (2231) (2242) (2281) can have, for example, the same focal length f=f$_1$=f$_2$=200 mm.

The CCD sensors used must have square pixels and a square useful region having a side length of $$D = 2f_2 \frac{ouv}{g},$$

the number of pixels being N$_{pix}$×N$_{pix}$ with, for example, N$_{pix}$=256. The beam control devices (2204) (2205) (2206) (2209) (2240) (2251) (2210) (2241) (2226) (2238) are all driven by phase rotators controlled by bipolar voltages. The control of these devices must be synchronized with the acquisition of the images by the camera. The camera can be a fast camera of the movement analyzer type, provided with sufficient memory, available for example from Kodak. The calculation system is a computer equipped with a sufficient memory to store the required three-dimensional arrays. Machines having 8 GB of memory for example are available from Digital Equipment.

The filters at (2203) (2234) (2255) (2256) allow the adjustment of the intensity of the different beams. As in the first embodiment, their values must be frequently adjusted during the different setting operations and during the use of the microscope. These adjustments are carried out in a similar fashion to what was done in the first embodiment and will not be mentioned again. They are also designed to limit the intensity of the beams which move in a direction opposite to the normal and tend to return towards the laser (2200), during certain adjustment operations.

7.2.2. Beam attenuation device

The attenuation device is represented in FIG. 30. It consists of a phase rotator (2501) designated "R1" in the figure, a Glan-Thomson polarizer (2502) designated "POL1", a second rotator (2503) designated "R2", and a second polarizer (2504) designated "POL2". The beam entering the device is vertically polarized. The angle of the neutral axis of (2501) with the vertical is θ for a bipolar voltage of −5 V applied to the terminals of the device and turned by an angle α by applying a voltage of +5 V, with α=22 degrees approximately. The neutral axis of the rotator (2503) is characterized by the same angles, but in relation to the horizontal direction and not to the vertical direction. The polarizer (2502) selects the horizontal polarization direction. The polarizer (2504) selects the vertical polarization direction.

FIG. 31 illustrates the functioning of the part of the device consisting of (2501) and (2502) for an applied voltage of −5 V. It represents, in bold lines, the electric field vector (2505) of the beam entering the device, in a coordinate system consisting of the vertical polarization axis (2506) and the horizontal polarization axis (2507). Passage through the rotator R1 (2501) causes this vector to turn by an angle of 2θ and it is thus transformed into (2508). Passage through the polarizer POL1 (2502) constitutes a projection on to the horizontal axis. At the exit of this polarizer, the electric field vector (2509) of the beam is thus horizontal and its amplitude has been multiplied by a factor sin(2θ).

FIG. 32 illustrates the functioning of the part of the device consisting of (2501) and (2502) for an applied voltage of +5 V. The neutral axis of R1 having been turned by an angle α, the electric field vector is turned by a total angle of 2(α+θ) and the electric field amplitude at the exit is multiplied by sin(2θ+2α). The attenuation factor between the "open" position (+5 V) and the "closed" position (−5 V) is thus $$a_1 = \frac{\sin(2\theta)}{\sin(2\alpha + 2\theta)}.$$

This expression is inverted into:

$$\theta = \frac{1}{2} \operatorname{Arctan}\left( \frac{\sin(2\alpha)}{\frac{1}{a_1} - \cos(2\alpha)} \right)$$

For example for $$a_1 = \frac{1}{16}$$

and α=22° we find θ=1.30°

The second part of the device, made up of (2503) and (2504), functions exactly like the first, except that it takes a horizontally polarized beam at the entrance and delivers a vertically polarized beam at the exit. The attenuation factor a$_2$ of this second part is thus given by the same formula as a$_1$ and the two parts of the device will be adjusted so as to have the same (or roughly the same) attenuation in each part. Owing to adjustment disparities between the two parts of the device, a$_2$ and a$_1$ are however not rigorously equal in practice.

The attenuation control takes place in accordance with the table below, where V$_1$ designates the bipolar voltage applied to (2501) and V$_2$ that applied to (2503).

| V1 | V2 | attenuation |
|---|---|---|
| −5 V | −5 V | α$_1$ α$_2$ |
| −5 V | +5 V | α$_1$ |
| +5 V | −5 V | α$_2$ |
| +5 V | +5 V | 1 |

7.2.3. Phase shift device

The phase shift device is made up of two identical units placed one after the other. One unit is made up as indicated in FIG. 33.

The vertically polarized beam at the entrance of the device first passes through a phase rotator (2601) designated "R1", then through a uniaxial birefringent plate (2602) designated "LP", then a second phase rotator (2603) designated "R2" and a polarizer (2604) designated "POL". The two positions of the neutral axis of each rotator are arranged symmetrically in relation to the vertical axis. The positions of the two rotators corresponding to a given control voltage are on the same side of the vertical axis: for a voltage of −5 V they are represented in dotted lines, for a voltage of +5 V they are represented by solid lines. Similarly, the two axes of the birefringent plate are arranged symmetrically in relation to this vertical axis (the third axis being in the beam propagation direction). FIG. 34 shows the condition of the electric field vector of the beam at each stage of passage through the device for a voltage of −5 V applied to each rotator.

FIG. 35 is based on FIG. 34 but giving the values of the angles between the different vectors and the phase differences between these vectors and the vector at the entrance of the device. FIG. 36 is based on FIG. 34 but gives the values of the angles between the different vectors and the attenuation on each vector.

The electric field vector (2605) at the entrance of the device is vertical. After passing through the rotator R1 (2601) it is symmetrized in relation to the neutral axis (2606) of this rotator, giving the vector (2607). After passing through the birefringent plate, the vector (2607), represented in dotted lines, is broken down into two components (2608) and (2609) corresponding to each neutral axis of the plate. The component (2609) is affected by a phase shift φ/2 and is reduced in amplitude by a factor $$\cos\left(\frac{\pi}{4} - \alpha\right).$$

The component (2608) is affected by a phase shift φ/2 and is reduced in amplitude by a factor $$\sin\left(\frac{\pi}{4} - \alpha\right).$$

After passing through the rotator (2603) the assembly is symmetrized in relation to the neutral axis (2612) of this rotator. (2608) is transformed into (2611), while (2609) is transformed into (2610). After passing through the polarizer (2604), these two components are projected on to a vertical axis. The component (2610) is multiplied by a factor $$\cos\left(\frac{\pi}{4} - \alpha\right)$$

and has thus been affected globally by a factor $$\cos^2\left(\frac{\pi}{4} - \alpha\right).$$

The component (2611) is multiplied by a factor $$\sin\left(\frac{\pi}{4} - \alpha\right)$$

and has thus been affected globally by a factor $$\sin^2\left(\frac{\pi}{4} - \alpha\right).$$

The two are then added to give a single component (2615) with the value:

$$v = \cos\left(\omega t - \frac{\varphi}{2}\right)\cos^2\left(\alpha - \frac{\pi}{4}\right) + \cos\left(\omega t + \frac{\varphi}{2}\right)\sin^2\left(\alpha - \frac{\pi}{4}\right)$$

where ω is the pulse of the wave, t is the time. We verify:

$$v = \cos(wt)\cos\frac{\varphi}{2} + \sin(wt)\sin\frac{\varphi}{2}\sin(2\alpha)$$

or in complex representation:

$$c = \cos\frac{\varphi}{2} + j\sin\frac{\varphi}{2}\sin(2\alpha)$$

If θ is the argument of c, we then have:

$$\cos\theta = \frac{\cos\frac{\varphi}{2}}{\sqrt{\sin^2(2\alpha) + \cos^2\frac{\varphi}{2}(1 - \sin^2(2\alpha))}}$$

$$\sin\theta = \frac{\sin\frac{\varphi}{2}\sin(2\alpha)}{\sqrt{1 + \sin^2\frac{\varphi}{2}(-1 + \sin^2(2\alpha))}}$$

These formulas are inverted as:

$$\sin\frac{\varphi}{2} = \frac{\sin\theta}{\sqrt{\sin^2\theta + \cos^2\theta\,\sin^2(2\alpha)}}$$

$$\cos\frac{\varphi}{2} = \frac{\cos\theta\,\sin(2\alpha)}{\sqrt{\sin^2\theta + \cos^2\theta\,\sin^2(2\alpha)}}$$

The creation of a phase shift θ=60° is sought in a position of the rotators and θ=−60° in the symmetrical position, which corresponds to a total phase shift of 120 degrees. The above equation makes it possible to determine the value of the total phase shift ω created by the plate between its two neutral axes.

With θ=60 and α=40 degrees we obtain: ω=120.7566 degrees. It is thus necessary to use a uniaxial plate creating, for the considered wavelength, a phase difference of 120.75 degrees between its two axes.

The two axes of the plate do not have a symmetrical role. If $\Delta\omega_i$ is the phase shift upon passing through the plate for a ray polarized along the axis i, there is only one choice for the axes 1 and 2 such that $\Delta\omega_1 - \Delta\omega_2 = 120$ degrees. The uniaxial plate must be oriented so that the rotator (2601) causes the turning of the polarization of the incident ray towards the axis 2 when it is subjected to a bipolar voltage of −5 V.

With the phase shift device made up of two units of this type, let $V_{ij}$ be the voltage applied to the i-th rotator of the j-th device (i and j varying from 1 to 2). The control of the phase shift system takes place according to the following table:

| $V_{11}$ | $V_{12}$ | $V_{21}$ | $V_{22}$ | shift |
|---|---|---|---|---|
| −5 V | −5 V | −5 V | −5 V | 0° |
| 5 V | 5 V | −5 V | −5 V | +120° |
| −5 V | −5 V | 5 V | 5 V | +120° |
| 5 V | 5 V | 5 V | 5 V | −120° |

The other combinations are not commonly used.

7.2.4. Beam deflector

The beam deflector is represented in FIGS. 37 and 38. Its basic unit is an elementary variation block made up of the elements (2801) to (2804).

An elementary variation block is made up of a first rotator (2801) denoted "R1" followed by a birefringent prism (2802) denoted "PD" (deviation prism) then a second rotator (2803) denoted "R2" and a Glan-Thomson polarizer (2804) denoted "POL". The rotator (2801) has its neutral axis in the vertical direction for an applied voltage of −5 V. For the same applied voltage, the rotator (2803) has its neutral axis in the horizontal direction. The prism (2802) is made up of a birefringent material, calcite or quartz. The polarization direction of the extraordinary ray (first neutral axis) is vertical for example, and the polarization direction of the ordinary ray (second neutral axis) is horizontal. An incident ray on this prism is thus divided into an ordinary ray polarized in the vertical direction and an extraordinary ray polarized in the horizontal direction. The ordinary ray and the extraordinary ray have a different inclination at the exit of the prism (angle of their propagation direction with that of the incoming beam).

FIGS. 39 and 40 illustrate the functioning of this elementary variation block. FIG. 39 corresponds to a deflection in one direction and FIG. 40 to a deflection in the other direction. The arrows in bold represent the electric field vectors of the considered beams.

In the case of FIG. 39, the voltages applied to the two rotators are respectively −5 V for (2801) and +5 V for (2803). The electric field vector of the incoming beam is vertical (2901). After passing through the first rotator whose neutral axis (2902) is vertical, it remains vertical (2903). After passing through the deflection prism, it is made up of a single extraordinary ray (2904). After passing through the second rotator, it is symmetrized in relation to the axis (2906) of this rotator, which itself forms an angle of 40 degrees with the horizontal (it is assumed for the drawing that α=40° but the result does not depend on the exactitude of this value). It is thus transformed into a vector (2905) forming an angle of 10 degrees with the horizontal. The polarizer projects this vector on to the horizontal to obtain the vector (2907) whose deflection corresponds to only the extraordinary ray.

In the case of FIG. 40, the voltages applied to the two rotators are respectively +5 V for (2801) and −5 V for (2803). The field vector of the incoming beam is vertical (2911). After passing through the first rotator, it is symmetrized in relation to the axis (2912) of this rotator, which itself forms an angle of 40° with the vertical. It is thus transformed into a vector (2913) forming an angle of 10 degrees with the horizontal. After passing through the deflection prism, the beam is split into an extraordinary beam having a field vector (2914) and an ordinary beam having a field vector (2915). After passing through the second rotator, with horizontal axis, the field vector of the extraordinary beam is symmetrized in relation to the horizontal and becomes (2916). The polarizer then selects only the horizontal component and the outgoing vector (2917) thus corresponds to the ordinary ray alone.

A complete elementary block is represented by the rectangle (2805), the direction of the field of the incoming beam being represented by the arrow (2806). The block (2807) is identical but turned 90 degrees in relation to the horizontal axis so that the direction of the field of the incoming beam is horizontal (2808). Both blocks give an elementary doublet (2809) allowing an elementary deflection of the beam in the horizontal and vertical directions. As indicated in FIG. 38, the entire deflector is made up of eight successive elementary doublets. However, in order to have an efficient switching system, the last doublet (numbered 0) is placed on the part of the beam in which the left-hand and right-hand illuminating beams have already been separated. Two identical doublets (D0) and (D0b) are thus used, one on each branch of the beam. When a voltage of −5 V is applied to its two rotators, an elementary block acts as a closed switch. The last doublet can thus switch the beam effectively, a voltage of −5 V having to be applied to all its rotators to have a closed switch.

The block (2209) in FIG. 27 thus represents the doublet D0b. The block (2240) represents the doublet D0. The block (2206) represents the doublets D1 to D7.

The type of crystal in which the prism is manufactured and the angle between its two faces determine the variation angle of the beam's inclination between the two positions of an elementary doublet.

The following notations are adopted:

$n_l$: index of the immersion liquid used for the beam deflection device.

o: aperture of the objective.

A: aperture of the beam at the entrance of the deflection device, roughly equal to its value at the level of the diaphragm where the image is formed. A is defined as the sine of a half-angle at the vertex of the cone formed by the rays coming from the objective.

g: magnification of the objective.

d: distance between planes P2 and P4 of FIG. 29.

$f_1$: focal length of the lens L1 in FIG. 29.

Abbe's formula and the solution of the optical equations yields:

$$A = \frac{o}{n_l g}\left(1 - \frac{d}{f_1}\right)$$

FIG. 41 shows the calculation principle for the deflection of ordinary rays by the prism. The ray (2922) enters the prism at (2921) and comes out at (2923).

$\theta_d$ is the angle at the vertex of the deflection prism.

$\theta_e$ is the angle of the exiting extraordinary beam with the external face of the prism.

$\theta_o$ is the angle of the exiting ordinary beam with the external face of the prism.

$n_e$ is the extraordinary index of the deflection prism.

$n_o$ is the ordinary index of the deflection prism.

We have:

$$\sin\theta_o = \frac{n_o}{n_l}\sin\theta_d$$

and likewise for the extraordinary ray:

$$\sin\theta_e = \frac{n_e}{n_l}\sin\theta_d$$

whence:

$$\sin\theta_e - \sin\theta_o = \frac{n_e - n_o}{n_l}\sin\theta_d$$

or, in the first order in $(\theta_e - \theta_o)$:

$$(\theta_e - \theta_o)\cos\theta_d = \frac{n_e - n_o}{n_l}\sin\theta_d$$

The i-th doublet must create a variation in the inclination of amplitude:

$$\theta_e - \theta_o = \frac{A}{2^i}$$

The half-angle at the vertex of the i-th prism is thus equal to:

$$\theta_d = \text{Arctan}\left(\frac{A}{2^i}\frac{n_l}{n_e - n_o}\right)$$

or with the value of A previously obtained:

$$\theta_d = \text{Arctan}\left(\frac{1}{2^i}\frac{1}{g}\frac{o}{n_e - n_o}\left(1 - \frac{d}{f_1}\right)\right)$$

In this equation, the following values must be taken into account:
quartz: $n_e - n_o = 0.009$
calcite: $n_e - n_o = -0.172$
For each prism:
Inverting the ordinary and extraordinary axes makes it possible to invert the direction in which the rays are deflected when changing from a pair of voltages (−5 V, 5 V) to a pair of voltages (5 V, −5 V) applied to the rotators of the elementary block concerned. As this direction is inverted between the quartz and the calcite for a given choice of ordinary and extraordinary axes, these axes must be inverted in a calcite prism in relation to their position in a quartz prism.
Inverting the orientation of the prism (vertex oriented downward instead of upward) also makes it possible to invert the direction in which the rays are deflected when changing from a pair of voltages (−5 V,5 V) to a pair of voltages (5 V, −5 V) applied to the rotators of the elementary block concerned. However, at the same time, this operation inverts the direction of deflection of the rays when a fixed pair of voltages is applied. In order to have a "fixed" minimum deflection of the rays, the prism with the greatest deflection of each series, calcite or quartz, must be inverted in relation to the others. In order to maintain the deflection in the desired direction, its ordinary and extraordinary axes must be inverted.

For each prism is chosen the material, quartz or calcite, which makes it possible to obtain most easily this angle at the vertex. The orientation of the prism is then chosen so that, at a fixed voltage applied to the rotators, the direction variations induced are best compensated between the prisms. The position of the ordinary and extraordinary axes are chosen so that the rays are always deflected in the same direction when changing from a pair of voltages (−5 V, 5 V) to a pair of voltages (5 V, −5 V) applied to the rotators of the elementary block concerned. For each doublet, it is necessary to specify for the two prisms included in the doublet, which have the same characteristics: the angle at the vertex, the orientation of the vertex (normal or inverted in relation to FIG. 37 in which it is oriented upward), and the position of the ordinary or extraordinary axes (normal or inverted in relation to FIG. 37 in which the extraordinary axis is vertical). For example, for an objective o=1.25 g=100 and with $f_1$=200 mm, d=20 mm, the following table is obtained in which the angles are in degrees:

| Index of prism | $\theta_d$ (calcite) | $\theta_d$ (quartz) | Choice | Orientation of vertex | Position of ordinary and extraordinary axes |
|---|---|---|---|---|---|
| 0 | 3.742 | 51.340 | calcite | inverted | normal |
| 1 | 1.873 | 32.005 | calcite | normal | inverted |
| 2 | 0.937 | 17.354 | calcite | normal | inverted |
| 3 | 0.468 | 8.881 | quartz | inverted | inverted |
| 4 | 0.234 | 4.467 | quartz | normal | normal |
| 5 | 0.117 | 2.237 | quartz | normal | normal |
| 6 | 0.058 | 1.119 | quartz | normal | normal |
| 7 | 0.029 | 0.559 | quartz | normal | normal |

A deflection of the beam is a variation in its direction. However, at a great distance from the doublet creating the deflection, it also results in a spatial shift of the illuminated area. In order for this phenomenon not to be penalizing, the distances between the elements of the deflector must be reduced to a minimum and these elements must have a sufficient section so that, whatever the chosen orientation, the beam "completely fills" the area delimited by the diaphragm. For example, this section may be 12 mm, the Glan-Thomson polarizers then having the dimension 12×30 mm. All the parts of the deflector which do not transmit the beam directly must be as absorbing as possible in order to limit noise.

To suppress the constant deflections by the deflection prisms, the index of the optical liquid in which a prism is immersed must be equal to the average value of the ordinary and extraordinary indices of the prism, i.e.:

$$\text{For calcite}: n_l = \frac{1.658 + 1.486}{2} = 1.572$$

$$\text{For quartz}: n_l = \frac{1.544 + 1.553}{2} = 1.5485$$

The part of the beam deflector whose prisms are in calcite must hence be immersed in a liquid of 1.572 index, and the part whose prisms are in quartz must be immersed in a liquid of 1.5485 index. The recipient containing the deflector and the optical liquid must consequently be separated into two parts, with a glass window allowing the passage of the beam between these two parts which contain optical liquids of different index.

The device is controlled by controlling the 36 rotators. In each doublet, the phase rotators are numbered from 0 to 3, number 0 being the "leftmost" rotator in FIG. 28. If i is the index of the doublet, varying from 0 to 7, and j is the index of the rotator in a doublet, varying from 0 to 3, the overall index k=i+1+j*9 is then assigned to the rotator, except for the doublet numbered 0b for which we have k=j*9. A 36-bit control word is used in which the bit number k corresponds to the rotator of overall index k. For each bit, a value of 0 corresponds to an applied voltage of −5 V, and a value of 1 corresponds to a voltage of +5 V.

An illumination is characterized by the sensor on which the direct illuminating beam arrives and by symbolic coordinates on this sensor. The sensor will be indexed by the integer p and the symbolic coordinates will be i,j where i and j vary between 0 and 255. The symbolic coordinates do not correspond necessarily to coordinates in pixels on the sensor. When one wishes to obtain an illumination characterized by the indices p,i,j, the control word is given in the following table:

| Sensor | Coordinates | Control word COM[p,i,j] |
|---|---|---|
| (2239): p = 0 | (i,j) | $(0_1, i_8, 0_1, \overline{i_8}, 0_1, j_8, 0_1, \overline{j_8})$ |
| (2229): p = 1 | (i,j) | $(i\%2)_1, 0_1, (i/2)_7, \overline{(i\%2)}_1, 0_1, \overline{(i/2)}_7, (j\%2)_1, 0_1, (j/2)_7, \overline{(j\%2)}_1, 0_1, \overline{(j/2)}_7)$ |

In this table:
a%b means a modulo b
a/2 represents the integer part of the division of a by 2, i.e. a shifted to the right
(a,b,c . . . ) represents a concatenated with b then with c etc.
$a_i$ represents a expressed over i bits.
If a is an integer number, its expression in binary is a series of 0 and 1. By transforming the 0's to 1's and vice versa, we obtain its complement which is denoted $\bar{a}$. This notation will be maintained hereinafter.

When one wishes to suppress the two illuminating beams, the control word to be used is 0.

7.3. Overall adjustment

7.3.1. First setup of the system

The system, with the exception of the elements (2204) (2205) (2206) (2209) (2240) (2210) (2241) (2238) (2226), is put in place geometrically with maximum precision. The path of the beam is checked by using a diffusing piece of paper inserted along its path. The position of the mirrors, semi-transparent mirrors, as well as of (2200) and (2201), is adjusted by thus checking the path of the beam.

7.3.2. Setup of beam control systems

For the setup of the beam control systems, it is necessary to have a photometer of sufficient accuracy, which will be used to measure beam attenuations or detect extinctions. These systems are composed of optical elements (prisms, rotators, polarizers, birefringent plates) which must be positioned accurately in relation to the optical axis and be mounted on positioners allowing fine rotational adjustment around this axis.

7.3.2.1. Marking of rotators

The entire illuminating beam modification system is based on the use of phase rotators. It is essential for the axis of each rotator to turn in the direction planned upon the application of a voltage opposite to that used during its setup. The position of the rotator must be defined when it is put in place and the adjustment takes place only on a few degrees. To specify the position of the axes of the rotator before setup, a test between crossed polarizers is carried out, in two stages.

Stage 1, described in FIG. 42, the rotator (3001) is put in place between the entrance polarizer having a polarization direction (3002), and the exit polarizer having a polarization direction (3003). A voltage of +5 V is applied. The rotator is adjusted in rotation so as to cancel the outgoing ray. The corresponding position, corresponding to the entrance polarizer, is marked with a red point (3004).

Stage 2: A voltage −5 V is applied. The exit polarizer is adjusted to cancel the ray. A green point is marked corresponding to the middle of the two polarizer positions, on the side where the angle is smallest. FIGS. 43 and 44 describe this stage in the two possible cases defined by the new position of the exit polarizer, respectively (3005) and (3006). In the case of FIG. 43, the green point is marked at (3007) and in the case of FIG. 44 it is marked at (3008).

The red point then marks the position of the axis for a +5 V voltage and the green spot marks its position for a −5 V voltage. These points then allow the correct prepositioning of the elements during the adjustment procedure.

7.3.2.2. Setup of beam attenuator

The polarizer (2502) is first put in place and a fine adjustment in rotation is carried out in order to reach the extinction of the outgoing beam. The rotator (2501) is then put in place and a fine adjustment of its position in rotation is carried out in order to have the attenuation $a_1^2$ sought when changing from the open position (+5 V voltage applied to (2501)) to the closed position (−5 V voltage applied).

We then switch (2501) to the open position (+5 V voltage) and the polarizer (2504) is put in place and adjusted in rotation in order to reach the extinction of the outgoing beam. The rotator (2503) is then put in place and its position in rotation is fine-adjusted in order to have the attenuation $a_2^2$ sought when changing from the open position (+5 V voltage applied to (2503)) to the closed position (−5 V voltage applied). For example, it is possible to use $$a_1 = a_2 = \frac{1}{16},$$

which gives attenuations measurable by the photometer:

$$a_1^2 = a_2^2 = \frac{1}{256}$$

The exact values obtained for the coefficients $a_1^2$ and $a_2^2$ are then measured. The coefficients $a_1$ and $a_2$ thus obtained will be used later.

7.3.2.3. Setup of phase shift devices

These devices (2205) and (2251) are put in place with the best possible precision considering the marks made previously.

7.3.2.4. Setup of the beam deflection and switching device

Each elementary block is put in place successively beginning with the block closest to the phase shift device. The beam attenuator must be in the open position. An elementary block is put in place in the following order:

Placement of polarizer POL (2804). Fine adjustment in rotation to cancel the exiting ray.

Placement of rotator R2 (2803). Fine adjustment in rotation to keep the exiting ray at a zero value, a −5 V voltage being applied to R2.

Placement of rotator R1(2801). Fine adjustment in rotation to keep the exiting ray at a zero value, a −5 V voltage being applied to R2 and R1.

Placement of deflection prism PD (2802). Fine adjustment in rotation to keep the exiting ray at a zero value, a −5 V voltage being applied to R1 and R2.

The blocks D0 and D0*b* are put in place in the same manner as the others.

7.3.2.5. Setup of phase rotators (2210) (2241) (2238) (2226)

These rotators must have their neutral axis vertical for an applied voltage of −5 V (green point up). The axis of (2210) must turn to the right in FIG. 27 when a +5 V voltage is applied (red point to the right). The axis of (2241) must turn to the left in FIG. 27 when a +5 V voltage is applied (red point to the left). The axis of (2238) and (2226) must turn up in FIG. 27 when a +5 V voltage is applied (red point up).

7.3.2.6. Setup of polarizers

The polarizers (2252) and (2253) are put in place with their passing axis vertical.

7.3.3. Adjustment of geometry

In a second phase, a geometry adjustment is carried out to correctly position the cameras, the achromatic lenses and certain mirrors. Some of these adjustments use an auxiliary CCD sensor whose pitch (distance between the centers of two adjacent pixels) must be as small as possible. From the image received either on one of the system sensors, or on the auxiliary sensor, an algorithm is used that allows the evaluation of the punctuality of the image and the location of the maximum. The image received on a sensor is obtained by causing the interference on this sensor of a reference wave and the wave whose punctuality is to be evaluated.

7.3.3.1. Obtaining a two-dimensional image and evaluation of punctuality

It was seen in the first embodiment how a two-dimensional image in complex numbers can be generated from three images differing from each other in the phase difference between the illuminating wave and the reference wave. This image in the frequency domain can be transposed to the space domain by Fourier transform. In the adjustment phases that follow, the evaluation of the point nature (punctuality) and the centering of such images in the spatial or frequency domain will be called for. These images will either be received on one of the CCD sensors of the device or on an auxiliary sensor. The phase shifts will be obtained either by means of (2205) or by means of (2251). In certain cases, the illuminating wave will play the role of the reference wave and vice versa. In every case, the system consequently produces three successive images with successive shifts indexed by the integer d, of +120 (d=0), 0(d=1), −120(d=2) degrees. This gives an array of pixels I[d,i,j] in which the index d varying from 0 to 2 indexes the phase difference. The image in complex numbers is deduced therefrom by:

$$S[i,j] = \left[ \frac{1}{6}(2I[0,i,j] - I[1,i,j] - I[2,i,j]) + \tilde{j}\frac{1}{2\sqrt{3}}(I[1,i,j] - I[2,i,j]) \right]$$

if one seeks to evaluate punctuality in the space domain, inverse Fourier transformation is applied to this image.

In both cases (whether Fourier transformation has taken place or not), from this image having the dimensions of $N_{pix} \times N_{pix}$ corresponding to the number of useful pixels of the sensor concerned (for example 256), punctuality is evaluated by the program, comprising the following stages:

Stage 1: The program calculates the maximum max of the modulus of S[i,j] and determines its coordinates (imax1, jmax1).

Stage 2: The part of the array S[i,j] located around (imax1, jmax1) is extracted. One thus creates an array Sa[i,j] having the dimensions $N_a \times N_a$ where, for example $N_a=16$:

$$Sa[i,j] = S\left[i - \frac{N_a}{2} + imax1, j - \frac{N_a}{2} + jmax1\right]$$

Stage 3: A direct Fourier transform is taken on array Sa

Stage 4: Array Sa is completed by zeros and an array Sb with dimensions of $N_b \times N_b$ is obtained $$Sb[i,j] = Sa\left[i - \frac{N_b}{2} + \frac{N_a}{2}, j - \frac{N_b}{2} + \frac{N_a}{2}\right]$$

when $$N_a - 1 \geq i - \frac{N_b}{2} + \frac{N_a}{2} \geq 0 \text{ and } N_a - 1 \geq j - \frac{N_b}{2} + \frac{N_a}{2} \geq 0$$

and Sb[i,j]=0 otherwise

Stage 5: The inverse Fourier transform of array Sb is taken. One thus obtains an oversampled version of the part of the initial array S located around the point corresponding to the modulus maximum value.

Stage 6: imax,jmax,max are calculated by the formulas:

$$imax2 = \frac{\sum_{i,j} |Sb[i,j]|^2 i}{\sum_{i,j} |Sb[i,j]|^2}$$

$$jmax2 = \frac{\sum_{i,j} |Sb[i,j]|^2 j}{\sum_{i,j} |Sb[i,j]|^2}$$

$$max = |Sb[imax2, jmax2]|$$

$$imax = imax1 + \frac{N_a}{N_b}\left(imax2 - \frac{N_b}{2}\right)$$

$$jmax = jmax1 + \frac{N_a}{N_b}\left(jmax2 - \frac{N_b}{2}\right)$$

The real values max,imax,jmax thus obtained characterize respectively the value and the position of the maximum. The higher the value max the better the punctuality. The program also displays the modulus of array S and the modulus of array Sb to have a visual evaluation of punctuality.

7.3.3.2. Apparatus used

A diffuser is used, for example a piece of paper allowing the path of the beam to be followed visually.

An auxiliary CCD is used to follow the beam more precisely than with the diffuser. Its pitch must be as small as possible.

A frequency-meter is also used. This term will designate the instrument described in FIG. 71, used to measure the spatial frequencies of a paraxial beam. It is made up of a mirror (5000) which reflects an incoming parallel beam towards a lens (5001) which focuses this beam towards a CCD (5002) mounted on a camera (5003). An optional polarizer (5004) can be inserted between the mirror and the lens. The use of the mirror (5000) allows the size of the frequency-meter to be kept to a minimum in the horizontal plane which is that of FIGS. 61 and 62. The optical axis of the lens and of the CCD is always vertical during measurement operations.

Given the dimensioning choices made, the maximum angle under which the beams enter the frequency-meter is o/g. If the total width of the CCD (5002) is 1, then the focal length of (5001) is calculated for the rays arriving under angles between −o/g and o/g to be taken into account. It is thus equal to:

$$f = \frac{g}{o}\frac{1}{2}.$$

A slightly lower value may be adopted to maintain a safety margin.

Before using the frequency-meter, the distance between the lens (5001) and the CCD (5002) must be adjusted so that the image of a parallel beam is as near a point image as possible, which is accomplished simply by sending to the frequency-meter a beam whose parallelism has been previously checked by the interferometry method and by adjusting accordingly the distance between the lens and the CCD.

The punctuality of the image obtained on the CCD (5002) allows the checking of the parallelism of an incoming beam. The relative position of several points on this CCD characterizes the angle between the corresponding beams.

Unless otherwise indicated in the description of an adjustment, the polarizer (5004) is not used.

7.3.3.3. Adjustment cycle

Adjustments are designed to ensure that:

(1) The beams follow the planned path. This can generally be checked by means of a simple diffuser. These beam path checks are not described but must be carried out prior to the other adjustments. For example, the orientation of the mirror (2247) must be adjusted so that the reflected beam is in fact superimposed on the incident beam, occupying the same space zone as the latter at the level of the semi-transparent mirror (2245).

(2) The illuminating beams and their opposite indicators have a point image on the CCD sensors.

(3) The reference beams have a point image in the plane of the diaphragms (2213) and (2223).

(4) A parallel beam entering the objective (2217) and directed along the optical axis has a point image centered on the sensor (2239).

(5) When a control word COM[1,i,j] is used, the coordinates of the point illuminated by the beam FED are deduced from those of the point illuminated by FEDI by homothetic similitude with a ratio close to 1.

The adjustments to be carried out result from these conditions. The description of the adjustment stages is given by way of information and constitutes an example of the ordering of the adjustment stages.

Throughout the adjustment, with the exception of Stage 14, the control word used for the beam deflector is COM [1,128,128], COM[0,128,128] or 0 depending on whether the right-hand illuminating beam FED or the left-hand illuminating beam FEG, or neither, is generated. The shutters (2257) (2258) (2259) (2260), and shutters not represented on the path of beams FRG and FRD, allow the selection of the beams used.

During certain adjustment phases, a given beam is measured on a sensor by means of a second beam serving as a reference. The program described in 7.3.3.1. is then used to evaluate the punctuality of the measured beam. Phase variations between the beam serving as a reference and the beam to be measured are obtained by means of (2205) or (2251). When no beam has been used as a reference, for example if the CCD is that of the frequency-meter, the image used is that received directly on the CCD. A point image is considered to be centered on a sensor of size $N_{pix} \times N_{pix}$ if its coordinates are $$\left(\frac{N_{pix}}{2}, \frac{N_{pix}}{2}\right).$$

Stage 1: Lens (2231) Translation Adjustment

The frequency-meter is positioned between the semi-transparent mirror (2211) and the polarization rotator (2238). The lens (2231) is adjusted so that the image of the beam FEDI on the CCD of the frequency-meter is a point.

Stage 2: Lens (2246) Translation Adjustment

The frequency-meter is positioned between the semi-transparent mirror (2245) and the lens (2237). The lens (2246) is adjusted so that the image of the beam FRDI on the CCD of the frequency-meter is a point.

Stage 3: Lens (2242) Translation Adjustment

The frequency-meter is positioned between the semi-transparent mirror (2225) and polarization rotator (2226). The lens (2242) is adjusted so that the image of the beam FEGI on the CCD of the frequency-meter is a point.

Stage 4: Lens (2281) Translation Adjustment

The frequency-meter is positioned between the semi-transparent mirror (2228) and the lens (2227). The lens (2281) is adjusted so that the image of the beam FRGI on the CCD of the frequency-meter is a point.

Stage 5: Lens (2212) Translation Adjustment

A provisional illuminating beam FEP is introduced. It is derived directly from the output of the beam expander (2201) by means of a semi-transparent mirror and is redirected by a set of mirrors to the objective (2217) in which it penetrates through the side where the sample is normally located, and directed along the optical axis of the objective. The objective (2217) must be roughly in a focussed position, i.e. in the position in which it will be during the normal use of the microscope. The objective (2219) must be temporarily eliminated in order to be able to introduce FEP.

The frequency-meter is positioned between the lens (2212) and the semi-transparent mirror (2211). The lens (2212) is adjusted so that the image of the beam FEP on the CCD of the frequency-meter is a point.

Stage 6: Lens (2237) Translation Adjustment and Semi-transparent Mirror (2245) Orientation Adjustment An auxiliary CCD is placed in the location of the diaphragm (2213). The lens (2237) is adjusted so that the image of the beam FRDI on this auxiliary CCD is a point. The semi-transparent mirror (2245) is adjusted so that the image of the beam FRDI on this auxiliary CCD is centered.

Stage 7: CCD (2239) Translation Adjustment

The position of the CCD (2239) is adjusted so that the image of the beam FEP obtained using the procedure described in 7.3.3.1. from the CCD (2239) is a centered point image.

Stage 8: Semi-transparent Mirror (2211) Adjustment

The position of this mirror is adjusted so that the image of the beam FEDI obtained using the procedure described in 7.3.3.1. from the CCD (2239) is a centered point image.

Stage 9: Objective Position Adjustment

The beam FEP is eliminated and the objective (2219) is put in place again. An auxiliary CCD is placed at the location of the diaphragm (2223). The sample is a transparent plate, for example, and optical oil is used on each side of the plate. The position of the objectives is adjusted so that the image of the beam FRDI on this auxiliary CCD is a centered point image.

Stage 10: Lens (2224) Translation Adjustment

The frequency-meter is positioned between the lens (2224) and the semi-transparent mirror (2225). The lens (2224) is adjusted so that the image of the beam FED on the CCD of the frequency-meter is a point.

Stage 11: Lens (2227) Translation Adjustment and Semi-transparent Mirror (2228) Orientation Adjustment An auxiliary CCD is placed at the location of (2223). The lens (2227) is adjusted so that the image of the beam FRGI on this auxiliary CCD is a point. The semi-transparent mirror (2228) is adjusted so that the image of the beam FRGI on this auxiliary CCD is centered.

Stage 12: CCD (2229) Translation Adjustment

The position of the CCD (2229) is adjusted so that the image of the beam FED obtained using the procedure described in 7.3.3.1. from the CCD (2229) is a centered point image.

Stage 13: Semi-transparent Mirror (2225) Adjustment

The position of this mirror is adjusted so that the image of the beam FEGI obtained using the procedure described in 7.3.3.1. from the CCD (2229) is a centered point image.

Stage 14: CCD (2229) and (2239) Rotation and Translation Adjustment

This stage consists in adjusting the position of (2229) and (2239) in rotation so that their systems of axes coincide. For this purpose, the control words COM[1,128,128], COM[1, 250,128], COM[1,128,250] are used alternately. The two sensors are adjusted in translation in a plane orthogonal to the axis (2264) and in rotation around this same axis. On each sensor is defined a system of coordinates (i,j) in which the pixel indices i and j range from 0 to $N_{pix}-1$ where $N_{pix}=256$, and which determines coordinates in the useful zone of the sensor, which will be used hereinbelow. The origin of the system of coordinates, namely the coordinates (0,0), may be any of the four corners of the useful zone of the sensor. At the same time as this adjustment is carried out, the origin of the system of coordinates is chosen. The adjustment and origin selection criteria are the same for the two sensors and are as follows:

When COM[1,128,128] is used, the point of impact of the illuminating beam, i.e. the direct illuminating beam on (2229) or the opposite indicator on (2239), must be at the coordinates (128,128).

When COM[1,250,128] is used, the point of impact of the illuminating beam must be at a point of coordinates (x,128) where x is positive.

When COM[1,128,6] is used, the point of impact of the illuminating beam must be a point of coordinates (128,x) where x is positive.

The coordinate systems thus determined are defined by their origin $O_p$ and their unit base vectors $\vec{i}_p, \vec{j}_p$, i.e. by the references $(O_p, \vec{i}_p, \vec{j}_p)$ where p is the index of the sensor (p=0 for (2239) and p=1 for (2229)).

This system of coordinates will be systematically used hereinbelow.

7.4. Determining the reference wave modulus

As in the first embodiment, the filters (2255) and (2256) are adjusted so that the level of the reference wave is about one-fourth the maximum level authorized by the digitizer, i.e. a level of 256/4=64 in the case of 8-bit sampling of the video signal, and this on both sensors.

This reference wave is then determined as in the first embodiment, but since both sensors are present, an array Iref[p,i,j] is obtained in which i,j are the pixel indices as in the first embodiment, and in which p is the sensor index, i.e. p=0 for (2239) and p=1 for (2229). Iref[0,i, j] is the intensity received on the sensor (2239) when only the beam FRD is present, and Iref[1,i,j] is the intensity received on the sensor (2229) when only the beam FRG is present.

7.5. Simple two-dimensional imaging

It was seen in the first embodiment how a two-dimensional frequency representation in complex numbers can be generated from three images differing from each other in the phase difference between the illuminating wave and reference wave. In the adjustment phases to follow, this type of frequency representation will be generated. To generate such a representation, the system produces three successive images with successive shifts of +120, 0,−120 degrees applied to the illuminating wave. The order of the phase differences is inverted in relation to that used in the first embodiment because they are applied to the illuminating wave and not to the reference wave. This yields an array of pixels I[d,p,i,j] in which the index d, varying from 0 to 2, designates the phase difference and in which the index p designates the sensor. The frequency representation is deduced therefrom by:

$$S[p, i, j] = \left[ \frac{1}{6\sqrt{Iref[p, i, j]}} (2I[0, p, i, j] - I[1, p, i, j] - I[2, p, i, j]) + \vec{j} \frac{1}{2\sqrt{3Iref[p, i, j]}} (I[1, p, i, j] - I[2, p, i, j]) \right]$$

With each acquisition is obtained an image for each sensor, and the array S[p,i,j] thus includes a sub-array for each sensor, the index p designating the sensor. However, in the adjustment phase, only one of these two images will generally be used.

7.6. Obtaining Parameters $K_p$ and adjustment of diaphragms

These parameters correspond to the parameter K of the first embodiment, but because of the dissymmetry of realization, the parameter is not necessarily the same for each sensor. Two parameters $K_0$ and $K_1$ will consequently be defined, corresponding to the two sensors. These parameters are obtained as in the first embodiment by simple imaging using an objective micrometer. The objective micrometer used must however be designed for this purpose: the marks must be made on a fine cover glass, as a thick plate cannot be used with this microscope.

In a first step, the objectives must be correctly focussed. For this purpose, the parallel beams FED and FEG are eliminated. Only the reference waves FRD and FRG are present. The mirrors (2282) and (2247) are used to obtain centered waves with two propagation directions. The mirrors (2243) and (2232) are blocked. The phase shifter (2251) is used to modify the phase of the waves. The micrometer is moved so that the marks are outside the field of the objectives. The wave measured on one side of the objectives is the equivalent of the reference wave used on the other side. The program described in 7.3.3.1. with Fourier transformation allowing passage from the frequency domain to the spatial domain, is used to evaluate the point nature of the image. The position of the objectives is adjusted to obtain a point centered in the middle of the image.

In a second step, the sample must be correctly positioned. The mirrors (2282) (2247) (2243) (2232) are blocked. Only the beam FEG is used, with a beam deflector control word COM[0,128,128]. The position of the sample in the horizontal plane is modified until a modification is obtained which is characteristic of the wave received on the sensors in the absence of a reference wave, as in the first embodiment.

The reference wave FRD is then reintroduced and a focussing program similar to that used in the first embodiment, and using the image obtained on the sensor (2239), is started. This program differs however from the one used in the first embodiment in that the illuminating wave phase and amplitude modifications are now controlled by the devices (2204) and (2205) and in that the value rapport_moy characteristic of the attenuation is real and is that which was measured in 7.3.2.2. between the only two positions of the beam attenuator which are used here.

The position of the diaphragm (2213) is then adjusted in a plane perpendicular to (2264) so that its image is correctly centered. Its aperture is adjusted in order to be as high as possible; the diaphragm must however remain entirely visible on the obtained image. The position of the micrometer is then adjusted in the vertical direction in order to obtain a clear image. On this image, the distance $(D_{pix})_0$ between two graduations separated by a real distance $D_{real}$ is measured.

The beams FEG and FRRD are then eliminated. The beam FED is introduced with the beam deflector control word COM[1,128,128]. The reference beam FRG is also introduced. The focussing program is restarted, this time using the image received on the sensor (2229). The position of the diaphragm (2223) is then adjusted in a plane perpendicular to (2264) so that its image is correctly centered. Its aperture is adjusted in order to be as high as possible; the diaphragm must however remain entirely visible on the obtained image. On the obtained image is measured the distance $(D_{pix})_1$ between the same graduations as previously.

We then have $$K_p = \frac{n_v}{\lambda} \frac{N_{pix}}{(D_{pix})_p} D_{real}$$

where:
($D_{pix}$)$_p$ is the distance in pixels measured on the image coming from the sensor index p, where p=0 for (2239) and p=1 for (2229)
$D_{real}$ is the same for each measurement.
$N_{pix}$ is the number of pixels of the useful zone of the sensor and of the Fourier transform used in the focussing program, for example $N_{pix}$=256.

The diaphragm apertures obtained after this procedure will be maintained in the rest of the description.

7.7. Path difference induced on a parallel beam

The average index of the observed sample is not necessarily the nominal index of the objectives. This index difference can lead to significant spherical aberration. It is necessary, to correct this aberration, to take into account the average index $n_o$ in the sample and the thickness L of the sample between two cover glasses with the nominal index.

The subsequent reconstitution of a three-dimensional image also requires knowledge of the relative position of the virtual origins of the reference beams used on each side of the system. This relative position is defined by x,y,z which are the coordinates of the origin of the reference beam used in the left-hand part in relation to the origin of the beam used in the right-hand part.

The parameters x,y,z,L, $n_o$ lead to phase differences in a parallel wave passing through the sample. The calculation of these phase differences is set forth below:

Correspondence between the direction of a parallel beam in the object and the coordinates of the corresponding point on the sensor:

i and j are the coordinates of a pixel in relation to the optical center, expressed in pixels, on the sensor p, in the system of coordinates defined in Stage 14 of the adjustment cycle described in 7.3.3.2. A unit vector parallel to the frequency vector in the object has the coordinates, in an orthonormed coordinate system $\vec{a}_p$, $\vec{b}_p$, $\vec{c}_p$ in which $\vec{c}_p$ is parallel to (2263) and in which $\vec{a}_p$, $\vec{b}_p$ is deduced simply from the vectors $\vec{i}_p$, $\vec{j}_p$ defined in 7.3.3.3.:

$$u = \left(\frac{i}{K_p}, \frac{j}{K_p}, \frac{1}{K_p}\sqrt{K_p^2 - i^2 - j^2}\right)$$

and it forms with the axis (2263) and angle of:

$$\sin\alpha = \frac{1}{K_p}\sqrt{i^2 + j^2}$$

If the beam coming from the objective were not deflected by the mirrors (2214) (2215) (2216) or (2222) (2221) (2220), the vectors $\vec{a}_p$, $\vec{b}_p$ would be equal to the vectors $\vec{i}_p$, $\vec{j}_p$. Although this is not really the case, the basic vectors $\vec{a}_p$, $\vec{b}_p$, $\vec{c}_p$ will be denoted hereinafter by $\vec{i}_p$, $\vec{j}_p$, $\vec{k}_p$, without differentiating the vectors $\vec{a}_p$, $\vec{b}_p$ from the corresponding vectors $\vec{i}_p$, $\vec{j}_p$ defined in 7.3.3.3. on the sensors.

Path difference induced by the presence of the object:

FIG. 45 shows the principle for calculating this path difference. We have:

$\Delta = l_o n_o - l_v n_v$, in which $n_v$ designates the nominal index of the objectives, i.e. the index for which they were designed and which must be that of the optical oil used.

$\Delta = Ln_o \cos\beta - Ln_v \cos\alpha$ $$\Delta = L\left(n_o\sqrt{1 - \left(\frac{n_v}{n_o}\sin\alpha\right)^2} - n_v\sqrt{1 - \sin^2\alpha}\right)$$

hence:

$$\Delta = L\left(n_o\sqrt{1 - \left(\frac{n_v}{n_o}\right)^2\frac{i^2 + j^2}{K_p^2}} - n_v\sqrt{1 - \frac{i^2 + j^2}{K_p^2}}\right)$$

Path difference induced by the displacement of the illuminated point:

The parameter accessible for measurement is the path difference between the inverted beam coming from FRG and the reference beam FRD. If these two beams coincide and if the index of the medium separating the objectives is the nominal index of the objectives, the path difference is zero. However, if the virtual origin of the reference beam FRD has the coordinates (x,y,z) in relation to the virtual origin of the reference beam FRG, materialized by the point of focus of its inverted beam, then this path difference is calculated as follows:

The vector v=(x,y,z) and the vector u defined above are used. FIG. 46 shows the geometrical calculation principle. The path difference induced is:

$$\Delta = u \cdot v = \left(\frac{i}{K_p}, \frac{j}{K_p}, \frac{1}{K_p}\sqrt{K_p^2 - i^2 - j^2}\right) \cdot (x, y, z)$$

$$\Delta = x\frac{i}{K_p} + y\frac{j}{K_p} + z\frac{1}{K_p}\sqrt{K_p^2 - i^2 - j^2}$$

Total path difference:

This is the sum of the path difference due to the presence of the object and that due to the non-coincidence of the source points.

$$\Delta = n_v\left(x\frac{i}{K_p} + y\frac{j}{K_p} + z\frac{1}{K_p}\sqrt{K_p^2 - i^2 - j^2}\right) +$$

$$L\left(n_o\sqrt{1 - \left(\frac{n_v}{n_o}\right)^2\frac{i^2 + j^2}{K_p^2}} - n_v\sqrt{1 - \frac{i^2 + j^2}{K_p^2}}\right)$$

In the absence of a diaphragm, the wave measured at the point of the sensor with coordinates (i,j) is equal to:

$$e^{j2\pi\frac{\Delta}{\lambda}} = \exp\left\{j\frac{2\pi}{\lambda}\left[n_v\left(x\frac{i}{K_p} + y\frac{j}{K_p} + z\frac{1}{K_p}\sqrt{K_p^2 - i^2 - j^2}\right) + L\left(n_o\sqrt{1 - \left(\frac{n_v}{n_o}\right)^2\frac{i^2 + j^2}{K_p^2}} - n_v\sqrt{1 - \frac{i^2 + j^2}{K_p^2}}\right)\right]\right\}$$

7.8. Maximization program 7.8.1. Principle

In the "ideal" case in which the sample is simply a plate of thickness L and refractive index $n_o$, a simple method may be used to determine the values of x,y,z,L, $n_o$. For this adjustment, the illuminating beams FED and FEG are eliminated and the reference beams FRD and FRG are introduced using the mirrors (2282) and (2247) to send symmetrical beams to the objectives. The beam FRG reflected by (2282) and directed towards the objective (2219) is centered on a central point of the diaphragm (2224). It is focussed by the objective (2219) at a point of the object (2218). It then passes through the objective (2217) and reaches the CCD (2239) on which it is superimposed on the reference beam FRD reflected by the semi-transparent mirror (2245) in the direction of the CCD (2239). The phase shifter (2251) is used to generate a phase shift between the two beams, thus allowing the complex value measurement of the beam coming from FRG and received on (2239), using the simple imaging procedure described in 7.5. The wave thus received is stored in an array $F_{rec}$ of dimensions $N_{pix} \times N_{pix}$.

In practice, the acquisition method will often differ from the ideal case but will always allow the acquisition of an array $F_{rec}$ of dimensions $N_{pix} \times N_{pix}$ equivalent to the one that would be obtained in the ideal case.

Owing to the phase differences induced by the sample, the value of the wave at a point in the absence of a diaphragm, and in a system of coordinates centered on the optical center, is given by the formula established in 7.7.:

$$e^{j2\pi\frac{\Delta}{\lambda}} = \exp\left\{ j\frac{2\pi}{\lambda} \left[ n_v \left( x\frac{i}{K_0} + y\frac{j}{K_0} + z\sqrt{1 - \frac{i^2 + j^2}{K_0^2}} \right) + L\left( n_o\sqrt{1 - \left(\frac{n_v}{n_o}\right)^2\frac{i^2 + j^2}{K_0^2}} - n_v\sqrt{1 - \frac{i^2 + j^2}{K_0^2}} \right) \right] \right\}$$

The presence of the diaphragm moreover has a filtering effect which may also be simulated.

The purpose of the program used is to calculate x,y,z,L, $n_o$ by minimizing the difference between the wave thus simulated and the wave actually received.

This difference may be characterized by the standard deviation $\sigma(x,y,z,L,n_o)$ between the simulated wave and the received wave. As the received wave is stored in an array $F_{rec}$ of dimensions $N_{pix} \times N_{pix}$, this standard deviation may be calculated as follows, in six stages, for a given value of the quintuplet (x,y,z,L,$n_o$):

Stage 1—The following frequency representation, of dimensions $N_c \times N_c$ with, for example, $N_c$=4096, is calculated:

$$F_c[i, j] = \exp\left\{ j\frac{2\pi}{\lambda} \left[ n_v \left( x\frac{ic}{R_c} + y\frac{jc}{R_c} + z\sqrt{1 - \frac{ic^2 + jc^2}{R_c^2}} \right) + L\left( n_o\sqrt{1 - \left(\frac{n_v}{n_o}\right)^2\frac{ic^2 + jc^2}{R_c^2}} - n_v\sqrt{1 - \frac{ic^2 + jc^2}{R_c^2}} \right) \right] \right\}$$

where $$R_c = \frac{N_c}{N_{pix}} K_0$$

and where ic and jc are the indices centered:

$$ic = i - \frac{N_c}{2}, \quad jc = j - \frac{N_c}{2}$$

Stage 2—The inverse Fourier transform of $F_c$ is calculated.
Stage 3—$F_c$ now being in spatial representation, the presence of the diaphragm constitutes a simple limitation in this domain. The program thus calculates the table $F_d$ of dimensions $N_{pix} \times N_{pix}$ by initializing it to 0 and then performing:

$$F_d[i, j] = F_c\left[i - \frac{N_{pix}}{2} + \frac{N_c}{2}, j - \frac{N_{pix}}{2} + \frac{N_c}{2}\right]$$

for all the pairs (i,j) such that $$\left(i - \frac{N_{pix}}{2}\right)^2 + \left(j - \frac{N_{pix}}{2}\right)^2 \leq \left(\frac{N_{pix}}{2}\right)^2$$

Stage 4—The program performs a Fourier transformation of the table $F_d$
Stage 5—The program calculates the value $$rapport = \frac{\sum_{(i,j)\in E} F_{rec}[i,j]\overline{F_d[i,j]}}{\sum_{(i,j)\in E} |F_d[i,j]|^2}$$

in which E is a set defined in order to avoid excessively attenuated values, allowing phase and intensity correction on the table $F_d$ before comparing it to $F_{rec}$.
Stage 6—The program then calculates the standard deviation $$\sigma^2(x, y, z, L, n_o) = \sum_{i,j} |F_{rec}[i,j] - rapport \cdot F_d[i,j]|^2$$

The calculation program of x,y,z,L, $n_o$ determines the value of x,y,z,L, $n_o$ which minimizes the standard deviation thus calculated. Any program for minimizing the value $\sigma^2(x,y,z,L,n_o)$ may be used in an equivalent manner. The algorithm described in 7.8.2. constitutes an example of such a program but may be replaced by any equivalent minimization program.

To simplify the calculations and facilitate convergence, the minimizing of $\sigma^2(x,y,z,L,n_o)$ is replaced in the algorithm described in 7.8.2. by the maximizing of a characteristic value which varies according to a mode variable which increases as the algorithm converges towards the solution. Three values of mode are used:

Mode=1: The image actually received is phase-corrected by multiplication by $e^{-j2\pi\Delta/\lambda}$. An inverse Fourier transform allows a spatial representation to be obtained. The value chosen is the maximum of the modulus over the entire spatial representation.

Mode=2: Same as mode=1, but the central part of the spatial representation is over-sampled and the value chosen is the value of the modulus at the barycenter of the points of the spatial representation.

Mode=3: The wave to be received on the sensor for the considered values of x,y,z,L, $n_o$ is calculated taking into account the filtering by the diaphragm. The value chosen is the opposite of the standard deviation between the wave thus simulated and the wave actually received, namely $-\sigma^2(x,y,z,L,n_o)$ 7.8.2. Algorithm
The algorithm of this program is described in FIGS. 47 to 50 and FIG. 60.

FIG. 47 describes the highest level of the program. This level consists of a double variation loop for the index $n_o$. The program calculates nopixels values of maxb, the highest value reached by the characteristic value for the index $n_o$, between nomin and nomax. This corresponds to the internal loop (3201). The program determines the new value of nocentre, which must correspond to the maximum value of maxb. It then begins a new iteration of the type (3201) where the values of $n_o$ are centered around the new value of nocentre and where the width nolarg=nomax−nomin of the search interval has been divided by 2. This constitutes the external loop (3202) which is reiterated until the width of the search interval corresponds to the precision sought on the index $n_o$. This method obviates the need to test too many values of $n_o$ to reach a result of a given precision.

The program must have the following input values:
minimum and maximum values of each value sought based on available information. nomin_ini, nomax_ini (index $n_o$), Lmin,Lmax (width L), zmin,zmax (depth z). The program does not require a maximum and minimum value of the coordinates x and y.
operating parameters, for example nopixels=5 and pixels=50
image obtained, for example in the manner described in 7.8.1., in the form of an array of complex numbers $F_{rec}[i,j]$ of dimensions $N_{pix} \times N_{pix}$.

The main steps in the program are:
(3203): the current value of $n_o$ is calculated.
(3204): this procedure calculates the maximum value maxb reached by the characteristic value for the current index $n_o$, as well as the corresponding values of x,y,z,L. It is illustrated in detail in FIG. 48.
(3205): When the value maxb corresponding to the current iteration is greater than max_no, the current values of x,y,z,L, (calculated using the procedure (3204)), and $n_o$ are stored and constitute the current approximation of the sought result.
(3206): The width is compared with a certain limit to determine the convergence condition. It is possible to have, for example, lim=0.05λ/L nopixels
(3207): The program ends. The values $x_f, y_f, z_f, L_f$, nocentre correspond to the best approximation of the real values of x,y,z,L, $n_o$. They are displayed and stored for subsequent re-use.

For each index $n_o$, the procedure (3204) calculates a maximum value of the characteristic value and the associated values of x,y,z,L. However, a change of variables is made and the variables really used in the procedure are x,y,u,v where:

$$u = cL + z$$
$$v = L - cz$$
$$c = \frac{n_v}{n_o} - 1$$

where $n_v$ is the nominal refractive index of the objectives.

The procedure consists in varying u and v and, for each pair (u,v), in calculating x,y, and the max value of the characteristic value.

The pair (u,v) varies initially over a discrete set of points of size upixels x vpixels, u and v varying respectively over the width intervals ularg and vlarg centered around the points ucentre_ini and vcentre_ini. The program determines the new value of (ucentre,vcentre) which corresponds to the pair (u, v) for which the max value is the highest. It also determines values xbar and ybar which correspond to the deviation between the values of x,y used for the calculation and the refined value of x,y after the calculation. These operations constitute the procedure (3305) shown in detail in FIG. 49.

When a new value of (ucentre,vcentre) has been obtained, the program decreases the width ularg and vlarg of the search intervals, as well as their centers ucentre_ini, vcentre_ini and the values of x and y, then calculates the value Δdif. If the obtained value is less than a limit set as convergence criterion, the program calculates z and L by inverting the change of variables, thus terminating the procedure (3204). Otherwise, it modifies if necessary the choice of characteristic value (mode modification), then repeats the procedure (3305). This constitutes the loop (3301). These operations constitute the procedure (3204) described in FIG. 48.

Figure 48:
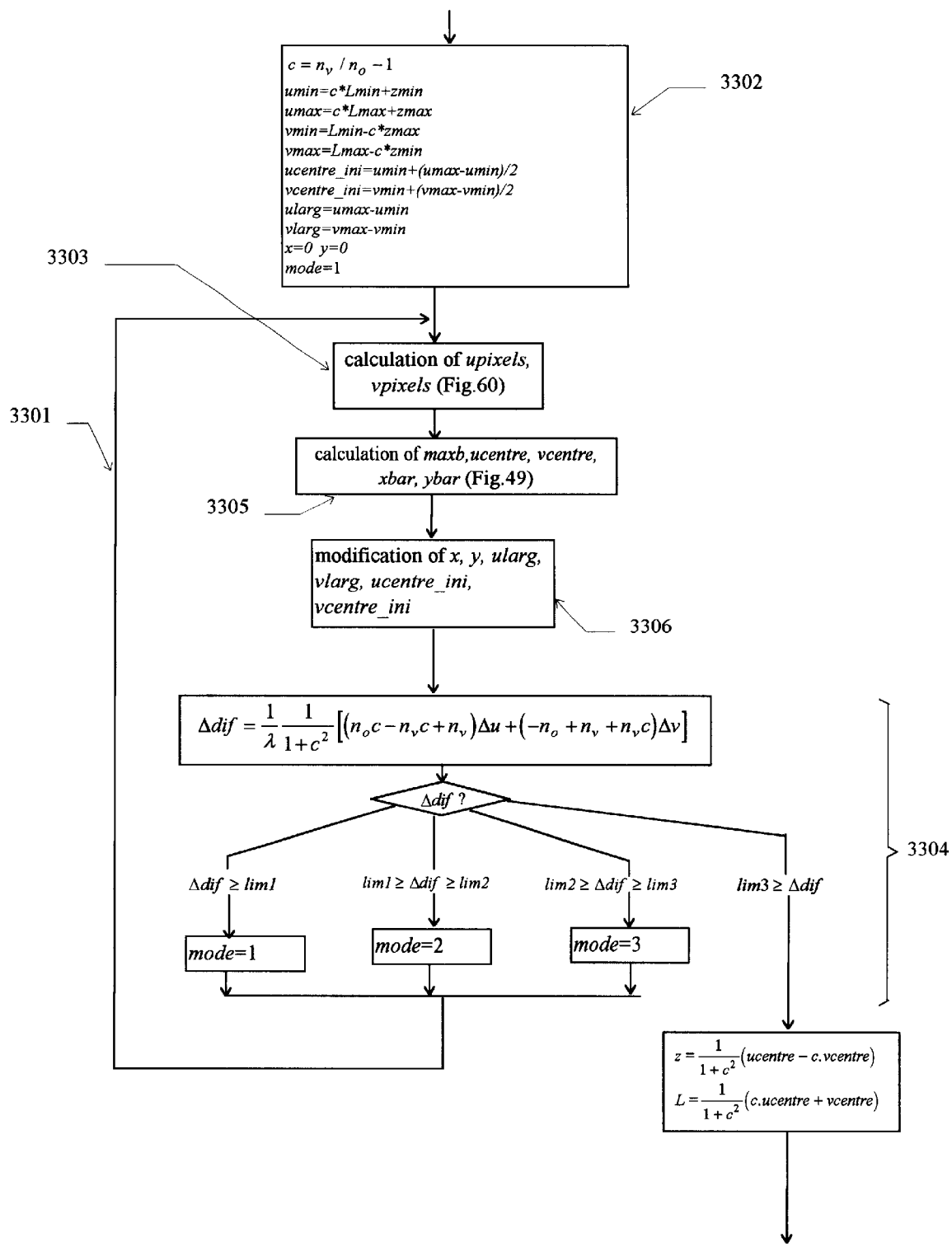

FIG. 48 describes the procedure (3204). Its basic steps are:
(3302): Variation intervals of u and v are determined.
(3303): This procedure is designed to determine upixels and vpixels in an optimum manner. Its algorithm is described in FIG. 60.
(3304): The deviation of (phase/2π) caused by the crossing of the plate and the displacement along z of the point of impact for a beam having a direction parallel to z is: dif=1/λ((n_o−n_v)L+n_v z). It is considered that the algorithm has converged when this value is known with sufficient accuracy. The uncertainty on this value is equal to:

$$\Delta dif = \frac{1}{\lambda} \frac{1}{1+c^2} [(n_o c - n_v c + n_v)\Delta u + (-n_o + n_v + n_v c)\Delta v]$$

where $$\Delta u = \frac{ularg}{upixels} \text{ and } \Delta v = \frac{vlarg}{vpixels}$$

The program modifies mode and determines the end of convergence according to the value obtained for Δdif. It is possible for example to have lim1=2, lim2=0.25,lim3= 0.01
(3305): This procedure calculates the characteristic value for a set of pairs (u,v) and determines the pair ucentre, vcentre corresponding to the highest characteristic value, the value maxb of this characteristic value, and the values xbar,ybar which represent the deviation between the new approximation of x,y and the current values of x,y. It is shown in detail in FIG. 49.
(3306): Modification of x,y,ularg,vlarg,ucentre_ini, vcentre_ini The program carries out the following modifications:

$$x = x + xbar$$
$$y = y + ybar$$

if upixels ≦4 then ucentre_ini, ularg are not modified.
if upixels ≧5 then: ucentre_ini=ucentre and $$ularg = \frac{4}{upixels} ularg$$

if vpixels ≦4 then: vcentre_ini, vlarg are not modified.
if vpixels ≧5 then: vcentre_ini=vcentre and $$vlarg = \frac{4}{vpixels} vlarg$$

Figure 49:
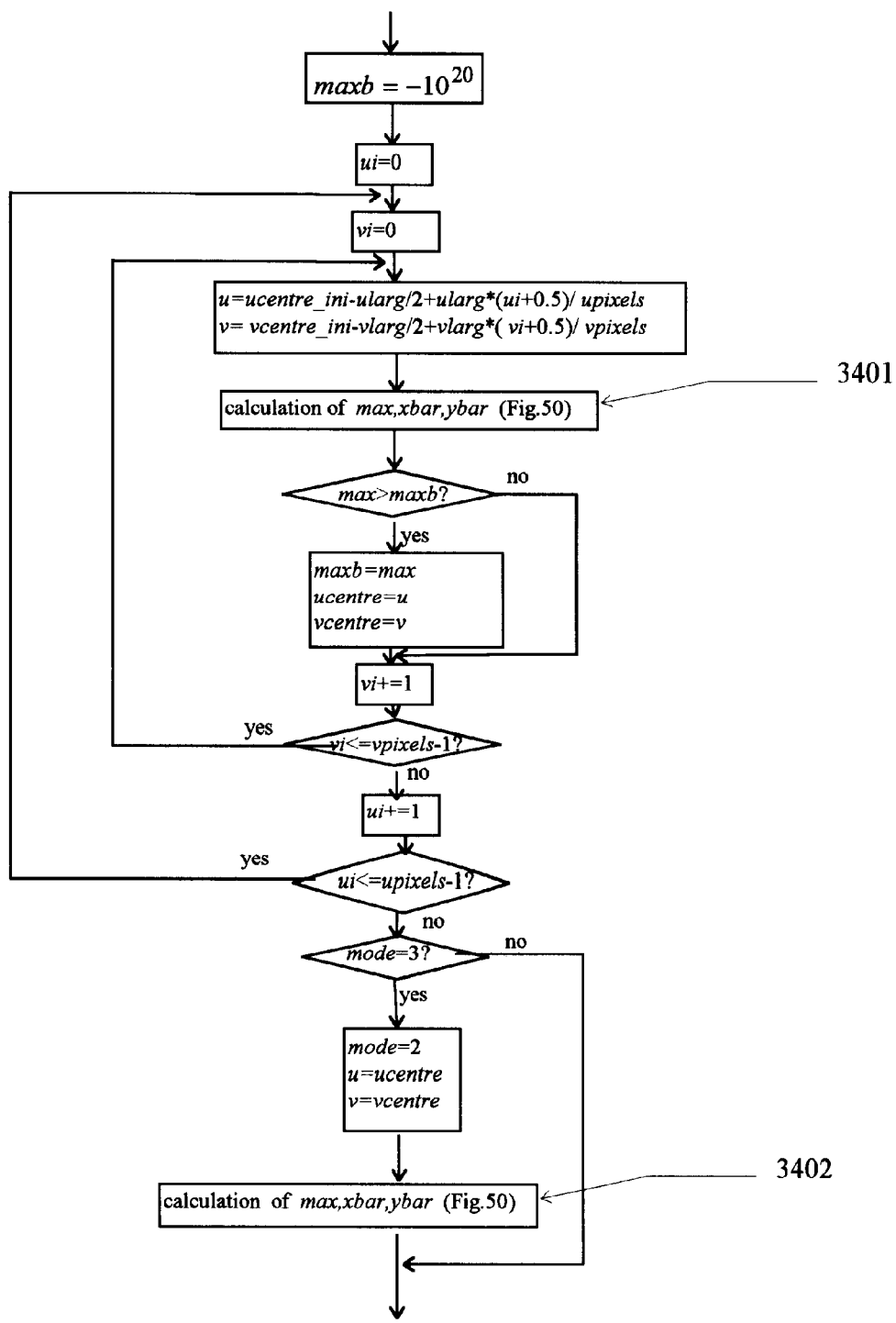

FIG. 49 describes the procedure (3305). Its basic steps are:
(3401): This procedure calculates the max characteristic value for the current values of u,v, $n_o$. In Mode 1 and 2 it also calculates xbar and ybar which represent the deviation between the new approximation of x,y and the input value of the procedure.

(3402): In the case of Mode 3, the procedure (3401) has not calculated xbar and ybar. It is restarted in Mode 2 to perform this calculation.

Figure 50:
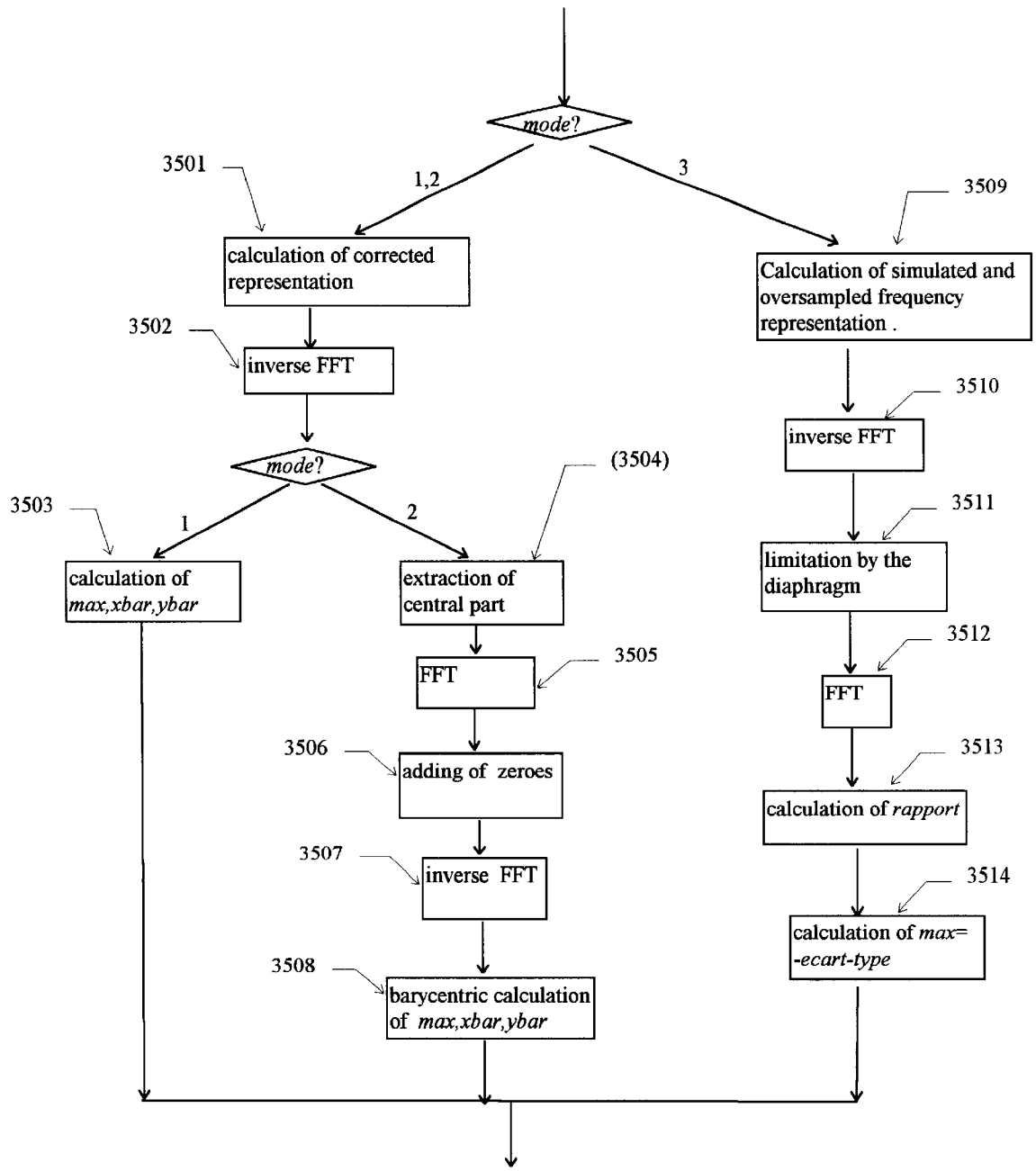

FIG. 50 describes the procedure (3401). Its basic steps are:

(3501): Calculation of corrected frequency representation. From the array $F_{rec}[i,j]$ the program calculates a corrected representation using:

$$a[i,j] = \frac{1}{\lambda}\left\{\frac{c}{1+c^2}n_o\left(\sqrt{1-\left(\frac{n_v}{n_o}\right)^2\frac{ic^2+jc^2}{K_0^2}}-1\right)+\right.$$

$$\left.\frac{1-c}{1+c^2}n_v\left(\sqrt{1-\frac{ic^2+jc^2}{K_0^2}}-1\right)\right\}$$

$$b[i,j] = \frac{1}{\lambda}\left\{\frac{1}{1+c^2}n_o\left(\sqrt{1-\left(\frac{n_v}{n_o}\right)^2\frac{ic^2+jc^2}{K_0^2}}-1\right)-\right.$$

$$\left.\frac{1+c}{1+c^2}n_v\left(\sqrt{1-\frac{ic^2+jc^2}{K_0^2}}-1\right)\right\}$$

where ic and jc are centered indices:

$$ic = i - \frac{N_{pix}}{2},\ jc = j - \frac{N_{pix}}{2}$$

We then verify, to with a constant bias independent of i and j:

$$\frac{\Delta}{\lambda} = \frac{n_v}{\lambda}\left(x\frac{ic}{K_0} + y\frac{jc}{K_0}\right) + a[i,j]u + b[i,j]v$$

The program generates the corrected frequency representation as follows:

$$F_{cor}[i,j] = F_{rec}[i,j]\gamma(a[i,j]\Delta u)\gamma(b[i,j]\Delta v)\exp$$
$$\left\{-\tilde{j}2\pi\left[\frac{n_v}{\lambda}\left(x\frac{i-\frac{N_{pix}}{2}}{K_0} + y\frac{j-\frac{N_{pix}}{2}}{K_0}\right) + a[i,j]u + b[i,j]v\right]\right\}$$

where $\gamma(x)=0$ when $|x|\geq 1/2$ and $\gamma(x)=1$ when $|x|<1/2$, and $$\Delta u = \frac{ularg}{upixels},\ \Delta v = \frac{vlarg}{vpixels}$$

a[i,j] and b[i,j] represent respectively the frequencies along u and v of the corrected function obtained. We verify that these frequencies both have a constant sign. Multiplication by the $\gamma$ functions makes it possible to cancel the elements for which these frequencies are too high and thus avoid aliasing which would prevent the convergence of the algorithm.

(3502): An inverse Fourier transform of array $F_{cor}$ is performed.

(3503): max is the maximum value of the module in the array $F_{cor}[i,j]$

We denote as imax and jmax the coordinates of the pixel in which the maximum is reached. We then have:

$$xbar = \frac{K_0\lambda}{N_vN_{pix}}\left(imax - \frac{N_{pix}}{2}\right)$$

$$ybar = \frac{K_0\lambda}{N_vN_{pix}}\left(jmax - \frac{N_{pix}}{2}\right)$$

(3504): The central part of the array $F_{cor}[i,j]$ is extracted. We thus create a array $F_a[i,j]$ of dimensions $N_a \times N_a$ with for example $N_a=16$:

$$F_a[i,j] = F_{cor}\left[i - \frac{N_a}{2} + \frac{N_{pix}}{2},\ j - \frac{N_a}{2} + \frac{N_{pix}}{2}\right]$$

(3505): A direct Fourier transform is performed on the array $F_a$ (3506): The array $F_a$ is completed by zeros and we obtain an array $F_b$ of dimensions $N_b \times N_b$ with for example $N_b=512$.

$$F_b[i,j] = F_a\left[i - \frac{N_b}{2} + \frac{N_a}{2},\ j - \frac{N_b}{2} + \frac{N_a}{2}\right]$$

when $$N_a - 1 \geq i - \frac{N_b}{2} + \frac{N_a}{2} \geq 0\ \text{and}\ N_a - 1 \geq j - \frac{N_b}{2} + \frac{N_a}{2} \geq 0$$

and $F_b[i,j]=0$ otherwise.

(3507): The Inverse Fourier transform of array $F_b$ is performed.

(3508): xbar,ybar,max are calculated by the formulas:

$$imax = \frac{\sum_{i,j}|F_b[i,j]|^2 i}{\sum_{i,j}|F_b[i,j]|^2}$$

$$jmax = \frac{\sum_{i,j}|F_b[i,j]|^2 j}{\sum_{i,j}|F_b[i,j]|^2}$$

$$max=|F_b[imax, jmax]|$$

$$xbar = \frac{K_0\lambda}{n_vN_{pix}}\frac{N_a}{N_b}\left(imax - \frac{N_b}{2}\right)$$

$$ybar = \frac{K_0\lambda}{n_vN_{pix}}\frac{N_a}{N_b}\left(jmax - \frac{N_b}{2}\right)$$

(3509): The following frequency representation, of dimensions $N_c \times N_c$ with for example $N_c=4096$, is calculated:

$$F_c[i,j] = \exp\left\{\tilde{j}\frac{2\pi}{\lambda}\left[n_v\left(x\frac{ic}{R_c} + y\frac{jc}{R_c} + z\sqrt{1 - \frac{ic^2+jc^2}{R_c^2}}\right) + \right.\right.$$

$$\left.\left. L\left(n_o\sqrt{1-\left(\frac{n_v}{n_o}\right)^2\frac{ic^2+jc^2}{R_c^2}} - n_v\sqrt{1-\frac{ic^2+jc^2}{R_c^2}}\right)\right]\right\}$$

where $$R_c = \frac{N_c}{N_{pix}} K_0$$

and where ic and jc are centered indices:

$$ic = i - \frac{N_c}{2}, \; jc = j - \frac{N_c}{2}$$

(3510): The inverse Fourier transform of $F_c$ is calculated.

(3511): $F_c$ now being in spatial representation, the presence of the diaphragm constitutes a simple limitation in this domain. The program thus calculates the array $F_d$ of dimensions $N_{pix} \times N_{pix}$ by initializing to 0 and then carrying out:

$$F_d[i, j] = F_c\left[i - \frac{N_{pix}}{2} + \frac{N_c}{2}, \; j - \frac{N_{pix}}{2} + \frac{N_c}{2}\right]$$

for all the pairs (i,j) such that $$\left(i - \frac{N_{pix}}{2}\right)^2 + \left(j - \frac{N_{pix}}{2}\right)^2 \leq \left(\frac{N_{pix}}{2}\right)^2$$

(3512): The program performs a Fourier transform of array $F_d$ (3513): The program calculates the value $$rapport = \frac{\sum_{(i,j) \in E} F_{rec}[i, j] \overline{F_d[i, j]}}{\sum_{(i,j) \in E} |F_d[i, j]|^2}$$

where E is the set of pairs (i, j) complying with:

$$F_{rec}[i, j] \overline{F_d[i, j]} \geq Coef \cdot \max_{\substack{0 \leq a \leq N_{pix}-1 \\ 0 \leq b \leq N_{pix}-1}} |F_{rec}[a, b] \overline{F_d[a, b]}|,$$

with for example Coef=0,5. The justification for this formula can be found in 7.17.1.2.

(3514): The program then calculates the max characteristic value:

$$\max = -\sum_{i,j} |F_{rec}[i, j] - rapport \cdot F_d[i, j]|^2$$

Figure 60:
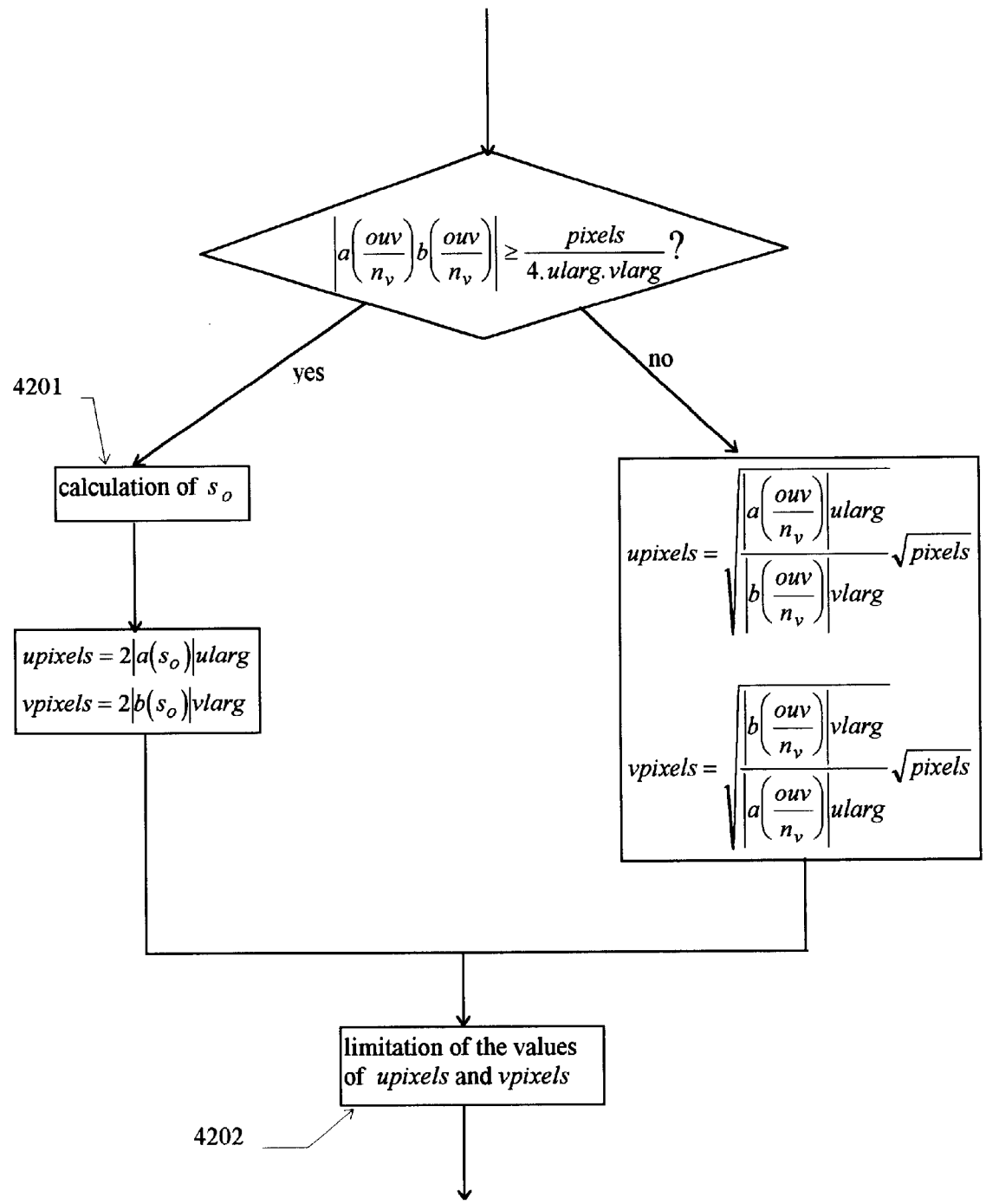

FIG. 60 describes the procedure (3303). This procedure seeks to determine upixels and vpixels according to the principles set forth below:

It is possible to express the value $\Delta/\lambda$ calculated in 7.7., with a constant bias, in the following form:

$$\frac{\Delta}{\lambda} = \frac{n_v}{\lambda}\left(x\frac{i}{K_0} + y\frac{j}{K_0}\right) + a(s)u + b(s)v$$

where:

$$a(s) = \frac{1}{\lambda}\left\{\frac{c}{1+c^2}n_o\left(\sqrt{1 - \left(\frac{n_v}{n_o}\right)^2 s^2} - 1\right) + \frac{1-c}{1+c^2}n_v\left(\sqrt{1-s^2} - 1\right)\right\}$$

-continued $$b(s) = \frac{1}{\lambda}\left\{\frac{c}{1+c^2}n_o\left(\sqrt{1 - \left(\frac{n_v}{n_o}\right)^2 s^2} - 1\right) - \frac{1-c}{1+c^2}n_v\left(\sqrt{1-s^2} - 1\right)\right\}$$

$$s = \sqrt{\frac{i^2 + j^2}{K_0^2}},$$

i and j being centered indices.

The method for generating the characteristic value, in the case of mode=1 or mode=2, consists in multiplying the frequency representation $F_{rec}$ by the phase correction factor $e^{-j2\pi\Delta/\lambda}$ and then performing a Fourier transform. The representation thus obtained is in the spatial domain. The characteristic value is roughly the value of this representation at the origin. It is thus obtained as a sum of elements of the form $e^{-j2\pi\Delta/\lambda}$. This characteristic value may be considered to be a ftmctionfonc(u,v) of u and v. If we fix the value of v, it becomes simply a function of u. If we limit the representation $F_{rec}$ to a disc of radius (in pixels) $K_0 s_o$, this function of u has as its maximum frequency $a(s_o)$. $a(s_o)$ is thus the maximum frequency of fonc along u. Similarly, $b(s_o)$ is the maximum frequency of fonc along v. upixels and vpixels must be determined so that, for a given value of $s_0$, as high as possible, the sampling intervals along u and v are sufficiently precise to prevent aliasing. This condition is written:

$$|a(s_o)|\frac{ularg}{upixels} = |b(s_o)|\frac{vlarg}{vpixels} = \frac{1}{2}$$

Further, the total number of pixels is limited to a pixels value, which is written:

upixels.vpixels=pixels

Combining these equations we obtain the equation E1:

$$|a(s_o)b(s_o)| = \frac{pixels}{4 \cdot ularg \cdot vlarg}$$

Two cases may then arise:

first case:

$$\left|a\left(\frac{ouv}{n_v}\right)b\left(\frac{ouv}{n_v}\right)\right| \geq \frac{pixels}{4 \cdot ularg \cdot vlarg}$$

The equation E1 has a solution $s_o$ that the program can determine by dichotomy. The values of upixels and vpixels are then determined by:

upixels=$2|a(s_o)|u$larg vpixels=$2|b(s_o)|v$larg

Second case:

$$\left|a\left(\frac{ouv}{n_v}\right)b\left(\frac{ouv}{n_v}\right)\right| < \frac{pixels}{4 \cdot ularg \cdot vlarg}$$

The equation E1 has no solution. The values of upixels and vpixels are then determined to be proportional to those obtained for the value $$s_o = \frac{ouv}{n_v} \text{ i.e:}$$

$$upixels = \alpha \left| a\left(\frac{ouv}{n_v}\right) \right| ularg$$

$$vpixels = \alpha \left| b\left(\frac{ouv}{n_v}\right) \right| vlarg$$

Also, the condition upixels.vpixels=pixels must always be true. The solution of these equations gives:

$$\alpha^2 = \frac{pixels}{\left| a\left(\frac{ouv}{n_v}\right) \right| \left| b\left(\frac{ouv}{n_v}\right) \right| ularg \cdot vlarg}$$

and we thus obtain finally:

$$upixels = \sqrt{\frac{\left| a\left(\frac{ouv}{n_v}\right) \right| ularg}{\left| b\left(\frac{ouv}{n_v}\right) \right| vlarg}} \sqrt{pixels}$$

$$vpixels = \sqrt{\frac{\left| b\left(\frac{ouv}{n_v}\right) \right| vlarg}{\left| a\left(\frac{ouv}{n_v}\right) \right| ularg}} \sqrt{pixels}$$

In both cases, the values thus determined are real values which may be less than 1 or higher than pixels. A last step thus consists in translating them into integer numbers within the interval [1,pixels].

The resulting algorithm, which allows the determination of upixels and vpixels, is represented in FIG. 60. The following steps must be examined in detail:

(4201): $s_o$ is the solution of the equation $$|a(s_o)b(s_o)| = \frac{pixels}{4 \cdot ularg \cdot vlarg}.$$

The program solves this equation by dichotomy between 0 and $$\frac{ouv}{n_v}.$$

(4202): The program takes for upixels and vpixels the integer number nearest to the real value obtained, then limits these values as follows:
if upixels<1 the program performs upixels=1
if vpixels<1 the program performs vpixels=1
if upixels>pixels the program performs upixels=pixels
if vpixels>pixels the program performs vpixels=pixels
7.9. Obtaining characteristics of parallel beams Each parallel beam generated by the illuminating beam control system has an independent phase. The purpose of this procedure is to determine the phases and the coordinates of these parallel beams. It is broken down into two parts:
7.9.1. Adjustment of objectives and obtaining the relative position of the points of focus The purpose of the present step is to determine the relative position of the origins of the reference beams FRD and FRG. This may be achieved by adjusting the position of the objectives so that the image produced by the beam FRGI on the sensor (2239) is a perfect point image.

For this purpose, only the beams FRGI and FRD are used. The mirror (2282) is used to obtain a centered wave with two propagation directions. The mirrors (2243) (2232) (2247) are blocked. The phase shifter (2251) is used to modify the phase of this wave. The space between the two objectives is occupied by optical oil with the nominal index of the objectives. The wave measured on the right side of the objectives on the sensor (2239) indexed by p=0 is the equivalent of the reference wave used on the other side. Its punctuality is evaluated by the procedure described in 7.3.3.1., using a Fourier transform in said procedure. The position of the objectives is set to obtain a point centered in the middle of the image.

If this objective position adjustment is carried out with the greatest care and with sufficiently precise positioners, of sub-micrometric precision, for example microscope focussing devices of sufficient quality, or positioners with piezo-electric control, then the origin of the images obtained on each side of the microscope match.

This however requires extremely precise positioning of the objectives. The adjustment procedure described in 7.3.3.2. however makes it possible to obtain this adjustment quality using positioners of average precision for the objectives. In fact, fine adjustments are carried out in this procedure by moving the cameras and not the objectives. If the adjustment procedure described in 7.3.3.2. is carried out with care, the origins of the frequency representations finally obtained will match. Their relative coordinates are thus (x,y,z)=(0,0,0). It is then preferable not to modify the positions obtained for the objectives.

However, the adjustments obtained by procedure 7.3.3.2. or by a new adjustment of the position of the objectives are in general not perfect. It is possible to use (x,y,z)=(0,0,0), but a better superposition of the images coming from each sensor will be obtained if a suitable algorithm is used to calculate a more precise value of these parameters.

The wave measured on the sensor (2239), obtained according to the procedure described in 7.5. with p=0, is then stored in an array $F_{rec}[i,j]$. The coordinates x,y,z of the origin of the reference wave coming from FRRD in relation to the origin of the reference wave coming from FRG are then determined from $F_{rec}[i,j]$ using the program described in 7.8. However, in order to take into account the absence of a sample, the procedure (3303) is replaced by the following two assignments:
upixels=pixels
vpixels=1

Further, the variables used are:
nomax_ini=nomin_ini=$n_v$, $n_v$ being the nominal index of the objectives.
Lmin=Lmax=0
nopixels=1
pixels=20
zmin=−20λ and zmax=20λ (for example)
7.9.2. Obtaining complex values and coordinates of the illuminating beams The purpose of this procedure is to determine, for each parallel beam defined by the indices p,i,j of the control word COM[p,i,j] of the beam deflector:
the coordinates of the point of direct impact of the illuminating beam on the sensor p. These coordinates will be stored in the arrays Ia[p,0,i,j], Ja[p,0,i,j].
the coordinates of the point of direct impact of the illuminating beam on the sensor p̄. These coordinates will be stored in the arrays Ia[p,1,i,j], Ja[p,1,i,j].
the complex value of the corresponding illuminating beam, its phase being measured at the origin of the reference wave used on the sensor $\bar{p}$. This phase measurement convention in fact ensures that the complex value thus obtained is independent of the position of the objectives, to within a global phase factor affecting all the beams characterized by the same index p. This complex value will be stored in an array Ra[p,i,j]. As the direct measurement of the beams gives coordinates relative to the origin of the reference wave used on the sensor p, this value must be corrected according to the position values determined en 7.9.1.

During this procedure, the reference beams FRD and FRG are used, as well as an illuminating beam defined by a variable control word COM[p,i,j] of the beam deflector. The mirrors (2243) and (2232) are used to create an opposite indicator beam of the illuminating beam which will strike the sensor opposite the sensor normally illuminated by this beam. The mirrors (2247) and (2282) are blocked. The procedure described in 7.5. is used to obtain, on each sensor, two-dimensional images in complex numbers. The phase shifts are obtained by means of the element (2205).

A program makes it possible to obtain these parameters in the form of arrays Ia[p,q,i,j], Ja[p,q,i,j], Ra[p,i,j]. Using an oversampling method, it determines Ia[p,q,i,j], Ja[p,q,i,j] with sub-pixel precision. These arrays are thus arrays of real numbers.

The coordinate system used on the sensor p is that determined in Step 14 of the adjustment cycle in 7.3.3.2., defined by the direction vectors ($\vec{i}_p, \vec{j}_p$). This coordinate system convention will be maintained hereinafter.

The program is made up of three loops covered successively.

Loop 1: This is a loop on the index p, which takes on the values 0 and 1 successively. For each of these indices the program uses the control word $$COM\left[p, \frac{N_{pix}}{2}, \frac{N_{pix}}{2}\right].$$

It then determines the integer coordinates imax0$_p$, jmax0$_p$ of the maximum of the resulting image on the sensor p.

Loop 2: This is a loop on the set of triplets $p_0, i_0, j_0$. For each of these triplets, the program generates the values Ia[$p_0$, q,i$_0$,j$_0$] Ja[$p_0$,q,i$_0$,j$_0$] Ra[$p_0$,i$_0$,j$_0$]. With each iteration, corresponding to a given triplet $p_0,i_0,j_0$ the program completes the following 8 steps:

Step 1: The control word $$COM\left[p_0, \frac{N_{pix}}{2}, \frac{N_{pix}}{2}\right]$$

is used and the resulting images on each sensor are stored in two arrays of complex numbers M0$_q$[i,j] where q=0 for the image obtained on sensor $p_0$ and q=1 for the image obtained on the opposite sensor.

Step 2: The control word COM[$p_0,i_0,j_0$] is used and the resulting images are stored in the arrays M1$_q$[i,j]

Step 3: The program determines the coordinates imax$_q$, jmax$_q$ of the point corresponding to the modulus maximum value of the array M1$_q$[i,j] for each value of q.

Step 4: The program extracts an image of size $N_a \times N_a$, with for example $N_a$=16, around the point of coordinates imax$_q$ jmaX$_q$:

$$M2_q[i, j] = M1_q\left[i - \frac{N_a}{2} + imax_q, j - \frac{N_a}{2} + jmax_q\right]$$

when:

$$N_{pix} - 1 \geq i - \frac{N_a}{2} + imax_q \geq 0 \text{ and } N_{pix} - 1 \geq j - \frac{N_a}{2} + jmax_q \geq 0$$

and M2$_q$[i,j]=0 otherwise.

Step 5: The program performs a direct Fourier transform of the arrays M2$_q$.

Step 6: The program completes the arrays M2$_q$ by zeros, generating the arrays M3$_q$ of dimensions $N_b \times N_b$ with for example $N_b$=512. The array M3$_q$ is set to zero and then the program carries out, for all the indices i,j each ranging from 0 to $N_a$−1 and for the two indices q:

$$M3_q\left[i - \frac{N_a}{2} + \frac{N_b}{2}, j - \frac{N_a}{2} + \frac{N_b}{2}\right] = M2_q[i, j]$$

Step 7: The program performs the inverse Fourier transform of the array M3.

Step 8: The program calculates the coordinates and the complex value at the barycenter of the array M3.

$$imax3_q = \frac{\sum_{i,j} |M3_q[i,j]|^2 i}{\sum_{i,j} |M3_q[i,j]|^2}$$

$$jmax3_q = \frac{\sum_{i,j} |M3_q[i,j]|^2 j}{\sum_{i,j} |M3_q[i,j]|^2}$$

$$Ia[p_0, q, i_0, j_0] = imax_q + \frac{N_a}{N_b}\left(imax3_q - \frac{N_b}{2}\right)$$

$$Ja[p_0, q, i_0, j_0] = jmax_q + \frac{N_a}{N_b}\left(jmax3_q - \frac{N_b}{2}\right)$$

$$Ra[p_0, i_0, j_0] = \frac{M3_0[imax3_0, jmax3_0]}{M0_0[imax0_{p_0}, jmax0_{p_0}]}$$

$$\exp\left(-j\frac{2\pi}{\lambda}n_v\left(x\frac{Ia[p_0, 0, i_0, j_0]}{K_{p_0}} + y\frac{Ja[p_0, 0, i_0, j_0]}{K_{p_0}} + z\sqrt{1 - \frac{Ia[p_0, 0, i_0, j_0]^2 + Ja[p_0, 0, i_0, j_0]^2}{K_{p_0}^2}}\right)\right)$$

where x,y,z are the coordinates calculates in 7.9.1.

Loop 3: The program carries out a last operation consisting in canceling the values of Ra and in assigning high values to Ja and Ia whenever the point of direct impact of the beam is outside the zone limited by the aperture of the objective, resulting in the disappearance of this point. For this purpose, the program again goes through the indices $p_0, i_0, j_0$, testing each time the condition $$\left|\frac{Ra[p_0, i_0, j_0]}{Ra[p_0, 127, 127]}\right| \leq \frac{1}{8}.$$

When this condition is met, the program performs:
Ra[$p_0,i_0,j_0$]=0

$Ia[p_0,0,i_0,j_0]=-1000$ $Ja[p_0,0,i_0,j_0]=-1000$

7.10. Objective position adjustment

The sample to be studied is put in place. During this step, only the beams FRGI and FRD are used. The mirror (2282) is used to obtain a centered wave with two propagation directions. The mirrors (2243) (2232) (2247) are blocked. The phase shifter (2251) is used to modify the phase of this wave. Optical oil with the nominal index of the objectives is used. The wave measured on the right side of the objectives on the sensor (2239) indexed by p=0 is the equivalent of the reference wave used on the other side. A program generates two images by the procedure described in 7.3.3.1.: a spatial image obtained with Fourier transformation, and a frequency image obtained without Fourier transformation. The program extracts from each of these images the intensity (square of the modulus of the complex numbers constituting the image obtained in 7.3.3.1.). The program displays the resulting images.

The spatial image must be centered.

On the frequency image, a clear disc must be observed. The adjustment must be carried out so that the intensity is the highest possible for the high frequencies (points far from the center). The observed disc must remain relatively homogeneous.

If a dark ring appears between the outer edge and the central zone, the sample is too thick and it will not be possible to take all the frequencies into account. The adjustment must then be carried out so as to have a relatively homogeneous disc with as large a radius as possible. The disc does not reach its maximum size and the high frequencies cannot be taken into account. The resolution of the image, mainly in depth, is reduced. The only solution to this problem is to use a specially designed objective, described in Paragraph 7.19.

This objective adjustment method is suited to the case in which the index of the sample differs significantly from the nominal index of the objectives. In the opposite case, and in particular if one wishes to use a function $D_p$ defined in 7.16 equal to 1, the adjustment must be carried out from the spatial image alone and so that this image is a centered point image.

7.11. Determination of x,y,z,L, $n_0$.

It is necessary to know these parameters in order to be able to compensate for the spherical aberration and the effects of non-matching of the origins of the reference waves. These parameters can be determined by not carrying out Step 7.10. and by thus leaving the objectives in the position in which they were at the end of the step described in 7.9.1. The values x,y,z are then those which were determined in 7.9.1. The values of L and $n_0$ may have been measured previously by a means outside the microscope proper. This method however has the disadvantage of not allowing any movement of the objectives when putting the sample in place, and of requiring the use of a costly external measurement system. It is thus preferable to determine anew all these parameters. This second method allows the movement of the objectives when putting the sample in place and Step 7.10. can thus be carried out.

To apply this second method, it would in principle be possible to use the theoretical procedure described in 7.8.1. which uses a single image acquisition, but local variations in the characteristics of the sample near the point of focus would distort the result. For this reason, a series of images are taken and, on each image, a measurement is made of the phase and intensity variation at the point of direct impact of the illuminating wave. From this series of values, it is possible to generate an array equivalent to the array $F_{rec}$ used in 7.8., but in which local variations are overcome.

7.11.1. Acquisition

The mirrors (2282) (2247) (2243) (2232) are blocked so as to eliminate all the opposite indicator beams, which will no longer be used hereinbelow. The procedure described in 7.9.2. is restarted, with the following modifications:

The sample is now present.

Loop 1, which consists in determining $imax0_p$, $jmax0_p$, is eliminated. The values previously obtained for $imax0_p$, $jmax0_p$ are used again.

In Loop 2, the indices $p_0$ and q are set at 0. Steps 1 to 8 are thus carried out only for the set of indices $i_0,j_0$ ($p_0$ being set at 0). In each of these steps, only the elements corresponding to the index q=0 are acquired or calculated.

Step 8 of Loop 2 is modified as follows:

$Ia[p_0,q,i_0,j_0]$, $Ja[p_0,q,i_0,j_0]$, $Ra[p_0,i_0,j_0]$ are not recalculated and their previously obtained values are maintained.

The quantity $Rb[p_0,i_0,j_0]$ is calculated as follows:

if $Ra[p_0,i_0,j_0]=0$ then $Rb[p_0,i_0,j_0]=0$ otherwise:

$$Rb[p_0, i_0, j_0] = \frac{M3_0[imax3_0, jmax3_0]}{M0_0[imax0_0, jmax0_0]} \frac{1}{Ra[p_0, i_0, j_0]}$$

This quantity corresponds to the variation of the illuminating beam due to the presence of the sample and to the movement of the objectives, on the sensor 0, for the illuminating characterized by the indices $i_0,j_0$, in relation to a position of the objectives in which the origin of the reference waves used on each objective would match.

Loop 3 is eliminated.

7.11.2. Generation of frequency image

A second program is then started. Its aim is to generate, from the previous measurements, an array $F_{rec}$ utilizable in the algorithm described in 7.8. As the coordinates $Ia[p_0,q,i_0,j_0]$, $Ja[p_0,q,i_0,j_0]$ of the points sampled by the array Rb do not correspond to whole pixels, an oversampling and filtering method is required to generate the array $F_{rec}$. This method is not perfect because the interval (for example $Ia[p,q,i,j]-Ia[p,q,i+1,j]$) between two adjacent samples of the array Rb can vary. Nevertheless, for a realization of good quality, this variation is small and the oversampling-filtering method yields good results. The method includes the following successive steps:

Step 1: Generation of an oversampled frequency representation, of dimensions $N_c \times N_c$ with for example $N_c=4096$. The array Fs is set to 0 and then the program goes through all the indices i,j, testing the condition $Ra[0,i,j] \neq 0$. When the condition is true, it performs:

$$Fs\left[E\left(Ia[0, 0, i, j]\frac{N_c}{N_{pix}}\right), E\left(Ja[0, 0, i, j]\frac{N_c}{N_{pix}}\right)\right] = Rb[0, i, j]$$

where E(x) designates the integer number closest to x.

Step 2: An inverse Fourier transform is applied to array Fs

Step 3: The middle part of the array, of dimensions $N_{pix} \times N_{pix}$, is extracted and the presence of the diaphragm is simulated.

$$F_{rec}[i, j] = Fs\left[i - \frac{N_{pix}}{2} + \frac{N_c}{2}, j - \frac{N_{pix}}{2} + \frac{N_c}{2}\right]$$

for all the pairs (i,j) such that $$\left(i - \frac{N_{pix}}{2}\right)^2 + \left(j - \frac{N_{pix}}{2}\right)^2 \leq \left(\frac{N_{pix}}{2}\right)^2$$

where ouv is the aperture of the objectives.

Step 4: The Fourier transform of the array $F_{rec}$ obtained is performed.

7.11.3. Calculation of parameters

Array $F_{rec}$ obtained after Step 4 constitutes the frequency image, equivalent to that whose acquisition is described in 7.8.1., but acquired in a manner less sensitive to local variations of the index. It is possible to simulate this frequency image from a quintuplet $(x,y,z,L, n_0)$ and to calculate a max characteristic value. This is what is done by the part of the program described in FIG. 50 and including the steps (3509) to (3514), which finally calculates a max characteristic value that will be denoted max$(x,y,z,L, n_0)$. The determination of the value of the quintuplet $(x,y,z,L, n_0)$ consists in using a maximization program which varies $(x,y,z,L, n_0)$ so as to determine the point corresponding to the highest value of max$(x,y,z,L, n_0)$. In principle, any maximization algorithm is suitable. However, the number of variables and the complexity of the calculations are such that a specific and optimized algorithm must be used. The program described in 7.8. is thus used to calculate the parameters from the array $F_{rec}$ which constitutes the frequency image.

7.12. Two-dimensional imagine 7.12.1. Principle

We saw in the first embodiment how it is possible to obtain a two-dimensional frequency representation from several elementary images differing from each other in the phase difference between the illuminating beam and the reference beam, as well as in the attenuation level of the illuminating beam. In this embodiment, phase rotators (2210) (2238) (2241) (2226) are added which make it possible to vary the polarization direction of the wave and the analysis direction. In fact, the diffraction of the illuminating wave is not homogeneous in all directions. For a given direction, the diffracted wave depends to a great extent on the polarization of the incident beam.

It will be recalled that if a and b are two vectors, then:
a^b is the vector product of a and b
a.b is the scalar product of a and b
$\|a\|$ is the norm of a.

We shall call:
$f_c$: characteristic frequency of a point
$f_e$: illuminating frequency
$f_o$: frequency associated with the optical center of the sensor
FIG. 51 shows the arrangement of these frequencies.
$\beta_c$ is the angle between the vector $f_c\!\!\hat{\,}\,f_e$ and the vector $f_c\!\!\hat{\,}\,f_o$
$\beta_e$ is the angle between the vector $f_e\!\!\hat{\,}\,f_c$ and the vector $f_e\!\!\hat{\,}\,f_o$
$\alpha_c$ is the angle between the vector $\vec{i}$ and the vector $f_c\!\!\hat{\,}\,f_o$ (the index p is omitted for the vectors $\vec{i},\vec{j},\vec{k}$)
$\alpha_e$ is the angle between the vector $\vec{i}$ and the vector $f_e\!\!\hat{\,}\,f_o$
$\theta$ is the angle between the vector $f_e$ and the vector $f_c$ If the electric field vector of the illuminating beam is parallel, in the object, to the vector $f_c\!\!\hat{\,}\,f_e$, then the beam diffracted by the object in the direction $f_c$ is not attenuated. If it is orthogonal to this vector, the diffracted beam is attenuated by a factor $\cos\theta$.

The electric field vector of a beam, when it reaches the sensor, is in the plane of the sensor, which is a plane orthogonal to $f_o$. The mode for the passage from the electric field vector in the object to the electric field vector on the sensor is a rotation around the vector $f_c\!\!\hat{\,}\,f_o$ for the frequency wave $f_c$. This rotation preserves the angle $\beta_c$. We denote $(f_c\!\!\hat{\,}\,f_e)_{rc}$ the vector thus obtained from the vector $f_c\!\!\hat{\,}\,f_e$. In the case of the frequency wave $f_e$ polarized parallel to $f_e\!\!\hat{\,}\,f_c$, the rotation is around $f_e\!\!\hat{\,}\,f_o$ and the resultant vector is denoted $(f_e\!\!\hat{\,}\,f_c)_{re}$ We denote:

$$\vec{x}_c = \frac{(f_c \wedge f_e)_{rc}}{\|f_c \wedge f_e\|}$$

$$\vec{x}_e = \frac{(f_e \wedge f_c)_{re}}{\|f_c \wedge f_e\|}$$

$\phi_c = \alpha_c + \beta_c$ $\phi_e = \alpha_e + \beta_e$

In the plane of the sensor, we thus have the configuration indicated in FIG. 52, in which the points O,E,C are respectively the optical center (frequency $f_o$), the point of direct impact of the illuminating wave (frequency $f_e$), and the point at which is measured the diffracted wave (frequency $f_c$).

When the electric field vector of the illuminating beam (at point E) is $A_0\vec{i} + A_1\vec{j}$, the resulting electric field vector at point C is $(C_{00}A_0 + C_{01}A_1)\vec{i} + (C_{10}A_0 + C_{11}A_1)\vec{j}$.

During the measurements will be used:
an illuminating wave directed along $\vec{i}$. For this illuminating wave will be measured the diffracted components polarized along the axes oriented by $\vec{i}$ and $\vec{j}$, obtaining the factors $C_{00}$ and $C_{10}$
an illuminating wave directed along $\vec{j}$. For this illuminating wave will be measured the diffracted components polarized along the axes oriented by $\vec{i}$ and $\vec{j}$, obtaining the factors $C_{01}$ and $C_{11}$
The factors $C_{kl}$ are thus the measured values.

We neglect here the fact that the polarization and analysis directions obtained are not rigorously orthogonal.

If the electric field vector of the illuminating beam at point E is parallel to the vector $\vec{x}_e$ and the electric field vector of the beam received at point C is parallel to the vector $\vec{x}_c$, there is no attenuation. This case corresponds to an electric field vector at point E of value $A\vec{x}_e = A(\vec{i}\cos\phi_e + \vec{j}\sin\phi_e)$ and hence a resulting electric field vector at point C: $A[(C_{00}\cos\phi_e + C_{01}\sin\phi_e)\vec{i} + (C_{10}\cos\phi_e + C_{11}\sin\phi_e)\vec{j}]$. The projection of this vector on to the axis oriented by $-\vec{x}_c$ has the value: $-A[(C_{00}\cos\phi_e + C_{01}\sin\phi_e)\cos\phi_c + (C_{10}\cos\phi_e + C_{11}\sin\phi_e)\sin\phi_c]$. The value to be integrated in the calculations is the ratio of the algebraic value of the diffracted beam to that of the incident beam in the absence of attenuation due to the angle $\theta$, which thus corresponds to the case above and is equal to: $M = -\cos\phi_e\cos\phi_c C_{00} - \sin\phi_e\cos\phi_c C_{01} - \cos\phi_e\sin\phi_c C_{10} - \sin\phi_e\sin\phi_c C_{11}$.

In order to calculate this value it is necessary to previously calculate the functions $\cos\phi_e$, $\cos\phi_c$, $\sin\phi_e$, $\sin\phi_c$. This is done by using, on the one hand, the trigonometric relations:

$\cos\phi_c = \cos\alpha_c\cos\beta_c - \sin\alpha_c\sin\beta_c$ $\sin\phi_c = \cos\alpha_c\sin\beta_c + \sin\alpha_c\cos\beta_c$ $\cos\phi_e = \cos\alpha_e\cos\beta_e - \sin\alpha_e\sin\beta_e$ $\sin\phi_e = \cos\alpha_e\sin\beta_e + \sin\alpha_e\cos\beta_e$ and, on the other hand, the following relations:

$$\cos\beta_c = \frac{f_c \wedge f_e}{\|f_c \wedge f_e\|} \cdot \frac{f_c \wedge f_o}{\|f_c \wedge f_o\|}$$

$$\sin\beta_c = \left(\frac{f_c \wedge f_o}{\|f_c \wedge f_o\|} \wedge \frac{f_c \wedge f_e}{\|f_c \wedge f_e\|}\right) \cdot \frac{f_c}{\|f_c\|}$$

$$\cos\beta_e = \frac{f_e \wedge f_c}{\|f_e \wedge f_c\|} \cdot \frac{f_e \wedge f_o}{\|f_e \wedge f_o\|}$$

$$\sin\beta_e = \left(\frac{f_e \wedge f_o}{\|f_e \wedge f_o\|} \wedge \frac{f_e \wedge f_c}{\|f_e \wedge f_c\|}\right) \cdot \frac{f_e}{\|f_e\|}$$

$$\cos\alpha_c = \vec{i} \cdot \frac{f_c \wedge f_o}{\|f_c \wedge f_o\|}$$

$$\sin\alpha_c = \vec{j} \cdot \frac{f_c \wedge f_o}{\|f_c \wedge f_o\|}$$

$$\cos\alpha_e = \vec{i} \cdot \frac{f_e \wedge f_o}{\|f_e \wedge f_o\|}$$

$$\sin\alpha_e = \vec{j} \cdot \frac{f_e \wedge f_o}{\|f_e \wedge f_o\|}$$

If we use normalized values of the frequency vectors:

$$f_o = \vec{k}$$

$$f_e = x_e \vec{i} + y_e \vec{j} + z_e \vec{k} \text{ with } x_e^2 + y_e^2 + z_e^2 = 1$$

$$f_c = x_c \vec{i} + y_c \vec{j} + z_c \vec{k} \text{ with } x_c^2 + y_c^2 + z_c^2 = 1$$

we obtain:

$$\cos\varphi_c = \frac{1}{M_c^2 M_{ce}}(y_c^2 V_{yz} - x_c y_c V_{xz} + x_c V_{xy})$$

$$\sin\varphi_c = \frac{1}{M_c^2 M_{ce}}(-x_c y_c V_{yz} + x_c^2 V_{xz} + y_c V_{xy})$$

$$\cos\varphi_e = -\frac{1}{M_e^2 M_{ce}}(y_e^2 V_{yz} - x_e y_e V_{xz} + x_e V_{xy})$$

$$\sin\varphi_e = -\frac{1}{M_e^2 M_{ce}}(-x_e y_e V_{yz} + x_e^2 V_{xz} + y_e V_{xy})$$

with:

$$V_{yz} = y_c z_e - z_c y_e$$

$$V_{xz} = -x_c z_e + z_c x_e$$

$$V_{xy} = -x_c y_e + y_c x_e$$

$$M_c^2 = x_c^2 + y_c^2$$

$$M_e^2 = x_e^2 + y_e^2$$

$$M_{ce} = \sqrt{V_{yz}^2 + V_{xz}^2 V_{xy}^2}$$

However, when the denominators are zero, the above expressions must be replaced by limit values.

7.12.2. Alaorithm

A two-dimensional frequency representation is an array $M_{k,p,q}[i,j]$ of complex numbers, with dimensions of $N_{pix} \times N_{pix}$ where k is the refractive index of the image in its series, p is the index of the sensor on which the direct illumination beam arrives (0 or 1) and q has the following values:
q=0: image received on the sensor on which the direct illuminating beam arrives
q=1: image received on the other sensor.
In addition to the image itself, this program also generates the arrays:

$B_{k,p,q}[i,j]$: noise indicator $H_{k,p,q}[i,j]$: reference image, corresponding to a two-dimensional frequency representation obtained for a fixed direction of the beam. The purpose of this reference image is to subsequently allow the compensation of optical path modifications due to vibrations in the mirrors included in the system. If these vibrations are small, the reference image can be acquired only periodically. The reference image may also be a simplified image, the precision criteria being lower than those of the "useful" image $M_{k,p,q}[i,j]$. To simplify the presentation, it will be supposed that a reference image $H_{k,p,q}[i,j]$ having the same characteristics as the useful image (except for the illuminating beam direction) is acquired for each useful image $M_{k,p,q}[i,j]$.

$BH_{k,p,q}[i,j]$: reference image noise indicator.

A series of two-dimensional frequency representations is obtained by calculation from a series of elementary images corresponding to interference patterns formed on the CCD sensors. The two-dimensional frequency representations acquisition program is thus broken down into an elementary image acquisition phase and a calculation phase. These two phases can be separated, or each image can form the subject of a calculation as the acquisition progresses. We are considering here the case in which the two phases are separated.

7.12.2.1. Acquisition of elementary images

The series of elementary images can be acquired in a single operation by the fast camera, without any calculations being carried out, in which case the control of the beam modification elements must be synchronized with image acquisition. This involves an iteration on the integer k and the integer p. The succession of parallel illuminations to be used must be defined by arrays Ic[k,p], Jc[k,p] determining the "symbolic" indices making it possible to calculate for each pair (k,p) the control word of the beam deflector COM[p,Ic[k,p],Jc[k,p]]. During this procedure, the beams FRG and FRD are present at all times, each elementary image being formed on a sensor by the interference of the reference wave and the wave diffracted by the sample, itself illuminated by illuminating waves of variable characteristics. The mirrors (2282) (2243) (2232) (2247) are blocked.

For each pair (k,p), imaging is broken down into two phases:

Phase 1: Acquisition of 36 pairs of elementary images, a pair of images comprising an image coming from each sensor, and the 36 pairs differing from each other in the condition of all the beam control systems except for the beam deflector which maintains a constant condition for a given pair (k,p). These 36 pairs of elementary images will be used later on to generate a useful two-dimensional frequency representation $M_{k,p,q}[i,j]$. One of these elementary images is denoted $M0[k,p][c,d,r_1,r_2][q,i,j]$. Before each elementary imaging operation, the phase rotators allowing the control of the illuminating beam (attenuation, phase shift, deflection and polarization) must be controlled appropriately.

The index c is determined by the following table, in which att[c] constitutes a table containing the attenuation corresponding to the index, and in which the values $a_1$ and $a_2$ are those explained in 7.2.2., measured in 7.3.2.2., and in which the beam attenuator is controlled as explained in 7.2.2.

| Index c | Attenuation att[c] |
|---------|---------------------|
| 0 | 1 |
| 1 | $\alpha_1$ |
| 2 | $\alpha_1 \alpha_2$ |

The indices $d, r_1, r_2$ are determined by the following tables:

| Index d | Phase shift (degrees) |
|---------|------------------------|
| 0 | +120 |
| 1 | 0 |
| 2 | −120 |

| Index $r_2$ | Voltage applied to the rotators (2210) and (2241) |
|-------------|---------------------------------------------------|
| 0 | 5 V |
| 1 | −5 V |

| Index $r_1$ | Voltage applied to the rotators (2238) and (2226) |
|-------------|---------------------------------------------------|
| 0 | 5 V |
| 1 | −5 V |

A pair of elementary images (corresponding to the two values of the index q) is obtained for each combination of indices $c,d,r_1,r_2$ and for each illuminating direction defined by the indices (k,p). For each illuminating direction (k,p), one thus obtained 36 pairs of elementary images denoted $M0[k,p][c,d,r_1,r_2][q,i,j]$.

The filter (2203) must be adjusted so that the sensor is never saturated, but comes as close as possible to the saturation limit. Equivalently, it may be adjusted in the absence of a reference wave so that the maximum intensity of the wave reaching the sensor in the absence of beam attenuation is one-fourth the maximum level authorized by the digitization of the video signal, i.e. 64 for an 6-bit digitizer.

Phase 2: Acquisition of 36 additional elementary images which will be used to generate the reference image. This phase is identical to Phase 1 but:
  we shall denote $MR0[k,p][c,d,r_1,r_2][q,i,j]$ an elementary image obtained.
  the control word used to obtain $MR0[k,p][c,d,r_1,r_2][q,i,j]$ is $COM[p, Id[p,i_r,j_r], Jd[p,i_r,j_r]]$ in which $i_r,j_r$ are the coordinates of a constant point located on the side of the sensor, for example the point (3905) in FIG. 56, representing a sensor and on which the contour (3902) represents the limit corresponding to the aperture of the objective, which cannot be exceeded by the illuminating beams. This control word consequently does not depend on k. The coordinates $i_r,j_r$ can be chosen in a relatively arbitrary manner. However, the choice of a highly eccentric point (3905) makes it possible for the points corresponding to total frequency vectors ($f_t$ according to the notations used in 5.3.) of comparable standard to be obtained from each sensor. For samples not having specific regular structures, such points correspond to comparable complex values on the two sensors, thus improving the reliability of the results.

7.12.2.2. Calculation of two-dimensional frequency representations

After the acquisition phase, a specific program must be used to generate, from these elementary images, images in complex numbers and the associated noise indicators. To generate $M_{k,p,q}[i,j]$ and $B_{k,p,q}[i,j]$, the program goes through the indices (k,p), carrying out for each pair (k,p) the following three steps:

Step 1: Generation of the attenuation indicator array.

This array is an array of integers $M1[q,i,j]$ generated as follows: it is initialized to 0, then the program goes through all the indices q,i,j twice.

First passage: the program calculates $$\max\_pix = \max_{d,r_1,r_2} (M0[k,p][0, dr_1, r_2][q, i, j]).$$

If, for a given value of q,i,j, max_pix is equal to the maximum value of the digitizer, the program sets this pixel and its immediate neighbors to 1:
  $M1[q,i+iadd,j+jadd]=1$ for iadd and jadd varying from −1 to 1, and provided that the limits of the array are not exceeded.

Second passage: the program calculates $$\max\_pix = \max_{d,r_1,r_2} (M0[k,p][0, dr_1, r_2][q, i, j]).$$

If, for a given value of q,i,j, max_pix is equal to the maximum value of the digitizer, the program sets this pixel and its immediate neighbors to 2:
  $M1[q,i+iadd,j+jadd]=2$ for iadd andjadd varying from −1 to 1, and provided the limits of the array are not exceeded.

After this step, the array $M1[q,i,j]$ contains the index corresponding to the attenuation to be used to attenuate the image.

Step 2: Generation of complex images corresponding to each position of the rotators.

$$M2[r_1, r_2][q, i, j] = \frac{1}{att[M1[q, i, j]]} \left[ \frac{1}{6\sqrt{Iref[\overline{p}q + p\overline{q}, i, j]}} (2M0[k, p][M1[q, i, j], 0, r_1, r_2][q, i, j] - M0[k, p][M1[q, i, j], 1, r_1, r_2][q, i, j] - M0[k, p][M1[q, i, j], 2, r_1, r_2][q, i, j]) + j \frac{1}{2\sqrt{3Iref[\overline{p}q + p\overline{q}, i, j]}} (M0[k, p][M1[q, i, j], 1, r_1, r_2][q, i, j] - M0[k, p][M1[q, i, j], 2, r_1, r_2][q, i, j]) \right]$$

Step 3: Combination of images obtained for the various positions of the rotators. The purpose of Step 3 is to calculate $M_{k,p,q}[i,j]$ as a function of $M2[r_1,r_2][q,i,j]$. This can be achieved simply without using the polarization variations by performing: $M_{k,p,q}[i,j]=M2[1,1][q,i,j]$ the noise then being given by:

$$B_{k,p,q}[i,j] = \frac{1}{att[MI[q,i,j]]}$$

The value $M_{k,p,q}[i,j]$ thus generated corresponds to the one used in the first embodiment. Nevertheless, this method induces inaccuracies on the high frequencies and it is preferable to use the principle described in 7.12.1., in which $M2[r_1,r_2][q,i,j]$ corresponds to the measured value, which was denoted $C_{r_1,r_2}$, in 7.12.1. Other variants of this method will be described in 7.18.

Step 3 is thus carried out as follows:
For each value of the indices q,i,j, the program calculates:

$$po = p\bar{q} + \bar{p}q$$

$$x_c = \frac{i - \frac{N_{pix}}{2}}{\frac{n_o}{n_v}K_{po}}, \quad y_c = \frac{j - \frac{N_{pix}}{2}}{\frac{n_o}{n_v}K_{po}}, \quad z_c = \sqrt{1 - x_c^2 - y_c^2}$$

$$x_e = \frac{Ia[q,p,Ic[k,p],Jc[k,p]] - \frac{N_{pix}}{2}}{\frac{n_o}{n_v}K_{po}},$$

$$y_e = \frac{Ja[q,p,Ic[k,p],Jc[k,p]] - \frac{N_{pix}}{2}}{\frac{n_o}{n_v}K_{po}}, \quad z_e = \sqrt{1 - x_e^2 - y_e^2}$$

$$V_{yz} = y_c z_e - z_c y_e$$

$$V_{xz} = -x_c z_e + z_c x_e$$

$$V_{xy} = -x_c y_e + y_c x_e$$

$$M_c^2 = x_c^2 + y_c^2$$

$$M_e^2 = x_e^2 + y_e^2$$

$$M_{ce} = \sqrt{V_{yz}^2 + V_{xz}^2 + V_{xy}^2}$$

The values of $\sin \phi_c$, $\cos \phi_c$, $\sin \phi_e$, $\cos \phi_e$ are determined according to the following tables:

| | | | |
|---|---|---|---|
| $M_{ce}$ | 0 | | other |
| $M_c$ | | 0 | other |
| $\cos\phi_c$ | 1 | $-\frac{y_c}{M_c}$ | $\frac{1}{M_c^2 M_{ce}}(y_c^2 V_{yz} - x_c y_c V_{xz} + x_c V_{xy})$ |
| $\sin\phi_c$ | 0 | $\frac{x_c}{M_c}$ | $\frac{1}{M_c^2 M_{ce}}(-x_c y_c V_{yz} + x_c^2 V_{xz} + y_c V_{xy})$ |
| $M_{ce}$ | 0 | | other |
| $M_e$ | | 0 | other |
| $\cos\phi_e$ | -1 | $-\frac{y_c}{M_c}$ | $-\frac{1}{M_e^2 M_{ce}}(y_c^2 V_{yz} - x_c y_c V_{xz} + x_c V_{xy})$ |
| $\sin\phi_e$ | 0 | $\frac{x_c}{M_c}$ | $-\frac{1}{M_e^2 M_{ce}}(-x_c y_c V_{yz} + x_c^2 V_{xz} + y_c V_{xy})$ |

Then the coefficients are calculated:

$\mathrm{coef}[k,p,q,i,j][0,0]=-\cos\phi_e \cos\phi_c$ $\mathrm{coef}[k,p,q,i,j][0,1]=-\sin\phi_e \cos\phi_c$ $\mathrm{coef}[k,p,q,i,j][1,0]=-\cos\phi_e \sin\phi_c$ $\mathrm{coef}[k,p,q,i,j][1,1]=-\sin\phi_e \sin\phi_c$ These coefficients do not depend on the result of the imaging and, if the same series is always repeated, they may be stored in an array rather than be calculated again each time. That is why they have been expressed here in this form. The program then uses these values to combine the images obtained with the different positions of the rotators as follows:

$$M_{k,p,q}[i,j] = \sum_{r_1,r_2} M2[r_1,r_2][q,i,j] \mathrm{coef}[k,p,q,i,j][r_1,r_2]$$

$M2[r_1,r_2][q,i,j]$ corresponds to the measured value, which was denoted $C_{r_1,r_2}$ in 7.12.1

$M_{k,p,q}[i,j]$ corresponds to the value which was denoted M in 7.12.1

Moreover, the program calculates a noise amplitude:

$$B_{k,p,q}[i,j] = \frac{1}{att[MI[q,i,j]]}$$

This ends Step 3.

When the program has calculated $M_{k,p,q}[i,j]$ and $B_{k,p,q}[i,j]$, it also calculates $H_{k,p,q}[i,j]$ and $BH_{k,p,q}[i,j]$. This second calculation is carried out in the same manner as the preceding one, in three steps, but $M0[k,p][c,d,r_1,r_2][q,i,j]$, $M_{k,p,q}[i,j]$ and $B_{k,p,q}[i,j]$ are replaced respectively by $MR0[k,p][c,d,r_1,r_2][q,i,j]$, $H_{k,p,q}[i,j]$ and $BH_{k,p,q}[i,j]$ and, in Step 3, the values of $x_e$ and $y_e$ are replaced by $$x_e = \frac{i_r - \frac{N_{pix}}{2}}{\frac{n_o}{n_v}K_{po}}, \quad y_e = \frac{j_r - \frac{N_{pix}}{2}}{\frac{n_o}{n_v}K_{po}}$$

The above procedure is the one that offers the maximum precision. However, owing to the large number of elementary images required, it may be necessary to use a faster procedure. It is possible not to use the four images generated by the combination of the indices $r_1$, $r_2$, as in the first embodiment in which a single image is generated. It is also possible not to use beam attenuation. The fastest method consists in using only three elementary images differing from each other in their phase. The reference image can also be acquired only one out of every ten times (for example) in order to limit the waste of time related to its acquisition, and provided that the vibrations are not too large. The reference image can be simplified just like the useful image, but this simplification will generally have a smaller impact on the quality of the results. It is thus not useful to simplify further the useful image.

7.13. Calculation of control indices

The array of control indices is the array Id which makes it possible to associate, with coordinates in pixels (i,j) and with a sensor p, virtual control indices (Id[p,i,j], Jd[p,i,j]) such that the control word COM(p,Id[p,i,j],Jd[p,i,j]) generates an illumination illuminating a point as close as possible to the point having coordinates (i,j) on the sensor p. This array is generated by the algorithm in FOG. 53. In this algorithm, E(x) designates the integer as close as possible to x. Before starting this algorithm, the array D must be initialized at a high value, for example 100000. After this program, the array D contains, for each point, the distance between this point and the nearest point obtained for the point of direct impact of an illuminating wave. The double loop of the algorithm, on $(i_0,j_0)$ and on $(i_1,j_1)$, allows the definition of values Id[p,i,j],Jd[p,i,j], also for points which do not correspond exactly to the point of direct impact of the beam.

A trajectory for the point of direct impact can be defined by the arrays (Io[k],Jo[k]) defining, as a function of the index k, the coordinates of the desired point of direct impact. For example, if the trajectory is a circle of radius R pixels, it is possible to have: Io[k]=R cos k/R, Jo[k]=R sin k/R for k ranging from 0 to $2\pi R$.

The arrays defining the control indices as a function of k and p are obtained from Io[k] and Jo[k] by:

$$Ic[k,p]=Id[p,Io[k],Jo[k]] \text{ and } Jc[k,p]=Jd[p,Io[k],Jo[k]]$$

7.14. Path difference induced on waves coming from the object

FIG. 54 illustrates the calculation of the path difference of a wave coming from a point O of the object in relation to the reference wave coming virtually from a point A of a medium of index $n_v$ (nominal refractive index of the objectives). We have:

$$\Delta = n_0 I_0 - n_v I_v$$

$$\Delta = n_0 d_0 \cos \beta - n_v d_v \cos \alpha$$

where $n_0 \sin \beta = n_v \sin \alpha$
giving, finally:

$$\Delta = n_0 d_0 \sqrt{1 - \left(\frac{n_v}{n_0}\sin\alpha\right)^2} - n_v d_v \sqrt{1 - \sin^2\alpha}$$

FIG. 55 illustrates the calculation of the path difference between a wave coming from a point O of the object and the reference wave coming virtually from the point $A_p$ where p is the index of the considered sensor. The coordinates of $A_p$ in relation to a coordinate system centered on O and direction vectors $\vec{i}_p, \vec{j}_p, \vec{k}_p$ are $x_p, y_p, z_p$, and the distance between O and the edge of the object on the side of the sensor p is $w_p$. The vectors $\vec{i}_p, \vec{j}_p, \vec{k}_p$ are defined as indicated in 7.7. We verify that, in accordance with the orientation of the axes in FIG. 55, the base vectors of the coordinate systems used in each half-space referenced by the index of sensor p comply with: $\vec{i}_0 = -\vec{i}_1, \vec{j}_0 = -\vec{j}_1, \vec{k}_0 = -\vec{k}_1$.

When $x_p=y_p=0$, it is possible to apply the preceding formula:

$$\Delta = n_0 d_0 \sqrt{1 - \left(\frac{n_v}{n_0}\sin\alpha\right)^2} - n_v d_v \sqrt{1 - \sin^2\alpha}$$

where $$d_0 = w_p$$

$$d_v = w_p - z_p$$

$$\sin^2\alpha = \frac{i^2 + j^2}{K_p^2}$$

where i,j are the coordinates in pixels taken from the optical center of the sensor.

If $x_p, y_p$ are also taken into account, to this path difference must be added the quantity:

$$n_v\left(x_p \frac{i}{K_p} + y_p \frac{j}{K_p}\right)$$

and one finally obtains, for the total path difference:

$$(x_p, y_p, z_p) = \left(\frac{x}{2}, \frac{y}{2}, \frac{z}{2}\right)$$

In particular, it is possible to position the point O so as to have $$(x_p, y_p, z_p) = (x/2, y/2, z/2)$$

where x,y,z are the coordinates in 7.11. We then have:

$$\Delta_p = n_0 w_p \sqrt{1 - \left(\frac{n_v}{n_0}\right)^2 \frac{i^2 + j^2}{K_p^2}} - n_v\left(w_p - \frac{z}{2}\right)\sqrt{1 - \frac{i^2 + j^2}{K_p^2}} + n_v\left(\frac{x}{2}\frac{i}{K_p} + \frac{y}{2}\frac{j}{K_p}\right)$$

To obtain a frequency representation of the object, the two-dimensional frequency representations must be corrected to compensate for this path difference. In this expression, only the values of $w_p$ have not yet been determined.

7.15. Calculation of $w_p$.

7.15.1. Principle

To correct the two-dimensional frequency representations of the phase factor determined in 7.14., it is necessary to previously determine the values $w_p$, i.e. in fact only the value $w_0$ since $w_1$ is deduced therefrom through $w_1=L-w_0$.

If the average index of the object is close to the nominal index of the objectives, the effect of $w_p$ on the value $\Delta_p$ is negligible and it is possible, for example, to adopt the value $w_p=L/2$ and position the sample between the two objectives visually, by adjusting this position subsequently to obtain an image of the region of interest of this sample.

It is also possible to add a reflecting layer on the side of one of the cover glasses which is in contact with the object, for example the one located on the side of the objective (2217), in a region of reduced dimensions. When the beam FRD and its opposite indicator are used alone and when the reflecting part is positioned so as to reflect the opposite indicator beam of FRD, then the interference pattern formed on the sensor (2239) must be a constant. The position of the sample must then be adjusted to actually obtain such a constant. When this adjustment has been performed, we have $w_0=z/2$. If a sufficiently precise positioner is used, the position of the sample can then be modified in the direction of the optical axis to obtain $w_0=L/2$. The position of the sample must finally be modified in the direction orthogonal to the optical axis so that the reflecting zone of the cover glass is located outside the field of observation.

However, the two preceding methods impose practical constraints which may be troublesome. A solution making it possible to avoid this difficulty is the determination of $w_p$ from measurements carried out on the sample in its final position.

A frequency representation Fa can be obtained from all the two-dimensional frequency representations coming from the sensor 0 (2239) when the point of direct impact of the illuminating wave is on this same sensor and takes, on this sensor, for example, the path represented in broken lines in FIG. 56. This representation is obtained in a manner very similar to the method used in the first embodiment, however with the following differences:

The two-dimensional frequency representation must be multiplied by the correction factor $$e^{-j2\pi\frac{\Delta p}{\lambda}}$$

to cancel the phase difference produced by spherical aberration.

The value of the coefficient K taken into account must be multiplied by a factor $n_o/n_v$ to take account of the average index in the sample.

To limit aliasing of the correction function, the frequency representation is oversampled.

When a point of the space of the frequencies is obtained several times, the adopted value is one of the values obtained and not the average of the values obtained.

In principle, the frequency representation thus obtained does not depend on the choice of the value adopted when a point of the frequency space is obtained several times. However, this is true only if the correction factor has a correct value.

Under these conditions, and taking into account the expression of the correction function $$e^{-j2\pi\frac{\Delta p}{\lambda}},$$

the value of the two-dimensional frequency representation Fa thus obtained at a point of the frequency space of coordinates ni,nj,nk, can be written in the following form:

$$Fa[ni,nj,nk]=Fs[ni,nj,nk]\exp(-j2\pi G[ni,nj,nk]w_0)$$

When a point of the frequency space is obtained several times, the values Fs[ni,nj,nk] and G[ni,nj,nk] obtained are different each time. For each point, we define Gmin[ni,nj,nk] and Gmax[ni,nj,nk], minimum and maximum values obtained for G at this point. Fsmin[ni,ni,nk] and Fsmax[ni,nj,nk] are then the values obtained for Fs[ni,nj,nk] when G[ni,nj,nk] is equal respectively to Gmin[ni,nj,nk] and Gmax[ni,nj,nk].

The following two frequency representations are then obtained:

$$Famin[ni,nj,nk]=Fsmin[ni,nj,nk]\exp(-j2\pi G\min[ni,nj,nk]w_0)$$

$$Famax[ni,nj,nk]=Fsmax[ni,nj,nk]\exp(-j2\pi G\min[ni,nj,nk]w_0)$$

When the value of $w_0$ is correct, these two representations are equal. The calculation of $w_0$ consists in minimizing the standard deviation between the two frequency representations Famin and Famax. The standard deviation to be minimized is in principle:

$$ecart = \sum_{ni,nj,nk} |Famax[ni,nj,nk] - Famin[ni,nj,nk]|^2$$

However, as the noise is not constant over the entire frequency representation, each element of this sum must be weighted by the inverse of the noise at the considered point and we obtain:

$$ecart = \sum_{ni,nj,nk} \left|\frac{Famax[ni,nj,nk] - Famin[ni,nj,nk]}{Btot[ni,nj,nk]}\right|^2$$

where Btot[ni,nj,nk] is a noise amplitude defined at each point.

By developing the expression of this standard deviation, a simplified expression is obtained which facilitates the minimization calculation.

7.15. 2. Algorithm

The calculation of $w_p$ is carried out with a program whose algorithm is described in FIG. 57. This program initially requires the following information:

values established in 7.11.: x,y,z,L, $n_0$ operating parameter wpixels, for example wpixels=5.

The essential steps in this program are the following:

(4001): image acquisition. A series of images is obtained by having the point of direct impact of the illuminating beam take the path represented in broken lines in FIG. 56, where (3901) represents the limit of the useful region of the sensor, (3902) represents the limit corresponding to the maximum aperture of the objectives, (3903) represents a circular part of the path and (3904) represents a straight part of the path. As indicated in 7.13., the arrays Io[k] Jo[k] are generated along this path and the program calculates the corresponding control indices Ic[k,p] Jc[k, p]. The program then acquires the series of images according to the procedure indicated in 7.12. The acquisition procedure generates the arrays $M_{k,p,q}[i,j]$. However, only the arrays corresponding to zero indices q,p will be used here, i.e. $M_{k,0,0}[i,j]$.

(4002): calculation of Fsmin, Gmin, Fsmax, Gmax, Btot

Step 1: Each array $M_{k,0,0}[i,j]$ obtained during the acquisition phase is first oversampled as follows in three steps:

Step 1.1.: the program takes the two-dimensional inverse Fourier transform of the array $M_{k,0,0}$ Step 1.2.: the program completes this array by zeros to obtain an array $Ms_k$ of dimensions $N_d \times N_d$ (for example $N_d=512$). $Ms_k$ is initialized to 0 then the program goes through the indices i,j of the array $M_{k,0,0}$ performing:

$$Ms_k\left[\frac{N_d}{2}+i-\frac{N_{pix}}{2}\right] = M_{k,0,0}[i,j]$$

Step 1.3.: a direct Fourier transform of the array $Ms_k$ is taken, thus terminating the oversampling phase.

Step 2: The elements of each array $Ms_k$ are referred to the value obtained at the point of direct impact of the illuminating wave:

$$Ms_k[i, j] = \frac{Ms_k[i, j]}{Ms_k[imax_k, jmax_k]}$$

where we denote:

$$imax_k = E\left(\frac{N_d}{N_{pix}} Ia[0, 0, Ic[k, 0], Jc[k, 0]]\right)$$

$$jmax_k = E\left(\frac{N_d}{N_{pix}} Ja[0, 0, Ic[k, 0], Jc[k, 0]]\right)$$

where E(x) designates the integer closest to x.

Step 3: When the program has thus generated all the oversampled arrays $Ms_k$, it calculates an oversampled noise amplitude in the form of a set of arrays of positive real values $Bs_k$ with dimensions $N_d \times N_d$. For this purpose, it goes through the indices i,j,k where i and j vary between 0 and $N_d-1$ by performing:

$$Bs_k[i, j] = \max_{\substack{i/r-2 \le i_1 \le i/r+2 \\ j/r-2 \le j_1 \le j/r+2}} (B_{k,0,0}[i_1, j_1]) \text{ where: } r = \frac{N_d}{N_{pix}}$$

In this equation, when the pair $i_1, j_1$ is outside the limits of the array $B_{k,0,0}$ the coefficient $B_{k,0,0}[i_1, j_1]$ is assumed to be equal to 0.

Step 4: The program initializes to 0 the arrays Fsmin, Fsmax; it initializes respectively to $10^{20}$ and $-10^{20}$ the arrays Gmin and Gmax; and initializes to $10^{20}$ the arrays Bmin, Bmax. These arrays each have the dimensions $2 N_d \times 2 N_d \times 2 N_d$.

The program then goes through the indices i,j,k where i and j vary from 0 to $N_d-1$, performing for each triplet (i,j,k) the following steps, numbered from 4.1 to 4.3:

Step 4.1.: calculation of indices of the three-dimensional frequency representation. The program performs the following operations:

$$ni = i - imax_k + N_d$$

$$nj = j - jmax_k + N_d$$

$$nk = \sqrt{\left(r\frac{n_o}{n_v}K_0\right)^2 - \left(i - \frac{N_d}{2}\right)^2 - \left(j - \frac{N_d}{2}\right)^2} - \sqrt{\left(r\frac{n_o}{n_v}K_0\right)^2 - \left(imax_k - \frac{N_d}{2}\right)^2 - \left(jmax_k - \frac{N_d}{2}\right)^2} + N_d$$

where:

$$r = \frac{N_d}{N_{pix}}$$

The values ni,nj,nk correspond to coordinates in a three-dimensional frequency space as in the first embodiment. As their calculation leads to non-integer values, the integer nearest the obtained value is assigned to them. The value of K must be corrected to take into account the index of the sample and we thus use $n_o/n_v K_0$. The coefficient r makes it possible to take into account the oversampling.

Step 4.2.: calculations of values of G and Fs at the current point:

$$Gval = \frac{1}{\lambda}\left\{\left(n_0\sqrt{1-\left(\frac{n_v}{n_0}\right)^2\frac{ic^2+jc^2}{r^2K_0^2}} - n_v\sqrt{1-\frac{ic^2+jc^2}{r^2K_0^2}}\right) - \left(n_0\sqrt{1-\left(\frac{n_v}{n_0}\right)^2\frac{imc^2+jmc^2}{r^2K_0^2}} - n_v\sqrt{1-\frac{imc^2+jmc^2}{r^2K_0^2}}\right)\right\}$$

$$Fsval = Ms_k[i,j]e^{-j\frac{2\pi}{\lambda}n_v\left\{\left(\frac{z}{2}\sqrt{1-\frac{ic^2+jc^2}{r^2K_0^2}} + \frac{x}{2}\frac{ic}{rK_0} + \frac{y}{2}\frac{jc}{rK_0}\right) - \left(\frac{z}{2}\sqrt{1-\frac{imc^2+jmc^2}{r^2K_0^2}} + \frac{x}{2}\frac{imc}{rK_0} + \frac{y}{2}\frac{jmc}{rK_0}\right)\right\}}$$

where:

$$ic = i - \frac{N_d}{2}, \quad jc = j - \frac{N_d}{2}, \quad imc = imax_k - \frac{N_d}{2}, \quad jmc = jmax_k - \frac{N_d}{2}$$

In the above equations, ic,jc,imc,jmc correspond to coordinates referred to the optical center and r has the same value as in the previous step.

Step 4.3.: possible modification of the values of Gmin, Fsmin, Gmax, Fsmax.

The program tests the value of Gval.

If $Gval \le Gmin[ni,nj,nk]$ the program carries out:

$Gmin[ni,nj,nk] = Gval$ $Fsmin[ni,nj,nk] = Fsval$ $Bmin[ni,nj,nk] = Bs_k[i,j]$

If $Gval \ge Gmaxn[ni,nj,nk]$ the program carries out:

$Gmax[ni,nj,nk]32 \ Gval$ $Fsmax[ni,nj,nk] = Fsval$ $Bmax[ni,nj,nk] = BS_k[i,j]$ Step 5: The program generates an overall noise amplitude. For this purpose, it goes through the indices ni,nj,nk, performing for each of these triplets, the operation:

$Btot[ni,nj,nk] = \sqrt{|Bmax[ni,nj,nk]|^2 + |B\min[ni,nj,nk]|^2}$ (4003): The calculated function is in principle equal to:

$$escart = \sum_{(ni,nj,nk)\in Es} \left| \frac{Fsmin[ni,nj,nk]e^{-j2\pi Gmin[ni,nj,nk]w_0} - Fsmax[ni,nj,nk]e^{-j2\pi Gmax[ni,nj,nk]w_0}}{Btot[ni,nj,nk]} \right|^2$$

where Es is the set of points at which the values of Gmin and Gmax differ, namely:

$$Es=\{ni,nj,nk|Gmax[ni,nj,nk]\neq Gmin[ni,nj,nk]\}$$

Hence, developing the expression:

$$ecart = \sum_{(ni,nj,nk)\in Es} \left| \frac{Fsmin[ni,nj,nk]}{Btot[ni,nj,nk]} \right|^2 + \left| \frac{Fsmax[ni,nj,nk]}{Btot[ni,nj,nk]} \right|^2 -$$

$$2 \sum_{(ni,nj,nk)\in Es} \text{Re}\left( \frac{Fsmin[ni,nj,nk]\overline{Fsmax[ni,nj,nk]}}{|Btot[ni,nj,nk]|^2} \right.$$

$$\left. e^{-j2\pi(Gmin[ni,nj,nk]-Gmax[ni,nj,nk])w_0} \right)$$

The first part of the expression does not depend on $w_0$. Minimizing the standard deviation is thus equivalent to maximizing the following function in which Re( ) designates the real part:

$$\sum_{(ni,nj,nk)\in Es} \text{Re}\left( \frac{Fsmin[ni,nj,nk]\overline{Fsmax[ni,nj,nk]}}{|Btot[ni,nj,nk]|^2} \right.$$

$$\left. e^{-j2\pi(Gmin[ni,nj,nk]-Gmax[ni,nj,nk])w_0} \right)$$

However, this function exhibits high frequencies causing aliasing which disturb the convergence of the algorithm. They are eliminated by using the function:

$$f(w, \Delta w) = \sum_{(ni,nj,nk)\in Es} \left\{ \text{Re}\left( \frac{Fsmin[ni,nj,nk]\overline{Fsmax[ni,nj,nk]}}{|Btot[ni,nj,nk]|^2} \right.\right.$$

$$\left.\exp(-j2\pi(Gmin[ni,nj,nk] - Gmax[ni,nj,nk])w_0) \right)$$

$$\left. \gamma((Gmin[ni,nj,nk] - Gmax[ni,nj,nk])\Delta w) \right\}$$

where $\gamma(x) = 0$ when $|x| \geq \frac{1}{2}$ and $\gamma(x) = 1$ when $|x| < \frac{1}{2}$ (4004): the algorithm iterates the loop on wlarg until a sufficient precision is achieved. For example, it is possible to have $$\lim = \frac{\lambda}{8} wpixels$$

(4005): the value $w_f$ displayed corresponds to $w_0$. We have:
$w_1 = L - w_f$ and $w_0 = w_f$ The value rapport displayed corresponds to:

$$rapport = \frac{2f\left(wf, \frac{wlarg}{wpixels}\right)}{\sum_{(ni,nj,nk)\in Es} \left( \frac{|Fsmin[ni,nj,nk]|^2 + |Fsmax[ni,nj,nk]|^2}{|Btot[ni,nj,nk]|^2} \right)}$$

The value rapport displayed characterizes the quality of the cross check obtained between the images calculated from the frequency representations Famin and Famax. The closer it is to 1, the better this cross check. When the sample is outside the observation region, this value approaches 0.

7.15.3. Focussing

The focussing adjustment consists in correctly positioning the sample within the region of observation of the objectives. During this adjustment, the values of rapport and $w_f$ must be recalculated constantly. The position of the sample must be adjusted along the axis (2263) so as to obtain a sufficiently high value of rapport, and then it can be adjusted more finely to obtain, for example, $$w_f = \frac{L}{2}.$$

This adjustment generally allows a first focussing. However, if, for example, the index $n_o$ is close to $n_v$, this focussing is very imprecise.

In every case, this adjustment must subsequently be completed by a more precise focus on the region of interest, as indicated in 7.17.3.

7.16. Obtaining the aberration compensation function

The function $$e^{-j2\pi\frac{\Delta}{\lambda}}$$

allowing, in principle, the correction of the phase differences introduced by the object and corresponding to spherical aberration comprises high frequencies which are filtered by the diaphragm. It can thus not be used directly and it is necessary to filter it to obtain, in the form of an array of dimensions $N_{pix} \times N_{pix}$, a utilizable correction function.

The aberration compensation function, which will be used in the imaging phase, is obtained as follows:

Step 1: generation of arrays $Ds_p$ of dimensions $N_e \times N_e$ with for example $N_e = 4096$:

$$Ds_p[i,j] =$$

$$\exp\left[-j\frac{2\pi}{\lambda}\left(n_0 w_p \sqrt{1 - \left(\frac{n_v}{n_0}\right)^2 \frac{ic^2 + jc^2}{r^2 K_p^2}} - n_v\left(w_p - \frac{z}{2}\right)\sqrt{1 - \frac{ic^2 + jc^2}{r^2 K_p^2}} + \right.\right.$$

$$\left.\left. n_v\left(\frac{x}{2}\frac{ic}{rK_p} + \frac{y}{2}\frac{jc}{rK_p}\right) \right)\right]$$

where $$ic = i - \frac{N_e}{2}, jc = j - \frac{N_e}{2}, r = \frac{N_e}{N_{pix}}$$

the array $Ds_p$ corresponds to the function $$e^{-j2\pi\frac{\Delta}{\lambda}}$$

oversampled with a sufficiently short step to prevent aliasing.
Step 2: inverse Fourier transformation of arrays $Ds_p$
Step 3: extraction of middle part of the array, of dimensions $N_{pix} \times N_{pix}$ with simulation of the diaphragm.
The program carries out:

$$D_p[i, j] = Ds_p\left[i - \frac{N_{pix}}{2} + \frac{N_c}{2}, j - \frac{N_{pix}}{2} + \frac{N_c}{2}\right]$$

for all the pairs (i,j) such that $$\left(i - \frac{N_{pix}}{2}\right)^2 + \left(j - \frac{N_{pix}}{2}\right)^2 \leq \left(\frac{N_{pix}}{2}\right)^2$$

where ouv is the aperture of the objectives.
Step 4: Fourier transformation of array $D_p$.
One thus obtains, in the form of the array $D_p$, the utilizable correction function.

7.17. Obtaining three-dimensional images
7.17.1. Principles
7.17.1.1. Superposition of the frequency representations We saw that, for a given illuminating beam (index k,p), one obtains two two-dimensional images corresponding to the two sensors and referenced by the index q. When the point of direct impact goes through the path of FIG. 56 on the sensor number 0, it is possible to generate a frequency representation from the two-dimensional images obtained on the two sensors. FIG. 58 shows how a set of two-dimensional frequency representations generates a three-dimensional representation. A two-dimensional representation is composed of a sphere portion (4101) obtained on sensor number 0 and a sphere portion (4102) obtained on sensor number 1. When the point of direct impact moves over a transverse path (3904), the movement of these sphere portions generates a volume. In FIG. 58 is represented a set of such sphere portions obtained for various positions of the point of direct impact on a transverse path. When the point of direct impact moves on the circle (3903), the volume (4104) delimited by (4105) is generated in addition. When the point of direct impact is on sensor number 1, a symmetrical volume is generated.

Four partial three-dimensional frequency representations are distinguished which will be denoted $F_{p,q}$ where the pair (p,q) designates a pair (sensor receiving the direct illuminating wave, sensor from which the two-dimensional representations allowing the generation of $F_{p,q}$ result) with p=0 for sensor (2239), p=1 for (2229), q=0 when it designates the same sensor as p, and q=1 when it designates the opposite sensor. The final three-dimensional representation is obtained by superposing these partial three-dimensional representations.

The complete frequency representation obtained is represented in section in FIG. 59. It is composed:
of a part (4111) obtained by sensor 0 or 1 receiving the point of direct impact of the beam, and corresponding to the representations $F_{0,0}$ and $F_{1,0}$ which occupy the same part of the frequency space.
of a part (4113) obtained by sensor 1 when the point of direct impact of the beam is on sensor 0, and hence corresponding to the representation $F_{0,1}$.
of a part (4112) obtained by sensor 0 when the point of direct impact of the beam is on sensor 1, and hence corresponding to the representation $F_{1,1}$.

To obtain this volume exactly, it is necessary in principle to go through all the possible frequency values, i.e. $N_{pix} \times N_{pix}$ values on each sensor, less the values located outside the zone limited by the aperture of the objective. Nevertheless, using the reduced path of FIG. 56, a volume little different from the one drawn is obtained.

The path of FIG. 56 however constitutes a simple example and various types of path may be used in practice. A few examples are given below:
A circle as in the first embodiment.
The path of FIG. 56, which allows images of better definition to be obtained.
The path of FIG. 56 made less dense. It is possible, for example to use one pixel out of two along this path. This has the effect of limiting the thickness of the samples that may be observed under good conditions.
A complete path, i.e. defined by the arrays Io[k] and Jo[k] such that the point of coordinates (Io[k],Jo[k]) passes through the entire disc limited by the aperture of the objective. This means that each pixel within the disc limited by the circle (3902) of FIG. 56 must be reached once and only once. This path affords only a small improvement in definition compared with that of FIG. 56 and considerably increases the acquisition time. On the other hand, the normal utilization conditions of this microscope require that the diffracted beam remain of small intensity in relation to the illuminating beam. The use of a complete path makes the system more robust when these utilization conditions are not complied with.

7.17.1.2. Phase and intensity reference

In order to be able to combine the two-dimensional frequency representations to obtain partial three-dimensional frequency representations, it is necessary to establish for them a common phase and intensity reference. The complex values of the waves received on the directly illuminated sensor can be referred to the value of the illuminating wave at its point of direct impact, as in the first embodiment or in the calculation of $w_p$.

A more elaborate method is required for waves received on the opposite sensor. The reference illuminations are used to establish a ratio characteristic of the phase variation on each sensor and this ratio is taken into account to cancel these variations before referring to the value of the illuminating wave at its point of direct impact. This makes it possible to make mutually coherent the two-dimensional representations corresponding to a given pair p,q, independent of the vibrations affecting the system, and hence to establish for each pair p,q a three-dimensional frequency representation.

However, this does not make it possible to establish the phase relationship between each of these three-dimensional frequency representations, which must be known in order to combine them into a single frequency representation. The phase relationship between, for example, the three-dimensional frequency representations $F_{0,0}$ and $F_{0,1}$, which correspond respectively to the parts (4111) and (4113) of the three-dimensional representation of the whole, can be established when these two parts have a common part (4114). It is sufficient to choose the phase difference which causes the best matching of these two representations on their common part. In order for there to be a common part, the aperture of the objective must be sufficient. The condition for the existence of this common part is determined geometrically and is:

$$n_0 < \frac{3}{2\sqrt{2}} ouv$$

where ouv is the aperture of the objective. For example, for an aperture of 1.4, one obtains a maximum index of $n_0$=1.48 for the sample.

When the two representations $F_{0,0}$ and $F_{0,1}$ do not match, it is in principle impossible to determine their phase relationship: in fact every phase relationship corresponds to a possible frequency representation. A representation of the object in absorptivity and index can however be obtained from $F_{0,0}$ alone, or a representation of the object not differentiating the index and absorptivity can be obtained from $F_{0,1}$ alone by extracting the modulus of the spatial representation obtained by using only $F_{0,1}$.

7.17.1.2. Phase difference between two noisy arrays

We consider two arrays with a dimension A[i] and B[i] in which i varies from 0 to N−1. The elements of A (or B) are each affected by an independent gaussian noise whose standard deviation is contained in an array GA[i] (or GB[i]). With these arrays A and B assumed equal, except for a constant phase and intensity ratio, and noise, an attempt is made to determine this phase and intensity ratio, which will be denoted x, and which would be equal, in the absence of noise, to $$x_{(noiseless)} = \frac{B[i]}{A[i]}.$$

The value sought for x is that which maximizes the quantity P(x|A,B), representing the probability of a value of x knowing the arrays A and B. Maximizing this quantity is equivalent to maximizing P(B|A,x). For a given value of x, and in the case in which the values of B[i] and A[i] are sufficiently over the noise level, the law giving B[i] from A[i] is the composite of two gaussian laws of respective standard deviations |x|GA[i] and GB[i]. It is thus a gaussian law of standard deviation $\sqrt{|x|^2 (GA[i])^2 + (GB[i])^2}$. We thus have:

$$P(B|A, x) = \prod_i \exp\left\{-\frac{|B[i] - xA[i]|^2}{|x|^2 (GA[i])^2 + (GB[i])^2}\right\}$$

In the cases that will be of interest to us later |x| is always close to 1. We thus have:

$$P(B|A, x) \approx \prod_i \exp\left\{-\frac{|B[i] - xA[i]|^2}{(GA[i])^2 + (GB[i])^2}\right\}$$

Maximizing this quantity is equivalent to minimizing the quantity:

$$\sum_i \frac{|B[i] - xA[i]|^2}{(GA[i])^2 + (GB[i])^2}$$

which equals, after division by the factor $$\frac{|A[i]|^2}{(GA[i])^2 + (GB[i])^2}$$

independent of x:

$$\frac{\sum_i \frac{|B[i]|^2}{(GA[i])^2 + (GB[i])^2}}{\sum_i \frac{|A[i]|^2}{(GA[i])^2 + (GB[i])^2}} - x \frac{\sum_i \frac{A[i]\overline{B[i]}}{(GA[i])^2 + (GB[i])^2}}{\sum_i \frac{|A[i]|^2}{(GA[i])^2 + (GB[i])^2}} - \overline{x} \frac{\sum_i \frac{\overline{A[i]}B[i]}{(GA[i])^2 + (GB[i])^2}}{\sum_i \frac{|A[i]|^2}{(GA[i])^2 + (GB[i])^2}} + |x|^2$$

We verify that this quantity is equal to:

$$\left| x - \frac{\sum_i \frac{\overline{A[i]}B[i]}{(GA[i])^2 + (GB[i])^2}}{\sum_i \frac{|A[i]|^2}{(GA[i])^2 + (GB[i])^2}} \right|^2 +$$

$$\frac{\sum_i \frac{|B[i]|^2}{(GA[i])^2 + (GB[i])^2}}{\sum_i \frac{|A[i]|^2}{(GA[i])^2 + (GB[i])^2}} - \left| \frac{\sum_i \frac{\overline{A[i]}B[i]}{(GA[i])^2 + (GB[i])^2}}{\sum_i \frac{|A[i]|^2}{(GA[i])^2 + (GB[i])^2}} \right|^2$$

The solution minimizing this quantity is thus:

$$x = \frac{\sum_i \frac{\overline{A[i]}B[i]}{(GA[i])^2 + (GB[i])^2}}{\sum_i \frac{|A[i]|^2}{(GA[i])^2 + (GB[i])^2}}$$

This simple formula is however valid only if the values of B[i] and A[i] are sufficiently over the noise level. One way of avoiding values not complying with this condition is to limit the summing as follows:

$$x = \frac{\sum_{i \in E} \frac{\overline{A[i]}B[i]}{(GA[i])^2 + (GB[i])^2}}{\sum_{i \in E} \frac{|A[i]|^2}{(GA[i])^2 + (GB[i])^2}}$$

where $$E = \left\{ i \left| \frac{|\overline{A[i]}B[i]|}{(GA[i])^2 + (GB[i])^2} \geq Coef \cdot \max_j \left( \frac{|\overline{A[j]}B[j]|}{(GA[j])^2 + (GB[j])^2} \right) \right. \right\}$$

i.e. the sums are limited to the set E of the values of i such that $$\frac{|\overline{A[i]}B[i]|}{(GA[i])^2 + (GB[i])^2}$$

is higher than the product of its maximum value by a coefficient Coef which can be, for example, equal to 0.5.

This method will be used subsequently, generalized to 2 or 3 dimensions, to determine the standard deviation between two partially matching frequency representations.

7.17.1.3. Combining a series of noisy elements

Let us consider an array with one dimension A[i] in which i varies from 0 to N−1. The elements of A are each affected by an independent gaussian noise whose standard deviation is contained in an array GA[i]. In the absence of noise, the elements of A are all equal to a value x to be determined. x is the value which maximizes P(x|A). Maximizing this quantity is equivalent to maximizing P(A|x). And we have:

$$P(A|x) = \prod_i \left\{ -\frac{|x-A[i]|^2}{(GA[i])^2} \right\}$$

Maximizing this quantity is equivalent to minimizing the following quantity:

$$\sum_i \frac{|x-A[i]|^2}{(GA[i])^2}$$

which equals, after division by the quantity $$\sum_i \frac{1}{(GA[i])^2}$$

independent of x:

$$\frac{\sum_i \frac{|A[i]|^2}{(GA[i])^2}}{\sum_i \frac{1}{(GA[i])^2}} - x \frac{\sum_i \frac{\overline{A[i]}}{(GA[i])^2}}{\sum_i \frac{1}{(GA[i])^2}} - \overline{x} \frac{\sum_i \frac{A[i]}{(GA[i])^2}}{\sum_i \frac{1}{(GA[i])^2}} + |x|^2$$

We verify that this quantity is equal to:

$$\left| x - \frac{\sum_i \frac{A[i]}{(GA[i])^2}}{\sum_i \frac{1}{(GA[i])^2}} \right|^2 + \frac{\sum_i \frac{|A[i]|^2}{(GA[i])^2}}{\sum_i \frac{1}{(GA[i])^2}} - \left| \frac{\sum_i \frac{A[i]}{(GA[i])^2}}{\sum_i \frac{1}{(GA[i])^2}} \right|^2$$

The solution x which minimizes it is thus:

$$x = \frac{\sum_i \frac{A[i]}{(GA[i])^2}}{\sum_i \frac{1}{(GA[i])^2}}$$

The noise on x is then given by the addition in quadratic value of the noises on each A[i]:

$$\sigma_x^2 = \frac{\sum_i \frac{(GA[i])^2}{(GA[i])^4}}{\left( \sum_i \frac{1}{(GA[i])^2} \right)^2}$$

We verify that this is equivalent to:

$$\frac{1}{\sigma_x^2} = \sum_i \frac{1}{(GA[i])^2}$$

This result will be used to determine a frequency representation from several partial representations matching on certain points.

7.17.2 Algorithm

A series of images is first acquired as indicated in 7.12., the point of direct impact of the illuminating beam taking, on each sensor, a path defined as indicated in 7.17.1.1. For simplification, the acquisition phase and the calculation phase are separated. However, the three-dimensional frequency representations $F_{p,q}$ can also be generated as the acquisition progresses. For example, if a complete path is used, the separation of the acquisition and calculation phases requires more memory and it is thus preferable to cany out the calculation as the acquisition progresses.

The acquisition phase generates the following arrays:

$M_{k,p,q}[i,j]$, corresponding to the main imaging
$B_{k,p,q}[i,j]$ noise indicator
$H_{k,p,q}[i,j]$ reference imaging for the k-th acquisition
$BH_{k,p,q}[i,j]$ reference image noise indicator where k indexes the image acquisition, p indexes the sensor illuminated by the direct beam, q indicates:
q=0: sensor illuminated by the direct beam
q=1: opposite sensor.

The series of control indices used being defined by the arrays Ic and Jc, the program also generates the series of coordinates of the points of direct and opposite impact of the illuminating beams.

imax$_{k,p,q}$=Ia[p,q,Ic[k,p],Jc[k,p]]
jmax$_{k,p,q}$=Ja[p,q,Ic[k,p],Jc[k,p]]

From these data, a program generates a three-dimensional spatial representation of the studied object. This program comprises the following steps:

Step 1. This step consists in calculating the ratio characteristic of the phase and amplitude difference due to vibrations and to fluctuations in the intensity of the laser between a reference imaging operation of index k=0 and the constant reference imaging of index k. This difference is characterized by variations in the function $H_{k,p,q}[i,j]$ which should be constant in the absence of vibrations. For all the triplets (k,p,q), the program thus calculates, in accordance with the method seen in 7.17.2., the ratio:

$$R_{k,p,q} = \frac{\displaystyle\sum_{(i,j)\in E_{k,p,q}} \frac{H_{0,p,q}[i,j]\overline{H_{k,p,q}[i,j]}}{|BH_{k,p,q}[i,j]|^2 + |BH_{0,p,q}[i,j]|^2}}{\displaystyle\sum_{(i,j)\in E_{k,p,q}} \frac{|H_{k,p,q}[i,j]|^2}{|BH_{k,p,q}[i,j]|^2 + |BH_{0,p,q}[i,j]|^2}}$$

with:

$$E_{k,p,q} = \left\{ \begin{array}{l} (i,j) \left| \frac{|H_{0,p,q}[i,j]\overline{H_{k,p,q}[i,j]}|}{|BH_{k,p,q}[i,j]|^2 + |BH_{0,p,q}[i,j]|^2} \geq \text{Coef} \cdot \right. \\ \\ \max_{\substack{0 \leq a \leq N_{pix}^{-1} \\ 0 \leq b \leq N_{pix}^{-1}}} \left( \frac{|H_{0,p,q}[a,b]\overline{H_{k,p,q}[a,b]}|}{|BH_{k,p,q}[a,b]|^2 + |BH_{0,p,q}[a,b]|^2} \right) \end{array} \right\}$$

and for example Coef=0.5.

Step 2: This step consists in performing the operation consisting in:

normalizing each two-dimensional representation to compensate for variations in the phase and amplitude differences due to vibrations, characterized by the quantity $R_{k,p,q}$ compensating for spherical aberration and the poor relative positioning of the objectives, characterized by $$D_{p\overline{q}+pq}[i,j]$$

going to the value of the illuminating wave at its point of direct impact.

The program thus goes through the indices k,p,q,i,j performing:

$$M_{k,p,q}[i,j] = \frac{M_{k,p,q}[i,j]D_{p\overline{q}+pq}[i,j]R_{k,p,q}}{M_{k,p,0}[imax_{k,p,0}, jmax_{k,p,0}]D_p[imax_{k,p,0}, jmax_{k,p,0}]R_{k,p,0}}$$

$$B_{k,p,q}[i,j] =$$

$$B_{k,p,q}[i,j] \left| \frac{D_{p\overline{q}+pq}[i,j]R_{k,p,q}}{M_{k,p,0}[imax_{k,p,0}, jmax_{k,p,0}]D_p[imax_{k,p,0}, jmax_{k,p,0}]R_{k,p,0}} \right|$$

The use of the array $D_p$, which is the result of steps 7.11, 7.15. and 7.16., makes it possible to clearly improve the results when the average index of the object differs from the nominal index of the objectives. It is however also possible to omit the steps 7.11, 7.15. and 7.16. The position adjustment of the objectives described in 7.10 must then be carried out so as to obtain a centered and punctual spatial image. The array $D_p$ must then be set to 1.

The use of the values $R_{k,p,q}$ enables compensation for possible vibrations in the optical table. However, if the optical table is perfectly stable, this compensation is not necessary. The values $R_{k,p,q}$ must then be set to 1.

Step 3: This step consists in calculating for each pair (p,q) a three-dimensional frequency representation $F_{p,q}$, combined with an array $IB_{p,q}$ of real values, containing the inverse of the square of the standard deviation of the gaussian noise affecting each element of the array $F_{p,q}$. These arrays have the dimensions $2 N_{pix} \times 2 N_{pix} \times 2 N_{pix}$. Each point of a two-dimensional frequency representation corresponds to a point of the three-dimensional frequency representation $F_{p,q}$, whose coordinates must be determined. When a point is obtained several times, the most probable value is determined.

The program initializes the arrays $F_{p,q}$, $IB_{p,q}$ to zero and then goes through all the indices p,q,k,i,j performing, for each quintuplet (p,q,k,i,j), the following operations numbered from 1 to 3:

Operation 1: calculation of the indices of the three-dimensional frequency representation. The program carries out:

$$ni = a_p(i - imax_{k,p,q}) + N_{pix}$$

$$nj = a_p(j - jmax_{k,p,q}) + N_{pix}$$

$$nk = \sqrt{K_m^2 - \left(a_p^2\left(i - \frac{N_{pix}}{2}\right)\right)^2 - \left(a_p^2\left(j - \frac{N_{pix}}{2}\right)\right)^2} - \sqrt{K_m^2 - \left(a_p^2\left(imax_{k,p,q} - \frac{N_{pix}}{2}\right)\right)^2 - \left(a_p^2\left(jmax_{k,p,q} - \frac{N_{pix}}{2}\right)\right)^2} + N_{pix}$$

A distance of one pixel, measured on the sensor p, corresponds to a real frequency deviation proportional to $$\frac{1}{K_p}.$$

The pixels consequently do not represent the same frequency deviations on the two sensors. One obtains a common unit proportional to the frequency deviations by multiplying the distances obtained on the sensor p by the coefficient $$a_p = \frac{K_o + K_1}{2K_p}.$$

A value of K then becomes common to the two sensors and equals $$\frac{K_0 + K_1}{2}.$$

It must be corrected to take into account the index of the sample and one thus obtains $$K_m = \frac{n_o}{n_v} \frac{K_0 + K_1}{2}.$$

Operation 2: modification of the indices of the three-dimensional frequency representation in the case of q=1.

If q=1, the frequency corresponding to the coordinates $imax_{k,p,q}, jmax_{k,p,q}$ is not the zero frequency.

In fact, one has, at this point, by resuming the notations used in 5.3.: $f_c = -f_e$ and hence $f_r = f_c - f_e = -2f_e$. The frequency obtained using the preceding method must thus be translated by a vector $-2f_e$, thus resulting in the following additional operations carried out only in the case of q=1:

$$ni\mathrel{+}= 2a_p imax_{k,p,1}$$

$$nj\mathrel{+}= 2a_p jmax_{k,p,1}$$

$$nk\mathrel{+}= 2\sqrt{K_m^2 - a_p^2\left(imax_{k,p,1} - \frac{N_{pix}}{2}\right)^2 - a_p^2\left(jmax_{k,p,1} - \frac{N_{pix}}{2}\right)^2}$$

With the calculation of the indices ni,nj,nk leading to non-integer values, the integer closest to the calculated value is assigned to them.

Operation 3: modification of array elements.

Having generated the modified indices, the program modifies the array elements:

$$IB_{p,q}[ni, nj, nk] + = \frac{1}{|B_{k,p,q}[i, j]|^2}$$

$$F_{p,q}[ni, nj, nk] + = \frac{M_{k,p,q}[i, j]}{|B_{k,p,q}[i, j]|^2}$$

Step 4: An operation remains to be carried out in order to obtain the most probable value on each frequency. The program thus goes through the indices p,q,ni,nj,nk performing, whenever $IB_{p,q}[ni,nj,nk] \neq 0$, the operation:

$$F_{p,q}[ni, nj, nk] = \frac{F_{p,q}[ni, nj, nk]}{IB_{p,q}[ni, nj, nk]}$$

Step 5: The coordinate systems in which the indices i,j and hence ni,nj,nk have been evaluated are inverted between the two sensors. It is thus necessary to make a change of coordinate system for representations corresponding to the sensor indexed 1 to express them in the same coordinate system as the representations corresponding to the sensor indexed 0. The program consequently carries out the change of variables $ni \to 2N_{pix}-ni$, $nj \to 2N_{pix}-nj$, $nk \to 2N_{pix}-nk$ in the arrays corresponding to the sensor indexed 1 in order to express all the frequencies in the same coordinate system. The arrays corresponding to a frequency representation coming from sensor 1 have an index p equal to 1 or 0 and an index q equal to $\bar{p}$.

To make these changes of variable, the program goes through all the indices p,ni,nj,nk, performing:

$$F_{p,\bar{p}}[ni,nj,nk] = F_{p,\bar{p}}[2N_{pix}-ni, 2N_{pix}-nj, 2N_{pix}-nk]$$

$$IB_{p,\bar{p}}[ni,nj,nk] = IB_{p,\bar{p}}[2N_{pix}-ni, 2N_{pix}-nj, 2N_{pix}-nk]$$

Step 6: The program calculates the characteristic ratio of the phase and amplitude difference between the wave received on the sensor illuminated directly and the one received on the sensor not illuminated. It thus goes through the indices p=0, p=1, performing, in accordance with the principle seen in 7.17.1.2.:

$$Rb_p = \frac{\sum_{(ni,nj,nk) \in E_p} \left[ \frac{F_{p,0}[ni, nj, nk]\overline{F_{p,1}[ni, nj, nk]}}{\frac{1}{IB_{p,0}[ni, nj, nk]} + \frac{1}{IB_{p,1}[ni, nj, nk]}} \right]}{\sum_{(ni,nj,nk) \in E_p} \left[ \frac{|F_{p,1}[ni, nj, nk]|^2}{\frac{1}{IB_{p,0}[ni, nj, nk]} + \frac{1}{IB_{p,1}[ni, nj, nk]}} \right]}$$

In this expression, the sums are restricted to a set $E_p$ made up of triplets (ni,nj,nk) complying with $IB_{p,0}[ni,nj,nk]$ $IB_{p,1}[ni,nj,nk] \neq 0$ and $$\frac{|F_{p,0}[ni, nj, nk]\overline{F_{p,1}[ni, nj, nk]}|}{\frac{1}{IB_{p,0}[ni, nj, nk]} + \frac{1}{IB_{p,1}[ni, nj, nk]}} \geq$$

$$Coef \cdot \max_{\substack{0 \leq a \leq 2N_{pix}-1 \\ 0 \leq b \leq 2N_{pix}-1 \\ 0 \leq c \leq 2N_{pix}-1}} \left( \frac{|F_{p,0}[a, b, c]\overline{F_{p,1}[a, b, c]}|}{\frac{1}{IB_{p,0}[a, b, c]} + \frac{1}{IB_{p,1}[a, b, c]}} \right)$$

where, for example, Coef=0,5

Step 7: The program modifies the three-dimensional representations obtained from sensors not illuminated directly. It goes through the indices p, ni,nj,nk, performing:

$$F_{p,1}[ni,nj,nk] = F_{p,1}[ni,nj,nk]Rb_p$$

Step 8: The program calculates the final frequency representation contained in an array F of dimensions $2N_{pix} \times 2N_{pix} \times 2N_{pix}$. It initializes this array to 0 and then goes through the indices ni,nj,nk while testing the condition:

$$\sum_{p,q} IB_{p,q}[ni, nj, nk] \neq 0$$

When the condition is met, it performs:

$$F[ni, nj, nk] = \frac{\sum_{p,q} F_{p,q}[ni, nj, nk] IB_{p,q}[ni, nj, nk]}{\sum_{p,q} IB_{p,q}[ni, nj, nk]}$$

Step 9: The program carries out a three-dimensional inverse Fourier transformation of the frequency representation thus obtained to obtain a spatial representation.

Step 10: As in the first embodiment, the program can then display the representation thus obtained in the form of sections or projections which may be stereoscopic.

7.17.4. Focussing

The algorithm described 7.17.2. makes it possible to obtain three-dimensional representations of the sample. The focussing adjustment consists in adjusting the position of the object so that these representations are those of a region of interest of the sample. This can be accomplished by the operator, moving the sample while observing, for example, a plane projection or a section of this three-dimensional representation, moving the object to obtain an image of the region of interest. If the sample is moved in the direction of the optical axis, this modifies the values of $w_p$, and the procedure described in 7.15.2. must be reiterated to obtain a correct value of $w_p$.

7.18. Variants

The algorithms used in the present embodiment allow many variants, some of which are set forth below.

7.18.1. Use of pre-recorded values of the direct illuminating beam

This variant consists in modifying Step 2 of the algorithm described in 7.17.2. so as to use the pre-recorded values of the direct illumination. One in fact has, to within a phase factor which is constant over all the values of k,p, $imax_{k,p,0}, jmax_{k,p,0}$:

$$M_{k,p,0}[imax_{k,p,0}, jmax_{k,p,0}] = \frac{Ra[p, Ic[k, p], Jc[k, p]]Rb[p, Ic[k, p], Jc[k, p]]}{R_{k,p,0}}$$

This value may be introduced in the formula used in Step 2, which is thus replaced by:

$$M_{k,p,q}[i, j] = \frac{(M_{k,p,q}[i, j]D_{pq+pq}[i, j]R_{k,p,q})}{(Ra[p, Ic[k, p], Jc[k, p]]} \\ Rb[p, Ic[k, p], Jc[k, p]]D_p[imax_{k,p,0}, jmax_{k,p,0}])$$

7.18.2. Use of precalculated values of the direct illuminating beam

Rb[p,Ic[k,p],Jc[k,p]] is in principle equal to the function obtained in 7.7.:

$$e^{j2\pi\frac{\Delta}{\lambda}} = \exp\left\{j\frac{2\pi}{\lambda}\left[n_v\left(x\frac{i}{K_p} + y\frac{j}{K_p} + z\frac{1}{K_p}\sqrt{K_p^2 - i^2 - j^2}\right) + L\left(n_o\sqrt{1-\left(\frac{n_v}{n_o}\right)^2\frac{i^2+j^2}{K_p^2}} - n_v\sqrt{1-\frac{i^2+j^2}{K_p^2}}\right)\right]\right\}$$

this function being however filtered by the diaphragm. It is thus possible to replace Rb[p,Ic[k,p],Jc[k,p]] by $RB_p[imax_{k,p,0}, jmax_{k,p,0}]$ in which the function $RB_p[i,j]$ is obtained as follows (this method is similar to the one used for $D_p[i,j]$ in 7.16.)

Step 1: generation of arrays $RB_p$ of dimensions $N_e \times N_e$ with, for example, $N_e$=4096:

$$RB_p[i, j] = \exp\left\{j\frac{2\pi}{\lambda}\left[n_v\left(x\frac{ic}{K_p} + y\frac{jc}{K_p} + z\frac{1}{K_p}\sqrt{K_p^2 - ic^2 - jc^2}\right) + L\left(n_o\sqrt{1-\left(\frac{n_v}{n_o}\right)^2\frac{ic^2+jc^2}{K_p^2}} - n_v\sqrt{1-\frac{ic^2+jc^2}{K_p^2}}\right)\right]\right\}$$

where $$ic = i - \frac{N_e}{2}, \; jc = j - \frac{N_e}{2}, \; r = \frac{N_e}{N_{pix}}$$

Step 2: inverse Fourier transformation of arrays $RB_p$
Step 3: extraction of middle part of the array, of dimensions $N_{pix} \times N_{pix}$ with simulation of the diaphragm.
The program carries out:

$$RB_p[i, j] = RB_p\left[i - \frac{N_{pix}}{2} + \frac{N_c}{2}, j - \frac{N_{pix}}{2} + \frac{N_c}{2}\right]$$

for all the pairs (i,j) such that $$\left(i - \frac{N_{pix}}{2}\right)^2 + \left(j - \frac{N_{pix}}{2}\right)^2 \leq \left(\frac{N_{pix}}{2}\right)^2$$

Step 4: Fourier transformation of array $RB_p$.
One then obtains in the form of the array $RB_p$ the function equivalent to array Rb Step 2 of the algorithm described in 7.17.2. is then replaced by:

$$M_{k,p,a}[i, j] = \frac{(M_{k,p,q}[i, j]D_{p\bar{q}+\bar{p}q}[i, j]R_{k,p,q})}{(Ra[p, Ic[k, p], Jc[k, p]])}$$
$$RB_p[imax_{k,p,0}, jmax_{k,p,0}]D_p[imax_{k,p,0}, jmax_{k,p,0}])$$

This replacement is similar to a "smoothing" of the function defined by array Rb and can in certain cases improve the results, in particular if the diffracted wave is strong, falling outside the normal utilization conditions of this microscope. In this case, this formula will be combined with the use of a complete path as defined in 7.17.1.1.

7.18.3. Obtaining confocal representations

A confocal microscope makes it possible to obtain three-dimensional spatial representations, which will be called confocal representations. The present microscope allows a confocal representation to be obtained which is strictly equivalent to that which would be obtained by means of a confocal microscope.

In fact, the illuminating wave used by a confocal microscope is the sum of the plane waves used in the case in which a complete path is used for the acquisition; each plane wave has to be assigned a phase dependent on the illuminated point. The wave equivalent to the wave received by a confocal microscope of the same aperture as the present microscope, when the central point is illuminated, can thus be generated by summing the two-dimensional representations of diffracted waves obtained for all the illuminating waves forming a complete path.

It can be demonstrated that the confocal representation of the object is the inverse Fourier transform of a three-dimensional frequency representation obtained by summing the partial two-dimensional frequency representations obtained from each illuminating wave, all the illuminating waves going through a complete path.

In addition, a confocal microscope acquires images only on a single objective and illuminates the sample only on one side. Furthermore, it generates a value which is the intensity of the wave having traversed the object and not its complex value. The confocal representation in intensity is thus obtained from the waves received by a single objective, and by extracting the square of the modulus of the previously obtained confocal representation. Finally, the confocal microscope does not correct the spherical aberration due to the index of the object.

A confocal representation can thus be obtained by the present microscope by using a complete path for the acquisition, as defined in 7.17.1.1., and by modifying the procedure described in Paragraph 17.2. as follows:

(1) Step 2 is modified as follows:

$$M_{k,p,a}[i, j] = \frac{(M_{k,p,q}[i, j]D_{p\bar{q}+\bar{p}q}[i, j]R_{k,p,q})}{(Ra[p, Ic[k, p], Jc[k, p]])}$$
$$RB_p[imax_{k,p,0}, jmax_{k,p,0}]D_p[imax_{k,p,0}, jmax_{k,p,0}])$$

in which the arrays $D_p$ can be set to 1 if no spherical aberration is to be corrected and in which $RB_p$ is defined as in 7.17.3.2.

(2) Operation 3 of Step 3 is replaced by $F_{p,q}[ni,nj,nk]+=M_{k,p,q}[i,j]$ (3) Steps 4, 5, 6, 7 are not carried out.

(4) Step 8 is replaced by $F[ni,nj,nk]=F_{po,qo}[ni,nj,nk]$ in which the choice of the indices (po,qo) depends on the type of confocal representation one seeks to generate.

if (po,qo)=(0,0) or (po,qo)=(1,0), a representation is generated corresponding to the one which would be obtained by a confocal microscope by reflection.

if (po,qo)=(0,1) or (po,qo)=(1,1), a representation is generated corresponding to the one which would be obtained by a confocal microscope by transmission.

(5) The square of the modulus of the spatial representation obtained after Step 9 then corresponds to the confocal representation in intensity.

Replacing the calculation of the most probable value of the frequency representation at each point results in an overevaluation of the low frequencies in relation to the high frequencies, which is equivalent to a filtering of high frequencies and hence to a loss of definition.

It is also possible to obtain a confocal representation from the three-dimensional frequency representation obtained in accordance with Paragraph 17 unmodified: in fact, the three-dimensional representation of the object constitutes the most complete possible information obtainable with objectives of a given aperture and can be used to simulate any type of image which could be generated from any type of microscope using the same objective and the same wavelength.

However, the use a complete path makes the system more robust, in accordance with what was stated in 7.17.1.1. If a confocal representation is obtained using a path such as the one in FIG. 56, it will be disturbed in the case in which a major part of the illuminating wave is diffracted, and this more significantly than the confocal representation obtained by means of a confocal microscope or by the use of a complete path. It can consequently not be considered to be rigorously equivalent to that generated by a confocal microscope.

7.18.4. Producing three-dimensional images with reference wave control

In the previously described methods, the phase shift device (2205) is controlled to generate phase differences $\theta_d$ in the illuminating wave dependent on the index d in accordance with the array indicated in 7.12.2.1.

To obtain the present variant, this discrete phase shift device must be replaced by a device allowing a continuous phase shift. Such a device may be a liquid crystal device placed between two polarizers, marketed for example by the company Newport. By modifying the path of the beam, this device can also be a piezoelectric mirror as in the first embodiment.

The present variant consists, during the image acquisition described in 7.17.2. and carried out as indicated in 7.12.2.1., in controlling the phase shift device so as to replace the phase shift $\theta_d$ by a phase shift $$\Theta'_d = \theta_d - Arg\left(\frac{Ra[p, Ic[k, p], Jc[k, p], Jc[k, p]]Rb[p, Ic[k, p], Jc[k, p]]}{R_{k,p,0}}\right)$$

in which Arg designates the argument of a complex number. This allows the cancellation of the illuminating wave phase at its point of direct impact and obviates the compensation of this phase. During the calculation phase described in 7.17.2., in Step 2, the formula used may be replaced by:

$$M_{k,p,q}[i, j] = \frac{M_{k,p,q}[i, j]D_{p\bar{q}+pq}[i, j]R_{k,p,q}}{D_p[imax_{k,p,0}, jmax_{k,p,0}]R_{k,p,0}}$$

This mode is equivalent to controlling the phase difference of the illuminating beams by the phase shift device instead of compensating for it by calculation after acquisition.

7.18.5. Obtaining frequency representations without calculating the wave received on the receiving surface If the optical table is of sufficient quality to eliminate vibrations, the formula used in 7.18.4. becomes:

$$M_{k,p,q}[i, j] = \frac{M_{k,p,q}[i, j]D_{p\bar{q}+pq}[i, j]}{D_p[imax_{k,p,0}, jmax_{k,p,0}]}$$

To simplify the explanations, it may be assumed that the beam attenuator and the polarization rotators are not used. We then verify that each frequency representation $F_{p,q}$ obtained in the procedure described in 7.17. can be expressed in the following form:

$$F_{p,q}[ni, nj, nk] =$$

$$\frac{1}{6}(2F_{p,q,0}[ni, nj, nk] - F_{p,q,1}[ni, nj, nk] - F_{p,q,2}[ni, nj, nk]) +$$

$$\bar{j}\frac{1}{2\sqrt{3}}(F_{p,q,1}[ni, nj, nk] - F_{p,q,2}[ni, nj, nk])$$

where $F_{p,q,d}[ni,nj,nk]$ is obtained like $F_{p,q}$ in procedure 7.17. unmodified, but by replacing $M_{k,p,q}[i,j]$ by the real value $M0[k,p][0,d,0,0][q,i,j]$ obtained in the procedure described in 7.12. for a corresponding value of the index d indexing the phase shift. It is thus possible to calculate for each index d a separate frequency representation $F_{p,q,d}$, these representations then being superimposed to obtain the frequency representation $F_{p,q}$, instead of performing directly in the procedure 7.12. the superposition of the values corresponding to each index d.

It is also possible to carry out the superposition of the arrays corresponding to each index d after passing into the spatial domain by inverse Fourier transformation.

Finally, it is possible not to use the same points of impact of the illuminating wave according to the phase shift applied. In this case, each phase shift corresponds to a distinct path and the arrays Io[k],Jo[k] must be replaced by the arrays Io[k,d],Jo[kd]. It is then possible, as previously, to calculate separate arrays $F_{p,q,d}$ before superposing them to obtain the arrays $F_{p,q}$.

This calculation mode is not particularly advantageous but shows that it is not indispensable to calculate the complex two-dimensional representations in an intermediate phase, nor even to undertake any acquisition of data corresponding to these complex two-dimensional representations.

7.18.6. Obtaining images with a single value of the phase shift

The present variant consists in modifying the procedure described in 7.12. so as to acquire only the real part of the complex number normally acquired as described in 7.12. This real part may be acquired in a single step, thus allowing the use of a single value of the index d characterizing the phase shift. Since only the real part is acquired, the frequency representation obtained, assuming that the spherical aberration compensation array $D_p$ is set to 1, is the real part of the complex representation. The spatial representation obtained by inverse Fourier transformation is then the superposition of the normal image with a conjugate image symmetrical in relation to the origin of the reference wave. In order for the normal image not to be superimposed on its symmetrical image, the origin of the reference wave must be placed on the side of the diaphragm, slightly outside the aperture of the diaphragm, and not at its center. The aperture of the diaphragm must be reduced by half in order to avoid the aliasing induced by this displacement of the reference wave origin. The image finally obtained then comprises the normal image and the symmetrical image, not superimposed and thus utilizable. However, in order to be able to acquire the real part in a single step, the reference wave intensity must be sufficiently higher than the diffracted wave intensity, so as not to induce second-order errors. The quality of the image finally obtained thus depends on the intensity of the reference wave. Too low an intensity induces second-order distortions and too high an intensity increases the gaussian noise.

To best comply with the condition of sufficient reference wave intensity, the intensity of the reference wave alone must be adjusted not at one-fourth the maximum value of the digitizer as indicated in 7.4. but, for example, at 80% of this value.

In order for the real part to be actually acquired with each imaging operation, the single phase shift used must make it possible to obtain directly a constant phase reference. This shift will consequently be similar to what was done in 7.18.4.:

$$\Theta_0 = -Arg(Ra[p,Ic[k,p],Jc[k,p]]Rb[p,Ic[k,p],Jc[k,p]])$$

Despite the application of this phase shift, the phase reference may not be constant in the presence of optical table vibrations. This would destroy the image and it is thus necessary to use an optical table of very good quality to eliminate these vibrations.

The index d takes on a single value instead of three and Step 2 of the procedure described in 7.12.2.2. is replaced by:

$$M2[r_1, r_2][q, i, j] = \frac{M0[k, p][MI[q, i, j], 0, r_1, r_2][q, i, j] - Iref[\overline{p}q + p\overline{q}, i, j]}{att[MI[q, i, j]]\sqrt{Iref[\overline{p}q + p\overline{q}, i, j]}}$$

As in 7.18.4., but taking into account the absence of vibrations, Step 2 of the procedure described in 7.17.2. is replaced by:

$$M_{k,p,q}[i, j] = \frac{M_{k,p,q}[i, j]D_{p\overline{q}+\overline{p}q}[i, j]}{D_p[imax_{k,p,0}, jmax_{k,p,0}]}$$

This variant can be further simplified by using only one position of the phase rotators and only one position of the beam attenuator, so that the 36 pairs of elementary images acquired in 7.12.2.1. can be reduced to a single one, with a significant reduction in image quality. In this "extreme simplification" case, the indices $c,d,r_1,r_2$ now take on a single value and the entire procedure described in 7.12.2. is reduced to:

$$M_{k,p,q}[i, j] = \frac{M0[k, p][0, 0, 0, 0][q, i, j] - Iref[\overline{p}q + p\overline{q}, i, j]}{\sqrt{Iref[\overline{p}q + p\overline{q}, i, j]}}$$

7.18.7. Simplified method for obtaining three-dimensional images

To generate the three-dimensional image of the object, it possible to limit the procedure to the representation $F_{0,0}$ defined in 7.17. In the procedure described in 7.17.2., this is equivalent to adopting zero arrays $IB_{p,q}$ for every pair $(p,q) \neq (0,0)$. The present method is the method defined in 7.18.4. but simplified in this manner, and adapted to the case in which the average index of the sample is close to the nominal index of the objectives, and in which the table can be considered perfectly stable.

Under these conditions, we have $R_{k,0,0}=1$ and $D_0[i,j]=1$. The formula:

$$M_{k,p,q}[i, j] = \frac{M_{k,p,q}[i, j]D_{p\overline{q}+\overline{p}q}[i, j]R_{k,p,q}}{D_p[imax_{k,p,0}, jmax_{k,p,0}]R_{k,p,0}}$$

which was used in 7.18.4. is thus simplified and we obtain: $M_{K,0,0}[i,j] = M_{k,0,0}[i,j]$ i.e the array $M_{k,0,0}$ is not modified before being used to generate the three-dimensional representation of the object.

In this particular case, no algorithmic compensation for the phase difference of the reference beam is required, because the device used allows the generation of illuminating beams having a constant phase difference in relation to the reference wave.

In this particular case, it is also possible to obviate Steps 7.10, 7.11, 7.15 and 7.16. The position of the objectives can be adjusted as in 7.9.1, so as to have a centered point image. The control of the phase shift device is then defined by:

$$\Theta_d = \theta_d - \text{Arg}(Ra[p,Ic[k,p],Jc[k,p]])$$

i.e. it does not depend on measurements previously carried out on the object itself. If a microscope objective having a nominal index equal to that of a vacuum is used, prior measurements may be carried out in the absence of any object (considering the transparent plate to be an object).

7.18.8. Producing an image with a single position of the polarizers

The present variant consists in not using the possibility of varying the indices $r_1$ and $r_2$. If images according to the present variant are generated alone, the polarization rotators (2210) (2241) (2238) (2226) may be eliminated. The present variant requires a modification of Step 3 of the loop on k,p described in 7.12.2.2., as well as a modification of Step 8 of the algorithm described in 7.17.2.

7.18.8.1. Modification of Step 3 of the loop on k,p described in 7.12.2.2.

When the polarization rotators are not used, the direction of the electric field vector of the illuminating beam and the analysis direction of the received beam are oriented along the vector $\vec{j}$ of FIG. 52.

We denote as $\vec{y}_e$ and $\vec{y}_c$ the vectors deduced respectively from the vectors $\vec{x}_e$ and $\vec{x}_c$ by a rotation of $\pi/2$ in the plane of FIG. 52.

We have:

$$\vec{j} = \vec{x}_e \sin \phi_e + \vec{y}_e \cos \phi_e$$

During the diffraction towards point C:

the component along $\vec{x}_e$ is transmitted without attenuation, becoming the component on the vector $-\vec{x}_c$ the component along $\vec{y}_e$ is transmitted, becoming the component on the vector $-\vec{y}_c$, but attenuated by a factor $\cos \theta$ in which $\theta$ is the angle between the vector $f_e$ and the vector $f_c$.

For an electric field vector $\vec{j}$ of the illuminating wave, the electric field vector of the wave received at point C is thus proportional to $\vec{t} = -\vec{x}_c \sin \phi_e - \vec{y}_c \cos \phi_e \cos \theta$. The relationships $\vec{x}_c = \vec{i} \cos \phi_c + \vec{j} \sin \phi_c$, $\vec{y}_c = -\vec{i} \sin \phi_c + \vec{j} \cos \phi_c$ can be taken into account. The component of $\vec{t}$ along $\vec{j}$ is also proportional to $Br = -\cos \phi_c \cos \phi_e \cos \theta - \sin \phi_c \sin \phi_e$. This constitutes an attenuation factor which affects the diffracted beam measured at the point C along an analysis direction oriented along $\vec{j}$ when the illuminating beam is directed on the point E and has its electric field vector oriented along $\vec{j}$. If the diffusion could be considered isotropic, this coefficient would be constant. To compensate for the anisotropic effect, it is thus sufficient to divide the values measured by this coefficient Br so as to arrive at a constant coefficient characterizing the isotropic diffusion. Division by Br raises the level of the noise affecting the points at which Br is low, which must also be taken into account.

The factor $\cos \theta$ is equal to $$\cos \theta = \frac{f_e \cdot f_c}{\|f_e\| \cdot \|f_c\|}.$$

Using the normalized values of the frequency vectors, this results in: $\cos \theta = x_c x_e + y_c y_e + z_c z_e$.

Step 3 of the procedure 7.12.12. is thus modified as follows:

the program calculates, in addition to the values already calculated in 7.12., $\cos \theta = x_c x_e + y_c y_e + z_c z_e$ the program calculates the attenuation compensation factor comp[k,p,q]:

if $-\cos \phi_c \cos \phi_e \cos \theta - \sin \phi_e \leq \lim$ then comp[k,p,q]=1/lim, where lim is a very low value, for example lim=$10^{-10}$ otherwise, $$comp[k, p, q] = \frac{1}{-\cos\varphi_c \cos\varphi_e \cos\theta - \sin\varphi_c \sin\varphi_e}$$

Like the values coef[k,p,q,i,j][$r_1,r_2$] used in 7.12., the values comp[k,p,q] constitute an array which can be precalculated.

the program finally calculates:

$$M_{k,p,q}[i,j] = M2[1,1][q,i,j] comp[k,p,q]$$

$$b_{k,p,q}[i, j] = \frac{\sigma_{acq}}{\sqrt{6}} \frac{comp[k, p, q]}{att[M1[q, i, j]]\sqrt{Iref[\overline{pq} + p\overline{q}, i, j]}}$$

where $\sigma_{acq}$ is the standard deviation of the noise of the sensors. The sensors are generally designed so that $\sigma_{acq}$ is of the order of 1. We have:

$$\sigma_{acq} = 10^{-\frac{SNR_{db}}{20}} 2^N$$

where $SNR_{dB}$ is the signal-to-noise ratio in decibels and N is the number of sampling bits of the signal.

7.18.8.2. Modification of Step 8 of the algorithm described in 7.17.2.

Multiplication by comp[k,p,q] can make the noise level rise considerably, which can distort the image obtained. To prevent this problem, Step 8 of the procedure described in 7.17 is modified so as to cancel the components of the frequency representation which are lower in modulus than the noise multiplied by a given constant const.

Cancellation of certain elements of the frequency representation is itself a noise generator. To obtain a frequency representation with a quality comparable to that obtained with the normal procedure, more precise sampling or an addition attenuation level may be necessary.

Step 8 of the procedure described in 7.17 is modified as follows:

Step 8 modified: The program calculates the final frequency representation, contained in an array F of dimensions $2N_{pix} \times 2N_{pix} \times 2N_{pix}$. It initializes to 0 this array and then goes through the indices ni,nj,nk while testing the condition:

$$\sum_{p,q} IB_{p,q}[ni, nj, nk] \neq 0$$

When the condition is met, it performs:

$$F[ni, nj, nk] = \frac{\sum_{p,q} F_{p,q}[ni, nj, nk] IB_{p,q}[ni, nj, nk]}{\sum_{p,q} IB_{p,q}[ni, nj, nk]}$$

It then tests the condition $$F[ni, nj, nk] \leq \frac{const}{\sqrt{\sum_{p,q} IB_{p,q}[ni, nj, nk]}}$$

When the condition is met, it performs: F[ni,nj,nk]=0 const is a constant chosen so that in the absence of a signal (noise only) the condition is always true. It is possible, for example, to use const=4

Multiplication by a constant of the total noise level modifies the results of this Step 8 modified. For this reason, in 7.18.8.1., an absolute noise level is determined, whereas in 7.12 the noise level was defined with a constant bias.

7.18.9. Obtaining an image of uniaxial birefringent crystal

We consider a uniaxial crystal of ordinary index $n_o$ cut so as to form a plate of small thickness, the plane of the plate being orthogonal to the optical axis of the crystal. This plate constitutes the observed sample and is placed between the two objectives, optical oil being used between the objectives and the sample, the objective being designed for the use of cover glasses having an index equal to that of the optical oil. The optical axis of the crystal thus coincides with the optical axis of the objectives.

It is assumed that this plate is not "perfect". It can be affected, for example, by localized crystallization faults. The purpose of the present procedure is to obtain a three-dimensional image of these crystallization faults. It may also be an optical memory whose local index variations characterize the stored bits. The present procedure makes it possible to obtain a three-dimensional image characteristic of the variations of the ordinary index $n_o$ of the sample.

The average ordinary index $n_o$ is assumed to be known, as is the thickness of the plate. The sample is introduced without displacing the objectives, so that x,y,z are also known. It is also possible to obtain $n_o$,L, x,y,z with a modified version of the procedure described in 7.11. Such a modified version, applicable in the case of embodiment 4, will be described in 8.4.3.2.

Obtaining the image of the ordinary index supposes a modification of Step 8 of the procedure 7.17., which is the one already described in 7.18.8.2. It also assumes a modification of Step 3 of the loop on k,p described in 7.12.2.2., described below using the notations used in 7.12.

7.18.9.1. Principle

We denote:

$$\vec{u}_e = \frac{f_e \wedge f_o}{\|f_e \wedge f_o\|}, \vec{u}_c = \frac{f_c \wedge f_o}{\|f_c \wedge f_o\|}$$

$\vec{u}_e$ and $\vec{u}_c$ are thus defined according to the vectors of FIG. 51. They are both in the plane of FIG. 52 (not shown). $\vec{u}_e$ is oriented along the ordinary polarization direction of the illuminating wave reaching E. $\vec{u}_c$ is oriented along the ordinary polarization direction of the diffracted wave reaching the point C.

We denote $\vec{v}_e$ and $\vec{v}_c$ the vectors deduced respectively from the vectors $\vec{u}_e$ and $\vec{u}_c$ by $\pi/2$ rotation in the plane of FIG. 52.

We denote $\vec{y}_e$ and $\vec{y}_c$ the vectors deduced respectively from the vectors $\vec{x}_e$ and $\vec{x}_c$ by $\pi/2$ rotation in the plane of FIG. 52.

We denote $\epsilon$ the angle between the vector $\vec{i}$ and the vector $\vec{a}$ obtained from $\vec{j}$ by a symmetry whose axis is the position of the neutral axis of the polarization rotators when this neutral axis is not parallel to $\vec{j}$. We typically have $\epsilon \approx 10$ degrees.

When the electric field vector of the illuminating beam (at point E) is $A_0 \vec{i} + A_1 \vec{j}$, the electric field vector measured at the point C is $(C_{00}A_0 + C_{01}A_1)\vec{i} + (C_{10}A_0 + C_{11}A_1)\vec{j}$.

When an electric field vector $\vec{u}_e = \vec{i} \cos \alpha_e + \vec{j} \sin \alpha_e$ is used for the illuminating wave, the electric field vector measured at the point C is thus: $\vec{w}_m = (C_{00} \cos \alpha_e + C_{01} \sin \alpha_e)\vec{i} + (C_{10} \cos \alpha_e + C_{11} \sin \alpha_e)\vec{j}$ We can use:

$$\vec{i} = \vec{u}_c \cos \alpha_c - \vec{v}_c \sin \alpha_c$$

$$\vec{j} = \vec{u}_c \sin \alpha_c - \vec{v}_c \cos \alpha_c$$

giving:

$$\vec{w}_m = (C_{00} \cos \alpha_e \cos \alpha_c + C_{01} \sin \alpha_e \cos \alpha_c + C_{10} \cos \alpha_e \sin \alpha_c + C_{11} \sin \alpha_e \sin \alpha_c)\vec{u}_c$$

$$+ (-C_{00} \cos \alpha_e \sin \alpha_c - C_{01} \sin \alpha_e \sin \alpha_c + C_{10} \cos \alpha_e \cos \alpha_c + C_{11} \sin \alpha_e \cos \alpha_c)\vec{v}_c$$

The value measured at the point C along the direction of the vector $\vec{u}_c$ is thus:

$$Bm = C_{00} \cos \alpha_e \cos \alpha_c + C_{01} \sin \alpha_e \cos \alpha_c + C_{10} \cos \alpha_e \sin \alpha_c + C_{11} \sin \alpha_e \sin \alpha_c$$

We denote $Q_{r_1,r_2}$ the value measured at the point C for the combination $r_1, r_2$ of the control indices of the polarization rotators. When the electric field vector of the illuminating beam (at the point E) is $A_0 \vec{a} + A_1 \vec{j}$, the electric field vector measured at the point C is $(Q_{00}A_0 + Q_{01}A_1)\vec{a} + (Q_{10}A_0 + Q_{11}A_1)\vec{j}$ with $\vec{a} = \vec{i} \cos \epsilon + \vec{j} \sin \epsilon$.

The relationship defining $\vec{a}$ is inverted as:

$$\vec{i} = \vec{a} \frac{1}{\cos \epsilon} + \vec{j} \tan \epsilon$$

When the electric field vector of the illuminating beam is $$A_0 \vec{i} + A_0 \vec{i} = \vec{a} A_0 \frac{1}{\cos \epsilon} + \vec{j}(-A_0 \tan \epsilon + A_1)$$

the vector received at the point C is thus:

$$\left(Q_{00}A_0 \frac{1}{\cos \epsilon} + Q_{01}(-A_0 \tan \epsilon + A_1)\right)\vec{a} +$$

$$\left(Q_{10}A_0 \frac{1}{\cos \epsilon} + Q_{11}(-A_0 \tan \epsilon + A_1)\right)\vec{j}$$

hence:

$$(Q_{00}A_0 + Q_{01}(-A_0 \sin \epsilon + A_1 \cos \epsilon))\vec{i} +$$

$$\left(Q_{00}A_0 \tan \epsilon + Q_{01}(-A_0 \sin \epsilon \tan \epsilon + A_1 \sin \epsilon) + \right.$$

$$\left. Q_{10}A_0 \frac{1}{\cos \epsilon} + Q_{11}(-A_0 \tan \epsilon + A_1)\right)\vec{j}$$

This expression is the equivalent of $(C_{00}A_0 + C_{01}A_1)\vec{i} + (C_{10}A_0 + C_{11}A_1)\vec{j}$, with:

$C_{00} = Q_{00} - Q_{01} \sin \epsilon$ $C_{01} = Q_{01} \cos \epsilon$ $$C_{10} = Q_{00} \tan \epsilon - Q_{01} \sin \epsilon \tan \epsilon + Q_{10} \frac{1}{\cos \epsilon} - Q_{11} \tan \epsilon$$

$C_{11} = Q_{01} \sin \epsilon + Q_{11}$

The expression of Bm is thus transformed as follows:

$$Bm = (Q_{00} - Q_{01} \sin \epsilon) \cos \alpha_e \cos \alpha_c +$$

$$Q_{01} \cos \epsilon \sin \alpha_e \cos \alpha_c + (Q_{01} \sin \epsilon + Q_{11}) \sin \alpha_e \sin \alpha_c +$$

$$\left(Q_{00} \tan \epsilon - Q_{01} \sin \epsilon \tan \epsilon + Q_{10} \frac{1}{\cos \epsilon} - Q_{11} \tan \epsilon\right) \cos \alpha_e \sin \alpha_c$$

hence:

$$Bm = (\cos \alpha_e \cos \alpha_c + \cos \alpha_e \sin \alpha_c \tan \epsilon) Q_{00} +$$

$$(-\sin \epsilon \cos \alpha_e \cos \alpha_c + \cos \epsilon \sin \alpha_e \cos \alpha_c +$$

$$\sin \epsilon \sin \alpha_c - \sin \epsilon \tan \epsilon \cos \alpha_e \sin \alpha_c) Q_{01} +$$

$$\left(\frac{1}{\cos \epsilon} \cos \alpha_e \sin \alpha_c\right) Q_{10} + (\sin \alpha_e \sin \alpha_c - \tan \epsilon \cos \alpha_e \sin \alpha_c) Q_{11}$$

This value Bm is the value measured at the point C along the direction of the vector $\vec{u}_c$ when the electric field vector of the illuminating wave is oriented along $\vec{u}_e$. Owing to the definition of the vectors $\vec{u}_e$ and $\vec{u}_c$, Bm is the value of the ordinary diffracted ray for an ordinary illuminating beam. The measurement of Bm is indirect since it is the values $Q_{ij}$ which are measured, the value of Bm being deduced therefrom.

The vector $\vec{u}_e$ may be expressed in the following form:

$$\vec{u}_e = \vec{x}_e \cos \beta_e - \vec{y}_e \sin \beta_e$$

During diffraction towards the point C, on the same principle as in 7.18.8.1.:

the component along $\vec{x}_e$ is transmitted without attenuation, becoming the component on the vector $-\vec{x}_c$ the component along $\vec{y}_e$ is transmitted, becoming the component on the vector $-\vec{y}_c$, but is attenuated by a factor cos $\theta$ where $\theta$ is the angle between the vector $f_e$ and the vector $f_c$.

The vector received at the point C is thus:

$$\vec{w}_r = -\vec{x}_c \cos \beta_e + \vec{y}_c \sin \beta_e \cos \theta$$

We can use:

$$\vec{x}_c = \vec{u}_c \cos \beta_c + \vec{v}_c \sin \beta_c$$

$$\vec{y}_c = -\vec{u}_c \sin \beta_c + \vec{v}_c \cos \beta_c$$

We consequently obtain:

$$\vec{w}_r = (-\cos\beta_c \cos\beta_e - \sin\beta_c \sin\beta_e \cos\theta)\vec{u}_c + (-\sin\beta_c \cos\beta_e + \cos\beta_c \sin\beta_e \cos\theta)\vec{v}_c$$

The value received at the point C along the direction of the vector $\vec{u}_c$ is thus:

$$Br = -\cos\beta_c \cos\beta_e - \sin\beta_c \sin\beta_e \cos\theta$$

This value Br is the attenuation coefficient which affects the ordinary diffracted beam received at the point C when the illuminating beam is ordinary. In an isotropic diffusion model, the coefficient Br would be constant. As in 7.18.8.1., this attenuation may be compensated by dividing the measured value Bm by the coefficient Br.

7.18.9.2. Algorithm

Step 3 of the loop on k,p described in 7.12.12. is thus modified as follows:

the program calculates the following quantities, in addition to those calculated in 7.12.12.:

$$\cos\theta = x_c x_e + y_c y_e + z_c z_e$$

$$\sin\beta_c = \frac{1}{M_c M_{ce}} V_{xy} \qquad \cos\beta_c = \frac{1}{M_c M_{ce}}(y_c V_{yz} - x_c V_{xz})$$

$$\sin\alpha_c = \frac{1}{M_c} x_c \qquad \cos\alpha_c = \frac{1}{M_c} y_c$$

$$\sin\beta_e = \frac{1}{M_e M_{ce}} V_{xy} \qquad \cos\beta_e = \frac{1}{M_e M_{ce}}(-y_e V_{yz} + x_e V_{xz})$$

$$\sin\alpha_e = \frac{1}{M_e} x_e \qquad \cos\alpha_e = \frac{1}{M_e} y_e$$

For all these values, appropriate limit values are used when the denominators are zero:

if $M_c=0$ then $\alpha_c=-\alpha_e$ and $\beta_c=\beta_e=0$ is used
if $M_e=0$ then $\alpha_e=-\alpha_c$ and $\beta_c=\beta_e=0$ is used
if $M_{ce}=0$ then $\beta_c=\beta_e=0$ is used
if $M_c=0$ and $M_e=0$ and $M_{ce}=0$ then $\alpha_c=\alpha_e=\beta_c=\beta_e=0$ is used the program calculates the attenuation compensation factor comp[k,p,q]:

if $-\cos\beta_c \cos\beta_e - \sin\beta_c \sin\beta_e \cos\theta \leq \lim$, then $$comp[k,p,q] = \frac{1}{\lim},$$

where lim is a very low value, for example $\lim=10^{-10}$ otherwise, $$comp[k,p,q] = \frac{1}{-\cos\beta_c \cos\beta_e - \sin\beta_c \sin\beta_e \cos\theta}$$

The program calculates the values:

$coef[k,p,q,i,j][0,0] = (\cos\alpha_e \cos\alpha_c + \cos\alpha_e \sin\alpha_c \tan\epsilon)comp[k,p,q]$ $coef[k,p,q,i,j][0,1] = (-\sin\epsilon \cos\alpha_e \cos\alpha_c + \cos\epsilon \sin\alpha_e \cos\alpha_c + \sin\epsilon \sin\alpha_e \sin\alpha_c - \sin\epsilon \tan\epsilon \cos\alpha_e \sin\alpha_c)comp[k,p,q]$ $coef[k,p,q,i,j][1,0] = \left(\frac{1}{\cos\epsilon}\cos\alpha_e \sin\alpha_c\right)comp[k,p,q]$ $coef[k,p,q,i,j][1,1] = (\sin\alpha_e \sin\alpha_c - \tan\epsilon \cos\alpha_e \sin\alpha_c)comp[k,p,q]$ As in 7.12., the values $coef[k,p,q,i,j][r_1,r_2]$ and $comp[k,p,q]$ constitute arrays which can be precalculated.

the program finally calculates:

$$M_{k,p,q}[i,j] = \sum_{r_1,r_2} M2[r_1,r_2][q,i,j] coef[k,p,q,i,j][r_1,r_2]$$

$$B_{k,p,q}[i,j] = \frac{\sigma_{acq}}{\sqrt{6}} \frac{comp[k,p,q]}{att[M1[q,i,j]]\sqrt{Iref[\bar{p}q+p\bar{q},i,j]}}$$

where $\sigma_{acq}$ is the standard deviation of the sensor noise defined as in 7.18.8.1. $M2[r_1,r_2][q,i,j]$ corresponds to the value measured which was denoted $Q_{r_1,r_2}$ in 7.18.9.1. the calculation of $M_{k,p,q}[i,j]$ is equivalent to the calculation of the ratio $$\frac{Bm}{Br}$$

defined in 7.18.9.1.

7.18.10. Study of samples by reflection only

When the two representations $F_{0,0}$ and $F_{0,1}$ do not match, it is in principle impossible to determine their phase relationship: in fact, any phase relationship corresponds to a possible frequency representation. A possible solution is then to obtain the representation of the object from $F_{0,1}$ alone. However, with information on $F_{0,1}$ alone it is not possible to reliably differentiate the refractive index and absorptivity. In fact, a representation differentiating validly the refractive index and absorptivity must occupy a region of the frequency space symmetrical in relation to the origin. A good quality representation, comparable to the one obtained with confocal microscopy by reflection but with a higher precision can be obtained by extracting the modulus from the spatial representation obtained by using $F_{0,1}$ alone.

This method can also be applied to the study of the surface area of thick samples through which the beam is transmitted poorly. In this case, the approximation whereby the illumination is roughly constant in the observed region of the sample is not complied with in the surface area adjacent to the microscope objectives, and when the illuminating beam and the wave coming from the object are transmitted by the same objective. The only reliable part of the frequency representation obtained is thus $F_{0,1}$ if the top side of the object is observed, or $F_{1,1}$ if the bottom side of the object is observed. As previously, it is possible to extract the modulus from the spatial representation obtained using only $F_{0,1}$ or $F_{1,1}$.

In a similar manner, this method can be used for the study of the surface of very opaque objects.

It is also possible to construct, on this principle, a degraded version of the microscope having only one objective and hence operating only be reflection. The adjustment phase must then be adapted so that a second objective is not required. It is also possible to use a complete system during the adjustment phase and then eliminate the second objective only later.

7.19. Use of microscope objectives with a suitable nominal index

In all the embodiments, it is possible to use standard microscope objectives. These objectives have a nominal refractive index $n_v$ close to that of glass. They are designed to operate with an immersion liquid and a cover glass of index $n_v$. These objectives yield good results if the observed sample has an average index close to that of $n_v$ or is not very thick. If the observed sample consists essentially of water, of index 1.33, and if the aperture of the objective is 1.4, then the total thickness of the sample must be sufficiently smaller than the total width of the generated image. If it is too high, the three-dimensional representation obtained may be distorted. In fact, the spherical aberration caused by the thickness of the sample may then become such that the wave coming from an objective cannot be received by the facing objective except for a small part of the frequencies used.

A microscope objective is designed to use an optical liquid with a given index, the index of the optical liquid having been called here the <<nominal index>> of the objective. It is also designed to use a cover glass having a given index and thickness, the thickness of the cover glass not being necessarily equal to the nominal index of the objective. If the average index of the object is assumed to be equal to the nominal index of the objective, the objective allows a compensation for the spherical aberration due to the cover glass, which is independent of the position of the object.

If, on the other hand, the nominal index of the objective differs from the average index of the object, the variations in the position of the object lead to a variation in the thickness of the layers corresponding respectively to the object and to the optical liquid. The induced spherical aberration thus depends on the position of the object and can consequently not be compensated by the objective, a compensation valid for a position of the object no longer being so for another position. This problem has no effect on the possibility of obtaining two-dimensional images, which is usual with conventional microscopes, and in which the index of the sample does not intervene. By contrast, it is troublesome for the observation of images in three dimensions with a thick sample.

A solution to this problem consists in using an objective whose nominal index is close to the average index of the observed sample.

If the observed sample consists essentially of water, the optical liquid may be water or a liquid having a stabilized index close to that of water. The objective can be designed by usual optical calculation methods, taking into account the index of the optical liquid and the need to compensate for aberration due to the cover glass. This design may be facilitated by the use of a Teflon cover (polymer manufactured by DuPont) whose index is close to that of water and which thus induces a small aberration.

If the observed sample is a birefringent crystal with a high index, as in the case of optical memories, the nominal index of the objective should be close to that of the crystal, implying the use of a high index optical liquid. The cover glass must have an index close to that of the observed crystal or may be eliminated.

Water-immersion objectives are, for example, manufactured by Zeiss.

7.20. Use of microscope objectives affected by spherical aberration

FIG. 90 represents the plane (6105) whose image is formed by the microscope objective in (6107) and the rear focal plane (6106) of the objective. We denote as B($\alpha$) the image point, in the rear focal plane of the objective, of a beam forming in the object an angle $\alpha$ with the optical axis.

The present variant consists in using objectives designed so as to verify only the following constraints:

(1)—Spherical aberration affecting the image formed in the image plane of the objective must remain less than a fraction of the diameter of this image.

(2)—The image, in the rear focal plane, of a beam which is parallel in the observed object, must be a point image.

(3)—The distance between the point B($\alpha$) and the point B(0) must be proportional to sin $\alpha$.

An objective complying only with these constraints is easier to design than a conventional objective. This simplification of requirements imposed on the objective makes it possible to increase the working distance, thus allowing the object to be placed between thick plates. It can also allow an increase in the aperture of the objectives, thus facilitating compliance with the matching condition for partial frequency representations. An objective of this type may consist, for example, of a Nikon aplanetic/achromatic condenser with an aperture of 1.4 associated with an achromat allowing its magnification to be adjusted. FIG. 89 shows the principle of such an association. The Nikon condenser is designed for a parallel incoming light. The beam coming from a point (6104) of the observed object is thus parallel to the output of the condenser (6102). An achromat (6101) is used to make it converge again towards a point (6103). If the focal length of the condenser is $f_c$ and if the focal length of the achromat is $f_a$ then the magnification of the combination is $f_a/f_c$ and the distance between the achromat and the image plane, where the diaphragm should be located, is $f_a$.

Conditions (2) and (3) must be interpreted as meaning that the deviations with regard to punctuality or errors in the position of the point in the rear focal plane are of an amplitude smaller than the diameter of the corresponding diffraction disc, which is about $$\frac{D}{N_{pix}}$$

where:

$N_{pix}$ is the number of sampling pixels of the plane frequency images used.

D is the diameter of the image formed in the rear focal plane of the objective.

An objective complying with requirements (1) to (3) can be designed by means of an optical calculation program. In this case, the program determines the optical paths. It can in particular determine the length of the optical path of the ray between point A and point B($\alpha$). This length is denoted chem(sin $\alpha$).

The phase difference, in the rear focal plane, of the corresponding beam is then $$2\pi \frac{chem(sin\alpha)}{\lambda}.$$

This phase shift can be compensated for by multiplying the point of coordinates (i,j) of the plane frequency image by:

$$\exp\left(-j\frac{2\pi}{\lambda} chem\left(\frac{1}{K}\sqrt{\left(i-\frac{N_{pix}}{2}\right)^2+\left(j-\frac{N_{pix}}{2}\right)^2}\right)\right)$$

This can be done by taking into account this phase difference in the aberration compensation function obtained in 7.16. If the value chem(sin $\alpha$) cannot be determined by optical calculation, it can also be determined by a measurement process.

In the following explanations, the value chem(sin $\alpha$) will always be used in functional form. It is however clear that it can in practice be in the form of arrays. Oversampling/undersampling methods can be used to obtain it in the form of arrays of different dimensions or having different sampling intervals. The objectives (2217) and (2219) must in every case be identical to each other.

The use of objectives complying only with conditions (1) (2) (3) calls for certain modifications in the method used.

7.20.1. Modification of method for calculating coefficients $K_p$ described in 7.6.

Since there is significant spherical aberration, it is not possible to focus the image on the micrometer as indicated in 7.6. The focussing procedure and the calculation formula for $K_p$ from the image of the micrometer are consequently eliminated and the coefficients $K_p$ are calculated directly from the frequency image.

The object is a micrometer illuminated by a plane wave and characterized by the distance $D_{reel}$ between two successive graduations. The wave coming from the object has a maximum intensity for angles formed with the optical axis complying with $$\sin\alpha = \frac{n\lambda_v}{D_{reel}}$$

in which n is an integer. The corresponding spatial frequencies consequently have as component along the horizontal axis:

$$\frac{n}{D_{reel}}.$$

Moreover, the frequency step on the image S[p,i,j] is $$\frac{1}{K_p\lambda_v}.$$

To measure the coefficient $K_0$ we use, as object, the objective micrometer and the beams FEG and FRD. From the sensor (2239), an image S[0,i,j] is obtained by the procedure described in 7.5. This image is composed of a central point made up of the direct illuminating wave and a series of aligned points corresponding to the different frequencies for which the wave coming from the object is at its maximum. The visibility of these aligned points is better if the sensor is allowed to saturate for the central frequency. In this image, we measure the distance in pixels $D_{fr}$ between two points separated by $N_{fr}$ intervals.

We have, given the preceding considerations:

$$\frac{D_{fr}}{K_0\lambda_v} = \frac{N_{fr}}{D_{reel}}$$

or, with $$K_0 = \frac{D_{reel}D_{fr}}{\lambda_v N_{fr}}.$$

The wavelength to be considered here is the wavelength in the material, assumed to have an index equal to the nominal index $n_v$ of the objective, i.e.:

$$\lambda_v = \frac{\lambda}{n_v}.$$

We thus have finally:

$$K_0 = \frac{n_v}{\lambda} \frac{D_{reel}D_{fr}}{N_{fr}}$$

$K_1$ is measured by a symmetrical process from sensor (2229).

7.20.2. Modification of procedure described in 7.9.1. for obtaining the relative coordinates of objectives When the procedure described in 7.9.1. is applied, the image obtained on the CCD (2239) is affected by a phase shift which is twice that which would affect the wave coming from a point of the sample. In fact, the beam FRGI passes through two objectives instead of one. This phase shift, which would not exist if the objectives were devoid of spherical aberration, must be compensated to obtain a function $F_{rec}$ from which it is possible to apply the program described in 7.8.

Before determining the coordinates x,y,z by means of the program described in 7.8., the array $F_{rec}$ obtained must consequently be modified as follows:

$$F_{rec}[i, j] = F_{rec}[i, j]\exp\left(-2\frac{2\pi}{\lambda}chem\left(\frac{1}{K_0}\sqrt{\left(i-\frac{N_{pix}}{2}\right)^2 + \left(j-\frac{N_{pix}}{2}\right)^2}\right)\right)$$

7.20.3. Modification of procedure described in 7.15.2. for calculating $w_p$

In order to be able to calculate $w_p$, it is essential to compensate, for each plane frequency image, the phase shifts due to the spherical aberrations of the microscope objectives.

In the block (4002) of FIG. 57, an additional step 1.4. must be added after Step 1.3. Step 1.4.: the program goes through the indices i,j performing:

$$Ms_k[i, j] = Ms_k[i, j]\exp\left(-\frac{2\pi}{\lambda}chem\left(\frac{N_{pix}}{K_0N_d}\sqrt{\left(i-\frac{N_d}{2}\right)^2 + \left(j-\frac{N_d}{2}\right)^2}\right)\right)$$

7.20.4. Modification of aberration compensation function calculation described in 7.16.

The compensation for spherical aberration of the objectives is obtained by a corresponding modification of the aberration compensation function $D_p$.

After Step 1 of the procedure described in 7.16., it is necessary to add an additional step: Step 1 bis: the program goes through all the indices i,j performing the operation:

$$Ds_p[i, j] = Ds_p[i, j]\exp\left(-\frac{2\pi}{\lambda}chem\left(\frac{N_{pix}}{K_pN_e}\sqrt{\left(i-\frac{N_e}{2}\right)^2 + \left(j-\frac{N_e}{2}\right)^2}\right)\right)$$

7.20.5. Measurement of chem function

If the chem function is not known through the use of an optical calculation program, it can be measured by the microscope. This measurement must be carried out immediately after the measurement of the coefficients $K_p$. To carry out this measurement, we use the beams FRGI and FED. We first use the procedure described in 7.3.3.1. to calculate the image in the spatial domain and evaluate its punctuality and the position of its center. The position of the objectives is then adjusted to have the best possible point image and so that this image is perfectly centered. One then determines the image received on the sensor (2239) by means of the procedure described in 7.5. As in 7.20.2., the image is affected by a phase shift which is twice that which would affect the image of a point of the object and we thus have roughly:

$$S[0, i, j] = \exp\left\{2\frac{2\pi}{\lambda}chem\left(\frac{1}{K_0}\sqrt{\left(i-\frac{N_{pix}}{2}\right)^2 + \left(i-\frac{N_{pix}}{2}\right)^2}\right)\right\}$$

From the array S measured it is possible to reconstitute the chem function. A simple way to obtain this function, for a set of sampling points indexed by the integer $p \leq K$, is through the equation:

$$chem\left(\frac{p}{K_0}\right) = \frac{1}{2}\frac{\lambda}{2\pi}\sum_{i=1}^{p} Arg\left\{\frac{S\left[0, i+\frac{N_{pix}}{2}, 0\right]}{S\left[0, i-1+\frac{N_{pix}}{2}, 0\right]}\right\}$$

for $1 \leq p \leq K$ and chem(0)=0, where Arg designates the argument and takes on values between $-\pi$ and $\pi$.

The values of chem are obtained here only from measurements carried out on a horizontal straight line. It is possible to use more elaborate methods to reduce, by filtration, the effect of local disturbances, taking into account all the points and not only those located on such a line.

The chem function thus obtained can be presented in the form of an array and oversampled or undersampled as indicated earlier.

7.21. Use of objectives exhibiting spherical aberration and frequency distortion The present variant consists in using objectives complying only with the properties (1) and (2) discussed in 7.20., namely:

(1)—Spherical aberration affecting the image formed in the image plane of the objective must remain less than a fraction of the diameter of this image.

(2)—The image, in the rear focal plane, of a beam which is parallel in the observed object must be a point image.

Such an objective may be formed in the same manner as previously, but it can then be used under broader conditions, for example with a higher number of pixels $N_{pix}$. It can also be formed more simply than in the preceding case.

The fact that we have obviated the property (3) facilitates further the construction of the objective. By contrast, the compensation for aberrations induced through non-compliance with property (3) leads to an additional complexity of the algorithms. Non-compliance with the property (3) is such that the coefficient of proportionality between the coordinates in pixels and the horizontal components of the spatial frequency is not constant. The coordinates i and j in pixels of the points obtained on the CCD sensor must be multiplied by a coefficient A(r) depending on the distance in pixels r between the considered point and the optical center. The method used thus differs from the one described in 7.20. in the following aspects:

a specific procedure is used to determine A(r).

the plane frequency image which was obtained directly from intensities received at each point of the CCD sensor CCD must be modified to be utilizable, in each step of the procedure in which it is used.

7.21.1. Calculation of A(r).

To determine the coefficient A(r) an objective micrometer is used as the object. The point of direct impact of the illuminating beam must match strictly with the optical center. As shown in FIG. 91, the image obtained on the CCD sensor in the absence of a reference wave consists of a central point $P_0$ coinciding with the optical center and a series of aligned points of intensity lower than $P_0$. We denote as $P_n$ those points which are on a given half-line originating at $P_0$, the maximum value of the index n being denoted N. We denote as $D_n$ the distance in pixels between the point $P_n$ and the optical center. We then have:

$$A\left(\frac{D_n + D_{n+1}}{2}\right) = \frac{N}{D_N}(D_{n+1} - D_n).$$

This equation gives the values of A at a limited number of points and an oversampling method must be used to obtain the value of A at a sufficient number of points.

7.21.2. Modification of Plane frequency images obtained

We denote as $S_{brut}[i, j]$ the array representing a plane frequency image obtained for example as indicated in 7.5. $S_{brut}[i, j]$ must be modified to generate an array $S_{fin}[i, j]$ which will really correspond to the plane frequency image. This modification may be carried out as follows:

Generation of an array S1, of dimensions $N_{sur} \times N_{sur}$ with, for example, $N_{sur}$=2048. This array is initialized to 0 and then the program carries out, for i and j ranging from 0 to $N_{pix}-1$:

$$S1\left[A\left(i\frac{N_{sur}}{N_{pix}}\right), A\left(j\frac{N_{sur}}{N_{pix}}\right)\right] = S_{brut}[i, j]$$

Inverse Fourier transformation of array S1 leading to array S2.

Extraction of the middle part of the array S2 to obtain an array S3 with dimensions of $N_{pix} \times N_{pix}$. The program carries out, for i and j ranging from 0 to $N_{pix}-1$:

$$S3[i, j] = S2\left[i - \frac{N_{pix}}{2} + \frac{N_{sur}}{2}, j - \frac{N_{pix}}{2} + \frac{N_{sur}}{2}\right]$$

Fourier transformation of array S3. The array thus obtained is the array $S_{fin}[i, j]$ which constitutes the plane frequency image to be used in all the operations.

All the raw plane frequency images obtained in each step of the three-dimensional adjustment and calculation procedure must be modified in this manner before being incorporated in the calculations.

8. FOURTH (PREFERRED) EMBODIMENT

This embodiment is considered to be the best because, in the visible domain, it is the one that yields the best performance in terms of speed and image quality.

8.1. Principles

The fourth embodiment differs from the third:

in the use of a different beam deflection device.

in the introduction of an additional device allowing the elimination of the direct wave reaching the CCDs to prevent or limit the saturation effect.

in the fact that sampling is "regular", i.e. the point image of an illuminating beam on the CCD coincides with the center of a pixel of the CCD.

Beam deflection and direct wave suppression devices are based on the use of a spatial modulator (SLM: spatial light modulator) marketed by the company Displaytech. This modulator consists of a matrix of 256×256 elements each functioning as an independent polarization rotator. It operates in reflection, i.e. the light incident on the SLM is reflected with a modified polarization, said polarization modification being different at each point of the matrix. There are two versions: one intended for amplitude modulation, in which, for one of the control voltages, the neutral axis of the ferroelectric liquid crystal (FLC: ferroelectric liquid crystal) is oriented in the direction defined by one of the axes of the matrix, and another intended for phase modulation, in which the two possible positions of the neutral axis of the FLC are symmetrical in relation to one of the axes of the matrix.

Obtaining regular sampling and good control of the beam path also requires appropriate use of lenses.

8.1.1. Beam path control

When a plane beam not directed along the optical axis moves away from its origin, it moves away from the optical axis and can become non-utilizable. FIG. 67 illustrates a method making it possible to control the position of such a beam in relation to the optical axis. A parallel beam (4800) coming from a plane (4801) must be used in a plane (4804) distant from (4801). If it propagates in a straight line, it moves away from the optical axis and becomes non-utilizable (4805).

The lenses (4802) and (4803) have the same focal length f The plane (4801) is the front focal plane of (4802). (4804) is the rear focal plane of (4803). The front focal plane of (4803) coincides with the rear focal plane of (4802) and is represented by broken lines (4806).

In the plane (4801), the beam (4800) is parallel and centered on the optical axis, i.e. its intersection with this plane forms a disc centered on the optical axis. Such a plane will be called <<spatial plane>> and will be denoted by the letter E.

In the plane (4806) the beam is punctual, i.e. its intersection with the plane is practically reduced to a point. Such a plane will be called <<frequency plane>> and will be denoted by the letter F.

In the plane (4804), the beam is again centered and parallel. This plane is thus a new spatial plane. It is the image of the plane (4801) through the optical system consisting of lenses (4802) and (4803).

The device makes it possible to reform in the plane (4804) a beam equivalent to the one present in the plane (4801), but symmetrized in relation to the optical axis.

By modifying the focal length of the second lens as in FIG. 68, it is possible to modify the angle of the beam in relation to the optical axis and its section. The focal length of the first lens is $f_1$, that of the second lens is $f_2$, and the distance between the two lenses is $f_1+f_2$. The angle of the beam in relation to the optical axis is multiplied by $f_1/f_2$ and the section of the beam is multiplied by $f_2/f_1$.

8.1.2. Beam deflection device

A direction at the exit of the deflection device is equivalent to a given spatial frequency and the terms "frequency" or "angle" will be used hereafter to define a deflection.

The beam deflection device uses a phase SLM whose entire surface is illuminated by a plane beam. When a phase profile (4601) of square-wave form as shown in FIG. 64 is applied to such a surface, the long-distance diffracted intensity is at its maximum for angles α and -α in which α is such that $$h = \frac{\lambda}{2}$$

or d sin α=λ/2. These two angles define two symmetrical diffracted beams (4602) and (4603) coming from the SLM. The number of pixels of the SLM used being $N_s$ and the step (distance between two pixels) $p_s$, sin α varies from 0 to $$\frac{\lambda}{2p_s}$$

in steps of $$\frac{\lambda}{N_s p_s}$$

or a total of $$\frac{N_s}{2}$$

possible values excluding zero. This principle is applied to generate a beam of given direction. This simple device is however not sufficient for the following reasons:

An attempt is made to generate a single frequency and it is thus necessary to then eliminate one of the two beams generated, for example (4602)

The beam coming from this simple modulation system is noisy, because, in addition to the frequency corresponding to the maximum illumination, many spurious frequencies are present.

To eliminate the spurious frequencies and the symmetrical beam, use is made of a system whose schematic diagram is shown in FIG. 65. In this diagram, the SLMs have been shown as if they functioned by transmission, and the polarizers associated with these SLMs have not been represented. A plane beam (4611) incident on a phase SLM (4612) functioning as indicated above is diffracted in two directions represented in solid lines and in broken lines. (4612) is in the front focal plane of a lens (4613). In the rear focal plane of (4613), a beam of a given angle at the exit of (4612) gives a point image. The front focal plane of the lens (4612) is a spatial plane, and the rear focal plane of (4612) is a frequency plane. In the frequency plane is placed:

a diaphragm (4615) whose functionality is to stop the symmetrical beam (broken line).

an SLM (4614) whose functionality is to suppress the spurious frequencies. When the SLM (4612) is controlled to generate a given frequency, this frequency corresponds to a point of the SLM (4614). This point is controlled to allow the beam to pass, and the other points of the SLM (4614) are controlled to stop the beam. Spurious frequencies are thus eliminated.

A second lens (4616) then transforms again the point obtained in the frequency plane in a corresponding direction at the exit of the device.

8.1.3. Direct wave elimination device

The wave having traversed the objected and reaching the CCD exhibits frequencies of high intensity around the point of direct impact of the beam. In the preceding embodiment, this led to a saturation of the CCD when a low beam attenuation was used.

To eliminate or attenuate this saturation effect, a device is used whose principle is indicated in FIG. 66, in which the SLM is represented as if it functioned in transmission, and in which the polarizer associated with the SLM has not been represented.

The wave coming from the object and having traversed the objective is filtered in an image plane by the diaphragm (4700). A lens (4703) makes it possible to form, in its rear focal plane, which constitutes a frequency plane, a frequency image of this wave. In the preceding embodiment, a CCD was placed directly in this frequency plane. In the present embodiment, an SLM (4704) is placed there. The direct beam (4702), not deflected by the sample, is represented by a broken line. Its image on the SLM is a point image. By darkening the corresponding pixel, and possibly some near pixels, this point of intense illumination is eliminated. The other pixels of the SLM are left in the passing position, thus enabling a ray (4701) of another frequency to pass through the SLM.

However, the SLM is not a "perfect" system in that, in the zone in which it is left transparent, it in fact constitutes a "grid", each pixel being passing but a certain darkened space being left between two pixels. This grid diffracts the rays passing through it, generating undesirable diffracted rays which are superimposed on the useful beam. The broken line (4710) shows a possible direction of this beam at the exit of the SLM (4704). A lens (4705) makes it possible, from the beam having traversed (4704), to reform a spatial plane identical to the one in which is placed (4700). In this spatial plane, undesirable rays diffracted by (4704) are outside the image of the diaphragm (4700). A diaphragm (4706) placed in a spatial plane and whose aperture coincides with the image of the aperture of the diaphragm (4700) thus enables these diffracted rays to be eliminated.

A last lens (4708) is used to reform a frequency plane in which is placed the CCD (4709).

8.1.4. Obtaining a regular sampling

In the third embodiment, the values of ni,nj,nk obtained after Operation 1 of Step 3 of the imaging procedure described in 7.17.2 are not integers. As integers are necessary in the rest of the algorithm, the nearest integer is taken for each of these values. Nevertheless, this constitutes an approximation which can result in disturbances on the three-dimensional image generated. In the present embodiment, the optical system is designed so that said values of ni and nj are practically integers, i.e. so that there is regular sampling along the axes ni and nj. The sampling along nk remains non-regular; nevertheless, this method reduces disturbances significantly.

A given illuminating wave produced by the beam deflection system produces, on the one hand, a direct beam striking one of the sensors and, on the other, an opposite indicator beam striking the other sensor. Conversely, a given pixel of a sensor may be reached by a direct beam produced by an illuminating wave or by an opposite indicator beam produced by another illuminating wave.

For regular sampling, each illuminating wave used must produce a direct beam and an opposite beam each reaching the center of a corresponding pixel of the corresponding CCD, the coordinates of the pixel reached by the direct beam on a CCD being the same as those of the pixel reached by the opposite indicator beam on the other CCD. To each pixel of the CCD located in the zone delimited by the aperture of the objectives must correspond two illuminating beams for which the pixel is reached respectively by the direct beam and the opposite indicator beam.

The frequency representation obtained on the CCD can be transformed in various ways owing to the lack of precision in the characteristics of the system:

By translation. This translation may be compensated by corresponding displacement of mirrors.

By homothetic transformation. A variation in the focal length of the lens forming the image on the CCD results in a homothetic transformation on this image.

By rotation. Part of the system comprising the two objectives, consisting of the assembly (4460) of FIG. 62, shown in detail in FIG. 63, if it is not perfectly constructed, will result in the rotation of the image produced on the CCD.

Homothetic transformation applied to the image produced on the CCD invalidates the exact correspondence between a pixel of the CCD, which is fixed, and the points of impact of the direct or opposite beam, which are modified by homothetic transformation. To prevent such a transformation, it is necessary to control accurately the focal length of the lens forming the image. An appropriate system allows the adjustment of this focal length.

The rotation produced by (4460) is applied only to the direct beam. It can be compensated by a corresponding rotation of the CCD. However, this operation offsets the pixels of the CCD in relation to the points of impact of the opposite beam. It is thus necessary to produce a corresponding rotation of the opposite indicator beam to cancel this deviation. An appropriate system allows this rotation.

8.1.4.1. Focal length adjustment

To obtain an optical element whose focal length is adjusted with precision around a central value $f_c$, we associate two lenses of focal length f separated by a distance d. The focal length of the assembly is then $$f_c = \frac{f}{2}\left(\frac{1}{1-\frac{d}{2f}}\right)$$

If we wish to adjust $f_c$ over a width of +−1%, or r=0.01, then it is necessary to have $$\frac{d}{2f} = r$$

with roughly $f_c$=f/2. The value of d adopted is thus: d=4$f_c$r

The value of f is then f=$f_c$+√($f_c$($f_c$−d))

An assembly of focal length $f_c$ adjustable to +−r is thus made up of two lenses of focal length f separated by a distance d with:

d=4$f_c$r f=$f_c$+√($f_c$($f_c$−d))

The focal length of the assembly is adjusted by varying the distance d.

Such doublets are used at various points of the device for similar reasons.

8.1.4.2. Rotation adjustment

To adjust in rotation an illuminating beam, one uses a device described in FIG. 69 inserted on the path of the illuminating beam in a zone in which this beam is parallel and hence defined by its wave vector. This device is made up of an assembly of mirrors (4901) to (4906). The mirrors (4901) (4902) are fixed. The mirrors (4903) (4904) (4905) (4906) are integral with each other and the assembly (4910) consisting of these mirrors is mobile in rotation around an axis (4909). The arrows in the plane of the figure represent the wave vectors of the beam at each point of the device.

The transformation of a wave vector by a mirror comprises a vectorial symmetrization in relation to an axis orthogonal to the plane of the mirror and a reversal of the direction of the vector. As the number of mirrors is even, the reversals cancel each other and we are interested here in the symmetrization part. The pair of mirrors (4901) (4902) produce two successive symmetrizations with axes orthogonal to each other, which is equivalent to a single symmetry of axis (4907). Likewise, the pair of mirrors (4903) (4904) produces a symmetry of axis (4908). The mirrors (4905) (4906) produce two vectorial symmetries with the same axis, which cancel each other out. The operation carried out by the entire device is thus the composite of a vectorial symmetry of axis (4907) and a vectorial symmetry of axis (4908). FIG. 70 represents, seen from A, the axes (4907) and (4908). When no rotation of (4910) is produced, these axes coincide and the composite of the two symmetries is the identity. The wave vector of the beam is not modified by the device.

When a rotation of angle a is applied to the assembly (4910), the two axes are offset by an angle $\alpha$ as indicated in FIG. 70. The composition of the two symmetries is then a vectorial rotation of angle $2\alpha$.

The system thus makes it possible to apply to an illuminating wave a vectorial rotation compensating that due to the assembly (4460).

8.2. Material description

A general diagram of the system is shown in FIGS. 61, 62, 63. In these figures, the elements directly equivalent to corresponding elements of FIGS. 27 and 28 are numbered using the number of the corresponding element of FIGS. 27 and 28 and replacing the first two digits by 43. For example, 2204 gives 4304. The elements not having direct equivalents in FIGS. 27 and 28 have numbers beginning with 44. The plane of FIGS. 61 and 62 is a horizontal plane, the figures constituting a top view. The elements of the system are fixed on an optical table suitably insulated from vibrations. FIG. 63 represents, in several views, the part of the microscope containing the objectives, which constitutes a three-dimensional structure.

A laser (4300) polarized in the vertical direction generates a beam whose electric field vector is thus directed along an axis orthogonal to the plane of the figure. This beam passes through a beam expander (4301). The beam coming from the expander is then divided into a reference beam and an illuminating beam by a semi-transparent mirror (4302).

The illuminating beam passes through a diaphragm (4348), a filter (4303) allowing its intensity adjustment, then a phase shift device (4304) and a beam attenuation device (4305).

It then passes through a lens (4401). This lens focuses the beam in a plane in which there is a pinhole (4402) sufficiently large so as not to disturb the beam, which is designed to stop in part the reflected beam returning in the opposite direction to the laser. The beam is then reflected on to one side of a double mirror (4403). The two reflecting sides of (4403) form a right angle. The beam then passes through a lens (4404) whose front focal plane coincides with the rear focal plane of (4401), and is then directed to a phase SLM (4405). The phase SLM (4405) is placed at the rear focal point (4404). The beam reflected by (4405) passes again through (4404) and is reflected by the second side of the double mirror (4403). The beam then passes through a diaphragm (4406) placed at the rear focal point (4404) for the beam reflected by (4405), which will be called second rear focal point of (4404). It then passes through a lens (4407) whose front focal point coincides with the rear focal point of (4404). The beam then passes through a polarizer (4408). It is then reflected on to a mirror (4409) placed slightly behind the rear focal plane of (4407). It then passes through a lens doublet (4411)(4410) of the type described in 8.1.4.1. The front focal plane of this doublet coincides with the rear focal plane of (4407). The amplitude SLM (4412) is placed in the rear focal plane of this doublet. The beam having passed through this doublet is directed towards (4412) which reflects it. It then passes again through the doublet, through a polarizer (4413) and a diaphragm (4414) placed in the second rear focal plane of the doublet (4410) (4411). It then passes through a doubled formed by (4415) and (4416). The front focal plane of doublet (4415)(4416) coincides with the rear focal plane of the doublet (4410) (4411). It is then directed to the amplitude SLM (4417) which reflects it. It passes again through the doublet (4415) (4416). It is reflected by a mirror (4418), passes through a diaphragm (4419) placed at the second rear focal point of the doublet (4415)(4416), then through a polarizer (4420) and a lens (4421) whose front focal plane coincides with the second rear focal plane of the doublet (4415)(4416). It then reaches a semi-reflecting mirror (4307) which separates it into a right illuminating beam FED and a left illuminating beam FEG.

The beam FEG is then reflected by a mirror (4432) and passes through a lens doublet (4433)(4434) which can, depending on dimensional conditions, be located before or after the mirror (4432). The front focal plane of the doublet (4433)(4434) coincides with the rear focal plane of (4421). The beam is then reflected by a mirror (4435) and then by an assembly (4436) equivalent to the assembly (4910) of FIG. 69, mobile around an axis (4450) and made up of mirrors (4446)(4447)(4448)(4449). The beam then passes through a beam extinguisher (4437). This beam extinguisher is designed like the beam attenuator described in 7.2.2. but with a zero angle θ. The beam then passes through a polarization rotator (4341) and is split by the semi-transparent mirror (4325) into a main illuminating beam directed towards (4324), which will again be denoted FEG, and an opposite indicator beam directed towards (4342), which will be denoted FEGI. The doublet (4433)(4434) thus has two rear focal planes, one in the direction of the main beam and the other in the direction of the opposite indicator beam.

The lens (4324) is placed ahead of the rear focal plane of the doublet (4433)(4434) so that the rear focal plane of this doublet in the direction of the main beam remains virtual. The lens (4324) forms an image of this focal plane, and this image must be in the plane of the diaphragm (4323).

The rear focal plane of this doublet in the direction of the beam FEGI coincides with the front focal plane of a lens (4342). The beam FEGI passes through this lens which focuses it on a mirror (4343) which may optionally be blocked by a shutter (4359). The beam reflected by this mirror passes through lens (4342) again and is again reflected by (4325). The beam FEGI then passes through a polarization rotator (4326), and then a polarizer (4438). It is then reflected by one side of the double mirror (4439). It then passes through the doublet (4440)(4441) and is directed towards the amplitude SLM (4442). The front focal plane of the doublet (4440)(4441) must coincide with the rear focal plane of the doublet (4433)(4434). The amplitude SLM (4442) is placed in the rear focal plane of the doublet (4440)(4441). The beam reflected by the SLM (4442) passes again through the doublet (4440)(4441), is reflected by the second side of (4439), and is directed towards a diaphragm (4443) placed in the second rear focal plane of the doublet (4440)(4441). The beam passes through (4443), then a doublet (4444)(4445), a polarizer (4353), and reaches the CCD (4329) mounted on the camera (4330). The front focal plane of (4444)(4445) coincides with the second rear focal plane of the doublet (4440)(4441). The CCD (4329) is placed in the rear focal plane of (4444)(4445).

The beam FEG passes through the lens (4324) and the diaphragm (4323). It is then reflected successively by the mirrors (4322)(4451)(4452)(4453). It passes through the objective (4319), then the sample (4318), and the objective (4317). It is then reflected successively by the mirrors (4454)(4455)(4456)(43 14) and reaches the diaphragm (4313). The diaphragm (4323) must be placed in the plane in which the objective (4319) normally forms the image of the sample, i.e. 160 mm from the shoulder of the objective for a standard objective. The diaphragm (4313) must be placed in the plane in which the objective (4317) normally forms the image of the sample.

The beam FEG then passes through the lens (4312) which is placed such that, if a transparent plate is used (absence of disturbances by the object), and at the exit of this lens, the beam is parallel. The beam then passes through the polarization rotator (4338), the polarizer (4423), is reflected on one side of (4424), passes through the doublet (4425)(4426), is reflected on the amplitude SLM (4427), passes again through the doublet (4425)(4426), is reflected on the second side of (4424), passes through the diaphragm (4428), the doublet (4429)(4430), the polarizer (4352), and reaches the CCD (4339) mounted on the camera (4384). The image of diaphragm (4313) through the lens (4312) coincides with the front focal plane of the doublet (4425)(4426). The SLM (4427) is in the rear focal plane of the doublet (4425)(4426). The diaphragm (4428) is in the second rear focal plane of the doublet (4425)(4426). The front focal plane of the doublet (4430)(4429) coincides with the second rear focal plane of the doublet (4425)(4426). The CCD (4339) is placed in the rear focal plane of the doublet (4430)(4429).

The right illuminating beam FED passes through a lens (4431) and is reflected by a mirror (4308). Depending on dimensional conditions, the position of the lens and of the mirror may be reversed. The beam FED then passes through the beam extinguisher (4422) identical to (4437), then the polarization rotator (4310). It is split by a semi-transparent mirror (4311) into a main illuminating beam which again will be denoted FED and an opposite indicator beam which will be denoted FEDI.

The beam FEDI then passes through the lens (4331), is reflected by the mirror (4332), passes again through (4331), is reflected in the direction of (4338) by the semi-transparent mirror (4311). (4332) can optionally be blocked by a shutter (4358). (4332) is in a focal plane of (4331), and the other focal plane of (4331) coincides with the image of (4313) through (4312). The beam FEDI then follows between (4311) and (4339) a path symmetrical with the one followed by beam FEGI between (4325) and (4329).

The main illuminating beam FED follows between (4311) and (4329) a path symmetrical with the one followed by the main illuminating beam FEG between (4325) and (4339).

The reference beam, separated from the illuminating beam by the partially transparent mirror (4302), is split into a right reference beam FRD and a left reference beam FRG by the semi-transparent mirror (4335).

The right reference beam FRD is then reflected by the mirror (4344), and then passes through the filter (4356) and the diaphragm (4349). It is then split by the semi-transparent mirror (4345) into a reference beau directed towards the CCD (4339), which will again be denoted FERD, and an opposite indicator beam which will be denoted FRDI. The beam FRDI passes through the lens (4346), is focussed on the mirror (4347) which reflects it, passes again through the lens (4346) and is partially reflected in the direction of (4430). The shutter (4357) optionally allows this opposite indicator beam to be eliminated.

The left reference beam FRG is reflected by the mirrors (4354)(4336) and then passes through a filter (4355), a phase shift device (4351), and a diaphragm (4350). It is then split by the semi-transparent mirror (4328) into a reference beam directed towards (4329), which will again be denoted FRG, and an opposite indicator beam which will be denoted FRGI. The beam FRGI passes through the lens (4381), is focussed on the mirror (4382) which reflects it, again passes through (4381) in the opposite direction, and is partially reflected by (4328). The shutter (4360) optionally enables this opposite indicator beam to be eliminated.

To help in the understanding of the diagram, the illuminating beam has been represented with a solid line. It passes alternately through the frequency planes and the spatial planes, in the sense defined in 8.1.1. In a frequency plane, the beam is concentrated at a point. In a spatial plane, it is parallel and "centered", in that it illuminates a circular zone symmetrical in relation to the optical axis, not depending on its direction. The letter (E) added to the number of an element means that this element is in a spatial plane. In the absence of an optical element, the letter (E) alone can also designate a spatial plane. Similarly, the letter (F) designates a frequency plane. A letter (E) has been placed on the diaphragm (4313), even though this diaphragm is not exactly a spatial plane: it is the image of this diaphragm through the lens (4312) which is a virtual spatial plane and which must be understood as being designated by the letter E. Likewise, the diaphragm (4323) does not correspond exactly to a spatial plane.

On the other hand, the reference beam has been represented with a broken line. The reference beam is concentrated at a point in the spatial planes. It is parallel and centered in the frequency planes.

The spatial and frequency planes alternate on the path of the beam. A spatial plane and a frequency plane in succession are always separated by a lens or a doublet. Their succession follows the logic described in 8.1. A spatial plane and a frequency plane separated by a lens (or a doublet) always occupy two focal planes of this lens (or of this doublet).

The beam deflection device whose principle was described in 8.1.2. is made of elements corresponding to those of FIG. 65. The SLMs (4612) and (4614) are materialized respectively by the SLMs (4405) and (4412). The diaphragm (4615) is materialized by (4406). The device was adapted to take into account the fact that the SLMs work in reflection, to include the polarizers, and to position the diaphragm (4406) in a plane different from the SLM (4412). The SLM (4417) was added for additional filtering of the illuminating wave, thereby improving the elimination of spurious frequencies.

The direct wave elimination device described in 8.1.3. is used by the elements corresponding to those of FIG. 66. The SLM (4704) corresponds to the SLM (4427). The diaphragms (4700) and (4706) correspond respectively to (4313) and (4428). The CCD (4709) corresponds to (4339). The lens (4703) corresponds to the doublet (4425)(4426). The lens (4705) corresponds to the same double traversed in the opposite direction. The lens (4708) corresponds to the doublet (4430)(4429). Symmetrical correspondences are valid for the symmetrical part of the microscope.

The doublets used allow the application of the principle described in 8.1.4.1. They consist of two lenses which may be moved jointly, one of these lenses also being movable in relation to the other.

The system formed by (4436) applies the principle described in 8.1.4.2.

On each polarizer, the passing axis is indicated by a line, representing an axis in the plane of the=figure, or a circle, representing an axis in a plane orthogonal to the plane of the figure.

On each SLM, a coordinate system is represented which constitutes the one in which the coordinates of the pixels are evaluated. On each amplitude SLM has also been represented the position of the neutral axis which corresponds to beam extinction, with the same convention as for the passing axis of the polarizers. The other possible position of the neutral axis is obtained from the extinction position by a rotation of about 40 degrees in one direction or the other. On the phase SLM (4405) the two positions of the neutral axis are symmetrical in relation to the vertical axis.

On the polarization rotators has been indicated a coordinate system. A position of the neutral axis, corresponding to an applied voltage of −5V, is the horizontal axis of the coordinate system. In the other position, the neutral axis is directed approximately along a vector having equal coordinates on the two axes. the polarizers (4408)(4413)(4420) may be Glan-Thomson prisms, which offer the advantage of low absorption. They however entail too much spherical aberration to be used on the path of the wave coming from the object. The polarizers (4423) (4352) (4438) (4353) are preferably dichroic polarizers consisting of a dichroic film maintained between two sufficiently thin glass plates.

The objectives used may be conventional objectives or the objectives described in Paragraphs 7.19 to 7.21. The <<preferred embodiment>> consists in using objectives of the type described in 7.20., which will allow the improvement of the working distance and/or the aperture.

A set of lenses used in the system are achromats or composite lenses minimizing spherical aberration.

Most of the elements are mounted on positioners allowing precise adjustment of their position. The characteristics of these positioners will be indicated in 8.5. along with the adjustment procedure. The sample, whose positioning characteristics are not explained in 8.5., is mounted on a three-axis translation positioner.

8.3. Dimensioning

To dimension the system, the focal distance of each lens and the aperture of each diaphragm must be indicated. For the doublets, the focal length of the doublet will be indicated.

$f_i$ designates the focal length of the lens (or doublet) number i, the lenses being numbered as follows:

| Index i | Lens number in the diagram or, in parentheses, number of the two lens forming a doublet |
|---|---|
| 1 | 4401 |
| 2 | 4404 |
| 3 | 4407 |
| 4 | (4410,4411) |
| 5 | (4415,4416) |
| 6 | 4421 |
| 7 | 4431 or (4433,4434) |
| 8 | (4425,4426) or (4440,4441) |
| 9 | (4430,4429) or (4444,4445) |
| 10 | 4312 or 4324 |
| 11 | 4331 or 4342 |
| 12 | 4346 or 4381 |

$l_i$ designates the width of diaphragm number i, the diaphragms being numbered as follows:

| Index i | Diaphragm number in diagram |
|---|---|
| 0 | 4349 or 4350 |
| 1 | 4348 |
| 2 | 4406 |
| 3 | 4414 |
| 4 | 4419 |
| 5 | 4313 or 4323 |
| 6 | 4428 or 4443 |

In addition, the following notations are adopted:

$p_c$ distance between centers of two adjacent pixels, on the CCD sensors $p_s$ distance between centers of two adjacent pixels, on the phase SLM $p_f$ distance between centers of two adjacent pixels, on the amplitude SLM $N_{pix}$ number of pixels on a CCD sensor or on an amplitude SLM (these numbers are equal).

$N_s$ number of pixels on the phase SLM. Ideally we should have $N_s=2N_{pix}$ but the SLMs are not available in all sizes and we can do with $N_s=N_{pix}$ by applying an additional attenuation of the illuminating beam.

o: numerical aperture of a microscope objective g: magnification of a microscope objective $f_o$: focal length of a microscope objective.

$d_o$: distance between lens (4312) and diaphragm (4313).

The width of the reference beam must be at least: $l_0=p_cN_{pix}$

The illumination width on (4405) is:

$$p_sN_s = \frac{f_2}{f_1}l_1,$$

whence we can write:

$$\frac{f_2}{f_1} = \frac{p_sN_s}{l_1}$$

To avoid unnecessary loss of power, it is preferable to have $l_0=l_1$ and hence $$\frac{f_2}{f_1} = \frac{p_sN_s}{p_cN_{pix}}$$

The width of the diaphragm (4406), which allows the passage of half the frequencies coming from the SLM (4405) under an angle $\alpha_{max}$ is: $l_2=f_2 \sin \alpha_{max}$ or, with the value of $\sin \alpha_{max}$ which results from 8.1.2., $$l_2 = f_2 \frac{\lambda}{2p_s}$$

The useful part of the SLM (4412) must be the image of the diaphragm (4406), which means that:

$$\frac{f_4}{f_3}l_2 = p_fN_{pix}$$

Based on the two preceding equations we obtain:

$$\frac{f_4}{f_3}f_2 = \frac{2p_s}{\lambda}p_f N_{pix}$$

The wave coming from (4412) exhibits a maximum angle $$\sin\beta_{max} = \frac{\lambda}{2p_f}.$$

The diaphragm (4414) must allow the passage of all these waves and consequently checks:

$$l_3 = 2\sin\beta_{max} f_4 \text{ or } l_3 = \frac{\lambda}{p_f}f_4.$$

The width of the diaphragm (4419) is equal to that of the diaphragm (4413), i.e. $l_4 = l_3$ Its width is transformed into the width of the object diaphragm (4312) by:

$$l_5 = \frac{f_7}{f_6}l_3$$

The width of the object diaphragm (4312) is equal to:

$$l_5 = \frac{\lambda}{2}\frac{g}{o}N_{pix}$$

From the preceding equations we can write:

$$f_4\frac{f_7}{f_6} = \frac{1}{2}\frac{g}{o}p_f N_{pix}$$

The size of the image on the SLM (4427) must be the same as on the SLM (4417), hence:

$$\frac{f_6}{f_5}\frac{f_8}{f_7} = 1$$

The image size on the camera is related to that on the SLM (4427) by:

$$p_c N_{pix} = \frac{f_9}{f_8}p_f N_{pix} \text{ or: } \frac{f_9}{f_8} = \frac{p_c}{p_f}$$

The SLMs (4412) and (4417) having the same characteristics, we have: $f_4 = f_5$ The lens (4312) must have an front focal plane coinciding with the rear focal plane of the microscope objective, and is at a distance $d_o$ from the image of the objective. We check that this results in:

$$f_{10} = gf_o + d_o$$

The focal length of (4331) or of (4346) must be sufficient to prevent spherical aberration.

Any set of values complying with the above equations may in principle be suitable. A particularly simple solution consists in writing:

$$f = \frac{p_f N_{pix}}{2}\frac{g}{o}$$

and imposing:

$$f_2 = f_4 = f_5 = f_6 = f_7 = f_8 = f_{11} = f_{12} = f$$

One then easily obtains the other focal lengths:

$$f_3 = \frac{g}{o}\frac{\lambda}{4p_s}f$$

$$f_1 = \frac{p_c N_{pix}}{p_s N_s}f$$

$$f_9 = \frac{p_c}{p_f}f$$

$$f_{10} = gf_o + d_o$$

and the diaphragm apertures:

$$l_0 = l_5 = l_3 = l_4 = \frac{\lambda}{2}\frac{g}{o}N_{pix}$$

$$l_2 = f\frac{\lambda}{2p_s}$$

$$l_0 = l_1 = p_c N_{pix}$$

The width of the beam at the exit of the beam expander (4301) must be slightly greater than $l_0$, the limitation being provided later by the diaphragms.

8.4. Operating mode

The operating mode is essentially the same as in the third embodiment. It is thus described in Paragraphs 7.4. to 7.17. and by the variants described in 7.18. If objectives such as those described in 7.20 or 7.21 are used, the modifications described in these paragraphs must be applied. The <<preferred embodiment>> must be understood as using the algorithms described in Paragraphs 7.4. to 7.17. without the variants described in 7.8. However, certain solutions described in the variants offer specific advantages and the qualifier <<preferred embodiment>> must not be understood in too absolute a manner. A certain number of differences must however be taken into account in relation to the algorithms described in the third embodiment:

8.4.1. Beam deflection control

The state of SLM (4405) is given by a control array $A[k,l]$ in in which k and l vary from 0 to $N_s-1$, the element $A[k,l]$ corresponding to the pixel of coordinates k,l and having the value 0 for a negative phase pixel and the value 1 for a positive phase pixel. The state of the SLMs (4412) and (4417) is given by a control array $B[k,l]$ in which k and l vary from 0 to $N_{pix}-1$, the element $B[k,l]$ corresponding to the pixel of coordinates k,l and having the value 0 for an extinguished pixel and the value 1 for a lit pixel.

To obtain a frequency characterized by the indices (i,j):

we light the pixel of coordinates i,j on the SLMs (4412) and (4417), i.e. we use an array $B_{ij}$ where $B_{ij}[k,l]=0$ at every point except at i,j where we have $B_{ij}[i,j]=1$ we apply to the SLM (4405) an appropriate array $A_{ij}$, namely:

$$A_{ij}[k, l] = E\left(\left\{\frac{1}{N_{pix}}(k(i+1) + l(j+1))\right\}\%2\right)$$

in which E designates the rounding to the nearest integer and %2 means modulo 2.

The "control word" used in the third embodiment thus consists here of the concatenation of the control arrays of the SLMs (4405)(4412)(4417) and the control bits of the phase rotators of (4422) and (4437). As previously, the directly illuminated sensor is designated by the index p with p=0 for (4339) and p=1 for (4329). For the control of the phase rotators included in the beam extinguishers (4422) and (4437), a zero control bit corresponds to an applied voltage of 5V (open position) and a control bit at 1 corresponds to an applied voltage of −5V (closed position).

| Control word COM[p, i, j] | Control array of SLM (4405) | $A_{ij}[k, l] = E\left(\left\{\frac{1}{N_{pix}}(k(i+1) + l(j+1))\right\}\%2\right)$ |
|---|---|---|
| | Control array of SLM (4412) | $B_{ij}[i, j] = 1$<br>$B_{ij}[k, l] = 0$ if $(k, l) \neq (i, j)$ |
| | Control array of SLM (4417) | $B_{ij}[i, j] = 1$<br>$B_{ij}[k, l] = 0$ if $(k, l) \neq (i, j)$ |
| | Control bits of rotators of (4422) | p, p |
| | Control bits of rotators of (4437) | p, p |

The control word thus formed is substituted in all the procedures of 7.4. to 7.17. for the one which was formed as indicated in 7.2.4.

8.4.2. Use of the direct wave elimination system

The SLMs (4427) and (4442) are respectively associated with the sensors (4339) and (4329) and indexed by the same indices p=0 and p=1. In the procedure described in 7.12.2.1., Phase 1, during the acquisition of a pair of elementary images, it is necessary to also control these SLMs. The value of an element C[k,l] of the control array used for such an SLM depends on the index of the SLM, the indices c and p of the image being acquired, and the indices i and j corresponding to the point of the sensor illuminated directly by the illuminating beam, or i=Ia[q,p,Ic[k,p],Jc[k,p]],j=Ja[q,p,Ic[k,p],Jc[k,p]]. It is given by the following table in which r designates an "extinction radius" which may be taken equal to 2 for example.

| Index c | 2 | | Other (non-maximum attenuation) | |
|---|---|---|---|---|
| Index of SLM | | $\bar{p}$ | | p |
| Indices k, l | | | $(k - i)^2 + (l - j)^2 > r^2$ | $(k - i)^2 + (l - j)^2 \leq r^2$ |
| Value of element of array C[k, l] | 1 | 1 | 1 | 0 |

8.4.3. Use of regular sampling
8.4.3.1. Modification of procedure 7.9.2.

The coordinates of the illuminating beams are known in advance and are:

$$Ia[q,p,i,j]=i\bar{p}+(N_{pix}-i-1)p$$

$$Ja[q,p,i,j]=j$$

It is thus sufficient to determine the array Ra[p,i,j]

We use the arrays Io and Jo characterizing a path going through all the accessible points, i.e. (Io[k], Jo[k]) must go through all the values such that $$\left(Io[k] - \frac{N_{pix}}{2}\right)^2 + \left(Jo[k] - \frac{N_{pix}}{2}\right)^2 \leq R_{ouv}^2$$

where $R_{ouv}$ is the radius of the disc limited by the aperture of the objective on a sensor, and corresponds for example to the radius of the illuminated zone on (4339) when the beam FRGI is used alone. This path will be called "complete path" hereafter.

A program performs the acquisition defined by these arrays according to the procedure described in 7.12. As the index $n_o$ is not known, it is taken equal to $n_v$ in the procedure 7.12. However, during this acquisition, it is sufficient to record the values $M_{k,p,q}[Io[k], Jo[k]]$ and $H_{k,p,q}[i_r,j_r]$.

The program initializes to 0 the array Ra and then goes through the series of indices k,p performing, for each pair k,p:

$$Ra[p, Io[k], Jo[k]] = \frac{M_{k,p,0}[Io[k], Jo[k]]}{H_{k,p,0}[i_r, j_r]} \exp$$

$$\left(-j\frac{2\pi}{\lambda}n_v\left(x\frac{Io[k]}{K} + y\frac{Jo[k]}{K} + z\sqrt{1 - \frac{Io[k]^2 + Jo[k]^2}{K}}\right)\right)$$

where $i_r, j_r$ are the coordinates of the maximum of the reference image, as defined in 7.12. and where x,y,z are the coordinates determined in 7.9.1.

8.4.3.2. Modification of procedure 7.11.

The program carries out the series of acquisitions defined by the arrays Io and Jo defining a complete path, already used in 8.4.3.1., according to the procedure described in 7.12. It thus generates the series of images $M_{k,p,q}[i,j]$ and $H_{k,p,q}[i,j]$. However, during this acquisition, it is sufficient to record the value $M_{k,p,q}[Io[k], Jo[k]]$ and $H_{k,p,q}[i_r,j_r]$.

The program then goes through the series of indices k. For each value of k it carries out:

$$F_{rec}[Io[k], Jo[k]] = \frac{M_{k,0,0}[Io[k], Jo[k]]}{H_{k,0,0}[i_r, j_r]} \frac{1}{Ra[0, Io[k], Jo[k]]}$$

The program described in 7.8. is then used to calculate the parameters x,y,z,L, $n_0$ from the array $F_{rec}$ thus formed.

The procedure 7.11. thus reformulated may be used directly to calculate x,y,z,L,$n_0$ in the case of the uniaxial crystal described in 7.18.9., thereby obviating the need to perform preliminary measurements and making the movement of the objectives possible. In this case, the acquisition method for the series of images allowing the calculation of x,y,z,L,$n_0$ corresponds to the procedure described in 7.12 and modified as indicated in 7.18.9.

8.4.3.3. Modification of procedure 7.13.

In 7.13, one obtains directly without using the program of FIG. 53:

$Id[p,i,j] = i\bar{p} + (N_{pix} - i - 1)p$ $Jd[p,i,j] = j$ $Ic[k,p] = \bar{p}Io[k] + (N_{pix} - Io[k] - 1)p$ $Jc[k,p] = Jo[k]$ 8.4.3.4. Modification of procedure 7.6.

The values of the coefficients $K_1$, $K_2$ determined in 7.6. comply with: $K_1 = K_2$ 8.5. Adjustment The position of each element of the system must be adjusted precisely before any use.

8.5.1. Apparatus used

The apparatus already described in 7.3.3.2. are used.

8.5.2. Types of images used

During the adjustment, different types of images may be used:

images obtained on an auxiliary CCD: an auxiliary CCD placed for example in a spatial plane can allow the determination of the center of an illuminating beam in this plane, or the punctuality of a reference beam in this plane.

images obtained on one of the CCDs of the microscope: these images may be obtained and analyzed as indicated in 7.3.3.1. in the presence of a reference beam. It is also possible to observe directly the images received in the absence of a reference beam.

images obtained on the CCD of the frequency-meter: observed directly, they make it possible to check the flatness of a wave or the angle between two plane waves.

images of the surface of an SLM: by placing the frequency-meter behind the lens which transforms into a plane wave the wave coming from a given point of the SLM, one forms on the CCD of the frequency meter an image of the surface of the SLM, which can be used for example to check that the SLM is correctly illuminated. To display the figures formed by controlling the SLM, a polarizer must moreover be present between the SLM and the CCD of the frequency-meter. If it is not already present in the system, it is possible to use the polarizer of the frequency-meter.

pixel-by-pixel images of the surface of an SLM: such an image comprises an array of two dimensions containing the illumination of each pixel. To obtain it, the frequency-meter is placed as above in the presence of a polarizer. The entire SLM is placed in an absorbing position ("black" image). Then each pixel is illuminated one by one, recording each time the intensity of the corresponding point on the frequency-meter. The intensities thus measured for each pixel of the SLM are stored in an array, which forms the pixel-by-pixel image of the SLM. This type of image can be used for example to check the point-by-point correspondence between the various SLMs, necessary for obtaining correct illumination and regular sampling.

8.5.3. Adjustment criteria

The adjustments are designed to ensure that:

(1) the beams follow the planned path. This can be checked in general by means of a simple diffuser.

(2) the illuminating beams are parallel in the spatial planes. This is verified by means of the frequency-meter.

(3) the reference beams are punctual in the spatial planes and the illuminating beams are points in the frequency planes. This is verified for example by means of an auxiliary CCD.

(4) the polarizers are properly adjusted. Beam extinctions can be observed for example on the frequency-meter.

(5) a parallel beam entering the objective (4317) and directed along the optical axis has a point image centered on the sensor (4339).

(6) when the control word $A_{i,j}$ is used for the SLM (4405) and when the control word $B_{i,j}$ is used for the SLMs (4412) and (4417), the following conditions are complied with:

(i) the point of coordinates i,j must be actually illuminated on the SLMs (4412) and (4417)

(ii) when the beams FEG and FEGI are used, the points illuminated on the SLMs (4427) and (4442) and on the sensors (4339) and (4329) must have the coordinates (i,j)

(iii) when the beams FED and FEDI are used, the illuminated points on the SLMs (4427) and (4442) and on the sensors (4339) and (4329) must have the coordinates ($N_{pix}$−1−i,j)

This condition (6) can be checked by means of images obtained on the sensors or by means of pixel-by-pixel images obtained on the CCDs.

The adjustments to be carried out result from these conditions. The description of the adjustment steps is given by way of information and constitutes an example of adjustment step ordering.

8.5.4. Adjustment steps

In the description of the adjustment steps, reference will frequently be made to the optical axis. Owing to the many reflections, the optical axis can be defined only locally. It is thus this locally defined optical axis to which reference will be made.

Prior to any fine adjustment, the entire system is put in place with the greatest possible precision using geometrical methods, with the exception of the elements (4304) (4305) (4422) (4437) (4351) which will be put in place during adjustment.

Throughout the adjustment, the position of the neutral axis of the polarization rotators (4310) (4338) (4341) (4326) is kept in the plane of FIG. 62. A point will be said to be centered on one of the sensors (4339) or (4329) if its coordinates are $$\left( \frac{N_{pix}}{2}, \frac{N_{pix}}{2} \right).$$

During the first adjustment step for a given element, the type of positioner on which this element is mounted is indicated.

Step 1. Orientation Adjustment for the Laser (4300)-beam Expander (4301) Assembly This assembly is mounted on an angular positioner allowing the direction of the beam to be adjusted. A diffuser is used to check the path of the beam. The position of the assembly (4300,4301) is adjusted so that the beam follows the planned path.

Step 2. Setup of the Phase Shift Device (4304)

This phase shift device is identical to the one described in 7.2.3. and is put in place as indicated in 7.3.2.3.

Step 3. Setup of Beam Attenuation Device (4305)

This beam attenuation device is identical to the one described in 7.2.2. and is put in place as indicated in 7.3.2.2.

Step 4. Pinhole (4402) Two-axis Translation Adjustment

This pinhole is mounted a two-dimensional positioner allowing movement in the plane orthogonal to the optical axis.

It is adjusted so as to maximize the intensity of the beam having passed through the pinhole.

Step 5. Adjustment of Orientation of Two-sided Mirror (4403)

This mirror is mounted on an angular positioner allowing its orientation to be adjusted. A diffuser is used to check the path of the beam and the position of the mirror is adjusted so that the incident beam on the SLM (4405) occupies the entire useful surface of this SLM.

Step 6. SLM (4405) Orientation Adjustment

This SLM is mounted on an angular positioner allowing its orientation to be adjusted, coupled with a two-axis translation positioner allowing an adjustment of its position in a plane orthogonal to the optical axis.

The SLM is positioned to be totally reflecting. A diffuser is used to check that the wave reflected on the SLM reaches the planned point on the mirror (4403) and is directed in the planned direction.

Step 7. Fine Adjustment of Orientation of Two-sided Mirror (4403), Translation Adjustment of the SLM (4405), Adjustment of Aperture of Diaphragm (4348), and Adjustment of Lens (4404) in Translation The lens (4404) is mounted on a single-axis translation positioner allowing translation adjustment in the direction of the optical axis.

This step is designed to:

adjust the position of the lens (4404) so that the SLM (4405) is in a spatial plane.

adjust the orientation of the two-sided mirror (4403) and the translation position of (4405) so that the beam reaching (4405) is centered.

adjust the aperture of (4348) so that the incident beam on (4405) is as wide as possible, without however exceeding the active surface of the SLM.

It is possible, on an SLM, to control independently the active zone and a peripheral zone called the "apron." The entire active zone here is controlled to perform a polarization rotation in a given direction, and the apron is controlled to carry out a polarization rotation in the opposite direction. The active zone is then modified so that a cross centered at the middle of the active zone is placed in the same state as the apron.

The frequency-meter is positioned behind (4406), which is widely open.

The aperture of the diaphragm (4348) is slightly greater (20% for example) than its nominal aperture calculated in 8.4.

The frequency-meter is first positioned in the absence of its polarizer so as to form on its CCD an image of the illuminated zone of (4405).

The polarizer of the frequency-meter is then introduced and adjusted in rotation so as to cause the appearance on the image of a maximum contrast between the peripheral zone (apron) and the central active zone of the SLM.

The position of (4403) is then adjusted so that the entire active zone and the border with the apron is visible on the image. One should see an illuminated square active zone surrounded by a dark zone (the apron) and marked by a centered cross.

The position of (4404) is adjusted so as to have the best possible contrast.

The aperture of the diaphragm (4348) is then reduced. We should see on the image an illuminated disc of reduced diameter intercepting the dark cross. The position of (4403) and that of (4405) in translation are adjusted so that the center of the disc and the center of the cross coincide.

The position of (4404) is again adjusted so as to have the best possible contrast.

The opening of the diaphragm (4348) is then enlarged as much as possible without however having the illuminated disc reach the apron zone.

Step 8. Translation Adjustment of Lens (4407)

This lens is mounted on a single-axis translation positioner in the direction of the optical axis.

The purpose of this adjustment is to ensure that a parallel beam coming from the laser and reflected entirely by (4405) is again parallel after passing through (4407).

The frequency-meter is positioned behind (4407). (4406) is open widely. The control array of (4405) is entirely set to 0. The position of (4407) is adjusted so as to have an image as close as possible to a point image on the frequency-meter.

Step 9. Rotation Adjustment of Polarizer (4408)

The polarizer (4408) is attached to a positioner allowing a rotation adjustment around the optical axis.

When the control word $A_{00}$ is used, the SLM (4405) reflects the beam in a direction D0. When $A_{N_{pix}-1,0}$ is used, the direction of the beam is modified and the component on the frequency corresponding to the direction D0 must be cancelled. The polarizer (4408) is adjusted so as to actually produce a cancellation of this component.

The frequency-meter is positioned behind (4408). The diaphragm (4406) is widely open. The array $A_{00}$ is first applied to (4405). The illuminated point P on the CCD of the frequency-meter is marked by a coordinate system. The array $A_{N_{pix}-1,0}$ is then used and the position of (4408) is adjusted to cancel the intensity received at the point P.

Step 10. Two-axis Translation Adjustment and Aperture of Diaphragm (4406)

The diaphragm (4406) has an adjustable aperture and is adjustable in translation along two axes orthogonal to the optical axis.

Its position and its aperture must be adjusted so that it allows the passage of useful frequencies and stops the symmetrical frequencies, its role being that of the diaphragm (4615) described in.8.1.2.

The frequency-meter is used and positioned behind (4408). The axes of the CCD of the frequency meter must be oriented as indicated by the arrow marker (4470). A specific program is used.

This program applies successively to the SLM (4405) the arrays:

$$A_{0,0} \quad A_{0,\frac{N_{pix}}{2}} \quad A_{\frac{N_{pix}}{2},0} \quad A_{\frac{N_{pix}}{2},N_{pix}-1} \quad A_{N_{pix}-1,\frac{N_{pix}}{2}}$$

The program sums the intensities obtained in each case by the CCD sensor and displays the corresponding image. It superimposes on this image symbols indicating the maximum obtained in each of these cases. It iterates indefinitely this procedure so that this image is updated constantly throughout the adjustment of the diaphragm.

The position and aperture of the diaphragm must be adjusted so that the point obtained for the indices (0,0) is not visible (blocked by the diaphragm) and so that the four other points are visible (at the limit of the diaphragm), at the positions indicated in FIG. 72 in which (5010) represents the limit of the diaphragm.

Step 11. Mirror (4409) Orientation Adjustment

The mirror (4409) is fixed on a positioner allowing its orientation to be adjusted.

The array $$A_{\frac{N_{pix}}{2},\frac{N_{pix}}{2}}$$

is applied to (4405). A diffuser is used to control the path of the beam. The angular position of (4409) is adjusted so that the beam reaches the center of (4412).

Step 12. SLM (4412) Orientation Adjustment

The SLM (4412) is fixed on a three-axis rotation positioner allowing the adjustment of its orientation (axes in the plane of the sensor) and its rotation position (axis orthogonal to the plane of the sensor), coupled with a two-axis translation positioner allowing a displacement in a plane orthogonal to the optical axis.

The array $$A_{\frac{N_{pix}}{2},\frac{N_{pix}}{2}}$$

remains applied to (4405). The control array of (4412) is set to 1. A diffuser is used the check the path of the beam. (4412) is adjusted so that the wave is reflected towards (4414) and is centered at the middle of this diaphragm.

Step 13. Polarizer (4413) Rotation Adjustment

The control array of (4412) is set to 1. The frequency-meter is positioned behind (4413) so that the image of (4412) is formed on its CCD. The control array of (4412) is then set to 0. (4413) is then adjusted in rotation so as to cancel the intensity received on the CCD of the frequency-meter.

Step 14. Fine Adjustment of Orientation of Mirror (4409), Adjustment of Position and Focal Length of Doublet (4410)(4411), and Rotation and Translation Adjustment of SLM (4412)

The lens (4410) is mounted on a single-axis positioner in the direction of the optical axis. This positioner and the lens (4411) are themselves mounted on a second single-axis positioner in the direction of the optical axis. It is thus possible either to move the assembly (4410)(4411) jointly or move (4410) alone to vary the distance between the two lenses of the doublet (4410)(4411).

The SLM (4405) makes it possible to control the direction in which is diffracted the wave coming from this SLM. To a direction of the beam at the exit of the SLM (4405) there corresponds a point in a frequency plane and in particular a point in the plane of the SLM (4412).

The position of (4410)(4411) must be adjusted so that the image of the beam coming from the SLM (4405) is actually a point image in the frequency plane in which (4412) is located. The position of (4409) and (4412) must be adjusted so that the frequency generated when the control array $$A_{\frac{N_{pix}}{2},\frac{N_{pix}}{2}}$$

is applied to (4405) corresponds to a point of coordinates $$\left(\frac{N_{pix}}{2},\frac{N_{pix}}{2}\right)$$

on the SLM (4412). The position of (4410)(4411)(4412) must moreover be adjusted so that there is a point-to-point correspondence between the frequencies generated by the arrays $A_{i,j}$ applied to (4405) and the pixels of (4412), i.e. so that when the control array $A_{i,j}$ is applied to (4405) the pixel of coordinates (i,j) is illuminated on the SLM (4412), whatever the integers i and j.

The series of operations o1 to o3 is repeated a sufficient number of times so as to converge towards the correct position of each element.

o1. Adjustment of Joint Position of (4410) and (4411) to Obtain a Point Frequency Image The frequency-meter is positioned behind (4414). The diaphragm (4414) is open widely. The array $$A_{\frac{N_{pix}}{2},\frac{N_{pix}}{2}}$$

is applied to (4405) and the control array applied to (4412) is at 1. The joint position of the assembly (4410) (4411) is adjusted to have, on the CCD of the frequency-meter, an image which is as much as possible a point image.

o2. Angular Adjustment of (4409) and Translation Adjustment of (4412) to Obtain a Centered Frequency Image $$A_{\frac{N_{pix}}{2},\frac{N_{pix}}{2}}$$

remains applied to (4405). (4409) and (4412) are then adjusted so that the central frequency generated is in the middle of the SLM (4412). This adjustment is carried out with the frequency meter and a program for locating the maximum, which will be called program PA.

The program PA illuminates one by one each pixel of the SLM (4412) and measures the corresponding intensity on the frequency-meter. The pixel generating the highest intensity corresponds to the maximum.

The basic procedure of the program PA, which will be called PB, goes through all the coordinates (i,j) of the pixels on the SLM (4412), i and j varying from 0 to $N_{pix}-1$. For each pair (ij) this procedure carries out the following steps:

it applies the control array $B_{ij}$ defined as in 8.4.1. to the SLM (4412).

it then acquires an image on the CCD of the frequency-meter.

it determines the maximum value of the intensity measured on all the points of this image.

it records this value in an array M at M[i,j]

When it has thus gone through all the indices i,j, the procedure determines the point of maximum intensity of the array M and its indices $i_0,j_0$ which correspond to the maximum. It displays on the screen the two-dimensional image corresponding to the array M, possibly magnified around the maximum, as well as the values of $i_0,j_0$ and the value $M[i_0,j_0]$.

The program PA consists in iterating indefinitely the procedure PB so as to be able to carry out the corresponding adjustment.

The position of (4409) must be adjusted to have $$(i_0, j_0) = \left(\frac{N_{pix}}{2}, \frac{N_{pix}}{2}\right)$$

and to maximize M[$i_0, j_0$].

o3. Adjustment of Focal Length of Doublet (4410)(4411) and Adjustment of (4412) in Rotation The frequency-meter, adjusted as previously, is used. A program displaying the characteristics of the system is used, and will be called program PC.

The program PC uses successively four control arrays $$A_{c,\frac{N_{pix}}{2}} \quad A_{\frac{N_{pix}}{2},c} \quad A_{\frac{N_{pix}}{2},N_{pix}-1-c} \quad A_{N_{pix}-1-c,\frac{N_{pix}}{2}}$$

applied to (4405). These control arrays are numbered in that order. c is a constant, for example c=20, introduced to prevent the illuminated points from leaving the active zone of the SLM in the event of incorrect initial adjustment.

For the n-th control word, the program uses the procedure PB already described and stores the coordinates of the maximum obtained at X[n] and Y[n]. When this operation has been carried out for the four control words, the program has obtained the arrays X and Y with four elements, corresponding to the coordinates in pixels of the successive maximums. When the system is correctly adjusted, we should have:

$$(X[1], Y[1]) = \left(c, \frac{N_{pix}}{2}\right)$$

$$(X[2], Y[2]) = \left(\frac{N_{pix}}{2}, c\right)$$

$$(X[3], Y[3]) = \left(\frac{N_{pix}}{2}, N_{pix} - 1 - c\right)$$

$$(X[4], Y[4]) = \left(N_{pix} - 1 - c, \frac{N_{pix}}{2}\right)$$

The adjustment thus seeks to obtain these equalities effectively. The adjustment of the focal length of the doublet (4410)(4411) allows the adjustment of the scale, and the rotation adjustment of (4412) allows the adjustment of the rotation position The program calculates the ratio of the actual distances to the distances which should be obtained with a correct adjustment:

$$r = \frac{1}{N_{pix} - 1 - 2c} \frac{1}{2} \left\{ \sqrt{(X[1] - X[4])^2 + (Y[1] - Y[4])^2} + \sqrt{(X[2] - X[3])^2 + (Y[2] - Y[3])^2} \right\}$$

If f is the focal length of each lens and if $d_1$ is the distance between these two lenses before adjustment, the actual focal length of the assembly of the two lenses before adjustment is:

$$f_1 = \frac{f}{2}\left(\frac{1}{1 - \frac{d_1}{2f}}\right)$$

Similarly, the focal length of the assembly after adjustment is:

$$f_2 = \frac{f}{2}\left(\frac{1}{1 - \frac{d_2}{2f}}\right)$$

As magnification is proportional to the focal length, it must be adjusted so that:

$$\frac{f_2}{f_1} = \frac{1}{r}$$

which leads, by developing the calculations, to:

$$d_2 - d_1 = 2f(1-r)\left(1 - \frac{d_1}{2f}\right)$$

In this equation, f and $d_1$ are poorly known but the "design" focal length doublet (4410)(4411) can be used. This length is that for which the doublet was designed. It will be denoted $f_c$ and will be equal to roughly f/2. We then obtain:

$$d_2 - d_1 = 4f_c(1-r)$$

The program PC displays:
the value $d_2 - d_1$, which allows the distance between lenses to be corrected accordingly.
the lines linking respectively the points 1 and 4 and the points 2 and 3
the deviation $$\frac{X[1] - X[4]}{N_{pix} - 2c},$$

which gives roughly the angle in radians by which the rotation position must be corrected.
the ratio $$\frac{X[1] - X[4]}{Y[2] - Y[3]},$$

which should be equal to ±1.

The SLM (4412) is adjusted in rotation so as to cancel the displayed deviation $$\frac{X[1] - X[4]}{N_{pix} - 2c},$$

and the distance between lenses of the doublet (4410)(4411) is modified according to the displayed value of $d_2 - d_1$.

Step 15. Translation Adjustment of Diaphragm (4414)

The diaphragm (4414) is mounted on a two-axis translation positioner allowing it to be moved in a plane orthogonal to the optical axis.

The aperture of (4414) is known. It must be adjusted in translation. An auxiliary CCD is placed just behind (4414). The control array $$B_{\frac{N_{pix}}{2}, \frac{N_{pix}}{2}}$$

is used for the SLM (4405), i.e. only a central point of this SLM is "lit", the direct reflected beam being stopped by (4406). The control array of the SLM (4412) is set to 1

(passing position). The image of the lit point of (4405) is then formed in the plane of the diaphragm (4414). (4414) is then adjusted in translation so that its center coincides with the image of the lit point of (4405).

Step 16. Two-axis Translation Adjustment of the SLM (4417)

This SLM is mounted on a two-axis translation positioner in the plane of the SLM, coupled with a three-axis rotation positioner for adjusting its orientation (axes in the plane of the sensor) and its rotation position (axis in a plane orthogonal to the sensor).

The control arrays $$A_{\frac{N_{pix}}{2},\frac{N_{pix}}{2}}$$

and $$B_{\frac{N_{pix}}{2},\frac{N_{pix}}{2}}$$

are used respectively for the SLMs (4405) and (4412). A diffuser is used to follow the beam arriving on (4417), and (4417) is adjusted in translation so that the beam arrives at its center.

Step 17. Orientation Adjustment of the SLM (4417)

The same control arrays as previously are used for the SLMs (4405)(4412). The control array of the SLM (4417) is set to 1. (4417) is adjusted so that the reflected beam reaches the point provided for on (4419), which is verified by means of a diffuser.

Step 18. Orientation Adjustment of the Mirror (4418)

The mirror (4418) is mounted on an angular positioner allowing its orientation to be adjusted. (4418) is adjusted so as to effectively send back the beam in the planned direction, which is verified with a diffuser.

Step 19. Translation Adjustment of the Diaphragm (4419)

The diaphragm (4419) is mounted on a two-axis translation positioner allowing displacement in a plane orthogonal to the optical axis.

The aperture of (4419) is known. It must be adjusted in translation. The control array $$B_{\frac{N_{pix}}{2},\frac{N_{pix}}{2}}$$

is used for the SLM (4405), i.e. only a central point of this SLM is "lit", the direct reflected beam being stopped by (4406). The control arrays of the SLMs (4412) and (4417) are set to 1 passing position). The image of the lit point of (4405) is then formed in the plane of the diaphragm (4419). (4419) is then adjusted in translation so that its center coincides with the image of the lit point of (4405).

Step 20. Rotation Adjustment of the Polarizer (4420)

The polarizer (4420) is mounted on a positioner allowing its rotation adjustment in relation to the optical axis.

The control arrays $$A_{\frac{N_{pix}}{2},\frac{N_{pix}}{2}}$$

and $$B_{\frac{N_{pix}}{2},\frac{N_{pix}}{2}}$$

are applied respectively to (4405) and (4412). The control array of (4417) is set to 1. The frequency-meter is placed just behind (4420). The image on its CCD is roughly a point image. The control array of (4417) is then set to 0. The position of (4420) is adjusted to cancel the intensity received on the frequency-meter.

Step 21. Two-axis Translation Adjustment and Rotation Adjustment of the SLM (4417), Adjustment of Position and Focal Length of the Doublet (4415) (4416)

The lenses (4415)(4416) are mounted on a translation positioner allowing either their simultaneous displacement in the direction of the optical axis or the displacement of (4415) alone.

The position of (4415)(4416) must be adjusted so that the image of the beam coming from the SLM (4412) when the control arrays $$A_{\frac{N_{pix}}{2},\frac{N_{pix}}{2}}$$

and $$B_{\frac{N_{pix}}{2},\frac{N_{pix}}{2}}$$

are applied respectively to (4405) and (4412) is effectively a point image in the frequency plane in which (4417) is located. The position of (4417) must be adjusted so that, under these conditions, the lit point on the SLM (4417) has the coordinates $$\left(\frac{N_{pix}}{2},\frac{N_{pix}}{2}\right).$$

The position of (4415)(4416)(4417) must moreover be adjusted so that there is a point-to-point correspondence between the pixels of (4412) and those of (4417), i.e. so that, when the control arrays $A_{i,j}$ and $B_{i,j}$ are applied respectively to (4405) and (4412), the lit point on (4417) is the pixel of coordinates (i,j), whatever the integers i and j.

The frequency-meter is positioned behind (4420). The series of operations o11 to o13 is repeated a sufficient number of times.

o11. Adjustment of Joint Position of (4415) and (4416) to Obtain a Point Frequency Image The control arrays $$A_{\frac{N_{pix}}{2},\frac{N_{pix}}{2}}$$

and $$B_{\frac{N_{pix}}{2},\frac{N_{pix}}{2}}$$

are applied respectively to the SLMs (4405) and (4412).

The control array applied to (4417) is set to 1. The position of the assembly (4415) (4416) is adjusted to have, on the CCD sensor of the frequency-meter, an image as close as possible to a point image.

o12. Translation Adjustment of (4417) to Obtain a Centered Frequency Image $$A_{\frac{N_{pix}}{2},\frac{N_{pix}}{2}}$$

and $$B_{\frac{N_{pix}}{2},\frac{N_{pix}}{2}}$$

remain applied respectively to the SLMs (4405) and (4412). (4417) is then adjusted so that the central frequency generated is in the middle of the SLM (4417). This adjustment is carried out with the frequency-meter and with the maximum-location program PA defined above. However, in this maximum-location program, the SLM (4412) is replaced here by the SLM (4417).

o13. Adjustment of (4415) to Obtain the Correct Frequency Magnification and Rotation Adjustment of (4417)

The program PC is used. However, in this program:
the SLM (4412) is replaced by the SLM (4417)
when a control word $A_{i,j}$ is applied to the SLM (4405), the corresponding control word $B_{i,j}$ is applied to the SLM (4412).

The inter-lens distance correction obtained is applied to the distance between (4415) and (4416) and the rotation adjustment is carried out on (4417) in rotation in relation to an axis orthogonal to the plane of the sensor.

Step 22. Orientation Adjustment of Semi-transparent Mirror (4307)

The semi-transparent mirror (4307) is mounted on an angular positioner allowing its orientation to be adjusted.

The SLMs (4405)(4412)(4417) are controlled to generate a central frequency: the control array of (4405) is $$A_{\frac{N_{pix}}{2},\frac{N_{pix}}{2}}$$

and the control array of (5512) and (4417) is $$B_{\frac{N_{pix}}{2},\frac{N_{pix}}{2}}.$$

The position of (4407) is adjusted by means of a diffuser in order to send the beam back in the appropriate direction.

Step 23. Orientation Adjustment of the Mirror (4308)

The mirror (4308) is mounted on an angular positioner allowing its orientation to be adjusted.

The control of the SLMs is unchanged. The position of (4308) is adjusted by means of a diffuser so as to send the beam back in the appropriate direction.

Step 24. Setup of Beam Extinguisher (4422)

The control of the SLMs is unchanged. This beam extinguisher is placed in accordance with the procedure indicated in 7.3.2.2.

Step 25. Translation Adjustment of Lens (4431)

The control of the SLMs is unchanged. The frequency-meter is placed behind (4431). The position of (4431) is adjusted to obtain a point image.

Step 26. Orientation Adjustment of Mirror (4332)

This mirror is mounted on a two-axis positioner enabling its orientation to be adjusted.

The control of the SLMs is unchanged. Between (4311) and (4331), two beams propagating in opposite directions are superimposed. A diffuser introduced on the side of the beam will be lit on both sides. The lit parts of each side of the diffuser must be the same: the two beams are then exactly superimposed. Incorrect adjustment of (4332) has the effect of offsetting the position of these two beams. (4332) is adjusted so that between (4311) and (4331) the beams propagating in both directions are exactly superimposed.

Step 27. Translation Adjustment of Lens (4331)

The lens (4331) is mounted on a single-axis translation positioner enabling displacement in the direction of the optical axis.

The frequency-meter is positioned between (4311) and (4338). The control of the SLMs (4405)(4412)(4417) is defined by the arrays $$A_{\frac{N_{pix}}{2},\frac{N_{pix}}{2}}$$

and $$B_{\frac{N_{pix}}{2},\frac{N_{pix}}{2}}.$$

The position of (4332) is adjusted so that FEDI has an image as close as possible on the frequency-meter.

Step 28. Orientation Adjustment of the Semi-transparent Mirror (4311)

This semi-transparent mirror is mounted on a two-axis rotation position (the two axes being in the plane of the semi-transparent mirror) enabling its orientation to be adjusted.

The adjustment of the SLMs is not modified. A diffuser is used to control the path of the beam. (4311) is adjusted so that the beam FEDI follows the appropriate path.

Step 29. Orientation Adjustment of the Two-sided Mirror (4424)

The double mirror (4424) is mounted on a two-axis rotation positioner, the two axes being in the plane of the non-reflecting side.

(4424) is adjusted so that FEDI reaches the center of (4427), which is verified by means of a diffuser.

Step 30. Orientation Adjustment of the SLM (4427)

This SLM is mounted on a two-axis translation positioner in the plane of the SLM, coupled with a three-axis rotation positioner allowing the adjustment of its orientation (axes in the plane of the sensor) and rotation position (axis in a plane orthogonal to the sensor).

The control arrays of the SLMs (4405) (4412) (4417) are not modified. The control array of the SLM (4427) is set to 1.

With the path of the beam controlled by means of a diffuser, the angular position of (4427) is adjusted so that the beam FEDI aims at the appropriate point on (4424).

Step 31. Fine Orientation Adjustment of the Two-sided Mirror (4424), Rotation and Translation Adjustment of (4427) and Adjustment of the Focal Length and Position of the Doublet (4425)(4426)

The position of (4425)(4426) must be adjusted so that the image of the beam FEDI, when the control arrays $$A_{\frac{N_{pix}}{2},\frac{N_{pix}}{2}}$$

and $$B_{\frac{N_{pix}}{2}, \frac{N_{pix}}{2}}$$

are applied respectively to the SLM (4405) and to the SLMs (4412) and (4417), is effectively a point image in the frequency plane in which (4427) is located. The position of (4424) and (4427) must be adjusted so that, under these conditions, the lit point on the SLM (4427) has the coordinates $$\left(\frac{N_{pix}}{2}, \frac{N_{pix}}{2}\right).$$

The position of (4425)(4426)(4427) must moreover be adjusted so that there is a point-to-point correspondence between the pixels of (4417) and those of (4427), i.e. so that, when the control arrays $A_{i,j}$ and $B_{i,j}$ are applied respectively to the SLM (4405) and to the SLMs (4412) and (4417), the lit point on (4427) is the pixel of coordinates (i,j), whatever the integers i and j.

The frequency-meter is positioned between (4424) and (4428). Its polarizer is put in place. The beam FEDI is used. The control array of (4427) is set to 0 and the polarizer of the frequency-meter is adjusted to cancel the intensity received on the CCD of the frequency-meter. The series of operations o21 to o23 is then repeated a sufficient number of times to converge towards a correct adjustment.

o21. Adjustment of Joint Position of (4425) and (4426) to Obtain a Point Frequency Image The control array $$A_{\frac{N_{pix}}{2}-1, \frac{N_{pix}}{2}}$$

is applied to the SLM (4405) and the control array $$B_{\frac{N_{pix}}{2}-1, \frac{N_{pix}}{2}}$$

is applied to the SLMs (4412) and (4417). The control array applied to (4427) is set to 1. The position of the assembly (4425) (4426) is adjusted to have, on the CCD sensor of the frequency-meter, an image as close as possible to a point image.

o22. Orientation Adjustment of (4424) and Translation Adjustment of (4427) to Obtain a Centered Frequency Image (4424) and (4427) are adjusted so that the central frequency generated is in the middle of the SLM. This adjustment is carried out with the frequency-meter and with the maximum-location program PA defined above. However, in this maximum-location program, the SLM (4412) is replaced here by the SLM (4427).

o23. Adjustment of (4425) to Obtain Proper Frequency Magnification and Rotation Adjustment of (4427)

The program PC is used. However, in this program:
the SLM (4412) is replaced by the SLM (4427)
when a control word $A_{i,j}$ is applied to the SLM (4405), the corresponding control word $B_{i,j}$ is applied in addition to the SLMs (4412) and (4417).

The inter-lens distance correction obtained is applied to the distance between (4425) and (4426) and the rotation adjustment is carried out on (4427).

Step 32. Two-axis Translation Adjustment of the Diaphragm (4428)

(4428) is mounted on a two-axis translation positioner allowing displacements in a plane orthogonal to the optical axis.

The aperture of (4428) is known. It must be adjusted in translation.

FEDI is used. (4428) is temporarily eliminated. An auxiliary CCD is placed just behind (4428). The control array $$A_{\frac{N_{pix}}{2}, \frac{N_{pix}}{2}}$$

is applied to the SLM (4405) and the control array $$B_{\frac{N_{pix}}{2}, \frac{N_{pix}}{2}}$$

is applied to the SLMs (4412) and (4417). The control array of (4427) is at 1. The center of the illuminated area is marked on the auxiliary CCD. (4428) is then put in place so that its center coincides with the center of the illuminated area.

Step 33. Rotation Adjustment of the Polarizer (4352)

This polarizer is mounted on a single-axis rotation positioner enabling the adjustment of its rotation position around its optical axis.

FEDI is used. The control array of (4427) is set to 0. The control arrays of the SLMs (4405)(4412)(4417) are not modified. The rotation position of (4352) is adjusted to cancel the intensity received on the CCD (4339).

Step 34. Orientation Adjustment of the Mirror (4344)

This mirror is mounted on a positioner allowing its orientation to be adjusted. The diaphragm (4349) is open widely. A diffuser is used to verify that the beam FD reaches the CCD (4339) and is centered on this CCD.

Step 35. Position Adjustment and Aperture of the Diaphragm (4349)

This diaphragm is mounted on a two-axis translation positioner allowing a displacement in the plane of the optical axis, and has an adjustable aperture.

Its position is adjusted in the presence of FRD so that the image of the diaphragm is centered on the CCD and its aperture is adjusted so that this image covers the entire CCD.

Step 36. Adjustment of the Focal Length and Position of the Doublet (4430)(4429) and Translation and Rotation Adjustment of the Sensor (4339)

The lenses (4430) (4429) are mounted on a translation positioner allowing, on the one hand, the joint displacement of the two lenses, and, on the other, the displacement of (4429) in relation to (4430).

The CCD (4339), integral with the camera (4384) is mounted on a three-axis rotation positioner allowing, on the one hand, rotation around the optical axis and, on the other, adjustment of the orientation of the sensor, coupled with a three-axis translation positioner.

The positioners of the lenses (4430) (4429) and of the camera (4384) are themselves mounted on a positioner allowing a displacement of the assembly in the direction of the optical axis.

The position of (4430)(4429) must be adjusted so that the image of the beam FEDI, when the control arrays $$A_{\frac{N_{pix}}{2}, \frac{N_{pix}}{2}}$$

and $$B_{\frac{N_{pix}}{2}, \frac{N_{pix}}{2}}$$

are applied respectively to the SLM (4405) and to the SLMs (4412) and (4417), and when the control array of (4427) is set to 1, is effectively a point image in the frequency in which (4339) is located. The position of (4339) must be adjusted so that, under these conditions, the point lit on the CCD (4339) has the coordinates $$\left(\frac{N_{pix}}{2}, \frac{N_{pix}}{2}\right).$$

The position of (4339)(4429)(4430) must moreover be adjusted so that there is a point-to-point correspondence between the pixels of (4417) and those of (4339), i.e. so that, when the control arrays $A_{i,j}$ and $B_{i,j}$ are applied respectively to the SLM (4405) and to the SLMs (4412) and (4417), and when the control array of (4427) is at 1, the point lit on (4339) is the pixel of coordinates (i,j), whatever the integers i and j.

The beams FEDI and FRD are used.
The array C applied to (4427) is set to 1.
The series of operations o31 to o33 is repeated a sufficient number of times.

o31. Adjustment of Joint Position of (4429) and (4430) to Obtain a Point Frequency Image the control array $$A_{\frac{N_{pix}}{2}-1, \frac{N_{pix}}{2}}$$

is applied to the SLM (4405) and the control array is applied to the SLMs (4412) and (4417). The punctuality of the image generated on the CCD (4339) is evaluated according to the procedure described in 7.3.3.1. The position of the assembly (4429)(4430) is adjusted to have an image as close as possible to a point image.

o32. Translation Adjustment of (4339) to Obtain a Centered Frequency Image

The translation position of (4339) is adjusted so that the coordinates of the point image, calculated according to the procedure indicated in 7.3.3.1., are o33. Adjustment of (4429) to Obtain Correct Frequency Magnification, and Rotation Adjustment of (4339)

The program PC is used. However, in this program:
when a control word $A_{i,j}$ is applied to the SLM (4405), the corresponding control word $B_{i,j}$ is applied in addition to the SLMs (4412) and (4417).
the arrays X[i] and Y[i] are not obtained by the procedure PB. They correspond to the coordinates of the maximum determined by the procedure described in 7.3.3.1., without any specific action on an SLM.
The inter-lens distance correction obtained is applied to the distance between (4429) and (4430).
The rotation adjustment is carried out on (4339)(4384), rotating around the optical axis.
The orientation of the CCD is adjusted to have Step 37. Adjustment of Translation Position of the Assembly Consisting of the CCD (4339) and the Doublet (4430)(4429)

The beam FRDI is used. An auxiliary CCD is put in place at the location of the diaphragm (4313). The position of said assembly is adjusted so that the image of FRDI on the auxiliary CCD is a point image.

Step 38. Orientation Adjustment of the Mirror (4347)

This mirror is mounted on a two-axis positioner enabling its orientation to be adjusted.

The control of the SLMs is unchanged. Between (4345) and (4346), two beams propagating in opposite directions are superimposed. A diffuser introduced on the side of the beam will be lit on both sides. The lit parts of each side of the diffuser must be the same: the two beams are then exactly superimposed. (4347) is adjusted so that, between (4345) and (4346), the beams propagating in both directions are exactly superimposed.

Step 39. Translation Adjustment of the Lens (4346)

The lens (4346) is mounted on a single-axis translation positioner allowing its position to be adjusted in the direction of the optical axis.

FRDI is used. The frequency-meter is positioned on the path of FRDI between (4345) and (4430). The position of the lens (4346) is adjusted so that the image on the CCD of the frequency-meter is a point image.

Step 40. Orientation Adjustment of the Semi-transparent Mirror (4345)

The semi-transparent mirror (4345) is mounted on a two-axis positioner allowing its orientation to be adjusted.

An auxiliary sensor is temporarily placed behind (4313). The semi-transparent mirror (4313) is adjusted so that the image on this temporary sensor is centered in relation to the diaphragm (4313).

Step 41. Translation Position Adjustment of the Objectives (4317) and (4319)

The objective (4319) is mounted on a focussing device. The objective (4317) is mounted on a two-axis translation positioner allowing displacement in a plane orthogonal to the optical axis.

The beam FRDI is used. A temporary CCD sensor is positioned just behind (4323) on the path of FRDI. The position of the objectives is adjusted to obtain a centered point image.

Step 42. Introduction of a Temporary Plane Illuminating Beam

This beam, which will be called "FEP," is derived from the sensor through a semi-transparent mirror placed between (4304) and (4305) and is brought by a set of mirrors to the entry of the microscope objective (4317), on the side of the sample. The objective (4319) must be temporarily eliminated for this purpose. At the input to the objective, this beam is directed along the optical axis of the objective.

Step 43. Orientation Adjustment of the Mirror (4314) and Translation Adjustment of the Lens (4312)

The mirror (4314) is mounted on an angular positioner enabling its orientation to be adjusted. The lens (4312) is mounted on a single-axis translation positioner in the direction of the optical axis.

FEP and FRD are used. An image is obtained from the sensor (4339). The punctuality and the coordinates of the FEP image point are evaluated by the procedure described in 7.3.3.1.

The lens (4312) is adjusted so that the image is a point image.

The mirror (4314) is adjusted so that the image is centered.

Step 44. Objective Position Adjustment

The beam FEP is eliminated and the objective (4317) is put in place again. The beam FRDI is used. A temporary CCD sensor is placed behind (4323) on the path of FRDI. The objectives are adjusted so that the image is a point image and is centered in relation to the diaphragm (4323).

Step 45. Translation Adjustment of the Lens (4324)

FED is used. It passes successively through the objectives (4317) and (4319), then the lens (4324) and reaches the frequency-meter, which is positioned behind (4324). The position of (4324) is adjusted to obtain an image as close as possible to a point image on the CCD of the frequency-meter.

Step 46. Orientation Adjustment of the Mirrors (4432) (4435), First Rotation Adjustment of (4436) and First Orientation Adjustment of the Semi-transparent Mirror (4325)

The SLMs (4405)(4412)(4417) are controlled so as to generate a central frequency. The beam FEG is used. (4325) is in the normal position. The path of the beam is controlled with a diffuser. Each mirror is adjusted so as to have the appropriate path. The beam must in particular occupy the entire aperture of (4323).

Step 47. Setup of Beam Extinguisher (4437)

This beam extinguisher is set up as indicated in 7.3.2.2.

Step 48. Adjustment of the Position and Focal Length of the Doublet (4433)(4434), Rotation Adjustment of the Assembly (4436), and Orientation Adjustment of the Semi-transparent Mirror (4325)

The lens (4434) is mounted on a translation positioner along the optical axis. This positioner and the lens (4433) are themselves mounted on a second single-axis translation positioner along the optical axis.

The position of (4433)(4434) must be adjusted so that the image of the beam FEG, when the control arrays and $$B_{\frac{N_{pix}}{2}, \frac{N_{pix}}{2}}$$

are applied respectively to the SLM (4405) and to the SLMs (4412) and (4417), and when the control array of (4427) is set to 1, is effectively a point image in the frequency plane in which (4339) is located. The position of (4325) must be adjusted so that, under these conditions, the illuminated point on the CCD (4339) has the coordinates $$\left(\frac{N_{pix}}{2}, \frac{N_{pix}}{2}\right).$$

The position of (4433)(4434)(4436)(4325) must moreover be adjusted so that there is a point-to-point correspondence between the pixels of (4417) and those of (4339), i.e. so that, when the control arrays $A_{i,j}$ and $B_{i,j}$ are applied respectively to the SLM (4405) and to the SLMs (4412) and (4417), and when the control array of (4427) is at 1, the illuminated point on (4339) is the pixel of coordinates (i, j), whatever the integers i and j.

The beams FRRD and FEG are used. The control array applied to (4427) is set to 1.

This adjustment is carried out while performing a sufficient number of times the steps o41 to o43.

o41. Adjustment of the Joint Position of (4433) and (4434) to Obtain a Point Frequency Image The control array $$A_{\frac{N_{pix}}{2}, \frac{N_{pix}}{2}}$$

is applied to the SLM (4405) and the control array $$B_{\frac{N_{pix}}{2}, \frac{N_{pix}}{2}}$$

is applied to the SLMs (4412) and (4417). The punctuality of the image generated on the CCD (4339) is evaluated according to the procedure described in 7.3.3.1. The position of the assembly (4433) (4434) is adjusted to have an image as close as possible to a point image.

o42. Angular Adjustment of (4325) to Obtain a Centered Frequency Image

The angular position of (4325) is adjusted so that the coordinates of the point image, calculated according to the procedure indicated in 7.3.3.1., are $$\left(\frac{N_{pix}}{2}, \frac{N_{pix}}{2}\right).$$

o43. Adjustment of (4433) to Obtain the Proper Frequency Magnification and Rotation Adjustment of (4436)

The program PC is used. However, in this program:
when a control word $A_{i,j}$ is applied to the SLM (4405), the corresponding control word $B_{i,j}$ is applied to the SLMs (4412) and (4417).
the values X[i] and Y[i] are not obtained by the procedure PB. They correspond to the coordinates of the maximum determined by the procedure described in 7.3.3.1., without any specific action on an SLM.

The inter-lens distance correction obtained is applied to the distance between (4433) and (4434) and the rotation adjustment is carried out on (4436).

Step 49. Adjustment of the Rest of the "Left-hand" Part of the Microscope

Each element still not adjusted corresponds to a symmetrical element in the right-hand part of the microscope. The adjustment of the elements not yet adjusted is "symmetrical" with the adjustment of the corresponding elements of the right-hand part of the microscope. It is carried out symmetrically, the beam FEGI replacing the beam FEDI. However, the following must be taken into account:

a point centered at $$\left(\frac{N_{pix}}{2}, \frac{N_{pix}}{2}\right)$$

on the sensor (4339) can be obtained with control arrays $$A_{\frac{N_{pix}}{2}, \frac{N_{pix}}{2}}$$

and $$B_{\frac{N_{pix}}{2}, \frac{N_{pix}}{2}}$$

of the SLMs (4405),(4412),(4417) and with the beam FEG. It can also be obtained with the control arrays $$A_{\frac{N_{pix}}{2}-1, \frac{N_{pix}}{2}} \quad B_{\frac{N_{pix}}{2}-1, \frac{N_{pix}}{2}}$$

and with the beam FEDI.

a point centered at $$\left(\frac{N_{pix}}{2}, \frac{N_{pix}}{2}\right)$$

on the sensor (4329) can be obtained with control arrays $$A_{\frac{N_{pix}}{2}-1,\frac{N_{pix}}{2}}$$

and $$B_{\frac{N_{pix}}{2}-1,\frac{N_{pix}}{2}}$$

of the SLMs (4405),(4412),(4417) and with the beam FED. It can also be obtained with the control arrays $$A_{\frac{N_{pix}}{2},\frac{N_{pix}}{2}} \quad B_{\frac{N_{pix}}{2},\frac{N_{pix}}{2}}$$

and with the beam FEGI.

The control words of the SLMs are consequently not perfectly equivalent during the two adjustments. The adjustment of the left part of the microscope comprises in particular steps equivalent to the steps 31 and 36. In these steps, the control arrays $$A_{\frac{N_{pix}}{2}-1,\frac{N_{pix}}{2}}$$

and $$B_{\frac{N_{pix}}{2}-1,\frac{N_{pix}}{2}}$$

must be replaced by $$A_{\frac{N_{pix}}{2},\frac{N_{pix}}{2}}$$

and $$B_{\frac{N_{pix}}{2},\frac{N_{pix}}{2}}.$$

Step 50. Setup of (4351)

This phase shift device is identical to the one described in 7.2.3. and is set up as indicated in 7.3.2.3. After this series of adjustments, the system is ready to be used.

8.6. Variant of utilization method

To generate the three-dimensional image of the object, we can confine ourselves to the representation $F_{0,0}$ defined in 7.17. This is equivalent, in the procedure described in 7.17.2., to adopting zero arrays $IB_{p,q}$ for any pair(p,q)≠(0,0).

It is also assumed here that that the object has an average index close to the nominal index of the object observed and that the optical table is totally free of vibrations.

The steps 7.9, 7.10, 7.11, 7.13, 7.15, 7.16 can then be eliminated. The present method differs moreover from the preceding one in the method used to adjust the position of the objectives before utilization, in the control arrays applied to the beam deflector during imaging, and in the image superposition algorithm.

8.6.1. Adjustment of objectives

This adjustment can be carried out in the presence of the object. It can also be performed with a transparent plate provided the objective is not moved when the object is introduced. If objectives designed to work without an immersion liquid and without a cover glass are used (nominal index equal to 1) and if the sample is not very thick or has an average index close to 1, it may also be carried out in the absence of the object. During this adjustment, the beams FEG and FRD are used and the following operations are performed:

the control array of the SLM (4405) is set to 0
the control arrays of the other SLMs are set to 1
the rotation polarizer (4408) is adjusted so as to cancel the beam FEG received on (4339)
to the SLM (4405) is applied the control array $$B_{\frac{N_{pix}}{2},\frac{N_{pix}}{2}}$$

which is zero at every point except at the point of coordinates $$\left(\frac{N_{pix}}{2}, \frac{N_{pix}}{2}\right).$$

the punctuality of the image received on the sensor (4339) is evaluated using the procedure described in 7.3.3.1. with Fourier transformation
the position of the objectives is adjusted so that the image is a perfect point image and is centered
the polarizer (4408) is then returned to its initial position.

8.6.2. Control of beam deflector

The control array $A_{ij}$ used in 8.4.1. for the SLM (4405) is replaced $$\text{by}: A_{ij}[k, l] = E\left(\left|\frac{1}{N_{pix}}\left(k\left(i-\frac{N_{pix}}{2}\right)+l\left(j-\frac{N_{pix}}{2}\right)\right)\right|\%2\right)$$

8.6.3. Algorithm for calculating the three-dimensional representation

Steps 1 and 2 of the algorithm described in 7.17.2. can be eliminated. In fact, the additional adjustment carried out, the control array of the beam deflector used, and the absence of vibrations makes it possible to avoid any phase shift in the illuminating beam. In particular, if the variant described in 7.18.5. is used, the phase shift device (4304) is not used, the phase difference $\Theta_d$ being constant and can be chosen as zero.

9. FIFTH EMBODIMENT

This embodiment does not allow image acquisition as fast as in the previous embodiment and is not, for this reason, the preferred embodiment in the general case. Nevertheless, in the particular case of UV radiation, it constitutes the preferred embodiment. In fact, in this case, Embodiments 3 and 4 are not feasible owing to the non-availability of liquid crystals and polarizers. Since it can work with UV radiation of short wavelength, this embodiment is also the one which makes it possible to obtain the best definition on the generated image.

9.1. Principles

This fifth embodiment is similar to the second embodiment in that the image is captured in a spatial plane and in that the variations in the beam direction are obtained by means of a mobile mirror. It is similar to the third embodiment in that two microscope objectives are used, and in that most of the algorithms are modified forms of those used in the third embodiment. It differs from all the preceding embodiments in that the reference wave is not fixed but is modified at the same time as the illuminating wave. It is described in FIGS. 73 and 74.

The aim of this fifth embodiment is to improve resolution through the use of an ultraviolet laser. No ferroelectric liquid crystals exist that work in the ultraviolet, so that consequently it is necessary to adopt solutions with more conventional optical components. In particular, the beam deflection device is a mobile mirror (5113).

However, the use of a mobile mirror in a system similar to the first or second embodiment generates vibrations. After each movement of the mirror, it is necessary to wait for the system to stabilize before proceeding with the acquisition. To overcome vibrations caused by the mobile mirror, it is necessary to position it outside the optical table and to separate the illuminating and reference beams on the optical table after passing the mirror. Mirror movements thus result in simultaneous movement of the reference and illuminating beams.

In order to benefit fully from ultraviolet resolution possibilities, it must be possible to carry out, as in the third and fourth embodiments, changes in the orientation of the electric field vector of the illuminating beam. These changes are made by separating the wave, by means of a semitransparent mirror (5102), into two paths, a phase blade (5111) modifying the polarization being inserted on one of the paths and shutters (5104) and (5109) allowing the choice of the path used. The two waves are then superimposed again by a mirror (5112). The shutters are placed at a point where the light ray occupies only a small spatial extension and can thus be opened and closed rapidly.

For the same reason, it is necessary to have several analysis directions. On each side of the microscope, two CCD sensors are used, one for each analysis direction. To the extent that it is difficult to have good polarizers in the UV domain, the analysis direction will be modified only by a modification in the reference wave polarization direction, for example by means of retardation plates (5238) (5239) which modify this polarization differently before each sensor.

The reference wave is mobile and can in particular pass through the object at an angle close to the maximum aperture of the objective. The spatial frequency thus received on the sensor can be twice as high as with a system in which the reference wave is centered in relation to the optical axis, as in the second embodiment. For the same image size, a sensor with twice the dimensions in pixels is thus necessary, in relation to the other embodiments, To eliminate the direct illuminating wave, a glass (5165) or (5191) is used on which is fixed a black spot placed in a frequency plane. By moving this black spot, one modifies the eliminated frequency. On the other hand, this method does not give the value of the wave at the point of direct impact of the illuminating wave, on which are based the three-dimensional reconstructions used in the other embodiments. Moreover, the mobile mirror is poorly suited to quick changes in the illuminating wave between very different frequencies. And these changes were necessary in the third embodiment for obtaining the reference images which allowed phase corrections for the two-dimensional representations obtained on the sensor opposite the point of direct impact of the illuminating wave. For this reason, a phase correction method requiring neither a reference image nor acquisition of the point corresponding to the direct illumination must be provided for in this embodiment.

Paragraph 9.2. describes materially the microscope used, and Paragraph 9.3. gives the applicable dimensioning principles. As the microscope has a material design differing significantly from Embodiment 3, its adjustment and its utilization also differ considerably from the adjustment and utilization of the microscope according to Embodiment 3.

The microscope entails a series of adjustments carried out in the absence of the sample:

Position adjustment for the different elements takes place as described in Paragraph 9.5. This adjustment involves an image acquisition procedure described in Paragraph 9.4.

The arrays allowing the control of the beam deflection mirror are determined as described in Paragraph 9.6.

The arrays allowing the control of the glasses (5165) and (5191) used to eliminate the direct illuminating beam are determined as described in Paragraph 9.7.

The constant K, equivalent to the one used in the first embodiment, is determined as described in 9.8.

The position of the CCD sensors entails a fine adjustment described in Paragraph 9.10.

The array characterizing the frequency response of the sensors is determined as described in Paragraph 9.11.

The relative coordinates of the central points of the images obtained on each side of the microscope are determined as described in Paragraph 9.12.

The phases of each illuminating beam are determined as described in Paragraph 9.13.

After placing the sample, the microscope undergoes a number of additional adjustments:

The position of objectives is adjusted as described in Paragraph 9.14.

The relative coordinates x,y,z of the origins of the reference beams associated with each objective, as well as the average index $n_o$ of the sample and its thickness L, are determined as described in Paragraph 9.15.

The value $w_0$ characterizing the position of the sample is calculated as described in Paragraph 9.16. The procedure described in Paragraph 9.16. is essentially similar to the one described in Paragraph 7.15. and comprises in particular a first focussing adjustment.

The aberration compensation function $D_p$ is obtained as described in Paragraph 9.17.

When these adjustments have been completed, the procedure for obtaining three-dimensional images is started. A version of this procedure, similar to the one described for the third embodiment, is described in 9.18. A specifically adapted version of this procedure is described in 9.19. In every case, the two-dimensional frequency representations are acquired using a procedure described in Paragraph 9.9., which is also used in certain adjustment steps.

Although this is not mentioned, a focussing adjustment similar to the one described in 7.17.3. is carried out, which may involve a recalculation of $w_0$ and $D_p$.

A very simplified version of the functioning of this microscope is described in 9.20.

After algorithmic modifications similar to those described in 7.20 and 7.21, this embodiment can be adapted to the use of objectives exhibiting aberrations.

9.2. Material description

An overall diagram of the system is represented in FIGS. 73,74,63. The plane of FIGS. 73 and 74 is horizontal. The assembly (5176) surrounded by dotted lines in FIG. 74 is identical to the corresponding assembly in the fourth embodiment and is represented in FIG. 63.

A laser polarized in the vertical direction (5100) produces a beam whose electric field vector is thus directed along an axis orthogonal to the plane of the figure. This beam then passes through a beam expander (5101).

The beam is then split in two by a semi-transparent mirror (5102). One of the beams coming from (5102) passes through a lens (5103) then a shutter (5104) placed in the focal plane of this lens. It then passes through a second lens (5105) whose front focal plane coincides with the rear focal plane of (5103), and is then reflected by a mirror (5106) and a semi-transparent mirror (5112). The part of the beam which is not reflected by (5112) strikes an absorbing surface (5253). The second beam coming from (5102) is reflected by a mirror (5107), passes through a lens (5108) then a shutter (5109) placed in the focal plane of this lens. It then passes through a second lens (5110) whose front focal plane coincides with the rear focal plane of (5108). It then passes through a retardation plate (5111) and then through mirror (5112). On exiting the mirror (5112) the two beams coming from the semi-transparent mirror (5102) are again superimposed. The focal lengths of the lenses (5103) (5105) (5108) (5110) are equal. The retardation plate (5111) introduces an optical path difference of a half-wavelength between its two neutral axes. It is positioned so as to transform the entering beam polarized in the vertical direction into a beam polarized in the horizontal direction. The small spatial extension of the beam passing through the shutters (5104) (5109) allows the use of fast mechanical shutters, a small displacement being sufficient to shutter the beam.

The beam coming from (5112) is directed towards the mirror (5113) which reflects it. This mirror on a two-axis positioner (5114) similar to the one represented in FIGS. 2 and 3, which enables control of its orientation. It is placed at the rear focal point of the lenses (5110) and (5105). The beam coming from (5113) then goes through the lens (5250) whose front focal point is on (5113), then the lens (5251) whose front focal point coincides with the rear focal point of (5250). It is then reflected by a partially transparent mirror (5115) which produces a reference beam directed towards (5117). The semi-transparent mirror (5117) then splits the reference beam into a right reference beam FRD and a left reference beam FRG. The beam having passed through (5115) then goes through a partially transparent mirror (5116) which separates a specific FS beam from it. The beam having passed through (5116) is then split by a semi-transparent mirror (5118) into a right illuminating beam FED and a left illuminating beam FEG.

The beam FRD first passes through a lens (5120) whose front focal point coincides with the rear focal point of (5251), then a second lens (5121) whose front focal point coincides with the rear focal point of (5120). It is then reflected by a mirror (5122) placed at the rear focal point of (5121) and mounted on a piezoelectric stack (5123) producing displacements of the order of the wavelength, which constitutes the phase shift device, on the same principle as the element (122) of FIG. 1. It then passes through a filter (5124) allowing the adjustment of its intensity, and then a lens (5125) whose front focal point is on the mirror (5122). It then passes through a lens doublet (5127)(5126) operating according the principle explained in 8.1.4.1., the front focal point of the doublet (5127)(5126) coinciding with the rear focal point of (5125). It is then split into two beams by a partially transparent mirror (5234). One of these beams is then reflected by the mirror (5235), passes through a retardation plate (5239), is then reflected in part towards the CCD (5174) by the partially transparent mirror (5236), the non-reflected part being stopped by an absorbing surface (5237). The other beam passes through a retardation plate (5238), is then reflected in part towards the CCD (5171) by the partially transparent mirror (5232), the non-reflected part being stopped by an absorbing surface (5233). The CCDs (5174) and (5171) are mounted respectively on cameras (5175) and (5172). They are each in an rear focal plane of the doublet (5126)(5127).

The beam FRG is reflected by a mirror (5252). It passes through a lens (5145) whose front focal point coincides with the rear focal point of (5251), then a second lens (5146) whose front focal point coincides with the rear focal point of (5145). It is reflected by a mirror (5147) placed at the real focal point of (5146) and mounted on a piezoelectric stack (5148) which constitutes the phase shift device. It then passes through a filter (5149) allowing the adjustment of its intensity, then a lens (5150) whose front focal point is on the mirror (5147). It then passes through a lens doublet (5151) (5152) functioning according to the principle explained in 8.1.4.1., the front focal point of the doublet (5151)(5152) coinciding with the rearfocal point of (5150). It then passes through a rotation adjustment device of the type described in 8.1.4.2., made up of the mirrors (5219) (5220) and of the assembly (5221) made up of the mirrors (5214) (5215) (5216) (5217), and mobile in rotation around an axis passing through the center of the mirrors (5220)(5214)(5217). It is then split into two beams by a partially transparent mirror (5244). One of these beams is then reflected by the mirror (5245), passes through a retardation plate (5249), is then reflected in part towards the CCD (5198) by the partially transparent mirror (5246), the non-reflected part being stopped by an absorbing surface (5247). The other beam passes through a retardation plate (5248), is then reflected in part towards the CCD (5201) by the partially transparent mirror (5242), the non-reflected part being stopped by an absorbing surface (5243). The CCDs (5198) and (5201) are mounted respectively on the cameras (5199) and (5202). They are each in an rear focal plane of the doublet (5151) (5152).

The beam FED is reflected by a mirror (5141), passes through a filter (5142) allowing the adjustment of its intensity, a lens (5143) whose front focal point coincides with the rear focal point of (5251), a shutter (5144), and a lens (5154) whose front focal plane coincides with the rear focal plane of (5143) and whose rear focal plane coincides with the image of the diaphragm (5158) through the lens (5157). It is reflected by mirrors (5153) and (5155), then split into two beams by a partially transparent mirror (5156). One of the beams, directed towards (5157), is the main beam and will be denoted FED. The other beam, directed towards (5159), constitutes the opposite indicator of FED and will be denoted FEDI.

The beam FED passes through the lens (5157), the diaphragm (5158), the device (5176) represented in FIG. 63, passes through the diaphragm (5184) and the lens (5183). A focal plane of the lens (5157) coincides with the rear focal plane of the microscope objective (4317) [in the conventional direction of the use of the objective, here opposite to the direction of the rays]. A focal plane of the lens (5183) coincides with the rear focal plane of the microscope objective (4319). The diaphragms (5158) and (5184) are placed in the planes in which the objectives normally form the images of the sample. The beam coming from (5183) passes through the semi-transparent mirror (5182). It passes through the lens (5188) whose front focal plane coincides with the image of the diaphragm (5184) through the lens (5183). It then passes through a glass (5191) of small thickness, on which there is an absorbing black spot a few tens of micrometers in diameter. This glass is positioned in the rear focal plane of the lens (5188) and is designed to stop the direct illuminating beam. A diaphragm (5190) placed roughly in the same plane improves the filtering of spatial frequencies carried out by the microscope objective. The beam then passes through a doublet (5192)(5193) whose front focal plane coincides with the glass (5191). It is then split into two beams by a semi-transparent mirror (5240). One of the beams from (5240) reaches the CCD (5198) after having passed through the partially transparent mirror (5246). The other beam is reflected by the mirror (5241) and reaches the CCD (5201) after having passed through the partially transparent mirror (5242). The CCDs (5198) and (5201) are each in an rear focal plane of the doublet (5192)(5193).

The beam FEDI passes through the lens (5159) whose focal plane coincides with the rear focal plane of the lens (5154). It reaches the mirror (5160), optionally closed off by the shutter (5161), which reflects it. It again passes through the lens (5159) and is reflected by the semi-transparent mirror (5156) towards the lens (5162). It passes through the lens (5162) whose front focal plane coincides with the image of the diaphragm (5158) through the lens (5157). It then passes through the partially transparent mirror (5163). Then it passes through a glass (5165) of small thickness on which there is an absorbing black spot a few tens of micrometers in diameter. This glass is positioned in the rear focal plane of the lens (5162) and is designed to stop the direct illuminating beam. An optional diaphragm (5164) placed roughly in the same plane improves the filtering of spatial frequencies carried out by the microscope objective. The beam then passes through a lens (5166) whose front focal plane coincides with the rear focal plane of (5162). It is then split into two beams by a semi-transparent mirror (5230). One of the beams coming from (5230) reaches the CCD (5174) after having passed through the partially transparent mirror (5236). The other beam is reflected by the mirror (5231) and reaches the CCD (5171) after having passed through the partially transparent mirror (5232). The CCDs (5174) and (5171) are each in an rear focal plane of the lens (5166).

The beam FEG is reflected by the mirrors (5119) (5204), passes through a filter (5205) enabling its intensity to be adjusted, a lens (5206) whose front focal point coincides with the rear focal point of (5251), a shutter (5207), a doublet (5179)(5178) whose front focal plane coincides with the rear focal plane of (5206) and whose rear focal plane coincides with the image of the diaphragm (5184) through the lens (5183). It then passes through a rotation adjustment device of the type described in 8.1.4.2., made up of mirrors (5177) (5180) and of the assembly (5181) made up of the mirrors (5210) (5211) (5212) (5213), and mobile in rotation around an axis passing through the center of the mirrors (5180) (5210) (5213). It is then split into two beams by a partially transparent mirror (5182). One of the beams, directed towards (5183), is the main beam and will be denoted FEG. The other beam, directed towards (5185), constitutes the reverse indicator of FFG and will be denoted FFG1.

The beam FEGI passes through the lens (5185) whose focal plane coincides with the rear focal plane of the doublet (5178) (5179). It reaches the mirror (5187), optionally closed off by the shutter (5186), which reflects it. It then passes again through the lens (5185) and is reflected by the semi-transparent mirror (5182) towards the lens (5188).

The beam FS first passes through a filter (5128), then a lens (5129) and is reflected by a mirror (5130). It then passes through a shutter (5254), then a lens (5140) whose front focal point coincides with the rear focal point of (5129). It is then split by a semi-transparent mirror (5163) into a main beam FS directed towards (5162) and an opposite indicator beam directed towards (5189), which will be denoted FSI. The beam FSI passes through a lens (5189), is reflected on a mirror placed at the front focal point of (5189) and capable of being closed off by a shutter (5209), passes again through the lens (5189) and is again reflected by the semi-transparent mirror (5163) in the direction of (5164).

Each lens used is an achromat or a composite lens minimizing optical aberrations.

The beam control principles indicated in 8.1.1. and 8.1.4. remain valid, and the spatial (E) and frequency (F) planes have been indicated in the same manner as for the fourth embodiment. The reference wave here is parallel, as is the illuminating wave and as in the second embodiment. For this reason it is a point wave in the frequency planes and parallel in the spatial planes like the illuminating wave. The special beam FS is, by contrast, a point beam in the spatial planes and parallel in the frequency planes, as was the reference wave in the fourth embodiment.

Many of the elements are mounted on positioners enabling the adjustment of their position in an adjustment phase.

The assemblies (5181) and (5221) are mounted on rotation positioners, in according with their operating mode explained in 8.1.4.2.

The other mirrors, partially transparent and piezoelectric mirrors, are mounted on angular positioners allowing the adjustment of their orientation.

The lenses which will be adjusted in 9.5. are mounted on single-dimension positioners allowing a displacement in the direction of the optical axis.

Each doublet is made up of two lenses. It transforms a frequency plane located on one side of the doublet into a spatial plane located on the other side of the doublet. The lens located on the side of the spatial plane is mounted on a positioner allowing translation in the direction of the optical axis. This positioner is itself mounted on a second positioner also allowing translation in the direction of the optical axis. The second lens is mounted directly on this second positioner.

The objective (4317) is mounted on a two-dimension positioner allowing positioning in a plane orthogonal to the optical axis. The objective (4319) is mounted on a focussing device. The sample (4318) is mounted a three-axis translation positioner.

The CCDs are mounted on single-axis rotation positioners and three-axis translation positioners allowing rotation around the optical axis and three degrees of freedom in translation.

The broken line (5203) separates two zones. The elements located on the left of this line are mounted on a table linked directly to the ground without shock absorption. The elements located on the right of this line or in FIG. 74 are mounted on an optical table suitably isolated from vibrations. The two arrays are at the same level. The glasses (5165) and (5191), the diaphragms (5164) and (5190), and the shutters (5144) (5207) are the only exceptions to this rule. Each of the glasses (5165) and (5191) is mounted on a powered two-axis translation positioner allowing displacement in a plane orthogonal to the optical axis, itself mounted on a manual positioner manual allowing translation in the direction of the optical axis, itself linked directly to the ground. The two-axis translation positioning system must be precise and not produce spurious rotational displacements of the glass. Such displacements would lead to phase variations that may in certain cases be detrimental to the quality of the images produced.

Each of the shutters (5144) (5207) is linked directly to the ground. Each of the diaphragms (5164) (5190) is linked to the floor via a three-axis translation positioner and a single-axis rotation positioner around the optical axis.

In order to be able to link the glasses and shutters to the floor, a rigid mechanical construction is used to obtain a stable support located over the optical table, linked to the ground and not to the optical table, and on which can be fixed the shutters as well as the glasses via their positioners.

The diaphragms (5164) and (5190) are made up as indicated in FIG. 82. The diaphragm (5710) has a circular aperture (5711), a part (5712) allowing the shuttering of an additional surface portion in this aperture.

On each camera has been indicated the system of coordinates used to express the coordinates of the pixels of the corresponding CCD. On each retardation plate has been indicated a system of coordinates. The direction vector of this system in the plane of the figure is denoted $\vec{i}$ and the direction vector of this system in the plane orthogonal to the figure is denoted $\vec{j}$. The retardation plate (5111) has a neutral axis directed along $\vec{i}+\vec{j}$. The other retardation plates have neutral axes directed along $\vec{i}\cos\pi/8+\vec{j}\sin\pi/8$.

If this microscope operates in the ultraviolet domain:
All the non-polarizing components traversed by the light, i.e. the lenses, including those of the objectives, the glasses, and the substrates of semi-transparent mirrors, can be made of a silica. Objectives in silica or in quartz are available from various manufacturers.
The mirrors and semi-transparent mirrors must be designed specially for UV.
The retardation plate are for example in quartz.
The laser is for example an excimer laser. In pulsed mode, the pulses must be synchronized with image acquisition, for example one image per pulse.

9.3. Dimensioning

The following notation is used:
$f_1$: focal length of the lens (5162) or of the lens (5188)
$f_2$: focal length of the lens (5166) or of the doublet (5192, 5193)
$f_3$: focal length of the lens (5157) or of the lens (5183)
$p_c$: distance between centers of two adjacent pixels on the CCD sensors
$2 N_{pix}$: side dimension in pixels of a CCD sensor
$o$: numerical aperture of a microscope objective
$g$: magnification of a microscope objective
$f_o$: focal length of a microscope objective.
$d_o$: distance between the lens (5157) and the diaphragm (5158).
$l_1$: width of the diaphragm (5164) or (5190)

The lens (5157) must have its front focal plane coincident with the rear focal plane of the microscope objective, and is located at a distance $d_o$ from the image of the objective. We check that this means:

$$f_3 = g f_o + d_o$$

The aperture of the beam upon reaching the CCD is:

$$\alpha = \frac{f_1}{f_2}\frac{o}{g}$$

The sampling period required on the CCD must be greater than $p_c$ and is equal, by applying the Nyquist criterion, to:

$$\frac{\lambda}{2}\frac{1}{2\alpha}$$

We thus obtain:

$$p_c \leq \frac{\lambda}{4}\frac{f_2}{f_1}\frac{g}{o}$$

where $$\frac{f_1}{f_2} \leq \frac{\lambda}{4p_c}\frac{g}{o}$$

The ratio $f_1/f_2$ must thus be equal or slightly lower than $$\frac{\lambda}{4p_c}\frac{g}{o},$$

each of the values $f_1$ and $f_2$ being moreover sufficient to prevent spherical aberration.

The width $l_1$ of the diaphragm (5164) must filter only the frequencies higher than the nominal aperture of the objective. We must thus have $l_1 = 2f_1 o/g$.

The diameter of the beam incident on the mirror (5113) must be such that the required direction variations are in fact obtainable in a reproducible manner by means of the positioning system of this mirror. We denote as $p_\alpha$ the angular displacement interval of the mirror, i.e. the smallest variation of the angle or orientation of this mirror obtainable in a reproducible manner by the positioning system of this mirror. We denote as $D_{diaph}$ the aperture diameter of the diaphragm (5158) and as $D_{mir}$ the diameter of the beam incident on the mirror (5113). We then check that the present condition is expressed by:

$$p_\alpha << \frac{o}{gN_{pix}}\frac{D_{diaph}}{D_{mir}}$$

in which the sign <<means << much smaller >>, or for example $$p_\alpha < \frac{1}{10}\frac{o}{gN_{pix}}\frac{D_{diaph}}{D_{mir}}.$$

In addition to the preceding criteria, a fairly large amount of liberty exists for the choice of the focal lengths of the other lenses. The dimensioning criteria applied to the path of the beams FEG,FED,FRG,FRD are the following:
(1). The succession of the spatial and frequency planes must be as indicated in the diagram. This succession of spatial and frequency planes constitutes the method used to control the path and aperture of the beam as indicated in 8.1.1.
(2). The illuminating and reference beams, in the absence of the diaphragm used between the mirror (5113) and the CCD sensors, must have the same diameter when they reach the sensors. Equivalently, they must have the same aperture, the aperture here being the angle between the parallel beams reaching the CCDs for two different positions of the mirror (5113).

(3). The focal lengths of the lenses must be sufficient to prevent spherical aberration.

(4). The focal lengths of the different lenses are adapted in order to comply with dimensional constraints.

For example, if the diameter of the beam is $D_1$ at the level of (5122) and must be $D_2$ at its arrival on the CCD sensor, and if the distance between (5122) and (5174), following the path adopted for the beam, is L, then if $f_a$ and $f_b$ are respectively the focal lengths of the lens (5125) and of the doublet (5126)(5127), and given the principles set forth in 8.1.1., the criterion (1) is $$\frac{D_2}{D_1} = \frac{f_b}{f_a}$$

and the criterion (4) is $2f_a+2f_b=L$, yielding $$f_a = \frac{L}{2}\frac{D_1}{D_1+D_2}$$

and $$f_b = \frac{L}{2}\frac{D_1}{D_1+D_2}.$$

The entire system will be adjusted so that, when the beam FEG penetrates into the objective (4317), being directed along the optical axis, its direction upon arrival on (5174) or (5171) coincides with that of the reference wave. When the mirror (5113) is to be displaced from this central position, the direction of the reference beam will be modified in one direction and the direction of the illuminating beam will be modified in the opposite direction, i.e. in a frequency plane the points corresponding to the beams FEG and FED will remain symmetrical in relation to the point corresponding to the illuminating beam when it enters the objective in the direction of the optical axis. The maintenance of this symmetry is made possible by:

the general configuration of the apparatus. In fact, following the diagram in FIG. 67, when the beam passes from one spatial plane (4801) to a second spatial plane (4804), its direction is reversed. In the adopted configuration, the difference between the number of spatial planes traversed by the illuminating beam and the number of spatial planes traversed by the reference beam is an odd number, and the illuminating beam is thus reversed in relation to the reference beam.

compliance with condition (3), which means that the displacement of the reference beam and the displacement of the illuminating beam are of the same amplitude.

This displacement symmetry allows the simplification of the algorithms and the adjustment procedure.

The dimensioning criteria applied to the path of the beam FS are the following:

the beam FS must be parallel upon its arrival on (5163)

its width upon its arrival on (5163) must be equal to that of a beam which would be a point beam in the plane (5158) and whose aperture would be limited by the aperture of the objective. This width, upon the arrival of the beam on (5163), is equal to about $f_1o/g$.

9.4. Obtaining a simple two-dimensional frequency representation and determining the maximum What is meant here by a simple two-dimensional frequency representation is a representation for which no account has been taken of polarizations, and which can be obtained without knowing the values of K and of the point of direct impact of the illuminating wave, from a single sensor. The steps in producing such a representation, for a given illuminating wave, are the following:

Step 1—Acquisition (5104) is open and (5109) is closed, so that the polarization of the illuminating wave is fixed.

d is defined as follows, the phase shift being produced with the piezoelectric actuators (5123) (5148) previously calibrated:

| Index d | Phase shift(degrees) |
|---|---|
| 0 | +120 |
| 1 | 0 |
| 2 | −120 |

The image is obtained from any one of the CCD sensors. When it is obtained by means of (5171) or (5201), the phase retardation plates (5238) and (5248) must be eliminated.

One thus obtains the arrays MF[d][i,j] in which i and j vary from 0 to $2N_{pix}-1$.

Step 2—Calculation of Two-dimensional Spatial Representations

The program performs:

MG[i, j]=1/6(2MF[0][i, j]−MF[1][i, j]−MF[2][i, j])+j1/2
√3(MF[1][i, j]−MF[2][i, j])

Step 3—Fourier Transformation

The Fourier transform of the array MG according to the indices i andj is performed. This generates the frequency representation MH[i, j] in which p takes on the values of 0 or 1 and in which i andj vary from 0 to $2N_{pix}-1$. In certain cases, this Fourier transformation may be omitted: one then obtains a spatial representation instead of a frequency representation.

When the image is roughly a point image and the coordinates and the value of the maximum must be known, the maximum calculation program proceeds as indicated in 7.3.3.1., except that the array S now has the dimensions $2N_{pix} \times 2N_{pix}$ and is the array MH calculated as above. It thus obtains the coordinates imax,jmax of the maximum on the sensor concerned. The image is considered to be centered if (imax, jmax)=$(N_{pix}, N_{pix})$ and it is considered to be a perfect point image when the value of the maximum obtained is the highest possible value.

9.5. Adjustment of manual Positioners 9.5.1. Adjustment criteria

FEP designates a plane illuminating beam entering the objective (4317), being directed along the optical axis and reaching the sensors (5174) (5171).

The adjustments are designed to ensure that:

(1) the beams follow the appropriate path.

(2) the illuminating and reference beams are point beams in the frequency planes and parallel in the spatial planes.

(3) the beams FS and FSI are point beams in the spatial planes (4) the beams FS and FSI have point images centered on the sensors (5171) (5174) (5201) (5198).

(5) a parallel beam FEP entering a microscope objective (4317) and directed along the optical axis has a point image centered on the two-dimensional frequency representations obtained using the procedure 9.4. from images received on the sensors (5174) or (5171).
(6) When the image of the beam FEG on the two-dimensional frequency representations obtained using the procedure 9.4. from images received on sensors (5174) or (5171) is a point image and is centered, then the image of the beam FEGI on the two-dimensional frequency representations obtained using the procedure 9.4. from the images received on the sensors (5198) or (5201) is a point image and is centered.
(7) Whatever the position of the mirror (5113):
   the points corresponding to the beams FRD, FEDI, FEG, FEP on the two-dimensional frequency representations obtained with the procedure 9.4. from the images received on the sensors (5174) or (5171) are arranged as indicated in FIG. 78
   the points corresponding to the beams FRG, FEGI, FED on the two-dimensional frequency representations obtained with the procedure 9.4. from the images received on the sensors (5198) or (5201) are arranged as indicated in FIG. 79.

To explain further this condition, we shall denote in the same manner a beam and the corresponding point on one of the sensors and we shall denote as (A,B) the vector linking the points A and B. This condition means that:
(i) FRD and FEDI are on the same vertical line.
(ii) FEDI and FEG are on the same horizontal line.
(iii) FEP is in the middle of FRD and FEG
(iv) (FRG,FEGI)=(FRD,FEDI)
(v) (FEGI,FED)=(FEG,FEDI)

The adjustments result naturally from the compliance with conditions (1) to (7). The rest of the adjustment steps given in detail below constitute an example of the ordering of these adjustments.

9.5.2. Adjustment steps

In certain adjustment phases, a temporarily parallel beam denoted FEP will be used. This beam is derived directly from the (5100) by means of a semi-transparent mirror and directed towards the input of the objective (4317), which it reaches while being directed along the optical axis, and which it traverses before going to the sensors (5171) and (5174).

The setup of FEP requires the temporary elimination of the objective (4319). The parts of the system said to be "linked to the ground" are in fact linked to a flat support ordinarily placed on the ground or on a table without any particular precautions, the optical table itself being placed, via shock absorbers, on this flat support. During all the adjustments described in the present paragraph, the optical table will be connected to the flat support, i.e. fixed without shock absorption and without freedom of movement to the flat support, in a position as close as possible to the position of the optical table when it is "free" on its shock absorbers. The flat support itself will be fixed on a second optical table. This device makes it possible to generate interference patterns using the beam FEP, which would be impossible because of the vibrations if said flat support were fixed directly to the ground as in the normal operating phase of the microscope.

The use of the beams FEG,FED,FEGI,FEDI,FS,FSI is controlled by the shutters (5144) (5207) (5218) (5209) (5161) (5186) (5254). Shutters not represented also allow the elimination of the beams FRD and IFRG. On an image of dimensions $2N_{pix} \times 2N_{pix}$ a point will be said to be centered if its coordinates are $(N_{pix}, N_{pix})$.

The following steps constitute an example of the ordering of adjustments:

Step 1: Pre-adjustment
A pre-adjustment is carried out, during which the mirror is positioned in a central position and the path of the beam is controlled with a diffuser. During this pre-adjustment, the position of all the elements is adjusted so that the beam follows approximately the appropriate path. For example, at the exit of (5112), the proper spatial superposition of the beams is checked. Between (5156) and (5159), we check that the reflected beam ahs the same spatial extension as the arriving beam.

During all the adjustments which follow, this pre-adjustment may be constantly verified or refined, with the aid of the diffuser, without this being restated. In the case of work in the UV domain, it is dangerous to display the light directly. The diffuser is then replaced by an auxiliary CCD, and the area illuminated on this CCD is observed on a screen instead of observing it directly.

Step 2: Translation Adjustment of the Lens (5105)
The frequency-meter is positioned behind the lens (5105) and the position of the lens is adjusted to have a point image on the frequency-meter.

Step 3: Translation Adjustment of the Lens (5110)
The frequency-meter is positioned behind the lens (5110) and the position of the lens is adjusted to have a point image on the frequency-meter.

Step 4: Orientation Adjustment of the Semi-transparent Mirror (5112)
The frequency-meter is used and positioned behind (5112). The shutters (5104) and (5106) being opened and closed alternately, the integrated image produced on the sensor of the frequency-meter consists of two points coming from each of the superimposed beam. The angular position of (5112) is adjusted so as to superimpose these two points.

Step 5: Translation Adjustment of the Lens (5251)
The frequency-meter is positioned behind the lens (5251) and the position of the lens is adjusted to have a point image on the frequency-meter.

Step 6: Translation Adjustment of the Lens (5121)
The frequency-meter is positioned behind the lens (5251) and the position of the lens is adjusted to have a point image on the frequency-meter.

Step 7—Translation Adjustment of the Doublet (5127) (5126)
The frequency-meter is placed behind (5127) on the path of the beam and the doublet is moved so that the image on the CCD of frequency-meter is a point image.

Step 8—Translation Adjustment of the Lens (5146)
This adjustment is carried out by means of the frequency-meter, placed behind (5146). The image on the CCD of the frequency-meter must be as close as possible to a point image.

Step 9—Translation Adjustment of the Doublet (5151) (5152)
The frequency-meter is placed behind (5152) on the path of the beam and the adjustment is carried out so that the image on the CCD of the frequency-meter is a point image.

Step 10—Translation Adjustment of the Lens (5140)
The adjustment is carried out by means of the frequency-meter placed behind (5140). The image on the CCD of the frequency-meter must be a point image.

Step 11—Translation Adjustment of the Lens (5154)
The frequency-meter is placed behind (5154). The image on the CCD of the frequency-meter must be a point image.

Step 12—Translation Adjustment of the Doublet (5178) (5179)
The frequency-meter is placed for example behind (5213). The image on the CCD of the frequency-meter must be a point image.

Step 13—Translation Adjustment of the Lens (5159)

The frequency-meter is placed between (5156) and (5162). The position of (5159) is adjusted so that the image of FEDI on the CCD of the frequency-meter is a point image.

Step 14—Introduction of a Temporary Parallel Illuminating Beam FEP

This beam has the characteristics described at the beginning of the present paragraph.

Step 15—Translation Adjustment of the Lens (5157)

The frequency-meter is placed between (5156) and (5162). The position of (5157) is adjusted so that the image of FEP on the CCD sensor of the frequency-meter is a point image.

Step 16—Orientation Adjustment of the Semitransparent Mirror (5156)

The position of (5156) is adjusted so that FEP and FEDI have point images coinciding on the frequency-meter.

Step 17—Translation Adjustment of the Lens (5162)

A CCD is temporarily placed at the location of (5158). FS is used. (5162) is adjusted so that the image of FS on this temporary CCD is a point image.

Step 18: Orientation Adjustment of the Partially Transparent Mirror (5163)

The CCD remains used with the beam FS. (5163) is adjusted so that the image of FS on this temporary CCD is centered in relation to the location of the diaphragm.

Step 19—Translation Adjustment of the Lens (5189)

The frequency-meter is positioned between (5163) and (5164). (5189) is adjusted to obtain a point image of FSI on the frequency-meter.

Step 20—Translation Adjustment of the Lens (5166)

FEDI is used. The frequency-meter is positioned on the path of the beam behind (5166) and the position of (5166) is adjusted so that the image of FEDI on the frequency-meter is a point image.

Step 21—Three-axis Translation Adjustment of the Sensors (5174) and (5171)

FSI and FRD are used. A program calculates the two-dimensional frequency representation received on each CCD (5174) or (5171) according to the procedure described in 9.4., but without carrying out Step 3 with its Fourier transformation. The position of the CCDs is adjusted to obtain, from each CCD, a centered point image.

Step 22—Orientation Adjustment of the Partially Transparent Mirror (5236)

FRD and FEDI are used. A program calculates the two-dimensional frequency representation received on the CCD (5174) according to the procedure described in 9.4.

The position of (5236) is adjusted so that the two-dimensional frequency representation obtained on each CCD is centered.

Step 23—Orientation Adjustment of the Partially Transparent Mirror (5232)

FRD and FEDI are used. A program calculates the two-dimensional frequency representation received on the CCD (5171) according to the procedure described in 9.4.

The position of (5232) is adjusted so that the two-dimensional frequency representation obtained on each CCD is centered.

Step 24—Adjustment of the Focal Length of the Doublet (5126) (5127) and Rotation Adjustment Around the Optical Axis of the Sensors (5174) (5171)

The beams FRD, FEP are used. A program calculates the two-dimensional frequency representation received on each CCD (5174) o' (5171) according to the procedure described in 9.4.

The initial position of the mirror (5113), in which the preceding adjustments were carried out, is the centered position. It must be recorded. It will be called position C.

The mirror (5113) is moved so that, on the two-dimensional frequency representation obtained on each CCD (5174) or (5171), the point corresponding to FEP is off centered as much as possible. This position of the mirror is recorded and will be used again later. It will be called position E.

The beam FEDI is introduced.

The positions of the different elements are adjusted so that, on each of the two representations obtained:

the coordinates of the points associated with FRID (central point) and FEDI are correct in relation to those of the point associated with FEP, i.e. symmetrical in relation to the horizontal axis passing through the point associated with FEP, as indicated in FIG. 78 where (5501) represents the contour of the two-dimensional area obtained after the procedure described in 9.4. and in which (5502) represents the limit defined by the aperture of the objective.

the images of FEP and FEDI remain point images.

More precisely:

the focal length of the assembly (5126) (5127) is adjusted so that the distance between the point associated with FEP and the point associated with FRRD is equal to the distance between the point associated with FEP and the point associated with FEDI. As the changes in the position of the lenses of the doublet can produce a loss of focus, the positions of the lenses of the doublet are also adjusted so that the image of FEP and FEDI remains a point image.

the rotation position of the sensors is adjusted so that the line passing through the points associated respectively with FRD and FEDI is vertical.

Owing to the non-coincidence of the axis of rotation of the CCDs with the central point of these sensors, this rotation adjustment can result in a loss of the translation adjustment of the CCDs. For this reason, after this operation, the mirror is brought back to position C and Step 21 is carried out again. Steps 21 and 24 can thus be repeated in sequence a certain number of times so as to converge towards a correct translation and rotation adjustment of the sensors.

Step 25—Translation Adjustment of the Position of Objectives (4319) and (4317)

The mirror (5113) is brought back to its original position (position C), the beam FEP is eliminated, the objectives are put back in place. A temporary CCD is positioned at the location of (5184). The beam FS is the only one used. A transparent plate is used as the object.

The position of the objectives is adjusted to obtain a centered point image.

Step 26—Translation Adjustment of the Lens (5183)

The beam FED is used. The frequency-meter is positioned behind (5183) on the path of FED. (5183) is adjusted so that FED has a point image on the frequency-meter.

Step 27—Translation Adjustment of the Doublet (5178) (5179) and Orientation Adjustment of the Semi-transparent Mirror (5182)

The beams FEG and FRD are used. A two-dimensional frequency representation is obtained from the CCDs (5174) or (5171) by the procedure 9.4.

The joint position of the doublet (5178) (5179) is adjusted so that the representation obtained is a point representation. The semi-transparent mirror (5182) is adjusted so that this image is centered.

Step 28—Adjustment of Focal Length of Doublet (5178) (5179), Rotation Adjustment of the Assembly (5181), and Orientation Adjustment of the Semi-transparent Mirror (5182).

The beams FRD, FEG are used. A two-dimensional frequency representation is obtained from the CCDs (5174) or (5171) by the procedure 9.4. The operations o1 and o2 above must be repeated in this order a certain number of times to converge towards a correct adjustment.

o1: The Mirror (5113) is Put in Position C and the Semi-transparent Mirror (5182) is Adjusted so that the Point of the Frequency Representation Corresponding to FEG is Centered o2: The Mirror (5113) is Put in Position E (Offcentered)

The different elements are adjusted so that the point corresponding to FEG obtained on the image is correctly positioned in relation to the others. The point corresponding to FEP is known by the adjustment carried out in Step 24. The point corresponding to FEG must be symmetrical with the point corresponding to FRD in relation to the point corresponding to FEP as indicated in FIG. 78.

More precisely:
the focal length of the doublet (5178)(5179) is adjusted so that the distance between the points corresponding to FRD and FEP is equal to the distance between the points corresponding to FEP and FEG. As changes in the position of the doublet lenses can produce a loss of focus, the positions of the doublet lenses are also adjusted so that the image of FEG remains a point image.

the rotation position of the assembly (5181) is adjusted so that the points FRD, FEP and FEG are aligned.

Step 29—Translation Adjustment of the Lens (5185)

The mirror (5113) is brought back to position C. The frequency-meter is positioned between (5182) and (5188). The position of (5185) is adjusted so that the image of FEGI on the frequency-meter is a point image.

Step 30—Translation Adjustment of the Lens (5188)

The beam FS is used. The frequency-meter is positioned behind (5188). The position of (5188) is adjusted so that FS has a point image on the CCD of the frequency-meter.

Step 31—Translation Adjustment of the Doublet (5192)(5193)

FEGI is used. The frequency-meter is positioned behind (5193). The joint position of (5192)(5193) is adjusted so that FEGI has a point image on the CCD of the frequency-meter.

Step 32—Three-axis Translation Adjustment of the Sensors (5198) and (5201)

FS and FRG are used. A program calculates the two-dimensional frequency representation received on each CCD (5198) or (5201) according to the procedure 9.4., but without carrying out Step 3 with its Fourier transformation. The position of the CCDs is adjusted to obtain from each CCD a centered point image.

Step 33—Orientation Adjustment of the Partially Transparent Mirror (5246)

FRG and FEGI are used. A program calculates the two-dimensional frequency representation received on the CCD (5198) according to the procedure 9.3.1.

The position of (5246) is adjusted so that the two-dimensional frequency representation obtained is centered.

Step 34—Orientation Adjustment of the Partially Transparent Mirror (5242)

FRG and FEGI are used. A program calculates two-dimensional frequency representation received on the CCD (520 1) according to the procedure 9.3.1.

The position of (5242) is adjusted so that the two-dimensional frequency representation obtained is centered.

Step 35—Adjustment
of the focal length of the doublet (5151) (5152)
of the focal length of the doublet (5192)(5193)
of the assembly (5212) in rotation
of the CCDs (5198) and (5201) in rotation around the optical axis The beams FRG, FED, FEGI are used. The mirror (5113) is put back in position E (offcentered).

A program calculates the two-dimensional frequency representation received on the CCDs (5198) (5201) according to the procedure 9.3.1.

The positions of all the elements are adjusted so that:
the coordinates of the points associated with FRG, FED, FEGI are correct, i.e. with the notations used in 9.5.1.: (FRG,FEGI)=(FRD,FEDI) and (FEGI,FED)=(FEG, FEDI) in which the positions of the points FRD,FEG, FEDI are those which were obtained during Steps 24 and 28, all these points being represented in FIGS. 78 and 79.

the images of FEP and FEG remain point images

More precisely:
The focal length of the doublet (5192)(5193) is adjusted so that the distance between the points corresponding to FEGI and FED are correct. As the changes in the position of the doublet lenses can result in a loss of focus, the positions of the doublet lenses are also adjusted so that the image of FED and FEGI remains a point image.

The rotation position of the CCDs (5198) and (5201) is adjusted so that the segment FEGI-FED is horizontal.

The focal length of the doublet (5151) (5152) and the position of the assembly (5151) (5152) are adjusted so that the distance between FRG and FEGI is correct and so that the line linking these points is vertical. As the changes in the position of the doublet lenses can result in a loss of focus, the positions of the doublet lenses are also adjusted so that the image of FEGI remains a point image.

Following this adjustment, the mirror (5113) is brought back to position C.

Steps 32 to 35 can be started again in this order a certain number of times to converge towards the correct positions. Step 35 in fact leads to a loss of adjustment of the central position of the CCDs and of the orientation of the reference beams used in position C.

Step 36: Adjustment of the Position of Glass (5165) in the Direction of the Optical Axis The beams FSI and FRD are used. A frequency image is obtained using the procedure 9.4.1. from the sensors (5171) (5174). On this frequency image, the black spot of the glass can be seen dark against a light background. The position of the glass is adjusted so that the black spot stands out against the background with the best possible contrast.

Step 37: Adjustment of the Position of Glass (5191) in the Direction of the Optical Axis The beams FS and FRG are used. A frequency image is obtained by the procedure 9.4. from the sensors (5201) (5198). On this frequency image, the black spot of the glass can be seen dark against a light background. The position of the glass is adjusted so that the black spot stands out against the background with the best possible contrast.

Step 38: Adjustment in Rotation Around the Optical Axis and Two-axis Translation of the Diaphragms (5164) and (5190)

Prior to this adjustment, the mirror (5113) is brought back to the middle position.

These diaphragms have the form indicated in FIG. 82. They are adjustable in translation on three axes and in rotation around the optical axis. The beams FS,FSI,FRG, FRGI are used for their adjustment. A frequency image is obtained by the procedure 9.4. from each of the sensors (5174) (5198).

They are adjusted in translation to have an image centered on each sensor and as clear as possible without however hindering the movement of the mobile glass (5165) or (5191) associated with them. They are adjusted in rotation so that the coordinates of the point hidden by the mobile part (5712) are the same on the image obtained from each sensor. These coordinates will hereafter be denoted ($i_o$, $j_o$). Following this adjustment, the program also determines the radius $R_{ouv}$ of the image obtained on each sensor, which characterizes the zone accessible by the beams not stopped by the aperture of the objective. It is preferable to underestimate slightly $R_{ouv}$.

Following this adjustment procedure of, the objectives are positioned so that FS has a centered point image on each sensor. This adjustment will not be modified until the introduction of the sample.

9.6. Beam deflector control

To each position of the mirror there corresponds a maximum (FE in FIG. 75) of the frequency image obtained with the procedure 9.4. The point FR corresponding to the reference wave is at the center of the image. The point FO corresponding to the optical center is in the middle of FR and FE. The coordinates of the point FE in a coordinate system centered on FO are the equivalent of the coordinates of the point of direct impact of the reference wave relation to the optical center in the third embodiment.

The index p will characterize the right or left side of the microscope where p=0 for the sensors (5171)(5174) and p=1 for the sensors (5198)(5201).

The system for positioning the beam deflection mirror consists of two no-hysteresis actuators. For example, it is possible to use stepping motor positioning as described in the first embodiment. If the system is designed with sufficient care, such a system can exhibit very little hysteresis. The position of the mirror is then characterized by the number of steps completed by each motor from a central point. Piezoelectric positioners designed with a feedback loop allowing precise control of their extension can also be used, in which case the number of steps of each motor is replaced by the extension of each actuator. Piezoelectric positioners without feedback can also be used; however they exhibit a strong hysteresis which requires the determination of voltages used over a given path, a point-to-point determination of the mirror position values, as carried out below, not being possible.

The control of the motors is defined by two arrays tab1 and tab2, where tab1[p,i,j] ( resp. tab2[p,i,j]) is the number of steps actuator 1 (resp.2) must complete so that the point FE has the coordinates (i,j) on the image obtained by procedure 9.4. from a sensor indexed by p, in a coordinate system in which FO has the coordinates $$\left(\frac{N_{pix}}{2}, \frac{N_{pix}}{2}\right).$$

Actuators are numbered so that actuator 1 determines a movement along the axis i and actuator 2 determines a movement along the axis j.

The determination of the arrays tab1 and tab2 is done without an object (transparent plate), using a specific program. The program then determines, for each "objective" point, the number of corresponding steps of each motor from an origin. FIG. 77 represents an example of an algorithm of such a program. The main steps are:

(5407): Modification of shutter control. When p=0, the beam used must be FEG and, when p=1, the beam used must be FED.

(5401): imax and jmax correspond to the coordinates of the maximum obtained using procedure 9.4. from the sensor receiving the point of direct impact of the illuminating wave. We then have:

$$x = \frac{imax}{2}$$

$$y = \frac{jmax}{2}$$

(5402): The value lim used depends on the accuracy of the actuators. It is possible to have, for example, lim=0.25.

(5403): In a manner similar to what was done in 5.20., the displacement of the motors is equal to:

pas1=(i-x).pas_par_pixel/2 pas2=(j-y).pas_par_pixel/2

The current position value is modified:

pos1+=pas1 pos2-=pas2 pas_par_pixel is the ratio (number of motor displacement steps)/(number of pixels of the displacement of FE on the image obtained in 9.4.). It must have been previously determined, similar to what was done in the first embodiment, but with the images now calculated according to the procedure 9.4. and not obtained directly on the CCD.

(5404): The displacement of the motors is carried out, for a number of steps pas1, pas2 of each motor.

(5405): The current values of the coordinates in motor steps are recorded in an array:

tab1[p,i,j]=pos1 tab2[p,i,j]=pos2

However, in the case of $$\left(i - \frac{N_{pix}}{2}\right)^2 + \left(j - \frac{N_{pix}}{2}\right)^2 > R_{ouv}^2$$

the values assigned are, for example, negative values indicating an error, such as tab1[p,i,j]=−10000, tab2[p,i,j]=−10000

(5406): The motors are displaced by -pos1, -pos2 so as to return to the origin, which must remain constant to avoid distorting the path.

To obtain an illuminating wave on the sensor p, at the point of coordinates i,j, the two motors will be displaced up to their positions characterized respectively by tab1[p,i,j] and tab2[p,i,j], and the shutters (5144) and (5207) will be actuated according to the following array:

| Index p | Position of (5144) | Position of (5207) |
|---------|--------------------|--------------------|
| 0       | closed             | open               |
| 1       | open               | closed             |

9.7. Control of lasses (5165) and (5191)

Each of these glasses is mounted for example on a two-axis translation positioner controlled by stepping motors and allowing the displacement of the glass in a plane orthogonal to the optical axis. For each position of the illuminating wave, characterized by the indices p,i,j, the glass must be positioned to cancel the direct illumination. This is done by controlling the stepping motors to move the glass up to a position characterized in number of steps of each motor by the coordinates tabv1[p,i,j], tabv2[p,i,j].

Prior to this use of the glasses, a program is used to determine the arrays tabv1[p,i,j], tabv2[p,i,j]. An example of such a program is described in FIG. 77.

To use the program of FIG. 77, the beams FS,FSI,FRD and FRG are necessary and the object used is a transparent plate. The filter (5128) used on the path of the beam FS is adjusted so that the sensors are saturated on a few pixels around the points of impact of the beams FS and FSI.

The main steps in this program are:

(5107): The position of the mirror (5113) is controlled by the arrays tab1[p,0,0], tab2[p,0,0].

(5401): An image is obtained using the procedure described in 9.4. with Fourier transformation from a sensor located on the side characterized by the index p. The modulus of the elements of this image is extracted to obtain an image in real numbers on which the point cut off by the "black spot" of the glass appears in a light tone against a black background. The image thus obtained constitutes the array S of dimensions $2N_{pix} \times 2N_{pix}$ from which the coordinates imax and jmax of the maximum are calculated using the procedure described in 7.3.3.1. We then have:

$$x = i\text{max}$$

$$y = j\text{max}$$

(5402): The value rim used depends on the accuracy of the positioner. It is possible to have, for example, lim=0.25.

(5403): Similar to what was done in 5.20., the displacement of the motors is equal to:

$$pas1 = (i-x).pas\_par\_\text{pixel}/2$$

$$pas2 = (i-y).pas\_par\_\text{pixel}/2$$

The current position value is modified:

$$pos1 += pas1$$

$$pos2 += pas2$$

pas_par_pixel is the ratio (number of motor displacement steps)/(number of pixels of the displacement of the point of coordinates imax,jmax on the image obtained in 9.4.). It must have been previously determined, for example by displacing the glass along one of the directions and measuring the number of displacement pixels of the point of coordinates (imax, jmax).

(5404): The displacement of the motors is completed, for a number of steps pas1, pas2 of each motor.

(5405): The current values of the coordinates in motor steps are recorded in a array:

$$tabv1[p,i,j] = pos1$$

$$tabv2[p,i,j] = pos2$$

However, in the case of $$\left(i - \frac{N_{pix}}{2}\right)^2 + \left(j - \frac{N_{pix}}{2}\right)^2 > R_{ouv}^2$$

the values assigned are, for example, negative values indicating an error, such as tab1[p,i,j]=−10000, tab2[p,i,j]=−10000

(5406): The motors are displaced by -pos1, -pos2 so as to return to the origin, which must remain constant to prevent the distortion of the path.

9.8. Obtaining the constant K

The micrometer is introduced as a sample. An image is obtained in the presence of the beams FED and FRG using the procedure described in 9.4. in which Step 3 with its Fourier transformation is not performed. The modulus of the complex values of this image is used to obtain a real image of the intensity. The position of the sample is adjusted so that this image is correctly focussed. The distance in pixels $D_{pix}$ between two graduations separated by a real distance $D_{reel}$ is measured. The value of the constant K is $$\text{then } K = \frac{n_v}{\lambda} \frac{2N_{pix}}{D_{pix}} D_{reel}.$$

9.9. Obtaining a complete two-dimensional frequency representation

In the third embodiment, a two-dimensional frequency representation was obtained using the procedure described in 7.12. In the present embodiment, the procedure for obtaining this representation must be modified.

9.9.1. Principle 9.9.1.1. Acquisition

During acquisition, the index r will designate the open switch, according to the table below:

| Index r | Shutter (5109) | Shutter (5104) |
|---------|----------------|----------------|
| 0       | open           | closed         |
| 1       | closed         | open           |

The index p will designate the right side (p=0) or left side (p=1) of the microscope where the direct illuminating wave arrives and, consequently, the position of the shutters (5144) and (5207), according to the table below:

| Index p | Shutter (5207) | Shutter (5144) |
|---------|----------------|----------------|
| 0       | open           | closed         |
| 1       | closed         | open           |

The index q will designate the side of the microscope from which the acquired data come, with q=0 for data coming from the side where the direct illuminating wave arrives and q=1 for the data coming from the opposite side.

We take $s = \bar{p}q + p\bar{q}$. s thus designates the side of the microscope from which the acquired data come, with s=0 for the right side and s=1 for the left side.

We assign the indices (s,t) to the sensors as follows.

| Index s | 0 | | 1 | |
|---------|---|---|---|---|
| Index t | 0 | 1 | 0 | 1 |
| Sensor | (5174) | (5171) | (5198) | (5201) |

The data $MA[k,p][d,r,t][q,i,j]$ come from the sensor indexed by $(p\bar{q}+pq,t)$ For each quintuplet (k,p,q,r,t), we obtain, from a corresponding sensor, and from three acquisitions corresponding to different phases of the reference wave, an image in the form of a two-dimensional array of complex numbers with dimensions of $2N_{pix} \times 2N_{pix}$.

9.9.1.2. Chance to frequency representation

The image thus obtained is in spatial representation. A Fourier transformation is carried out to obtain an image in frequency representation. The representation thus obtained is centered around a point FR corresponding to the reference beam. It must be translated and limited to obtain a representation with dimensions of $N_{pix} \times N_{pix}$ centered around the point FO corresponding to the optical center.

FIGS. 75 and 76 depict the representations obtained respectively for a given index p on the sensors indexed by q=0 and q=1. In these figures, the point denoted FR is the central point with coordinates of $(N_{pix}, N_{pix})$, corresponding to the frequency of the reference wave. The point denoted FE corresponds to the frequency of the illuminating wave (q=0) or its opposite wave (q=1). The point denoted FO corresponds to the optical center of the system, i.e. to the frequency of a wave passing through the object observed in the direction of the optical axis. The contours (5301) and (5303) delimit the representation.

In the case of q=0, FR and FE are symmetrical in relation to FO. In the case of q=1, FR and FE are symmetrical in relation to a horizontal line passing through FO.

The limited and centered frequency representation is obtained from these figures by extracting the area with dimensions $N_{pix} \times N_{pix}$ centered around the point FO, limited by (5302) or (5304) in the figures.

9.9.1.3. Combination of different polarizations

We denote as $D_{p,s,r,t}$ the complex value measured at a point C of a frequency representation obtained after the procedure described in 9.9.1.2., from the sensor indexed by s,r and t when the direction of the illuminating wave is characterized by p.

We denote as $\vec{w}_{s,r,t}$ the electric field vector of the reference wave on the sensor characterized by the indices s, r and t.

In FIG. 80, the different combinations of the indices s,r,t are represented in the form of a table. In each box of the table:

the neutral axis of the phase plate located ahead of the sensor concerned is shown as a broken line.

the electric field vector of the reference wave before passing through the phase plate, directed along $\vec{i}$ or $\vec{j}$, is shown as a solid line.

the electric field vector $\vec{w}_{s,r,t}$ of the reference wave after passing through the phase plate and reflection on the semi-transparent mirror which superimposes it on the beam coming from the object, directed along $\pm \vec{u}$ or $+\vec{v}$, is also shown as a solid line. If s=0, this vector is deduced from the electric field vector of the wave before passing through the plate by a symmetry whose axis is the neutral axis of the blade. If s=1, an additional vertical axis symmetry must be completed.

The values of $\vec{w}_{s,r,t}$ are deduced from this figure. A formula grouping all the values obtained is, with a constant bias: $\vec{w}_{s,r,t} = (-1)^{srt+\bar{s}(\bar{rt})} \vec{i} + (-1)^{\bar{rt}} \vec{j}$ The phase of the reference wave differs between the sensors (5171) and (5174). We denote as $\alpha_s$ the ratio characteristic of the intensity and phase shift between the sensors indexed respectively by (s, t=0) and (s, t=1).

The wave detected on a given sensor constitutes a projection of the wave reaching this sensor on an axis oriented like the electric field vector of the reference wave. The unit vector orienting this axis will be denoted as the electric field vector of the reference wave.

For the measurements will be used:

an illuminating wave directed along $(-1)^p \vec{i}$ where p is the index of the sensor toward which the direct illuminating wave is directed. The factor $(-1)^p$ is due to the fact that the horizontal component of the illuminating wave, symmetrized by the mirrors which direct it in two opposite directions according to the index p, is reversed when the direction of the illuminating wave is itself reversed. For this illuminating wave, the components of the diffracted wave polarized along the axes oriented by $\vec{w}_{s,0,0}$ and $\vec{w}_{s,0,1}$ will be measured, giving respectively the factors $D_{p,s,0,0}$ and $D_{p,s,0,1}$ an illuminating wave directed along $\vec{j}$. For this illuminating wave, the components of the diffracted wave polarized along the axes oriented by $\vec{w}_{s,1,0}$ and $\vec{w}_{s,1,1}$ will be measured, giving respectively the factors $D_{p,s,1,0}$ and $D_{p,s,1,1}$ When the electric field vector of the illuminating beam (at the point E) is $A_0(-1)^p\vec{i} + A_1 \vec{j}$, the electric field vector resulting at the point C, on side s of the microscope, is thus:

$$\sum_{r,t} \text{\textbackslash(\textbackslash\%\textbackslash)} A_r D_{p,s,r,t}(\bar{i} + t\alpha_s)\vec{w}_{s,r,t}$$

When the electric field vector at the point E is $A_0 \vec{i} + A_1 \vec{j}$, the electric field vector resulting at point C, on side s of the microscope, is thus:

$$\sum_{r,t} \text{\textbackslash(\textbackslash\%\textbackslash)} A_r (-1)^{pr} D_{p,s,r,t}(\bar{i}+t\alpha_s)\vec{w}_{s,r,t} \text{ or}$$

$$\sum_{r,t} \text{\textbackslash(\textbackslash\%\textbackslash)}(-1)^{pr}((-1)^{srt+\bar{s}(\bar{rt})}\vec{i} + (-1)^{\bar{rt}}\vec{j})(\bar{i}+t\alpha_s)A_r D_{p,s,r,t}$$

which corresponds to the expression $$C_{p,s,0,0}A_0\vec{i} + C_{p,s,1,0}A_0\vec{j} + C_{p,s,0,1}A_1\vec{i} + C_{p,s,1,1}A_1\vec{i} + C_{p,s,1,1}A_1\vec{j}$$

where:

$$C_{p,s,d,r} = \sum_t \text{\textbackslash(\textbackslash\%\textbackslash)}(-1)^{pr}((-1)^{srt+\bar{s}(\bar{rt})}\vec{d} + (-1)^{\bar{rt}}d)(\bar{i}+t\alpha_s)D_{p,s,r,t}$$

or:

$$C_{p,s,0,0} = (-1)^p(-1)^s(D_{p,s,0,0} + \alpha_s D_{p,s,0,1})$$

$$C_{p,s,1,0} = (-1)^p(-D_{p,s,0,0} + \alpha_s D_{p,s,0,1})$$

$$C_{p,s,0,1} = (-1)^s(-D_{p,s,1,0} + \alpha_s D_{p,s,1,1})$$

$$C_{p,s,1,1} = D_{p,s,1,0} + \alpha_s D_{p,s,1,1}$$

The same expression as in 7.12 can be used from these values of $C_{p,s,d,r}$ to obtain the value sought $M_{p,s}$, the indices p,s which were not necessary in 7.12. being added:

$$M_{p,s} = -\cos\phi_e \cos\phi_c C_{p,s,0,0} - \sin\phi_e \cos\phi_c C_{p,s,0,1} - \cos\phi_e \sin\phi_c C_{p,s,1,0} - \sin\phi_e \sin\phi_c C_{p,s,1,1}$$

or $M_{p,s} = \sum_{r,t} \backslash(\backslash\%\backslash) E_{p,s,r,t} D_{p,s,r,t}$ where:

$$E_{p,s,0,0} = (-1)^p((-1)^s \cos\phi_e \cos\phi_c + \cos\phi_e \sin\phi_c)$$

$$E_{p,s,0,1} = (-1)^p \alpha_s ((-1)^s \cos\phi_e \cos\phi_c - \cos\phi_e \sin\phi_c)$$

$$E_{p,s,1,0} = (-1)^s \sin\phi_e \cos\phi_c - \sin\phi_e \sin\phi_c$$

$$E_{p,s,1,1} = \alpha_s(-(-1)^s \sin\phi_e \cos\phi_c - \sin\phi_e \sin\phi_c)$$

It is necessary to first determine the coefficient $\alpha_s$. Around the point of impact of the illuminating wave, a comparable value is obtained on each sensor for a given index r. It is thus possible to adopt for this coefficient the value $$\alpha_s = \frac{\sum D_{p,s,r,0} \overline{D_{p,s,r,1}}}{\sum |D_{p,s,r,1}|^2}$$

where the sums are on the indices r and on a reduced number of points around the point of direct impact of the illuminating wave.

9.9.2. Acquisition

As in the third embodiment, the point of direct impact of the illuminating wave follows a path indexed by k and characterized by the arrays Io[k],Jo[k].

As in 7.12.2.1., the acquisition of the elementary images is an iteration on the integers p and k designating respectively the sensor reached by the direct illuminating beam and the order number of the elementary image in the series of images corresponding to a given index p.

There is no beam attenuation here. For each pair (k,p) complying with $$\left(Io[k] - \frac{N_{pix}}{2}\right)^2 + \left(Jo[k] - \frac{N_{pix}}{2}\right)^2 \leq R_{ouv}^2,$$

the program controls the displacement of the mirror through the arrays tab1[p,Io[k],Jo[k]], tab2[p,Io[k],Jo[k]] and the shutters (5144) and (5207) as indicated in 9.6. It moves the glass located on the side opposite the point of direct impact of the illuminating wave so that its black spot is outside the frequency field used.

It controls the movement of the glass located on the side where the point of direct impact of the illuminating wave is located as indicated in 9.7., with the arrays tabv1[p,Io[k],Jo[k]], tabv2[p,Io[k],Jo[k]].

However, according to a variant which will be called Variant 2, it does not use this glass and hence moves it so that its black spot is outside the frequency field used.

To increase the speed, the number of changes of the index p must be limited as much as possible, calling for a manipulation of the shutters (5144) and (5207) which are slower than (5104) and (5109) for example. The program thus carries out a first iteration on k, at p=0, followed by a second iteration on k, at p=1.

For each value of (k,p) the program acquires 12 pairs of elementary images. A pair of elementary images is, as in 7.12.2.1., an array indexed
- on the one hand, by the index q with q=0 if the image is detected on the same side as the point of direct impact of the reference wave, and q=1 if it is detected on the opposite site.
- on the other hand, by the indices i and j characterizing the position of the pixel on the sensor concerned.

The indices p,q,r,t are defined as indicated in 9.9.1.1. The index d determines the phase shift of the reference wave and is defined as in the following table:

| Index d | Phase shift $\theta_d$ (degrees) |
|---------|----------------------------------|
| 0       | −120                             |
| 1       | 0                                |
| 2       | +120                             |

The acquisition of a series of images corresponding to the indices k,p,q,d,r,t thus generates the series of elementary image pairs MA[k,p][d,r,t][q,i,j]

The program also acquires a series of images corresponding to the reference image. It moves the motors up to the positions pos1[p,i,j], pos2[p,i,j,] where $(i_r,j_r)$ are normally the coordinates $(i_o,j_o)$ of the fixed point hidden by the diaphragrms, determined in Step 38 of the adjustment procedure 9.5. However, if Variant 2 is used, $(i_r,j_r)$ are the coordinates of another fixed point, highly offcentered but not blocked. The program then acquires a series of six pairs of elementary images, obtaining an array MA2[k,p][d,r,t][q,i,j]

However, according to a variant which will be called Variant 1, the program does not carry out the acquisition of this reference image.

9.9.3. Calculations

The calculation of the two-dimensional frequency representation, of the reference image, and of the characteristics arrays of the noise on these two images is carried out by Steps 1 to 8 below:

Step 1—Calculation of Two-dimensional Spatial Representations

The program performs, on all the data obtained:

$$MB[k,p][r,t][q,i,j] =$$

$$\frac{1}{6}(2MA[k,p][0,r,t][q,i,j] - MA[k,p][1,r,t][q,i,j] -$$

$$MA[k,p][2,r,t][q,i,j]) +$$

$$j\frac{1}{2\sqrt{3}}(MA[k,p][1,r,t][q,i,j] - MA[k,p][2,r,t][q,i,j])$$

Step 2—Change to Frequency Representation

The indices i and j vary from 0 to 2 $N_{pix}$−1. The program performs the Fourier transform, based on these two indices, of each of the spatial representations previously obtained. This leads to the transformed representations:

$$MC[k,p][r,t][q,i,j]$$

Step 3: Compensation for Frequency Response of the Sensors

This compensation is not indispensable, but it improves substantially the precision of the microscope.

The program calculates the array MD:

$$MD[k,p][r,t][q,i,j] = RI[i,j]MC[k,p][r,t][q,i,j]$$

The array RI represents the inverted frequency response of the sensors. It is determined in 9.11. However, according to a variant which will be called Variant 3, used for certain adjustments, the array RI is set to 1.

Step 4—Translation and Limitation of the Two-dimensional Frequency Representation The position of the point FO indicated in 9.9.1.2. is stored in the form of arrays Io[k] Jo[k]. The considerations indicated in 9.9.1.2. then result in the following operations performed by the program:

$$ME[k,p][r,t][0,i,j]=MD[k,p][r,t][0,i+Io[k],j+Jo[k]]$$

$$ME[k,p][r,t][1,i,j]=MD[k,p][r,t][1,i-Io[k]+N_{pix},j+Jo[k]]$$

where i and j vary now from 0 to $N_{pix}-1$.

Step 5: Calculation of Coefficients $\alpha_s$

A coefficient $\alpha_s$ is determined for each triplet (k,p,q). It is stored in an array of complex numbers alpha[k,p,q]. The program goes through all the triplets (k,p,q). For each triplet it initializes to 0 the numbers nom and denom.

it goes through all the triplets r,i,j testing the condition:

$$(i-Io[k])^2+(j-Jo[k])^2 \leq \lim^2$$

where, for example, lim=20.

When the condition is true, it performs:

$$\text{nom}+=ME[k,p][r,0][q,i,j]\overline{ME[k,p][r,1][q,i,j]}$$

$$\text{denom}+=|ME[k,p][r,1][q,i,j]|^2$$

When the loop on r,i,j is completed, it performs:

$$\text{alpha}[k,p,q]=\text{nom}/\text{denom}$$

Step 6—Combination of Values Corresponding to Indices r and t

This step is designed to calculate $M_{k,p,q}[i,j]$ as a function of ME[k,p][r,t][q,i,j]. This can be accomplished very simply by performing the following operation: $M_{k,p,q}[i,j]=ME[k,p][1,1][q,i,j]$, the value assigned to the noise then being constant and Step 5 becomes unnecessary. If this method is to be used, it is however preferable to eliminate the phase plates (5111) (5238) (5239) (5248) (5249).

In any case, this method, similar to the one used in the second embodiment, induces imperfections in the high frequencies. It is thus preferable to use the method whose principle was indicated in 9.9.1.3., the quantity ME[k,p][r,t][q,i,j] being the measured value denoted $D_{p,s,r,t}$ in 9.9.1.3. Step 6 is then carried out as follows:

For each value of the indices k,p,q,i,j, the program calculates:

$$x_c = \frac{j-\frac{N_{pix}}{2}}{\frac{n_o}{n_v}K}, \quad y_c = \frac{j-\frac{N_{pix}}{2}}{\frac{n_o}{n_v}K}, \quad z_c = \sqrt{1-x_c^2-y_c^2}$$

$$x_e = \frac{Io[k]-\frac{N_{pix}}{2}}{\frac{n_o}{n_v}K}, \quad y_e = \frac{Jo[k]-\frac{N_{pix}}{2}}{\frac{n_o}{n_v}K}, \quad z_e = \sqrt{1-x_e^2-y_e^2}$$

$$V_{yz}=y_c z_e - z_c y_e$$

$$V_{xz}=-x_c z_e + z_c x_e$$

$$V_{xy}=-x_c y_e + y_c x_e$$

$$M_c^2 = x_c^2 + y_c^2$$

$$M_e^2 = x_e^2 + y_e^2$$

$$M_{ce} = \sqrt{V_{yz}^2 + V_{xz}^2 + V_{xy}^2}$$

The values of $\sin \phi_c$, $\cos \phi_c$, $\sin \phi_e$, $\cos \phi_e$ are determined according to the following tables:

|         |     |                      |                                                          |
|---------|-----|----------------------|----------------------------------------------------------|
| $M_{ce}$ | 0   |                      | other                                                    |
| $M_c$    |     | 0                    | other                                                    |
| $\cos\phi_c$ | 1 | $-\frac{y_c}{M_c}$ | $\frac{1}{M_c^2 M_{ce}}(y_c^2 V_{yz} - x_c y_c V_{xz} + x_c V_{xy})$ |
| $\sin\phi_c$ | 0 | $\frac{x_c}{M_c}$  | $\frac{1}{M_c^2 M_{ce}}(-x_c y_c V_{yz} + x_c^2 V_{xz} + y_c V_{xy})$ |
| $M_{ce}$ | 0   |                      | other                                                    |
| $M_e$    |     | 0                    | other                                                    |
| $\cos\phi_e$ | -1 | $-\frac{y_c}{M_c}$ | $-\frac{1}{M_c^2 M_{ce}}(y_c^2 V_{yz} - x_c y_c V_{xz} + x_c V_{xy})$ |
| $\sin\phi_e$ | 0 | $\frac{x_c}{M_c}$  | $-\frac{1}{M_c^2 M_{ce}}(-x_c y_c V_{yz} + x_c^2 V_{xz} + y_c V_{xy})$ | then the coefficients are calculated:

$$\text{coef}[k,p,q,i,j][0,0]=(-1)^p((-1)^{p\bar{q}+\bar{p}q}\cos\phi_e\cos\phi_c+\cos\phi_e\sin\phi_c)$$

$$\text{coef}[k,p,q,i,j][0,1]=\text{alpha}[k,p,q](-1)^p((-1)^{p\bar{q}+\bar{p}q}\cos\phi_e\cos\phi_c-\cos\phi_e\sin\phi_c)$$

$$\text{coef}[k,p,q,i,j][1,0]=(-1)^{p\bar{q}+\bar{p}q}\sin\phi_e\cos\phi_c-\sin\phi_e\sin\phi_c$$

$$\text{coef}[k,p,q,i,j][1,1]=-\text{alpha}[k,p,q](-(-1)^{p\bar{q}+\bar{p}q}\sin\phi_e\cos\phi_c-\sin\phi_e\sin\phi_c)$$

These coefficients do not depend on the result of the imaging operations and, if the same series is always repeated, they can be stored in an array instead of being recalculated each time. The program then uses these values to combine the images obtained with the different positions of the rotators as follows:

$$M_{k,p,q}[i,j] = \sum_{r,t} ME[k,p][r,t][q,i,j]\text{coef}[k,p,q,i,j][r,t]$$

coef[k,p,q,i,j][r,t] corresponds to the quantity denoted $E_{p,s,r,t}$ en 9.9.1.3. with $s=\bar{p}q+p\bar{q}$.

ME[k,p][r,t][q,i,j] corresponds to the quantity denoted $D_{p,s,r,t}$ in 9.9.1.3.

$M_{k,p,q}[i,j]$ to the quantity denoted $M_{p,s}$ in 9.9.1.3.

Step 7: The Noise Amplitude is Calculated as Follows:

$B_{k,p,0}[i,j]$ is equal to:

when RI[i+Io[k],j+Jo[k]]≠0: $B_{k,p,0}[i,j]=|RI[i+Io[k],j+Jo[k]]|$ otherwise: $B_{k,p,0}[i,j]=\text{MAX}$ where MAX is a high value, for example $10^{10}$ $B_{k,p,1}[i,j]$ is equal to:

when RI[i-Io[k]+$N_{pix}$,j+Jo[k]]≠0: $B_{k,p,1}[i,j]=|RI[i-Io[k]+N_{pix},j+Jo[k]]|$ otherwise: $B_{k,p,1}[i,j]=\text{MAX}$ Step 8—Calculation of the Reference Image The reference image is calculated exactly in the same manner as the main image, but using array MA2 instead of array MA and replacing the values Io[k],Jo[k] by $(i_r,j_r)$. We shall denote as $H_{k,p,q}[i,j]$ the array thus generated and $BH_{k,p,q}[i,j]$ the corresponding noise amplitude. However, in the case of Variant 1, this reference image is not calculated.

9.10. Fine adjustment of the position of the sensors

The purpose of this operation is to ensure a precise adjustment, in relation to each other, of the two sensors corresponding to the same side of the microscope, in particular in the direction of the optical axis. In the absence of such an adjustment, the origin of the frequency representations generated from each sensor may differ slightly, which would compromise subsequently the proper superposition of the portions of the frequency representations coming from each side of the microscope. Omitting this adjustment does not prevent the generation of three-dimensional representations of the sample, but limits the precision of these representations.

A translation displacement of a sensor entails a modulation in the frequency domain and hence a phase difference in the values of the plane waves obtained from this sensor. The adjustment consists in verifying that the plane waves received on each sensor for different directions of the illuminating beam are in phase.

The sensors are indexed with the indices s, t with the same convention as in 9.9.1.3. The program initializes to 0 the arrays $MF_{s,t}$ with dimensions of $N_{pix} \times N_{pix}$. It carries out a loop on the indices s, i and j. For each triplet s,i,j complying with $$\left(i - \frac{N_{pix}}{2}\right)^2 + \left(j - \frac{N_{pix}}{2}\right)^2 \leq R_{ouv}^2,$$

it performs the following operations:
it actuates the shutters so as to use the beam FEG for s=0 and the beam FED for s=1.
it moves the mirror to the point corresponding to tab1[s,i,j], tab2[s,i,j]
it generates, from each sensor indexed by s, a two-dimensional image according to the method described in 9.4., thus obtaining two images $MH_{s,t}[k,l]$ where the indices s and t have been added to characterize the sensor, with the same convention as in 9.9.
it moves the mirror to a fixed point of coordinates $(i_r,j_r)$
it generates, from each sensor indexed by s, a two-dimensional image according to the method described in 9.4., obtaining two images $MHR_{s,t}[k,l]$.
it carries out, for the pair of integers (i,j):

$$MF_{s,t}[i,j] = \frac{MH_{s,t}[2i,2j]}{MHR_{s,t}[2i,2j]}$$

After having completed this loop on s,i,j, the program calculates the following deviations:

$$\sigma_s = \sum_{i,j} |MF_{s,0}[i,j] - MF_{s,1}[i,j]|^2$$

The translation position of the sensor (5171) must be adjusted so as to minimize $\sigma_0$ and the position of the sensor (5201) must be adjusted so as to minimize $\sigma_1$. The program must thus loop on the calculation of these deviations until the adjustment is completed. $\sigma_s$ represents the standard (rms) deviation due to the phase errors between the frequencies received on the two sensors located on the same side of the microscope.

9.11. Determining the frequency response of the sensors

The sensors filter the spatial frequencies reaching them. This filtering is in the best case equivalent to an averaging on the surface of the pixel; however, in general, it is more significant owing to the defects of the CCDs and of the cameras. In the embodiments based on a reception in a frequency plane, this filtering simply induces a darkening of the part of the generated image which is far from the center. In this embodiment, this filtering is carried out in the spatial plane and poses more significant problems. It is preferable to use cameras of good quality and to compensate for this filtering. This filtering in the spatial plane is equivalent to a multiplication in frequency by a array RF whose inverse RI is used in the procedure 9.9. to obtain the compensation. To limit the noise on the frequency response, the latter is acquired by means of plane waves rather than from a single spherical wave.

9.11.1. Acquisition

The arrays Io and Jo are used, characterizing a path across all the accessible points, i.e. (Io[k],Jo[k]) must go through all points that comply with $$\left(Io[k] - \frac{N_{pix}}{2}\right)^2 + \left(Jo[k] - \frac{N_{pix}}{2}\right)^2 \leq R_{ouv}^2$$

where $R_{ouv}$ is the radius limited by the aperture of the objectives, which was obtained in Step 37 of the adjustment procedure 9.5. This path will be called "complete path" hereafter.

A program carries out the acquisition defined by these arrays, according to the procedure described in 9.9. with the Variants 2 and 3, i.e. without using the glasses (5165)(5191) and with a point of coordinates $(i_r,j_r)$ not blocked. It thus generates the series of images $M_{k,p,q}[i,j]$ and $H_{k,p,q}[i,j]$. The index $n_o$ not being known, it is taken equal to $n_v$ in the procedure 9.9. However, during this acquisition, it is sufficient to record the values $M_{k,p,q}[Io[k],Jo[k]]$ and $H_{k,p,q}[i_r,j_r]$.

9.11.2. Calculation

The program initializes to 0 the array RF1 of dimensions $N_{pix} \times N_{pix}$. It then goes through the series of indices k. For each index k, it performs:

$$RF1[Io[k], Jo[k]] = \left|\frac{M_{k,0,0}[Io[k], Jo[k]]}{H_{k,0,0}[i_r, j_r]}\right| + \left|\frac{M_{k,1,0}[Io[k], Jo[k]]}{H_{k,1,0}[i_r, j_r]}\right|$$

where $i_r,j_r$ are the coordinates of the maximum of the reference image, as defined in 9.9.

It then takes the two-dimensional inverse Fourier transform of the array RF1, obtaining an array RF2. It completes this array with zeros by initializing to 0 the array RF3 of dimensions $2N_{pix} \times 2N_{pix}$ and then by carrying tout for i and j varying from 0 to $N_{pix}-1$:

$$RF3\left[i + \frac{N_{pix}}{2}, j + \frac{N_{pix}}{2}\right] = RF2[i,j]$$

It then takes the two-dimensional inverse Fourier transform of the array RF3, obtaining the array RF corresponding to the frequency response of the sensors.

The program then calculates the inverse frequency response of the sensors as follows:
if $(i-N_{pix})^2 + (j-N_{pix})^2 \leq 4R_{ouv}^2$ then:

$$RI[i,j] = \frac{1}{|RF[i,j]|}$$

otherwise: RI[i,j]=0
The array RI thus determined is used in particular in 9.9.

9.12. Determining the relative coordinates of the origins of images obtained on each side of the microscope The frequency images obtained on each side of the microscope by procedure 9.9. are equivalent to the frequency images which were obtained in the preceding embodiments. They are, in like manner, relative to an origin, which no longer depends on the origin of the reference wave, but on the position of the sensor. To be able to superimpose these representations, it is necessary to know the relative position of the origins of the representations obtained on each side of the microscope.

This is accomplished by using the spherical waves FS and FSI. The spherical wave FS or FSI received on each side of the microscope must in principle be a point wave centered on each receiving surface. The position of the objectives can thus be adjusted in the presence of the beams FS, FSI,FRG, FRD so that the image, obtained on each sensor by the procedure 9.4. used without Fourier transformation, is a perfect centered point image. If this adjustment of the position of the objectives is carried out with great care and with sufficiently precise positioners, offering sub-micrometric precision, for example microscope focussing devices of sufficient quality, or positioners with piezoelectric control, then the origins of the images obtained on each side of the microscope coincide.

The adjustment procedure described in 9.5. however makes it possible to obtain this adjustment quality using positioners of average precision for the objectives. In fact, fine adjustments are carried out, in this procedure, by the displacement of the cameras and not of the objectives. If the adjustment procedure described in 9.5. is carried out carefully, the origins of the frequency representations finally obtained will coincide. Their relative coordinates are thus (x,y,z)=(0,0,0).

However, the adjustments obtained with the procedure 9.5. or by another position adjustment of the objectives are generally not perfect. In particular, they may be influenced by local imperfections of the sensors. It is possible to use (x,y,z)=(0,0,0), but a better superposition of the images coming from each sensor will be obtained if a suitable algorithm is used to calculate a more precise value of these parameters. A precise determination of the relative positions of the origins can be obtained using a method similar to the one used in 7.9.1. However:

The image of the beam FS or FSI in the receiving plane is a point image and is not distributed over the entire receiving surface as in 7.9.1. The consequences are that the image obtained is sensitive to local defects of the sensors and is very noisy.

The point of focus of FS and FSI does not correspond to the characteristic point (with the terminology used in 3.16.) of one of the objectives, whereas in 7.9.1. the point of focus of the reference beam corresponded to the characteristic point of a corresponding objective.

The method used is thus modified to overcome, to the extent possible, these drawbacks. The beams used are FS,FSI,FRD,FRG and the object used is a transparent plate. The method used is broken down into two phases:

Acquisition phase: This phase consists of an iteration on the indices k,l going through the set E0 of the points complying with $$\left(k - \frac{N_{pix}}{2}\right)^2 + \left(l - \frac{N_{pix}}{2}\right)^2 \leq rayon^2$$

where for example $rayon = 0.8 R_{ouv}$. The array M6 of dimensions $N_{pix} \times N_{pix}$ is initialized to 0 and then the program performs, for each pair (k,l) of the set E0, Steps 1 to 7 below:

Step 1: Positioning of the beam deflection mirror at the point determined by tab1[0,k,l], tab2[0,k,l]

Step 2: An image is acquired on each side of the microscope according to the procedure described in 9.4. without performing the Fourier transform. These images will be denoted $M0_s[i,j]$ instead of $MH[i,j]$, the index s characterizing the sensor with s=0 for (5174) and s=1 for (5198).

Step 3: The program determines the coordinates $imax_s$, $jmax_s$ of the maximum value of each array $M0_s[i,j]$. It then calculates the arrays $M1_s[i,j]$ with:
if $(i-imax_s)^2 + (j-jmax_s)^2 \leq R_{niv}^2$ $M1_s[i,j] = M0_s[i,j]$
otherwise $M1_s[i,j] = 0$
where $R_{niv}$ is determined so that the disc of radius $R_{niv}$ centered on $imax_s, jmax_s$ contains all the points whose values without noise are higher than the noise level, while remaining as small as possible. In practice, $R_{niv}$ can be determined empirically and may be equal to ten or so pixels.

Step 4: The program performs the two-dimensional Fourier transform of each array $M1_s[i,j]$, obtaining the arrays $M2_s[i,j]$.

Step 4: The program applies the filter RI to the arrays thus obtained:

$$M3_s[i,j] = M2_s[i,j] RI[i,j]$$

Step 5: The program calculates the array M4 of dimensions $N_{pix} \times N_{pix}$ as follows:

$$-\text{if} \left(i - \frac{N_{pix}}{2}\right)^2 + \left(j - \frac{N_{pix}}{2}\right)^2 \leq R_{ouv}^2 \text{ then}$$

$$M_4[i,j] = \frac{M3_0[i+k, j+l]}{M3_1[i-k+N_{pix}, j+l]}$$

otherwise, $M4[i,j]=0$

The array M4 represents the phase shift between the two sensors due to the non-coincidence of the origins, partially noise corrected.

Step 6: The program performs the inverse Fourier transform of the array M4, obtaining an array M5.

Step 7: The program modifies the array M6 as follows:

$$M6[i,j] \mathrel{+}= \frac{M4[i,j]}{M4[0,0]}$$

Calculation phase: The program calculates the array M7 which is the Fourier transform of the array M6. The program calculates the coordinates x,y,z obtained by the procedure described in 7.8. from the array M7, which replaces the array denoted $F_{rec}$ in 7.8. However, for this step, the procedure described in 7.8. must be modified as indicated in 7.9.1. to take into account the fact that the index of the object is known. It must also be modified in a second manner to take into account the fact that the acquisition method is different and that the standard deviation $\sigma^2$ must be calculated in the spatial domain and not in the frequency domain as in 7.8.1. This second modification consists in replacing the steps (3512) to (3514) in FIG. 50 by the following steps, which are carried out in spatial representation and in which it is thus the array M6 (and not M7) which is used:

Step 1: The program determines the coordinates (imaxjmax) of the point corresponding to the maximum value of |M6[i,j]|. It then calculates $$rapport = \frac{M6[imax, jmax]}{F_d[imax, jmax]}$$

Step 2: The program calculates the characteristic value max:

$$max = -\sum_{(i,j)\in Disque} |M6[i,j] - rapport \cdot F_d[i,j]|^2$$

where the sum is over all the pairs (i,j) included in the disc of center (imax,jmax) and of radius $R_{niv}/2$.

9.13. Determininu the phases of the beams

This procedure is similar to the procedure 7.9.2. The position of the objectives is the one which was used in 9.12. to obtain the coordinates x,y,z and must not be modified during the present procedure.

We use the arrays Io and Jo already used in 9.11. and characterizing a complete path.

A program carries out the acquisition defined by these arrays, according to the procedure described in 9.9. with Variants 2 and 3, i.e. without using the glasses (5165)(5191), with a point of coordinates $(i_r,j_r)$ not blocked, and without sensor filtering compensation. It thus generates the series of images $M_{k,p,q}[i,j]$ and $H_{k,p,q}[i,j]$. The index $n_o$, not being known, it is taken equal to $n_v$ in the procedure 9.9. During this acquisition, it is sufficient to record the values $M_{k,p,q}[Io[k],Jo[k]]$ and $H_{k,p,q}[i_r,j_r]$.

The program initializes to 0 the array Ra and then goes through the series of the indices k,p carrying out, for each pair k,p:

$$Ra[p, Io[k], Jo[k]] = \frac{M_{k,p,0}[Io[k], Jo[k]]}{H_{k,p,0}[i_r, j_r]} \exp\left(-j\frac{2\pi}{\lambda}n_v\left(x\frac{Io[k]}{K} + y\frac{Jo[k]}{K} + z\sqrt{1 - \frac{Io[k]^2 + Jo[k]^2}{K}}\right)\right)$$

where $i_r,i_r$ are the coordinates of the maximum of the reference image, as defined in 9.9. and where x,y,z are the coordinates determined in 9.12.

9.14. Adiusting the position of the objectives in the presence of the sample

The sample to be observed is put in place. The beams FS and FRG are used. The beam FRG used is in the direction of the optical axis, so that the deflection mirror is in the central position, defined by $$tab1\left[0, \frac{N_{pix}}{2}, \frac{N_{pix}}{2}\right], tab2\left[0, \frac{N_{pix}}{2}, \frac{N_{pix}}{2}\right].$$

From the wave received on the sensor (5198), two images are generates by the procedure described in 9.4.: a spatial image obtained without carrying out Step 3 and a frequency image obtained by carrying out Step 3. The modulus of the complex values is extracted on each image. The position of the objectives is adjusted on the same principle as in 7.10.:

The spatial image must be centered.

On the frequency image, one should observe a light-toned disc. The adjustment must be carried out so that the intensity is as high as possible for the high frequencies (points far from the center). The observed disc must remain relatively uniform.

If a dark ring appears between the outer edge and the middle zone, the sample is too thick and all the frequencies cannot be taken into account. The adjustment must then be carried out so as to have a relatively uniform disc with as high a radius as possible. The disc does not reach its maximum size and the high frequencies cannot be taken into account. The resolution of the image, mainly in depth, is reduced. The only solution to this problem consists in using a specially designed objective, described in Paragraph 7.19.

9.15. Determining x,y,z,L,$n_0$

This step is similar to the one described in procedure 7.11. As in the procedure described in 7.11., this step can be avoided by the prior measurement of the values L and $n_0$ and by introducing the sample without moving the objectives, and hence without carrying out Step 9.14., so as not to modify the values of x,y,z obtained in 9.12.

The program carries out the series of acquisitions defined by the arrays Io and Jo defining a complete path, already used in 9.11.2, according to the procedure described in 9.9. used with Variants 2 and 3. It thus generates the series of images $M_{k,p,q}[i,j]$ and $H_{k,p,q}[i,j]$. However, during this acquisition, it is sufficient to record the values $M_{k,p,q}[Io[k], Jo[k]]$ and $H_{k,p,q}[i_r,j_r]$.

The program then goes through the series of indices k. For each value of k, it performs:

$$F_{rec}[Io[k], Jo[k]] = \frac{M_{k,0,0}[Io[k], Jo[k]]}{H_{k,0,0}[i_r, j_r]} \frac{1}{Ra[0, Io[k], Jo[k]]}$$

The program described in 7.8. is then used to calculate the parameters x,y,z,L,$n_0$ from the array $F_{rec}$ thus formed.

9.16. Calculating $w_p$ and adjusting the focus

This step is carried out as described in 7.15. It can however be avoided if the index of the sample is close to the nominal index of the objectives, in which case it is possible to choose for example $w_p=L/2$.

The arrays $M_{k,p,q}[i,j]$ obtained with the procedure 9.9. used without variant are substituted for those previously obtained with the procedure 7.12.

Since the sampling is regular, we use $K_0=K_1=K$

The values $imax_k, jmax_k$ are now given by:

$$imax_k = \frac{N_d}{N_{pix}}Io[k], \quad jmax_k = \frac{N_d}{N_{pix}}Jo[k].$$

Step 2 of the procedure (4002) in FIG. 57 requires the acquisition of the value of the wave at the point ($imax_k$, $jmax_k$). As the glasses are used to stop the direct illuminating wave, this value is not available. This step is thus replaced by Steps 2.1 and 2.2. below:

Step 2.1. For each value of k, the program calculates:

$$R_{k,0,0} = \frac{\sum_{(i,j)\in E_k} \frac{H_{0,0,0}[i,j]\overline{H_{k,0,0}[i,j]}}{(B_{0,0,0}[i,j])^2 + (B_{k,0,0}[i,j])^2}}{\sum_{(i,j)\in E_k} \frac{|H_{k,0,0}[i,j]|^2}{(B_{0,0,0}[i,j])^2 + (B_{k,0,0}[i,j])^2}}$$

where:

$$E_k = \left\{(i,j) \left| \frac{|H_{0,0,0}[i,j]\overline{H_{k,0,0}[i,j]}|}{(B_{0,0,0}[i,j])^2 + (B_{k,0,0}[i,j])^2} \geq \right.\right.$$

$$\left.\left. Coef \cdot \max_{\substack{0\leq a\leq N_{pix}-1 \\ 0\leq b\leq N_{pix}-1}} \left(\frac{|H_{0,0,0}[a,b]\overline{H_{k,0,0}[a,b]}|}{(B_{0,0,0}[a,b])^2 + (B_{k,0,0}[a,b])^2}\right)\right\}$$

and where for example Coef=0.5

Step 2.2. For each value of k,i,j the program carries out:

$$Ms_k[i,j] = \frac{Ms_k[i,j]R_{k,0,0}}{Ra[0, Io[k], Jo[k]]F_{rec}[Io[k], Jo[k]]}$$

where $F_{rec}$ is the array determined in 9.15.

9.17. Obtaining the aberration compensation function

This step is carried out as described in 7.16. with $K_0=K_1=K$ 9.18. Obtaining three-dimensional images by the method described in the third embodiment 9.18.1. Without eliminating the direct wave This step is carried out as described in 7.17.2.

the arrays $M_{k,p,q}[i,j]$ $H_{k,p,q}[i,j]$ $B_{k,p,q}[i,j]$ $BH_{k,p,q}[i,j]$ obtained with the procedure 9.9 used with Variant 2 are substituted for those previously obtained with the procedure 7.12 because the sampling is regular, we use $K_0=K_1=K$, $a_0=a_1=1$. the values $imax_{k,p,q}, jmax_{k,p,q}$ are now given by: $imax_{k,p,q}=Io[k], jmax_{k,p,q}=Jo[k]$.

9.18.2. Eliminating the direct wave

The principle is the same as above but the procedure 9.9. is used without a variant. In addition, Step 2 of the algorithm described in 7.17.2. requires the acquisition of the value of the wave at the point $(imax_{k,p,0}, jmax_{k,p,0})$. As the glasses are used to stop the direct illuminating wave, this value is not available. This step is thus replaced by Step 2 below, equivalent to the one indicated in 7.18.1.

Step 2: For each value of k,p,q,i,j, the program performs:

$$M_{k,p,q}[i,j] = \frac{M_{k,p,q}[i,j]D_{pq+pq}[i,j]R_{k,p,q}}{Ra[p, Io[k], Jo[k]]F_{rec}[Io[k], Jo[k]]D_p[Io[k], Jo[k]]}$$

9.19. Obtaining three-dimensional images using a fast method with the elimination of direct illumination The use of the previously described method has the drawback of requiring the acquisition of reference images. With each reference image acquisition, it is necessary to move the mirror (5113) considerably. It is possible to use a reference image for the phase correction of several successive useful images, and hence not acquire a reference image with each elementary image acquisition. Nevertheless, if the system is not perfectly stable over a time scale comparable to the acquisition time for a complete three-dimensional frequency representation, numerous reference image acquisitions will be required. Owing to the significant displacement of the mirror that they require, these acquisitions constitute a great loss of time. To obviate the acquisition of reference images, Steps 1 and 2 of Paragraph 7.17.2., whose purpose is to allow the phase correction of the two-dimensional frequency representations, can be replaced by the method described below. This method can also be used with the other embodiments, but is then of only limited interest.

This method includes a preliminary phase, which is carried out before any calculation requiring phase correction (i.e. before the actual imaging phase), then a modification of the steps used in the imaging phase. The acquisition of an image to be dealt with using this method can take place according to the procedure 9.9. used with Variant 1, i.e. without reference image acquisition and with the use of the glass to cancel the direct illumination.

9.19.1. Preliminary phase

The preliminary phase consists in determining, from a limited number of twodimensional frequency representations indexed by the index l, the arrays $Kn_{p,q}[ni,nj,l]$ $Fh_{p,q}[ni,nj,l]$. In these arrays:

p indexes the side (left or right) towards which the direct illuminating wave goes q indexes the side from which the frequency representation comes (opposite or not opposite the side on which the direct illuminating wave arrives)

l indexes the position of the point corresponding to the direct illuminating wave, on the image generated by the method described in 9.9., from the side indexed by q=0.

The indices (l,p) thus characterize an illuminating wave and the indices (l,p,q) characterize a two-dimensional frequency representation corresponding to this illuminating wave and to the sensor indexed by q.

The indices ni,nj are the coordinates on two axes of this frequency representation, after centering in relation to the point of direct impact of the illuminating wave.

The array $Kn_{p,q}[ni,nj,l]$ contains the third coordinate nk of the considered frequency representation, for each pair ni, nj.

The array $Fh_{p,q}[ni,nj,l]$ contains the value of this representation at the point of coordinates ni,nj,nk after phase correction in relation to the representation defined by l=0.

The array $Bh_{p,q}[ni,ni,l]$ contains the noise on the corresponding elements of $Fh_{p,q}[ni,nj,l]$.

These arrays thus characterize the values of the three-dimensional frequency representation of the object at a certain number of points. The array $Kn_{p,q}$ characterizes the points at which values are available, and the array $Fh_{p,q}$ characterizes these values themselves. The positions of the direct illuminating wave corresponding to the indices l are chosen so that every two-dimensional frequency representation, after recentering, has a non-empty intersection with the part of the three-dimensional frequency representation of the object constituted by the superposition of the representations corresponding to the different indices l, and characterized by the arrays $Kn_{p,q}$ and $Fh_{p,q}$.

The preliminary phase is broken down into three steps:

Step 1: FIG. 81 represents the points corresponding to the direct illuminating wave, on the image generated by procedure 9.9. from sensors reached by this direct illuminating wave, for several values of l. We denote IT[l], JL[l] the coordinates of point indexed by l, with for example:

| l | IL[l] | JL[l] |
|---|---|---|
| 0 | $\frac{N_{pix}}{2}$ | $\frac{N_{pix}}{2}$ |
| 1 | $N_{pix} - 1 - $ marge | $\frac{N_{pix}}{2}$ |
| 2 | $\frac{N_{pix}}{2}$ | $N_{pix} - 1 - $ marge |
| 3 | marge | $\frac{N_{pix}}{2}$ |
| 4 | $\frac{N_{pix}}{2}$ | marge | where marge=10 for example.

The points indexed by l must form part of the path defined by the arrays Io and Jo. The program then determines, for each value of l, the value of k such that IL[l]=Io[k] and JL[l]=Jo[k]. It stores this value the array TK at TK[l].

Step 2: The second step consists in determining the arrays $Kn_{p,q}$ and $Fh_{p,q}$ The program first initializes these arrays, for example to a value of −10000.

The program then goes through all the quintuplets (l,p,q,i,j). It calculates for each of them $$k=TK[l]$$

$$ni=i-i\max_{k,p,q}+N_{pix}$$

$$nj=j-j\max_{k,p,q}+N_{pix}$$

$$nk = \sqrt{\left(\frac{n_o}{n_v}K\right)^2 - \left(i-\frac{N_{pix}}{2}\right)^2 - \left(j-\frac{N_{pix}}{2}\right)^2} - \sqrt{\left(\frac{n_o}{n_v}K\right)^2 - \left(i\max_{k,p,q}-\frac{N_{pix}}{2}\right)^2 - \left(j\max_{k,p,q}-\frac{N_{pix}}{2}\right)^2} + N_{pix}$$

It takes for each of these numbers the nearest integer and then performs:

$$Kn_{p,q}[ni,nj,l]=nk$$

$$Fh_{p,q}[ni,nj,l]=M_{k,p,q}[i,j]D_{p\bar{q}+\bar{p}q}[i,j]$$

$$Bh_{p,q}[ni,nj,l]=B_{k,p,q}[i,j]\|D_{p\bar{q}+\bar{p}q}[i,j]\|$$

Step 3: This step consists in modifying the array $Fh_{p,q}$. The program goes through all the (l,p,q). For each value of this triplet, the program carries out Operations 1 to 3 below:

Operation 1: The program initializes to 0 the numbers nom and denom

Operation 2: The program goes through all the values of (ni,nj) testing the condition $|Kn_{p,q}[ni,nj,l]-Kn_{p,q}[ni,nj,0]|^2 \leq \lim$ with, for example, lim=1. When this condition is met, it performs:

$$nom_{p,q,l} \mathrel{+}= \frac{Fh_{p,q}[ni,nj,0]\overline{Fh_{p,q}[ni,nj,l]}}{(Bh_{p,q}[ni,nj,0])^2 + (Bh_{p,q}[ni,nj,l])^2}$$

$$denom_{p,q,l} \mathrel{+}= \frac{|Fh_{p,q}[ni,nj,l]|^2}{(Bh_{p,q}[ni,nj,0])^2 + (Bh_{p,q}[ni,nj,l])^2}$$

Operation 3: The program performs:

$$Fh_{p,q}[ni,nj,l] = \frac{nom_{p,q,l}}{denom_{p,q,l}} Fh_{p,q}[ni,nj,l]$$

9.19.2. Imaging phase

The imaging phase differs from the one used in 7.17.2. by the phase correction method. Phase correction here is carried out in relation to the part of the frequency representation of the object characterized by the arrays calculated in the preliminary phase, and not in relation to the illuminating wave image point, to prerecorded values of the illuminating wave or to reference images.

Steps 1, 2 and 3 below replace Steps 1 and 2 defined in 7.17.2.

Step 1: The program carries out, for all the values of k,p,q,i,j:

$$M_{k,p,q}[i,j]=M_{k,p,q}[i,j]D_{p\bar{q}+\bar{p}q}[i,j]$$

$$B_{k,p,q}[i,j]=B_{k,p,q}[i,j]\|D_{p\bar{q}+\bar{p}q}[i,j]\|$$

Step 2: This step consists in establishing the complex coefficient characterizing, for each two-dimensional representation, the phase and intensity shift between this two-dimensional representation and the portion of three-dimensional representation characterized by the arrays $Kn_{p,q}$ and $Fh_{p,q}$. This complex coefficient, for the representation characterized by the indices k,p,q, is expressed in the form $$\frac{nom_{k,p,q}}{denom_{k,p,q}}.$$

It is obtained by carrying out a loop on all the indices (k,p,q,i,j,l). For each (k,p,q,i,j,l):

The program calculates:

$$ni=i-i\max_{k,p,q}+N_{pix}$$

$$nj=j-j\max_{k,p,q}+N_{pix}$$

$$nk = \sqrt{\left(\frac{n_o}{n_v}K\right)^2 - \left(i-\frac{N_{pix}}{2}\right)^2 - \left(j-\frac{N_{pix}}{2}\right)^2} - \sqrt{\left(\frac{n_o}{n_v}K\right)^2 - \left(i\max_{k,p,q}-\frac{N_{pix}}{2}\right)^2 - \left(j\max_{k,p,q}-\frac{N_{pix}}{2}\right)^2} + N_{pix}$$

It tests the condition:

$$|Kn_{p,q}[ni,nj,l]-nk|^2 \leq \lim \text{ with, for example, lim=1.}$$

If the condition is true, the program performs the operations $$nom_{k,p,q} \mathrel{+}= \frac{\overline{M_{k,p,q}[i,j]}Fh_{p,q}[ni,nj,l]}{(B_{k,p,q}[i,j])^2 + (Bh_{p,q}[ni,nj,l])^2}$$

$$denom_{k,p,q} \mathrel{+}= \frac{|M_{k,p,q}[i,j]|^2}{(B_{k,p,q}[i,j])^2 + (Bh_{p,q}[ni,nj,l])^2}$$

Step 3: This step constitutes the phase correction proper. The program performs:

$$M_{k,p,q}[i, j] = \frac{nom_{k,p,q}}{denom_{k,p,q}} M_{k,p,q}[i, j]$$

9.20. Obtaining threedimensional images with a simplified method

To generate the three-dimensional image of the object, we can confine ourselves to the representation $F_{0,0}$ defined in 7.17. This is equivalent, in the procedure described in 7.17.2., to adopting arrays $IB_{p,q}$ which are zero for any pair $(p,q) \neq (0,0)$.

It is also assumed here that the object has an average refractive index close to the nominal index of the object observed and that the optical table is totally devoid of vibrations.

Steps 9.11. to 9.17 can then be eliminated. The present method differs moreover from the preceding one in the method used to adjust the position of the objectives before utilization and in the image superposition algorithm.

9.20.1. Adjustment of objectives and of mirror (5113)

This adjustment can be carried out with a transparent plate provided the objectives are not moved after adjustment, when the object is introduced. If objectives designed to operate without any immersion liquid or any cover glass are involved (nominal index equal to 1) or if the sample is not very thick or has an average index close to 1, it can also be carried out without an object. During this step, the beams FEG and FRD are used.

The mirror (5113) must be removable and must be replaceable by a plate absorbent at every point except at a central point where a reflector of small dimensions is placed. The dimensions of this reflector should be about $$\frac{D}{2N_{pix}}$$

where D is the diameter of the beam incident on the mirror (5113). This plate must be temporarily placed on the mirror so that the reflector occupies roughly the center of the beam incident on the mirror. The mirror positioner must itself be fixed on a three-axis translation positioner.

This adjustment must be carried out immediately after the series of adjustments described in 9.5., and the objectives must not be moved any more thereafter. It includes the following steps:

Step 1: The mirror is replaced by the absorbing plate

Step 2: Using only the beam FRD, the mirror is translated so that the image produced on the CCD (4339) is a centered point image.

Step 3: Using only the beam FEG, the objectives are moved so that the image produced on the CCD (4339) is a centered point image.

Step 4: The mirror can then be put back in place.

9.20.2. Algorithm for calculating the three-dimensional representation

Steps 1 and 2 of the algorithm described in 7.17.2. can be eliminated. In fact, the additional adjustment carried out and the absence of vibrations make it possible to avoid any phase shift in the illuminating beam.

9.21. Use of objectives exhibiting aberrations

As in the third embodiment, objectives of the type described in 7.20 or 7.21 can be used. The corresponding modifications of the algorithms are similar to those described in 7.20 and 7.21. It is of course necessary to adapt them to the method for obtaining the plane frequency image, which differs significantly from the third embodiment.

10. OPTICAL ELEMENT POSITIONING DEVICE

The embodiments described, and in particular Embodiment 4, require the use of many high-precision positioners. These positioners are costly elements ill suited to mass production and capable of losing their adjustment with time. These positioners, with the exception of the positioners of the objectives and the sample, should in principle be adjusted only once, during the initial adjustment phase.

A solution to this problem is to use removable positioners during the manufacture of the microscope. After positioning, each element can be fixed with an appropriate adhesive. For example, in Embodiment 4, the SLMs may be secured by means of the device of FIGS. 83 to 85. The part of the attachment device which is incorporated in the microscope comprises three mobile assemblies:

Assembly 1: Consisting of the following elements, connected together:
- an attachment plate (5801) shown in detail in FIG. 83 and having a porous surface for gluing (5802).
- the SLM (5804) fixed on the unglued part (5803) of this plate.
- a plate (5808) in magnetizable material, for example iron, fixed to the rear of the plate (5801).

Assembly 2: Consisting of the following elements, connected together:
- a plate (5805) shown in detail in FIG. 84 exhibiting a porous surface for gluing (5806) and a hollow (5807) at its center.
- a plate (5809) exhibiting a surface for gluing (5817).
- a plate (5810) in magnetizable material, for example iron, fixed to the plate (5809).

Assembly 3: Consisting of a plate (5811) exhibiting a porous surface for gluing (5816).

The removable part of the attachment device includes the following assemblies:

Assembly 4: Consisting of an arm (5815) with a magnetizable part (5814) and connected to a positioner POS1 not shown. The part (5814) comprises an electric wire winding around an iron core, not shown. By supplying this winding, (5814) and (5810) are brought together and, eliminating the power supply, these elements are disconnected.

Assembly 5: Consisting of an arm (5813) with a magnetizable part (5812) and connected to a positioner POS2 not shown. The part (5812) comprises an electric wire winding around an iron core, not shown. By supplying this winding, (5808) and (5812) are brought together and, eliminating the power supply, these elements are disconnected.

The fixed part of positioner POS1 and the element 3 are integral with the optical table. The "fixed" part of positioner POS2 is integral with the mobile part of positioner POS1. Positioner POS1 allows single-axis displacement in the direction of the axis $\vec{i}$ and a rotation around the axis $\vec{j}$. Positioner POS2 allows translation along each of the vectors $\vec{j}$ and $\vec{k}$ and rotation around the axis $\vec{i}$. It also allows, but with a very small adjustment margin, rotation around the axis $\vec{k}$.

For the positioning of the system, the above-designated surfaces to be glued are first glued. The magnets of the parts (5812) and (5814) are powered so as to connect the removable parts and the non-removable parts. The adjustment is carried out normally with positioners POS1 and POS2. The system is left in place sufficiently long so that the glue dries. The magnets are then no longer powered so as to detach the removable parts from the non-removable parts. The adjustment is then final and the removable part can be removed.

The glue used must have a sufficiently long setting time so as not to hinder adjustment and must have a minimum shrinkage when it dries. It is also possible to provide specific orifices in the plates (5811) and (5805) to inject glue after positioning. This example is given for the positioning of the SLMs but is adaptable simply to all the elements to be positioned in the system. Depending on the number of degrees of freedom required and the type of element to be positioned, the form of the mobile platforms must be adapted. The principle consisting in using removable positioners and in carrying out final attachment by gluing however remains valid.

11. SUPPORT SUITED TO THE TRANSPORT AND MAINTAINING OF ADJUSTMENTS MADE

The microscopes described in Embodiments 3 to 5 are made up of a number of elements fixed to an optical table. During possible transport, even light shocks can lead to a disadjustment of the system. During prolonged use, dust may become deposited on the different optical elements.

To deal with these problems, the microscope described can be protected by a system whose principle is shown in FIG. 86. The optical table, which can be in granite, for example, constitutes the lower part of a hermetically closed box (5901). The fact that the box (5901) is hermetically closed protects the assembly from dust. The box (5901) is included in a larger box (5902), without any direct contact between the two boxes. The two boxes are separated by shock absorbers which may be rubber balloons (5903) inflated in an appropriate manner, and which are placed on the six sides of the box (5901). This system allows the absorption of shocks and prevents loss of adjustment during transport, while guaranteeing good suspension of the optical table during utilization.

However, the part of the system made up of the two objectives and their positioners must remain accessible. This leads to certain adaptations in the form of the boxes, shown in FIG. 87, adapted here to the example constituted by the embodiments 4 and 5. The front wall of the box (5901) constitutes a vertical plane passing in FIG. 63 between the mirrors (4451) and (4452). The box (5901) has a projection (5903) allowing the attachment of the mirrors (4454)(4455) (4456) and of the objective (4317) under the plane of the optical table proper. The box (5902) shown in broken lines has a recess (5904) accommodating the objectives and the sample.

In order for the mirrors (4453) and (4454), as well as the inlets of the objectives, to remain inaccessible, and in order to prevent any ingress of dust, the form of the box (5902) must also be adapted locally. This adaptation is shown in detail in FIG. 88. The box has two projections (5905) and (5906) containing respectively the mirrors (4453) and (4454), and has two openings linked to the inlet of the objectives (in fact, to the mounts of these objectives) by rubber sleeves (6001) (6002). The positioners of the objectives and of the sample, not shown, are outside the box (5902).

In FIG. 87, the shock absorbers (5903) are not shown, but they are present in the entire zone between the two boxes.

A cover protecting the accessible part (objectives and sample, as well as their positioners) must also be provided.

In the case of Embodiment 5, the outside box (5901) must include an additional compartment containing the elements which are not on the optical table.

12. VARIANTS

Other embodiments are of course possible and the description above is not limitative. It is in particular possible to use more objectives, or to have other combinations of the types of beam deflector or receiver, or modify the phase correction algorithms.

13. INDUSTRIAL APPLICATION POSSIBILITIES

13.1. REFERENCES

[Thomas]: 4-D imaging software observe living cells, Charles Thomas & John White, Scientific Computing World p.31, décembre 1996.

[Holton]: Under a Microscope: Confocal Microscopy Casts New Light on the Dynamics of Life, W. Conard Holton, Photonics Spectra p.78, février 1995.

[Pike]: Phase measuring scanning optical microscope, J. G. Walker & E. R. Pike, brevet WO 91/07682

[Bertero]: Analytic inversion formula for confocal scanning microscopy, B. Bertero, C.Of Mol, E. R. Pike, Journal of the Optical Society of America vol.4 no.9, septembre 1987

[Ueki]: Three-dimensional optical memory with a photorefractive crystal, Y. Kawata, H. Ueki, Y. Hashimoto, S. Kawata, Applied Optics vol.34 no 20 p.4105, 10 juillet 1995

[Juskaitis]: Differential phase-contrast microscope with a split detector for the readout system of a multilayered optical memory, Y. Kawata, R. Juskaitis, T. Tanaka, T. Wilson & S. Kawata, Applied Optics vol.35 no 14 p.2466, 10 mai 1996

[Parthenopoulos]: Three-dimensional optical storage memory, D. A. Parthenopoulos & P. M. Rentzepis, Science 245, p.843, 1989

[Strickler]: Three dimensional optical data storage in refractive media by two-photon excitation, J. H. Strickler & W. W. Webb, Optics Letters 16, p.1780, 1991

[McMichael]: Compact holographic storage demonstrator with rapid access, I. McMichael, W. Christian, D. Pletcher, T. Y. Chang & J. H. Hong, Applied Optics vol.35 no 14 p.2375, 10 mai 1996.

[Bashaw]: Cross-talk considerations for angular and phase-encoded multiplexing in volume holography, M. C. Bashaw, J. F. Heanue, A. Aharoni, J. F. Walkup & L. Hesselink, Journal of the Optical Society of America B vol.11 no 9 p.1820 septembre 1994

[Barbarstatis]: Shift multiplexing with spherical reference waves, G. Barbarstatis, M. Levene, D. Psaltis, Applied Optics vol.35 no 14 p.2403, 10 mai 1996

13.2. Discussion

Prior-art microscopes form, by an optical process, a two-dimensional image corresponding to a magnified section of the observed object. This image may, if desired, be recorded by a video camera for subsequent restitution.

It is possible to generate a three-dimensional image using one of these microscopes and varying the focussing adjustment. To each adjustment there corresponds a different section plane, and an image in three dimensions can be reconstituted from these section planes. Some microscopes equipped with a powered focussing device and appropriate software perform this operation automatically. Such microscopes are described for example in [Thomas]. The major drawback of these microscopes is that the image of a section plane is highly disturbed by the content of the other planes.

There are also confocal microscopes in which the illumination is focussed on a point and the three-dimensional image is generated by scanning all the points of the object. Such microscopes are described for example in [Holton]. These microscopes make it possible to solve the problem of the systems described in [Thomas], namely that the value detected at a given point is not greatly disturbed by the value of neighboring points.

Confocal microscopes have the drawback of being able to detect only the intensity of the received wave and not its phase. As many objects currently observed are characterized essentially by variations in refractive index leading to variations in the phase of the transmitted wave, this drawback is significantly troublesome for users who must color the images observed. For this reason, efforts were made to design confocal microscopes sensitive to the phase of the transmitted wave [Pike]. For various reasons, these microscopes are still not very effective.

The image generated by confocal microscopes does not have the best theoretical definition obtainable in principle from the wave received by the objective used. This is related, as indicated in 7.18.3., to the fact that the confocal microscope method filters the high frequencies significantly. For this reason, efforts have been made to improve the resolution of these confocal microscopes [Bertero].

The present microscope remedies these shortcomings of prior-art microscopes in terms of resolution and in terms of phase detection. It can be used advantageously as a replacement for such microscopes, in all their applications.

A new field of application for microscopes is the reading of three-dimensional optical memories.

A first type of optical memory is the one in which data are recorded point by point in a three-dimensional material in the form of variations in the local properties of this material ([Ueki], [Parthenopoulos], [Strickler]). These data must thus be read by a microscope capable of reading three-dimensional data without any mutual disturbance between the data recorded in several successive layers of material. The disturbance of the image of a point by rays diffracted by neighboring points thus results here in inter-symbol interference. In general, the authors have used few layers at great distances from each other, thus limiting these interferences. However, if a greater quantity of data must be recorded in a given volume, conventional microscopy methods are inadequate. In particular in the case of [Strickler] and [Ueki], data are recorded in the form of index variations and the confocal microscope is particularly ill suited to their reading. For this reason, efforts have been made to improve the data reading system [Juskaitis].

The present microscope constitutes the reading solution allowing maximum integration of this type of memory. In fact, the image that it makes obtainable takes into account the index and reduces inter-symbol interference significantly. In the ideal case in which the entire beam coming from the sample is detected, which may be accomplished by increasing the number or the aperture of the objectives, inter-symbol interference is entirely eliminated.

Another type of optical memory is the holographic memory. For example, in the document [McMichael], data are read by illuminating the object constituted by the optical memory with a parallel beam of variable direction and by detecting the wave coming from the sample for each direction of the illuminating beam. A direction of the illuminating beam corresponds to a page of data and each point of the two-dimensional frequency representation of the wave coming from the object for a given illuminating wave corresponds to a bit stored in the optical memory. As each point of the two-dimensional representation of the wave coming from the object moreover corresponds to a point of the three-dimensional representation of the object itself, a bit stored in the optical memory corresponds to a point of the three-dimensional frequency representation of this optical memory. An analysis of this type of memory in terms of frequency representations may be found in [Bashaw].

The present microscope can thus be used advantageously to read such optical memories, the bits stored en memory corresponding directly to points of the three-dimensional frequency representation obtained by the present microscope from the object constituted by the optical memory. The writing system of the optical memory must however be designed so as not to use the points of the three-dimensional frequency representation which are not obtained by the present microscope, except to increase the number of objectives used in order to avoid non-detection of certain frequencies.

Other types of holographic optical memories exist [Barbarstatis]. In general, the present microscope makes it possible to obtain a representation of the observed object which would be "perfect" in the ideal case in which the objectives used would cover the entire space around the object. In the case in which the representation obtained is perfect, the data stored in memory and detected in the form of a three-dimensional frequency representation of the object can then be restored in any form: it is possible to simulate, by using the known representation of the object constituted by the optical memory, the wave which would be obtained from any illumination or by any other reading method (at the wavelength used by the microscope). All types of optical memory may thus be read by the present microscope, in the general case by means of additional operations allowing the reconstitution of the data from the frequency representation of the object constituted by the optical memory. In the case in which the representation is not perfect, adequate precautions must be taken in order to take into account the "shadow zones" of the frequency representation of the object.

What is claimed is:

1. A microscope comprising:
   a) means providing a laser beam,
   b) means for splitting the laser beam into a reference wave and an illuminating wave,
   c) optical means for rendering the illuminating wave plane and for directing it towards an observed object, the illuminating wave being diffracted by the observed object to produce a diffracted wave,
   d) optical means for superimposing the diffracted wave and the reference wave, to produce an interference pattern,
   e) at least one receiver for receiving and recording the interference pattern,
   f) means for calculating, from the recorded interference pattern, a frequency representation of the diffracted wave, corresponding to phases and amplitudes of plane wave components of the diffracted wave,
   g) a beam deflector for varying the direction of the illuminating wave from a first direction to a second direction, for obtaining a first frequency representation of the diffracted wave corresponding to the first direction of the illuminating wave, and a second frequency representation of the diffracted wave corresponding to the second direction of the illuminating wave, h) means for applying a first phase shift to the first frequency representation, i) means for superimposing the first frequency representation and the second frequency representation to obtain a three-dimensional frequency representation of the observed object, wherein the first phase shift is such that the part of the three-dimensional frequency representation corresponding to the first frequency representation has substantially the same phase reference as the part of the three-dimensional frequency representation corresponding to the second frequency representation.

2. The microscope of claim 1, wherein the means for applying the first phase shift to the first frequency representation are calculation means.

3. The microscope of claim 2, wherein said calculation means multiply the first frequency representation by a complex number having a phase corresponding to the first phase shift.

4. The microscope of claim 2, wherein said beam deflector varies the direction of the illuminating wave from the second direction to a third direction and to a fourth direction, for obtaining a third frequency representation of the diffracted wave corresponding to the third direction of the illuminating wave, and a fourth frequency representation of the diffracted wave corresponding to the fourth direction of the illuminating wave, and further comprising means for superimposing the first frequency representation and the third frequency representation to obtain a first sub-representation of the observed object, and means for superimposing the second frequency representation and the fourth frequency representation to obtain a second sub-representation of the observed object, and wherein said means for applying a first phase shift comprise means for applying a second phase shift to the first sub-representation of the observed object, thus shifting the phase of the first frequency representation included in the first sub-representation, and further comprising means for superimposing the first sub-representation and the second sub-representation to obtain the three-dimensional frequency representation of the object, thus superimposing the first frequency representation included in the first sub-representation and the second frequency representation included in the second sub-representation.

5. The microscope of claim 1, further comprising means for causing the phase difference between the illuminating wave and the reference wave to be reproducible.

6. The microscope of claim 5, wherein said means for applying a first phase shift comprise an optoelectronic device for shifting the phase of the illuminating and/or the reference wave, thus shifting the phase of the first frequency representation.

7. The microscope of claim 5, wherein said means for applying a first phase shift comprise adjustment means for adjusting the position of an optical element, so as to simultaneously adjust the phase shifts applied to the illuminating wave for a plurality of directions of the illuminating wave.

8. The microscope of claim 1, further comprising means for determining the first phase shift.

9. The microscope of claim 8, wherein said means for determining the first phase shift determine the phase difference between at least a first point of the second frequency representation and a corresponding second point of the first frequency representation, said first and second points being superimposed in the three-dimensional frequency representation.

10. The microscope of claim 9, wherein said means for determining the first phase shift calculate a complex number having a phase which is an evaluation of said phase difference.

11. The microscope of claim 10, wherein said means for determining the first phase shift calculate a weighted average, over a plurality of the first points and the corresponding second points, of the product of the complex value of the second frequency representation at the second point by the conjugate of the complex value of the first frequency representation at the first point, for obtaining said complex number.

12. The microscope of claim 1, further comprising means for applying a second phase shift to the second frequency representation of the diffracted wave.

13. The microscope of claim 12, wherein said means for applying the first and second phase shifts consist of means for dividing the first frequency representation by the value of the first frequency representation at a first point, and means for dividing the second frequency representation by the value of the second frequency representation at a second point, wherein the first and second points are superimposed to the point of origin in the three-dimensional frequency representation.

14. The microscope of claim 1, wherein the observed object, and said at least one receiver, are fixed in position.

15. The microscope of claim 1, further comprising means for multiplying the first and second frequency representations by a set of complex values for cancelling spherical aberration.

16. The microscope of claim 1, further comprising:

a) a first microscope objective lens disposed along the path of the illuminating wave directed towards the observed object, in the first direction of the illuminating waves b) a second microscope objective lens disposed along the path of the illuminating wave directed towards the observed object, in the second direction of the illuminating wave, c) said at least one receiver comprising a first receiver unit for recording the wave coming from the observed object after passing through the first objective, and at least a second receiver unit for recording the wave coming from the observed object after passing through the second objective.

17. The microscope of claim 1, further comprising a) means for polarizing the illuminating wave in two directions orthogonal to each other, and b) means for analyzing the diffracted wave in two directions orthogonal to each other.

18. The microscope of claim 1, wherein the beam deflector comprises:

a) a primary beam deflector for generating small variations of the direction of a parallel beam, and b) a condenser lens for transforming the small variations into large variations of the direction of the illuminating beam.

19. The microscope of claim 18, wherein said primary beam deflector comprises a first spatial modulator controlled so as to generate an exiting beam from an incident parallel beam of given direction, the direction of the exiting beam being controlled by the state of the modulator.

20. The microscope of claim 19, wherein said spatial modulator is a binary modulator.

21. The microscope of claim 20, further comprising:
   a) a first intermediate lens located along the path of the exiting beam,
   b) a diaphragm and/or a second spatial modulator placed in the image focal plane of the first intermediate lens to eliminate spurious beams generated by the first spatial modulator, and
   c) a second intermediate lens located along the path of the exiting beam downstream of said diaphragm to convert the beam exiting from the diaphragm into a parallel beam.

22. In a microscope, a method for generating a three-dimensional frequency representation of an observed object, comprising the steps of:
   a) splitting a laser beam into a reference wave and an illuminating wave,
   b) rendering the illuminating wave plane
   c) directing the plane iluminating wave in a first direction for illuminating the observed object, the illuminating wave being diffracted by the object to provide a diffracted wave,
   d) superimposing the diffracted wave and the reference wave to produce an interference pattern,
   e) recording the interference pattern,
   f) calculating from at least the interference pattern a first frequency representation of the diffracted wave corresponding to phases and amplitudes of plane wave components of the diffracted wave,
   g) changing the direction of the illuminating wave and repeating steps (d) to (f) at least once, to produce at least a second frequency representation of the diffracted wave,
   h) applying a first phase shift to the first frequency representation, and
   i) superimposing the first frequency representation and the second frequency representation, to obtain a three-dimensional frequency representation of the observed object,
   wherein the first phase shift is such that the part of the three-dimensional frequency representation corresponding to the first frequency representation has substantially the same phase reference as the part of said three-dimensional frequency representation corresponding to the second frequency representation.

23. The method according to claim 22, wherein said step of applying a first phase shift comprises multiplying the first frequency representation by a complex number having a phase which is equal to said first phase shift.

24. The method according to claim 22, further comprising the steps of:
   a) varying the direction of the illuminating wave from the second direction to a third direction and to a fourth direction for obtaining a third frequency representation of the diffracted wave corresponding to the third direction of the illuminating wave and a fourth frequency representation of the diffracted wave corresponding to the fourth direction of the illuminating wave
   b) superimposing the first frequency representation and the third frequency representation to obtain a first sub-representation of the observed object, and superimposing the second frequency representation and the fourth frequency representation to obtain a second sub-representation of the observed object,
   c) applying the first phase shift to the first sub-representation of the observed object, thus shifting the phase of the first frequency representation included in the first sub-representation,
   d) superimposing the first frequency representation and the second frequency sub-representation to obtain the three-dimensional frequency representation of the object, thus superimposing the first frequency representation included in the first sub-representation and the second frequency representation included in the second sub-representation.

25. The method according to claim 22, wherein said step of directing the illuminating wave in a first direction is performed such that the phase difference between the illuminating wave and the reference wave is reproducible.

26. The method according to claim 25, wherein the step of applying a first phase shift is performed by shifting the phase of the reference wave and/or the phase of the illuminating wave when the illuminating wave is directed in the first direction, thus shifting the phase of the first frequency representation.

27. The method according to claim 26, wherein the shift of the phase of the illuminating wave and/or the reference wave is performed by applying independent phase shifts for each direction of the illuminating wave.

28. The method according to claim 26, further providing a step of adjusting the position of an optical element for simultaneously adjusting the phase shifts applied to the illuminating wave for a plurality of directions of the illuminating wave.

29. The method according to claim 22, further comprising the step of determining the first phase shift.

30. The method according to claim 29, wherein said step of determining the first phase shift comprises determining the phase difference between at least a first point of the second frequency representation and a corresponding second point of the first frequency representation to obtain the first phase shift, said first and second points being superimposed in the three-dimensional frequency representation.

31. The method according to claim 30, wherein said step of determining the first phase shift consists of determining a complex number having a phase which is equal to said phase difference.

32. The method according to claim 31, wherein said step of determining the first phase consists of calculating a weighted average, over a plurality of the first points and of the corresponding second points, of the product of the complex value of said second frequency representation at said second point, by the conjugate of the complex value of said first frequency representation at said first point.

33. The method according to claim 22, further comprising the step of applying a second phase shift to the second frequency representation.

34. The method according to claim 33, wherein said step of applying a first phase shift consists of dividing the first frequency representation by its value at a first point of the first frequency representation and wherein said step of applying a second phase shift consists of dividing the second frequency representation by its value at a second point, said first and second points being superimposed to the point of origin in the three-dimensional frequency representation.

35. The method according to claim 22, further comprising the step of multiplying said first and second frequency representations by a set of complex values, to cancel the spherical aberration.

36. The method according to claim 22, wherein the interference pattern is recorded on fixed receiver means and wherein the observed object remains fixed in position.

37. The method of claim 22, further comprising the steps of:

j) directing the illuminating wave through a first microscope objective towards said observed object, to obtain said first direction of the illuminating wave, k) recording the interference pattern formed by the reference wave and by the wave diffracted by the object and having passed through the first microscope objective, l) recording the interference pattern formed by the reference wave and by the wave diffracted by the object and having passed through a second microscope objective, and m) directing the illuminating wave through the second microscope objective towards said observed object, to obtain said second direction of the illuminating wave, and repeating steps k) and l).

38. The method of claim 22, further comprising the steps of:

a) polarizing the illuminating wave in two directions orthogonal to each other, and b) analyzing the diffracted wave in two directions orthogonal to each other.

39. In a microscope, a method for improving an initial three-dimensional frequency representation of an observed object, comprising the steps of:

a) splitting a laser beam into a reference wave and an illuminating wave, b) rendering the illuminating wave plane and directing it in a first direction for illuminating the observed object, thereby providing a diffracted wave diffracted by the object, c) superimposing the diffracted wave and the reference wave, to produce an interference pattern, d) recording the interference pattern, e) calculating, from at least the interference pattern, a first frequency representation of the diffracted wave corresponding to phases and amplitudes of plane wave components of the diffracted wave, f) applying a first phase shift to the first frequency representation, and g) superimposing the first frequency representation and the initial three-dimensional frequency representation, to obtain a final frequency representation, wherein the first phase shift is such that the part of the three-dimensional frequency representation corresponding to the first frequency representation has substantially the same phase reference as the part of said three-dimensional frequency representation corresponding to the second frequency representation.

* * * * *